(12) United States Patent
Ohki

(10) Patent No.: US 11,747,452 B2
(45) Date of Patent: Sep. 5, 2023

(54) DISTANCE MEASURING DEVICE

(71) Applicant: SONY SEMICONDUCTOR SOLUTIONS CORPORATION, Kanagawa (JP)

(72) Inventor: Mitsuharu Ohki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 410 days.

(21) Appl. No.: 16/763,903

(22) PCT Filed: Oct. 17, 2018

(86) PCT No.: PCT/JP2018/038711
§ 371 (c)(1),
(2) Date: May 13, 2020

(87) PCT Pub. No.: WO2019/102751
PCT Pub. Date: May 31, 2019

(65) Prior Publication Data
US 2021/0025980 A1 Jan. 28, 2021

(30) Foreign Application Priority Data
Nov. 22, 2017 (JP) .................................. 2017-224451

(51) Int. Cl.
*G01S 7/487* (2006.01)
*G01S 7/48* (2006.01)
(Continued)

(52) U.S. Cl.
CPC ............ *G01S 7/487* (2013.01); *G01S 7/4808* (2013.01); *G01S 7/4863* (2013.01); *G01S 17/08* (2013.01)

(58) Field of Classification Search
CPC ...... G01S 7/487; G01S 7/4808; G01S 7/4863; G01S 17/08
See application file for complete search history.

(56) References Cited

U.S. PATENT DOCUMENTS

| 5,319,720 A * | 6/1994 | Yokoyama ............ G06T 7/0006 382/199 |
| 6,587,185 B1 * | 7/2003 | Ide ......................... H03K 5/125 327/1 |

(Continued)

FOREIGN PATENT DOCUMENTS

| CN | 1929561 A * | 9/2006 | ........... H04N 5/2351 |
| CN | 1503914 A | 6/2014 | |

(Continued)

OTHER PUBLICATIONS

Oh, et al., "Reduction of Range Walk Error in Direct Detection Laser Radar Using a Geiger Mode Avalanche Photodiode", Optics Communications, vol. 283, Issue 2, Jan. 15, 2010, pp. 304-308.

(Continued)

*Primary Examiner* — Zaihan Jiang
(74) *Attorney, Agent, or Firm* — Chip Law Group

(57) ABSTRACT

An appropriate peak detection is performed on the basis of a histogram indicating a frequency of reception of reflected light to measure a distance to a target object. A histogram acquisition unit acquires a histogram indicating the frequency of reception of reflected light including active light components that are active light emitted from a light emitting unit and reflected by the target object and ambient light components that are ambient light reflected by the target object. A detection unit detects a distribution of the active light components by performing predetermined statistical processing on the histogram. A measurement unit measures (Continued)

the distance to the target object as distance information on the basis of the distribution of the active light components.

18 Claims, 139 Drawing Sheets

(51) Int. Cl.
    *G01S 7/4863*     (2020.01)
    *G01S 17/08*     (2006.01)

(56) References Cited

U.S. PATENT DOCUMENTS

| | | | |
|---|---|---|---|
| 2004/0070748 A1* | 4/2004 | Inaba | G01S 17/10 356/5.01 |
| 2005/0231709 A1* | 10/2005 | Inaba | G01S 17/10 356/5.01 |
| 2016/0033644 A1 | 2/2016 | Moore | |

FOREIGN PATENT DOCUMENTS

| | | | |
|---|---|---|---|
| CN | 104010191 B | * | 6/2014 |
| EP | 1382979 A1 | | 1/2004 |
| JP | H07120384 | * | 10/1993 |
| JP | 06-230001 A | | 8/1994 |
| JP | 4504492 B2 | * | 2/2000 |
| JP | 2002-328168 A | | 11/2002 |
| JP | 2010-091377 A | | 4/2010 |
| JP | 2014-211393 A | | 11/2014 |
| JP | 2015-108539 A | | 6/2015 |
| JP | 2016-161438 A | | 9/2016 |
| JP | 6443132 B2 | | 12/2018 |
| WO | 2002/088772 A1 | | 11/2002 |

OTHER PUBLICATIONS

International Search Report and Written Opinion of PCT Application No. PCT/JP2018/038711, dated Jan. 22, 2019, 23 pages of ISRWO.

* cited by examiner

FIG. 27

```
PROCESSING OF REMOVING NOISE FROM
"HISTOGRAM H(t, x, y, n) AT TIME OF INTEREST t
AND POSITION OF INTEREST (x, y)"
```

↓ S281

CHOOSE TIME AND POSITION IN PROXIMITY TO TIME t AND POSITION (x, y) IN TIME AND SPACE AS (t1, x1, y1). HERE, THERE IS PLURALITY OF SETS OF (t1, x1, y1).

↓ S282

INPUT HISTOGRAM OBTAINED FROM ACCUMULATION UNIT 15 FOR EVERY ONE OF PLURALITY OF SETS OF (t1, x1, y1) AS H(t1, x1, y1, n). HERE, n = 0 TO N−1.

↓ S283

FOR EVERY ONE OF PLURALITY OF SETS OF (t1, x1, y1), AND FOR offset = −Os TO Os, EXECUTE ROUTINE OF CALCULATING EVALUATION VALUE OF SIMILARITY OF "HISTOGRAM OBTAINED BY SHIFTING HISTOGRAM AT TIME t1 AND POSITION (x1, y1) BY offset" TO "HISTOGRAM AT TIME t AND POSITION (x, y)".

↓ S284

IN EVALUATION VALUES S(t, x, y, t1, x1, y1, offset) FOR CORRESPONDING SETS OF (t1, x1, y1) OBTAINED IN STEP S283, EXPRESS MAXIMUM offset VALUE IN RANGE OF offset = −Os TO Os AS offsetMax(t1, x1, y1).

↓ S285

INPUT PIXEL VALUE IN IMAGE BY CAMERA 100 CORRESPONDING TO "OBJECT BEING MEASURED BY SPAD AT (t, x, y)". EXPRESS IT AS E(t, x, y). INPUT PIXEL VALUE IN IMAGE BY CAMERA 100 CORRESPONDING TO "OBJECT BEING MEASURED BY SPAD AT EVERY ONE OF PLURALITY OF SETS OF (t1, x1, y1)". EXPRESS IT AS E(t1, x1, y1).

↓ S286

CALCULATE EXPRESSION 27. NOTE THAT (t1, x1, y1) CHOSEN IN STEP S281 IS ACCUMULATED IN EXPRESSION 27.

↓ S287

OUTPUT HNR(t, x, y, n), WHICH IS CALCULATION RESULT OF EXPRESSION 27, AS SHARPENED HISTOGRAM. HERE, n = 0 TO N−1.

↓

( END )

FIG. 30

| | INFORMATION | APPROPRIATE ADDITION |
|---|---|---|
| FIRST WORKING EXAMPLE | SIMILARITY BETWEEN A HISTOGRAM AT "TIME AND POSITION" OF INTEREST AND A HISTOGRAM AT "TIME AND POSITION" IN PROXIMITY THERETO | WITH WEIGHTING IN ACCORDANCE WITH THE SIMILARITY, ADD A HISTOGRAM IN PROXIMITY THERETO |
| SECOND WORKING EXAMPLE | SIMILARITY BETWEEN A HISTOGRAM AT "TIME AND POSITION" OF INTEREST AND A HISTOGRAM AT "TIME AND POSITION" IN PROXIMITY THERETO, AND A DISTANCE BETWEEN THE "TIME AND POSITION" OF INTEREST AND THE "TIME AND POSITION" IN PROXIMITY THERETO | WITH WEIGHTING IN ACCORDANCE WITH THE SIMILARITY AND THE DISTANCE, ADD A HISTOGRAM IN PROXIMITY THERETO |
| THIRD WORKING EXAMPLE | SIMILARITY BETWEEN A GROUP OF HISTOGRAMS CENTERED ON "TIME AND POSITION" OF INTEREST AND A GROUP OF HISTOGRAMS CENTERED ON "TIME AND POSITION" IN PROXIMITY THERETO | WITH WEIGHTING IN ACCORDANCE WITH THE SIMILARITY, ADD A HISTOGRAM IN PROXIMITY THERETO |
| FOURTH WORKING EXAMPLE | SIMILARITY BETWEEN HISTOGRAMS CONSECUTIVE IN A DIRECTION FROM A POSITION OF INTEREST IN TIME AND SPACE | WITH WEIGHTING IN ACCORDANCE WITH THE SIMILARITY IN A DIRECTION, ADD A HISTOGRAM IN THAT DIRECTION |
| FIFTH WORKING EXAMPLE | IN AN IMAGE OBTAINED FROM AN ATTACHED CAMERA, A DIFFERENCE BETWEEN A PIXEL VALUE CORRESPONDING TO "TIME AND POSITION" OF INTEREST AND A PIXEL VALUE CORRESPONDING TO "TIME AND POSITION" IN PROXIMITY THERETO, AND A DISTANCE BETWEEN THE "TIME AND POSITION" OF INTEREST AND THE "TIME AND POSITION" IN PROXIMITY THERETO | WITH WEIGHTING IN ACCORDANCE WITH THE "DIFFERENCE BETWEEN THE PIXEL VALUES" AND THE "DISTANCE", ADD A HISTOGRAM IN PROXIMITY THERETO |
| SIXTH WORKING EXAMPLE | USING AN IMAGE OBTAINED FROM AN ATTACHED CAMERA, A DIFFERENCE BETWEEN A VALUE OF A GROUP OF PIXELS CENTERED ON A POSITION IN THE IMAGE CORRESPONDING TO "TIME AND POSITION" OF INTEREST AND A VALUE OF A GROUP OF PIXELS CENTERED ON A POSITION IN THE IMAGE CORRESPONDING TO "TIME AND POSITION" IN PROXIMITY THERETO, AND A DISTANCE BETWEEN THE "TIME AND POSITION" OF INTEREST AND THE "TIME AND POSITION" IN PROXIMITY THERETO | WITH WEIGHTING IN ACCORDANCE WITH THE "DIFFERENCE IN VALUE BETWEEN THE GROUPS OF PIXELS" AND THE "DISTANCE", ADD A HISTOGRAM IN PROXIMITY THERETO |

FIG. 41

| | INFORMATION | APPROPRIATE ADDITION |
|---|---|---|
| FIRST WORKING EXAMPLE | A DISTANCE BETWEEN "TIME, POSITION, AND BIN" OF INTEREST AND "TIME, POSITION, AND BIN" IN PROXIMITY THERETO | WITH WEIGHTING IN ACCORDANCE WITH THE DISTANCE, ADD AN OCCURRENCE RATE IN PROXIMITY THERETO |
| SECOND WORKING EXAMPLE | SIMILARITY BETWEEN AN OCCURRENCE RATE AT "TIME, POSITION, AND BIN" OF INTEREST AND AN OCCURRENCE RATE AT "TIME, POSITION, AND BIN" IN PROXIMITY THERETO, AND AN AMOUNT OF ERROR (RELIABILITY) IN AN OCCURRENCE RATE | WITH WEIGHTING IN ACCORDANCE WITH THE SIMILARITY AND THE AMOUNT OF ERROR (RELIABILITY), ADD AN OCCURRENCE RATE IN PROXIMITY THERETO |
| THIRD WORKING EXAMPLE | SIMILARITY BETWEEN AN OCCURRENCE RATE AT "TIME, POSITION, AND BIN" OF INTEREST AND AN OCCURRENCE RATE AT "TIME, POSITION, AND BIN" IN PROXIMITY THERETO, AND A DISTANCE BETWEEN THE "TIME, POSITION, AND BIN" OF INTEREST AND THE "TIME, POSITION, AND BIN" IN PROXIMITY THERETO | WITH WEIGHTING IN ACCORDANCE WITH THE SIMILARITY AND THE DISTANCE, ADD AN OCCURRENCE RATE IN PROXIMITY THERETO |
| FOURTH WORKING EXAMPLE | SIMILARITY BETWEEN A GROUP OF OCCURRENCE RATES CENTERED ON "TIME, POSITION, AND BIN" OF INTEREST AND A GROUP OF OCCURRENCE RATES CENTERED ON "TIME, POSITION, AND BIN" IN PROXIMITY THERETO | WITH WEIGHTING IN ACCORDANCE WITH THE SIMILARITY, ADD AN OCCURRENCE RATE IN PROXIMITY THERETO |
| FIFTH WORKING EXAMPLE | IN AN IMAGE OBTAINED FROM AN ATTACHED CAMERA, A DIFFERENCE BETWEEN A PIXEL VALUE CORRESPONDING TO "TIME AND POSITION" OF INTEREST AND A PIXEL VALUE CORRESPONDING TO "TIME AND POSITION" IN PROXIMITY THERETO, AND A DISTANCE BETWEEN "TIME, POSITION, AND BIN" OF INTEREST AND "TIME, POSITION, AND BIN" IN PROXIMITY THERETO | WITH WEIGHTING IN ACCORDANCE WITH THE "DIFFERENCE BETWEEN THE PIXEL VALUES" AND THE "DISTANCE", ADD AN OCCURRENCE RATE IN PROXIMITY THERETO |
| SIXTH WORKING EXAMPLE | USING AN IMAGE OBTAINED FROM AN ATTACHED CAMERA, A DIFFERENCE BETWEEN A VALUE OF A GROUP OF PIXELS CENTERED ON A POSITION IN THE IMAGE CORRESPONDING TO "TIME AND POSITION" OF INTEREST AND A VALUE OF A GROUP OF PIXELS CENTERED ON A POSITION IN THE IMAGE CORRESPONDING TO "TIME AND POSITION" IN PROXIMITY THERETO, AND A DISTANCE BETWEEN "TIME, POSITION, AND BIN" OF INTEREST AND "TIME, POSITION, AND BIN" IN PROXIMITY THERETO | WITH WEIGHTING IN ACCORDANCE WITH THE "DIFFERENCE IN VALUE BETWEEN THE GROUPS OF PIXELS" AND THE "DISTANCE", ADD AN OCCURRENCE RATE IN PROXIMITY THERETO |

FIG. 90

PROCESSING OF OBTAINING "REGION OF FIRST OBJECT", "REGION OF SECOND OBJECT", AND "REGION OF THIRD OBJECT" IN REGION OF SPAD AT POSITION (x, y)

S941
INPUT C(x, y) IN SPADS AT POSITION (x, y) AND ITS SURROUNDING POSITIONS (FOR EXAMPLE, 5×5 POSITIONS). THEN, ALSO INPUT Z(x, y, i) AND S(x, y, i). HERE, i=1 TO C(x, y).

S942
CALCULATE EXPRESSIONS 144 TO 149 TO DETERMINE $\alpha 1, \beta 1, \alpha 2, \beta 2, \alpha 3,$ AND $\beta 3$.

S943
USE EXPRESSION OBTAINED BY SUBSTITUTING $\alpha 1, \beta 1, \alpha 2, \beta 2, \alpha 3,$ AND $\beta 3$ OBTAINED IN STEP ABOVE INTO EXPRESSION 150 TO DETERMINE u0 AND v0.

S944
ON BASIS OF $\alpha 1, \beta 1, \alpha 2, \beta 2, \alpha 3, \beta 3,$ u0, AND v0 DETERMINED IN STEPS ABOVE, OUTPUT REGIONS REPRESENTED BY EXPRESSIONS 151 TO 153.

END

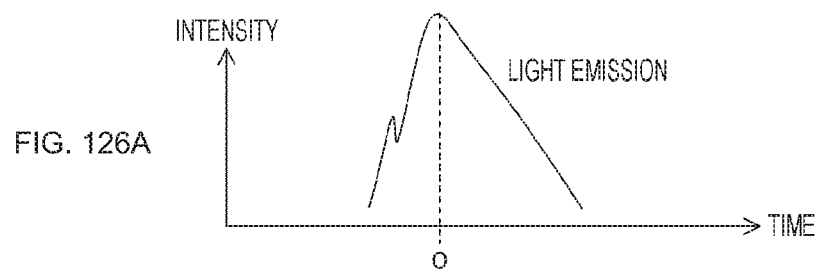
FIG. 126A
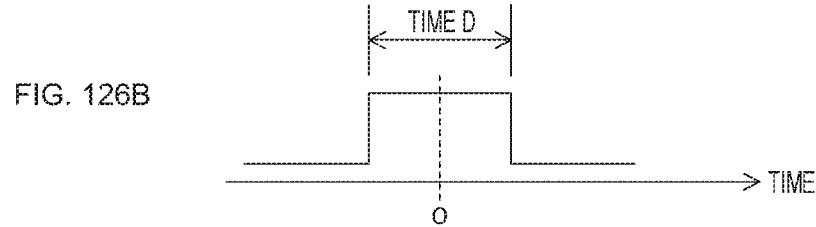
FIG. 126B
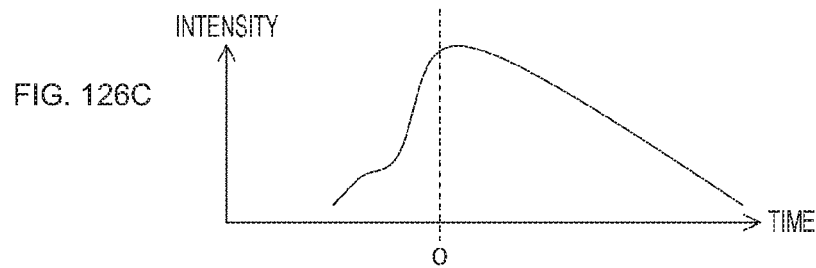
FIG. 126C
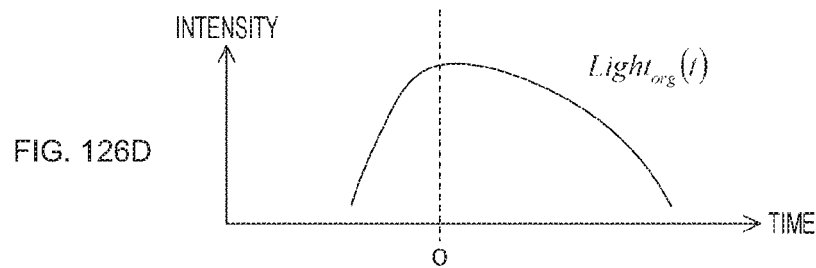
FIG. 126D

DISTANCE MEASURING DEVICE

TECHNICAL FIELD

The present technology relates to a distance measuring device. More specifically, the present technology frelates to a distance measuring device that measures a distance to a target object on the basis of a signal obtained from a sensor using single photon avalanche diodes (SPADs), a processing method thereof, and a program that causes a computer to execute the method.

BACKGROUND ART

As a distance measuring device (distance measuring sensor), a time-of-flight (ToF) method using a SPAD is known. In this ToF method, distance measurement is performed by emitting pulsed light from a light emitting unit and receiving the light reflected from a target object with a SPAD sensor.

More specifically, the time from emission of light by the light emitting unit to reception of the light by the SPAD sensor is measured. Then, a distance to the target object is calculated by multiplying this time by the speed of light (c) and dividing the result by 2. This is because the time measured is the time it took for the light to travel the distance to and back from the target object.

Now, in a case of one-time emission and reception of light, an erroneous determination may occur. This is because light from outside (ambient light) may be incident on the SPAD sensor and the SPAD sensor may react during the time from when the light is emitted to when the light is reflected by and returned from the target object. Furthermore, light emitted from the light emitting unit is not always reflected by the target object and returned to the SPAD sensor. These occur stochastically. Thus, measurement is performed by emitting and receiving light a plurality of times (for example, in the thousands or tens of thousands of times), and superior data is detected from the results of the plurality of times of measurement.

More specifically, consideration is given to a histogram with time on the horizontal axis and a frequency on the vertical axis. Then, times from emission to reception of light are plotted on this histogram. Then, a peak time in this histogram is detected. This time is multiplied by c/2 to calculate the distance to the target object.

Now, the problem here is detection of a peak. That is, a method of distinguishing between a peak time and a non-peak time in the histogram is necessary. Therefore, for example, a distance measuring apparatus has been proposed in which a peak value is determined on the basis of whether a difference from other values is equal to or greater than a certain threshold (for example, see Patent Document 1).

CITATION LIST

Patent Document

Patent Document 1: Japanese Patent Application Laid-Open No. 2010-091377

SUMMARY OF THE INVENTION

Problems to be Solved by the Invention

In the above-described conventional art, a threshold is used to determine a peak in a histogram indicating a time from emission to reception of light. However, the threshold is set as an artificial value, and there is a concern that the threshold lacks theoretical validity. Therefore, it cannot be said that the peak detection is appropriate, and an erroneous determination may occur.

The present technology has been created in view of such a situation, and is aimed at performing appropriate peak detection on the basis of a histogram indicating a frequency of reception of reflected light to measure a distance to a target object.

Solutions to Problems

The present technology has been made in order to eliminate the above-described problems, and a first aspect of the present technology is a distance measuring device including:

a histogram acquisition unit that acquires a histogram indicating a frequency of reception of reflected light including active light components that are active light emitted from a light emitting unit and reflected by a target object and ambient light components that are ambient light reflected by the target object;

a detection unit that detects a distribution of the active light components by performing predetermined statistical processing on the histogram; and a measurement unit that measures a distance to the target object as distance information on the basis of the distribution of the active light components. This brings about an effect of appropriately measuring the distance to the target object.

Furthermore, in the first aspect, the detection unit may perform, as the predetermined statistical processing, processing of obtaining a probability density function when an occurrence rate caused by reception of the reflected light is used as a random variable. This brings about an effect of appropriately measuring the distance to the target object on the basis of the probability density function.

Furthermore, in the first aspect, the detection unit may perform, as the predetermined statistical processing, processing of determining, when an occurrence rate caused by reception of the reflected light is expressed as a function of time, a parameter of the function that satisfies a relationship with the histogram. This brings about an effect of appropriately measuring the distance to the target object on the basis of the parameter of the function.

Furthermore, in the first aspect, a histogram noise removal processing unit that performs noise removal processing on the histogram may be further included, and the detection unit may perform the predetermined statistical processing on the histogram on which the noise removal processing has been performed by the histogram noise removal processing unit. This brings about an effect of appropriately measuring the distance to the target object on the basis of the histogram from which noise has been removed.

Furthermore, in the first aspect, the histogram noise removal processing unit may adaptively perform weighted addition processing on a plurality of the histograms. This brings about an effect of removing noise from the histograms.

Furthermore, in the first aspect, the histogram noise removal processing unit may perform weighted addition processing on occurrence rates obtained from a plurality of the histograms. This brings about an effect of removing noise from the histograms.

Furthermore, in the first aspect, the histogram noise removal processing unit may perform noise removal processing on an occurrence rate obtained from the histogram. This brings about an effect of removing noise from the occurrence rate.

Furthermore, in the first aspect, parameters that satisfy a first constraint that constrains, when an occurrence rate caused by reception of the reflected light is expressed as a function of time, the parameters of the function so as to satisfy a relationship with the histogram, and a second constraint that constrains the parameters so that the parameters in proximity to each other in time and space may satisfy a specific relationship, may be calculated, and the calculated parameters may be used to obtain the distance to the target object or a luminance. This brings about an effect of appropriately measuring the distance to the target object or the luminance.

Furthermore, in the first aspect, a distance information noise removal processing unit that removes noise from the distance information measured by the measurement unit may be further included. This brings about an effect of removing noise from the distance information.

Furthermore, in the first aspect, the distance information noise removal processing unit may perform weighted addition processing in which the more pieces of the distance information are similar between pieces of data that are the same in time and position, the more the weighting is increased. This brings about an effect of removing noise from the distance information by the weighted addition processing.

Furthermore, in the first aspect, the distance information noise removal processing unit may determine the distance information after noise removal so that an extreme value may be obtained by summing a first operator that causes the distance information after the noise removal to be equal to the distance information, and a second operator that causes a set of pieces of distance information, among pieces of the distance information after the noise removal adjacent to each other in time and space, having the smallest difference to be equal to each other. This brings about an effect of removing the noise of the distance information by a least square method.

Furthermore, in the first aspect, the detection unit may obtain, for every one of a plurality of the histograms, an occurrence rate by dividing each value of the histogram by a value obtained by subtracting the smallest frequency from the total number in the histogram, obtain peaks and peak areas of the occurrence rates, and obtain an area of a region of an object from a ratio between the peak areas. This brings about an effect of obtaining the area of the region of the object from the occurrence rates.

Furthermore, in the first aspect, an image input unit that inputs a captured image of the target object, an image dividing unit that divides the image into a plurality of divided regions, and an assigning unit that assigns pieces of the distance information each to every one of the plurality of divided regions may be further included. This brings about an effect of assigning the distance information to the actually captured image.

Furthermore, in the first aspect, the detection unit may obtain, for every one of a plurality of the histograms, an occurrence rate by dividing each value of the histogram by a value obtained by subtracting the smallest frequency from the total number in the histogram, perform deconvolution on the occurrence rate, and obtain a sharpened histogram from the deconvolved occurrence rate. This brings about an effect of appropriately measuring the distance to the target object on the basis of the histograms obtained via an ideal lens.

Furthermore, in the first aspect, the detection unit may obtain, for every one of a plurality of the histograms, an occurrence rate by dividing each value of the histogram by a value obtained by subtracting the smallest frequency from the total number in the histogram, obtain a peak position and a peak half width of the occurrence rate, and detect that the target object is obliquely disposed or in a moving state in a case where the half width is larger than a predetermined threshold. This brings about an effect of detecting a layout state and a moving state of the target object on the basis of the histograms.

Furthermore, in the first aspect, the detection unit may perform, under a condition that light is received again after a specific time has elapsed since reception of the reflected light, processing of obtaining the probability density function on the basis of state transition used to manage the specific time. This brings about an effect of obtaining the probability density function and appropriately measuring the distance to the target object even in a case where the specific time until light is received again is finite.

Furthermore, in the first aspect, the detection unit may detect a peak position of the active light components with a time resolution finer than a time resolution of the histogram on the basis of the distribution of the active light components, and measure the distance to the target object on the basis of the peak position. This brings about an effect of improving the resolution of the distance when the distance to the target object is measured.

Furthermore, in the first aspect, an output unit may be further included, in which the measurement unit may generate the degree of significance of the active light components with respect to the ambient light components, and the output unit may output the distance information and the degree of significance. This brings about an effect of outputting the degree of significance together with the distance information.

Effects of the Invention

According to the present technology, it is possible to achieve an excellent effect of enabling measurement of a distance to a target object by performing appropriate peak detection on the basis of a histogram indicating a frequency of reception of reflected light. Note that the effects described here are not necessarily restrictive, and the effects of the invention may be any of the effects described in the present disclosure.

BRIEF DESCRIPTION OF DRAWINGS

FIG. 27 is a flowchart illustrating an example of processing of removing noise from a histogram according to a fifth working example of the second embodiment of the present technology.

FIG. 30 is a diagram illustrating a summary of specific examples of "information" and an "appropriate addition" according to the first to sixth working examples of the second embodiment of the present technology.

FIG. 41 is a diagram illustrating a summary of specific examples of "information" and an "appropriate addition" according to the first to sixth working examples of the third embodiment of the present technology.

FIG. 90 is a flowchart illustrating an example of a processing procedure for obtaining a region of an object according to the third working example of the ninth embodiment of the present technology.

FIG. 120 is a flowchart illustrating the example of the processing procedure for determining a situation of an object according to the working example of the twelfth embodiment of the present technology.

FIG. 121 is a diagram illustrating an example of operation in a case where a SPAD having a dead time is used according to a thirteenth embodiment of the present technology.

FIG. 122 is a diagram illustrating an example of state transition in a case where a SPAD having a dead time is used according to the thirteenth embodiment of the present technology.

FIG. 123 is a flowchart illustrating an example of a processing procedure for calculating a probability density function in a case where a SPAD is used according to the thirteenth embodiment of the present technology.

FIG. 124 is a diagram illustrating another example of operation in a case where a SPAD having a dead time is used according to the thirteenth embodiment of the present technology.

FIG. 125 is a flowchart illustrating another example of the processing procedure for calculating a probability density function in a case where a SPAD is used according to the thirteenth embodiment of the present technology.

FIG. 126 is a diagram illustrating an example of an intensity distribution in distance measurement according to a fourteenth embodiment of the present technology.

FIG. 127 is a diagram illustrating an example of an intensity distribution in distance measurement according to the fourteenth embodiment of the present technology.

FIG. 128 is a diagram illustrating a specific example of occurrence rate interpolation according to the fourteenth embodiment of the present technology.

FIG. 129 is a flowchart illustrating a processing procedure for calculating a peak of an occurrence rate with a highly accurate time resolution according to the fourteenth embodiment of the present technology.

FIG. 130 is a conceptual diagram illustrating processing of detecting an attribute of an object to be measured according to the fourteenth embodiment of the present technology.

FIG. 131 is a diagram illustrating an example of an intensity distribution on which processing of detecting an attribute of an object to be measured is premised according to the fourteenth embodiment of the present technology.

Figure 132:
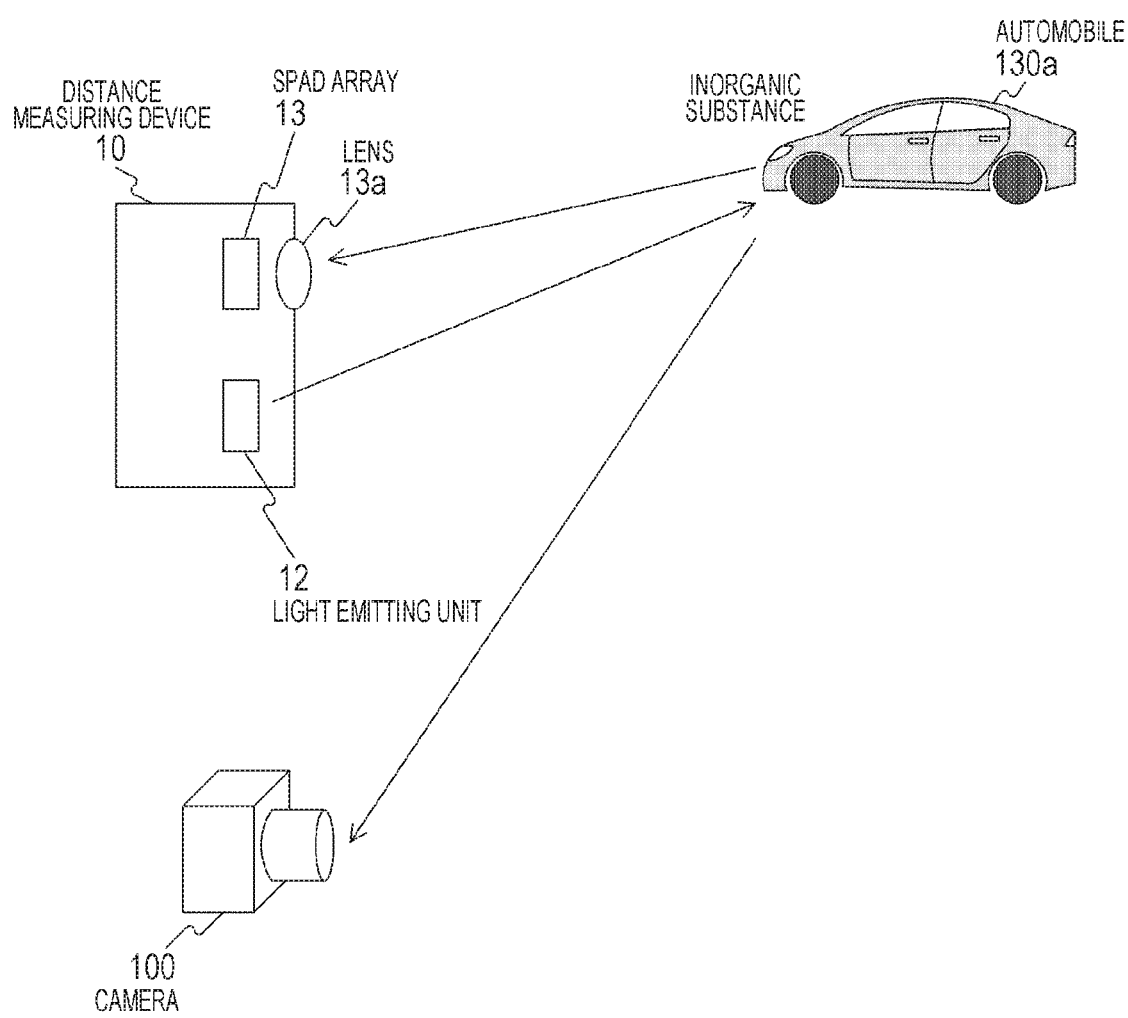

FIG. 132 is a conceptual diagram illustrating processing of detecting an attribute of an object to be measured according to the fourteenth embodiment of the present technology.

Figure 133:
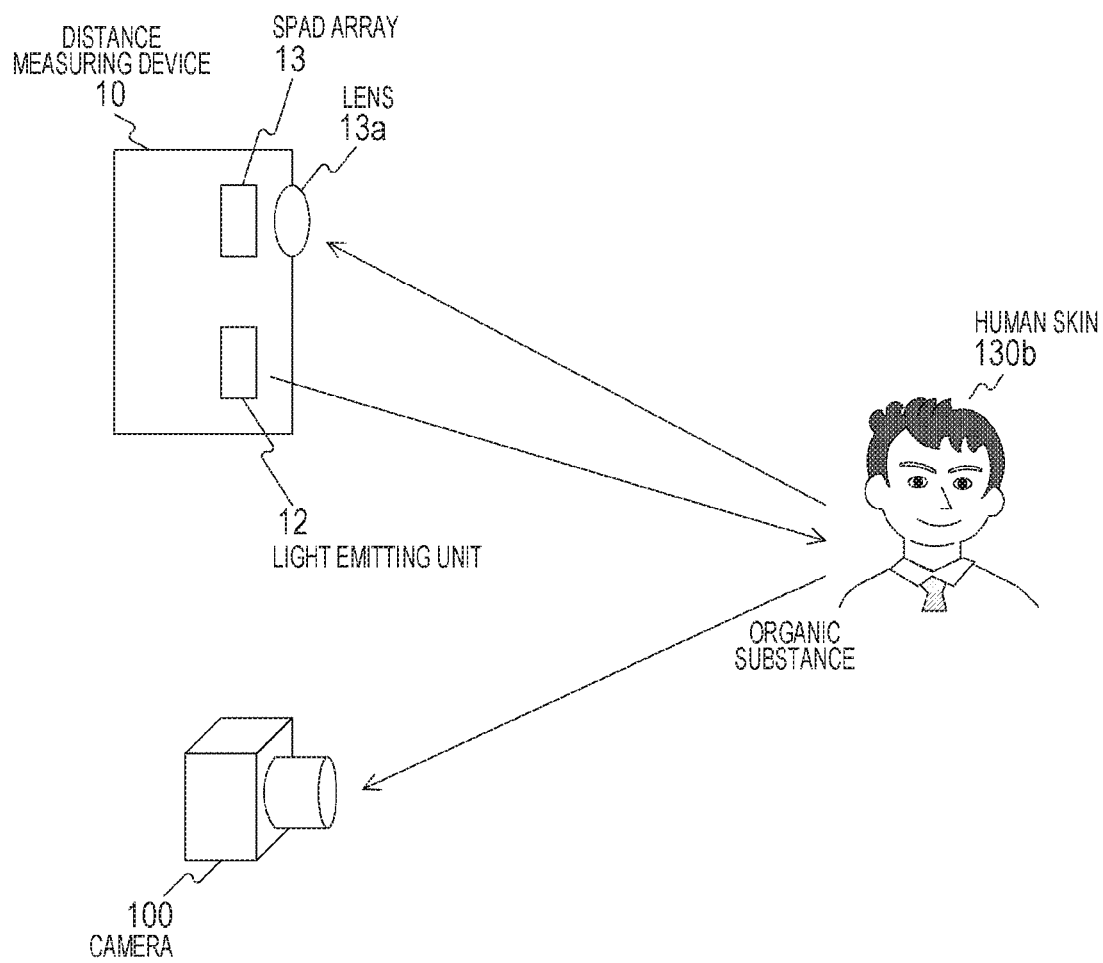

FIG. 133 is a conceptual diagram illustrating processing of detecting an attribute of an object to be measured according to the fourteenth embodiment of the present technology.

Figure 134:
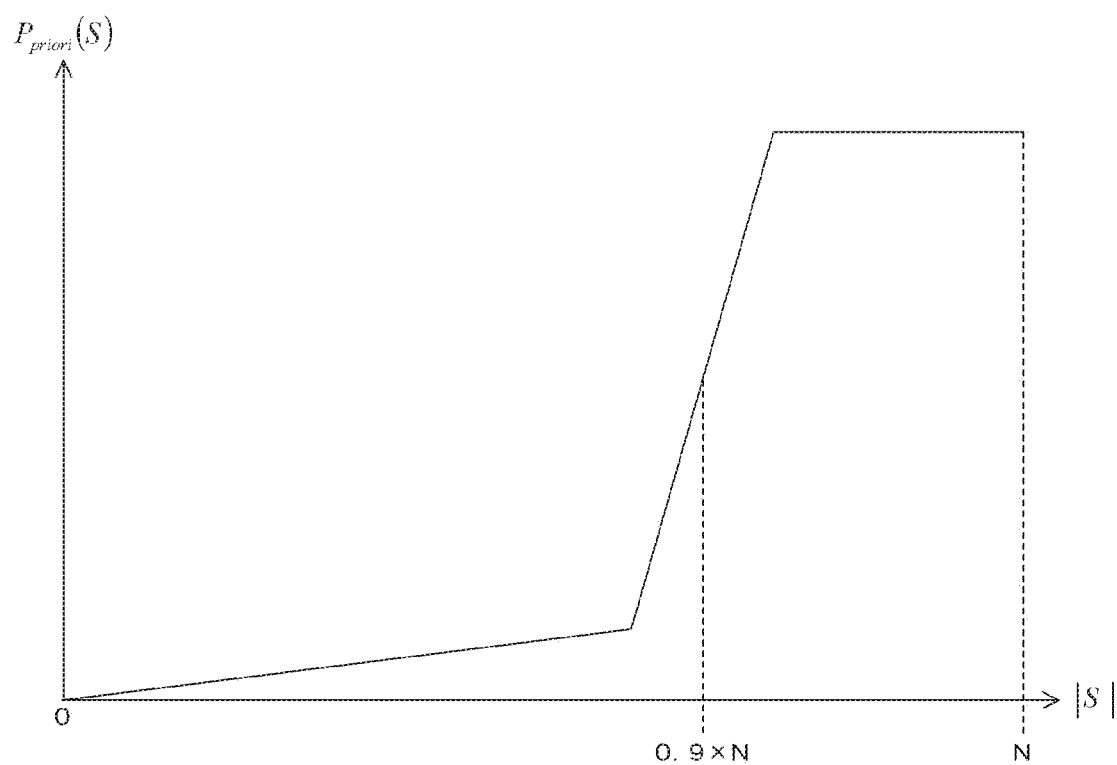

FIG. 134 is a diagram illustrating a premise on which a set S is based according to a fifteenth embodiment of the present technology.

Figure 135:
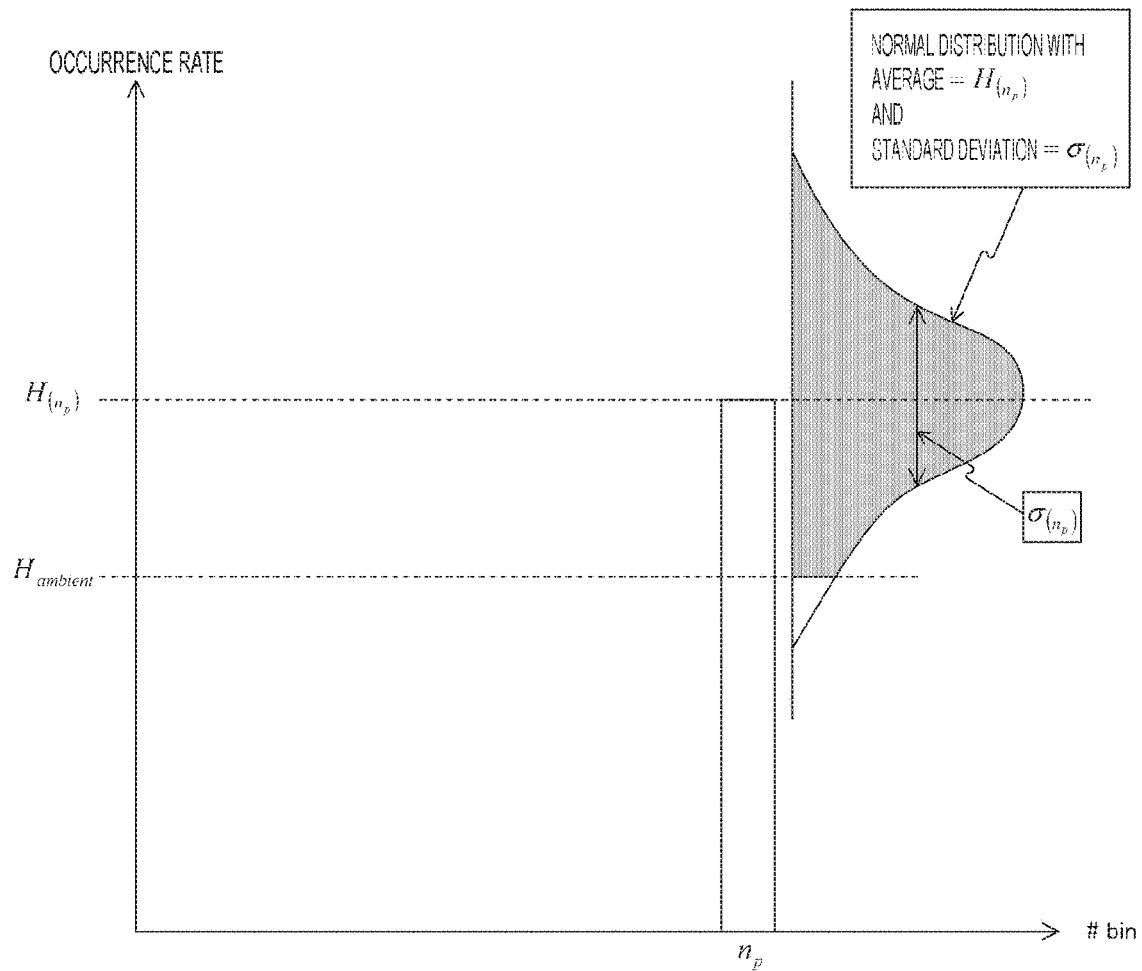

FIG. 135 is a diagram illustrating an example of an occurrence rate according to the fifteenth embodiment of the present technology.

Figure 136:
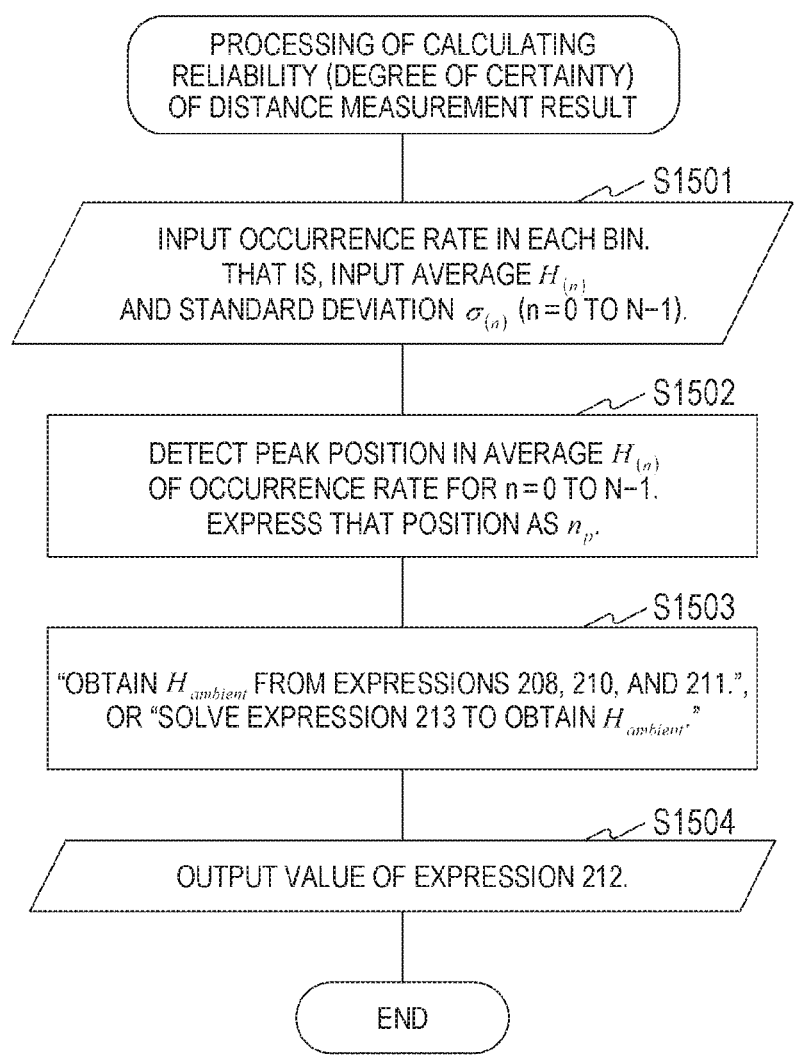

FIG. 136 is a flowchart illustrating an example of a processing procedure for calculating the degree of certainty according to the fifteenth embodiment of the present technology.

Figure 137:
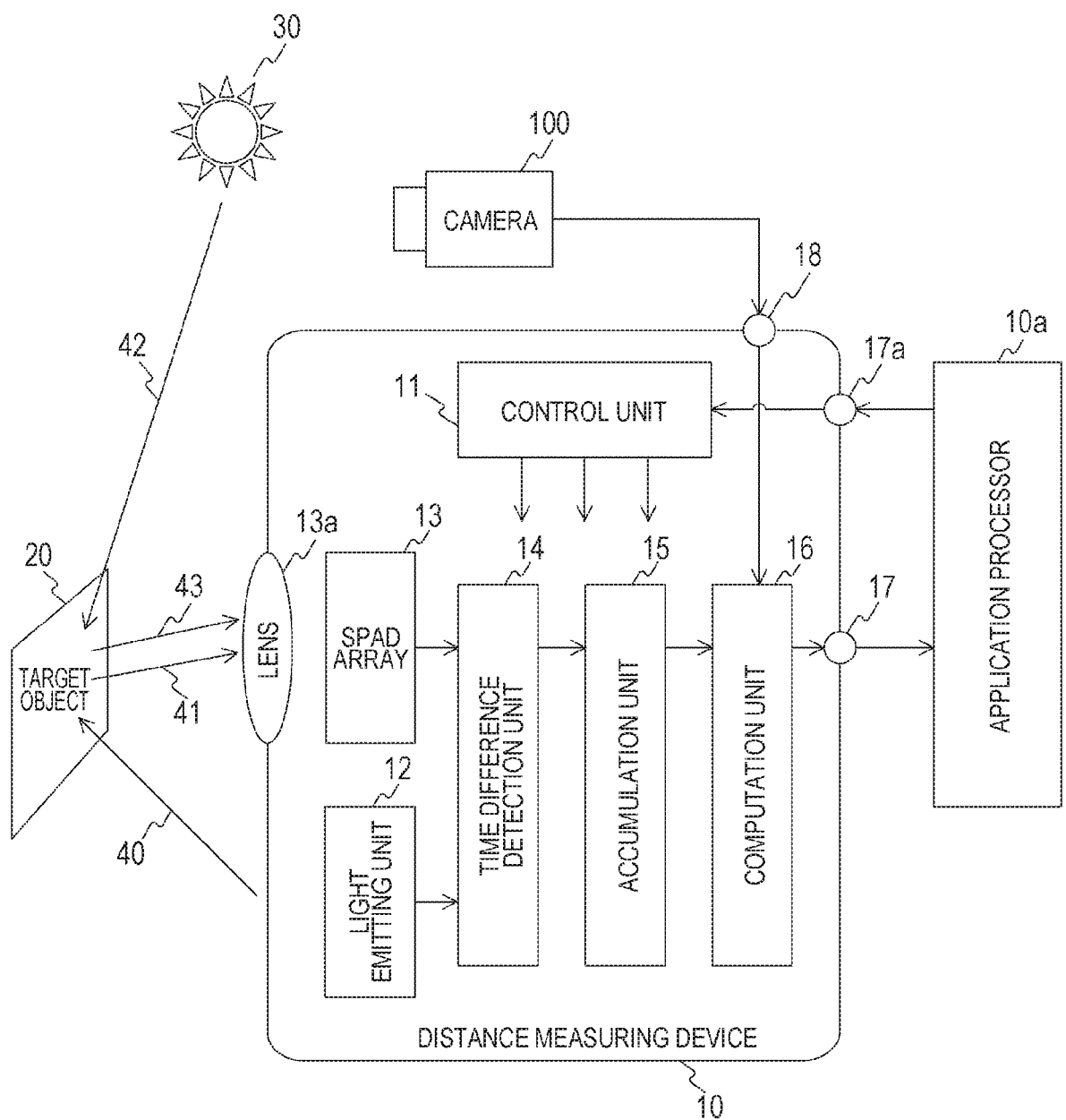

FIG. 137 is a diagram illustrating an application example of the fifteenth embodiment of the present technology.

Figure 138:
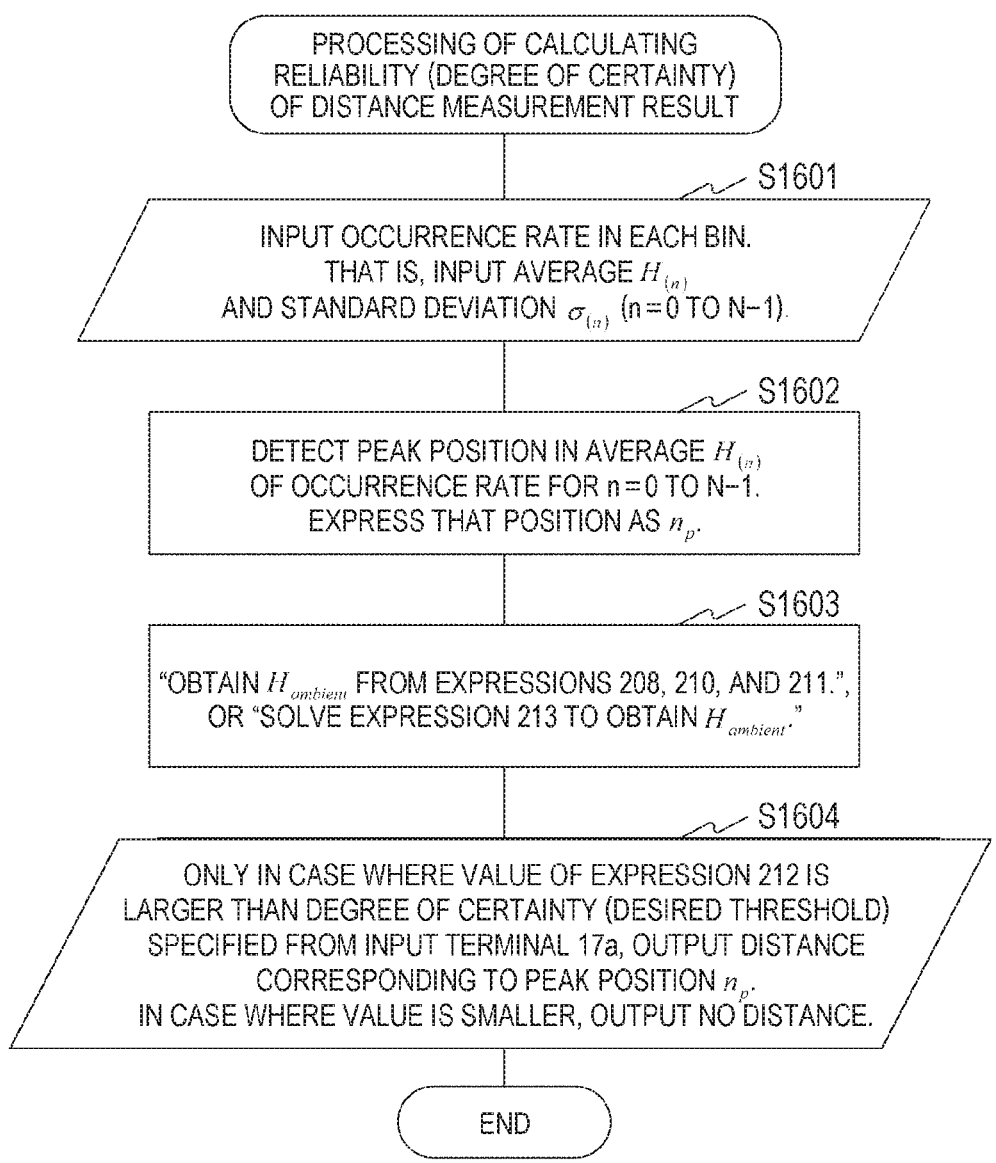

FIG. 138 is a flowchart illustrating an example of a processing procedure for calculating a degree of certainty and outputting only distance data having at least a desired degree of certainty according to the fifteenth embodiment of the present technology.

Figure 139:
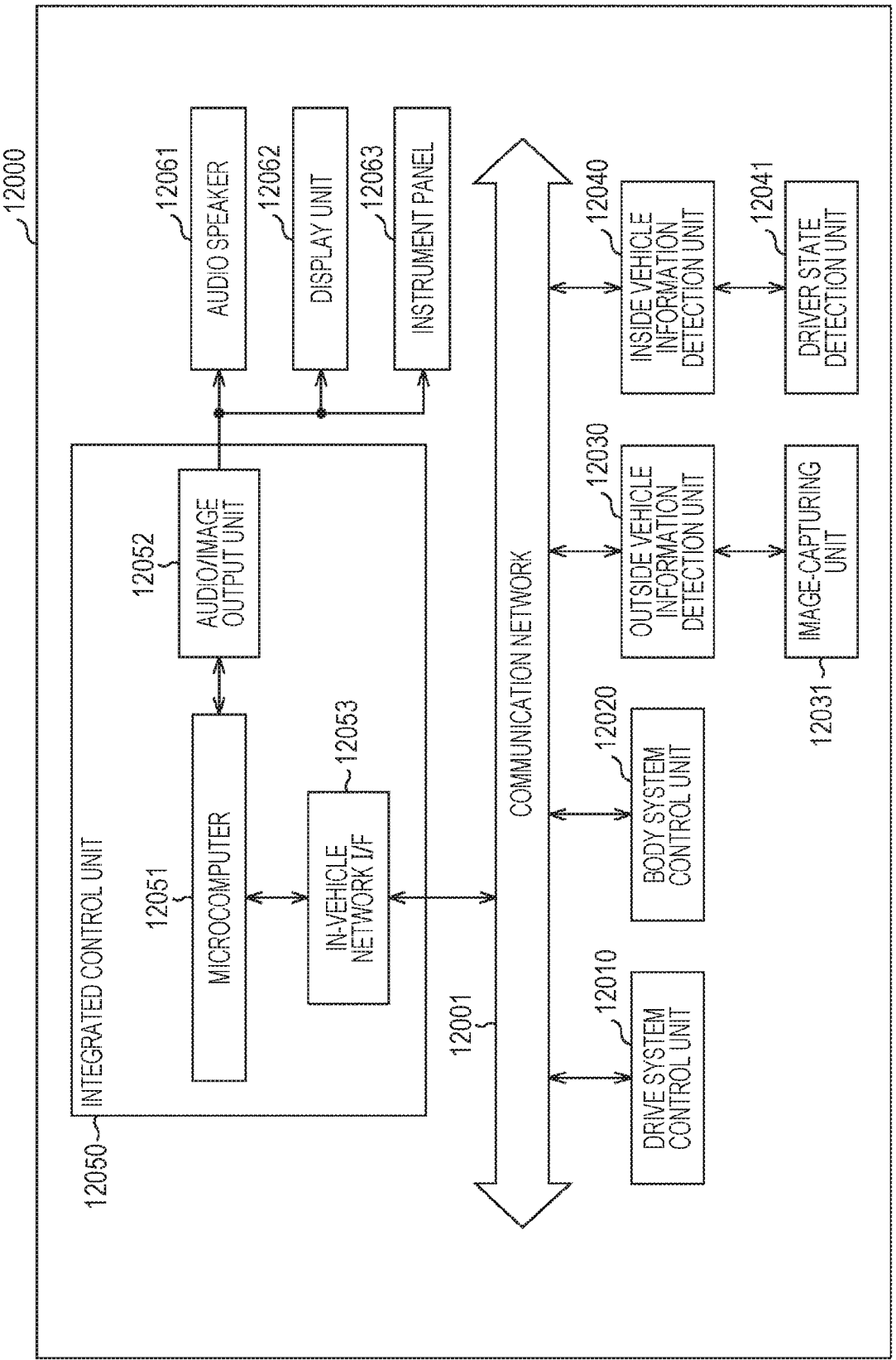

FIG. 139 is a block diagram illustrating a schematic configuration example of a vehicle control system that is an example of a mobile object control system to which the technology according to the present disclosure can be applied.

Figure 140:
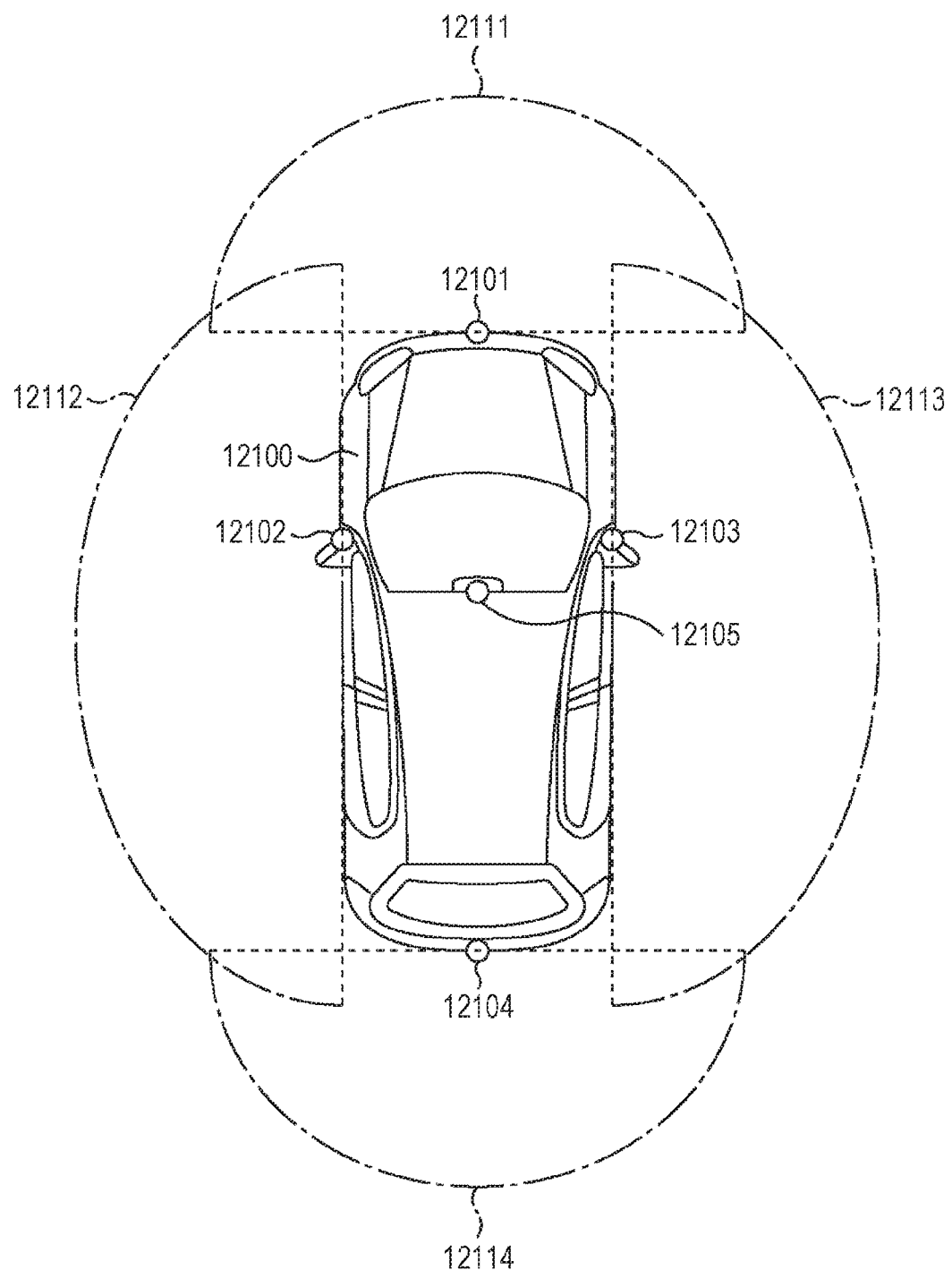

FIG. 140 is a diagram illustrating an example of an installation position of an image-capturing unit 12031 of the vehicle control system that is an example of the mobile object control system to which the technology according to the present disclosure can be applied.

MODE FOR CARRYING OUT THE INVENTION

Modes for carrying out the present technology (hereinafter referred to as "embodiments") will be described below. The description will be made in the following order.
1. Distance measuring device
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Tenth Embodiment
12. Eleventh Embodiment
13. Twelfth Embodiment
14. Thirteenth Embodiment
15. Fourteenth Embodiment
16. Fifteenth Embodiment
17. Application example 1. Distance Measuring Device

[Configuration of Distance Measuring Device]

Figure 1:
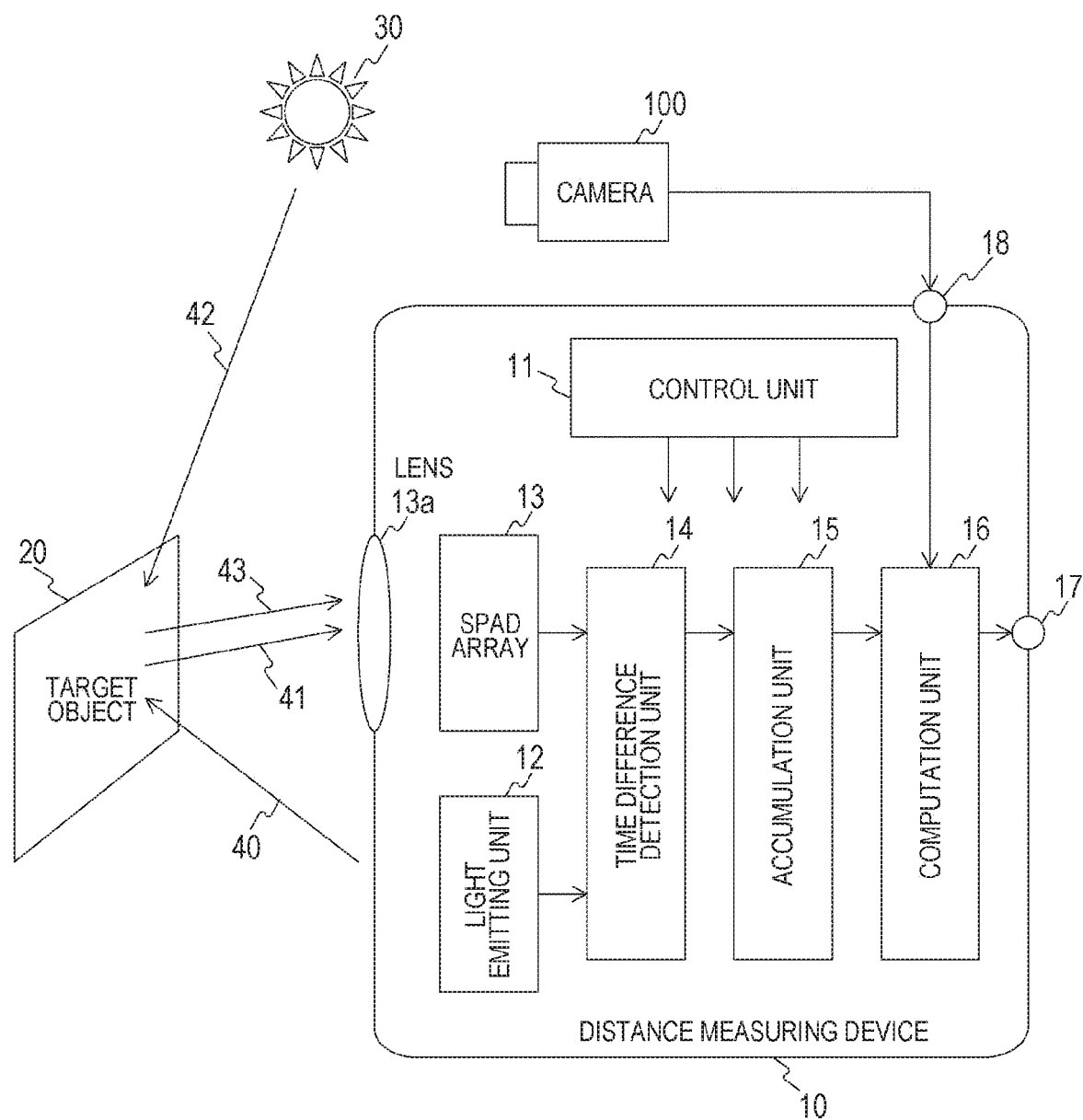
FIG. 1 is a diagram illustrating a configuration example of a distance measuring device 10 assumed in the embodiments of the present technology.

FIG. 1 is a diagram illustrating a configuration example of a distance measuring device 10 assumed in the embodiments of the present technology.

The distance measuring device 10 measures a distance to a target object 20 on the basis of a signal obtained from a sensor using single photon avalanche diodes (SPADs). The distance measuring device 10 includes a control unit 11, a light emitting unit 12, a SPAD array 13, a time difference detection unit 14, an accumulation unit 15, a computation unit 16, and an output terminal 17.

The SPAD array 13 is a complementary metal oxide semiconductor (CMOS) image sensor (imager) in which SPADs are arranged in a two-dimensional array. A lens 13a is attached in front of the SPAD array 13 so that light can be collected by the lens 13a and efficiently received by each SPAD. Note that the SPAD array 13 may be referred to as a SPAD sensor 13 in the present disclosure.

The light emitting unit 12, the SPAD array 13, the time difference detection unit 14, the accumulation unit 15, and the computation unit 16 are controlled by control signals from the control unit 11. Specific details of the control are as described below.

Under the control of the control unit 11, the light emitting unit 12 emits light for a short time, and the light 40 reaches the target object 20 as active light. Then, the light 40 is reflected by the target object 20 and returns as light 41 to one of the SPADs in the SPAD array 13. As a matter of course, light does not always return. That is, light may or may not return stochastically.

Furthermore, besides the light emission from the light emitting unit 12, light 42 from Sun 30 also reaches the target object 20 as ambient light. Then, the light 42 is reflected by the target object 20 and reaches, as light 43, one of the SPADs in the SPAD array 13.

The time from emission of light by the light emitting unit 12 to reception of the light by each SPAD in the SPAD array 13 is measured by the time difference detection unit 14. Such a distance measurement method is called a time-of-flight (ToF) method. However, it is not possible to distinguish whether the light is the light 41 or the light 43. Note that the time difference detection unit 14 is generally constituted by a time-to-digital converter (TDC). Then, the time difference detection unit 14 generally has TDCs of the same number as the SPADs in order to measure the time for each SPAD.

The value of this time is sent to the accumulation unit 15. The accumulation unit 15 has a memory (not illustrated), in which histogram data is formed. A bin corresponding to the value of this time in the histogram is incremented by 1. As a result, the histogram is updated. Note that one histogram is formed for each SPAD. Note that the time difference detection unit 14 and the accumulation unit 15 are examples of a histogram acquisition unit described in the claims.

Short-time light emission by the light emitting unit 12 under the control of the control unit 11 is performed a plurality of times. This number of times is expressed as M, where M is an integer. M is typically in the thousands or tens of thousands.

Final histogram data obtained after the M-time measurements is sent to the computation unit 16.

Data (data regarding the distance to the target object 20) obtained by processing by the computation unit 16 is output from the output terminal 17.

Each SPAD in the SPAD array 13 is a sensor that detects the first piece of light (photon) to arrive. Thus, in a case where the light 41 arrives earlier in time than the light 43, distance measurement can be performed correctly. That is, the time detected by the time difference detection unit 14 is the time it takes to travel to and back from the target object 20, and the distance to the target object 20 can be calculated by multiplying the time by c/2, where c is the speed of light. On the other hand, in a case where the light 43 arrives earlier in time than the light 41, the correct time for distance measurement cannot be measured.

Reception of the light 43 (reception of the ambient light) always occurs with a constant probability regardless of time. On the other hand, reception of the light 41 (reception of the active light) occurs mostly at a certain time (more specifically, a value obtained by dividing twice the distance to the target object 20 by c). Thus, the distance to the target object 20 can be obtained by detecting a peak in the histogram and obtaining a time corresponding to the peak.

In this way, the computation unit 16 performs the processing of detecting a peak in the histogram and the processing of calculating the distance by multiplying a time corresponding to the peak by c/2. Note that the computation unit 16 is an example of a detection unit and a measurement unit described in the claims.

The distance measuring device 10 may have an attached camera 100. The camera 100 captures an image in the same direction as the direction of measurement by the SPAD array 13 of the distance measuring device 10.

An image obtained from the camera 100 is sent to the computation unit 16 via an input terminal 18 of the distance measuring device 10. The computation unit 16 may use the image to perform computation.

[Histogram]

Figure 2:
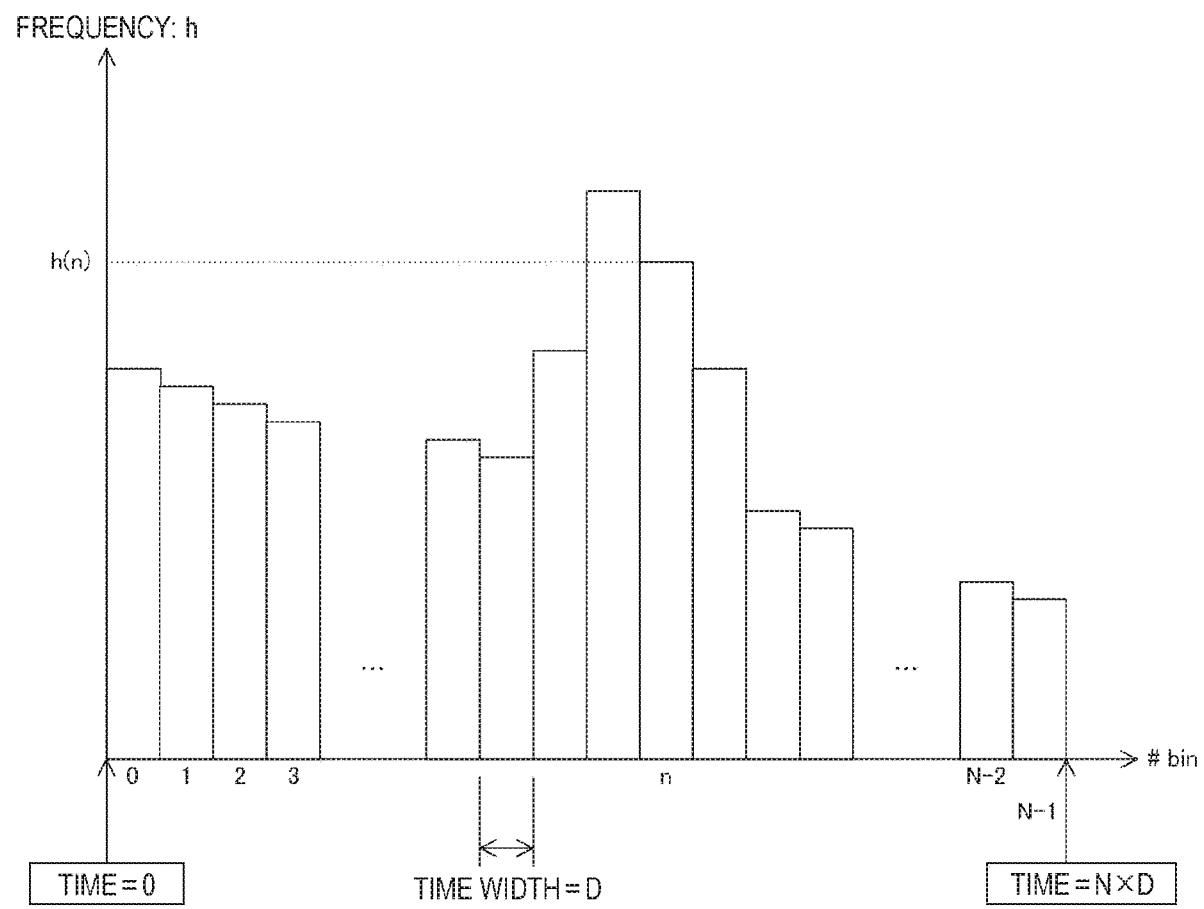
FIG. 2 is a diagram illustrating an example of a histogram generated by an accumulation unit 15 according to the embodiments of the present technology.

FIG. 2 is a diagram illustrating an example of a histogram generated by the accumulation unit 15 according to the embodiments of the present technology.

In this histogram, time (horizontal axis) is expressed in units of width D. That is, in a case where the value of the time detected by the time difference detection unit 14 is in the range from time 0 to time D, the detected time is added to a frequency of a 0-th bin. In a case where the value is in the range from time D to time 2D, the detected time is added to a frequency of a first bin. In a case where the value is in the range from time 2D to time 3D, the detected time is added to a frequency of a second bin. After that, in a case where the value is in the range from time (N−1)×D to time N×D, the detected time is added to a frequency of an (N−1)-th bin in a similar manner.

Here, D is a resolution of the TDC.

Note that the measurement time for one time of measurement is limited to N×D. That is, in a case where a time of N×D has elapsed since emission of light but no light has been received, the measurement ends at that point. In this case, the time difference detection unit 14 does not output a value of the time, and the accumulation unit 15 does not update the histogram. Here, N is a constant.

Thus, when a final histogram is obtained after M-time measurements, the total of frequencies of all bins may be less than M.

It is assumed that a SPAD is arranged at each position (x, y) in the SPAD array 13. Here, x=1 to X, and y=1 to Y. The number of SPADs is X×Y in total. As described above, distance measurement is performed by M-time emissions and receptions of light, and a histogram is completed by the accumulation unit 15. That is, a histogram corresponding to each position (x, y) is completed by M-time emissions and receptions of light. The number of histograms is X×Y in total.

Moreover, it is assumed that distance measurement is performed continuously in time. That is, processing of "creating a histogram by M-time emissions and receptions of light" is continuously performed. The time required for the processing of "creating a histogram by M-time emissions and receptions of light" is defined as a unit time. By defining the unit time in this way, the accumulation unit 15 outputs, at time t, a histogram created for the t-th time in time. Here, t is an integer equal to or greater than 1.

A histogram at time t and position (x, y) is expressed as H(t, x, y, n). Here, t is an integer equal to or greater than 1, x is an integer between 1 and X inclusive, and y is an integer between 1 and Y inclusive. Then, n represents a bin number, and is an integer between 0 and N−1 inclusive.

However, depending on the embodiment, interest may not be focused on time t and position (x, y). In the following derivation of a probability density function, only one histogram is considered, so H(t, x, y, n) is simply represented as h(n). Here, n=0 to N−1. Note that, in embodiments in which X=1 and Y=1 may be used, the SPAD array 13 may be hereinafter referred to as the SPAD sensor 13.

[Probability Density Function]

Here, terms are explained first. An occurrence rate is the number of times an event occurs per unit time. The "occurrence rate" is a generally used term in probability theory, and is used in the same meaning in the embodiments of the present technology. That is, the number of times light (photon) arrives the SPAD sensor 13 per unit time is referred to as a photon arrival occurrence rate or simply an occurrence rate. The occurrence rate in each bin is a probability of arrival of a photon during the time corresponding to that bin. The occurrence rate in bin n is expressed as p(n).

Note that, to be precise, a "probability of arrival of a photon during a time (D) corresponding to a certain bin" is a value obtained by multiplying an occurrence rate by time D. However, constant multiplication (multiplication by D) is ignored here. Alternatively, time D may be considered as a unit time.

Now, an occurrence rate p(n) in bin n is the probability that light (photon) arrives the SPAD sensor 13 during a period from time n×D to time (n+1)×D. The occurrence rate p(n) is irrelevant to whether light (photon) has arrived before time n×D.

On the other hand, the SPAD sensor 13 in the distance measuring device 10 detects the first piece of light (photon) to arrive, but does not detect the second and subsequent pieces of light (photons) to arrive. As a specific example, in a case where a first piece of light (photon) arrives at a time corresponding to bin 2, a second piece of light (photon) arrives at a time corresponding to bin 4, and then a third piece of light (photon) arrives at a time corresponding to bin 6, only h(2) is counted in the histogram, not h(4) or h(6).

In this way, there is a clear difference between the occurrence rate p(n) that is irrelevant to whether light (photon) has arrived before that point of time, and a frequency h(n) in which light (photon) that has arrived before that point of time is not counted. By taking this into consideration, a relationship between the occurrence rate p(n) and the frequency h(n) can be derived.

When the occurrence rate in bin 0 is expressed as p(0), the probability that the frequency of bin 0 becomes h(0) in M-time measurements is represented by Expression 1.

[Math. 1]

$$_{M}C_{h(0)} \cdot p_{(0)}^{h(0)} \cdot (1-p_{(0)})^{M-h(0)} \quad \text{Expression 1}$$

This is because the probability is a probability that an event that occurs with a probability of p(0) occurs h(0) times out of M times.

The occurrence rate in bin 1 is expressed as p(1). The probability that the frequency of bin 1 becomes h(1) even though the event has occurred h(0) times in bin 0 in M-time measurements is represented by Expression 2.

[Math. 2]

$$_{M-h(0)}C_{h(1)} \cdot p_{(1)}^{h(1)} \cdot (1-p_{(1)})^{M-h(0)-h(1)} \quad \text{Expression 2}$$

This is because the probability is a probability that an event that occurs with a probability of p(1) occurs h(1) times out of M−h(0) times.

The occurrence rate in bin 2 is expressed as p(2). The probability that the frequency of bin 2 becomes h(2) even though the event has occurred h(0) times in bin 0 and h(1) times in bin 1 in M-time measurements is represented by Expression 3.

[Math. 3]

$$_{M-j(0)-h(1)}C_{h(2)} \cdot p_{(2)}^{h(2)} \cdot (1-p_{(2)})^{M-h(0(-h(1)-h(2))} \quad \text{Expression 3}$$

This is because the probability is a probability that an event that occurs with a probability of p(2) occurs h(2) times out of M−h(0)−h(1) times.

Similarly, the probability that the frequency of bin n becomes h(n) even though the event has occurred h(m) times in bin m in M-time measurements is represented by Expression 4. Here, m=0 to n−1.

[Math. 4]

$$_{M(n-1)}C_{h(n)} \cdot p_{(n)}^{h(n)} \cdot (1-p_{(n)})^{M(n-1)-h(n)}, \text{ where} \quad \text{Expression 4}$$

$$M_{(n-1)} \equiv M - \sum_{j=0}^{n-1} h_{(j)}$$

Moreover, Expression 4 indicates a binomial distribution, and can be approximated by a normal distribution. That is, when a frequency h(n) of an n-th bin in the histogram is used as a random variable, a probability density function indicates a normal distribution shown in Expression 5.

[Math. 5]

$$N(M_{(n-1)} \cdot p_{(n)}, M_{(n-1)} \cdot p_{(n)} \cdot (1-p_{(n)})) \quad \text{Expression 5}$$

Moreover, the following Expression 6 holds.

[Math. 6]

$$p_{(n)} \approx \frac{h_{(n)}}{M_{(n-1)}} \quad \text{Expression 6}$$

This Expression 6 can be used to approximate Expression 5 to Expression 7.

[Math. 7]

$$N\left(h_{(n)}, h_{(n)} \cdot \left(1 - \frac{h_{(n)}}{M_{(n-1)}}\right)\right) \quad \text{Expression 7}$$

Thus, when the frequency h(n) of each bin n in the histogram has been observed and the occurrence rate p(n) of the n-th bin is used as a random variable, the probability density function is represented by Expression 8 from Expressions 6 and 7.

[Math. 8]

$$N\left(\frac{h_{(n)}}{M_{(n-1)}}, \frac{1}{M_{(n-1)}} \cdot \frac{h_{(n)}}{M_{(n-1)}} \cdot \left(1 - \frac{h_{(n)}}{M_{(n-1)}}\right)\right) \quad \text{Expression 8}$$

This Expression 8 is a final expression (the probability density function of the occurrence rate p(n) when the frequency h(n) of each bin n has been observed) derived from the theory according to this embodiment.

As previously described, since reception of the ambient light always occurs with a constant probability regardless of time, the occurrence rate of the corresponding bin is constant. On the other hand, reception of the active light occurs mostly at a certain time (i.e., a certain bin), and the bin has an occurrence rate higher than that of other bins. This can be solved theoretically by using Expression 8.

2. First Embodiment

[Outline]

In a first embodiment, a luminance value and a distance are accurately obtained by accurately obtaining a probability density function when an occurrence rate of each bin in a histogram is used as a random variable.

Figure 3A:
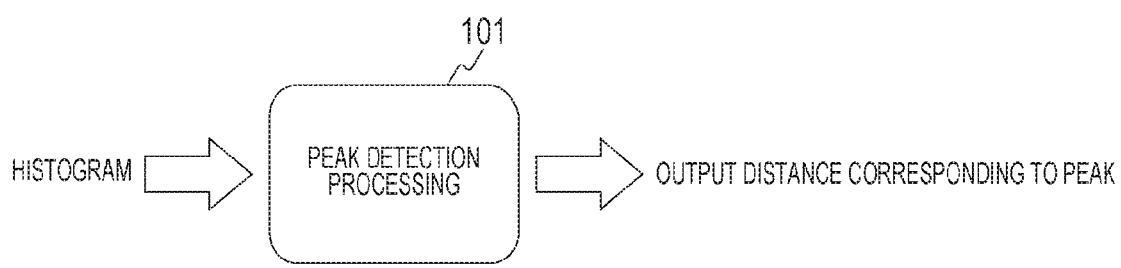
FIG. 3 is a diagram for describing processing according to a first embodiment of the present technology.
Figure 3B:
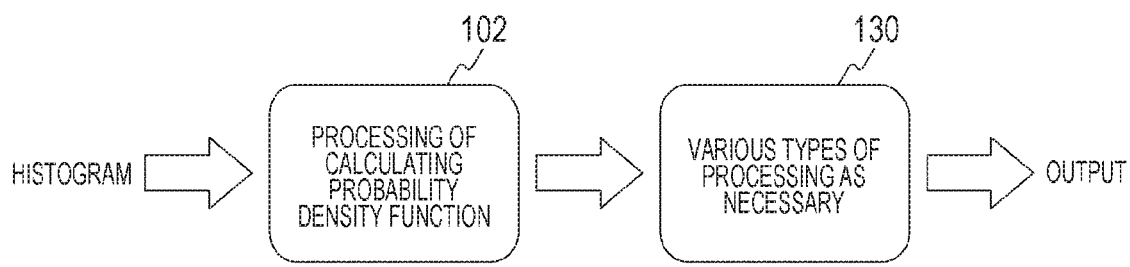

FIG. 3 is a diagram for describing processing according to the first embodiment of the present technology.

Conventionally, as illustrated in a in the drawing, peak detection processing 101 is performed using an artificial threshold from a histogram, and a distance corresponding to the time is output.

On the other hand, in the first embodiment, as illustrated in b in the drawing, processing 102 of calculating a probability density function expressing a sensor reaction occurrence rate at each time from a histogram is performed. Therefore, a theoretically correct occurrence rate is calculated, and an error-free result is obtained.

Moreover, in the first embodiment, the probability density function expressing the occurrence rate is used to perform various types of processing 130 described later. Therefore, a variety of data can be output accurately. Here, the various types of processing 130 are, for example, the following processing.

Figure 4A:
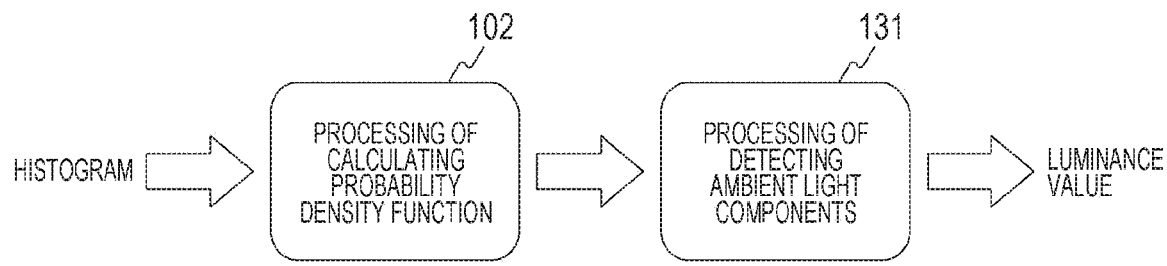
FIG. 4 is a diagram for describing various types of processing 130 according to the first embodiment of the present technology.
Figure 4B:
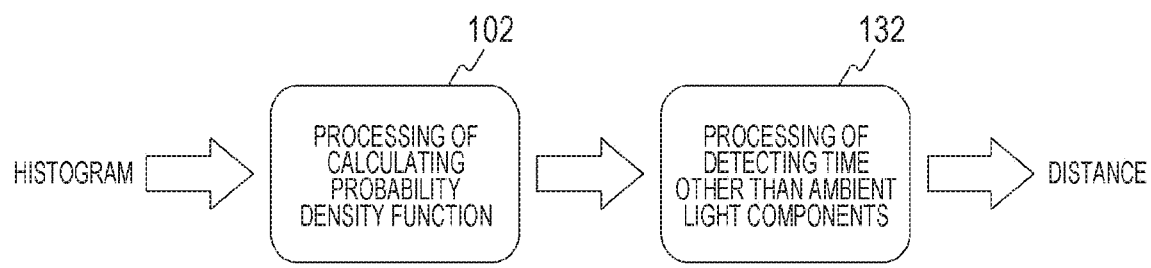
Figure 4C:
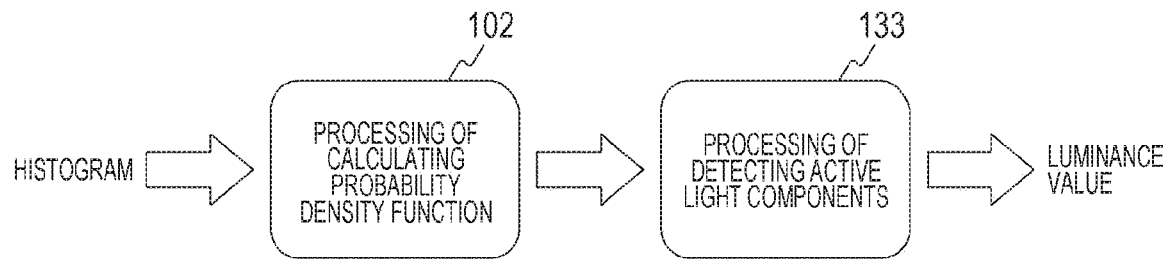

FIG. 4 is a diagram for describing the various types of processing 130 according to the first embodiment of the present technology.

In a in the drawing, processing 131 of detecting ambient light components is disposed subsequent to the processing 102 of calculating a probability density function. This allows the amount of the ambient light components to be obtained. That is, it is possible to output a luminance value when a target object 20 is illuminated by the ambient light. Note that a in the drawing corresponds to first and fifth working examples described later.

In b in the drawing, processing 132 of detecting a time other than the ambient light components is disposed subsequent to the processing 102 of calculating a probability density function. Therefore, a time when light other than the ambient light components, that is, light (active light) from a light emitting unit is directed onto and reflected by the target object 20 can be obtained. Therefore, the time it takes for light to travel to and back from the target object 20 can be found out, and a distance to the target object 20 can be output. Note that b in the drawing corresponds to second and fourth working examples described later.

In c in the drawing, processing 133 of detecting active light components is disposed subsequent to the processing 102 of calculating a probability density function. This allows the amount of the active light components to be obtained. That is, it is possible to output a luminance value when the target object 20 is illuminated by the active light. Note that c in the drawing corresponds to third and sixth working examples described later.

[Probability Density Function]

Figure 5:
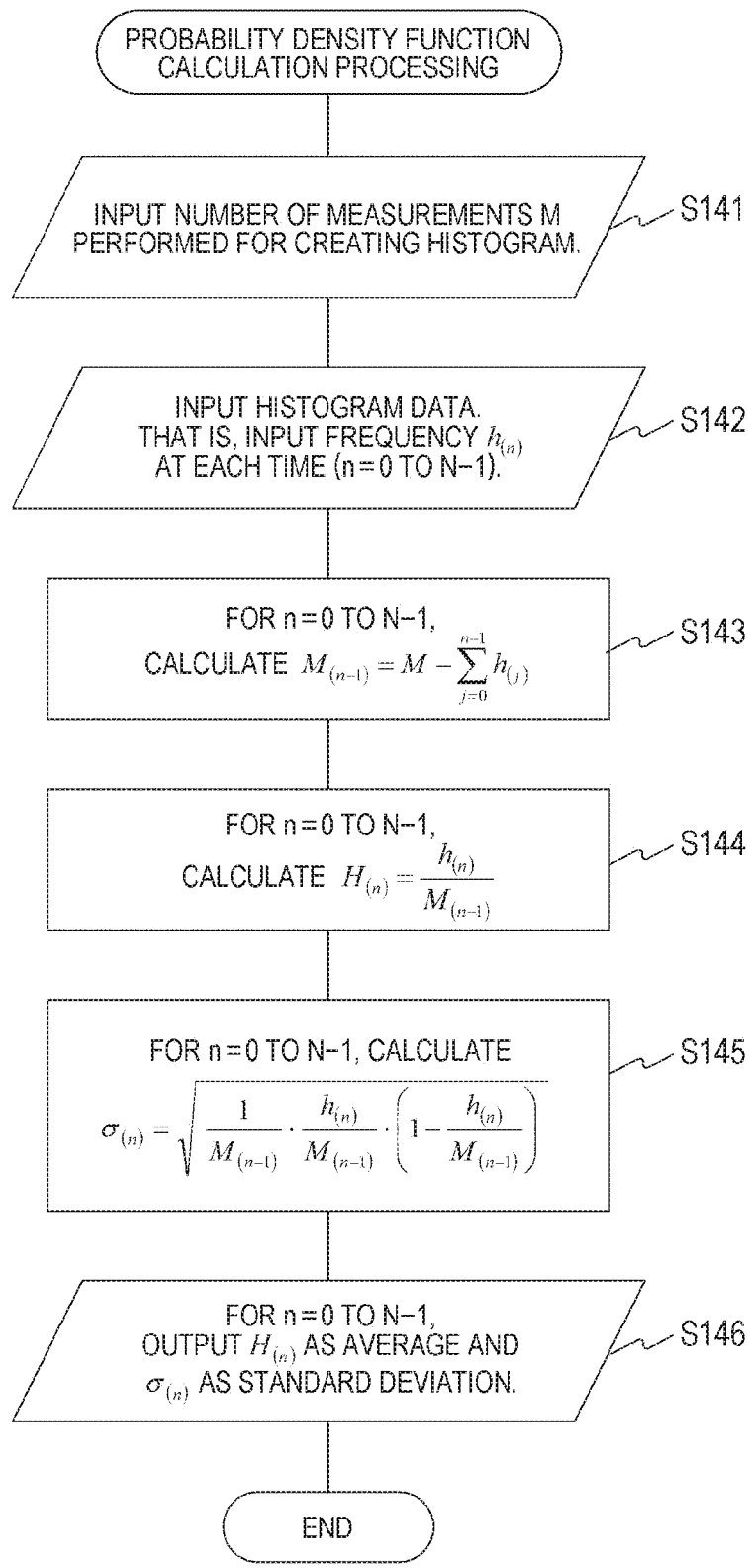
FIG. 5 is a flowchart illustrating an example of a processing procedure for calculating a probability density function according to the first embodiment of the present technology.

FIG. 5 is a flowchart illustrating an example of a processing procedure for calculating a probability density function according to the first embodiment of the present technology. This processing is performed by a computation unit 16.

First, in step S141, a numerical value M, which is the number of measurements performed for creating a histogram, is input. Then, the processing proceeds to step S142.

In step S142, histogram data created by an accumulation unit 15 is input. That is, a frequency h(n) in each bin n is input. Here, n=0 to N−1. Then, the processing proceeds to step S143.

In step S143, M(n−1) defined in the above-described Expression 4 is calculated. Here, n=0 to N−1. Then, the processing proceeds to step S144.

In step S144, H(n)=h(n)/M(n−1) is calculated. Here, n=0 to N−1. Note that H(n) is an average in a normal distribution of the above-described Expression 8. Then, the processing proceeds to step S145.

In step S145, σ(n)="square root of (1/M(n−1)×h(n)/M(n−1)×(1−h(n)/M(n−1)))" is calculated. Here, n=0 to N−1. Note that σ(n) is a standard deviation of the normal distribution of the above-described Expression 8. Then, the processing proceeds to step S146.

In step S146, H(n) is output as an average, and σ(n) is output as a standard deviation. Then, the series of processing ends. Here, n=0 to N−1.

Using the "probability density function when the occurrence rate p(n) of the n-th bin is used as a random variable" theoretically derived in this way, a specific application example is described below.

First Working Example

The first working example is an example in which a distance measuring device 10 is used to output a luminance value when the target object 20 is illuminated by the ambient light.

Figure 6:
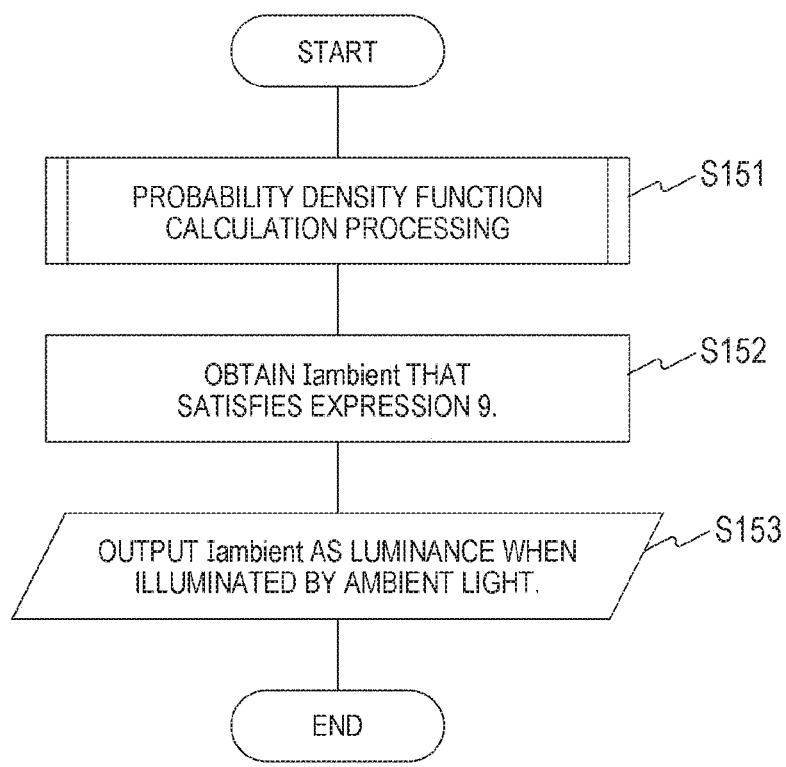
FIG. 6 is a flowchart illustrating an example of a processing procedure for outputting a luminance value when a target object 20 is illuminated by ambient light in a first working example of the first embodiment of the present technology.

FIG. 6 is a flowchart illustrating an example of a processing procedure for outputting a luminance value when the target object 20 is illuminated by the ambient light in the first working example of the first embodiment of the present technology. This processing is performed by the computation unit 16.

First, in step S151, probability density function calculation processing illustrated in FIG. 5 is performed. Then, the processing proceeds to step S152.

In step S152, Iambient that satisfies the following Expression 9 is obtained. Then, the processing proceeds to step S153.

[Math. 9]

$$I_{ambient} = \underset{I}{\arg\max} \left| \left\{ n \mid H_{(n)} - \frac{\sigma_{(n)}}{2} \leq I \leq H_{(n)} + \frac{\sigma_{(n)}}{2} \right\} \right| \quad \text{Expression 9}$$

In step S153, Iambient is output as a luminance value when the target object 20 is illuminated by the ambient light. Then, the series of processing ends.

Here, supplementary information regarding Expression 9 will be given. First, the meaning of a set {n} on the right-hand side of Expression 9 for a certain value I will be described using a drawing.

Figure 7:
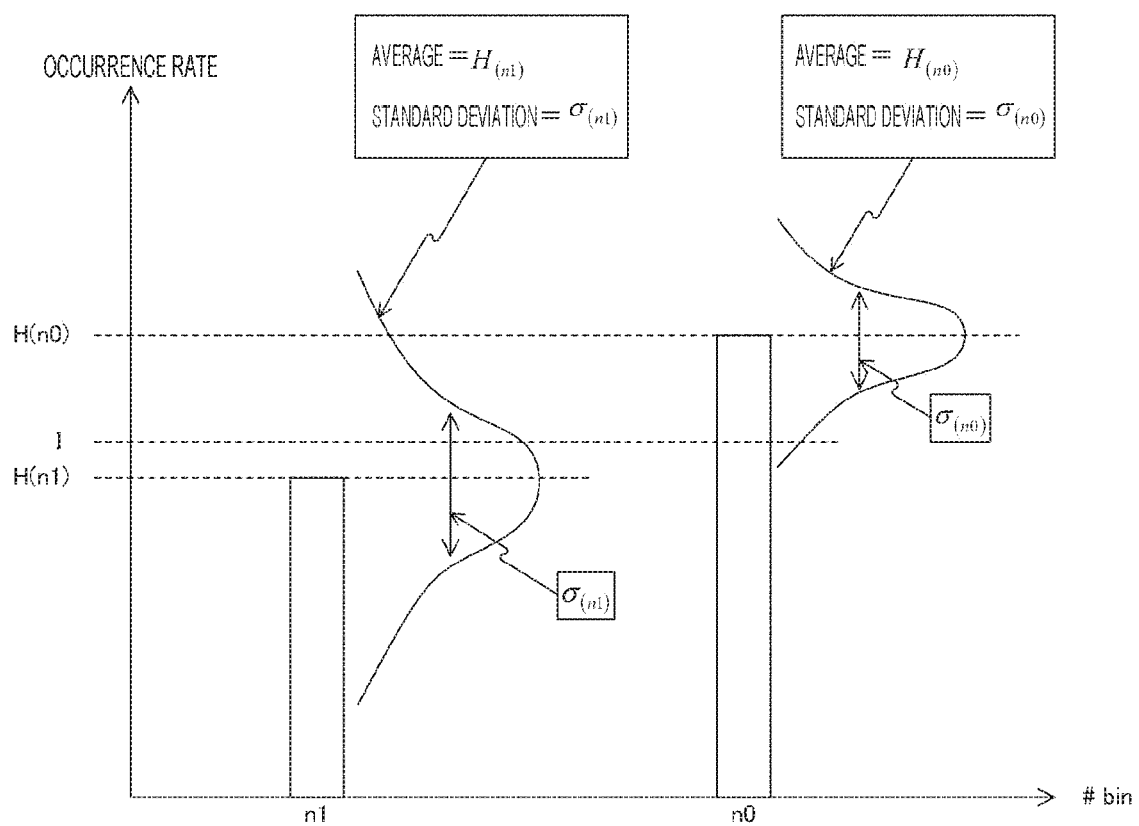
FIG. 7 is a diagram illustrating an occurrence rate of each bin obtained in step S151 of the first working example of the first embodiment of the present technology.

FIG. 7 is a diagram illustrating an occurrence rate of each bin obtained in step S151 of the first working example of the first embodiment of the present technology. The drawing representatively illustrates two bins (n0 and n1). The occurrence rates of the n0-th and n1-th bins are H(n0) and H(n1) on average, and have standard deviations of σ(n0) and σ(n1), respectively. In the case of the drawing, since H(n0)−σ(n0)/2≤I≤H(n0)+σ(n0)/2 is not satisfied, n0 is not included in the set {n}. On the other hand, since H(n1)−σ(n1)/2≤I≤H(n1)+σ(n1)/2 is satisfied, n1 is included in the set {n}. The occurrence rate in n0 is considered to be H(n0). However, the occurrence rate is uncertain. It is quite possible that the occurrence rate may be approximately between H(n0)−σ(n0)/2 and H(n0)+σ(n0)/2. Even taking this uncertainty into consideration, the occurrence rate is not considered to be I. On the other hand, the occurrence rate in n1 is considered to be H(n1). However, the occurrence rate is uncertain. It is quite possible that the occurrence rate may be approximately between H(n1)−σ(n1)/2 and H(n1)+σ(n1)/2. Considering this uncertainty, it is quite possible that the occurrence rate is I. That is, the set {n} is a set of bins that are highly likely to have an occurrence rate of I.

Next, Iambient in Expression 9 will be described. Iambient is a value of I that maximizes the number of elements in the set {n}. The occurrence rates are Iambient in most bins, and it is therefore considered that the occurrence rates have not been caused by reception of the active light but have been caused by reception of the ambient light. That is, the occurrence rates represent the amount of the ambient light. Thus, Iambient may be used as a luminance value when the target object 20 is illuminated by the ambient light. Note that the absolute value of the set in Expression 9 is a symbol indicating the number of elements in the set. In a set theory, the symbol of the absolute value is a symbol generally used to represent the number of elements, and is used in the same meaning in this embodiment.

In this way, in the first working example of the first embodiment, a luminance value when the target object 20 is illuminated by the ambient light can be obtained.

Second Working Example

The second working example is an example in which the distance to the target object 20 is output using the distance measuring device 10.

Figure 8:
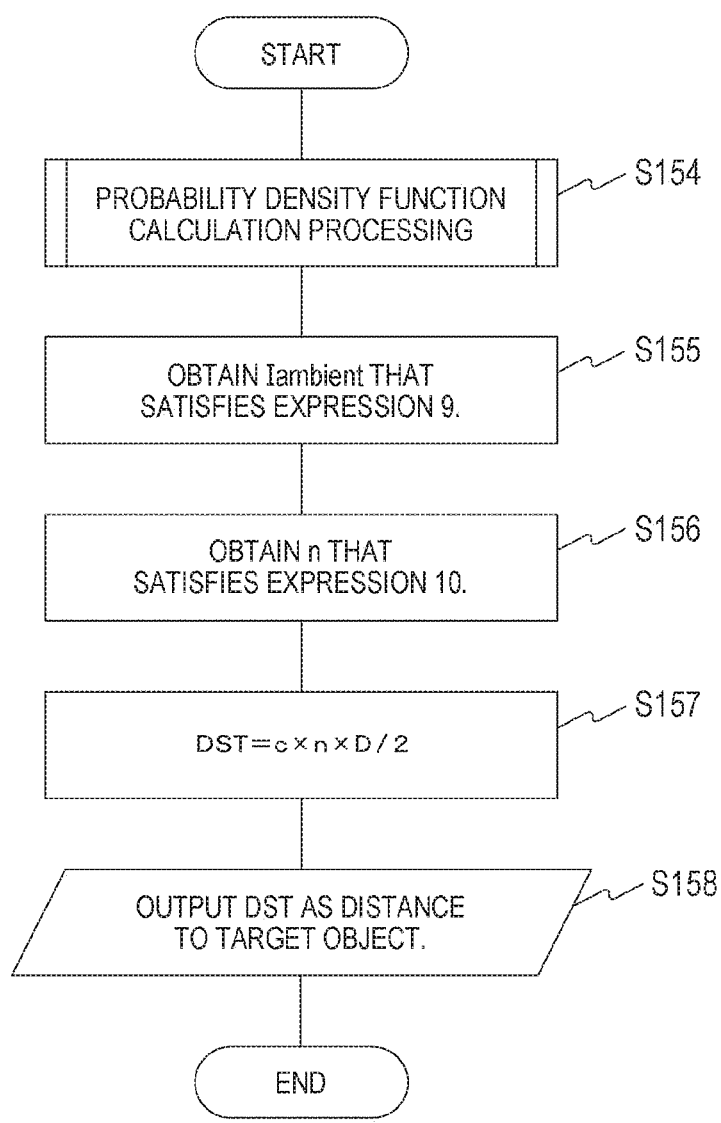
FIG. 8 is a flowchart illustrating an example of a processing procedure for outputting a distance to the target object 20 in a second working example of the first embodiment of the present technology.

FIG. 8 is a flowchart illustrating an example of a processing procedure for outputting the distance to the target object 20 in the second working example of the first embodiment of the present technology. This processing is performed by the computation unit 16.

First, in step S154, the probability density function calculation processing illustrated in FIG. 5 is performed. Then, the processing proceeds to step S155.

In step S155, Iambient that satisfies the above-described Expression 9 is obtained. Then, the processing proceeds to step S156.

In step S156, n that satisfies the following Expression 10 is obtained. Then, the processing proceeds to step S157.

[Math. 10]

$$\{n | I_{ambient} < H_{(n)} - 3/2\sigma_{(n)}\}$$ Expression 10

In step S157, DST=c×n×D/2 is calculated. DST is a distance corresponding to bin n. This is because the bin n corresponds to a time of approximately n×D. Then, the processing proceeds to step S158.

In step S158, DST is output as the distance to the target object. Then, the series of processing ends.

Here, supplementary information regarding Expression 10 will be given with reference to a drawing. Iambient is, as described in the first working example, an occurrence rate caused by reception of the ambient light.

Figure 9:
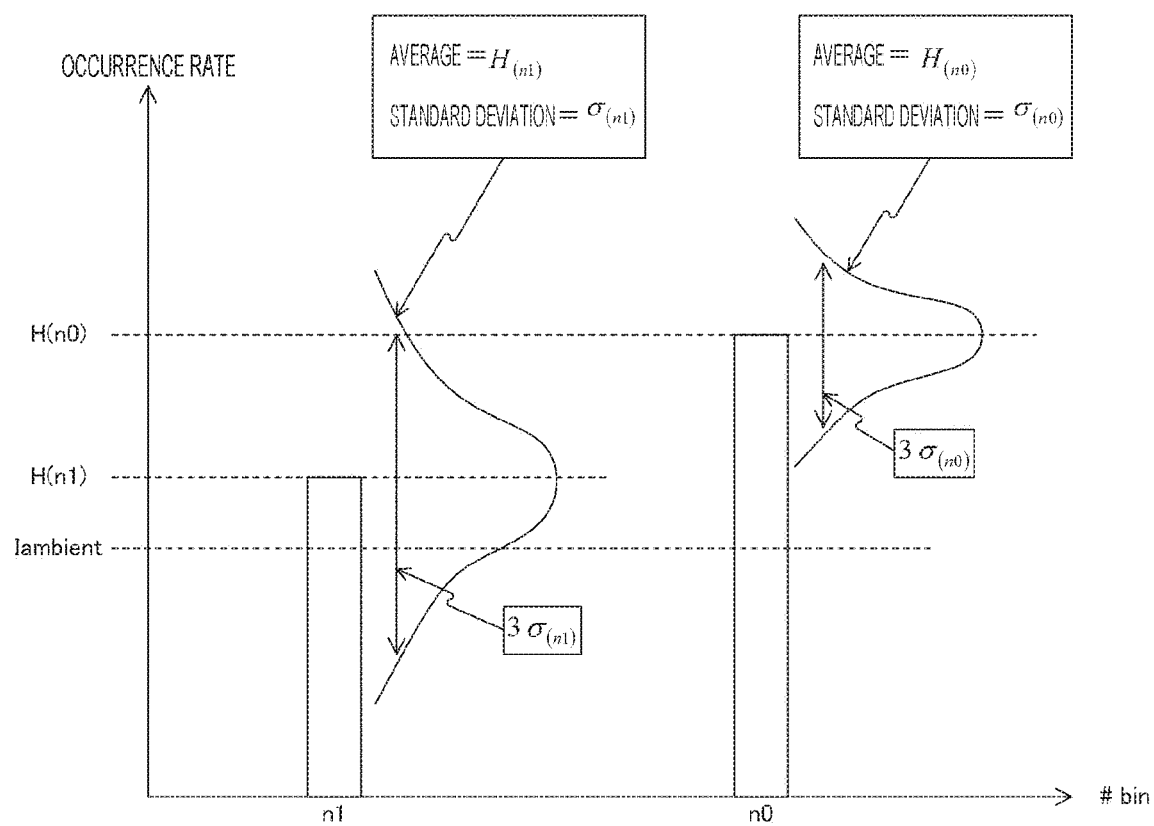
FIG. 9 is a diagram illustrating an occurrence rate of each bin obtained in step S154 of the second working example of the first embodiment of the present technology.

FIG. 9 is a diagram illustrating an occurrence rate of each bin obtained in step S154 in the second working example of the first embodiment of the present technology. The drawing representatively illustrates two bins (n0 and n1). Furthermore, the drawing also illustrates Iambient obtained in step S155. The occurrence rates of the n0-th and n1-th bins are H(n0) and H(n1) on average, and have standard deviations of σ(n0) and σ(n1), respectively. In the case of the drawing, since Iambient H(n0)−3×σ(n0)/2, n0 is included in a set {n} in Expression 10. On the other hand, since Iambient≤H(n1)−3×σ(n1)/2 is not satisfied, n1 is not included in the set {n} in Expression 10. The occurrence rate in n0 is considered to be H(n0). However, the occurrence rate is uncertain. The occurrence rate may be approximately between H(n0)−3×σ(n0)/2 and H(n0)+3×σ(n0)/2, and is significantly less likely to be otherwise. Even taking this uncertainty into consideration, the occurrence rate is considered to be equal to or greater than Iambient. That is, it is considered that the occurrence rate has been caused by reception of the active light. On the other hand, the occurrence rate in n1 is considered to be H(n1). However, the occurrence rate is uncertain. The occurrence rate may be approximately between H(n1)−3×σ(n1)/2 and H(n1)+3×σ(n1)/2. Considering this uncertainty, the occurrence rate may be Iambient. That is, the occurrence rate may not have been caused by reception of the active light. In a case where a peak fails to be detected, a distance measurement operation can be further performed to detect a peak again.

In this way, Expression 10 can be used to choose a bin in which an occurrence rate caused by reception of the active light has occurred.

In this way, in the second working example of the first embodiment, the bin in which the occurrence rate caused by reception of the active light has occurred is chosen to obtain the distance to the target object 20.

Third Working Example

The third working example is an example in which the distance measuring device 10 is used to output a luminance value when the target object 20 is illuminated by the active light.

Figure 10:
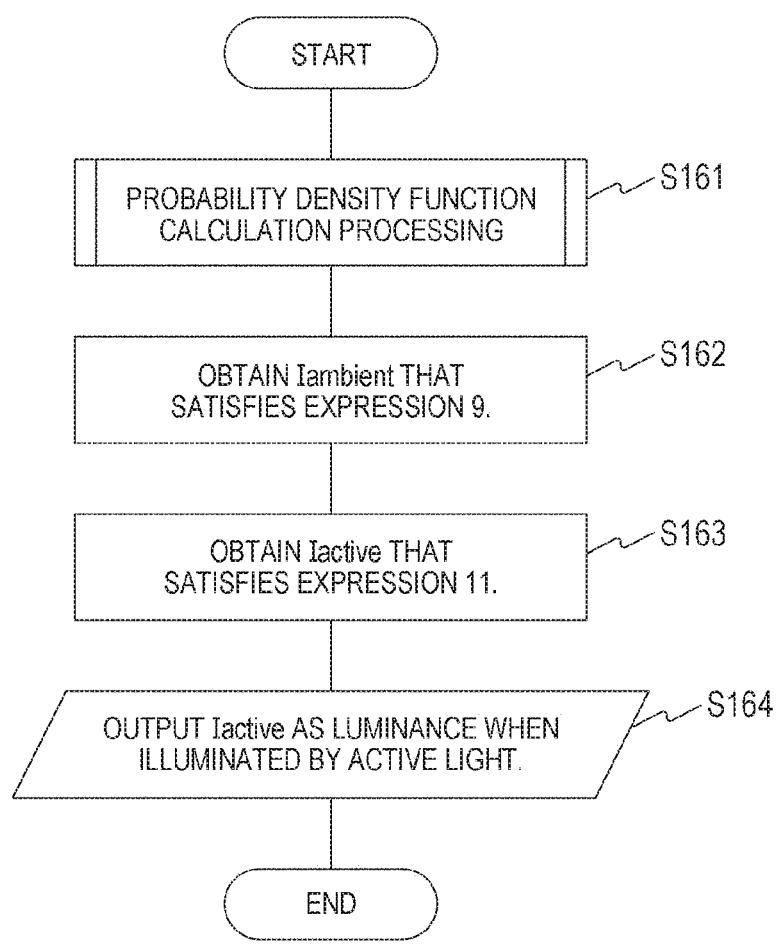
FIG. 10 is a flowchart illustrating an example of a processing procedure for outputting a luminance value when the target object 20 is illuminated by active light in a third working example of the first embodiment of the present technology.

FIG. 10 is a flowchart illustrating an example of a processing procedure for outputting a luminance value when the target object 20 is illuminated by the active light in the third working example of the first embodiment of the present technology. This processing is performed by the computation unit 16.

First, in step S161, the probability density function calculation processing illustrated in FIG. 5 is performed. Then, the processing proceeds to step S162.

In step S162, Iambient that satisfies the above-described Expression 9 is obtained. Then, the processing proceeds to step S163.

In step S163, Iactive that satisfies the following Expression 11 is obtained. Then, the processing proceeds to step S164.

[Math. 11]

$$I_{active} = \sum_{n \in \{n | I_{ambient} < H(n) - \frac{3}{2}\sigma(n)\}} \{H_{(n)} - I_{ambient}\}$$ Expression 11

In step S164, Iactive is output as a luminance value when the target object 20 is illuminated by the active light. Then, the series of processing ends.

Here, supplementary information regarding Expression 11 will be given. The cumulative n on the right-hand side of Expression 11 is the same as n that satisfies Expression 10. That is, as described in the second working example, this is a bin in which an occurrence rate caused by reception of the active light has occurred. Naturally, the occurrence rate of this bin also includes an occurrence rate caused by reception of the ambient light. Consequently, as shown in Expression 11, only the total of occurrence rates caused by reception of the active light can be calculated by subtracting Iambient from H(n) and accumulating n. That is, the amount of the active light can be obtained. Thus, Iactive may be used as a luminance value when the target object 20 is illuminated by the active light.

In this way, in the third working example of the first embodiment, a luminance value when the target object 20 is illuminated by the active light can be obtained.

Fourth Working Example

The fourth working example is an example in which the distance to the target object 20 is output using the distance measuring device 10.

Figure 11:
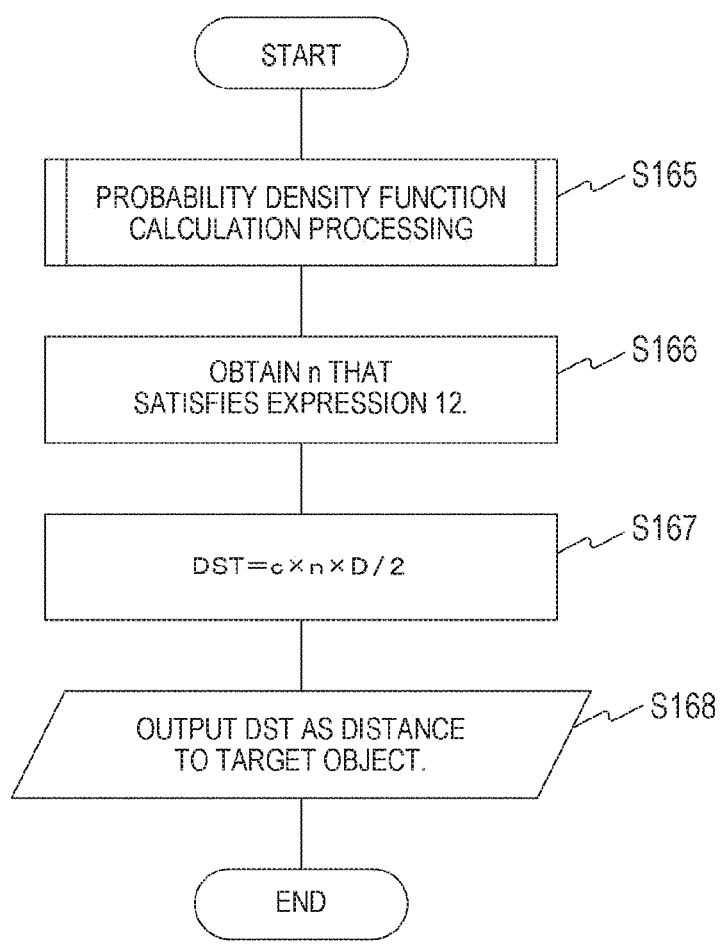
FIG. 11 is a flowchart illustrating an example of a processing procedure for outputting a distance to the target object 20 in a fourth working example of the first embodiment of the present technology.

FIG. 11 is a flowchart illustrating an example of a processing procedure for outputting the distance to the target object 20 in the fourth working example of the first embodiment of the present technology. This processing is performed by the computation unit 16.

First, in step S165, the probability density function calculation processing illustrated in FIG. 5 is performed. Then, the processing proceeds to step S166.

In step S166, n that satisfies the following Expression 12 is obtained. Then, the processing proceeds to step S167.

[Math. 12]

$$\left\{n \middle| C_{num1} \leq \middle| \left\{m \middle| C_{dist1} < \frac{H_{(n)} - H_{(m)}}{2(\sigma_{(n)} + \sigma_{(m)})}\right\} \middle| \right\}$$ Expression 12

In step S167, DST=c×n×D/2 is calculated. DST is a distance corresponding to bin n. This is because the bin n corresponds to a time of approximately n×D. Then, the processing proceeds to step S168.

In step S168, DST is output as the distance to the target object 20. Then, the series of processing ends.

Here, supplementary information regarding Expression 12 will be given with reference to a drawing.

Figure 12:
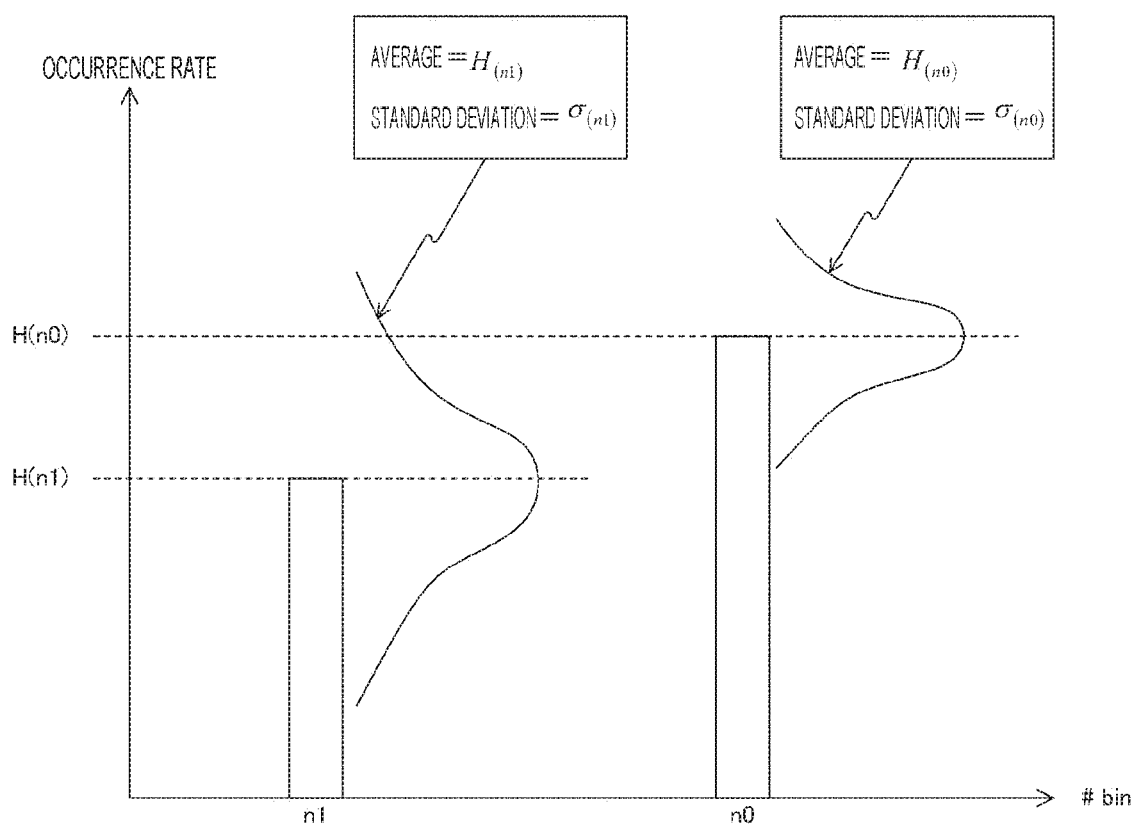
FIG. 12 is a diagram illustrating an occurrence rate of each bin obtained in step S165 of the fourth working example of the first embodiment of the present technology.

FIG. 12 is a diagram illustrating an occurrence rate of each bin obtained in step S165 of the fourth working example of the first embodiment of the present technology.

The drawing representatively illustrates two bins (n0 and n1). The occurrence rates of the n0-th and n1-th bins are H(n0) and H(n1) on average, and have standard deviations of σ(n0) and σ(n1), respectively. A resolution (degree of resolution between two peaks) between these two occurrence rates is represented by the following Expression 13.

[Math. 13]

$$\frac{H_{(n0)} - H_{(n1)}}{2(\sigma_{(n0)} + \sigma_{(n1)})}$$ Expression 13

When the resolution is large to a certain degree (threshold Cdist1), it can be said that true occurrence rates of the two are different. Consequently, for a certain bin n, in a case where there are many (equal to or greater than Cnum1) bins (m) in which the resolution from n exceeds Cdist1, it can be said that the n has a prominent occurrence rate distinctively higher than the occurrence rates of other bins. Such bin n is chosen by using Expression 12. Since the distinctively high occurrence rate is considered to be an occurrence rate caused by reception of the active light, Expression 12 can be used to choose a bin in which an occurrence rate caused by reception of the active light has occurred.

Note that while the resolution is used as an example of an index for determining whether or not the occurrence rates of the two bins are different, this embodiment does not limit the determination index to the resolution.

Note that Cdist1 and Cnum1 are constants.

In this way, in the fourth working example of the first embodiment, the distance to the target object 20 can be obtained.

Fifth Working Example

A fifth working example is an example in which the distance measuring device 10 is used to output a luminance value when the target object 20 is illuminated by the ambient light.

Figure 13:
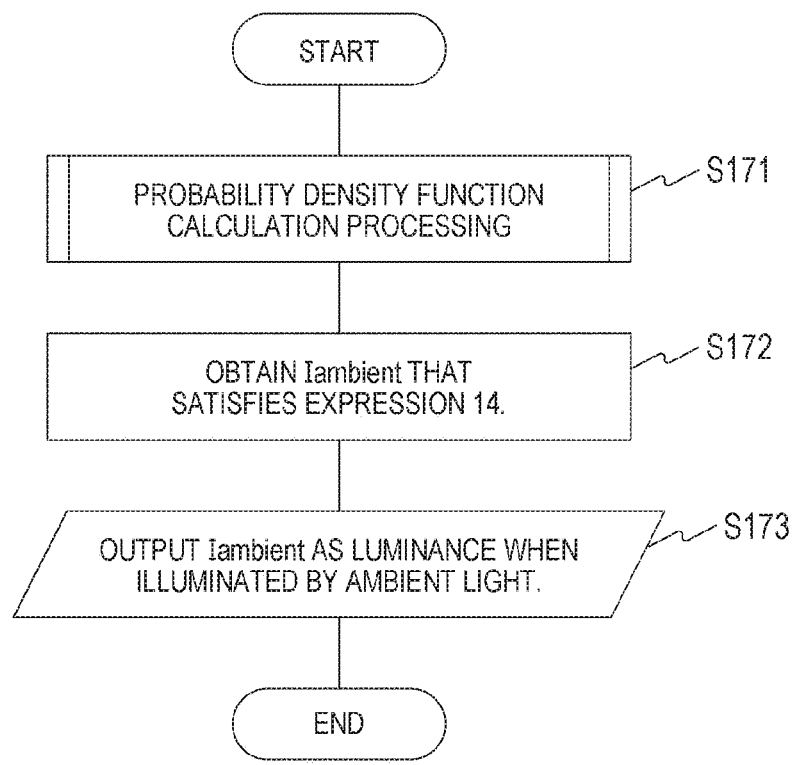
FIG. 13 is a flowchart illustrating an example of a processing procedure for outputting a luminance value when the target object 20 is illuminated by the ambient light in a fifth working example of the first embodiment of the present technology.

FIG. 13 is a flowchart illustrating an example of a processing procedure for outputting a luminance value when the target object 20 is illuminated by the ambient light in the fifth working example of the first embodiment of the present technology. This processing is performed by the computation unit 16.

First, in step S171, the probability density function calculation processing illustrated in FIG. 5 is performed. Then, the processing proceeds to step S172.

In step S172, Iambient that satisfies the following Expression 14 is obtained. Then, the processing proceeds to step S173.

[Math. 14]

$$I_{ambient} = \frac{\sum_{n \in \left\{n \middle| \left\{m \middle| C_{dist2} < \frac{H_{(n)} - H_{(m)}}{2(\sigma_{(n)} + \sigma_{(m)})}\right\} \middle| \leq C_{num2}\right\}} H_{(n)}}{\left| \left\{n \middle| \left\{m \middle| C_{dist2} < \frac{H_{(n)} - H_{(m)}}{2(\sigma_{(n)} + \sigma_{(m)})}\right\} \middle| \leq C_{num2}\right\} \right|}$$ Expression 14

In step S173, Iambient is output as a luminance value when the target object 20 is illuminated by the ambient light. Then, the series of processing ends.

Here, supplementary information regarding Expression 14 will be given. n, which is to be accumulated in H(n) in a numerator on the right-hand side of Expression 14, is as described below. That is, bins to be accumulated are bins in which the number of bins (m) having a resolution larger than Cdist2 is equal to or smaller than Cnum2. This means that the occurrence rate of the bin n is not distinctively high, and is considered to be an occurrence rate caused by reception of the ambient light. The right-hand side of Expression 14 is calculation of an average of such H(n), and is considered to be an occurrence rate caused by reception of the ambient light. Thus, Iambient may be used as a luminance value when the target object 20 is illuminated by the ambient light.

Note that Cdist2 and Cnum2 are constants.

In this way, in the fifth working example of the first embodiment, a luminance value when the target object 20 is illuminated by the ambient light can be obtained.

Sixth Working Example

The sixth working example is an example in which the distance measuring device 10 is used to output a luminance value when the target object 20 is illuminated by the active light.

Figure 14:
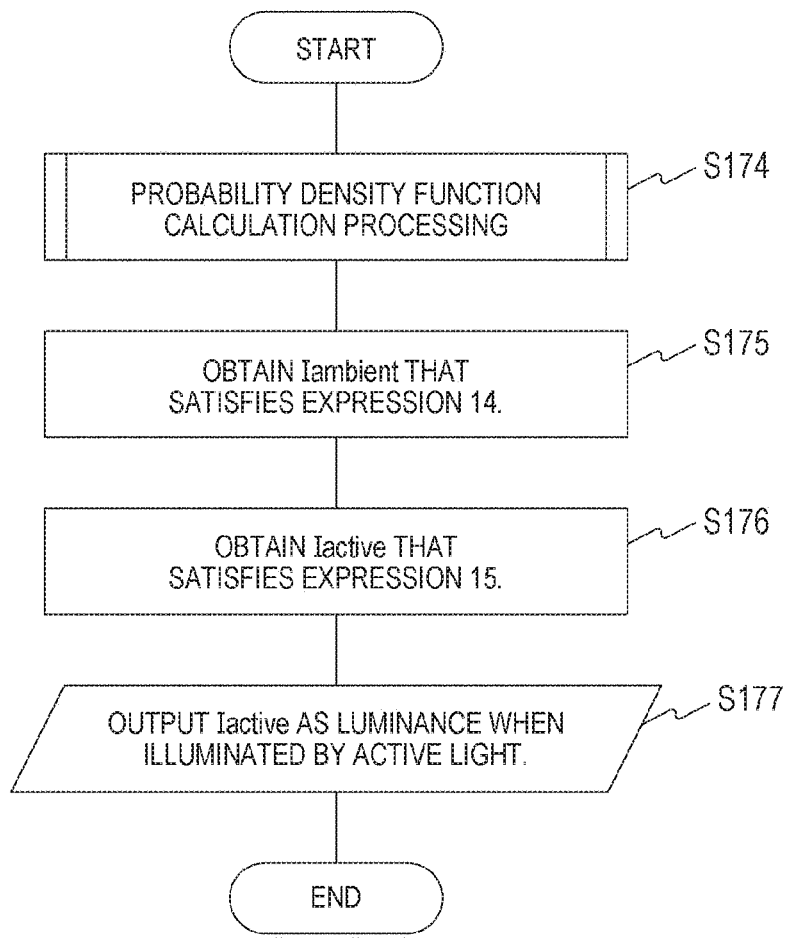
FIG. 14 is a flowchart illustrating an example of a processing procedure for outputting a luminance value when the target object 20 is illuminated by the active light in a sixth working example of the first embodiment of the present technology.

FIG. 14 is a flowchart illustrating an example of a processing procedure for outputting a luminance value when the target object 20 is illuminated by the active light in the sixth working example of the first embodiment of the present technology. This processing is performed by the computation unit 16.

First, in step S174, the probability density function calculation processing illustrated in FIG. 5 is performed. Then, the processing proceeds to step S175.

In step S175, Iambient that satisfies the above-described Expression 14 is obtained. Then, the processing proceeds to step S176.

In step S176, Iactive that satisfies the following Expression 15 is obtained. Then, the processing proceeds to step S177.

[Math. 15]

$$I_{active} = \sum_{n \in \{n \mid C_{num} 1 \leq \mid \{m \mid C_{dist1} < \frac{H_{(n)} - H_{(m)}}{2(\sigma_{(n)} + \sigma_{(m)})} \} \mid \}} \{H_{(n)} - I_{ambient}\}$$

Expression 15

In step S177, Iactive is output as a luminance value when the target object 20 is illuminated by the active light. Then, the series of processing ends.

Here, supplementary information regarding Expression 15 will be given. The cumulative n on the right-hand side of Expression 15 is the same as n that satisfies the above-described Expression 12. That is, as described in the fourth working example, this is a bin in which an occurrence rate caused by reception of the active light has occurred. Naturally, the occurrence rate of this bin also includes an occurrence rate caused by reception of the ambient light. Consequently, as shown in Expression 15, only the total of occurrence rates caused by reception of the active light can be calculated by subtracting Iambient from H(n) and accumulating n. That is, the amount of the active light can be obtained. Thus, Iactive may be used as a luminance value when a target object is illuminated by the active light.

In this way, in the sixth working example of the first embodiment, a luminance value when the target object 20 is illuminated by the active light can be obtained.

[Effect]

In this way, according to the first embodiment, a "probability density function when an occurrence rate of each bin is used as a random variable" can be obtained by theoretically analyzing histogram data obtained from a SPAD sensor (FIG. 5). Thus, an accurate determination can be made. Therefore, accurate distance measurement can be performed using this probability density function as described in, for example, the second and fourth working examples. Furthermore, for example, as shown in the first and fifth working examples, it is possible to accurately measure a luminance value when a target object is illuminated by the ambient light. Furthermore, for example, as shown in the third and sixth working examples, it is possible to accurately measure a luminance value when the target object 20 is illuminated by accurate active light.

[Gist]

The gist of the first embodiment is as follows.

(1) A method of calculating a probability density function, the method including the steps of:
  inputting a histogram obtained from a SPAD sensor;
  calculating M(n−1) and H(n) from a frequency h(n) corresponding to time n in the histogram; and
  outputting H(n) as an average value of "probability density functions when an occurrence rate in the time n is used as a random variable".

(2) The method of calculating a probability density function according to (1), the method further including the steps of:
  calculating σ(n); and
  outputting σ(n) as a standard deviation of "probability density functions when an occurrence rate in the time n is used as a random variable".

(3) A luminance value calculation method including the steps of:
  calculating a mode value from probability density functions obtained by (1) or (2); and
  outputting the mode value as a luminance value when a target object is illuminated by ambient light.

(4) A distance calculation method including the steps of:
  calculating a mode value from probability density functions obtained by (1) or (2);
  choosing a time that does not have the mode value;
  multiplying the chosen time by a value of (the speed of light/2); and
  outputting a result of the multiplication as a distance to a target object.

(5) A luminance value calculation method including the steps of:
  calculating a mode value from probability density functions obtained by (1) or (2);
  calculating a value of a probability density function corresponding to a time that does not have the mode value; and
  outputting the value of the probability density function as a luminance value when a target object is illuminated by active light.

(6) A distance calculation method including the steps of:
  choosing, from probability density functions obtained by (1) or (2), a time in which the corresponding probability density function has a distinctively high value;
  multiplying the time by a value of (the speed of light/2); and
  outputting a result of the multiplication as a distance to a target object.

(7) A luminance value calculation method including the steps of:
  calculating, from probability density functions obtained by (1) or (2), a value of a probability density function corresponding to a time in which the corresponding probability density function does not have a distinctively high value; and
  outputting the value of the probability density function as a luminance value when a target object is illuminated by ambient light.

(8) A luminance value calculation method including the steps of:
  calculating, from probability density functions obtained by (1) or (2), a value of a probability density function corresponding to a time in which the corresponding probability density function has a distinctively high value; and outputting the value of the probability density function as a luminance value when a target object is illuminated by active light.

3. Second Embodiment

[Outline]

In this second embodiment, before detection of a peak in a histogram by a computation unit 16, the histogram is sharpened by adaptively performing an optimum weighted addition on the histogram in accordance with the situation. This decreases false detections.

The sharpening of a histogram according to the second embodiment can be succinctly expressed as the following Expression 16.

[Math. 16]

$$H_{NR(t,x,y,n)} = \frac{1}{W} \sum_{t_1, x_1, y_1, \text{offset}} w \cdot H_{(t_1, x_1, y_1, n-\text{offset})},$$

$$\text{where } W \equiv \sum_{t_1, x_1, y_1, \text{offset}} w$$

Expression 16

Here, an observation value at time t, position (x, y), and n-th bin (i.e., a value obtained from an accumulation unit 15) is expressed as H(t, x, y, n). Then, for a sharpened histogram obtained by applying the second embodiment, a value at time t, position (x, y), and n-th bin is expressed as HNR(t, x, y, n). The computation unit 16 calculates Expression 16 using a histogram H(t, x, y, n) obtained from the accumulation unit 15 to obtain a sharpened histogram HNR(t, x, y, n). Using the sharpened histogram HNR(t, x, y, n) to search for a peak value enables detection of a peak without false detections, and distance measurement without false detections.

Moreover, Expression 16 performs a weighted average for H(t, x, y, n). The weighted average removes noise from the histogram and sharpens the histogram. w is weighting for the corresponding H(t, x, y, n), and W is the total value of w used for normalization. The second embodiment is characterized in that the value of this w is adaptively optimized in accordance with the "situation".

Figure 15:
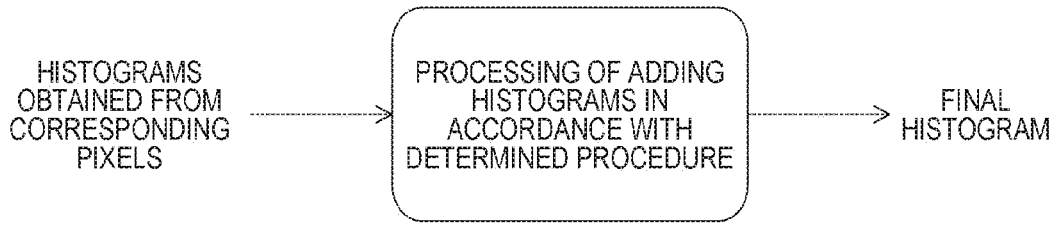
FIG. 15 is a diagram for describing a first technique in a conventional art.

FIG. 15 is a diagram for describing a first technique in a conventional art. In this conventional art, histograms obtained from the corresponding pixels are added by a circuit for "processing of adding histograms in accordance with a determined procedure" to obtain a final histogram. In a case of an object in a positional relationship that does not match the determined procedure, there is a problem in that histograms are blurred.

Figure 16:
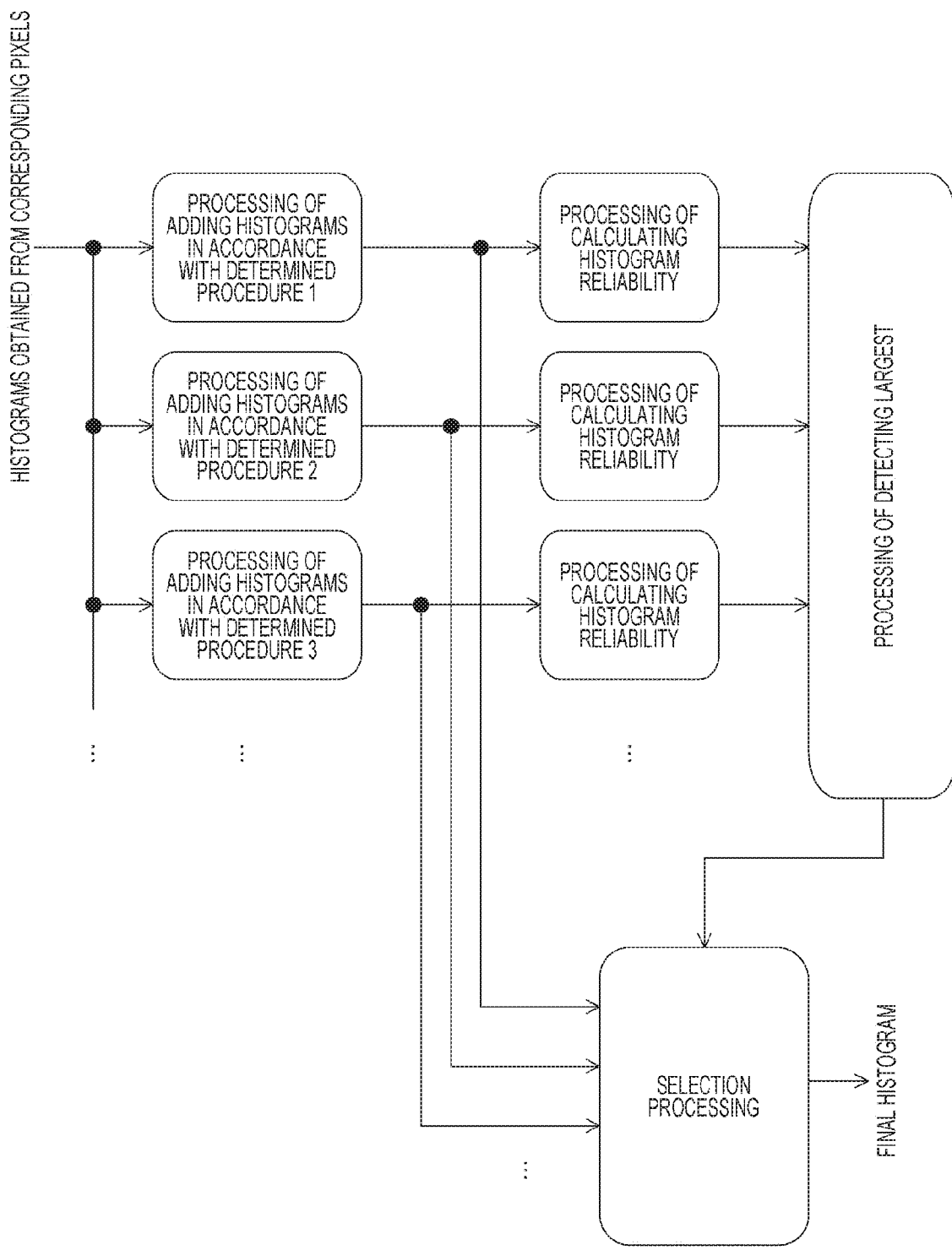
FIG. 16 is a diagram for describing a second technique in the conventional art.

FIG. 16 is a diagram for describing a second technique in the conventional art. In this conventional art, since there is a plurality of determined procedures, addition of corresponding histograms is performed in each procedure. These additions are performed on histograms obtained from the corresponding pixels by a circuit for "processing of adding histograms in accordance with determined procedures 1, 2, 3, . . . ". Then, a reliability is calculated for each histogram. The calculation of these reliabilities is performed by a circuit for "processing of calculating a histogram reliability". The largest among the plurality of calculated reliabilities is detected by a circuit for "processing of detecting the largest". Then, the corresponding "added up histogram" is selected by a circuit for "selection processing" to obtain a final histogram. There is a plurality of types of "processing of adding histograms in accordance with a determined procedure", and this causes a problem in that the amount of calculation becomes enormous.

Figure 17:
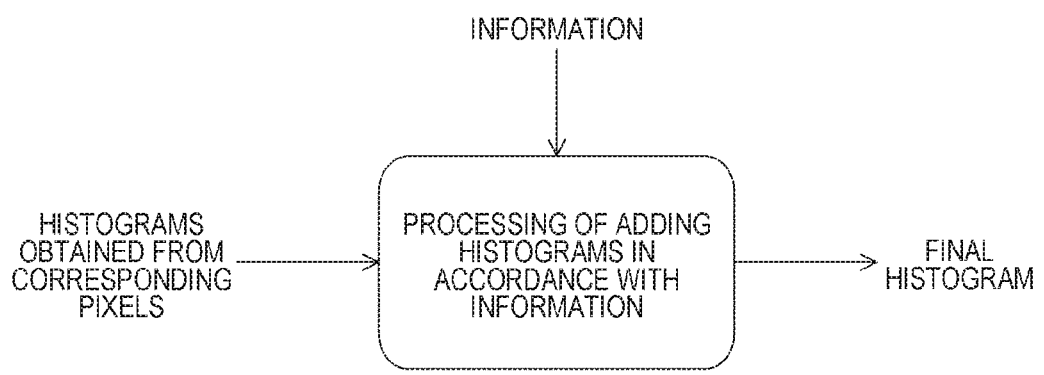
FIG. 17 is a conceptual diagram illustrating an example of processing according to a second embodiment of the present technology.

FIG. 17 is a conceptual diagram illustrating an example of processing according to the second embodiment of the present technology. In the second embodiment, an appropriate addition is performed on histograms obtained from the corresponding pixels by a circuit for "processing of adding histograms in accordance with information". That is, since an appropriate addition is performed, the addition performed is always optimum regardless of the positional relationship of the object projected onto each pixel. Therefore, the processing can be applied also to an object in a positional relationship that does not match the determined procedure, and this prevents blurred histograms. Furthermore, in the second embodiment, not a plurality of additions but only one type of appropriate addition is performed. Therefore, no enormous amount of calculation is required.

What is important here is "information" in the drawing, and a method of performing an "appropriate addition" using this "information". These "information" and "appropriate addition" will become apparent from the details described later. Note that the "appropriate addition" corresponds to the above-described Expression 16. Furthermore, the "information" corresponds to the above-described "situation" for adaptively optimizing the value of w.

[Similarity Between Histograms]

Next, assuming that two histograms are given, similarity between the two histograms will be discussed. As the two histograms, a histogram at time t and position (x, y) and a histogram at time t1 and position (x1, y1) are assumed. Furthermore, an evaluation is performed on the similarity between the two histograms when bins are shifted by offset.

An n-th bin in the histogram at time t and position (x, y) is expressed as H(t, x, y, n). From the discussion described above, a probability density function of an occurrence rate in this bin is represented by Expression 17.

[Math. 17]

$$N\left( \frac{H_{(t,x,y,n)}}{M_{(t,x,y,n-1)}}, \frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right) \right)$$

Expression 17

Note that M(t, x, y, n−1) is defined by the following Expression 18.

[Math. 18]

$$M_{(t,x,y,n-1)} \equiv M - \sum_{j=0}^{n-1} H_{(t,x,y,j)}$$

Expression 18

On the other hand, a value of an (n−offset)-th bin in the histogram at time t1 and position (x1, y1) is H(t1, x1, y1, n−offset). Here, offset is an arbitrary constant. An occurrence rate in the (n−offset)-th bin in the histogram at time t1 and position (x1, y1) is most likely to be Expression 19.

[Math. 19]

$$\frac{H_{(t_1, x_1, y_1, n-\text{offset})}}{M_{(t_1, x_1, y_1, n-1-\text{offset})}}$$

Expression 19

Thus, the probability that the occurrence rate of the n-th bin in the histogram at time t and position (x, y) is the same as the occurrence rate of the (n−offset)-th bin in the histogram at time t1 and position (x1, y1) is represented by Expression 20.

[Math. 20]

$$\frac{1}{\sqrt{2\pi \cdot \frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right)}} \cdot \exp\left\{\frac{-\left(\frac{H_{(t_1,x_1,y_1,n-\textit{offset})}}{M_{(t_1,x_1,y_1,n-1-\textit{offset})}} - \frac{H_{(t,x,y,n)}}{M_{(t,x,y,n-1)}}\right)^2}{2 \cdot \frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right)}\right\} \quad \text{Expression 20}$$

In general, most of bins in a histogram have counts triggered by reception of ambient light. Then, only a small number of bins have counts triggered by reception of active light. Considering that the similarity between the two histograms is evaluated by an average value of Expression 20 for all bins, the evaluation is influenced by bins that have counts triggered by reception of the ambient light, the bins accounting for the majority, rather than by bins that have counts triggered by reception of the active light. On the other hand, an ultimate goal of the second embodiment is sharpening for detection of peaks in histograms (bins that have counts triggered by reception of the active light). Thus, the evaluation may be performed on the basis of the average value of Expression 20 for all bins, but this is not the best evaluation method.

Consequently, in the second embodiment, the following two evaluation methods are proposed. Note that a method of evaluating similarity between two histograms is not limited to this. As a matter of course, the evaluation may be performed on the basis of the average value of Expression 20 for all bins.

[First Technique of Calculating Evaluation Value of Similarity Between Histograms]

Occurrence rates of bins that have counts triggered by reception of the active light are larger than other bins. Consequently, for bins in which the value shown in Expression 21 is relatively large, the above-described Expression 20 is calculated, and a result of the calculation is used as an evaluation value of similarity between the two histograms.

[Math. 21]

$$\frac{H_{(t,x,y,n)}}{M_{(t,x,y,n-1)}} \quad \text{Expression 21}$$

Note that the value of Expression 21 is, as can be seen from the previous description using Expression 6, the most probable value obtained from an observation value of the occurrence rate of the n-th bin in the histogram at time t and position (x, y).

Figure 18:
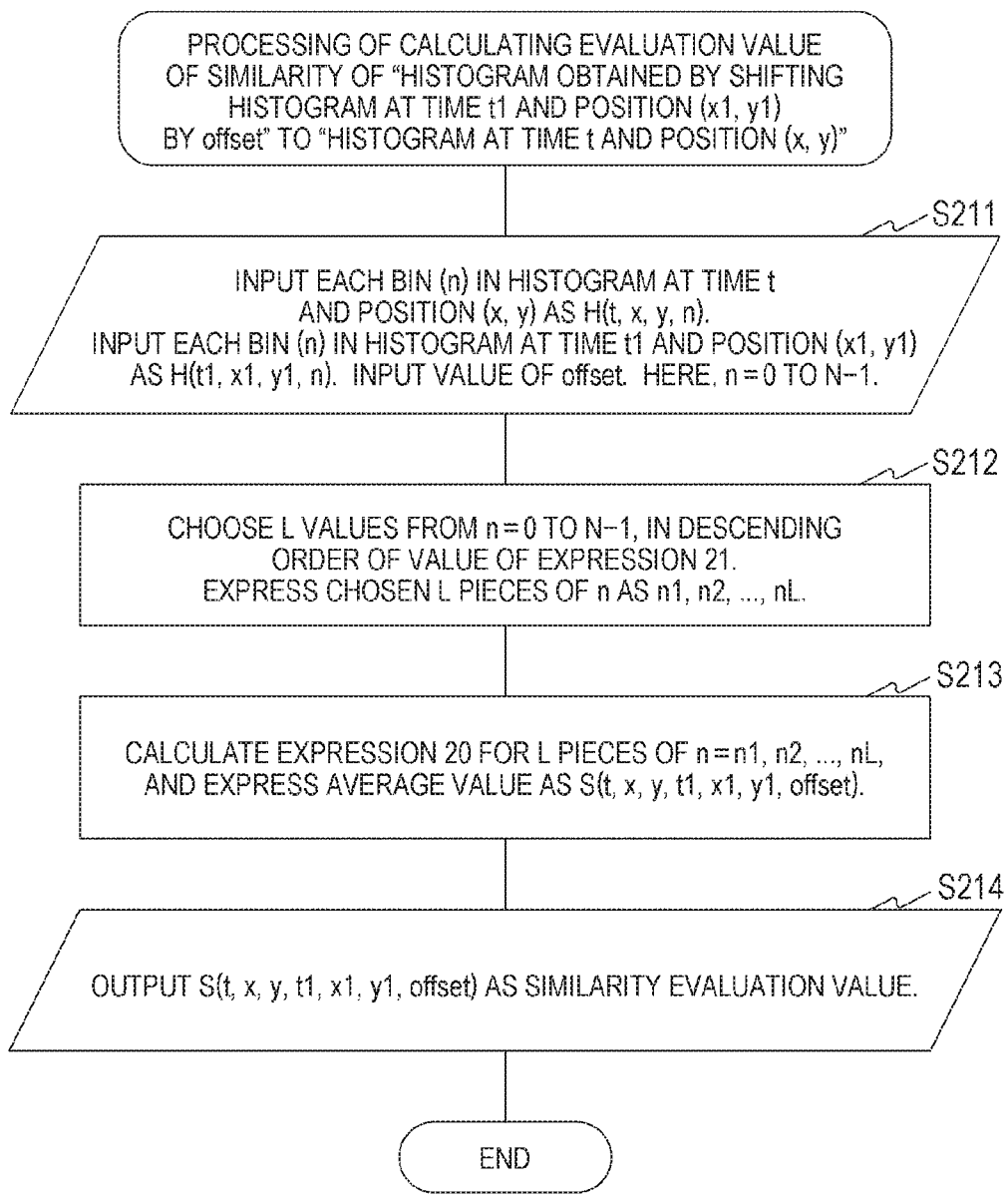
FIG. 18 is a flowchart illustrating a first example of processing of calculating a similarity evaluation value according to the second embodiment of the present technology.

FIG. 18 is a flowchart illustrating a first example of processing of calculating a similarity evaluation value according to the second embodiment of the present technology. This processing calculates an evaluation value of similarity of a "histogram obtained by shifting the histogram at time t1 and position (x1, y1) by offset" to the "histogram at time t and position (x, y)". Note that the higher the similarity, the larger the evaluation value.

First, in step S211, each bin (n) in the histogram at time t and position (x, y) is input, and is expressed as H(t, x, y, n). Each bin (n) in the histogram at time t1 and position (x1, y1) is input, and is expressed as H(t1, x1, y1, n). A value of offset is input. Here, n is 0 to N−1. Then, the processing proceeds to step S212.

In step S212, L values are chosen from n=0 to N−1, in descending order of the value of Expression 21. The chosen L pieces of n are expressed as n1, n2, . . . , nL. Here, L is a desired constant. Then, the processing proceeds to step S213.

In step S213, Expression 20 is calculated for L pieces of n=n1, n2, . . . , nL, and the average value is expressed as S(t, x, y, t1, x1, y1, offset). Then, the processing proceeds to step S214.

In step S214, S(t, x, y, t1, x1, y1, offset) is output as a similarity evaluation value. Then, this series of processing ends.

[Second Technique of Calculating Evaluation Value of Similarity Between Histograms]

Occurrence rates of bins that have counts triggered by reception of the active light are larger than other bins. In a case where corresponding bins in the two histograms have large occurrence rates, the similarity evaluation value should be increased. Conversely, in a case where an occurrence rate of a bin in one histogram is large and an occurrence rate of the corresponding bin in the other histogram is small, then the similarity evaluation value should be reduced. That is, with interest focused on bins that largely differ in occurrence rate, it may be determined that the similarity is low in a case where the difference is large, and that the similarity is high in a case where the difference is small. Note that the difference in occurrence rate can be calculated by Expression 22.

[Math. 22]

$$\left| \frac{H_{(t_1,x_1,y_1,n-\textit{offset})}}{M_{(t_1,x_1,y_1,n-1-\textit{offset})}} - \frac{H_{(t,x,y,n)}}{M_{(t,x,y,n-1)}} \right| \quad \text{Expression 22}$$

Figure 19:
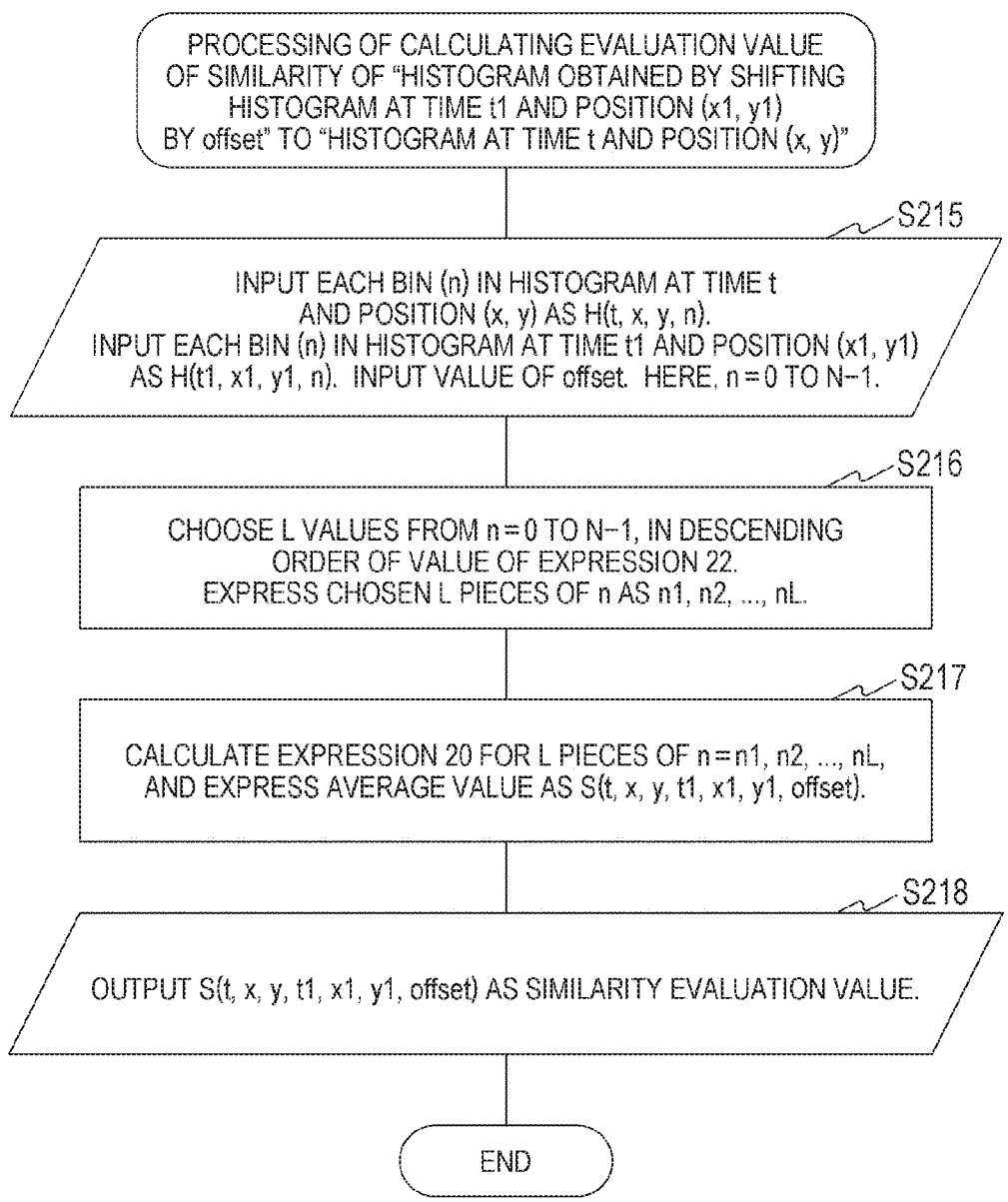
FIG. 19 is a flowchart illustrating a second example of the processing of calculating a similarity evaluation value according to the second embodiment of the present technology.

FIG. 19 is a flowchart illustrating a second example of the processing of calculating a similarity evaluation value according to the second embodiment of the present technology. This processing calculates an evaluation value of similarity of a "histogram obtained by shifting the histogram at time t1 and position (x1, y1) by offset" to the "histogram at time t and position (x, y)". Note that the higher the similarity, the larger the evaluation value.

First, in step S215, each bin (n) in the histogram at time t and position (x, y) is input, and is expressed as H(t, x, y, n). Each bin (n) in the histogram at time t1 and position (x1, y1) is input, and is expressed as H(t1, x1, y1, n). A value of offset is input. Here, n is 0 to N−1. Then, the processing proceeds to step S216.

In step S216, L values are chosen from n=0 to N−1, in descending order of the value of Expression 22. The chosen L pieces of n are expressed as n1, n2, . . . , nL. Here, L is a desired constant. Then, the processing proceeds to step S217.

In step S217, Expression 20 is calculated for L pieces of n=n1, n2, . . . , nL, and the average value is expressed as S(t, x, y, t1, x1, y1, offset). Then, the processing proceeds to step S218.

In step S218, S(t, x, y, t1, x1, y1, offset) is output as a similarity evaluation value. Then, this series of processing ends.

First Working Example 5

In a first working example, a distance measuring device 10 is used to perform distance measurement for each SPAD in a SPAD array 13. In particular, the features include sharpening of an observed histogram obtained from the accumulation unit 15. The sharpening of the histogram is performed by the computation unit 16.

Similarity of a SPAD histogram H(t, x, y, n) (here, n=0 to N−1) at time of interest t and position of interest (x, y) to a SPAD histogram that is in proximity in time and space to the histogram H(t, x, y, n) is examined. Then, in a case where a histogram that is highly similar to the histogram H(t, x, y, n) is found, the histogram is added to the histogram H(t, x, y, n) with weighting in accordance with the degree of similarity. Therefore, noise removal and sharpening of the histogram H(t, x, y, n) is performed.

Figure 20:
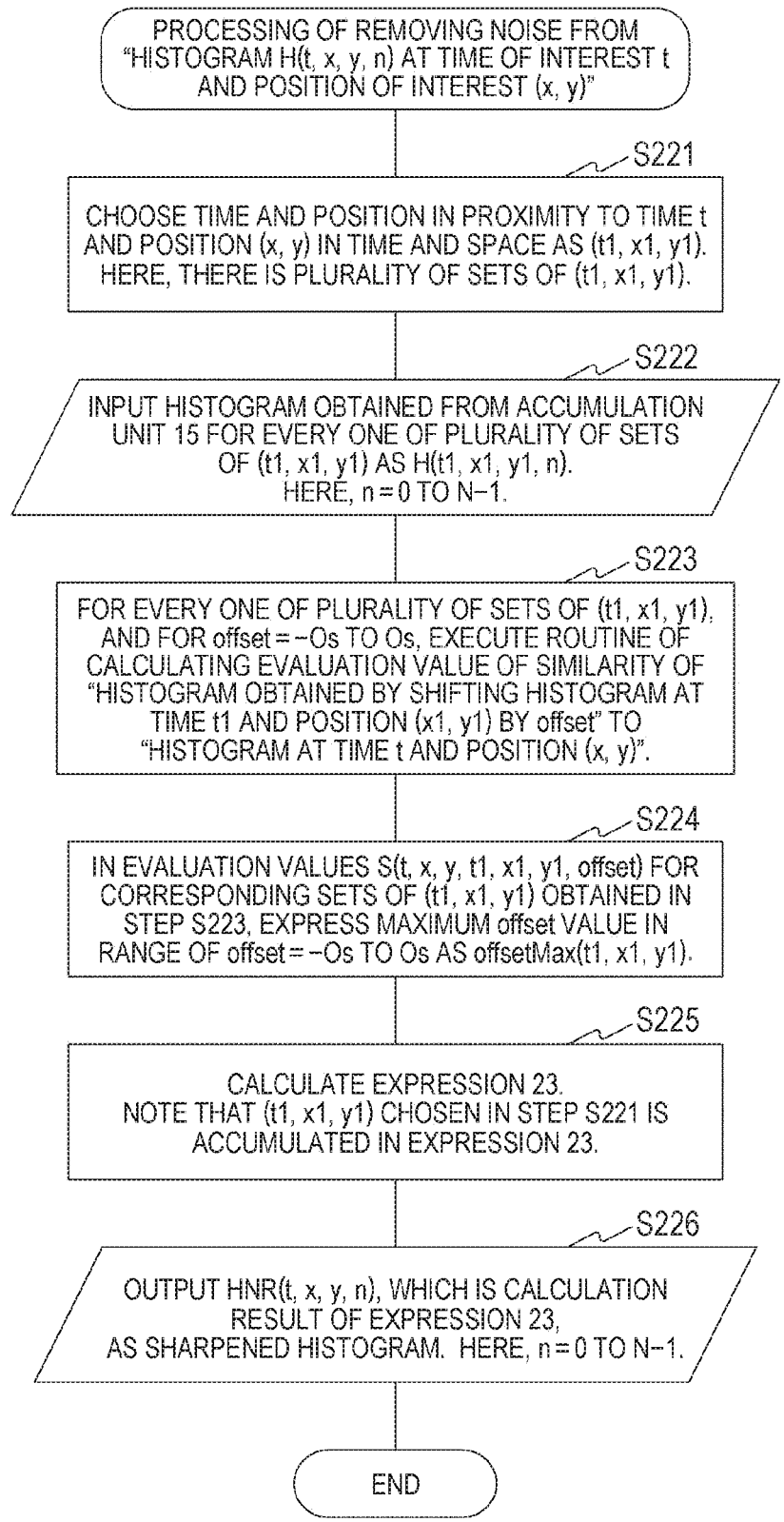
FIG. 20 is a flowchart illustrating an example of processing of removing noise from a histogram according to a first working example of the second embodiment of the present technology.

FIG. 20 is a flowchart illustrating an example of processing of removing noise from a histogram according to the first working example of the second embodiment of the present technology. This processing is performed to remove noise from (i.e., sharpen) a histogram H(t, x, y, n) (here, n=0 to N−1) at time of interest t and position of interest (x, y) obtained from the accumulation unit 15.

First, in step S221, a time and position in proximity to time t and position (x, y) in time and space are chosen and expressed as (t1, x1, y1). Here, there is a plurality of sets of (t1, x1, y1). For example, there are six sets of (t1, x1, y1):
(t+1, x, y),
(t−1, x, y),
(t, x+1, y),
(t, x−1, y),
(t, x, y+1), and
(t, x, y−1). Then, the processing proceeds to step S222.

In step S222, for every one of the plurality of sets of (t1, x1, y1), a histogram obtained from the accumulation unit 15 is input, and is expressed as H(t1, x1, y1, n). Here, n=0 to N−1. For example, the histograms are
H(t+1, x, y, n),
H(t−1, x, y, n),
H(t, x+1, y, n),
H(t, x−1, y, n),
H(t, x, y+1, n), and
H(t, x, y−1, n). Then, the processing proceeds to step S223.

In step S223, for every one of the plurality of sets of (t1, x1, y1), and for "offset=−Os to Os", processing (see FIG. 18 or 19) of calculating an evaluation value of similarity of a "histogram obtained by shifting the histogram at time t1 and position (x1, y1) by offset" to the "histogram at time t and position (x, y)" is executed. Here, Os is a desired constant (constant equal to or greater than 0). For example,
an evaluation value of similarity of a "histogram obtained by shifting a histogram at time t+1 and position (x, y) by −Os" to the "histogram at time t and position (x, y)" is calculated. Then,
an evaluation value of similarity of a "histogram obtained by shifting the histogram at time t+1 and position (x, y) by −Os+1" to the "histogram at time t and position (x, y)" is calculated. Then,
an evaluation value of similarity of a "histogram obtained by shifting the histogram at time t+1 and position (x, y) by −Os+2" to the "histogram at time t and position (x, y)" is calculated. After that, in a similar manner with the value of offset changed,
an evaluation value of similarity of a "histogram obtained by shifting the histogram at time t+1 and position (x, y) by Os" to the "histogram at time t and position (x, y)" is calculated.
Moreover,
an evaluation value of similarity of a "histogram obtained by shifting a histogram at time t−1 and position (x, y) by −Os" to the "histogram at time t and position (x, y)" is calculated. Then,
an evaluation value of similarity of a "histogram obtained by shifting the histogram at time t−1 and position (x, y) by −Os+1" to the "histogram at time t and position (x, y)" is calculated. Then,
an evaluation value of similarity of a "histogram obtained by shifting the histogram at time t−1 and position (x, y) by −Os+2" to the "histogram at time t and position (x, y)" is calculated. After that, in a similar manner with the value of offset changed,
an evaluation value of similarity of a "histogram obtained by shifting the histogram at time t−1 and position (x, y) by Os" to the "histogram at time t and position (x, y)" is calculated.
Moreover,
an evaluation value of similarity of a "histogram obtained by shifting a histogram at time t and position (x+1, y) by −Os" to the "histogram at time t and position (x, y)" is calculated. Then,
an evaluation value of similarity of a "histogram obtained by shifting the histogram at time t and position (x+1, y) by −Os+1" to the "histogram at time t and position (x, y)" is calculated. Then,
an evaluation value of similarity of a "histogram obtained by shifting the histogram at time t and position (x+1, y) by −Os+2" to the "histogram at time t and position (x, y)" is calculated. After that, in a similar manner with the value of offset changed,
an evaluation value of similarity of a "histogram obtained by shifting the histogram at time t and position (x+1, y) by Os" to the "histogram at time t and position (x, y)" is calculated.
The same applies to (t, x−1, y), (t, x, y+1), and (t, x, y−1), which are other sets of (t1, x1, y1).
Then, the processing proceeds to step S224.

In step S224, in evaluation values S(t, x, y, t1, x1, y1, offset) for the corresponding sets of (t1, x1, y1) obtained in step S223, a maximum offset value in the range of "offset=−Os to Os" is expressed as offsetMax(t1, x1, y1). For example,
in S(t, x, y, t+1, x, y, offset), a maximum offset value in the range of "offset=−Os to Os" is expressed as offsetMax(t+1, x, y). Furthermore,
in S(t, x, y, t−1, x, y, offset), a maximum offset value in the range of "offset=−Os to Os" is expressed as offsetMax(t−1, x, y). Furthermore,
in S(t, x, y, t, x+1, y, offset), a maximum offset value in the range of "offset=−Os to Os" is expressed as offsetMax(t, x+1, y).
The same applies to (t, x−1, y), (t, x, y+1), and (t, x, y−1), which are other sets of (t1, x1, y1).
Then, the processing proceeds to step S225.

In step S225, the following Expression 23 is calculated. Note that (t1, x1, y1) chosen in step S221 is accumulated in Expression 23.

[Math. 23]

$$H_{NR(t,x,y,n)} = \frac{1}{W}(H_{(t,x,y,n)} + \sum_{t_1, x_1, y_1} S(t, x, y, t_1, x_1, y_1, \text{offset Max}(t_1, x_1, y_1)) \cdot H_{(t_1, x_1, y_1, n-\text{offsetMax}(t_1, x_1, y_1))}),$$

where $$W \equiv \sum_{t_1, x_1, y_1} S(t, x, y, t_1, x_1, y_1, \text{offset Max}(t_1, x_1, y_1))$$

For example, to H(t, x, y, n),

H(t+1, x, y, n−offsetMax(t+1, x, y)) is added, with weighting of S(t, x, y, t+1, x, y, offsetMax(t+1, x, y)). Moreover, H(t−1, x, y, n−offsetMax(t−1, x, y)) is added, with weighting of S(t, x, y, t−1, x, y, offsetMax(t−1, x, y)). Moreover, H(t, x+1, y, n−offsetMax(t, x+1, y)) is added, with weighting of S (t, x, y, t, x+1, y, offsetMax (t, x+1, y)).

In a similar manner, weighted addition is performed on other sets of (t1, x1, y1), which are (t, x−1, y), (t, x, y+1), and (t, x, y−1). Then, the processing proceeds to step S226.

In step S226, HNR(t, x, y, n), which is a calculation result of Expression 23, is output as a sharpened histogram. Here, n=0 to N−1. Then, the series of processing ends.

Note that Expression 23 is equivalent to Expression 16 in which addition is performed with weighting of 1 for H(t, x, y, n), which is itself, and weighting of S(t, x, y, t1, x, y, offsetMax(t1, x1, y1)) for H(t1, x1, y1, n−offset) at a position in proximity to itself, only for offset of offsetMax (t1, x1, y1).

In this way, a sharpened histogram HNR(t, x, y, n) (here, n=0 to N−1) at time of interest t and position of interest (x, y) is obtained.

Here, supplementary information regarding Expression 23 will be given. The two histograms H(t, x, y, n) and H(t1, x1, y1, n−offsetMax(t1, x1, y1)) are similar. This means that a distance to an object measured by a SPAD at time t and position (x, y) in the SPAD array 13 is shifted, from a distance to an object measured by a SPAD at time t1 and position (x1, y1), by offsetMax(t1, x1, y1) in terms of the speed of light. Consequently, noise can be removed by adding the histograms H(t, x, y, n) and H(t1, x1, y1, n−offsetMax(t1, x1, y1)). At this time, the addition is performed with weighting of S(t, x, y, t1, x1, y1, offsetMax(t1, x1, y1)), which is the degree of similarity.

By executing the processing illustrated in the drawing, a histogram of a SPAD at each time t and each position (x, y) in the SPAD array 13 is sharpened. Note that this processing is performed for all integers equal to or greater than 1 for t, integers between 1 and X inclusive for x, and integers between 1 and Y inclusive for y. Thereafter, the computation unit 16 detects a peak of the sharpened histogram. Then, a value obtained by multiplying a bin corresponding to the peak by c×D/2 is output as a distance from an output terminal 17. Note that since bin n corresponds to a time of approximately n×D, the distance can be calculated by multiplication by c×D/2. Here, the peak detection is performed by a known technique.

Second Working Example

In the above-described first working example, weighting is determined independently of the distance between "time t, position (x, y)" and "time t1, position (x1, y1)" in time and space. This second working example is an example in which weighting is determined depending also on the distance between "time t, position (x, y)" and "time t1, position (x1, y1)" in time and space.

In a case where the distance in time and space is short, it is highly likely that the same object is being measured. Conversely, in a case where the distance in time and space is long, it is highly likely that completely different objects are being measured. Consequently, it is understood that weighting may be determined depending on the distance.

Figure 21:
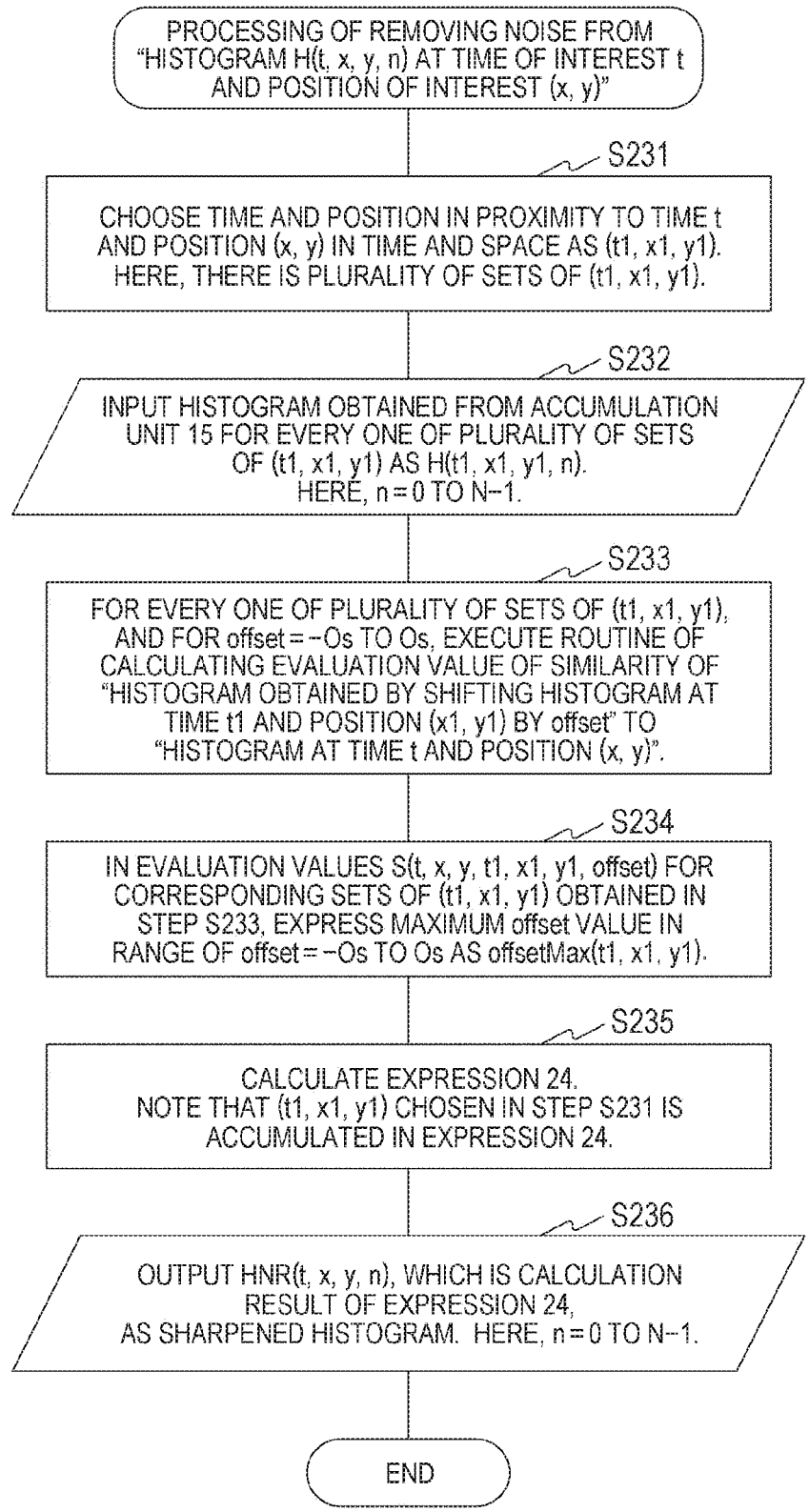
FIG. 21 is a flowchart illustrating an example of processing of removing noise from a histogram according to a second working example of the second embodiment of the present technology.

FIG. 21 is a flowchart illustrating an example of processing of removing noise from a histogram according to the second working example of the second embodiment of the present technology. This processing is performed to remove noise from (i.e., sharpen) a histogram H(t, x, y, n) (here, n=0 to N−1) at time of interest t and position of interest (x, y) obtained from the accumulation unit 15.

First, in step S231, a time and position in proximity to time t and position (x, y) in time and space are chosen and expressed as (t1, x1, y1). Here, there is a plurality of sets of (t1, x1, y1). For example, there are 5×5×5−1=124 sets of (t1, x1, y1), excluding (t1, x1, y1)=(t, x, y), where t−2≤t1≤t+2, x−2≤x1≤x+2, and y−2≤y1≤y+2. Then, the processing proceeds to step S232.

Step S232 is the same processing as step S222 in FIG. 20, and the description will be omitted. Then, the processing proceeds to step S233.

Step S233 is the same processing as step S223 in FIG. 20, and the description will be omitted. Then, the processing proceeds to step S234.

Step S234 is the same processing as step S24 in FIG. 20, and the description will be omitted. Then, the processing proceeds to step S235.

In step S235, the following Expression 24 is calculated. Note that (t1, x1, y1) chosen in step S231 is accumulated in Expression 24.

[Math. 24]

$$H_{NR(t,x,y,n)} = \frac{1}{W}\left\{H_{(t,x,y,n)} + \sum_{t_1, x_1, y_1} \frac{S\left(\begin{array}{c}t, x, y, t_1, x_1, y_1,\\ \text{offset Max}(t_1, x_1, y_1)\end{array}\right)}{\sqrt{(t_1 - t)^2 + (x_1 - x)^2 + (y_1 - y)^2}} \cdot H_{(t_1, x_1, y_1, n-\text{offsetMax}(t_1, x_1, y_1))}\right\},$$

where $$W \equiv 1 + \sum_{t_1, x_1, y_1} \frac{S\left(\begin{array}{c}t, x, y, t_1, x_1, y_1,\\ \text{offset Max}(t_1, x_1, y_1)\end{array}\right)}{\sqrt{(t_1 - t)^2 + (x_1 - x)^2 + (y_1 - y)^2}}$$

Then, the processing proceeds to step S236.

In step S236, HNR(t, x, y, n), which is a calculation result of Expression 24, is output as a sharpened histogram. Here, n=0 to N−1. Then, the series of processing ends.

Note that Expression 23 is equivalent to Expression 16 in which addition is performed with weighting of 1 for H(t, x, y, n), which is itself, and weighting of S(t, x, y, t1, x, y, offsetMax(t1, x1, y1))/(distance between "time t, position (x, y)" and "time t1, position (x1, y1)") for H(t1, x1, y1, n–offset) at a position in proximity to itself, only for offset of offsetMax(t1, x1, y1).

Furthermore, in Expression 23, weighting for H(t1, x1, y1, n–offsetMax(t1, x1, y1)) is S(t, x, y, t1, x, y, offsetMax (t1, x1, y1))/(distance between "time t, position (x, y)" and "time t1, position (x1, y1)"), and the value of this weighting may exceed 1. On the other hand, weighting for H(t, x, y, n), which is itself, is 1. It is not desirable that weighting for data other than itself is heavier than itself. Consequently, in a case where weighting for a term exceeds 1, the weighting may be forcibly set to 1.

In this way, a sharpened histogram HNR(t, x, y, n) (here, n=0 to N–1) at time of interest t and position of interest (x, y) is obtained.

Third Working Example

In the above-described first working example, weighting is determined on the basis of similarity between one SPAD of interest and each SPAD in proximity thereto. This third working example is an example in which weighting is determined on the basis of similarity between a group of a plurality of SPADs centered on a SPAD of interest and a group of SPADs in proximity thereto. Determining the similarity by comparing histograms between a SPAD and a SPAD may result in an erroneous determination. However, a determination of the similarity becomes further reliable by comparing histograms between a plurality of SPADs and a plurality of SPADs.

Figure 22:
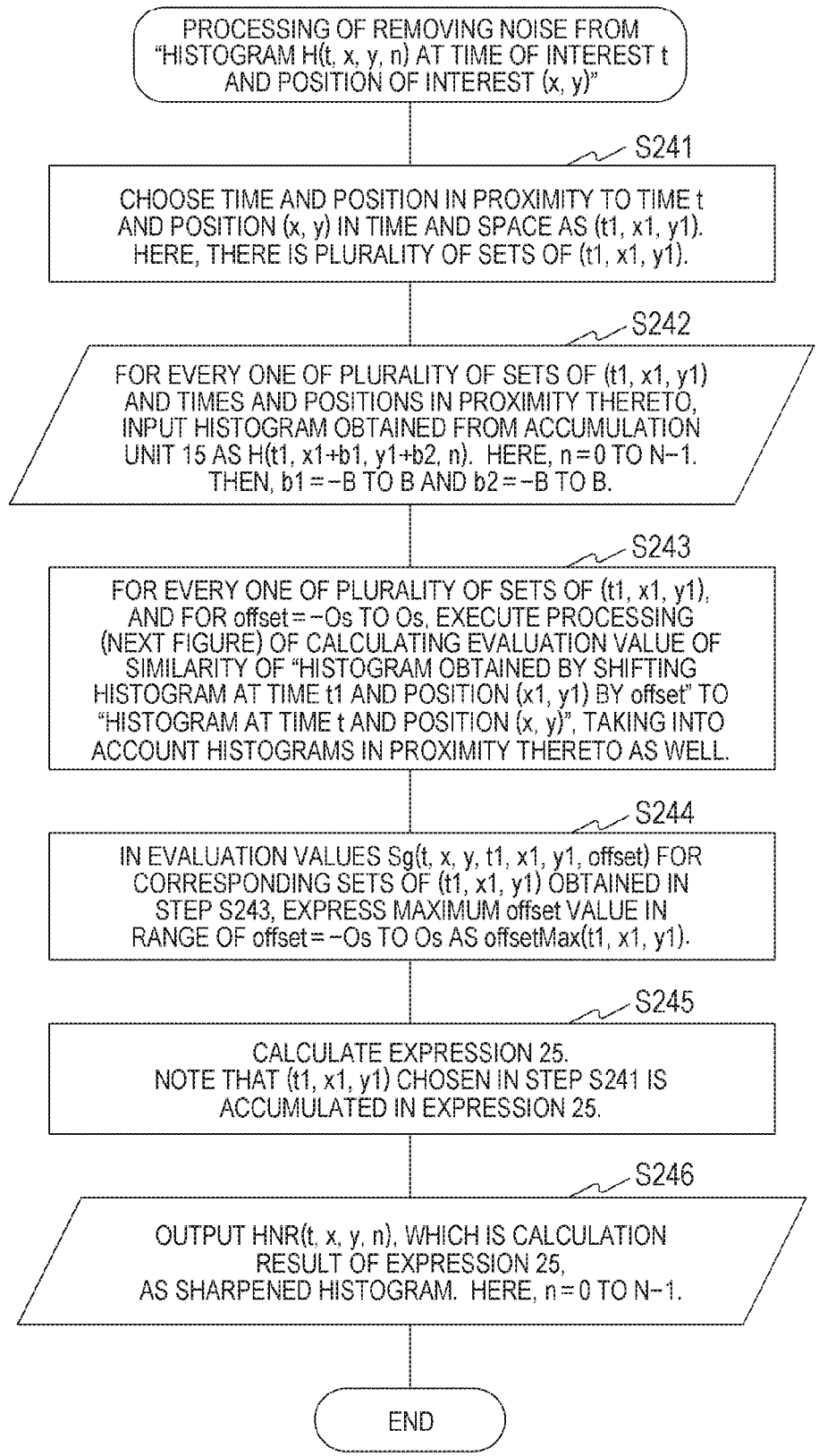
FIG. 22 is a flowchart illustrating an example of processing of removing noise from a histogram according to a third working example of the second embodiment of the present technology.

FIG. 22 is a flowchart illustrating an example of processing of removing noise from a histogram according to the third working example of the second embodiment of the present technology. This processing is performed to remove noise from (i.e., sharpen) a histogram H(t, x, y, n) (here, n=0 to N–1) at time of interest t and position of interest (x, y) obtained from the accumulation unit 15.

First, in step S241, a time and position in proximity to time t and position (x, y) in time and space are chosen and expressed as (t1, x1, y1). Here, there is a plurality of sets of (t1, x1, y1). Then, the processing proceeds to step S242.

In step S242, for every one of the plurality of sets of (t1, x1, y1) and times and positions in proximity thereto, a histogram obtained from the accumulation unit 15 is input, and is expressed as H(t1, x1+b1, y1+b2, n). Here, n=0 to N–1. Then, b1=–B to B and b2=–B to B. Note that B is a desired constant. Then, the processing proceeds to step S243.

In step S243, for every one of the plurality of sets of (t1, x1, y1), and for "offset=–Os to Os", processing of calculating an evaluation value of similarity of a "histogram obtained by shifting the histogram at time t1 and position (x1, y1) by offset" to the "histogram at time t and position (x, y)" is executed, taking into account histograms in proximity thereto as well. This processing will be described with reference to the next figure. Here, Os is a desired constant (constant equal to or greater than 0). Then, the processing proceeds to step S244.

In step S244, in evaluation values Sg(t, x, y, t1, x1, y1, offset) for the corresponding sets of (t1, x1, y1) obtained in step S243, a maximum offset value in the range of "offset=–Os to Os" is expressed as offsetMax(t1, x1, y1). Then, the processing proceeds to step S245.

In step S245, the following Expression 25 is calculated. Note that (t1, x1, y1) chosen in step S241 is accumulated in Expression 25.

[Math. 25]

$$H_{NR(t,x,y,n)} = \frac{1}{W}(H_{(t,x,y,n)} + \sum_{t_1,x_1,y_1} S_g(t, x, y, t_1, x_1, y_1 \text{offsetMax}(t_1, x_1, y_1)) \cdot H_{(t_1,x_1,y_1,n-\text{offsetMax}(t_1,x_1,y_1))}),$$

where $$W \equiv 1 + \sum_{t_1,x_1,y_1} S_g(t, x, y, t_1, x_1, y_1 \text{offsetMax}(t_1, x_1, y_1))$$

Expression 25

Then, the processing proceeds to step S246.

In step S246, HNR(t, x, y, n), which is a calculation result of Expression 25, is output as a sharpened histogram. Here, n=0 to N–1. Then, the series of processing ends.

Note that Expression 25 is equivalent to Expression 16 in which addition is performed with weighting of 1 for H(t, x, y, n), which is itself, and weighting of Sg(t, x, y, t1, x, y, offsetMax(t1, x1, y1)) for H(t1, x1, y1, n–offset) at a position in proximity to itself, only for offset of offsetMax (t1, x1, y1).

Figure 23:
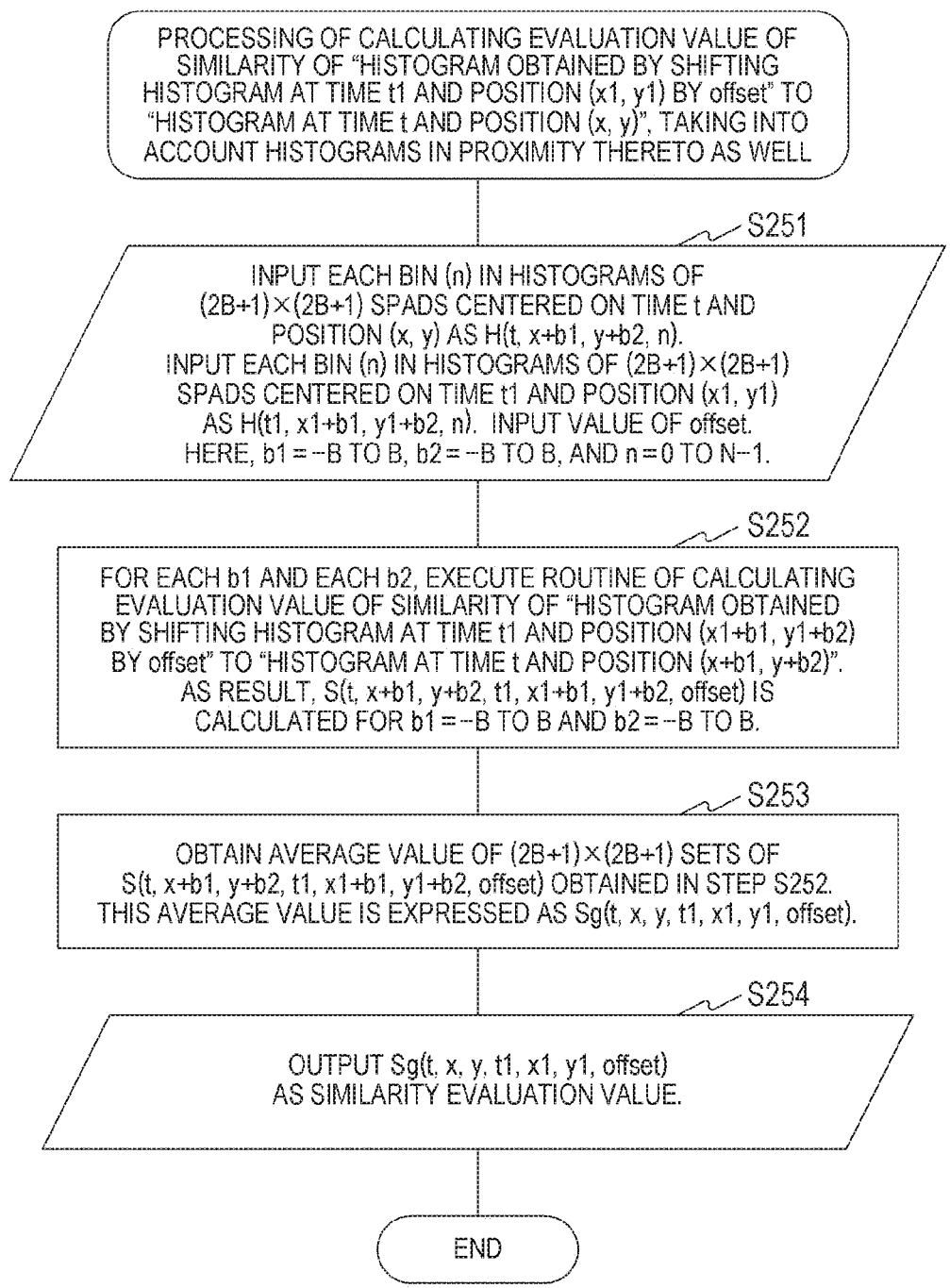
FIG. 23 is a flowchart illustrating an example of a processing procedure for calculating an evaluation value of similarity between histograms according to the third working example of the second embodiment of the present technology.

FIG. 23 is a flowchart illustrating an example of a processing procedure for processing (step S243) of calculating an evaluation value of similarity between histograms according to the third working example of the second embodiment of the present technology. This processing calculates an evaluation value of similarity of a "histogram obtained by shifting the histogram at time t1 and position (x1, y1) by offset" to the "histogram at time t and position (x, y)", taking into account histograms in proximity thereto as well. Note that the higher the similarity, the larger the evaluation value. Note that the difference from the evaluation value calculation method described with reference to FIG. 18 or 19 is that histograms in proximity thereto are also taken into account.

First, in step S251, each bin (n) in histograms of (2B+1)×(2B+1) SPADs centered on time t and position (x, y) is input, and expressed as H(t, x+b1, y+b2, n). Each bin (n) in histograms of (2B+1)×(2B+1) SPADs centered on time t1 and position (x1, y1) is input, and expressed as H(t1, x1+b1, y1+b2, n). A value of offset is input. Here, b1=–B to B, b2=–B to B, and n=0 to N to 1. Note that B is a desired constant. For example, in a case where B=2, H(t, x–2, y–2, n),
H(t, x–2, y–1, n),
H(t, x–2, y, n),
H(t, x–2, y+1, n),
H(t, x–2, y+2, n),
H(t, x–1, y–2, n),
H(t, x–1, y–1, n),
H(t, x–1, y, n),
H(t, x–1, y+1, n),
H(t, x–1, y+2, n),
and the like are input. Then,
H(t1, x1–2, y1–2, n),
H(t1, x1–2, y1–1, n), H(t1, x1−2, y1, n),
H(t1, x1−2, y1+1, n),
H(t1, x1−2, y1+2, n),
H(t1, x1−1, y1−2, n),
H(t1, x1−1, y1−1, n),
H(t1, x1−1, y1, n),
H(t1, x1−1, y1+1, n),
H(t1, x1−1, y1+2, n),
and the like are input. Then, the processing proceeds to step S252.

In step S252, for each b1 and each b2, processing (see FIG. 18 or 19) of calculating an evaluation value of similarity of a "histogram obtained by shifting a histogram at time t1 and position (x1+b1, y1+b2) by offset" to a "histogram at time t and position (x+b1, y+b2)" is executed. That is, the processing illustrated in FIG. 18 or 19 is performed (2B+1)×(2B+1) times. As a result, S(t, x+b1, y+b2, t1, x1+b1, y1+b2, offset) is calculated for b1=−B to B and b2=−B to B. Then, the processing proceeds to step S253.

In step S253, an average value of (2B+1)×(2B+1) sets of S(t, x+b1, y+b2, t1, x1+b1, y1+b2, offset) obtained in step S252 is obtained. This average value is expressed as Sg(t, x, y, t1, x1, y1, offset). Then, the processing proceeds to step S254.

In step S254, Sg(t, x, y, t1, x1, y1, offset) is output as a similarity evaluation value. Then, this series of processing ends.

Histograms of (2B+1)×(2B+1) SPADs centered on a certain position are used to evaluate the similarity, and this makes the evaluation more reliable than the evaluation in FIG. 18 or 19.

In this way, a sharpened histogram HNR(t, x, y, n) (here, n=0 to N−1) at time of interest t and position of interest (x, y) is obtained.

Fourth Working Example

It is preferable to add histograms of SPADs that are in proximity to a SPAD at time of interest t and position of interest (x, y) and are measuring the same object that the SPAD at time of interest t and position of interest (x, y) is measuring. On the other hand, it is not preferable to include SPADs that are measuring another object in the addition.

A description will be given using specific examples. For example, a case is assumed in which a distance measurement result of a SPAD on the left of a position of interest is 10 meters, a distance measurement result of a SPAD at the position of interest is 10.1 meters, and a distance measurement result of a SPAD on the right of the position of interest is 10.2 meters. In this case, it is reasonable to consider that the same object has been obliquely disposed with respect to the distance measuring device 10. Thus, it is expected that noise can be removed by adding a histogram obtained from the SPAD on the left and a histogram obtained from the SPAD on the right to a histogram obtained from the SPAD at the position of interest.

On the other hand, a case is assumed in which a distance measurement result of a SPAD on the left of a position of interest is 10 meters, a distance measurement result of a SPAD at the position of interest is 10.1 meters, and a distance measurement result of a SPAD on the right of the position of interest is 12 meters. In this case, it is highly likely that the SPAD on the left of the position of interest, the SPAD at the position of interest, and the SPAD on the right of the position of interest are not measuring the same object. This is because the distance measurement results of the three consecutive SPADs show irregular values. Thus, it is considered that noise cannot be removed by adding a histogram obtained from the SPAD on the left and a histogram obtained from the SPAD on the right to a histogram obtained from the SPAD at the position of interest. The same applies to positions immediately above and immediately below the position of interest.

For example, a case is assumed in which a distance measurement result of a SPAD at a time immediately preceding a time of interest is 10 meters, a distance measurement result of a SPAD at the time of interest is 10.1 meters, and a distance measurement result of a SPAD at a time immediately following the time of interest is 10.2 meters. In this case, it is reasonable to consider that the same object has been moving away from the distance measuring device 10 over time. Thus, it is expected that noise can be removed by adding a histogram obtained from the immediately preceding SPAD and a histogram obtained from the immediately following SPAD to a histogram obtained from the SPAD at the time of interest.

On the other hand, a case is assumed in which a distance measurement result of a SPAD at a time immediately preceding a time of interest is 10 meters, a distance measurement result of a SPAD at the time of interest is 10.1 meters, and a distance measurement result of a SPAD at a time immediately following the time of interest is 12 meters. In this case, it is highly likely that the immediately preceding SPAD, the SPAD at the time of interest, and the immediately following SPAD are not measuring the same object. This is because the distance measurement results of the three consecutive SPADs show irregular values. Thus, it is considered that noise cannot be removed by adding a histogram obtained from the immediately preceding SPAD and a histogram obtained from the immediately following SPAD to a histogram obtained from the SPAD at the time of interest.

In this way, it is determined whether the same object is being measured in a left-right direction (i.e., a horizontal direction in the SPAD array 13), in an up-down direction (i.e., a vertical direction of the SPAD array 13), and in a time direction, on the basis of similarity between pixels on the left and right of a pixel of interest, between pixels above and below the pixel of interest, and between pixels preceding and following a time of interest, respectively. Then, in a case where it is determined that the same object is being measured, addition of histograms is performed in that direction.

Figure 24:
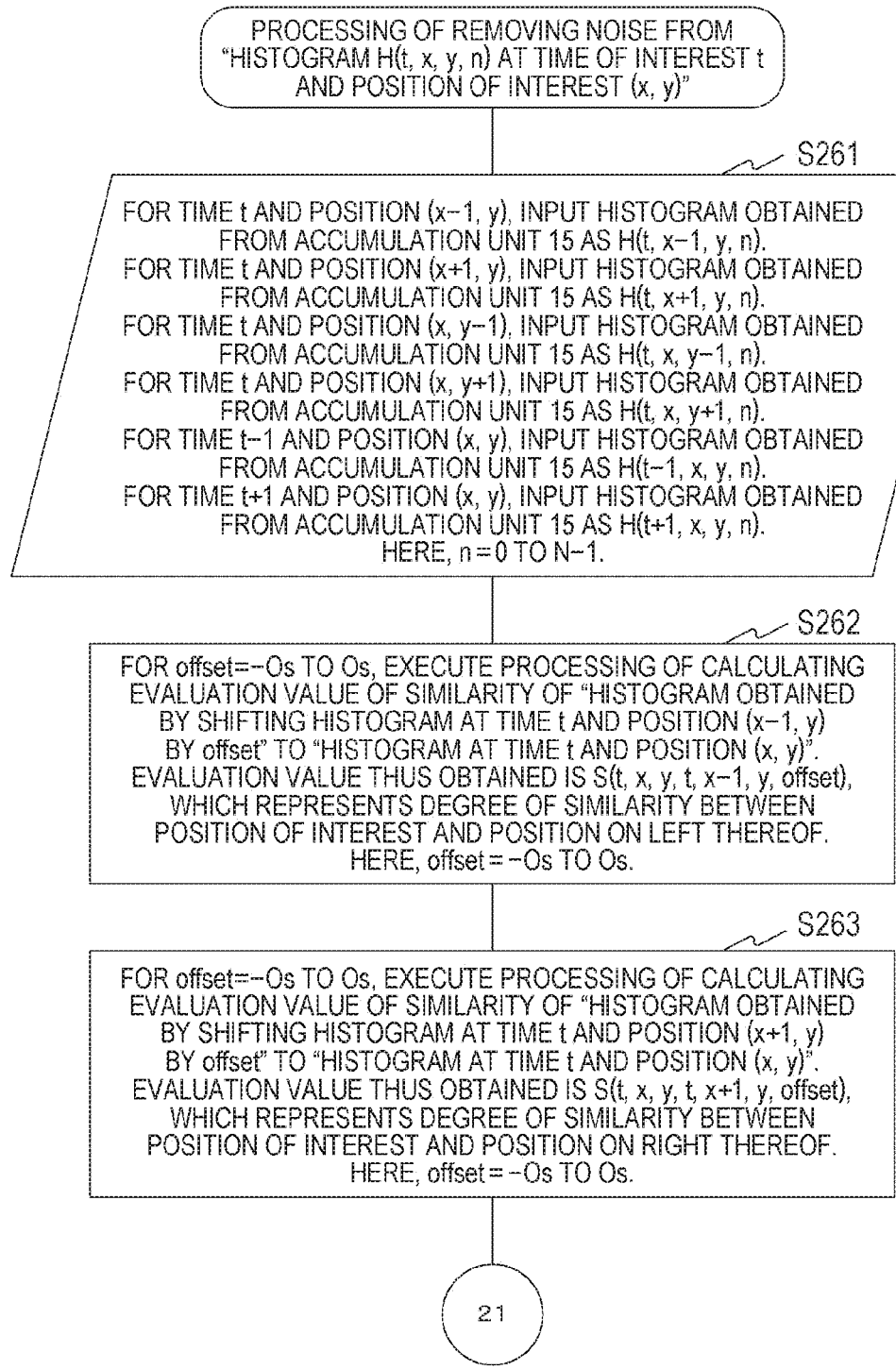
FIG. 24 is a flowchart illustrating an example of processing of removing noise from a histogram according to a fourth working example of the second embodiment of the present technology.
Figure 25:
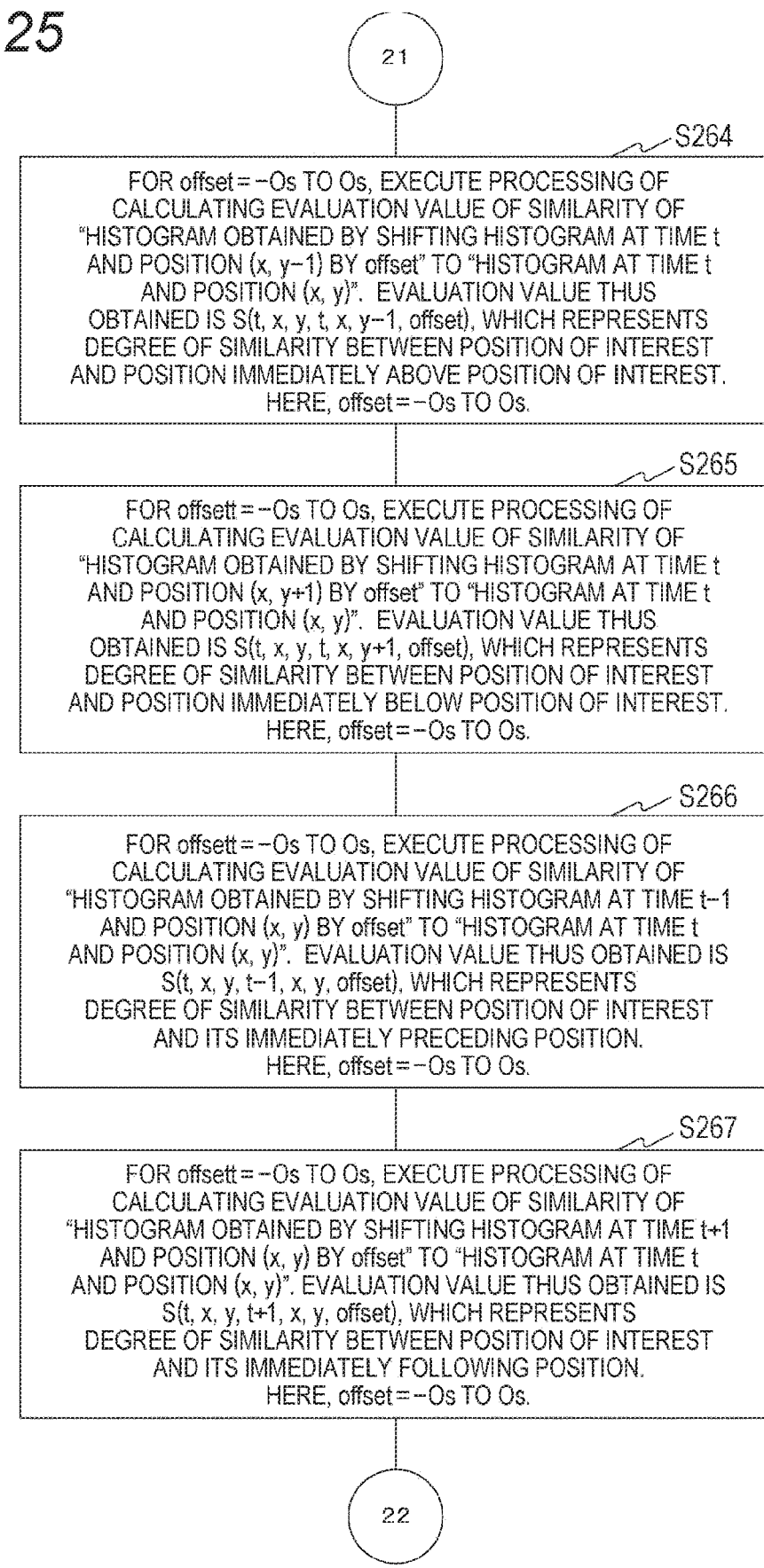
FIG. 25 is a flowchart illustrating the example of processing of removing noise from a histogram according to the fourth working example of the second embodiment of the present technology.
Figure 26:
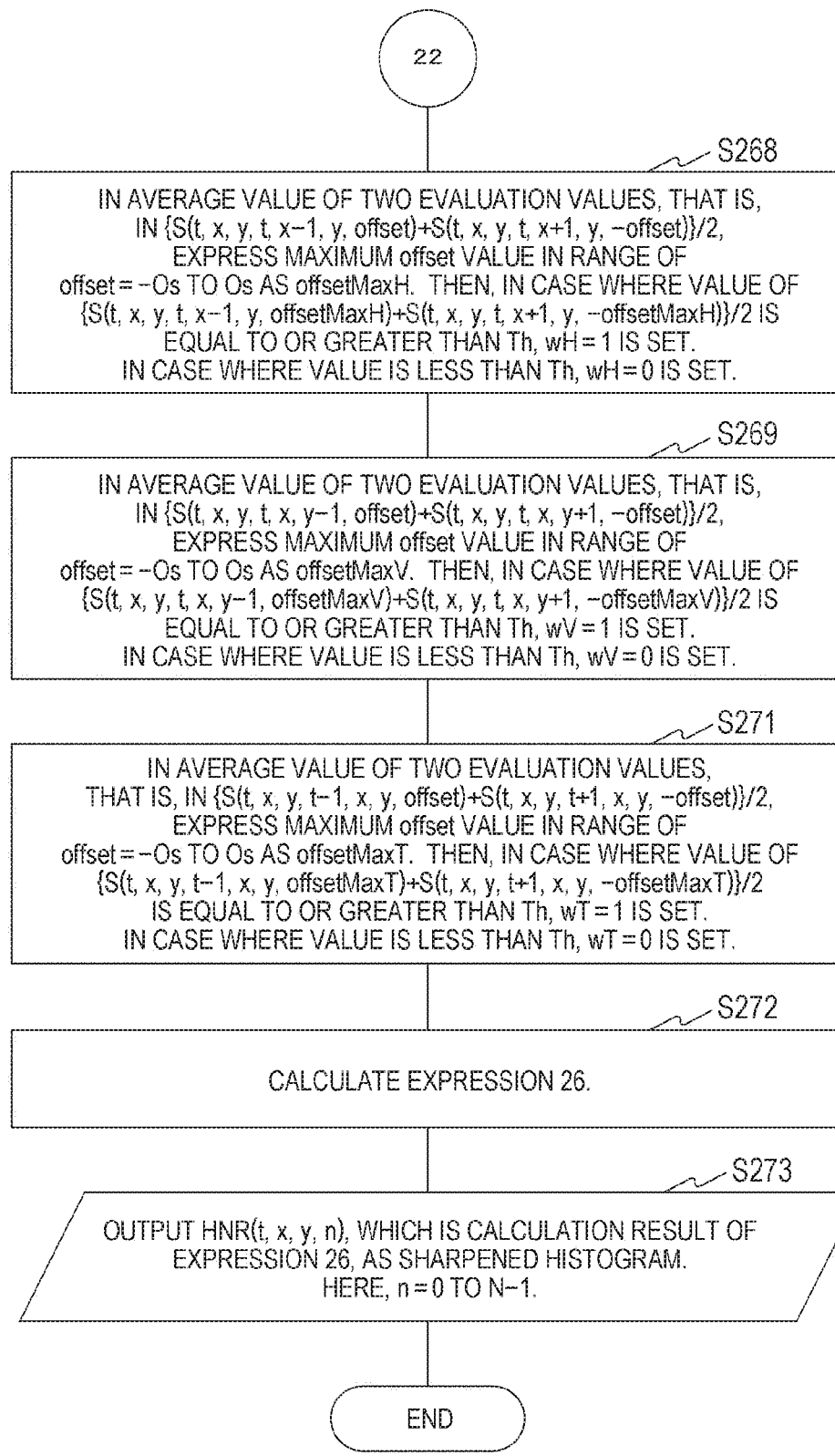
FIG. 26 is a flowchart illustrating the example of processing of removing noise from a histogram according to the fourth working example of the second embodiment of the present technology.

FIGS. 24 to 26 are flowcharts illustrating an example of processing of removing noise from a histogram according to a fourth working example of the second embodiment of the present technology. This processing is performed to remove noise from (i.e., sharpen) a histogram H(t, x, y, n) (here, n=0 to N−1) at time of interest t and position of interest (x, y) obtained from the accumulation unit 15.

First, in step S261,
for time t and position (x−1, y), a histogram obtained from the accumulation unit 15 is input, and is expressed as H(t, x−1, y, n).

For time t and position (x+1, y), a histogram obtained from the accumulation unit 15 is input, and is expressed as H(t, x+1, y, n).

For time t and position (x, y−1), a histogram obtained from the accumulation unit 15 is input, and is expressed as H(t, x, y−1, n).

For time t and position (x, y+1), a histogram obtained from the accumulation unit 15 is input, and is expressed as H(t, x, y+1, n).

For time t−1 and position (x, y), a histogram obtained from the accumulation unit 15 is input, and is expressed as H(t−1, x, y, n).

For time t+1 and position (x, y), a histogram obtained from the accumulation unit 15 is input, and is expressed as H(t+1, x, y, n).

Here, n=0 to N−1. Then, the processing proceeds to step S262.

In step S262, for "offset=−Os to Os", processing (see FIG. 18 or 19) of calculating an evaluation value of similarity of a "histogram obtained by shifting a histogram at time t and position (x−1, y) by offset" to the "histogram at time t and position (x, y)" is executed. The evaluation value thus obtained is S(t, x, y, t, x−1, y, offset), which represents the degree of similarity between the position of interest and a position on the left thereof. Here, "offset=−Os to Os". Then, the processing proceeds to step S263.

In step S263, for "offset=−Os to Os", processing (see FIG. 18 or 19) of calculating an evaluation value of similarity of a "histogram obtained by shifting the histogram at time t and position (x+1, y) by offset" to the "histogram at time t and position (x, y)" is executed. The evaluation value thus obtained is S(t, x, y, t, x+1, y, offset), which represents the degree of similarity between the position of interest and a position on the right thereof. Here, "offset=−Os to Os". Then, the processing proceeds to step S264.

In step S264, for "offset=−Os to Os", processing (see FIG. 18 or 19) of calculating an evaluation value of similarity of a "histogram obtained by shifting a histogram at time t and position (x, y−1) by offset" to the "histogram at time t and position (x, y)" is executed. The evaluation value thus obtained is S(t, x, y, t, x, y−1, offset), which represents the degree of similarity between the position of interest and a position immediately above the position of interest. Here, "offset=−Os to Os". Then, the processing proceeds to step S265.

In step S265, for "offset=−Os to Os", processing (see FIG. 18 or 19) of calculating an evaluation value of similarity of a "histogram obtained by shifting a histogram at time t and position (x, y+1) by offset" to the "histogram at time t and position (x, y)" is executed. The evaluation value thus obtained is S(t, x, y, t, x, y+1, offset), which represents the degree of similarity between the position of interest and a position immediately below the position of interest. Here, "offset=−Os to Os". Then, the processing proceeds to step S266.

In step S266, for "offset=−Os to Os", processing (see FIG. 18 or 19) of calculating an evaluation value of similarity of a "histogram obtained by shifting the histogram at time t−1 and position (x, y) by offset" to the "histogram at time t and position (x, y)" is executed. The evaluation value thus obtained is S(t, x, y, t−1, x, y, offset), which represents the degree of similarity between the position of interest and its immediately preceding position. Here, "offset=−Os to Os". Then, the processing proceeds to step S267.

In step S267, for "offset=−Os to Os", processing (see FIG. 18 or 19) of calculating an evaluation value of similarity of a "histogram obtained by shifting the histogram at time t+1 and position (x, y) by offset" to the "histogram at time t and position (x, y)" is executed. The evaluation value thus obtained is S(t, x, y, t+1, x, y, offset), which represents the degree of similarity between the position of interest and its immediately following position. Here, "offset=−Os to Os". Then, the processing proceeds to step S268.

In step S268, in an average value of two evaluation values, that is, in {S(t, x, y, t, x−1, y, offset)+S(t, x, y, t, x+1, y, −offset)}/2, a maximum offset value in the range of "offset=−Os to Os" is expressed as offsetMaxH. Then, in a case where the value of {S(t, x, y, t, x−1, y, offsetMaxH)+S(t, x, y, t, x+1, y, −offsetMaxH)}/2 is equal to or greater than Th, wH=1 is set. In a case where the value is less than Th, wH=0 is set. Here, Th is a desired threshold. Then, the processing proceeds to step S269.

In step S269, in an average value of two evaluation values, that is, in {S(t, x, y, t, x, y−1, offset)+S(t, x, y, t, x, y+1, −offset)}/2, a maximum offset value in the range of "offset=−Os to Os" is expressed as offsetMaxV. Then, in a case where the value of {S(t, x, y, t, x, y−1, offsetMaxV)+S(t, x, y, t, x, y+1, −offsetMaxV)}/2 is equal to or greater than Th, wV=1 is set. In a case where the value is less than Th, wV=0 is set. Then, the processing proceeds to step S271.

In step S271, in an average value of two evaluation values, that is, in {S(t, x, y, t−1, x, y, offset)+S(t, x, y, t+1, x, y, −offset)}/2, a maximum offset value in the range of "offset=−Os to Os" is expressed as offsetMaxT. Then, in a case where the value of {S (t, x, y, t−1, x, y, offsetMaxT)+S(t, x, y, t+1, x, y, −offsetMaxT)}/2 is equal to or greater than Th, wT=1 is set. In a case where the value is less than Th, wT=0 is set. Then, the processing proceeds to step S272.

In step S272, the following Expression 26 is calculated.

[Math. 26]

$$H_{NR(t,x,y,n)} = \frac{1}{W}(H_{(t,x,y,n)} + w_H \cdot H_{(t,x-1,y,n-\textit{offsetMaxH})} + w_H \cdot H_{(t,x+1,y,n+\textit{offsetMaxH})} + w_V \cdot H_{(t,x,y-1,n-\textit{offsetMaxV})} + w_V \cdot H_{(t,x,y+1,n+\textit{offsetMaxV})} + w_T \cdot H_{(t-1,x,y,n-\textit{offsetMaxT})} + w_T \cdot H_{(t+1,x,y,n+\textit{offsetMaxT})}),$$

where $$W \equiv 1 + 2 \cdot w_H + 2 \cdot w_V + 2 \cdot w_T$$

Expression 26

Then, the processing proceeds to step S273.

In step S273, HNR(t, x, y, n), which is a calculation result of Expression 26, is output as a sharpened histogram. Here, n=0 to N−1. Then, the series of processing ends.

Note that Expression 26 is equivalent to Expression 16 in which addition is performed with weighting of 1 for H(t, x, y, n), which is itself, and weighting of wH, wV, or wT for a position in proximity thereto, only for offset of offsetMaxH, offsetMaxV, or offsetMaxT.

In this way, a sharpened histogram HNR(t, x, y, n) (here, n=0 to N−1) at time of interest t and position of interest (x, y) is obtained.

Here, supplementary information regarding Expression 26 will be given. Assuming that a distance measured by the SPAD on the left of the position of interest, a distance measured by the SPAD at the position of interest, and a distance measured by the SPAD on the right of the position of interest are spaced at regular intervals, intervals between bins corresponding to the regular intervals is offsetMaxH. The correctness of that assumption is {S(t, x, y, t, x−1, y, offsetMaxH)+S(t, x, y, t, x+1, y, −offsetMaxH)}/2. Thus, in a case where {S(t, x, y, t, x−1, y, offsetMaxH)+S(t, x, y, t, x+1, y, −offsetMaxH)}/2 is equal to or greater than a certain threshold (Th), it is preferable to add the histogram. Consequently, in a case where the value of {S(t, x, y, t, x−1, y, offsetMaxH)+S(t, x, y, t, x+1, y, −offsetMaxH)}/2 is equal to or greater than Th, addition is performed with weighting wH set to 1. In a case where the value is less than Th, 0 is set as wH, so virtually no addition is performed. The same object is obliquely disposed with respect to the distance measuring device 10, and the amount of shift of the bins in accordance with the degree of obliquity is offsetMaxH, so the histogram on the left is added with a shift of offsetMaxH. The histogram on the right is added with a shift of −offsetMaxH. The same applies to the up-down direction and the time direction.

Fifth Working Example

In a fifth working example, a camera 100 attached to the distance measuring device 10 is used. Here, the camera 100 is a device capable of capturing an image, and captures the image in the same direction as a direction of measurement by the SPAD array 13 of the distance measuring device 10.

In a case where a pixel value E(t, x, y) in an image by the camera 100 corresponding to an object being measured by a SPAD at time of interest t and position of interest (x, y) in the SPAD array 13 and a pixel value E(t1, x1, y1) in an image by the camera 100 corresponding to an object being measured by a SPAD at time t1 and position (x1, y1) in the SPAD array 13 are similar, it is considered that the same object is being imaged in the camera 100. That is, in this case, the objects being measured by the two SPADs are considered to be the same. On the other hand, in a case where the two pixel values are different, it is considered that different objects are being measured.

Consequently, in a case where the pixel values E(t, x, y) and E(t1, x1, y1) in the images by the camera 100 are substantially the same, weighting with which a histogram at time t1 and position (x1, y1) is added to a histogram at time of interest t and position of interest (x, y) is increased. On the other hand, in a case where the two values are not substantially the same, weighting to be added is reduced, or no addition is performed. In this way, an appropriate histogram can be added, and noise can be removed from the histogram. Note that here, (t1, x1, y1) is in proximity to (t, x, y) in time and space.

Note that E(t, x, y) is a luminance value when the object being measured by the SPAD at time t and position (x, y) is imaged by the camera 100 at time t. E(t1, x1, 1y) is a luminance value when the object being measured by the SPAD at time t1 and position (x1, y1) is imaged by the camera 100 at time t1.

Furthermore, in the fifth working example, as in the above-described second working example, weighting is determined depending also on the distance between "position (x, y)" and "position (x1, y1)".

FIG. 27 is a flowchart illustrating an example of processing of removing noise from a histogram according to the fifth working example of the second embodiment of the present technology. This processing is performed to remove noise from (i.e., sharpen) a histogram H(t, x, y, n) (here, n=0 to N−1) at time of interest t and position of interest (x, y) obtained from the accumulation unit 15.

First, processing in step S281 is performed. This is the same as step S221 in FIG. 20, and the description will be omitted. Then, the processing proceeds to step S282.

Step S282 is the same processing as step S222 in FIG. 20, and the description will be omitted. Then, the processing proceeds to step S283.

Step S283 is the same processing as step S223 in FIG. 20, and the description will be omitted. Then, the processing proceeds to step S284.

Step S284 is the same processing as step S224 in FIG. 20, and the description will be omitted. Then, the processing proceeds to step S285.

In step S285, a pixel value in an image by the camera 100 corresponding to an "object being measured by a SPAD at (t, x, y)" is input. This pixel value is expressed as E(t, x, y). A pixel value in an image by the camera 100 corresponding to an "object being measured by a SPAD at every one of the plurality of sets of (t1, x1, y1)" is input. This pixel value is expressed as E(t1, x1, y1). Then, the processing proceeds to step S286.

In step S286, the following Expression 27 is calculated. Note that (t1, x1, y1) chosen in step S281 is accumulated in Expression 27.

[Math. 27]

$$H_{NR(t,x,y,n)} = \frac{1}{W} \Biggl( H_{(t,x,y,n)} + \sum_{t_1,x_1,y_1} \frac{H_{(t_1,x_1,y_1,n-\text{offsetMax}(t_1,x_1,y_1))}}{\sqrt{(t_1-t)^2 + (x_1-x)^2 + (y_1-y)^2} \cdot |E_{(t,x,y)} - E_{(t_1,x_1,y_1)}|} \Biggr)$$

Expression 27 where $$W = 1 + \sum_{t_1,x_1,y_1} \frac{1}{\sqrt{(t_1-t)^2 + (x_1-x)^2 + (y_1-y)^2} \cdot |E_{(t,x,y)} - E_{(t_1,x_1,y_1)}|}$$

Then, the processing proceeds to step S287.

In step S287, HNR(t, x, y, n), which is a calculation result of Expression 27, is output as a sharpened histogram. Here, n=0 to N−1. Then, the series of processing ends.

Note that Expression 27 is equivalent to Expression 16 in which addition is performed with weighting of 1 for H(t, x, y, n), which is itself, and weighting of 1/(distance between "time t, position (x, y)" and "time t1, position (x1, y1)")/(absolute value of a difference between E(t, x, y) and E(t1, x1, y1)) for H(t1, x1, y1, n−offset) at a position in proximity to itself, only for offset of offsetMax(t1, x1, y1).

Furthermore, when E(t, x, y)=E(t1, x1, y1), division by zero occurs in Expression 27. Consequently, in practice, in order to avoid division by zero, when E(t, x, y)=E(t1, x1, y1), a minute value is used instead of the "absolute value of a difference between E(t, x, y) and E(t1, x1, y1)". Since this is a known common practice and is irrelevant to the gist of this embodiment, this is not mentioned in Expression 27.

Furthermore, in the above-described second working example, in a case where weighting for a term in Expression 24 exceeds 1, the weighting may be forcibly set to 1. The same can be said for Expression 27. That is, in Expression 27, in a case where weighting for a term exceeds 1, the weighting may be forcibly set to 1.

In this way, a sharpened histogram HNR(t, x, y, n) (here, n=0 to N−1) at time of interest t and position of interest (x, y) is obtained.

Sixth Working Example

In the above-described fifth working example, weighting is determined on the basis of similarity between one pixel value corresponding to one SPAD of interest and one pixel value corresponding to each SPAD in proximity to the SPAD of interest (difference between two values). This sixth working example is an example in which weighting is determined on the basis of similarity between pixel values of a group of a plurality of pixels centered on a "pixel corresponding to a SPAD of interest" and pixel values of a group of pixels centered on a "pixel corresponding to a SPAD in proximity thereto". Determining the similarity by performing a comparison between a pixel and a pixel may result in an erroneous determination. However, a determination of the similarity becomes further reliable by performing a comparison between a plurality of pixels and a plurality of pixels.

Figure 28:
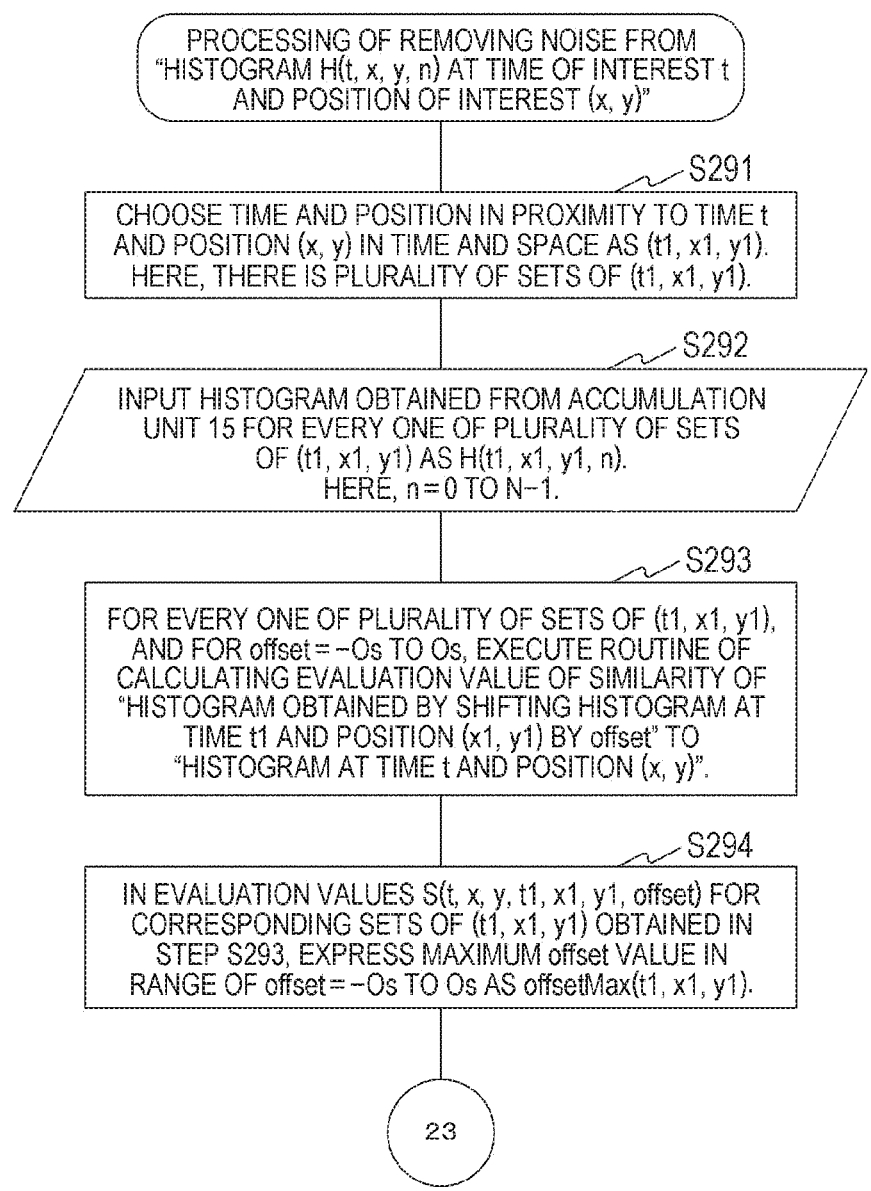
FIG. 28 is a flowchart illustrating an example of processing of removing noise from a histogram according to a sixth working example of the second embodiment of the present technology.
Figure 29:
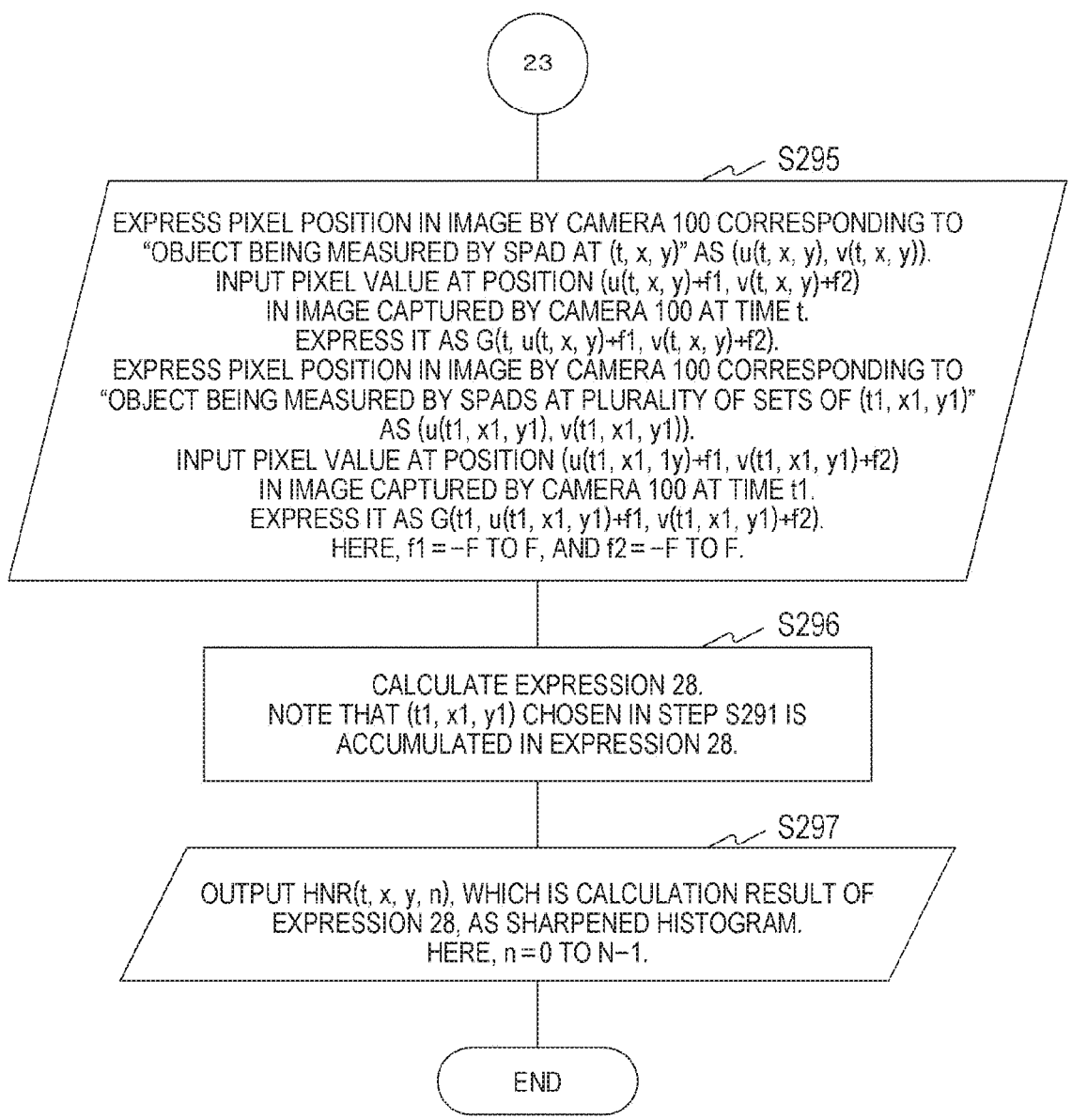
FIG. 29 is a flowchart illustrating the example of processing of removing noise from a histogram according to the sixth working example of the second embodiment of the present technology.

FIGS. 28 and 29 are flowcharts illustrating an example of processing of removing noise from a histogram according to the sixth working example of the second embodiment of the present technology. This processing is performed to remove noise from (i.e., sharpen) a histogram H(t, x, y, n) (here, n=0 to N−1) at time of interest t and position of interest (x, y) obtained from the accumulation unit 15.

First, processing in step S291 is performed. This is the same as step S281 in FIG. 27, and the description will be omitted. Then, the processing proceeds to step S292.

Step S292 is the same processing as step S282 in FIG. 27, and the description will be omitted. Then, the processing proceeds to step S293.

Step S293 is the same processing as step S283 in FIG. 27, and the description will be omitted. Then, the processing proceeds to step S294.

Step S294 is the same processing as step S284 in FIG. 27, and the description will be omitted. Then, the processing proceeds to step S295.

In step S295, a pixel position in an image by the camera 100 corresponding to an "object being measured by a SPAD at (t, x, y)" is expressed as (u(t, x, y), v(t, x, y)). A pixel value at position (u(t, x, y)+f1, v(t, x, y)+f2) in an image captured by the camera 100 at time t is input. This pixel value is expressed as G(t, u(t, x, y)+f1, v(t, x, y)+f2). A pixel position in an image by the camera 100 corresponding to an "object being measured by SPADs at a plurality of sets of (t1, x1, y1)" is expressed as (u(t1, x1, y1), v(t1, x1, y1)). A pixel value at position (u(t1, x1, 1y)+f1, v(t1, x1, y1)+f2) in an image captured by the camera 100 at time t1 is input. The value is expressed as G(t1, u(t1, x1, y1)+f1, v(t1, x1, y1)+f2). Here, f1=−F to F, and f2=−F to F. Note that F is a desired constant, for example, F=2. Then, the processing proceeds to step S296.

In step S296, the following Expression 28 is calculated. Note that (t1, x1, y1) chosen in step S291 is accumulated in Expression 28.

[Math. 28]

$$H_{NR(t,x,y,n)} = \frac{1}{W} \left( H_{(t,x,y,n)} + \sum_{t_1,x_1,y_1} \frac{H_{(t_1,x_1,y_1,n-\text{offsetMax}(t_1,x_1,y_1))}}{w_{inv}(t, x, y, t_1, x_1, y_1)} \right)$$

where $$w_{inv}(t, x, y, t_1, x_1, y_1) \equiv \sqrt{(t_1-t)^2 + (x_1-x)^2 + (y_1-y)^2} \cdot$$

Expression 28

-continued $$\left\{ \sum_{\substack{f_1=-FtoF \\ f_2=-FtoF}} |G_{(t,u(t,x,y)+f_1, v(t,x,y)+f_2)} - G_{(t_1,u(t_1,x_1,y_1)+f_1, v(t_1,x_1,y_1)+f_2)}| \right\}$$

where $$w_{inv}(t, x, y, t_1, x_1, y_1) \equiv \sqrt{(t_1-t)^2 + (x_1-x)^2 + (y_1-y)^2} \cdot$$

$$\left\{ \sum_{\substack{f_1=-FtoF \\ f_2=-FtoF}} |G_{(t,u(t,x,y)+f_1, v(t,x,y)+f_2)} - \right.$$

Then, the processing proceeds to step S297.

In step S297, HNR(t, x, y, n), which is a calculation result of Expression 28, is output as a sharpened histogram. Here, n=0 to N−1. Then, the series of processing ends.

Note that Expression 28 is equivalent to Expression 16 in which addition is performed with weighting of 1 for H(t, x, y, n), which is itself, and weighting of 1/(distance between "time t, position (x, y)" and "time t1, position (x1, y1)")/(sum of absolute values of differences among values of a group of (2F+1)×(2F+1) pixels centered on a corresponding pixel position in an image by the camera 100) for H(t1, x1, y1, n−offset) at a position in proximity to itself, only for offset of offsetMax(t1, x1, y1).

Furthermore, in Expression 28, division by zero may occur as in Expression 27. As a method of avoiding division by zero, the known common practice may be used as described in the description of Expression 27. Since this is irrelevant to the gist of this embodiment, this is not mentioned in Expression 28.

Furthermore, in the above-described second working example, in a case where weighting for a term in Expression 24 exceeds 1, the weighting may be forcibly set to 1. The same can be said for Expression 28. That is, in Expression 28, in a case where weighting for a term exceeds 1, the weighting may be forcibly set to 1.

In this way, a sharpened histogram HNR(t, x, y, n) (here, n=0 to N−1) at time of interest t and position of interest (x, y) is obtained.

Here, supplementary information regarding Expression 27 will be given. The object being measured by the SPAD at time t and position (x, y) is projected onto position (u(t, x, y), v(t, x, y)) in an image captured by the camera 100 at time t. The pixel value (luminance value) at the time of the projection is G(t, u(t, x, y), v(t, x, y)). G(t, u(t, x, y)+f1, v(t, x, y)+f2), where f1=−F to F and f2=−F to F, expresses pixel values (luminance values) of a group of pixels including (2F+1)×(2F+1) pixels centered on position (u(t, x, y), v(t, x, y)) in an image. The same applies to G(t1, u(t1, x1, y1)+f1, v(t1, x1, y1)+f2).

Thus, in Expression 27, in a case where the values of the group of pixels including (2F+1)×(2F+1) pixels are similar (the differences are small), the object being measured by the SPAD at time of interest t and position of interest (x, y) and the object being measured by the SPAD at time t1 and position (x1, y1) are considered to be the same, so the histogram at time t1 and position (x1, y1) is added with increased weighting. In a case where the values of the group of pixels are not similar (the differences are large), weighting is reduced.

Here, features of the above-described fifth and sixth working examples viewed from another aspect will be described. In these working examples, histograms are added together by using an image from the camera 100 attached to the distance measuring device 10 as a clue. This uses the fact that there is a correlation between each SPAD in the SPAD array 13 and the corresponding pixel value of an image from the camera 100. In this way, the correlation is used to sharpen a histogram.

As described with reference to FIG. 17 and Expression 16, the second embodiment is characterized in the "appropriate addition" using the "information". FIG. 30 illustrates a summary of specific examples of the "information" and the "appropriate addition" according to the first to sixth working examples. That is, FIG. 30 is a diagram illustrating a summary of specific examples of the "information" and the "appropriate addition" according to the first to sixth working examples of the second embodiment of the present technology. According to these, a histogram can be sharpened by adaptively performing an optimum addition of histograms in accordance with similarity between the histograms, shortness of a distance, similarity between sets of image data corresponding to the histograms, and the like.

Note that while sharpening of a histogram has been described in the second embodiment, an occurrence rate can also be sharpened in a similar manner. That is, an occurrence rate $(A(t, x, y, n)=H(t, x, y, n)/M(t, x, y, n-1))$ may be used instead of a histogram $H(t, x, y, n)$, which is an observation value shown on the right-hand side of Expression 16, 23, 24, 25, 26, 27, or 28. Then, the right-hand side of Expression 16, 23, 24, 25, 26, 27, or 28 is calculated. In this case, the value obtained by the calculation is not a sharpened histogram $HNR(t, x, y, n)$ but a sharpened occurrence rate $(\lambda NR(t, x, y, n))$.

[Effect]

In this way, according to the second embodiment, an appropriate addition can be performed, in accordance with the information, on a histogram obtained from each SPAD. Since an appropriate addition is performed, the addition performed is always optimum regardless of the positional relationship of the object projected onto each pixel. Furthermore, since only one type of appropriate addition is performed instead of performing a plurality of additions, an enormous amount of calculation is not required.

[Gist]

The gist of the second embodiment is as follows.

(1) A method of sharpening a histogram, the method including:
an input step of inputting a first histogram at each position in time and space;
an addition step of adaptively adding the first histograms in accordance with first information to obtain a second histogram; and an output step of outputting the second histogram.

(2) The method of sharpening a histogram according to (1), in which
the first information is similarity between the first histograms, and
the addition in the addition step is performed with increased weighting for the first histograms at a position in the time and space in a direction in which the similarity is high.

(3) The method of sharpening a histogram according to (1), in which
the first information is similarity between the first histograms, and
the addition in the addition step is performed with weighting in accordance with the degree of the similarity.

(4) The method of sharpening a histogram according to (2) or (3), in which
the "similarity between the first histograms", which is the first information, is similarity among a plurality of sets in the time and space.

(5) The method of sharpening a histogram according to (1), in which
the first information is a distance in the time and space, and
the addition in the addition step is performed with weighting in accordance with shortness of the distance.

(6) The method of sharpening a histogram according to (1), in which
the first information is similarity between sets of image data corresponding to the first histograms, and
the addition in the addition step is performed with weighting in accordance with the degree of the similarity.

(7) The method of sharpening a histogram according to (6), in which
the "similarity between sets of image data corresponding to the first histograms", which is the first information, is similarity among a plurality of sets of the image data.

4. Third Embodiment

[Outline]

In this third embodiment, before detection of a peak in a histogram by a computation unit 16, each bin in the histogram is sharpened by performing a weighted addition for each bin of the histogram or an occurrence rate obtained from the histogram. This decreases false detections. That is, a method of sharpening a histogram by performing an appropriate addition of histograms with a small amount of computation and without assuming a positional relationship in advance is provided.

Figure 31:
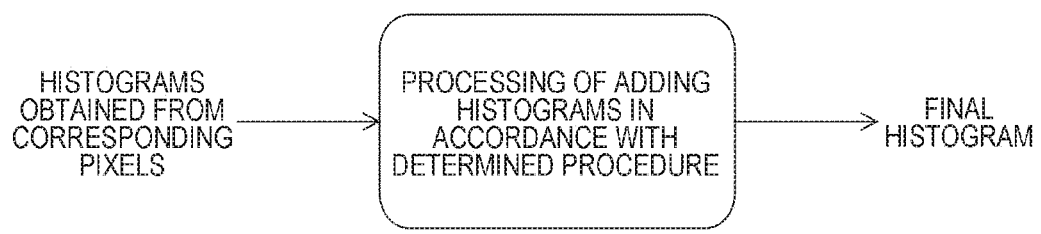
FIG. 31 is a diagram for describing a first technique in a conventional art.

FIG. 31 is a diagram for describing a first technique in a conventional art. In this conventional art, histograms obtained from the corresponding pixels are added by a circuit for "processing of adding histograms in accordance with a determined procedure" to obtain a final histogram. In a case of an object in a positional relationship that does not match the determined procedure, there is a problem in that histograms are blurred.

Figure 32:
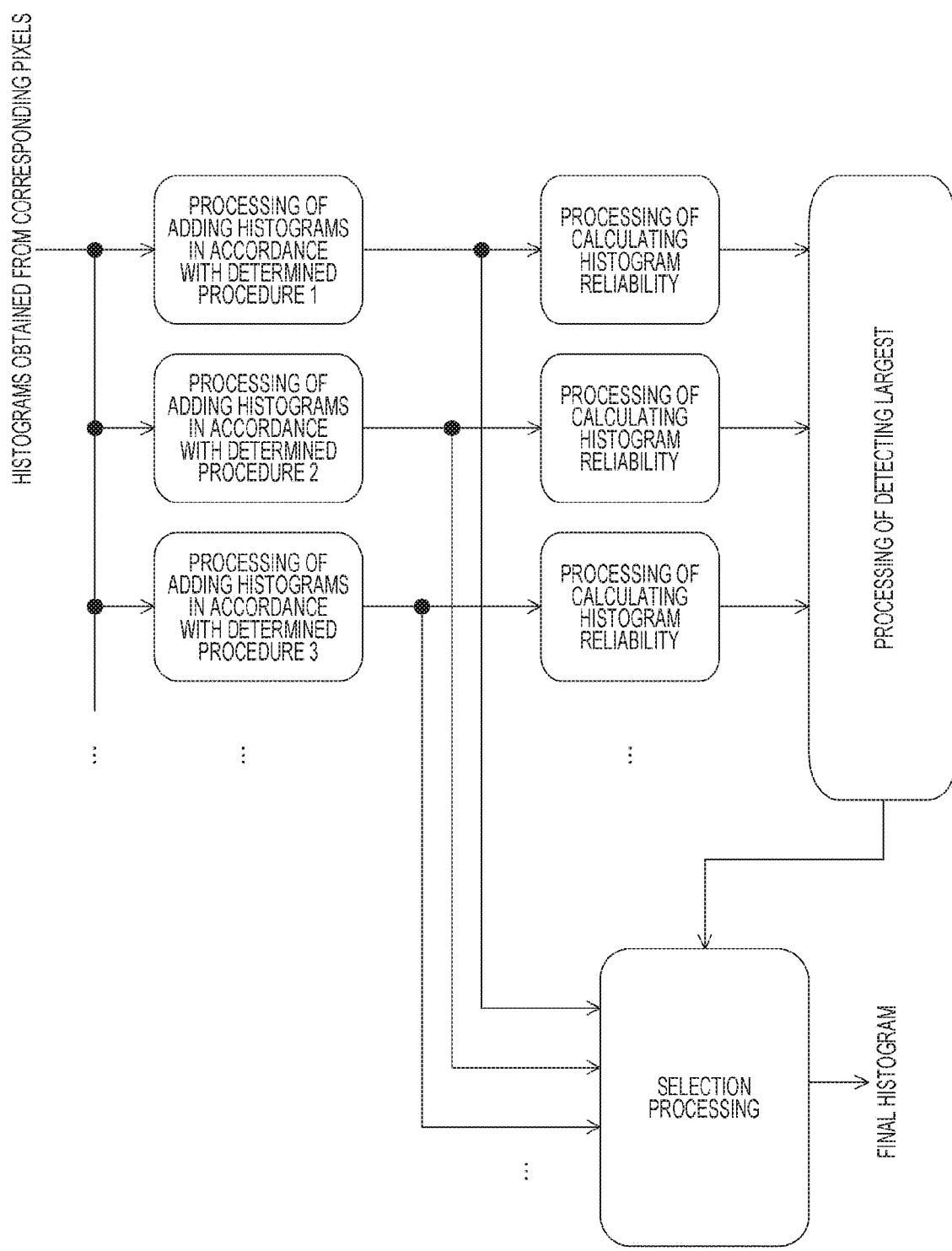
FIG. 32 is a diagram for describing a second technique in the conventional art.

FIG. 32 is a diagram for describing a second technique in the conventional art. In this conventional art, since there is a plurality of determined procedures, addition of corresponding histograms is performed in each procedure. These additions are performed on histograms obtained from the corresponding pixels by a circuit for "processing of adding histograms in accordance with determined procedures 1, 2, 3, . . . ". Then, a reliability is calculated for each histogram. The calculation of these reliabilities is performed by a circuit for "processing of calculating a histogram reliability". The largest among the plurality of calculated reliabilities is detected by a circuit for "processing of detecting the largest". Then, the corresponding "added up histogram" is selected by a circuit for "selection processing" to obtain a final histogram. There is a plurality of types of "processing of adding histograms in accordance with a determined procedure", and this causes a problem in that the amount of calculation becomes enormous.

Figure 33:
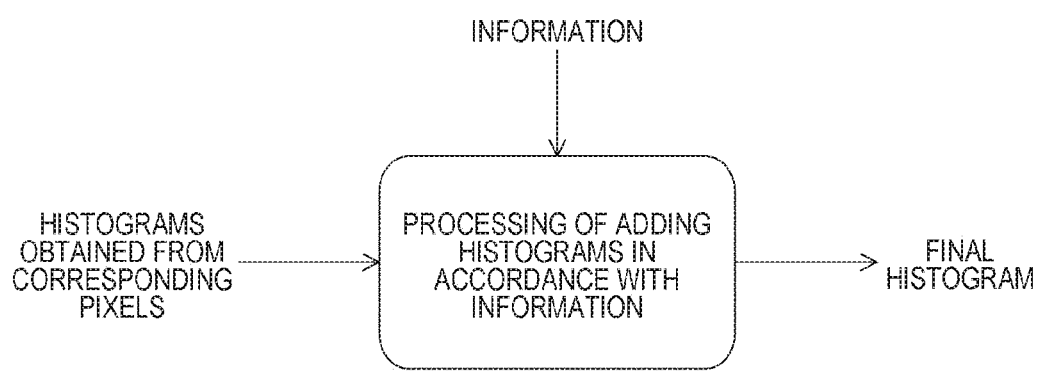
FIG. 33 is a conceptual diagram illustrating an example of processing according to a third embodiment of the present technology.

FIG. 33 is a conceptual diagram illustrating an example of processing according to the third embodiment of the present technology. In the third embodiment, an appropriate addition is performed on histograms obtained from the corresponding pixels by a circuit for "processing of adding histograms in accordance with information". That is, since an appropriate addition is performed, the addition performed is always optimum regardless of the positional relationship of the object projected onto each pixel. Therefore, the processing can be applied also to an object in a positional relationship that does not match the determined procedure, and this prevents blurred histograms. Furthermore, in the third embodiment, only one type of appropriate addition is performed instead of performing a plurality of additions. Therefore, no enormous amount of calculation is required.

What is important here is "information" in the drawing, and a method of performing an "appropriate addition" using this "information". These "information" and "appropriate addition" will become apparent from the details described later. Note that the "appropriate addition" corresponds to Expression 33 described later.

[Sharpening of Occurrence Rate]

In the third embodiment, an observed histogram H(t, x, y, n) is converted into an occurrence rate, and the occurrence rate is sharpened. That is, an occurrence rate $\lambda$(t, x, y, n) represented by the following Expression 29 is sharpened.

[Math. 29]

$$\lambda_{(t,x,y,n)} \equiv \frac{H_{(t,x,y,n)}}{M_{(t,x,y,n-1)}} \qquad \text{Expression 29}$$

Here, M(t, x, y, n-1) is defined by the following Expression 30.

[Math. 30]

$$M_{(t,x,y,n-1)} \equiv M - \sum_{j=0}^{n-1} H_{(t,x,y,j)} \qquad \text{Expression 30}$$

Note that it is necessary to pay attention that a value of the occurrence rate $\lambda$(t, x, y, n) in Expression 29 has an error with a standard deviation $\sigma$(t, x, y, n) represented by the following Expression 31.

[Math. 31]

$$\sigma_{(t,x,y,n)} = \sqrt{\frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right)} \qquad \text{Expression 31}$$

In summary, sharpening is performed on the value $\lambda$(t, x, y, n) obtained from Expression 29 from the observation value H(t, x, y, n). Note that $\lambda$(t, x, y, n) includes an error with the standard deviation $\sigma$(t, x, y, n) represented by Expression 31.

A result of sharpening the occurrence rate $\lambda$(t, x, y, n) is expressed as $\lambda$NR(t, x, y, n). HNR(t, x, y, n) may be obtained from the following Expression 32 as necessary. HNR(t, x, y, n) is a sharpened histogram.

[Math. 32]

$$H_{NR(t,x,y,n)} = M_{NR(t,x,y,n-1)} \cdot \lambda_{NR(t,x,y,n)}, \qquad \text{Expression 32}$$

where $$M_{NR(t,x,y,n-1)} \equiv M - \sum_{j=0}^{n-1} H_{(t,x,y,j)}$$

Note that it is apparent from the above-described Expressions 29 and 30 that Expression 32 holds.

The sharpening of an occurrence rate according to the third embodiment can be succinctly expressed as the following Expression 33.

[Math. 33]

$$\lambda_{NR(t,x,y,n)} = \frac{1}{W} \sum_{t_1,x_1,y_1,n_1} w_{(t,x,y,n,t_1,x_1,y_1,n_1)} \cdot \lambda_{(t_1,x_1,y_1,n_1)}, \qquad \text{Expression 33}$$

where $$W \equiv \sum_{t_1,x_1,y_1,n_1} w_{(t,x,y,n,t_1,x_1,y_1,n_1)}$$

Here, an observation value at time t, position (x, y), and n-th bin (i.e., a value obtained from an accumulation unit 15) is expressed as H(t, x, y, n). Then, the occurrence rate $\lambda$(t, x, y, n) is defined in the above-described Expression 29. For a sharpened occurrence rate obtained by applying the third embodiment, a value at time t, position (x, y), and n-th bin is expressed as $\lambda$NR(t, x, y, n). The computation unit 16 calculates Expressions 29 and 33 from the histogram H(t, x, y, n) obtained from the accumulation unit 15 to obtain a sharpened occurrence rate $\lambda$NR(t, x, y, n). Moreover, as necessary, the sharpened histogram HNR(t, x, y, n) is obtained from the above-described Expression 32. Using the sharpened occurrence rate $\lambda$NR(t, x, y, n) or the sharpened histogram HNR(t, x, y, n) to search for a peak value enables detection of a peak without false detections, and distance measurement without false detections.

Here, supplementary information will be given. In distance measurements using SPADs, detection of a peak in a histogram is generally performed. However, as can be seen from the above description, the same result as the detection of a peak in a histogram can be obtained also by detecting a peak in an occurrence rate, which has a proportional relationship with a histogram as shown in Expression 29. Thus, the sharpened occurrence rate $\lambda$NR(t, x, y, n) may be used to perform a search with respect to bin n for peak detection. Here, n=0 to N-1. In this case, it is not necessary to obtain a sharpened histogram HNR(t, x, y, n) from the sharpened occurrence rate $\lambda$NR(t, x, y, n) using Expression 32 (already described).

Moreover, the description of the above-described Expression 33 will be continued. The above-described Expression 33 performs a weighted average for $\lambda$(t, x, y, n). The weighted average removes noise from the occurrence rate $\lambda$(t, x, y, n), and sharpens the occurrence rate. w(t, x, y, n, t1, x1, y1, n1) is weighting for the corresponding $\lambda$(t1, x1, y1, n1), and W is the total value of w(t, x, y, n, t1, x1, y1, n1) used for normalization.

[Resolution Between Two Distributions]

A probability density function of an occurrence rate at time t, position (x, y), and n-th bin obtained from an observation value indicates a normal distribution with an average of $\lambda$(t, x, y, n) and a standard deviation of $\sigma$(t, x, y, n). A probability density function of an occurrence rate at time t1, position (x1, y1), and n1-th bin obtained from an observation value indicates a normal distribution with an average of $\lambda$(t1, x1, y1, n1) and a standard deviation of $\sigma$(t1, x1, y1, n1).

A resolution (degree of resolution between two peaks) between these two occurrence rates is represented by the following Expression 34.

[Math. 34]

$$R_{(t,x,y,n,t_1,x_1,y_1,n_1)} \equiv \frac{|\lambda_{(t_1,x_1,y_1,n_1)} - \lambda_{(t,x,y,n)}|}{2(\sigma_{(t_1,x_1,y_1,n_1)} + \sigma_{(t,x,y,n)})} \qquad \text{Expression 34}$$

In a case where the resolution is large to a certain degree, it can be said that true occurrence rates of the two are different. Conversely, in a case where the resolution is small to a certain degree, it can be said that true occurrence rates of the two are the same. In a case where the resolution is small, noise can be removed from the occurrence rates by performing addition.

The greater the resolution, the smaller the similarity between the occurrence rates of the two bins. Conversely, the smaller the resolution, the larger the similarity between the occurrence rates of the two bins.

Note that while the resolution is used here as an example of an index for determining whether the occurrence rates of the two bins are the same or different, this embodiment does not limit the determination index to the resolution.

First Working Example

In a first working example, a distance measuring device 10 is used to perform distance measurement for each SPAD in a SPAD array 13. In particular, the features include sharpening of an occurrence rate obtained from a "histogram that is an observation value from the accumulation unit 15" by the above-described Expression 29. The occurrence rate is sharpened by the computation unit 16.

To an occurrence rate $\lambda(t, x, y, n)$ at time of interest t, position of interest (x, y), and bin of interest n, an occurrence rate $\lambda(t1, x1, y1, n1)$ in proximity thereto in time, space, and bin is added with weighting. Therefore, noise is removed from the occurrence rate $\lambda(t, x, y, n)$ for sharpening.

Figure 34:
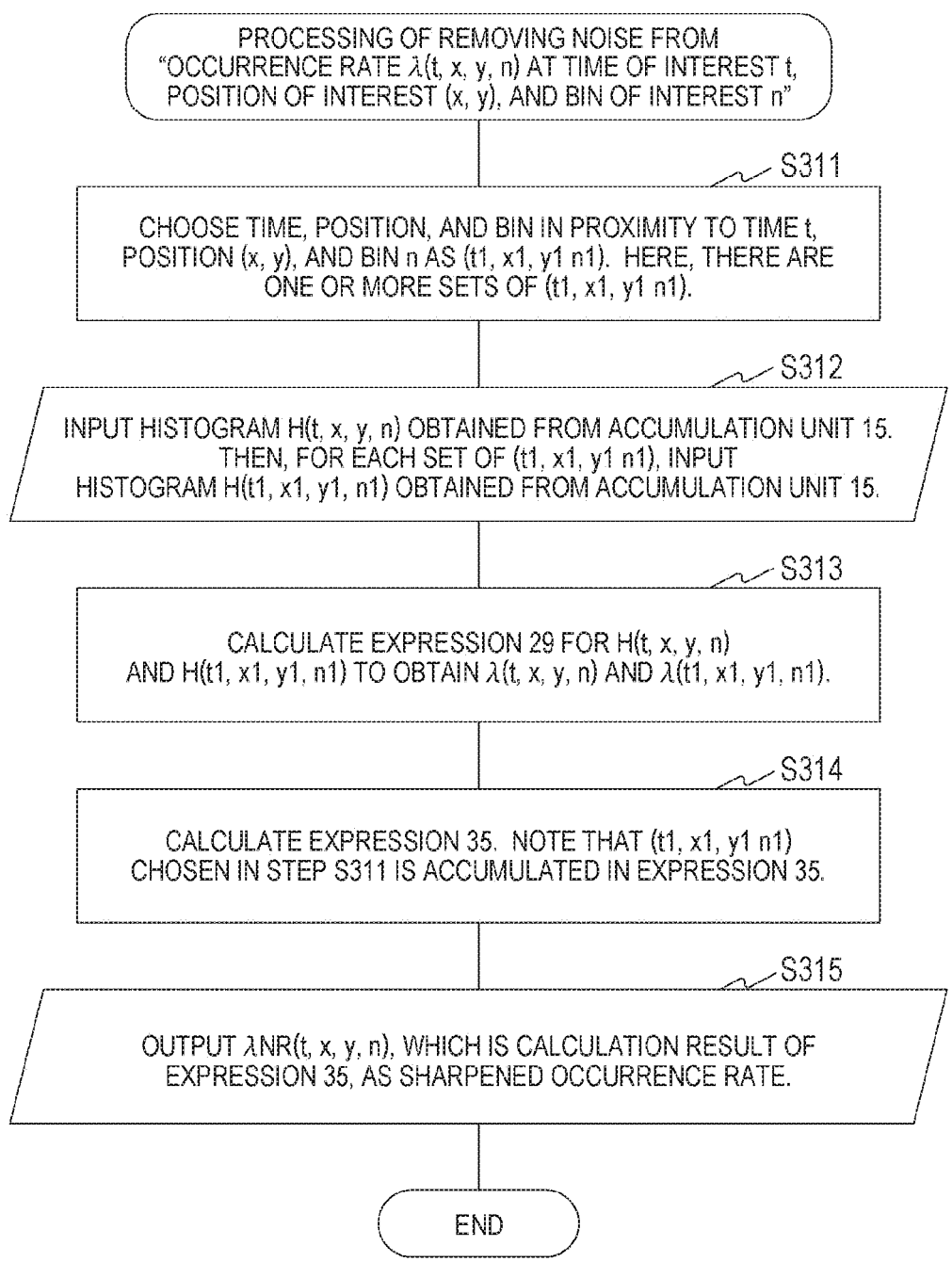
FIG. 34 is a flowchart illustrating an example of a processing procedure for removing noise from an occurrence rate according to a first working example of the third embodiment of the present technology.

FIG. 34 is a flowchart illustrating an example of a processing procedure for removing noise from an occurrence rate according to the first working example of the third embodiment of the present technology. This processing is performed to remove noise from (i.e., sharpen) an occurrence rate $\lambda(t, x, y, n)$ at time of interest t, position of interest (x, y), and bin of interest n.

First, in step S311, a time, space, and bin in proximity to time t, position (x, y), and bin n is chosen, and is expressed as (t1, x1, y1 n1). Here, there is one or more sets of (t1, x1, y1 n1). For example, (t1, x1, y1 n1) includes sets that satisfy t−2≤t1≤t+2, x−2≤x1≤x+2, y−2≤y1≤y+2, and n−2≤n1≤n+2. However, (t1, x1, y1 n1)=(t, x, y n) is excluded. Note that n1 may be all bins, that is, 0 to N−1. Then, the processing proceeds to step S312.

In step S312, a histogram H(t, x, y, n) obtained from the accumulation unit 15 is input. Then, for each set of (t1, x1, y1 n1), a histogram H(t1, x1, y1, n1) obtained from the accumulation unit 15 is input. Then, the processing proceeds to step S313.

In step S313, Expression 29 is calculated for H(t, x, y, n) and H(t1, x1, y1, n1) to obtain $\lambda(t, x, y, n)$ and $\lambda(t1, x1, y1, n1)$. Then, the processing proceeds to step S314.

In step S314, the following Expression 35 is calculated. Note that (t1, x1, y1 n1) chosen in step S311 is accumulated in Expression 35. Then, the processing proceeds to step S315.

[Math. 35]

$$\lambda_{NR(t,x,y,n)} = \frac{1}{W}\left(\lambda_{(t,x,y,n)} + \sum_{t_1,x_1,y_1,n_1} \frac{\lambda_{(t_1,x_1,y_1,n_1)}}{\sqrt{(t_1-t)^2 + (x_1-x)^2 + (y_1-y)^2 + (n_1-n)^2}}\right)$$

Expression 35 where $$W \equiv 1 + \sum_{t_1,x_1,y_1,n_1} \frac{1}{\sqrt{(t_1-t)^2 + (x_1-x)^2 + (y_1-y)^2 + (n_1-n)^2}}$$

In step S315, $\lambda$NR(t, x, y, n), which is a calculation result of Expression 35, is output as a sharpened occurrence rate. Then, the series of processing ends.

Note that Expression 35 is equivalent to Expression 33 in which addition is performed with weighting of 1 for $\lambda(t, x, y, n)$, which is itself, and weighting of "1/(distance between "time t, position (x, y), bin n" and "time t1, position (x1, y1), bin n1")" for $\lambda(t1, x1, y1, n1)$ at a position in proximity thereto.

In this way, a sharpened occurrence rate $\lambda$NR(t, x, y, n) of time of interest t, position of interest (x, y), and bin of interest n is obtained.

Here, supplementary information regarding Expression 35 will be given. In the space of "time t, position (x, y), bin n", occurrence rates in proximity to each other are similar to each other, so noise can be removed by adding them. Expression 35 performs this calculation.

By executing the processing illustrated in the drawing, an occurrence rate at each time t, each position (x, y), and each bin n in the SPAD array 13 is sharpened. Note that the processing illustrated in the drawing is performed for all integers equal to or greater than 1 for t, integers between 1 and X inclusive for x, integers between 1 and Y inclusive for y, and integers between 0 and N−1 inclusive for n. Thereafter, the computation unit 16 detects a peak of the sharpened occurrence rate. Then, a value obtained by multiplying a bin corresponding to the peak by c×D/2 is output as a distance from an output terminal 17. Note that since bin n corresponds to a time of approximately n×d, the distance can be calculated by multiplication by c×D/2. Here, the peak detection is performed by a known technique. Alternatively, for a sharpened occurrence rate, a sharpened histogram may be calculated by the above-described Expression 32, and peak detection may be performed on this sharpened histogram.

Second Working Example

In the above-described first working example, weighting is determined depending on the distance between "time t, position (x, y), bin n" and "time t1, position (x1, y1), bin n1" in time and space. This second working example is an example in which weighting is determined on the basis of whether two occurrence rates are substantially equal. Noise can be removed by adding those having substantially equal occurrence rates. Moreover, weighting is determined also in accordance with the degree of accuracy of the occurrence rates to be added. That is, in a case where an occurrence rate includes many errors, the value of that occurrence rate cannot be trusted, so the weighting is reduced. In other words, weighting is determined in accordance with a reliability of the occurrence rate.

Figure 35:
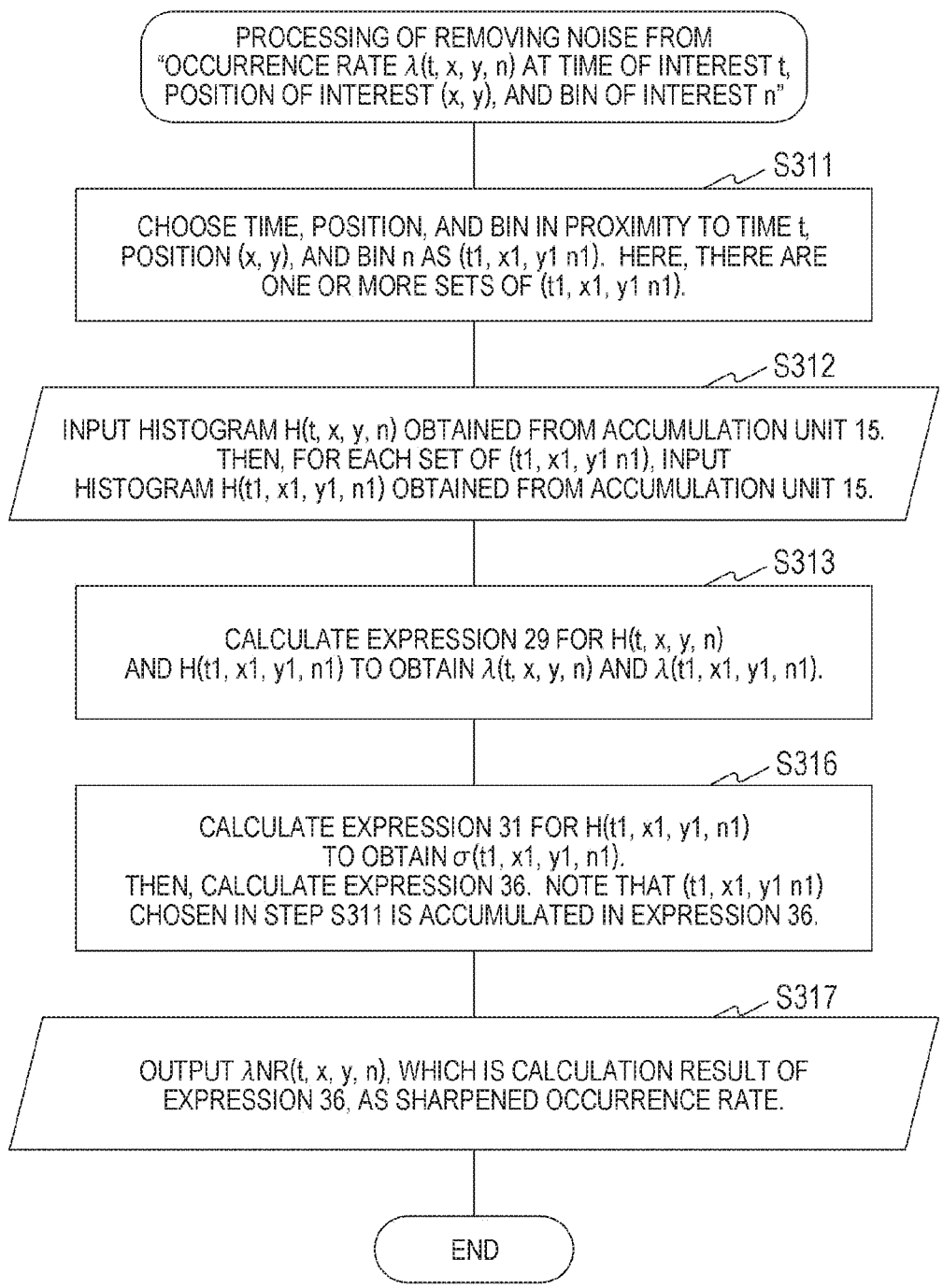
FIG. 35 is a flowchart illustrating an example of a processing procedure for removing noise from an occurrence rate according to a second working example of the third embodiment of the present technology.

FIG. 35 is a flowchart illustrating an example of a processing procedure for removing noise from an occurrence rate according to the second working example of the third embodiment of the present technology. This processing is performed to remove noise from (i.e., sharpen) an occurrence rate $\lambda(t, x, y, n)$ at time of interest t, position of interest (x, y), and bin of interest n. Note that the processing according to the second working example corresponds to the processing in which the processing in step S314 in the above-described first working example is replaced with the processing in step S316 as described below.

In step S316, Expression 31 is calculated for H(t1, x1, y1, n1) to obtain σ(t1, x1, y1, n1). Then, Expression 36 is calculated. Note that (t1, x1, y1 n1) chosen in step S311 is accumulated in Expression 36. Then, the processing proceeds to step S317.

[Math. 36]

$$\lambda_{NR(t,x,y,n)} = \frac{1}{W}\left(\lambda_{(t,x,y,n)} + \sum_{t_1,x_1,y_1,n_1} \frac{\lambda_{(t_1,x_1,y_1,n_1)}}{R_{(t,x,y,n,t_1,x_1,y_1,n_1)} \cdot \sigma_{(t_1,x_1,y_1,n_1)}}\right) \quad \text{Expression 36}$$

where $$W \equiv 1 + \sum_{t_1,x_1,y_1,n_1} \frac{1}{R_{(t,x,y,n,t_1,x_1,y_1,n_1)} \cdot \sigma_{(t_1,x_1,y_1,n_1)}}$$

In step S317, λNR(t, x, y, n), which is a calculation result of Expression 36, is output as a sharpened occurrence rate. Then, the series of processing ends.

Note that Expression 36 is equivalent to Expression 33 in which addition is performed with weighting of 1 for λ(t, x, y, n), which is itself, and weighting of "1/(resolution between occurrence rate at "time t, position (x, y), bin n" and occurrence rate at "time t1, position (x1, y1), bin n1")/ (standard deviation of occurrence rate at "time t1, position (x1, y1), bin n1")" for λ(t1, x1, y1, n1) at a position in proximity thereto.

Furthermore, in a case where the value of the resolution or the standard deviation is 0, division by zero occurs in Expression 36. Consequently, in practice, in order to avoid division by zero, when the resolution or the standard deviation is 0, it is necessary to replace the value with a minute value. Since this is a known common practice and is irrelevant to the gist of this embodiment, this is not mentioned in Expression 36.

Furthermore, in Expression 36, weighting for the occurrence rate λ(t1, x1, y1, n1) in proximity to be added may exceed 1. On the other hand, weighting of the occurrence rate λ(t, x, y, n), which is itself, is 1. It is not desirable that weighting for data other than itself is heavier than itself. Consequently, in a case where weighting for a term exceeds 1, the weighting may be forcibly set to 1.

In this way, a sharpened occurrence rate λNR(t, x, y, n) of time of interest t, position of interest (x, y), and bin of interest n is obtained.

Here, supplementary information regarding Expression 36 will be given. In a case where the resolution is small, it means that the two occurrence rates are substantially equal. In a case where the occurrence rates are substantially equal, noise can be removed by adding the occurrence rates. Furthermore, in a case where the standard deviation σ(t1, x1, y1, n1) of the occurrence rate λ(t1, x1, y1, n1) to be added is large (i.e., in a case where a reliability is low), the occurrence rate at "time t1, position (x1, y1), bin n1" lacks trustworthiness. Consequently, in such a case, weighting for the occurrence rate λ(t1, x1, y1, n1) should be reduced. Expression 36 performs this calculation.

Third Working Example

In the above-described first working example, weighting is determined depending on the distance between "time t, position (x, y), bin n" and "time t1, position (x1, y1), bin n1" in time and space. Furthermore, in the second working example, weighting is determined on the basis of whether the two occurrence rates are substantially equal. In this third working example, weighting is determined taking into account these two matters.

Figure 36:
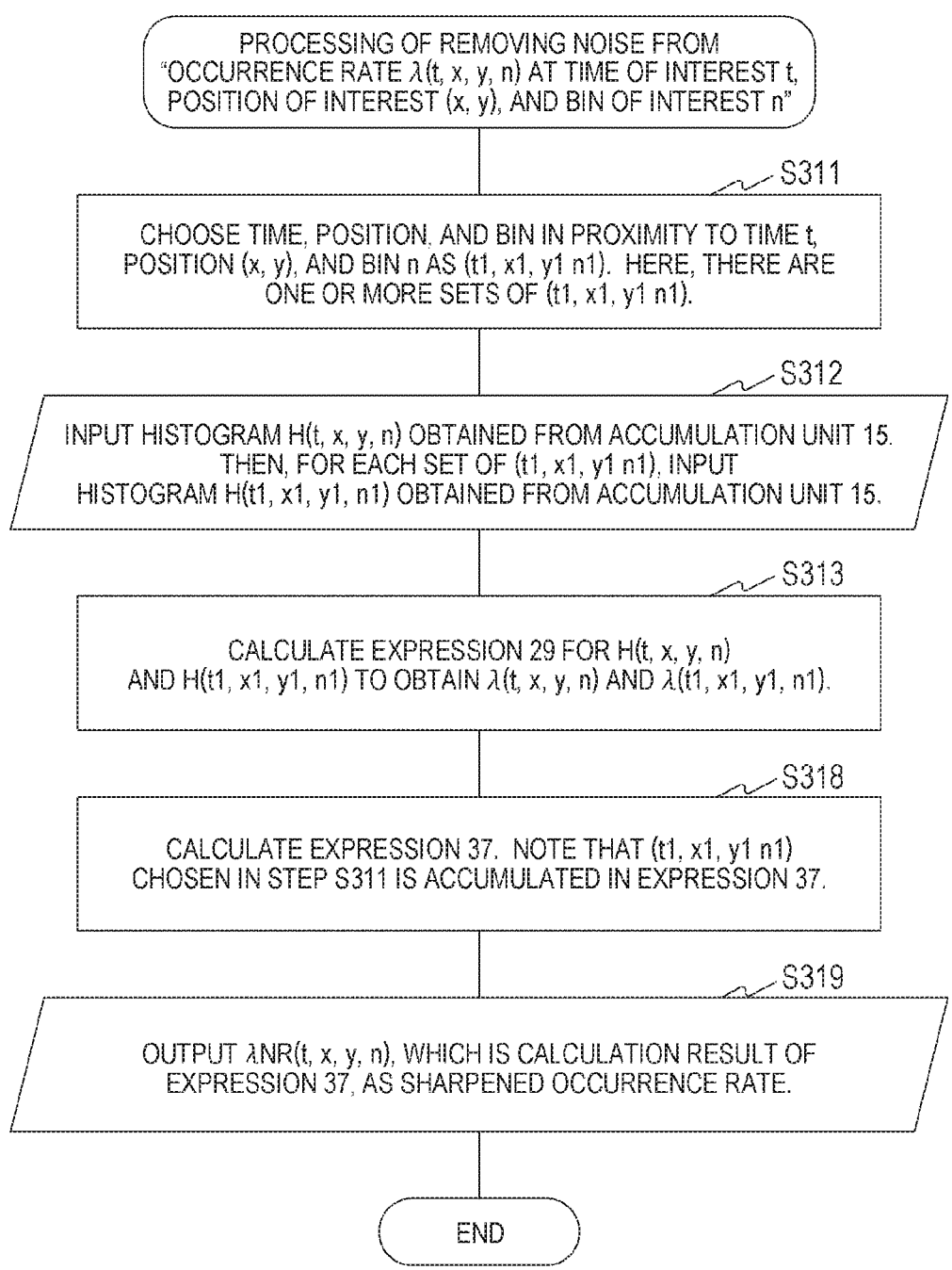
FIG. 36 is a flowchart illustrating an example of a processing procedure for removing noise from an occurrence rate according to a third working example of the third embodiment of the present technology.

FIG. 36 is a flowchart illustrating an example of a processing procedure for removing noise from an occurrence rate according to the third working example of the third embodiment of the present technology. This processing is performed to remove noise from (i.e., sharpen) an occurrence rate λ(t, x, y, n) at time of interest t, position of interest (x, y), and bin of interest n. Note that the processing according to the third working example corresponds to the processing in which the processing in step S314 in the above-described first working example is replaced with the processing in step S318 as described below.

In step S318, the following Expression 37 is calculated. Note that (t1, x1, y1 n1) chosen in step S311 is accumulated in Expression 37. Then, the processing proceeds to step S319.

[Math. 37]

$$\lambda_{NR(t,x,y,n)} = \frac{1}{W}\left(\lambda_{(t,x,y,n)} + \sum_{t_1,x_1,y_1,n_1} \frac{\lambda_{(t_1,x_1,y_1,n_1)}}{\sqrt{(t_1-t)^2 + (x_1-x)^2 + (y_1-y)^2 + (n_1-n)^2} \cdot R_{(t,x,y,n,t_1,x_1,y_1,n_1)}}\right) \quad \text{Expression 37}$$

where $$W \equiv 1 + \sum_{t_1,x_1,y_1,n_1} \frac{1}{\sqrt{(t_1-t)^2 + (x_1-x)^2 + (y_1-y)^2 + (n_1-n)^2} \cdot R_{(t,x,y,n,t_1,x_1,y_1,n_1)}}$$

In step S319, λNR(t, x, y, n), which is a calculation result of Expression 37, is output as a sharpened occurrence rate. Then, the series of processing ends.

Note that Expression 37 is equivalent to Expression 33 in which addition is performed with weighting of 1 for λ(t, x, y, n), which is itself, and weighting of "1/(distance between "time t, position (x, y), bin n" and "time t1, position (x1, y1), bin n1")/(resolution between occurrence rate at "time t, position (x, y), bin n" and occurrence rate at "time t1, position (x1, y1), bin n1")" for λ(t1, x1, y1, n1) at a position in proximity thereto.

Furthermore, in Expression 37, division by zero may occur as in Expression 36. As a method of avoiding division by zero, the known common practice may be used as described in the description of Expression 36. Since this is irrelevant to the gist of this embodiment, this is not mentioned in Expression 37.

Furthermore, in the second working example, in a case where weighting for a term in Expression 36 exceeds 1, the weighting may be forcibly set to 1. The same can be said for Expression 37. That is, in Expression 37, in a case where weighting for a term exceeds 1, the weighting may be forcibly set to 1.

In this way, a sharpened occurrence rate λNR(t, x, y, n) of time of interest t, position of interest (x, y), and bin of interest n is obtained.

Here, supplementary information regarding Expression 37 will be given. In the space of "time t, position (x, y), bin n", occurrence rates in proximity to each other are similar to each other, so noise can be removed by adding them. Furthermore, in a case where the resolution is small, it means that the two occurrence rates are substantially equal. In a case where the occurrence rates are substantially equal, noise can be removed by adding the occurrence rates. Expression 37 performs this calculation.

Fourth Working Example

In the above-described second working example, weighting is determined on the basis of similarity (resolution) between one occurrence rate of interest and each of the occurrence rates in proximity thereto. This fourth working example is an example in which weighting is determined on the basis of similarity between a group of a plurality of occurrence rates centered on a position of interest and a group of occurrence rates in proximity thereto. Determining the similarity by performing a comparison between an occurrence rate and an occurrence rate may result in an erroneous determination. However, a determination of the similarity becomes further reliable by performing a comparison between a plurality of occurrence rates and a plurality of occurrence rates.

Figure 37:
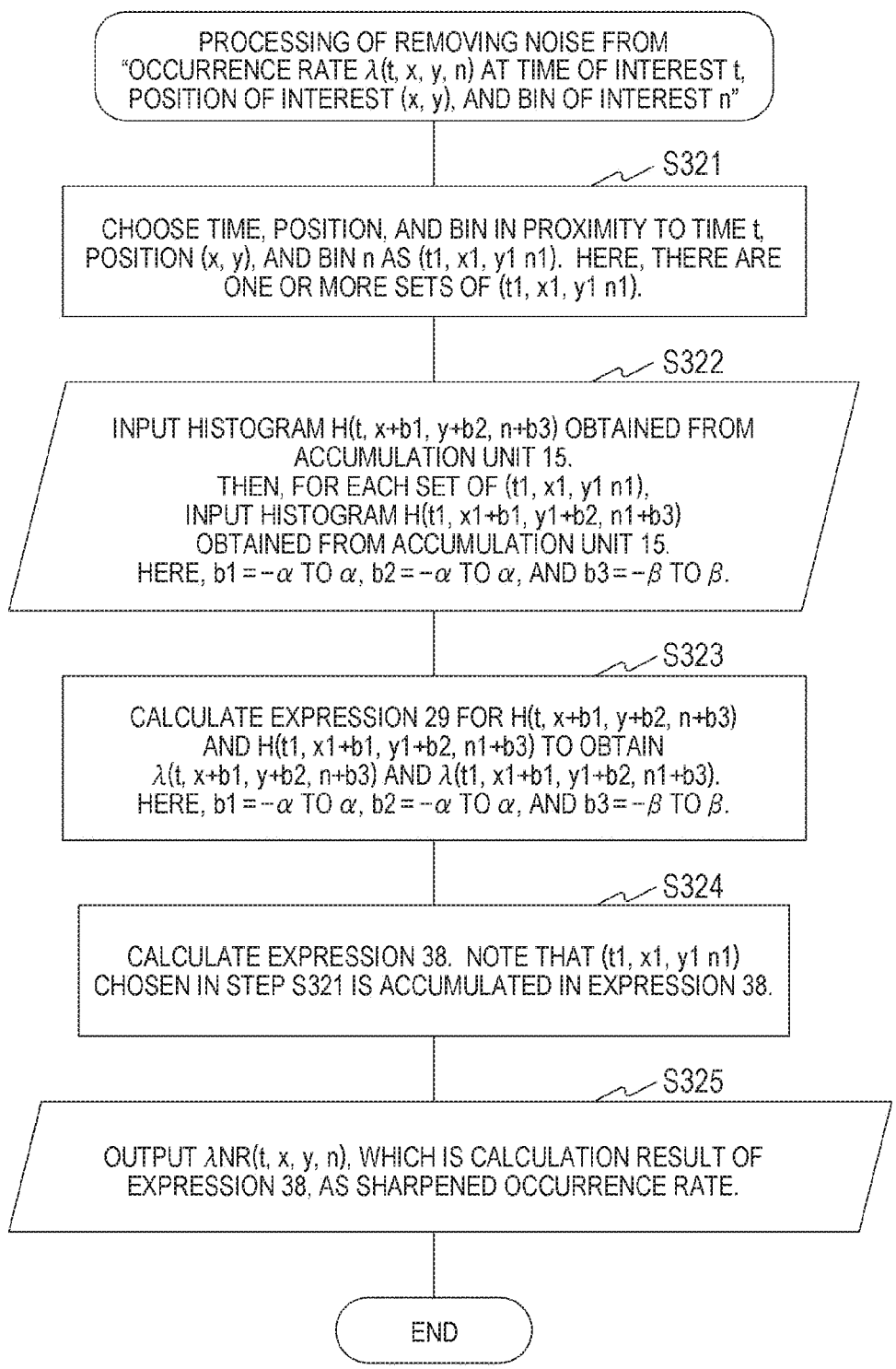
FIG. 37 is a flowchart illustrating an example of a processing procedure for removing noise from an occurrence rate according to a fourth working example of the third embodiment of the present technology.

FIG. 37 is a flowchart illustrating an example of a processing procedure for removing noise from an occurrence rate according to the fourth working example of the third embodiment of the present technology. This processing is performed to remove noise from (i.e., sharpen) an occurrence rate λ(t, x, y, n) at time of interest t, position of interest (x, y), and bin of interest n.

First, in step S321, a time, space, and bin in proximity to time t, position (x, y), and bin n is chosen, and is expressed as (t1, x1, y1 n1). Here, there is one or more sets of (t1, x1, y1 n1). Then, the processing proceeds to step S322.

In step S322, a histogram H(t, x+b1, y+b2, n+b3) obtained from the accumulation unit 15 is input. Then, for each set of (t1, x1, y1 n1), a histogram H(t1, x1+b1, y1+b2, n1+b3) obtained from the accumulation unit 15 is input. Here, b1=−α to α, b2=−α to α, and b3=−β to β. Here, α and β are desired constants. For example, α=2 and β=2. Then, the processing proceeds to step S323.

In step S323, Expression 29 is calculated for H(t, x+b1, y+b2, n+b3) and H(t1, x1+b1, y1+b2, n1+b3) to obtain λ(t, x+b1, y+b2, n+b3) and λ(t1, x1+b1, y1+b2, n1+b3). Here, b1=−α to α, b2=−α to α, and b3=−β to β. Then, the processing proceeds to step S324.

In step S324, the following Expression 38 is calculated. Note that (t1, x1, y1 n1) chosen in step S321 is accumulated in Expression 38. Then, the processing proceeds to step S325.

[Math. 38]

$$\lambda_{NR(t,x,y,n)} = \frac{1}{W}$$

$$\left\{ \lambda_{(t,x,y,n)} + \sum_{t_1,x_1,y_1,n_1} \frac{\lambda_{(t_1,x_1,y_1,n_1)}}{\sum_{\substack{b_1=-\alpha \text{ to } \alpha \\ b_2=-\alpha \text{ to } \alpha \\ b_3=-\beta \text{ to } \beta}} R_{(t,x+b_1,y+b_2,n+b_3,t_3,x_3+b_3,y_1+b_2,n_1+b_3)}} \right\}$$

where $$W \equiv 1 + \sum_{t_1,x_1,y_1,n_1} \frac{1}{\sum_{\substack{b_1=-\alpha \text{ to } \alpha \\ b_2=-\alpha \text{ to } \alpha \\ b_3=-\beta \text{ to } \beta}} R_{(t,x+b_3,y+b_2,n+b_1,t_1,x_1-b_1,y_1+b_2,n_1+b_3)}}$$

Expression 38

In step S325, λNR(t, x, y, n), which is a calculation result of Expression 38, is output as a sharpened occurrence rate. Then, the series of processing ends.

Note that Expression 38 is equivalent to Expression 33 in which addition is performed with weighting of 1 for λ(t, x, y, n), which is itself, and weighting of "1/(total value of resolutions between a group of occurrence rates centered on "time t, position (x, y), bin n" and a group of occurrence rates centered on "time t1, position (x1, y1), bin n1")" for λ(t1, x1, y1, n1) at a position in proximity thereto.

Furthermore, in Expression 38, division by zero may occur as in Expression 36. As a method of avoiding division by zero, the known common practice may be used as described in the description of Expression 36. Since this is irrelevant to the gist of this embodiment, this is not mentioned in Expression 38.

Furthermore, in the above-described second working example, in a case where weighting for a term in Expression 36 exceeds 1, the weighting may be forcibly set to 1. The same can be said for Expression 38. That is, in Expression 38, in a case where weighting for a term exceeds 1, the weighting may be forcibly set to 1.

In this way, a sharpened occurrence rate λNR(t, x, y, n) of time of interest t, position of interest (x, y), and bin of interest n is obtained.

Here, supplementary information regarding Expression 18 will be given. In the space of "time t, position (x, y), bin n", in a case where a resolution between groups of occurrence rates is small, it means that the two occurrence rates, which are the centers of the groups of occurrence rates, are substantially equal. In a case where the occurrence rates are substantially equal, noise can be removed by adding the occurrence rates. Expression 38 performs this calculation.

Fifth Working Example

In a fifth working example, a camera 100 attached to the distance measuring device 10 is used. Here, the camera 100 is a device capable of capturing an image, and captures the image in the same direction as a direction of measurement by the SPAD array 13 of the distance measuring device 10.

In a case where a pixel value E(t, x, y) in an image by the camera 100 corresponding to an object being measured by a SPAD at time of interest t and position of interest (x, y) in the SPAD array 13 and a pixel value E(t1, x1, y1) in an image by the camera 100 corresponding to an object being measured by a SPAD at time t1 and position (x1, y1) in the SPAD array 13 are similar, it is considered that the same object is being imaged in the camera 100. That is, in this case, the objects being measured by the two SPADs are considered to be the same. In a case where the pixel values are different, it is considered that different objects are being measured. Consequently, in a case where the pixel values E(t, x, y) and E(t1, x1, y1) in the images by the camera 100 are substantially the same, weighting with which a histogram or an occurrence rate at time t1 and position (x1, y1) is added to a histogram or an occurrence rate at time of interest t and position of interest (x, y) is increased. In other cases, weighting to be added is reduced, or no addition is performed. In this way, an appropriate histogram or occurrence rate can be added, and noise can be removed from the histogram or occurrence rate. Note that here, (t1, x1, y1) is in proximity to (t, x, y) in time and space.

Note that E(t, x, y) is a luminance value when the object being measured by the SPAD at time t and position (x, y) is imaged by the camera 100 at time t. E(t1, x1, 1y) is a luminance value when the object being measured by the SPAD at time t1 and position (x1, y1) is imaged by the camera 100 at time t1.

Furthermore, in the fifth working example, as in the above-described first working example, weighting is determined depending also on the distance between "position (x, y)" and "position (x1, y1)".

Figure 38:
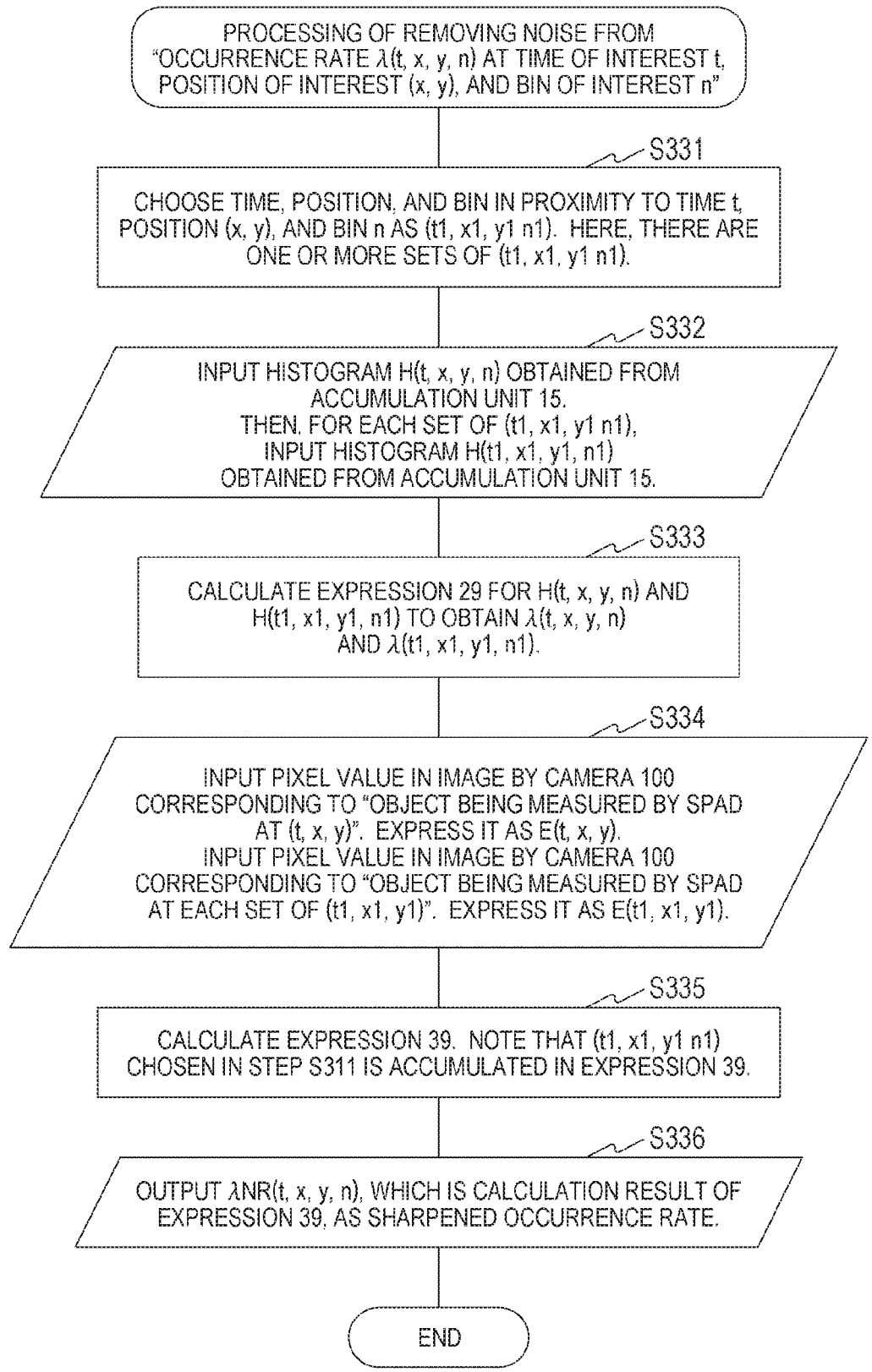
FIG. 38 is a flowchart illustrating an example of a processing procedure for removing noise from an occurrence rate according to a fifth working example of the third embodiment of the present technology.

FIG. 38 is a flowchart illustrating an example of a processing procedure for removing noise from an occurrence rate according to the fifth working example of the third embodiment of the present technology. This processing is performed to remove noise from (i.e., sharpen) an occurrence rate $\lambda(t, x, y, n)$ at time of interest t, position of interest (x, y), and bin of interest n.

First, in step S331, a time, space, and bin in proximity to time t, position (x, y), and bin n is chosen, and is expressed as (t1, x1, y1 n1). Here, there is one or more sets of (t1, x1, y1 n1). Then, the processing proceeds to step S332.

In step S332, a histogram H(t, x, y, n) obtained from the accumulation unit 15 is input. Then, for each set of (t1, x1, y1 n1), a histogram H(t1, x1, y1, n1) obtained from the accumulation unit 15 is input. Then, the processing proceeds to step S333.

In step S333, Expression 29 is calculated for H(t, x, y, n) and H(t1, x1, y1, n1) to obtain $\lambda(t, x, y, n)$ and $\lambda(t1, x1, y1, n1)$. Then, the processing proceeds to step S334.

In step S334, a pixel value in an image by the camera 100 corresponding to an "object being measured by a SPAD at (t, x, y)" is input. The pixel value is expressed as E(t, x, y). A pixel value in an image by the camera 100 corresponding to an "object being measured by a SPAD at each set of (t1, x1, y1)" is input. The pixel value is expressed as E(t1, x1, y1). Then, the processing proceeds to step S335.

In step S335, the following Expression 39 is calculated. Note that (t1, x1, y1 n1) chosen in step S331 is accumulated in Expression 39. Then, the processing proceeds to step S336.

[Math. 39]

$$\lambda_{NR(t,x,y,n)} = \frac{1}{W} \left\{ \lambda_{(t,x,y,n)} + \sum_{t_1,x_1,y_1,n_1} \frac{\lambda_{(t_1,x_1,y_1,n_1)}}{\sqrt{\begin{array}{l}(t_1-t)^2 + \\ (x_1-x)^2 + \\ (y_1-y)^2 + \\ (n_1-n)^2\end{array}} \cdot \left| \begin{array}{l} E_{(t,x,y)} - \\ E_{(t_1,x_1,y_1)} \end{array} \right|} \right\}$$

Expression 39 where $$W \equiv 1 + \sum_{t_1,x_1,y_1,n_1} \frac{1}{\sqrt{\begin{array}{l}(t_1-t)^2 + \\ (x_1-x)^2 + \\ (y_1-y)^2 + \\ (n_1-n)^2\end{array}} \cdot \left| \begin{array}{l} E_{(t,x,y)} - \\ E_{(t_1,x_1,y_1)} \end{array} \right|}$$

In step S336, $\lambda NR(t, x, y, n)$, which is a calculation result of Expression 39, is output as a sharpened occurrence rate. Then, the series of processing ends.

Note that Expression 39 is equivalent to Expression 33 in which addition is performed with weighting of 1 for $\lambda(t, x, y, n)$, which is itself, and weighting of "1/(distance between "time t, position (x, y), bin n" and "time t1, position (x1, y1), bin n1")/(absolute value of a difference between E(t, x, y) and E(t1, x1, y1))" for $\lambda(t1, x1, y1, n1)$ at a position in proximity thereto.

Furthermore, in Expression 39, division by zero may occur as in Expression 36. As a method of avoiding division by zero, the known common practice may be used as described in the description of Expression 36. Since this is irrelevant to the gist of this embodiment, this is not mentioned in Expression 39.

Furthermore, in the above-described second working example, in a case where weighting for a term in Expression 36 exceeds 1, the weighting may be forcibly set to 1. The same can be said for Expression 39. That is, in Expression 39, in a case where weighting for a term exceeds 1, the weighting may be forcibly set to 1.

In this way, a sharpened occurrence rate $\lambda NR(t, x, y, n)$ of time of interest t, position of interest (x, y), and bin of interest n is obtained.

Sixth Working Example

In the above-described fifth working example, weighting is determined on the basis of similarity between one pixel value corresponding to one SPAD of interest and one pixel value corresponding to each SPAD in proximity to the SPAD of interest (difference between two values). This sixth working example is an example in which weighting is determined on the basis of similarity between pixel values of a group of a plurality of pixels centered on a "pixel corresponding to a SPAD of interest" and pixel values of a group of pixels centered on a "pixel corresponding to a SPAD in proximity thereto". Determining the similarity by performing a comparison between a pixel and a pixel may result in an erroneous determination. However, a determination of the similarity becomes further reliable by performing a comparison between a plurality of pixels and a plurality of pixels.

Figure 39:
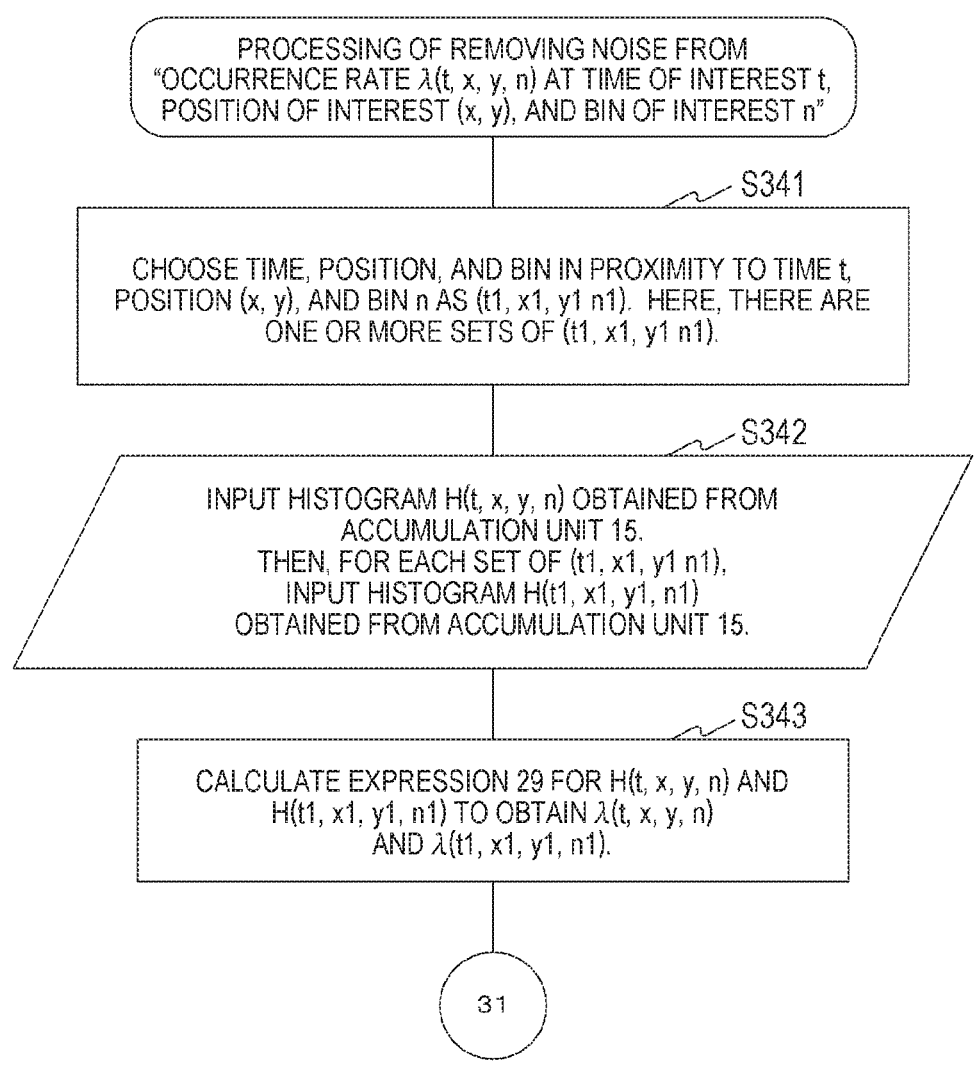
FIG. 39 is a flowchart illustrating an example of a processing procedure for removing noise from an occurrence rate according to a sixth working example of the third embodiment of the present technology.
Figure 40:
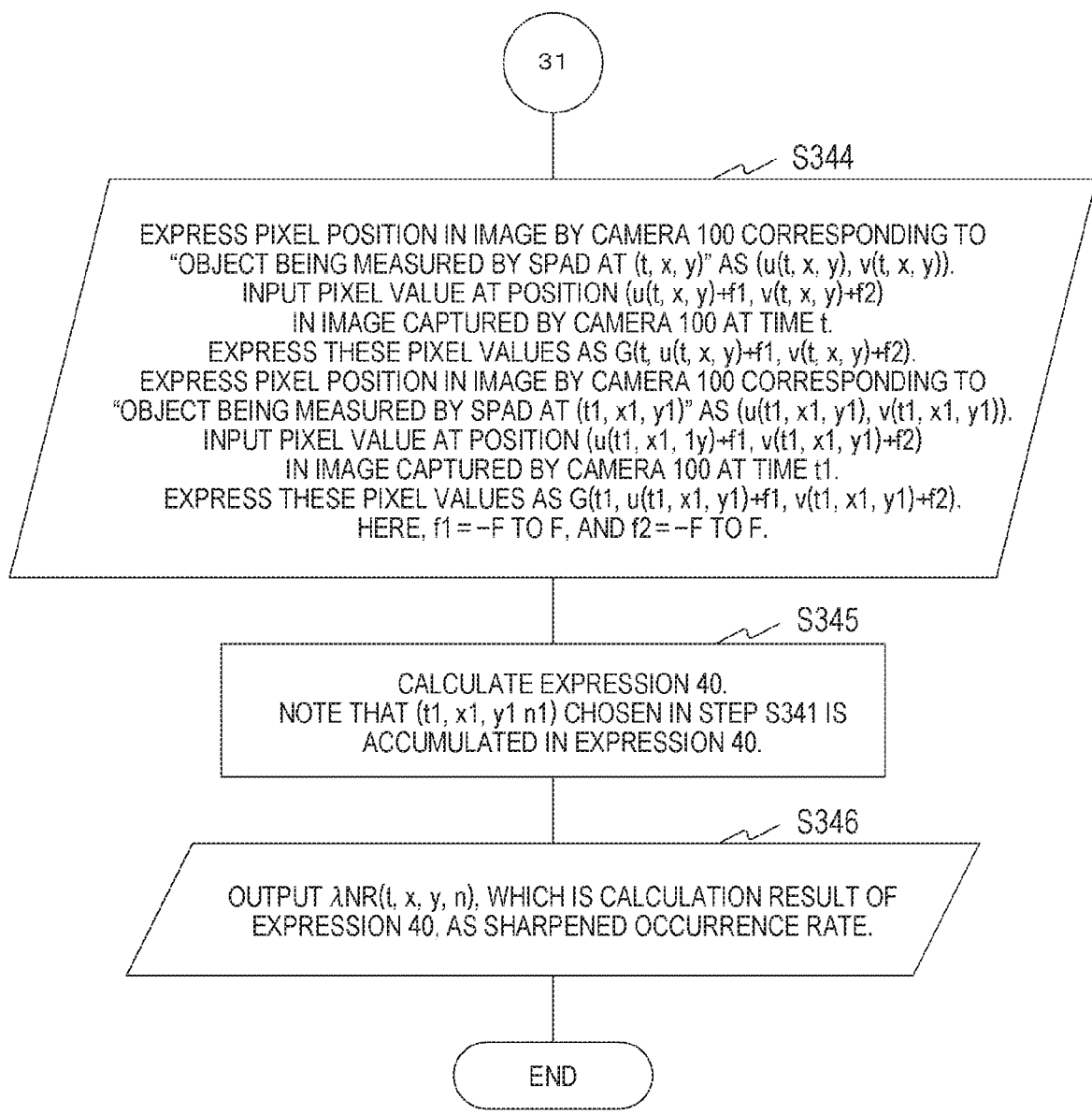
FIG. 40 is a flowchart illustrating the example of the processing procedure for removing noise from an occurrence rate according to the sixth working example of the third embodiment of the present technology.

FIGS. 39 and 40 are flowcharts illustrating an example of a processing procedure for removing noise from an occurrence rate according to the sixth working example of the third embodiment of the present technology. This processing is performed to remove noise from (i.e., sharpen) an occurrence rate $\lambda(t, x, y, n)$ at time of interest t, position of interest (x, y), and bin of interest n.

First, step S341 is performed, which is the same as the above-described step S331, and the description will be omitted. Then, the processing proceeds to step S342.

Step S342 is the same processing as the above-described step S332, and the description will be omitted. Then, the processing proceeds to step S343.

Step S343 is the same processing as the above-described step S333, and the description will be omitted. Then, the processing proceeds to step S344.

In step S344, a pixel position in an image by the camera 100 corresponding to an "object being measured by a SPAD at (t, x, y)" is expressed as (u(t, x, y), v(t, x, y)). A pixel value at position (u(t, x, y)+f1, v(t, x, y)+f2) in an image captured by the camera 100 at time t is input. These pixel values are expressed as G(t, u(t, x, y)+f1, v(t, x, y)+f2). A pixel position in an image by the camera 100 corresponding to an "object being measured by a SPAD at (t1, x1, y1)" is expressed as (u(t1, x1, y1), v(t1, x1, y1)). A pixel value at position (u(t1, x1, 1y)+f1, v(t1, x1, y1)+f2) in an image captured by the camera 100 at time t1 is input. These pixel values are expressed as G(t1, u(t1, x1, y1)+f1, v(t1, x1, y1)+f2). Here, f1=−F to F, and f2=−F to F. Note that F is a desired constant, for example, F=2. Then, the processing proceeds to step S345.

In step S345, the following Expression 40 is calculated. Note that (t1, x1, y1 n1) chosen in step S341 is accumulated in Expression 40. Then, the processing proceeds to step S346.

[Math. 40]

$$\lambda_{NR(t,x,y,n)} = \frac{1}{W}\left(\lambda_{(t,x,y,n)} + \sum_{t_1,x_1,y_1,n_1} \frac{\lambda_{(t_1,x_1,y_1,n_1)}}{w_{inv}(t,x,y,n,t_1,x_1,y_1,n_1)}\right),$$

$$\text{where } w_{inv}(t,x,y,n,t_1,x_1,y_1,n_1) \equiv$$

$$\sqrt{(t_1-t)^2 + (x_1-x)^2 + (y_1-y)^2 + (n_1-n)^2}$$

$$\left(\sum_{\substack{f_1=-F \text{ to } F \\ f_2=-F \text{ to } F}} |G_{(t,u(t,x,y)+f_1,v(t,x,y)+f_2)} - G_{(t_1,u(t_1,x_1,y_1)+f_1,v(t_1,x_1,y_1)+f_2)}|\right) \text{ and } W \equiv$$

$$1 + \sum_{t_1,x_1,y_1} \frac{1}{w_{inv}(t,x,y,n,t_1,x_1,y_1,n_1)}$$

Expression 40

In step S346, λNR(t, x, y, n), which is a calculation result of Expression 40, is output as a sharpened occurrence rate. Then, the series of processing ends.

Note that Expression 40 is equivalent to Expression 33 in which addition is performed with weighting of 1 for λ(t, x, y, n), which is itself, and weighting of "1/(distance between "time t, position (x, y), bin n" and "time t1, position (x1, y1), bin n1")/(sum of absolute values of differences among values of a group of (2F+1)×(2F+1) pixels centered on a corresponding pixel position in an image by the camera 100)" for λ(t1, x1, y1, n1) at a position in proximity thereto.

Furthermore, in Expression 40, division by zero may occur as in Expression 36. As a method of avoiding division by zero, the known common practice may be used as described in the description of Expression 36. Since this is irrelevant to the gist of this embodiment, this is not mentioned in Expression 40.

Furthermore, in the above-described second working example, in a case where weighting for a term in Expression 36 exceeds 1, the weighting may be forcibly set to 1. The same can be said for Expression 40. That is, in Expression 40, in a case where weighting for a term exceeds 1, the weighting may be forcibly set to 1.

In this way, a sharpened occurrence rate λNR(t, x, y, n) of time of interest t, position of interest (x, y), and bin of interest n is obtained.

Here, supplementary information regarding Expression 40 will be given. The object being measured by the SPAD at time t and position (x, y) is projected onto position (u(t, x, y), v(t, x, y)) in an image captured by the camera 100 at time t. The pixel value (luminance value) at the time of the projection is G(t, u(t, x, y), v(t, x, y)), G(t, u(t, x, y)+f1, v(t, x, y)+f2), where f1=−F to F and f2=−F to F, expresses pixel values (luminance values) of a group of pixels including (2F+1)×(2F+1) pixels centered on position (u(t, x, y), v(t, x, y)) in an image. The same applies to G(t1, u(t1, x1, y1)+f1, v(t1, x1, y1)+f2).

Thus, in Expression 40, in a case where the values of the group of pixels including (2F+1)×(2F+1) pixels are similar (the differences are small), the object being measured by the SPAD at time of interest t and position of interest (x, y) and the object being measured by the SPAD at time t1 and position (x1, y1) are considered to be the same, so addition is performed with increased weighting. In a case where the values of the group of pixels are not similar (the differences are large), weighting is reduced.

Here, features of the fifth and sixth working examples of the third embodiment viewed from another aspect will be described. In these working examples, an occurrence rate obtained from a histogram is added by using an image from the camera 100 attached to the distance measuring device 10 as a clue. This uses the fact that there is a correlation between each SPAD in the SPAD array 13 and the corresponding pixel value of an image from the camera 100. In this way, the correlation is used to sharpen an occurrence rate obtained from a histogram.

As described with reference to FIG. 33 and Expression 33, the third embodiment is characterized in the "appropriate addition" using the "information". FIG. 41 illustrates a summary of specific examples of the "information" and the "appropriate addition" according to the first to sixth working examples. That is, FIG. 41 is a diagram illustrating a summary of specific examples of the "information" and the "appropriate addition" according to the first to sixth working examples of the third embodiment of the present technology. According to these, histograms or occurrence rates obtained from histograms can be sharpened by performing addition on the corresponding bins of the histograms or occurrence rates obtained from the histograms in accordance with shortness of the distance, similarity between the histograms or the occurrence rates obtained from the histograms, and the like.

[Effect]

In this way, according to the third embodiment, an appropriate addition is performed, in accordance with the information, on each bin of a histogram (or an occurrence rate) obtained from each SPAD. Since an appropriate addition is performed, the addition performed is always optimum regardless of the positional relationship of the object projected onto each pixel. Furthermore, since only one type of appropriate addition is performed instead of performing a plurality of additions, an enormous amount of calculation is not required.

[Gist]

The gist of the third embodiment is as follows.

(1) A method of sharpening a histogram or an occurrence rate obtained from a histogram, the method including:

an input step of inputting a first histogram at each position in time and space;

a first calculation step of calculating corresponding occurrence rates from the first histograms;

an addition step of performing addition for the corresponding bins of the first occurrence rates from first information to obtain a second occurrence rate;

a second calculation step of calculating, as necessary, a second histogram from the second occurrence rate; and an output step of outputting the second occurrence rate or the second histogram.

(2) The method of sharpening a histogram or an occurrence rate obtained from a histogram according to (1), in which the first information is a distance in the time and space and in the bins, and addition with weighting in accordance with shortness of the distance is performed in the addition step.

(3) The method of sharpening a histogram or an occurrence rate obtained from a histogram according to (1), in which the first information is similarity between the corresponding bins of the first occurrence rates, and addition with weighting in accordance with the degree of the similarity is performed in the addition step.

(4) The method of sharpening a histogram or an occurrence rate obtained from a histogram according to (3), in which the method of sharpening a histogram is characterized in that the "similarity between the corresponding bin of the first occurrence rates", which is the first information, is similarity among a plurality of sets in the time and space and in the bins.

(5) The method of sharpening a histogram or an occurrence rate obtained from a histogram according to (1), in which the first information is a reliability between the corresponding bins of the first occurrence rates, and addition with weighting in accordance with the degree of the reliability is performed in the addition step.

(6) The method of sharpening a histogram or an occurrence rate obtained from a histogram according to (1), in which the first information is similarity between pieces of image data corresponding to the first occurrence rates, and addition with weighting in accordance with the degree of the similarity is performed in the addition step.

(7) The method of sharpening a histogram or an occurrence rate obtained from a histogram according to (6), in which the "similarity between pieces of image data corresponding to the first occurrence rates", which is the first information, is similarity among a plurality of sets of the image data.

5. Fourth Embodiment

[Outline]

In this fourth embodiment, before a computation unit 16 detects a peak in a histogram, noise is removed from the histogram. This decreases false detections. That is, a method of removing noise from a histogram with a small amount of computation and without assuming a positional relationship in advance is provided.

Note that, to be precise, it is removal of noise from an occurrence rate derived from a histogram, rather than direct removal of noise from a histogram. Then, as necessary, a histogram is derived from the occurrence rate from which noise has been removed. Therefore, it is possible to eventually calculate a histogram from which noise has been removed. These pieces of processing are performed by the computation unit 16. As a working example of this embodiment, an example of removal of noise from a histogram is shown, but removal of noise from an occurrence rate is more preferable.

[Removal of Noise from Occurrence Rate]

In the fourth embodiment, an observed histogram H(t, x, y, n) is converted into an occurrence rate, and noise is removed from the occurrence rate. That is, removal of noise from an occurrence rate λ(t, x, y, n) represented by the following Expression 41 is performed.

[Math. 41]

$$\lambda_{(t,x,y,n)} \equiv \frac{H_{(t,x,y,n)}}{M_{(t,x,y,n-1)}} \qquad \text{Expression 41}$$

Here, M(t, x, y, n−1) is defined by the following Expression 42.

[Math. 42]

$$M_{(t,x,y,n-1)} \equiv M - \sum_{j=0}^{n-1} H_{(t,x,y,j)} \qquad \text{Expression 42}$$

Note that it is necessary to pay attention that a value of the occurrence rate λ(t, x, y, n) in Expression 41 has an error with a standard deviation σ(t, x, y, n) represented by the following Expression 43.

[Math. 43]

$$\sigma_{(t,x,y,n)} = \sqrt{\frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right)} \qquad \text{Expression 43}$$

In summary, noise removal is performed on the value λ(t, x, y, n) obtained from Expression 41 from the observation value H(t, x, y, n). Note that λ(t, x, y, n) includes an error with the standard deviation σ(t, x, y, n) represented by Expression 43.

A result of removal of noise from the occurrence rate λ(t, x, y, n) is expressed as λNR(t, x, y, n). HNR(t, x, y, n) may be obtained by the following Expression 44 as necessary. HNR(t, x, y, n) is a histogram from which noise has been removed.

[Math. 44]

$$H_{NR(t,x,y,n)} = M_{NR(t,x,y,n-1)} \cdot \lambda_{(t,x,y,n)}, \qquad \text{Expression 44}$$

$$\text{where } M_{NR(t,x,y,n-1)} \equiv M - \sum_{j=0}^{n-1} H_{NR(t,x,y,j)}$$

Note that it is apparent from Expressions 41 and 42 that Expression 44 holds.

Furthermore, as described above, as an optimum noise removal, noise is removed from an occurrence rate derived from a histogram. That is, noise is removed from the occurrence rate λ(t, x, y, n) that is represented by Expression 41 and includes an error with a standard deviation represented by Expression 43. Moreover, a working example of removal of noise from a histogram, not from an occurrence rate, will be described. That requires an expression described here. That is, it relates to noise in an observed histogram. A standard deviation of this noise is, as can be seen from the description of Expression 7, represented by the following Expression 45.

[Math. 45]

$$\sigma_{H(t,x,y,n)} \equiv \sqrt{H_{(t,x,y,n)} \cdot \left(1 - \frac{H_{(t,x,y,n)}}{M_{(t,x,y,n-1)}}\right)} \qquad \text{Expression 45}$$

It is necessary to pay attention that the value of the observed histogram H(t, x, y, n) has an error with a standard deviation αH(t, x, y, n) represented by Expression 45.

[Definition of Variables]

Variables used hereinafter are defined here.

An "N-dimensional column vector λNR(t, x, y)" is defined by enumerating occurrence rates λNR(t, x, y, n), from which noise has been removed, for n. That is, it is defined by the following Expression 46. Here, n=0 to N−1.

[Math. 46]

$$\vec{\lambda}_{NR(t,x,y)} \equiv (\lambda_{NR(t,x,y,0)}, \lambda_{NR(t,x,y,1)}, \lambda_{NR(t,x,y,2)}, \ldots, \lambda_{NR(t,x,y,N-1)})^T \qquad \text{Expression 46}$$

Furthermore, an "N-dimensional column vector HNR(t, x, y)" is defined by enumerating histograms HNR(t, x, y, n), from which noise has been removed, for n. That is, it is defined by the following Expression 47. Here, n=0 to N−1.

[Math. 47]

$$\vec{H}_{NR(t,x,y)} \equiv (H_{NR(t,x,y,0)}, H_{NR(t,x,y,1)}, H_{NR(t,x,y,2)}, \ldots, H_{NR(t,x,y,N-1)})^T \qquad \text{Expression 47}$$

Furthermore, an "N-dimensional column vector s(t, x, y)" is defined by enumerating scalar variables s(t, x, y, n) described later for n. An "N-dimensional column vector a(t, x, y)" is defined by enumerating scalar variables a(t, x, y, n) for n. An "N-dimensional column vector b(t, x, y)" is defined by enumerating scalar variables b(t, x, y, n) for n. That is, it is defined by the following Expression 48. Here, n=0 to N−1.

[Math. 48]

$$\vec{s}_{NR(t,x,y)} \equiv (s_{NR(t,x,y,0)}, s_{NR(t,x,y,1)}, s_{NR(t,x,y,2)}, \ldots, s_{NR(t,x,y,N-1)})^T$$

$$\vec{a}_{NR(t,x,y)} \equiv (a_{NR(t,x,y,0)}, a_{NR(t,x,y,1)}, a_{NR(t,x,y,2)}, \ldots, a_{NR(t,x,y,N-1)})^T$$

$$\vec{b}_{NR(t,x,y)} \equiv (b_{NR(t,x,y,0)}, b_{NR(t,x,y,1)}, b_{NR(t,x,y,2)}, \ldots, b_{NR(t,x,y,N-1)})^T \qquad \text{Expression 48}$$

Moreover, symbols will be defined. An Lp norm is described by the following Expression 49. Here, p is equal to or greater than 0, and includes infinity.

[Math. 49]

$$\|\cdot\|_p \qquad \text{Expression 49}$$

In this embodiment, definitions of this symbol and the Lp norm are used in a similar manner to generally used terms. In the working examples of this embodiment, examples of p=0 and 2 are shown as expressions to be solved. However, in this embodiment, p is not limited to 0 and 2.

Furthermore, a gradient is described by Expression 50.

[Math. 50]

$$\nabla \equiv \left(\frac{\partial}{\partial x}, \frac{\partial}{\partial y}\right) \qquad \text{Expression 50}$$

In the working examples of this embodiment, it is necessary to pay attention that this symbol ∇ is an operator for position (x, y) and does not act on time t and bin n.

The removal of noise from an occurrence rate according to the fourth embodiment can be succinctly expressed as the following Expression 51.

[Math. 51]

$$\underset{\lambda_{NR(t,x,y,n)}}{\operatorname{argmin}} (DataTerm_\lambda + SmoothTerm_\lambda) \qquad \text{Expression 51}$$

Furthermore, the removal of noise from a histogram according to the fourth embodiment can be succinctly expressed as the following Expression 52.

[Math. 52]

$$\underset{H_{NR(t,x,y,n)}}{\operatorname{argmin}} (DataTerm_H + SmoothTerm_H) \qquad \text{Expression 52}$$

That is, in either case, an occurrence rate λNR(t, x, y, n) or a histogram HNR(t, x, y, n) is obtained such that the sum of two terms, DataTerm (data term) and SmoothTerm (smooth term or regularization term) is minimized.

In the case of removal of noise from an occurrence rate (Expression 51), DataTermλ, which is a data term, is a term that acts so that λ(t, x, y, n), which is a value obtained from an observation value H(t, x, y, n) by Expression 41, and λNR(t, x, y, n) may have values that are as close to being the same as possible. Then, SmoothTermλ, which is a smooth term, is a term that acts so that values of λNR(t, x, y, n) in proximity to each other may be similar.

In the case of removal of noise from a histogram (Expression 52), DataTermH, which is a data term, is a term that acts so that H(t, x, y, n), which is an observation value, and HNR(t, x, y, n) may have values that are as close to being the same as possible. Then, SmoothTermH, which is a smooth term, is a term that acts so that values of HNR(t, x, y, n) in proximity to each other may be similar.

Here, supplementary information will be given. In distance measurements using SPADs, detection of a peak in a histogram is generally performed. However, as can be seen from the above description, the same result as the detection of a peak in a histogram can be obtained also by detecting a peak in an occurrence rate, which has a proportional relationship with a histogram as shown in Expression 41. Thus, the occurrence rate λNR(t, x, y, n), from which noise has been removed, may be used to perform a search with respect to bin n for peak detection. Here, n=0 to N−1. In this case, it is not necessary to obtain a histogram HNR(t, x, y, n), from which noise has been removed, from the occurrence rate λNR(t, x, y, n), from which noise has been removed, by using the above-described Expression 44.

First Working Example

In this first working example, a distance measuring device 10 is used to perform distance measurement for each SPAD in a SPAD array 13. In particular, the features include removal of noise from an occurrence rate obtained from a "histogram that is an observation value from the accumulation unit 15" by the above-described Expression 41. The removal of noise from an occurrence rate is performed by the computation unit 16.

In the first working example, an occurrence rate $\lambda NR(t, x, y, n)$, from which noise has been removed, represented by Expression 51 is obtained. Here, $DataTerm\lambda$ is represented by the following Expression 53.

[Math. 53]

$$DataTerm_\lambda \equiv \sum_{t}\sum_{x=1}^{X}\sum_{y=1}^{Y}\sum_{n=0}^{N-1}\left\|\frac{\lambda_{NR(t,x,y,n)} - \lambda_{(t,x,y,n)}}{\sigma_{(t,x,y,n)}}\right\|_2 \quad \text{Expression 53}$$

Furthermore, $SmoothTerm\lambda$ is represented by the following Expression 54.

[Math. 54]

$$SmoothTerm_\lambda \equiv \quad \text{Expression 54}$$

$$\alpha_t \sum_{t}\sum_{x=1}^{X}\sum_{y=1}^{Y}\sum_{n=0}^{N-1}\left\|\frac{\partial}{\partial t}\lambda_{NR(t,x,y,n)}\right\|_2 +$$

$$\alpha_{xy}\sum_{t}\sum_{x=1}^{X}\sum_{y=1}^{Y}\sum_{n=0}^{N-1}\|\nabla\lambda_{(t,x,y,n)}\|_2 +$$

$$\alpha_n \sum_{t}\sum_{x=1}^{X}\sum_{y=1}^{Y}\sum_{n=0}^{N-1}\left\|\frac{\partial}{\partial n}\lambda_{NR(t,x,y,n)}\right\|_2$$

In Expression 53, $\lambda(t, x, y, n)$ is a value calculated from an observation value $H(t, x, y, n)$ by Expression 41. Furthermore, $\sigma(t, x, y, n)$ is a value calculated by Expression 43. As the value of $\lambda NR(t, x, y, n)$ to be finally obtained becomes closer to the observation value $\lambda(t, x, y, n)$, the value of Expression 53 becomes smaller. In Expression 53, division by $\sigma(t, x, y, n)$ is performed to make the value of Expression 53 depend on the degree of certainty of the observation value $\lambda(t, x, y, n)$. That is, when the observation value $\lambda(t, x, y, n)$ is uncertain (when the standard deviation $\sigma(t, x, y, n)$ is large), it is not necessary to make $\lambda NR(t, x, y, n)$ very close to $\lambda(t, x, y, n)$. On the other hand, when the degree of certainty of the observation value $\lambda(t, x, y, n)$ is high (when the standard deviation $\sigma(t, x, y, n)$ is small), the value of $\lambda(t, x, y, n)$ can be trusted, so it is preferable to make $\lambda NR(t, x, y, n)$ close to $\lambda(t, x, y, n)$. In order to reflect this, division by $\sigma(t, x, y, n)$ is performed in Expression 53.

A first term on the right-hand side of Expression 54 indicates that $\lambda NR(t, x, y, n)$ to be finally obtained is smooth in the time direction. That is, the smaller the value obtained by partially differentiating $\lambda NR(t, x, y, n)$ with respect to time t, the smaller the value of Expression 54. Here, $\alpha t$ is a contribution rate for smoothness in the time direction, and is a desired constant equal to or greater than 0. Note that when $\alpha t = 0$ is satisfied, smoothness in the time direction is not considered.

A second term on the right-hand side of Expression 54 indicates that $\lambda NR(t, x, y, n)$ to be finally obtained is smooth in a space (x, y) direction. That is, the smaller the value obtained by partially differentiating $\lambda NR(t, x, y, n)$ with respect to space (x, y), the smaller the value of Expression 54. Here, $\alpha xy$ is a contribution rate for smoothness in the space (x, y) direction, and is a desired constant equal to or greater than 0. Note that when $\alpha xy=0$ is satisfied, smoothness in the space (x, y) direction is not considered.

A third term on the right-hand side of Expression 54 indicates that $\lambda NR(t, x, y, n)$ to be finally obtained is smooth in a bin direction. That is, the smaller the value obtained by partially differentiating $\lambda NR(t, x, y, n)$ with respect to bin n, the smaller the value of Expression 54. Here, $\alpha n$ is a contribution rate for smoothness in the bin direction, and is a desired constant equal to or greater than 0. Note that when $\alpha n=0$ is satisfied, smoothness in the bin direction is not considered.

Figure 42:
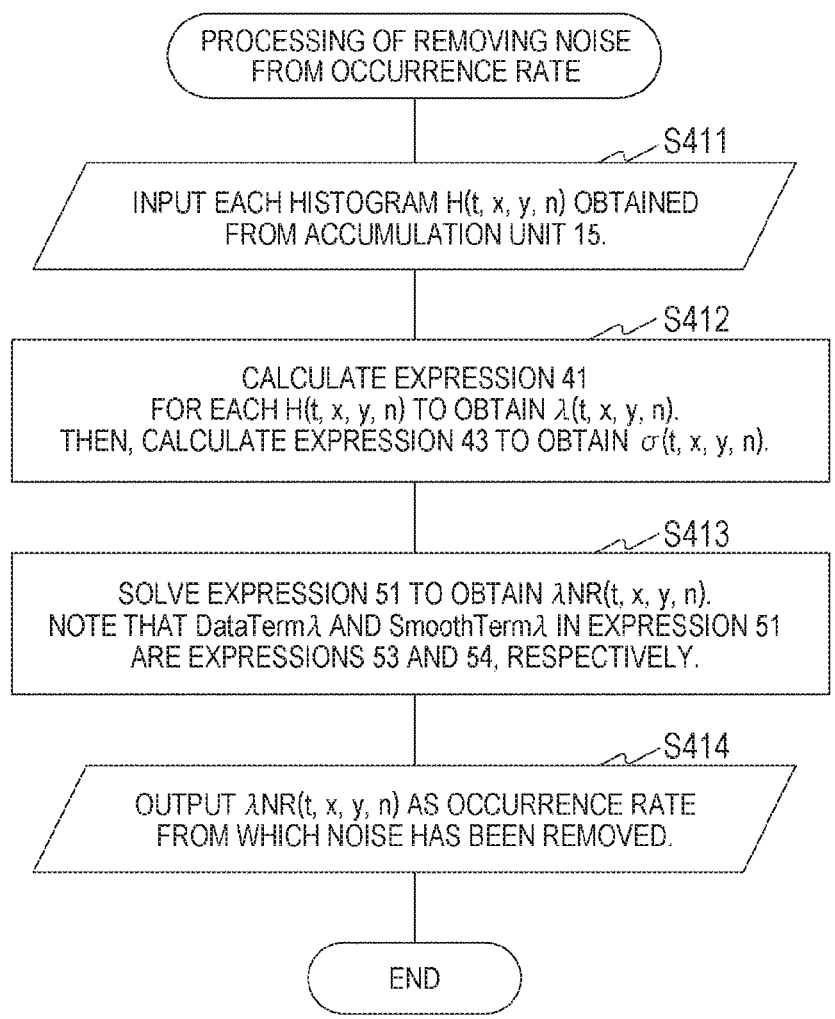
FIG. 42 is a flowchart illustrating an example of a processing procedure for removing noise from an occurrence rate according to a first working example of a fourth embodiment of the present technology.

FIG. 42 is a flowchart illustrating an example of a processing procedure for removing noise from an occurrence rate according to the first working example of the fourth embodiment of the present technology. This processing is performed to remove noise from an occurrence rate.

First, in step S411, each histogram $H(t, x, y, n)$ obtained from the accumulation unit 15 is input. Then, the processing proceeds to step S412.

In step S412, Expression 41 is calculated for each $H(t, x, y, n)$ to obtain $\lambda(t, x, y, n)$. Then, Expression 43 is calculated to obtain $\sigma(t, x, y, n)$. Then, the processing proceeds to step S413.

In step S413, Expression 51 is solved to obtain $\lambda NR(t, x, y, n)$. Note that $DataTerm\lambda$ and $SmoothTerm\lambda$ in Expression 51 are Expressions 53 and 54, respectively. Then, the processing proceeds to step S414.

In step S414, $\lambda NR(t, x, y, n)$ is output as an occurrence rate from which noise has been removed. Then, the series of processing ends.

By executing the processing illustrated in the drawing, noise is removed from an occurrence rate at each time t, each position (x, y), and each bin n in the SPAD array 13. Thereafter, the computation unit 16 detects a peak of the occurrence rate from which noise has been removed. Then, a value obtained by multiplying a bin corresponding to the peak by $c \times D/2$ is output as a distance from an output terminal 17. Note that since bin n corresponds to a time of approximately $n \times D$, the distance can be calculated by multiplication by $c \times D/2$. Here, the peak detection is performed by a known technique. Alternatively, for an occurrence rate from which noise has been removed, a histogram $HNR(t, x, y, n)$ may be calculated by the above-described Expression 44, and peak detection may be performed on this histogram $HNR(t, x, y, n)$.

Note that in a case where the smoothness in the bin direction is not considered, the following Expression 55 may be used as $SmoothTerm\lambda$ instead of Expression 54. That is, Expression 51 may be solved assuming that $DataTerm\lambda$ and $SmoothTerm\lambda$ are Expressions 53 and 55, respectively.

[Math. 55]

$$\alpha_x \sum_t \sum_{x=1}^{X} \sum_{y=1}^{Y} \left\| \frac{\partial}{\partial x} \vec{\lambda}_{NR(t,x,y,n)} \right\|_0 +$$

$$SmoothTerm_\lambda \equiv \alpha_t \sum_t \sum_{x=1}^{X} \sum_{y=1}^{Y} \left\| \frac{\partial}{\partial t} \vec{\lambda}_{NR(t,x,y,n)} \right\|_0 +$$

$$\alpha_y \sum_t \sum_{x=1}^{X} \sum_{y=1}^{Y} \left\| \frac{\partial}{\partial y} \vec{\lambda}_{NR(t,x,y,n)} \right\|_0$$

Expression 55

Here, αx and αy are contribution rates for smoothness in an x direction and a y direction, respectively, and are desired constants equal to or greater than 0.

Second Working Example

In the above-described first working example, noise is removed from an occurrence rate. In a second working example, noise is removed from a histogram. That is, in the second working example, the distance measuring device 10 is used to perform distance measurement for each SPAD in the SPAD array 13. In particular, the features include removal of noise from a "histogram that is an observation value from the accumulation unit 15". The removal of noise from a histogram is performed by the computation unit 16.

In the second working example, a histogram HNR(t, x, y, n), from which noise has been removed, represented by the above-described Expression 52 is obtained. In this case, DataTermH is represented by the following Expression 56.

[Math. 56]

$$DataTerm_H \equiv \sum_t \sum_{x=1}^{X} \sum_{y=1}^{Y} \sum_{n=0}^{N-1} \left\| \frac{H_{NR(t,x,y,n)} - H_{(t,x,y,n)}}{\sigma_{H(t,x,y,n)}} \right\|_2$$

Expression 56

Furthermore, SmoothTermH is represented by the following Expression 57.

[Math. 57]

$$SmoothTerm_H \equiv$$

$$\alpha_t \sum_t \sum_{x=1}^{X} \sum_{y=1}^{Y} \sum_{n=0}^{N-1} \left\| \frac{\partial}{\partial t} H_{NR(t,x,y,n)} \right\|_2 +$$

$$\alpha_{xy} \sum_t \sum_{x=1}^{X} \sum_{y=1}^{Y} \sum_{n=0}^{N-1} \| \nabla H_{(t,x,y,n)} \|_2 +$$

$$\alpha_n \sum_t \sum_{x=1}^{X} \sum_{y=1}^{Y} \sum_{n=0}^{N-1} \left\| \frac{\partial}{\partial n} H_{NR(t,x,y,n)} \right\|_2$$

Expression 57

Note that a detailed description of Expression 56 will be omitted because the description is the same as that of Expression 53 if λ is replaced with H.

Furthermore, a detailed description of Expression 57 will be omitted because the description is the same as that of Expression 54 if λ is replaced with H. Note that αt, αxy, and αn are desired constants equal to or greater than 0.

Figure 43:
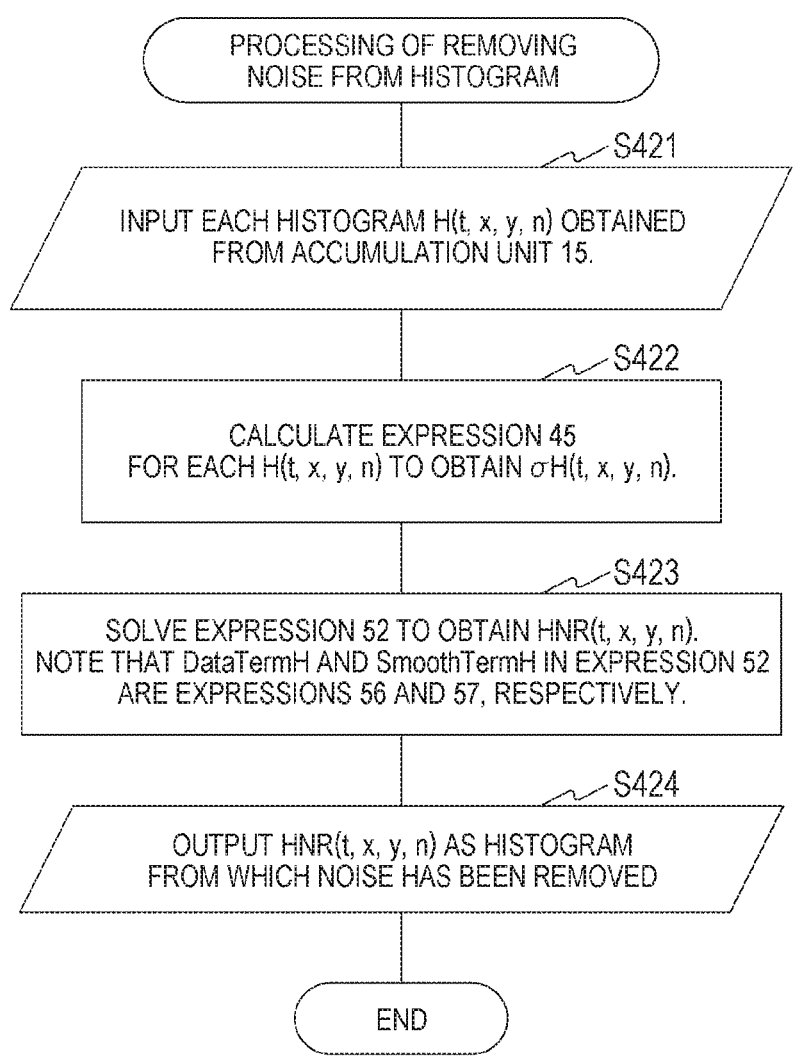
FIG. 43 is a flowchart illustrating an example of a processing procedure for removing noise from a histogram according to a second working example of the fourth embodiment of the present technology.

FIG. 43 is a flowchart illustrating an example of a processing procedure for removing noise from a histogram according to the second working example of the fourth embodiment of the present technology. This processing is performed to remove noise from a histogram.

First, in step S421, each histogram H(t, x, y, n) obtained from the accumulation unit 15 is input. Then, the processing proceeds to step S422.

In step S422, Expression 45 is calculated for each H(t, x, y, n) to obtain σH(t, x, y, n). Then, the processing proceeds to step S423.

In step S423, Expression 52 is solved to obtain HNR(t, x, y, n). Note that DataTermH and SmoothTermH in Expression 52 are Expressions 56 and 57, respectively. Then, the processing proceeds to step S424.

In step S424, HNR(t, x, y, n) is output as a histogram from which noise has been removed. Then, the series of processing ends.

By executing the processing illustrated in the drawing, noise is removed from a histogram at each time t, each position (x, y), and each bin n in the SPAD array 13. Thereafter, the computation unit 16 detects a peak of the histogram from which noise has been removed. Then, a value obtained by multiplying a bin corresponding to the peak by c×D/2 is output as a distance from the output terminal 17. Here, the peak detection is performed by a known technique.

Note that in a case where the smoothness in the bin direction is not considered, the following Expression 58 may be used as SmoothTermH instead of Expression 57. That is, Expression 52 may be solved assuming that DataTermH and SmoothTermH are Expressions 56 and 58, respectively.

[Math. 58]

$$SmoothTerm_H \equiv \alpha_t \sum_t \sum_{x=1}^{X} \sum_{y=1}^{Y} \left\| \frac{\partial}{\partial t} \vec{H}_{NR(t,x,y,n)} \right\|_0 +$$

$$\alpha_x \sum_t \sum_{x=1}^{X} \sum_{y=1}^{Y} \left\| \frac{\partial}{\partial x} \vec{H}_{NR(t,x,y,n)} \right\|_0 +$$

$$\alpha_y \sum_t \sum_{x=1}^{X} \sum_{y=1}^{Y} \left\| \frac{\partial}{\partial y} \vec{H}_{NR(t,x,y,n)} \right\|_0$$

Expression 58

Here, ax and ay are contribution rates for smoothness in the x direction and the y direction, respectively, and are desired constants equal to or greater than 0.

Third Working Example

In the following third to sixth working examples, a camera 100 attached to the distance measuring device 10 is used. Here, the camera 100 is a device capable of capturing an image, and captures the image in the same direction as a direction of measurement by the SPAD array 13 of the distance measuring device 10.

A pixel value (luminance value) in an image by the camera 100 corresponding to an object being measured by a SPAD at each time t and each position (x, y) in the SPAD array 13 is expressed as I(t, x, y). Note that in a case where the device 10 and the camera 100 are installed adjacent to each other, the pixel value I(t, x, y) is a value of a pixel that has been imaged by the camera 100 in the same direction as the direction in which a SPAD at position (x, y) is imaging at time t.

It is assumed that (t1, x1, y1) and (t2, x2, y2) neighbor each other in time and space.

In a case where I(t1, x1, y1) and I(t2, x2, y2) are substantially the same in value (pixel value), the object being measured by a SPAD at (t1, x1, y1) and the object being measured by a SPAD at (t2, x2, y2) are considered to be the same. Thus, true histograms or true occurrence rates corresponding to (t1, x1, y1) and (t2, x2, y2) are considered to have the same shape. In this case, a smooth term SmoothTermH or SmoothTermλ may be applied so that these two histograms or occurrence rates may be as close to being the same as possible.

On the other hand, in a case where I(t1, x1, y1) and I(t2, x2, y2) are completely different in value (pixel value), the object being measured by the SPAD at (t1, x1, y1) and the object being measured by the SPAD at (t2, x2, y2) are considered to be different. Thus, true histograms or true occurrence rates corresponding to (t1, x1, y1) and (t2, x2, y2) are considered to have different shapes. Smoothing between these two histograms or occurrence rates having different shapes would rather result in moving away from true values. Consequently, for these two, it is preferable to reduce the smoothing effect of the smooth term SmoothTermH or SmoothTermλ.

The above description is, as described above, common to the third to sixth working examples.

In the third working example, the distance measuring device 10 is used to perform distance measurement for each SPAD in the SPAD array 13. In particular, the features include removal of noise from an occurrence rate obtained from a "histogram that is an observation value from the accumulation unit 15" by the above-described Expression 41. The removal of noise from an occurrence rate is performed by the computation unit 16. The third working example is an example in which "noise removal taking into account the time direction" is not performed, and it is assumed that t=1 only.

In the third working example, an occurrence rate λNR(t, x, y, n), from which noise has been removed, represented by Expression 51 is obtained. Here, DataTermλ is represented by the above-described Expression 53. Furthermore, SmoothTermλ is represented by the following Expression 59.

[Math. 59]

$$SmoothTerm_\lambda \equiv \alpha_{xy} \sum_{x=1}^{X} \sum_{y=1}^{Y} \left( \left\| \vec{s}_{(t,x,y)} - \frac{\frac{\partial}{\partial x} \vec{\lambda}_{NR(t,x,y)}}{\frac{\partial}{\partial x} I_{(t,x,y)}} \right\|_2 + \right.$$

$$\left. \left\| \vec{s}_{(t,x,y)} - \frac{\frac{\partial}{\partial y} \vec{\lambda}_{NR(t,x,y)}}{\frac{\partial}{\partial y} I_{(t,x,y)}} \right\|_2 \right) + \alpha_{edge}$$

$$\sum_{x=1}^{X} \sum_{y=1}^{Y} \sum_{n=0}^{N-1} ( \| \mu_{across(t,x,y)} e^T_{across(t,x,y)} \nabla s_{(t,x,y,n)} \|_2 +$$

$$\| \mu_{along(t,x,y)} e^T_{along(t,x,y)} \nabla s_{(t,x,y,n)} \|_2 )$$

Expression 59

Note that a vector s(t, x, y) is defined by the above-described Expression 48. Furthermore, eacross(t, x, y), ealong(t, x, y), pacross(t, x, y), and palong(t, x, y) shown in Expression 59 are defined by the following Expressions 60 to 63.

[Math. 60]

$$e_{across(t,x,y)} \equiv \frac{1}{|\nabla I_{(t,x,y)}|^2} \begin{pmatrix} \frac{\partial}{\partial x} I_{(t,x,y)} \\ \frac{\partial}{\partial y} I_{(t,x,y)} \end{pmatrix}$$

Expression 60

[Math. 61]

$$e_{along(t,x,y)} \equiv \frac{1}{|\nabla I_{(t,x,y)}|^2} \begin{pmatrix} \frac{\partial}{\partial y} I_{(t,x,y)} \\ -\frac{\partial}{\partial x} I_{(t,x,y)} \end{pmatrix}$$

Expression 61

[Math. 62]

$$\mu_{across(t,x,y)} \equiv \sqrt{\frac{\eta^2}{|\nabla I_{(t,x,y)}|^2 + 2\eta^2}}$$

Expression 62

[Math. 63]

$$\mu_{along(t,x,y)} \equiv \sqrt{\frac{|\nabla I_{(t,x,y)}|^2 + \eta^2}{|\nabla I_{(t,x,y)}|^2 + 2\eta^2}}$$

Expression 63

Here, η is a desired minute value (constant), and pacross(t, x, y)≤µalong(t, x, y) is satisfied. Furthermore, Expression 60 defines eacross(t, x, y), which is a unit tangent vector perpendicular to an edge direction of (crossing an edge of) an image. Expression 61 defines ealong(t, x, y), which is a unit tangent vector along the edge direction of the image.

Note that when the value obtained by partially differentiating I(t, x, y) with respect to x or y is 0, division by zero occurs in Expression 59. Consequently, in practice, in order to avoid division by zero, when the value obtained by partially differentiating I(t, x, y) with respect to x or y is 0, replacement with a minute value is necessary. Since this is a known common practice and is irrelevant to the gist of this embodiment, this is not mentioned in Expression 59.

Since Expression 53 used in the third working example has already been described in the first working example, a detailed description will be omitted.

A first term on the right-hand side of Expression 59 will be described. This term acts so that the ratio between the differential value (difference value) in the x direction of λNR(t, x, y, n) to be finally obtained and the differential value (difference value) in the x direction of the corresponding image pixel value I(t, x, y) may be equal to s(t, x, y, n). Moreover, this term acts so that the ratio between the differential value (difference value) in the y direction of λNR(t, x, y, n) to be finally obtained and the differential value (difference value) in the y direction of the corresponding image pixel value I(t, x, y) may also be equal to s(t, x, y, n). That is, this term acts so that the ratio between the differential value of λNR(t, x, y, n) and the differential value of I(t, x, y), which have a linear relationship, may be as close to s(t, x, y, n) as possible. Here, n is 0 to N−1. Note that αxy is a contribution rate for the linearity between the differential value of λNR(t, x, y, n) and the differential value of I(t, x, y) in the space (x, y) direction, and is a desired constant equal to or greater than 0.

A second term on the right-hand side of Expression 59 will be described.

In a direction crossing an edge of an image, there is no correlation between the amount of change in λNR(t, x, y, n) and the amount of change in I(t, x, y). This is because an edge indicates a boundary between objects, and there are completely different objects (i.e., completely different in distance and luminance value) on one side and the other side of the edge. Consequently, even a large amount of change in s(t, x, y, n) in this direction is acceptable. A contribution to SmoothTermλ is reduced by multiplying a "differential value of s(t, x, y, n) in this direction" by pacross(t, x, y), which is a small value.

In a direction along an edge of an image, there is a correlation between the amount of change in λNR(t, x, y, n) and the amount of change in I(t, x, y). This is because in a direction along an edge, the object is the same (i.e., same distance and same luminance value). Consequently, the amount of change in s(t, x, y, n) in this direction is to be reduced. The contribution to SmoothTermλ is increased by multiplying a "differential value of s(t, x, y, n) in this direction" by palong(t, x, y), which is a large value.

That is, the second term on the right-hand side of Expression 59 is a term that acts on acceptability of a change in s(t, x, y, n) in a direction crossing/along an edge. Note that αedge is a contribution rate relating to acceptability of a change in s(t, x, y, n) at an edge, and is a desired constant equal to or greater than 0.

Figure 44:
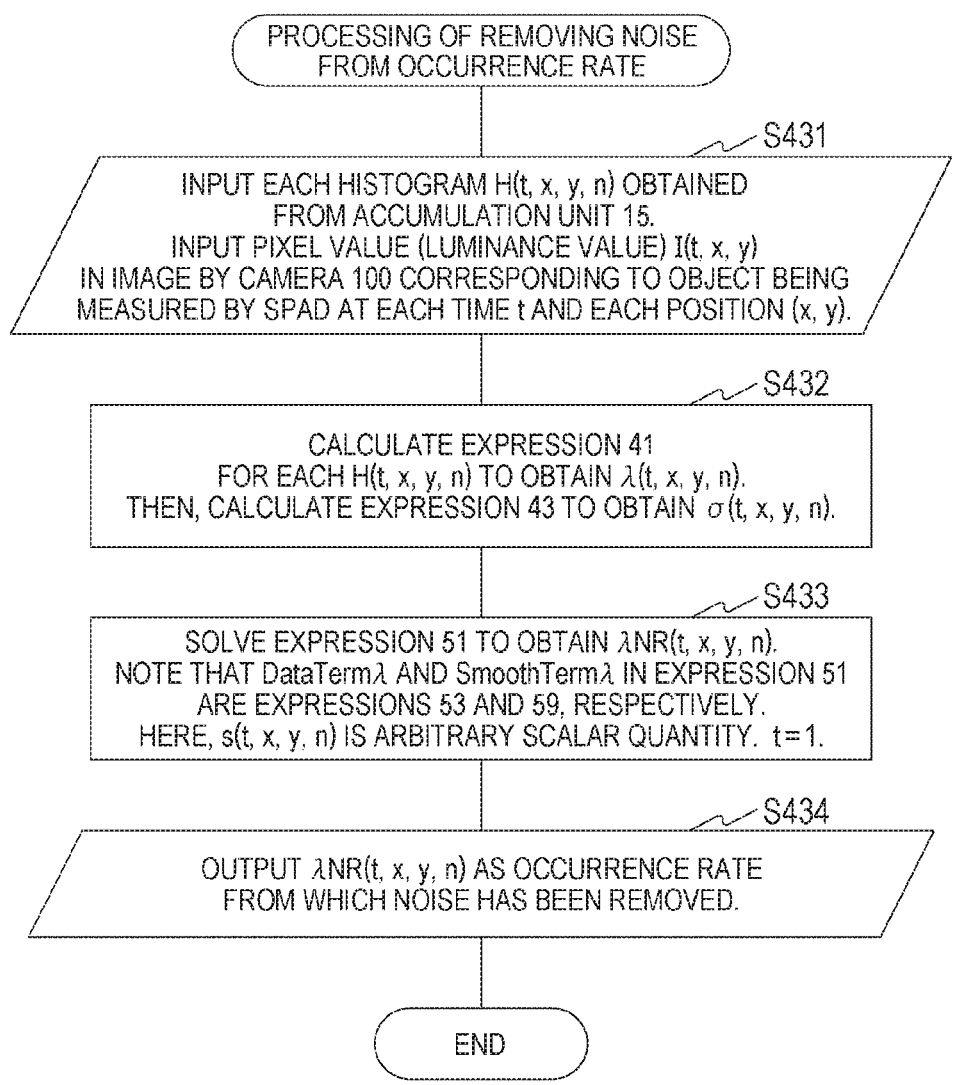
FIG. 44 is a flowchart illustrating an example of a processing procedure for removing noise from an occurrence rate according to a third working example of the fourth embodiment of the present technology.

FIG. 44 is a flowchart illustrating an example of a processing procedure for removing noise from an occurrence rate according to the third working example of the fourth embodiment of the present technology. This processing is performed td remove noise from an occurrence rate.

First, in step S431, each histogram H(t, x, y, n) obtained from the accumulation unit 15 is input. A pixel value (luminance value) I(t, x, y) in an image by the camera 100 corresponding to an object being measured by a SPAD at each time t and each position (x, y) is input. Then, the processing proceeds to step S432.

In step S432, Expression 41 is calculated for each H(t, x, y, n) to obtain λ(t, x, y, n). Then, Expression 43 is calculated to obtain σ(t, x, y, n). Then, the processing proceeds to step S433.

In step S433, Expression 51 is solved to obtain λNR(t, x, y, n). Note that DataTermλ and SmoothTermλ in Expression 51 are Expressions 53 and 59, respectively. Here, s(t, x, y, n) is an arbitrary scalar quantity. That is, sets of λNR(t, x, y, n) and s(t, x, y, n) are obtained such that a value obtained by adding Expressions 53 and 59 is minimized, and only λNR(t, x, y, n) among those obtained is used as a calculation result. Furthermore, t=1. Then, the processing proceeds to step S434.

In step S434, λNR(t, x, y, n) is output as an occurrence rate from which noise has been removed. Then, the series of processing ends.

By executing the processing illustrated in the drawing, noise is removed from an occurrence rate at each time t, each position (x, y), and each bin n in the SPAD array 13. Thereafter, the computation unit 16 detects a peak of the occurrence rate from which noise has been removed. Then, a value obtained by multiplying a bin corresponding to the peak by c×D/2 is output as a distance from the output terminal 17. Here, the peak detection is performed by a known technique. Alternatively, for an occurrence rate from which noise has been removed, a histogram HNR(t, x, y, n) may be calculated by the above-described Expression 44, and peak detection may be performed on this histogram HNR(t, x, y, n).

Fourth Working Example

In the above-described third working example, noise is removed from an occurrence rate. In a fourth working example, noise is removed from a histogram. That is, in the fourth working example, the distance measuring device 10 is used to perform distance measurement for each SPAD in the SPAD array 13. In particular, the features include removal of noise from a "histogram that is an observation value from the accumulation unit 15". The removal of noise from a histogram is performed by the computation unit 16. The fourth working example is an example in which "noise removal taking into account the time direction" is not performed, and it is assumed that t=1 only.

In the fourth working example, a histogram HNR(t, x, y, n), from which noise has been removed, represented by Expression 52 is obtained. Here, DataTermH is represented by the above-described Expression 56. Furthermore, SmoothTermH is represented by the following Expression 64.

[Math. 64]

$$SmoothTerm_H \equiv \alpha_{xy} \sum_{x=1}^{X} \sum_{y=1}^{Y} \left( \left\| \vec{s}_{(t,x,y)} - \frac{\frac{\partial}{\partial x} \vec{H}_{NR(t,x,y)}}{\frac{\partial}{\partial x} I_{(t,x,y)}} \right\|_2 \right.$$

$$\left. \left\| \vec{s}_{(t,x,y)} - \frac{\frac{\partial}{\partial y} \vec{H}_{NR(t,x,y)}}{\frac{\partial}{\partial y} I_{(t,x,y)}} \right\|_2 \right) +$$

$$\sum_{x=1}^{X} \sum_{y=1}^{Y} \sum_{n=0}^{N-1} \left( \| \mu_{across\,(t,x,y)} e_{across\,(t,x,y)}^T \nabla s_{(t,x,y,n)} \|_2 + \right.$$

$$\left. \| \mu_{along\,(t,x,y)} e_{along\,(t,x,y)}^T \nabla s_{(t,x,y,n)} \|_2 \right)$$

Expression 64

Note that a vector s(t, x, y) is defined by the above-described Expression 48. Furthermore, eacross(t, x, y), ealong(t, x, y), pacross(t, x, y), and palong(t, x, y) shown in Expression 64 are respectively defined by the above-described Expressions 60 to 63.

Note that when the value obtained by partially differentiating I(t, x, y) with respect to x or y is 0, division by zero occurs in the above-described Expression 59. Consequently, in practice, in order to avoid division by zero, when the value obtained by partially differentiating I(t, x, y) with respect to x or y is 0, replacement with a minute value is necessary. Since this is a known common practice and is irrelevant to the gist of this embodiment, this is not mentioned in the above-described Expression 64.

Since Expression 56 used in the fourth working example has already been described in the second working example, a detailed description will be omitted.

A detailed description of Expression 64 will be omitted because the description is the same as that of Expression 59 if λ is replaced with H. Note that αxy and αedge are desired constants equal to or greater than 0.

Figure 45:
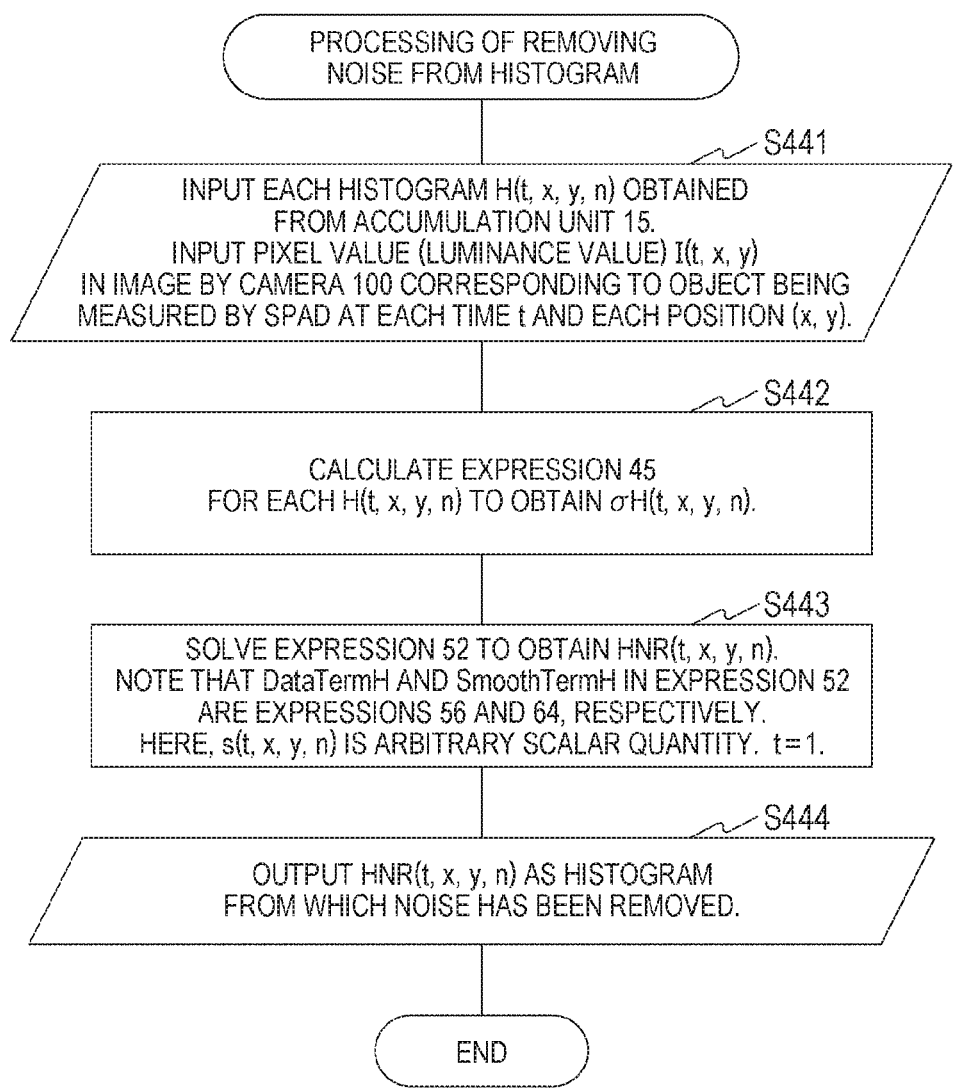
FIG. 45 is a flowchart illustrating an example of a processing procedure for removing noise from a histogram according to a fourth working example of the fourth embodiment of the present technology.

FIG. 45 is a flowchart illustrating an example of a processing procedure for removing noise from a histogram according to the fourth working example of the fourth embodiment of the present technology. This processing is performed to remove noise from a histogram.

First, in step S441, each histogram H(t, x, y, n) obtained from the accumulation unit 15 is input. A pixel value (luminance value) I(t, x, y) in an image by the camera 100 corresponding to an object being measured by a SPAD at each time t and each position (x, y) is input. Then, the processing proceeds to step S442.

In step S442, Expression 45 is calculated for each H(t, x, y, n) to obtain σH(t, x, y, n). Then, the processing proceeds to step S443.

In step S443, Expression 52 is solved to obtain HNR(t, x, y, n). Note that DataTermH and SmoothTermH in Expression 52 are Expressions 56 and 64, respectively. Here, s(t, x, y, n) is an arbitrary scalar quantity. That is, sets of HNR(t, x, y, n) and s(t, x, y, n) are obtained such that a value obtained by adding Expressions 56 and 64 is minimized, and only HNR(t, x, y, n) among those obtained is used as a calculation result. Furthermore, t=1. Then, the processing proceeds to step S444.

In step S444, HNR(t, x, y, n) is output as a histogram from which noise has been removed. Then, the series of processing ends.

By executing the processing illustrated in the drawing, noise is removed from a histogram at each time t, each position (x, y), and each bin n in the SPAD array 13. Thereafter, the computation unit 16 detects a peak of the histogram from which noise has been removed. Then, a value obtained by multiplying a bin corresponding to the peak by c×D/2 is output as a distance from the output terminal 17. Here, the peak detection is performed by a known technique.

Fifth Working Example

In a fifth working example, the distance measuring device 10 is used to perform distance measurement for each SPAD in the SPAD array 13. In particular, the features include removal of noise from an occurrence rate obtained from a "histogram that is an observation value from the accumulation unit 15" by the above-described Expression 41. The removal of noise from an occurrence rate is performed by the computation unit 16.

In the fifth working example, an occurrence rate λNR(t, x, y, n), from which noise has been removed, represented by Expression 51 is obtained. Here, DataTermλ is represented by the above-described Expression 53. Furthermore, SmoothTermλ is represented by the following Expression 65.

Since Expression 53 used in the fifth working example has already been described in the first working example, a detailed description will be omitted.

A first term on the right-hand side of Expression 65 will be described. Consideration is given to a block the size of (2×dT+1, 2×dX+1, 2×dY+1) centered on (t, x, y) in time and space. For example, dT=dX=dY=2. In this local block, it may be considered that there is a linear relationship between λNR(t, x, y, n) to be finally obtained and the corresponding image pixel value I(t, x, y). This is because, in a local block, there is a correlation between "sets of λNR(t, x, y, n) and I(t, x, y)" at each position in time and space. Consequently, in this linearity, a first-order coefficient is expressed as a(t, x, y, n), and a zero-order coefficient is expressed as b(t, x, y, n). The first term on the right-hand side of Expression 65 acts so that this linearity relationship may be established as much as possible. Here, n is 0 to N−1. Note that α1 is a contribution rate for the degree of establishment of this linearity relationship, and is a desired constant equal to or greater than 0.

A second term on the right-hand side of Expression 65 will be described. In a case where a change in value of I(t, x, y) in a block the size of (2×dT+1, 2×dX+1, 2×dY+1) centered on (t, x, y) in time and space is small, a(t, x, y, n) becomes unstable. This is because the following Expression 67 holds if b' is set so as to satisfy the following Expression 66 for an arbitrary value a'.

[Math. 66]

$$b' = b - (a' - a_{(t,x,y,n)}) \cdot I_{const} \quad \text{Expression 66}$$

[Math. 67]

$$a_{(t,x,y,n)} \cdot I_{const} + b_{(t,x,y,n)} = a' \cdot I_{const} + b' \quad \text{Expression 67}$$

Here, the value of I(t, x, y) is Iconst, which is always constant.

Consequently, the term for canceling the instability is the second term on the right-hand side of Expression 65. Even in a case where the first term alone is not enough to prevent a(t, x, y, n) from being unstable, this second term can act so that a small value is selected as the value of a(t, x, y, n) so that a(t, x, y, n) can be determined. Here, n is 0 to N−1. Note that α2 is a contribution rate for the instability cancellation, and is a desired constant equal to or greater than 0.

Figure 46:
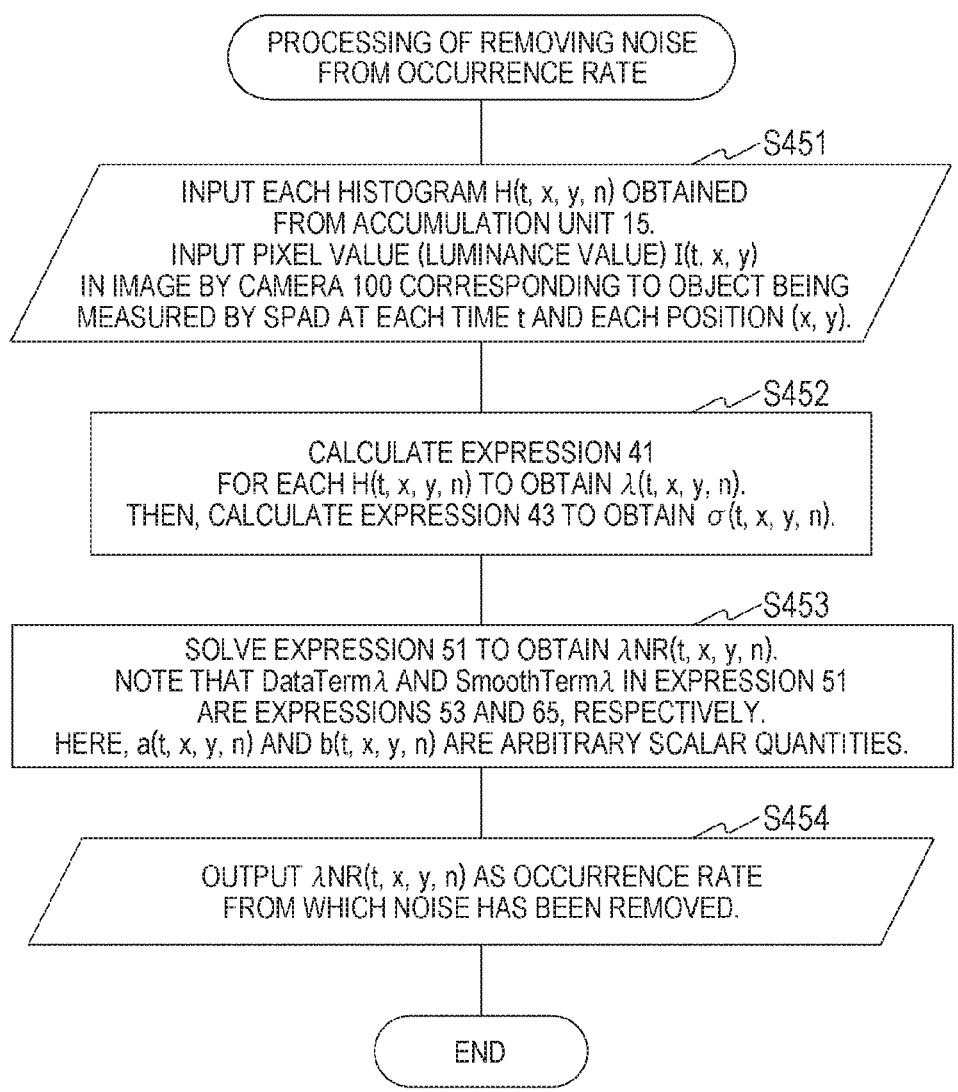
FIG. 46 is a flowchart illustrating an example of a processing procedure for removing noise from an occurrence rate according to a fifth working example of the fourth embodiment of the present technology.

FIG. 46 is a flowchart illustrating an example of a processing procedure for removing noise from an occurrence rate according to the fifth working example of the fourth embodiment of the present technology. This processing is performed to remove noise from an occurrence rate.

First, in step S451, each histogram H(t, x, y, n) obtained from the accumulation unit 15 is input. A pixel value

[Math. 65]

$$SmoothTerm_\lambda \equiv \alpha_1 \sum_t \sum_{x=1}^{X} \sum_{y=1}^{Y} \sum_{\substack{-dT \leq t_1 \leq dT \\ -dX \leq x_1 \leq dX \\ -dY \leq y_1 \leq dY}} \left\| \vec{\lambda}_{NR(t+t_1, x+x_1, y+y_1)} - \vec{a}_{(t,x,y)} \cdot I_{(t+t_1, x+x_1, y+y_1)} - \vec{b}_{(t,x,y)} \right\|_2 + \alpha_2 \sum_t \sum_{x=1}^{X} \sum_{y=1}^{Y} \|\vec{a}_{(t,x,y)}\|_2 \quad \text{Expression 65}$$

Note that a vector a(t, x, y) and a vector b(t, x, y) are defined by the above-described Expression 48. Furthermore, dT, dX, and dY are each a desired constant equal to or greater than 0.

(luminance value) I(t, x, y) in an image by the camera 100 corresponding to an object being measured by a SPAD at each time t and each position (x, y) is input. Then, the processing proceeds to step S452.

In step S452, Expression 41 is calculated for each H(t, x, y, n) to obtain λ(t, x, y, n). Then, Expression 43 is calculated to obtain σ(t, x, y, n). Then, the processing proceeds to step S453.

In step S453, Expression 51 is solved to obtain λNR(t, x, y, n). Note that DataTermλ and SmoothTermλ in Expression 51 are Expressions 53 and 65, respectively. Here, a(t, x, y, n) and b(t, x, y, n) are arbitrary scalar quantities. That is, sets of λNR(t, x, y, n), a(t, x, y, n), and b(t, x, y, n) are obtained such that a value obtained by adding Expressions 53 and 65 is minimized, and only λNR(t, x, y, n) among those obtained is used as a calculation result. Then, the processing proceeds to step S454.

In step S454, λNR(t, x, y, n) is output as an occurrence rate from which noise has been removed. Then, the series of processing ends.

By executing the processing illustrated in the drawing, noise is removed from an occurrence rate at each time t, each position (x, y), and each bin n in the SPAD array 13. Thereafter, the computation unit 16 detects a peak of the occurrence rate from which noise has been removed. Then, a value obtained by multiplying a bin corresponding to the peak by c×D/2 is output as a distance from the output terminal 17. Here, the peak detection is performed by a known technique. Alternatively, for an occurrence rate from which noise has been removed, a histogram HNR(t, x, y, n) may be calculated by the above-described Expression 44, and peak detection may be performed on this histogram HNR(t, x, y, n).

Sixth Working Example

In the above-described fifth working example, noise is removed from an occurrence rate. In a sixth working example, noise is removed from a histogram. That is, in the sixth working example, the distance measuring device 10 is used to perform distance measurement for each SPAD in the SPAD array 13. In particular, the features include removal of noise from a "histogram that is an observation value from the accumulation unit 15". The removal of noise from a histogram is performed by the computation unit 16.

In the sixth working example, a histogram HNR(t, x, y, n), from which noise has been removed, represented by Expression 52 is obtained. Here, DataTermH is represented by the above-described Expression 56. Furthermore, SmoothTermH is represented by the following Expression 68.

Figure 47:
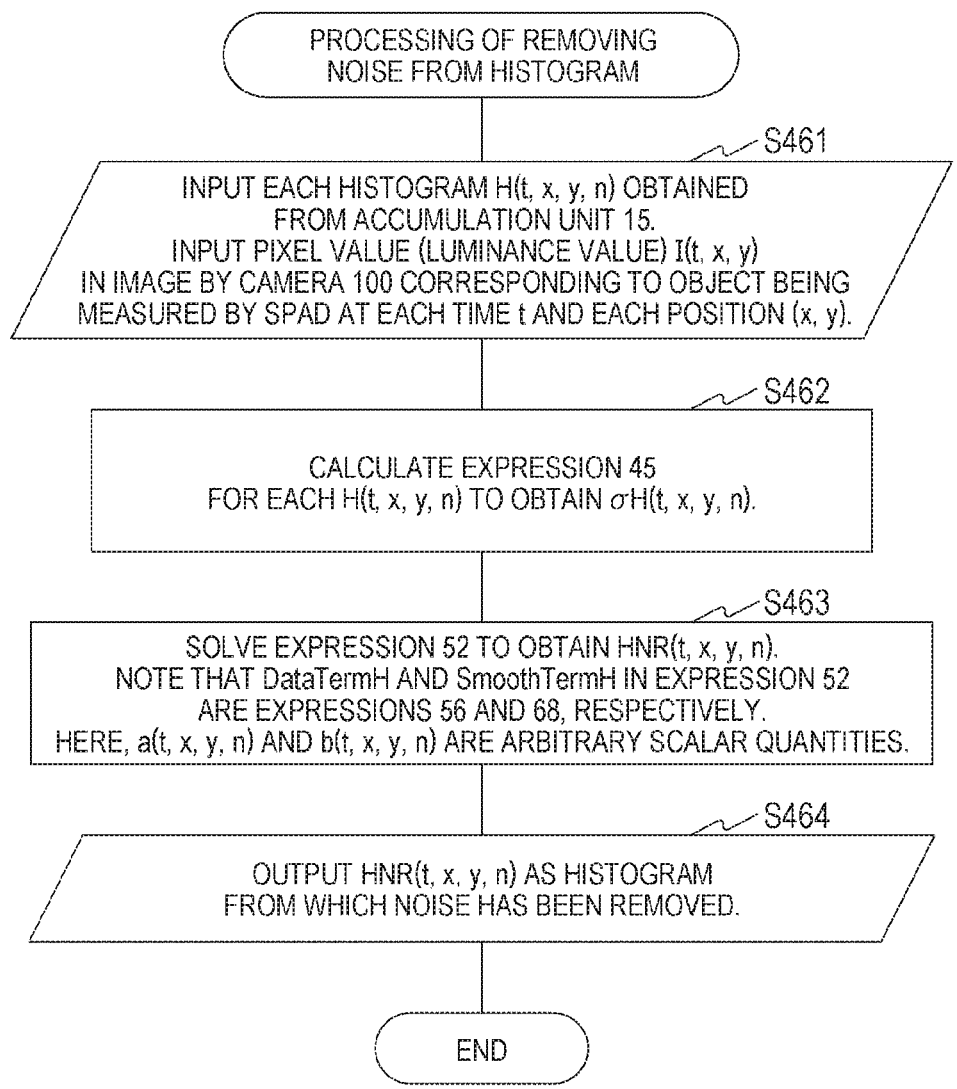
FIG. 47 is a flowchart illustrating an example of a processing procedure for removing noise from a histogram according to a sixth working example of the fourth embodiment of the present technology.

FIG. 47 is a flowchart illustrating an example of a processing procedure for removing noise from a histogram according to the sixth working example of the fourth embodiment of the present technology. This processing is performed to remove noise from a histogram.

First, in step S461, each histogram H(t, x, y, n) obtained from the accumulation unit 15 is input. A pixel value (luminance value) I(t, x, y) in an image by the camera 100 corresponding to an object being measured by a SPAD at each time t and each position (x, y) is input. Then, the processing proceeds to step S462.

In step S462, Expression 45 is calculated for each H(t, x, y, n) to obtain σH(t, x, y, n). Then, the processing proceeds to step S463.

In step S463, Expression 52 is solved to obtain HNR(t, x, y, n). Note that DataTermH and SmoothTermH in Expression 52 are Expressions 56 and 68, respectively. Here, a(t, x, y, n) and b(t, x, y, n) are arbitrary scalar quantities. That is, sets of HNR(t, x, y, n), a(t, x, y, n), and b(t, x, y, n) are obtained such that a value obtained by adding Expressions 56 and 68 is minimized, and only HNR(t, x, y, n) among those obtained is used as a calculation result. Then, the processing proceeds to step S464.

In step S464, HNR(t, x, y, n) is output as a histogram from which noise has been removed. Then, the series of processing ends.

By executing the processing illustrated in the drawing, noise is removed from a histogram at each time t, each position (x, y), and each bin n in the SPAD array 13. Thereafter, the computation unit 16 detects a peak of the histogram from which noise has been removed. Then, a value obtained by multiplying a bin corresponding to the peak by c×D/2 is output as a distance from the output terminal 17. Here, the peak detection is performed by a known technique.

[Effect]

In the fourth embodiment, when noise is removed from a histogram or an occurrence rate, a correction is performed taking into account two policies. That is, a first policy is to correct a histogram or an occurrence rate so that the histogram or the occurrence rate may match an observation value as much as possible. Furthermore, a second policy is to perform a correction so as to reduce the change between histograms or occurrence rates in proximity to each other. The second policy may further use a correlation with an image obtained from an attached camera to operate the acceptable amount of change between neighbors depending on each position (t, x, y) in time and space.

[Math. 68]

$$SmoothTerm_H \equiv \alpha_1 \sum_t \sum_{x=1}^{X} \sum_{y=1}^{Y} \sum_{\substack{-dT \leq t_1 \leq dT \\ -dX \leq x_1 \leq dX \\ -dY \leq y_1 \leq dY}} \left\| \vec{H}_{NR(t+t_1, x+x_1, y+y_1)} - \vec{a}_{(t,x,y)} \cdot I_{(t+t_1, x+x_1, y+y_1)} - \vec{b}_{(t,x,y)} \right\|_2 + \alpha_2 \sum_t \sum_{x=1}^{X} \sum_{y=1}^{Y} \|\vec{a}_{(t,x,y)}\|_2 \quad \text{Expression 68}$$

Note that a vector a(t, x, y) and a vector b(t, x, y) are defined by the above-described Expression 48. Furthermore, dT, dX, and dY are each a desired constant equal to or greater than 0.

Since Expression 56 used in the sixth working example has already been described in the second working example, a detailed description will be omitted.

A detailed description of Expression 68 will be omitted because the description is the same as that of Expression 65 if λ is replaced with H. Note that α1 and α2 are desired constants equal to or greater than 0.

Therefore, in the fourth embodiment, noise can be removed from a histogram or an occurrence rate with a small amount of computation and without assuming a positional relationship in advance.

[Gist]

The gist of the fourth embodiment is as follows.

(1) A method of removing noise from a histogram or an occurrence rate obtained from a histogram including:

an input step of inputting a first histogram or a first occurrence rate at each position in time and space;

a noise removal/calculation step of removing noise from the first histograms or the first histograms and calculating second histograms or second occurrence rates; and an output step of outputting the second histograms or the second occurrence rates, in which in the noise removal/calculation step, processing of determining the second histograms or the second occurrence rates is performed so that the total of two operators may become an extreme value, the two operators being a first operator that acts so that the second histograms or the second occurrence rates may be equal to the first histograms or the first occurrence rates, and a second operator that acts so that the second histograms or the second occurrence rates in proximity to each other in time and space may have a specific relationship.

(2) The method of removing noise from a histogram or an occurrence rate obtained from a histogram according to (1), in which the second operator acts so as to reduce a difference between the second histograms or the second occurrence rates in proximity to each other in time and space.

(3) The method of removing noise from a histogram or an occurrence rate obtained from a histogram according to (1), further including an image input step of inputting an image, in which the second operator acts so that the second histograms or the second occurrence rates in time and space may be correlated with the image.

(4) The method of removing noise from a histogram or an occurrence rate obtained from a histogram according to (3), in which the second operator acts so that a ratio between a "change in pixel value of the image" and a "change in the second histograms or the second occurrence rates" in a direction along an edge in the image may become constant.

(5) The method of removing noise from a histogram or an occurrence rate obtained from a histogram according to (3), in which the second operator acts so that, for every local region in time and space, the image and "the second histograms or the second occurrence rates" may have a linear relationship.

6. Fifth Embodiment

[Outline]

As described above, a distance to a target object can be obtained by detecting a peak in a histogram and obtaining a time corresponding to the peak. Conventionally, a determination by an artificial threshold has been performed for this peak detection. In this fifth embodiment, a theoretically correct determination is performed for this peak detection.

Note that a "probability of arrival of a photon during a time (D) corresponding to a certain bin" is a value obtained by multiplying an occurrence rate by time D, and constant multiplication (multiplication by D) is not taken into consideration in other embodiments. However, in the fifth embodiment, an occurrence rate may be considered to be defined as a value obtained by multiplying an "occurrence rate", which is a term generally widely used, by D.

As described above, Expression 8 is the final expression (the probability density function of the occurrence rate p(n) when the frequency h(n) of each bin n has been observed) derived from the theory according to this embodiment. Thus, the total of values obtained by dividing, by a variance, a square of an error in a case where an occurrence rate of each bin n is p(n) when a frequency h(n) of each bin n is observed is represented by the following Expression 69.

[Math. 69]

$$\frac{1}{N} \sum_{n=0}^{N-1} \left\{ \frac{p_{(n)} - \frac{h_{(n)}}{M_{(n-1)}}}{\sqrt{2 \cdot \frac{1}{M_{(n-1)}} \cdot \frac{h_{(n)}}{M_{(n-1)}} \cdot \left(1 - \frac{h_{(n)}}{M_{(n-1)}}\right)}} \right\}^2 \qquad \text{Expression 69}$$

This means that the smaller the value of Expression 69, the more highly likely that the occurrence rate of each bin n is p(n). Here, n is 0 to N−1.

Figure 48:
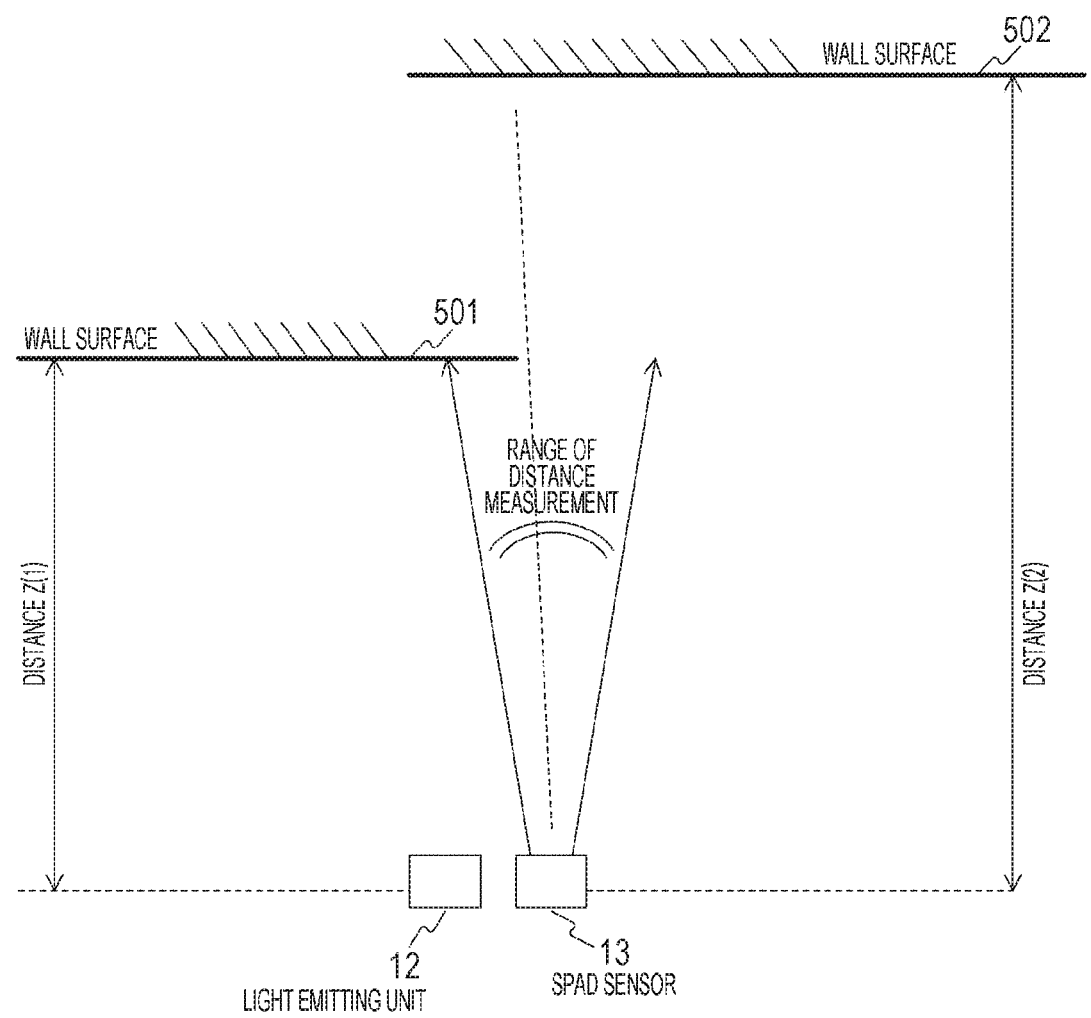
FIG. 48 is a diagram illustrating a scene of a first example of distance measurement according to a fifth embodiment of the present technology.
Figure 49A:
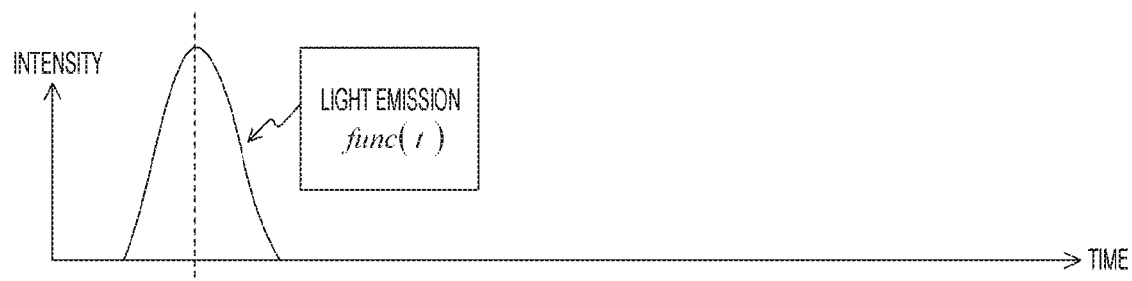
FIG. 49 is a diagram illustrating an intensity distribution in the first example of the distance measurement according to the fifth embodiment of the present technology.
Figure 49B:
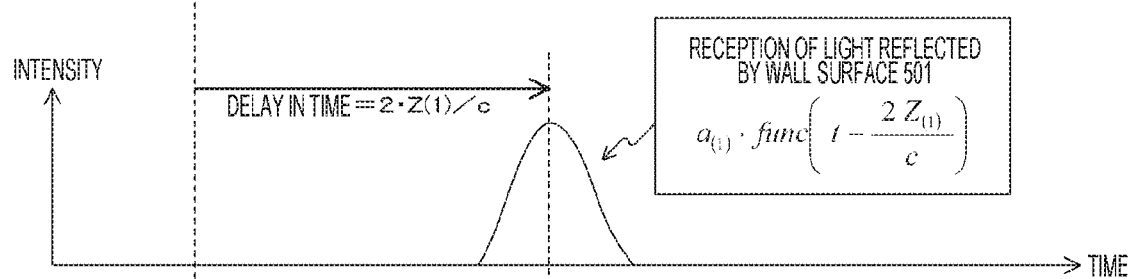
Figure 49C:
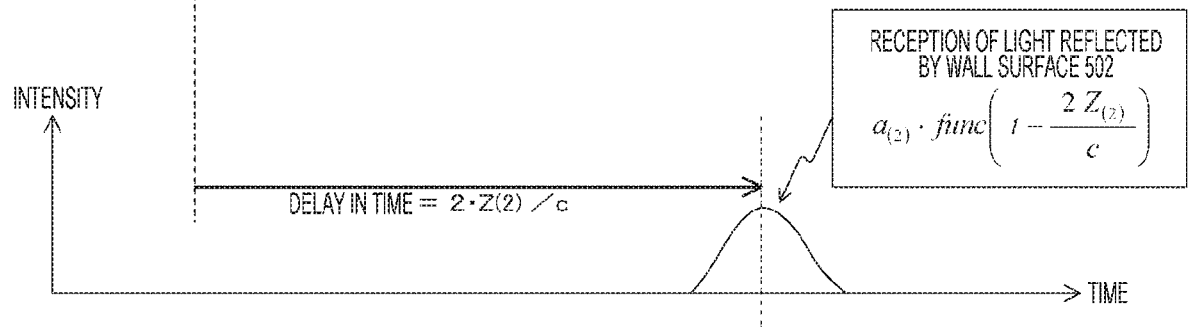
Figure 49D:
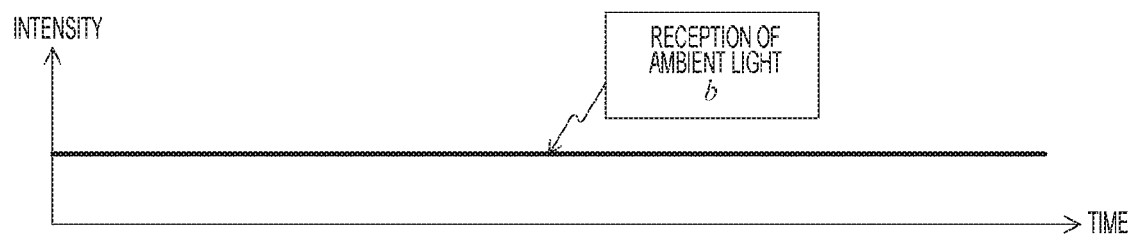

FIG. 48 is a diagram illustrating a scene of a first example of distance measurement according to the fifth embodiment of the present technology.

Here, consideration is given to a case where a SPAD sensor 13 is measuring distances of objects (wall surfaces 501 and 502) at different distances at the same time. The SPAD sensor 13 does not perform distance measurement in one direction, but in practice performs distance measurement in the whole direction with a certain solid angle (the range of distance measurement in the drawing). The drawing illustrates a scene where the wall surfaces 501 and 502 are in the range of distance measurement. It is assumed that the wall surfaces 501 and 502 are at distances Z(1) and Z(2), respectively.

FIG. 49 is a diagram illustrating an intensity distribution in the first example of distance measurement according to the fifth embodiment of the present technology.

It is assumed that light is emitted from a light emitting unit 12 as illustrated in A in the drawing. Since an intensity changes over time, this intensity is expressed as func(t). By measuring the intensity of light emitted from the light emitting unit 12 in advance, this func(t) becomes known.

The SPAD sensor 13 receives light emitted from the light emitting unit 12 and then reflected by the wall surface 501. In this case, as illustrated in B in the drawing, the intensity distribution is shifted in time by 2×Z(1)/c from A in the drawing. However, since attenuation occurs, the waveform becomes a(1) times the intensity of A in the drawing. Here, a(1) is less than 1, and depends on Z(1) and a reflectance of the wall surface 501.

The SPAD sensor 13 receives light emitted from the light emitting unit 12 and then reflected by the wall surface 502. In this case, as illustrated in C in the drawing, the intensity distribution is shifted in time by 2×Z(2)/c from A in the drawing. However, since attenuation occurs, the waveform becomes a(2) times the intensity of A in the drawing. Here, a(2) is less than 1, and depends on Z(2) and a reflectance of the wall surface 502.

Furthermore, the SPAD sensor 13 receives ambient light. The ambient light is constant regardless of time as illustrated in D in the drawing, and is expressed as b.

Thus, in the situation of the first example, the intensity of light received by the SPAD sensor 13 is represented by the following Expression 70.

[Math. 70]

$$b + a_{(1)} \cdot func\left(t - \frac{2Z_{(1)}}{c}\right) + a_{(2)} \cdot func\left(t - \frac{2Z_{(2)}}{c}\right) \qquad \text{Expression 70}$$

In the above-described first example, two objects are assumed. A further generalized case is considered in which the SPAD sensor 13 performs distance measurement on K objects at different distances at the same time. In this case, the intensity of received light is represented by the following Expression 71.

[Math. 71]

$$b + \sum_{k=1}^{K} \left\{ a_{(k)} \cdot func\left( t - \frac{2Z_{(k)}}{c} \right) \right\} \quad \text{Expression 71}$$

Note that a distance to a k-th object is expressed as $Z(k)$, and an attenuation rate for the object is expressed as $a(k)$. Here, k=1 to K.

Thus, an occurrence rate $p(n)$ of each bin n is represented by the following Expression 72.

[Math. 72]

$$p(n) = \quad \text{Expression 72}$$

$$\left\{ b + \sum_{k=1}^{K} \left\{ a_{(k)} \cdot func\left( nD - \frac{2Z_{(k)}}{c} \right) \right\} \right\} \times D$$

Note that func(t) is known as described above.

Summarizing the above, in a case where the SPAD sensor 13 is performing distance measurement on K objects at different distances at the same time, assuming that $p(n)$ is expressed by Expression 72, b, a(k) and Z(k) that minimize Expression 69 may be obtained. The obtained values are the most probable values when a frequency h(n) of each bin n is observed. That is, the obtained b is the intensity (luminance value) of the ambient light. a(k) is an intensity (luminance value) when a k-th target object is illuminated by active light. Z(k) is a distance to the k-th target object. Here, k=1 to K.

Next, the value of the above-described K will be discussed.

The above-described Expression 72 is an expression expressing p(n) as a function of n. In a case where the SPAD sensor 13 is actually performing distance measurement on K0 objects at different distances at the same time, true occurrence rate can be expressed by "Expression 72 where K=K0". In a case where K1<K0, the true occurrence rate cannot be expressed by "Expression 72 where K=K1". This is because, from analogical reasoning based on the above description that the intensity of light is expressed by Expression 70 in a case where K0=2 (FIG. 48), it is apparent that the same applies also to cases other than K0=2.

Conversely, consideration is given to K2 that satisfies K0<K2. In a case where at least a(k)=0 is set for any k that satisfies K0<k≤K2, the true occurrence rate can be expressed by "Expression 72, where K=K2", although the expression is redundant.

What has been described above with respect to the above-described Expression 12 can also be said for "minimization of Expression 69". Minimizing Expression 69 means making p(n) to be closer to an "observation value h(n)/M(n−1)" for any n that satisfies n=0 to N−1. The larger the value of K, the larger the degree of freedom of p(n), which is a function of n. Thus, it is possible to make the "minimum value of Expression 69" smaller as the value of K is larger. That is, in a case where K3<K4, the "minimum value of Expression 69, where K=K4" can be made to be equal to or smaller than the "minimum value of Expression 69, where K=K3". In fact, in a case where a(k)=0 is set for any k that satisfies K3<k≤K4, the "minimum value of Expression 69, where K=K4" can be made to be the same as the "minimum value of Expression 69, where K=K3".

In a case where the SPAD sensor 13 is performing distance measurement on K0 objects at different distances at the same time, since the true occurrence rate can be expressed by Expression 72, the "minimum value of Expression 69, where K=K0" becomes significantly small. Furthermore, in a case where K0<K2, the true occurrence rate can be expressed by Expression 72 although the expression is redundant, so the "minimum value of Expression 69, where K=K2" also becomes significantly small. Furthermore, in a case where K1<K0, the true occurrence rate cannot be expressed by Expression 72, so the "minimum value of Expression 69, where K=K1" becomes large.

From this, the "number of objects at different distances" in the range of distance measurement by the SPAD sensor 13 can be found out by the following procedure. That is, the "minimum value of Expression 69" is checked while the value of K is decremented by one from the largest value. The value of K immediately preceding an abrupt increase in the "minimum value of Expression 69" is the "number of objects at different distances".

First Working Example

Figure 50:
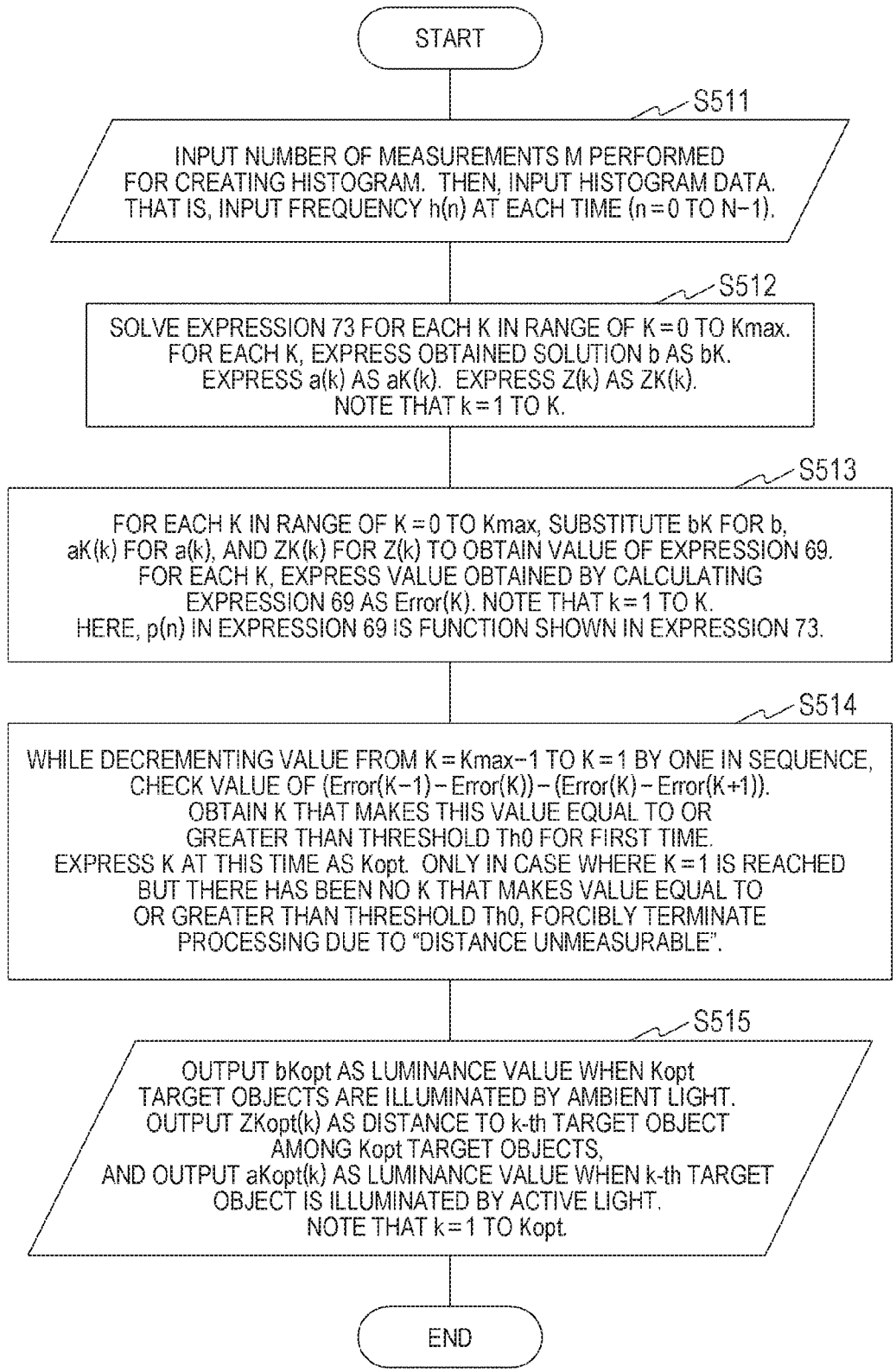
FIG. 50 is a flowchart illustrating an example of a processing procedure for measuring a distance according to a first working example of the fifth embodiment of the present technology.

FIG. 50 is a flowchart illustrating an example of a processing procedure for measuring a distance according to a first working example of the fifth embodiment of the present technology. This processing is performed by a computation unit 16, and the result is output from an output terminal 17.

First, in step S511, the number of measurements M performed for creating a histogram is input. Then, histogram data is input. That is, a frequency h(n) at each time (n=0 to N−1) is input. Then, the processing proceeds to step S512.

In step S512, the following Expression 73 is solved for each K in the range of K=0 to Kmax.

[Math. 73]

$$\underset{\{b, \{(a_{(k)}, Z_{(k)}) | k=1-K\}\}}{\mathrm{argmin}} \quad \text{Expression 73}$$

$$\left\{ \frac{1}{N} \sum_{n=0}^{N-1} \left\{ \frac{p(n) - \frac{h_{(n)}}{M_{(n-1)}}}{\sqrt{2 \cdot \frac{1}{M_{(n-1)}} \cdot \frac{h_{(n)}}{M_{(n-1)}} \cdot \left(1 - \frac{h_{(n)}}{M_{(n-1)}}\right)}} \right\}^2 \right\}$$

where $p(n) =$ $$\left\{ b + \sum_{k=1}^{K} \left\{ a_{(k)} \cdot func\left( nD - \frac{2Z_{(k)}}{c} \right) \right\} \right\} \times D,$$

and $M_{(n-1)} = M - \sum_{j=0}^{n-1} h_{(j)}$

For each K, an obtained solution b is expressed as bK. a(k) is expressed as aK(k). Z(k) is expressed as ZK(k). Note that k=1 to K. Here, Kmax is a desired constant. The maximum number assumed as the "number of objects at different distances" in the range of distance measurement by the SPAD sensor 13 may be set to Kmax. Then, the processing proceeds to step S513.

In step S513, for each K in the range of K=0 to Kmax, bK is substituted for b, aK(k) is substituted for a(k), and ZK(k) is substituted for Z(k) to obtain the value of Expression 69. For each K, the value obtained by calculating Expression 69 is expressed as Error(K). Note that k=1 to K. Here, p(n) in Expression 69 is a function shown in Expression 73. Then, the processing proceeds to step S514.

In step S514, while decrementing a value from K=Kmax−1 to K=1 by one in sequence, a value of (Error (K−1)−Error(K))−(Error(K)−Error(K+1)) is checked. K that makes this value equal to or greater than a threshold Th0 for the first time is obtained. The K at this time is expressed as Kopt. Only in a case where K=1 is reached but there has been no K that makes the value equal to or greater than the threshold Th0, forced termination occurs due to "distance unmeasurable". Here, Th0 is a desired constant. Then, the processing proceeds to step S515.

In step S515, bKopt is output from the output terminal 17 as a luminance value when Kopt target objects are illuminated by the ambient light. ZKopt(k) is output as the distance to the k-th target object among the Kopt target objects, and aKopt(k) is output as a luminance value when the k-th object is illuminated by the active light. Note that k=1 to Kopt. Then, the series of processing ends.

In this way, in the first working example, the most probable result obtained from the observation value h(n) can be obtained.

Second Working Example

A second working example is an example that also takes into account a state in which multipath (in a case where light is received after being reflected at a plurality of locations) occurs.

Figure 51:
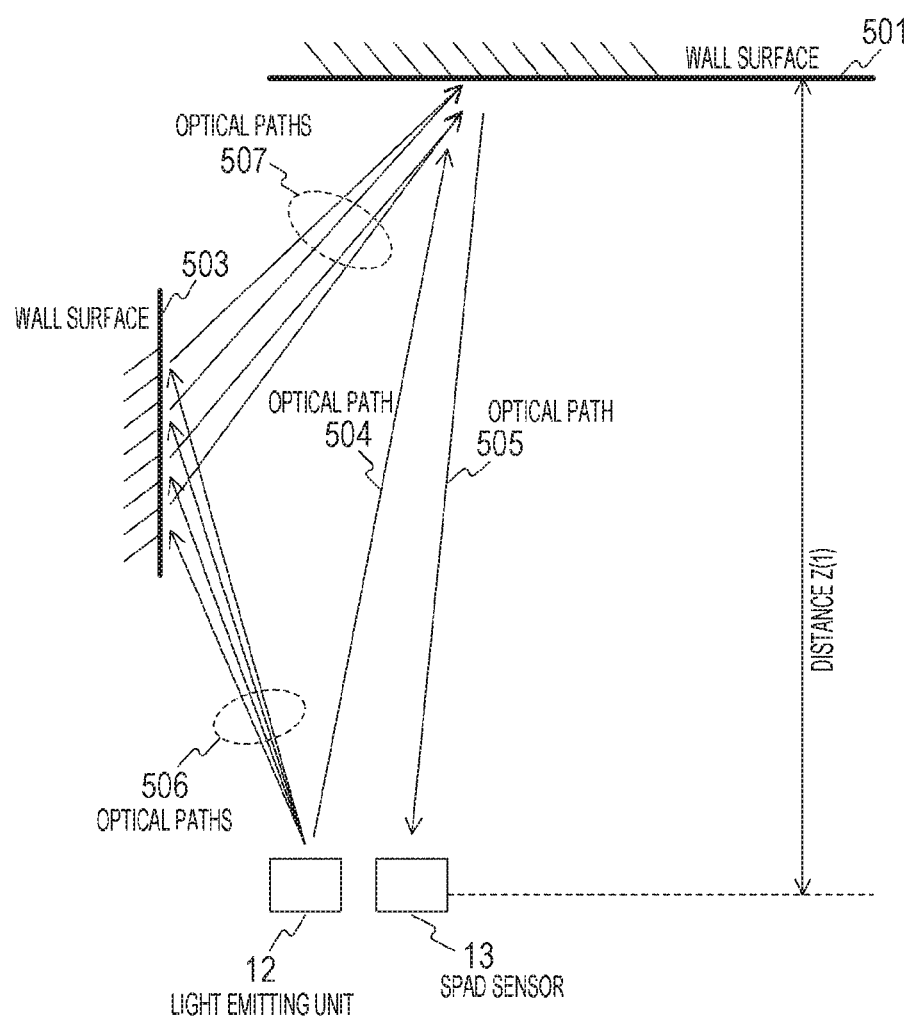
FIG. 51 is a diagram illustrating a scene of a second example of the distance measurement according to the fifth embodiment of the present technology.
Figure 52A:
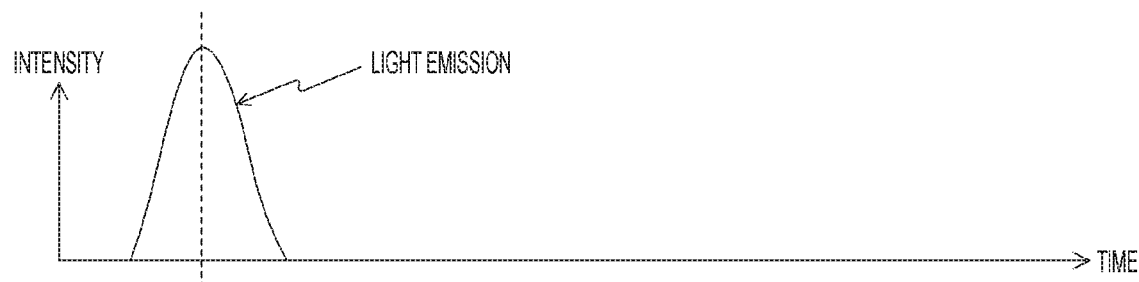
FIG. 52 is a diagram illustrating an intensity distribution in the second example of the distance measurement according to the fifth embodiment of the present technology.
Figure 52B:
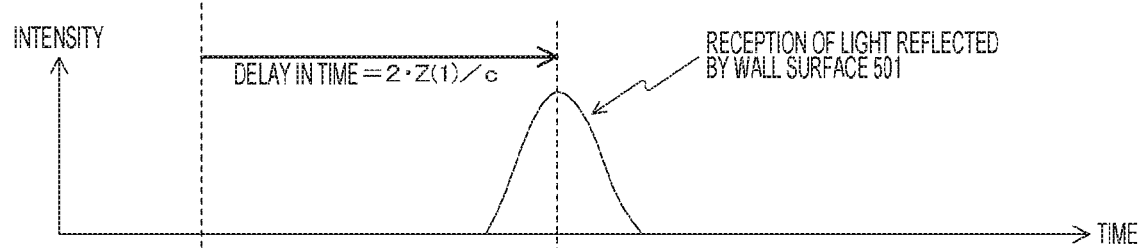
Figure 52C:
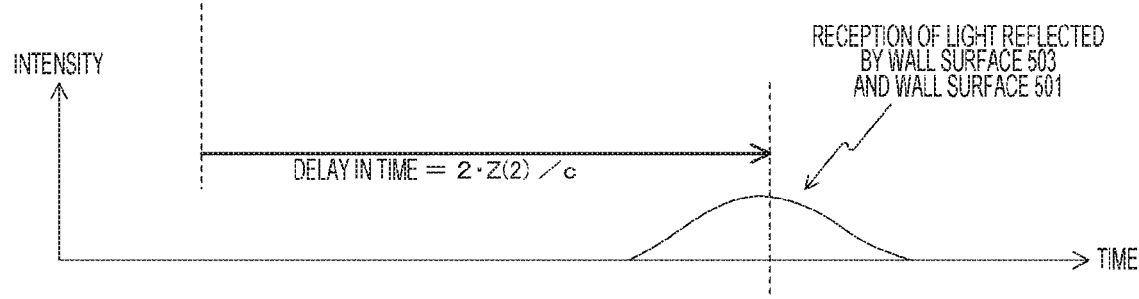
Figure 52D:
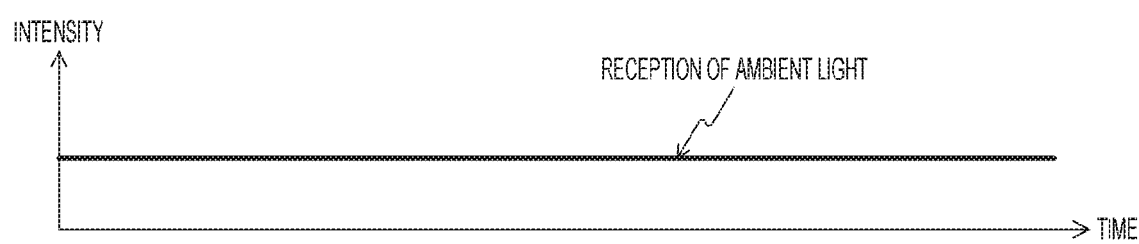

FIG. 51 is a diagram illustrating a scene of a second example of the distance measurement according to the fifth embodiment of the present technology. In the drawing, light emitted from the light emitting unit 12 is received by the SPAD sensor 13 after being reflected by the wall surface 501 (see optical paths 504 and 505 in the drawing). At the same time, the light emitted from the light emitting unit 12 is first reflected by a wall surface 503, further reflected by the wall surface 501, and received by the SPAD sensor 13 (see a group of optical paths 506, a group of optical paths 507, and the optical path 505).

Note that it is assumed that the wall surface 501 is at distance Z(1). Furthermore, it is assumed that the total distance of the group of optical paths 506, the group of optical paths 507, and the optical path 505 is 2×Z(2).

Here, supplementary information will be given for the light (the group of optical paths 506, the group of optical paths 507, and the optical path 505) that reaches the SPAD sensor 13 after being reflected at the two wall surfaces 503 and 501. Since diffuse reflection occurs on the wall surface 503, the light that reaches the SPAD sensor 13 is not light reflected from one point on the wall surface 503, but is light reflected from all points in a certain region. Thus, as illustrated in the drawing, the groups of optical paths 506 and 507 illustrate light that reaches the SPAD sensor 13, not as one "optical path" but as a "group of optical paths" as indicated with a plurality of arrows.

FIG. 52 is a diagram illustrating an intensity distribution in the second example of the distance measurement according to the fifth embodiment of the present technology.

It is assumed that light is emitted from the light emitting unit 12 as illustrated in A in the drawing. The intensity changes over time. This intensity is assumed to be in a normal distribution.

The SPAD sensor 13 receives light emitted from the light emitting unit 12 and then reflected by the wall surface 501 via the optical paths 504 and 505. In this case, as illustrated in B in the drawing, the intensity distribution is shifted in time by 2×Z(1)/c from A in the drawing. However, since attenuation occurs, the waveform becomes a(1) times the intensity of A in the drawing. Here, a(1) is less than 1, and depends on Z(1) and a reflectance of the wall surface 501.

The SPAD sensor 13 receives light emitted from the light emitting unit 12 and then reflected by the wall surfaces 503 and 501 via the group of optical paths 506, the group of optical paths 507, and the optical path 505. In this case, as illustrated in C in the drawing, the intensity distribution is shifted in time by 2×Z(2)/c from A in the drawing. However, since attenuation occurs, the waveform becomes a(2) times the intensity of A in the drawing. Here, a(2) is less than 1, and depends on Z(2) and reflectances of the wall surfaces 503 and 501.

Moreover, each optical path in the groups of optical paths 506 and 507 has a slightly different distance. Thus, the distance of the light that arrives after being reflected by the wall surfaces 503 and 501 is not exactly 2×Z(2) but a value around 2×Z(2). That is, the value has a wide width as illustrated in C in the drawing. Expressed mathematically, the variance of the normal distribution of C in the drawing is larger than the variance of the normal distribution of A in the drawing.

Furthermore, the SPAD sensor 13 receives ambient light. As illustrated in D in the drawing, the ambient light is constant regardless of time, and is expressed as b.

In the situation of the second example, the intensity of light received by the SPAD sensor 13 is a value obtained by summing B, C, and D in the drawing.

In the above-described second example, two objects are assumed. A further generalized case is considered in which distance measurement is performed on K reflections from different distances at the same time. In this case, the occurrence rate p(n) is represented by the following Expression 74.

[Math. 74]

$$p(n) = \left\{ b + \sum_{k=1}^{K} \left\{ a_{(k)} \cdot \frac{1}{\sqrt{2\pi}\,\sigma_{(k)}} \exp\left( \frac{1}{2\sigma_{(k)}^2} \left( nD - \frac{2Z_{(k)}}{c} \right)^2 \right) \right\} \right\} \times D$$

Expression 74

Note that a distance to the k-th object is Z(k), an attenuation rate for the object is a(k), and a variance is a(k). Here, k=1 to K.

Summarizing the above, in a case where the SPAD sensor 13 is performing distance measurement on K reflections from different distances at the same time, assuming that p(n) is expressed by Expression 74, b, a(k), σ(k), and Z(k) that minimize Expression 69 may be obtained. The obtained values are the most probable values when a frequency h(n) of each bin n is observed. That is, the obtained b is the intensity (luminance value) of the ambient light. a(k) is an intensity (luminance value) when a k-th target object is illuminated by active light. Z(k) is a distance to the k-th target object. Here, k=1 to K. In particular, when the value of σ(k) is large, it means that the light has arrived after being reflected at a plurality of locations, and does not mean that there is actually an object at a distance of Z(k). That is, it is possible to output only a distance to an object that actually exists by excluding σ(k) having a large value (for example, equal to or greater than a desired threshold Th1) and then outputting Z(k).

Figure 53:
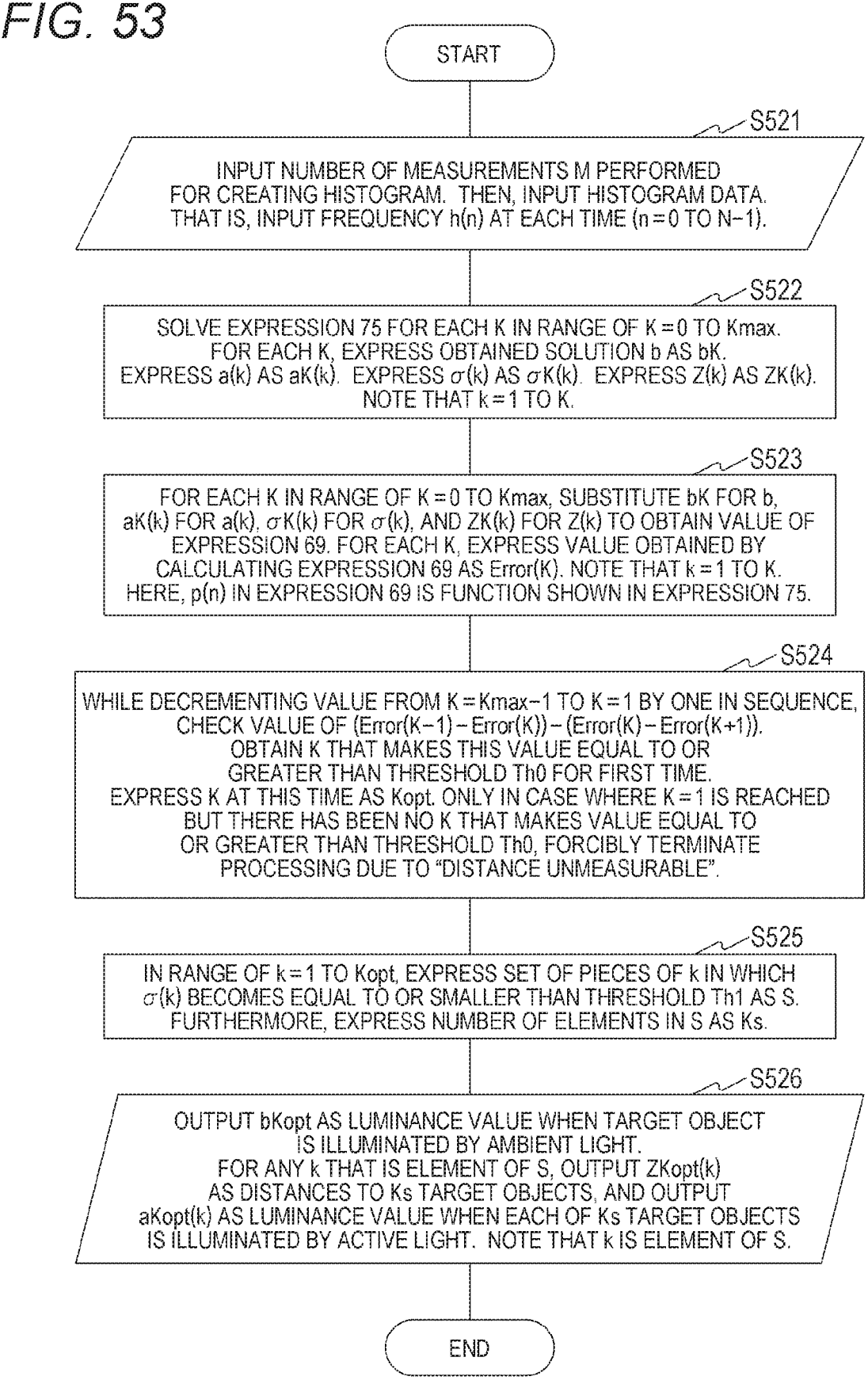
FIG. 53 is a flowchart illustrating an example of a processing procedure for measuring a distance according to a second working example of the fifth embodiment of the present technology.

FIG. 53 is a flowchart illustrating an example of a processing procedure for measuring a distance according to the second working example of the fifth embodiment of the present technology. This processing is performed by the computation unit 16, and the result is output from the output terminal 17.

First, in step S521, the number of measurements M performed for creating a histogram is input. Then, histogram data is input. That is, a frequency h(n) at each time (n=0 to N−1) is input. Then, the processing proceeds to step S522.

In step S522, the following Expression 75 is solved for each K in the range of K=0 to Kmax.

[Math. 75]

$$\underset{\{b,\{(a_{(k)},\sigma_{(k)},Z_{(k)})|k=1-K\}\}}{\mathrm{argmin}} \quad \text{Expression 75}$$

$$\left\{ \frac{1}{N} \sum_{n=0}^{N-1} \left\{ \frac{p(n) - \dfrac{h_{(n)}}{M_{(n-1)}}}{\sqrt{2 \cdot \dfrac{1}{M_{(n-1)}} \cdot \dfrac{h_{(n)}}{M_{(n-1)}} \cdot \left(1 - \dfrac{h_{(n)}}{M_{(n-1)}}\right)}} \right\}^2 \right\},$$

$$\text{where } p(n) = \left\{ b + \sum_{k=1}^{K} \left\{ a_{(k)} \cdot \frac{1}{\sqrt{2\pi}\,\sigma_{(k)}} \right. \right.$$

$$\left. \left. \exp\!\left( \frac{1}{2\sigma_{(k)}^2}\!\left(nD - \frac{2Z_{(k)}}{c}\right)^2 \right) \right\} \right\} \times D,$$

$$\text{and } M_{(n-1)} = M - \sum_{j=0}^{n-1} h_{(j)}$$

For each K, an obtained solution b is expressed as bK. a(k) is expressed as aK(k). σ(k) is expressed as σK(k). Z(k) is expressed as ZK(k). Note that k=1 to K. Here, Kmax is a desired constant. Then, the processing proceeds to step S523.

In step S523, for each K in the range of K=0 to Kmax, bK is substituted for b, aK(k) is substituted for a(k), σK(k) is substituted for σ(k), and ZK(k) is substituted for Z(k) to obtain the value of Expression 69. For each K, the value obtained by calculating Expression 9 is expressed as Error (K). Note that k=1 to K. Here, p(n) in Expression 69 is a function shown in Expression 75. Then, the processing proceeds to step S524.

In step S524, while decrementing a value from K=Kmax−1 to K=1 by one in sequence, a value of (Error (K−1)−Error(K))−(Error(K)−Error(K+1)) is checked. K that makes this value equal to or greater than a threshold Th0 for the first time is obtained. The K at this time is expressed as Kopt. Only in a case where K=1 is reached but there has been no K that makes the value equal to or greater than the threshold Th0, forced termination occurs due to "distance unmeasurable". Here, Th0 is a desired constant. Then, the processing proceeds to step S525.

In step S525, in the range of k=1 to Kopt, a set of pieces of k in which σ(k) becomes equal to or smaller than the threshold Th1 is expressed as S. Furthermore, the number of elements in S is expressed as Ks. Here, Th1 is a desired constant. Then, the processing proceeds to step S526.

In step S526, bKopt is output as a luminance value when a target object is illuminated by the ambient light. For any k that is an element of S, ZKopt(k) is output as distances to Ks target objects, and aKopt(k) is output as a luminance value when each of the Ks target objects is illuminated by the active light. Note that k is an element of S. Then, the series of processing ends.

In this way, in the second working example, the most probable result obtained from the observation value h(n) can be obtained in consideration of multipath.

Third Working Example

In a third working example, the above-described second working example will be discussed from another viewpoint.

In the above-described second working example, the occurrence rate is modeled as the total of a plurality of "upward-convex functions". Then, the portion where the "upward-convex functions" have large variances is determined to be light received after being reflected at a plurality of locations. Now, with no need for modeling the occurrence rate, in a case where a peak detected by a conventionally known peak detection method is not a steep peak but is a wide peak, it is possible to determine that the light has been received after being reflected at a plurality of locations.

Figure 54:
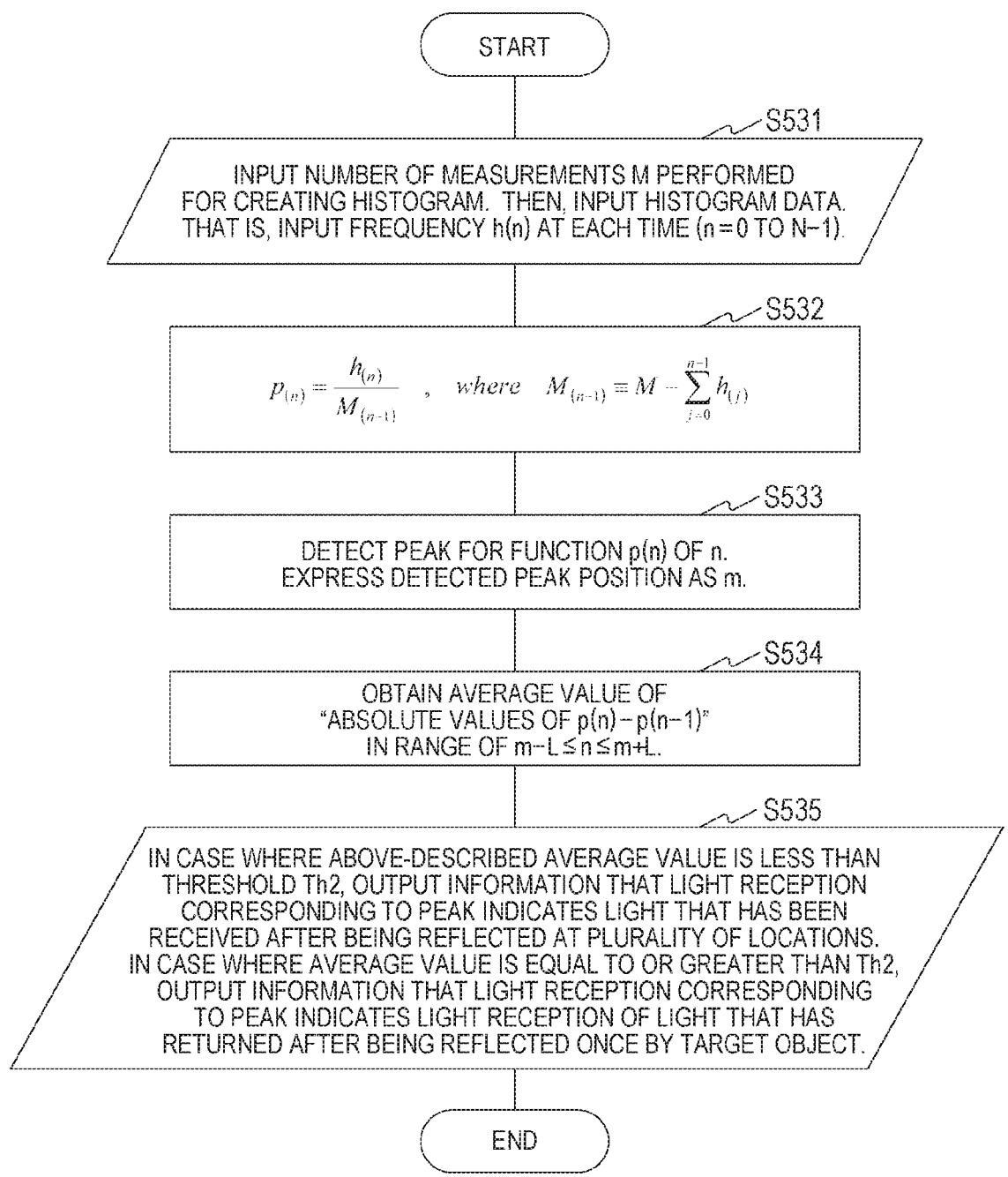
FIG. 54 is a flowchart illustrating an example of a processing procedure for determining reception of light according to a third working example of the fifth embodiment of the present technology.

FIG. 54 is a flowchart illustrating an example of a processing procedure for determining reception of light according to the third working example of the fifth embodiment of the present technology. This processing is performed to determine whether or not the light corresponding to each peak is light received after being reflected at a plurality of locations.

First, in step S531, the number of measurements M performed for creating a histogram is input. Then, histogram data is input. That is, a frequency h(n) at each time (n=0 to N−1) is input. Then, the processing proceeds to step S532.

In step S532, p(n)=h(n)/M(n−1) is calculated for each bin n. Here, n=0 to N−1. Note that M(n−1) is a value defined in Expression 4. Then, the processing proceeds to step S533.

In step S533, a peak is detected for a function p(n) of n. The detected peak position is expressed as m. The method of peak detection is a known method, and a detailed description thereof will be omitted. Furthermore, there is one or more peaks. Then, the processing proceeds to step S534.

In step S534, an average value of "absolute values of p(n)−p(n−1)" in a range of m−L≤n≤m+L is obtained. Here, L is a desired constant. For example, L=2. In step S534, the degree of inclination in proximity to m is calculated. That is, the degree of steepness or wideness of this peak is calculated. Then, the processing proceeds to step S535.

In step S535, in a case where the above-described average value is less than a threshold Th2, information that the light reception corresponding to the peak indicates light that has been received after being reflected at a plurality of locations is output. In a case where the average value is equal to or greater than Th2, information that the light reception corresponding to the peak indicates light that has returned after being reflected once by a target object is output. Here, Th2 is a desired constant. Then, the series of processing ends.

In this way, it is possible to determine whether or not the light corresponding to each peak is light received after being reflected at a plurality of locations.

SUMMARY

The features of the fifth embodiment are as follows.

(Feature 1) An occurrence rate is expressed as a function of time t (or bin n proportional thereto).

(Feature 2) The function is expressed by the total of a constant value (b) with respect to time and an upward-convex function (func(t)) with respect to time.

(Feature 3) There is one or more "upward-convex functions".

(Feature 4) The occurrence rate of Feature 1 is obtained from an observed histogram (h(n)) on the basis of a relationship between an occurrence rate and a histogram (the relationship that minimizes Expression 69). That is, an intensity (luminance value) when a target object is illuminated by the ambient light is obtained. Then, an intensity (luminance value) when the target object is illuminated by the active light is obtained. Then, a distance to the target object is obtained.

(Feature 5) In a case where an "upward-convex function", which is a component in the "occurrence rate obtained in Feature 4", has a wide width, it is determined that the light has reached the SPAD sensor after a plurality of reflections. In a case where the "upward-convex function" is a steep function, it is determined that the light has directly hit and has been reflected back from an object.

(Feature 6) In a case where the peak in the occurrence rate has a wide width, it is determined that the light has reached the SPAD sensor after a plurality of reflections. In a case where the peak in the occurrence rate is a steep peak, it is determined that the light has directly hit and has been reflected back from an object.

Note that in a case where not necessarily all but at least one of the plurality of features is satisfied, it can be said that the features of the fifth embodiment are used.

The advantages of the fifth embodiment are as follows.

(Advantage 1) By executing the processing of the fifth embodiment, a theoretically correct solution (i.e., the most probable solution) can be obtained. That is, an intensity (luminance value) when a target object is illuminated by the ambient light can be obtained. Then, the intensity (luminance value) when the target object is illuminated by the active light can be obtained. Then, a distance to the target object can be obtained.

(Advantage 2) It is possible to distinguish whether the light that has reached the SPAD sensor is light after a plurality of reflections or light that has directly hit and has been reflected back from an object.

[Gist]

The gist of the fifth embodiment is as follows.

(1) A method of fitting a function of an occurrence rate obtained from a histogram, the method including:
   a first input step of inputting a histogram;
   a parameter calculation step of determining, when an occurrence rate is expressed as a function of time, a parameter of the function that satisfies a relationship with the histogram; and
   a first output step of outputting the parameter.

(2) The method of fitting a function of an occurrence rate obtained from a histogram according to (1), in which
   the relationship between the occurrence rate p(t) and the histogram h(t) is represented by $p(t)=h(t)/M(t-1)$, where M is the number of measurements for obtaining the histogram.

(3) The method of fitting a function of an occurrence rate obtained from a histogram according to (1) or (2), in which
   the function is expressed as the total of a constant and an upward-convex function.

(4) The method of fitting a function of an occurrence rate obtained from a histogram according to (3), in which
   the number of the "upward-convex functions" in a case where the number becomes the smallest is expressed as Kpot, and
   the function is expressed as the total of a constant and Kopt "upward-convex functions".

(5) A luminance value calculation method including:
   a maximal value calculation step of calculating a maximal value of the occurrence rate from the fitted function of the occurrence rate obtained in (1) to (4); and
   a second output step of outputting the maximal value as a luminance value when a target object is illuminated by active light.

(6) A luminance value calculation method including:
   an other-than-maximal value calculation step of calculating a value other than a maximal value of the occurrence rate from the fitted function of the occurrence rate obtained in (1) to (4); and
   a third output step of outputting the value other than the maximal value as a luminance value when a target object is illuminated by ambient light.

(7) A distance calculation method including:
   a first time calculation step of calculating a time at which the occurrence rate takes a maximal value from the fitted function of the occurrence rate obtained in (1) to (4);
   a first multiplication step of calculating a value obtained by multiplying the time at which the maximal value is taken by (the speed of light/2); and
   a fourth output step of outputting a result of the calculation as a distance to a target object.

(8) A distance calculation method including:
   a second time calculation step of calculating a time at which a function with a small variance, among the "upward-convex functions", takes a maximum value from the fitted function of the occurrence rate obtained in (3) or (4);
   a second multiplication step of calculating a value obtained by multiplying the time at which the maximum value is taken by (the speed of light/2); and
   a fifth output step of outputting a result of the calculation as a distance to a target object.

(9) A distance calculation method including:
   a second input step of inputting a histogram h(t);
   a peak time detection step of obtaining a time at which the value of h(t)/M(t−1), which is a function of t, reaches a peak;
   an inclination calculation step of obtaining an inclination of the "function of t" at a time in proximity to the peak;
   a third multiplication step of calculating a value obtained by multiplying the time at which the inclination is steep and the peak is reached by (the speed of light/2); and
   a sixth output step of outputting a result of the calculation as a distance to a target object.

7. Sixth Embodiment

[Outline]

This sixth embodiment correctly obtains a distance or a luminance by causing observed histograms and occurrence rates to have a theoretically correct relationship, and also causing parameters of occurrence rates in proximity to each other in time and space to have a specific relationship. That is, a method of appropriately removing noise with a small amount of computation and without assuming a positional relationship in advance is provided.

Note that a "probability of arrival of a photon during a time (D) corresponding to a certain bin" is a value obtained by multiplying an occurrence rate by time D, and constant multiplication (multiplication by D) is not taken into consideration in other embodiments. However, in the sixth embodiment, an occurrence rate may be considered to be defined as a value obtained by multiplying an "occurrence rate", which is a term generally widely used, by D.

As described above, Expression 8 is the final expression (the probability density function of the occurrence rate p(n) of the bin n when the frequency h(n) of each bin n has been observed) derived from the theory according to this embodiment. Thus, when a histogram at each time t and each position (x, y) is observed and the histogram is expressed as H(t, x, y, n), the most probable "occurrence rate p(t, x, y, n) at each time t and each position (x, y)) is p(t, x, y, n) that minimizes the following Expression 76. Here, n=0 to N−1.

[Math. 76]

$$DataTerm \equiv \sum_{t}\sum_{x=1}^{X}\sum_{y=1}^{Y}\sum_{n=0}^{N-1} \left\| \frac{p_{(t,x,y,n)} - \frac{H_{(t,x,y,n)}}{M_{(t,x,y,n-1)}}}{\sqrt{\frac{1}{M_{(t,x,y,n-1)}} \cdot \frac{H_{(t,x,y,n)}}{M_{(t,x,y,n-1)}} \cdot \left(1 - \frac{H_{(t,x,y,n)}}{M_{(t,x,y,n-1)}}\right)}} \right\|_2$$

$$\text{, where } M_{(t,x,y,n-1)} \equiv M - \sum_{j=0}^{n-1} H_{(t,x,y,j)}$$

Expression 76

Note that H(t, x, y, n)/M(t, x, y, n−1) shown in a numerator on the right-hand side of Expression 76 corresponds to the average value of the normal distribution shown in Expression 8. A denominator on the right-hand side of Expression 76 corresponds to the standard deviation of the normal distribution shown in Expression 8.

[Occurrence Rate]

Each position in a SPAD array 13 is expressed as (u, v). u and v are each a real number. Furthermore, a region in which a SPAD indicated by (x, y) in the SPAD sensor 13 reacts to arriving light (photon) is expressed as A(x, y). That is, light (photon) that has arrived position (u, v), where (u, v)∈A(x, y), causes the SPAD at position (x, y) to react. Furthermore, the SPAD does not always react to light (photon) incident on position (u, v). The reaction rate is expressed as η(u, v, x, y). When light (photon) is incident on position (u, v), the SPAD indicated by (x, y) reacts at a rate of η(u, v, x, y). Note that η(u, v, x, y) depends on position (u, v) and becomes known by measuring it in advance. In a case where the measurement is difficult, η(u, v, x, y) may be 0 at (u, v) outside a physical region of the SPAD indicated by (x, y) in the SPAD sensor 13, and may be approximated to a constant value at (u, v) in the physical region of the SPAD indicated by (x, y) in the SPAD sensor 13.

Note that here, supplementary information will be given. A(x, y) ideally coincides with the physical region of the SPAD indicated by (x, y) in the SPAD sensor 13. That is, ideally, in a case where (x1, y1)≠(x2, y2) is satisfied, there is no overlap between region A(x1, y1) and region A(x2, y2). However, actually, in a case where (x1, y1) and (x2, y2) are neighboring SPADs, there is an overlap between region A(x1, y1) and region A(x2, y2). This is because, as a first reason, arriving light is collected on each SPAD by the lens 13a as described in the above description of FIG. 1. In a case where an inexpensive lens is used, light may not be sufficiently collected and blur may occur. That is, light (photon) flying in a direction toward a SPAD indicated by (x1, y1) in the SPAD sensor 13 may reach a neighboring SPAD indicated by (x2, y2) due to blurring of the lens. Furthermore, as a second reason, even in a case where light (photon) is incident on a region of the SPAD indicated by (x1, y1), the light (photon) may travel through a semiconductor forming the SPAD array and reach the neighboring SPAD indicated by (x2, y2). Thus, for a certain position (u, v), even in a case where (x1, y1)≠(x2, y2) is satisfied, both η(u, v, x1, y1)≠0 and η(u, v, x2, y2)≠0 may be satisfied.

Figure 55A:
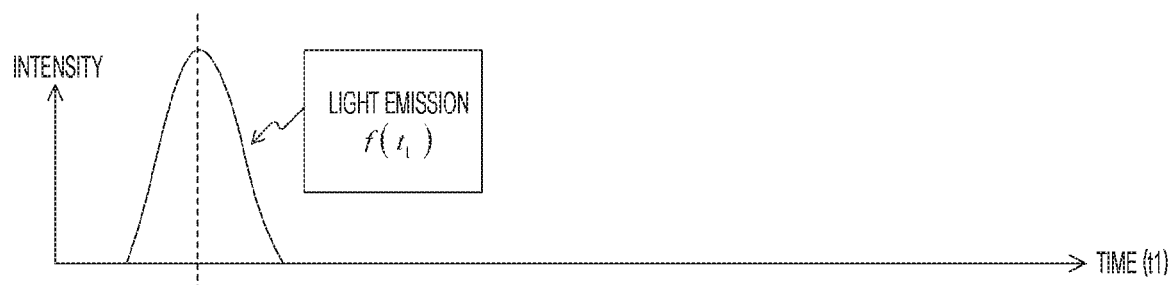
FIG. 55 is a diagram for describing an intensity distribution according to a sixth embodiment of the present technology.
Figure 55B:
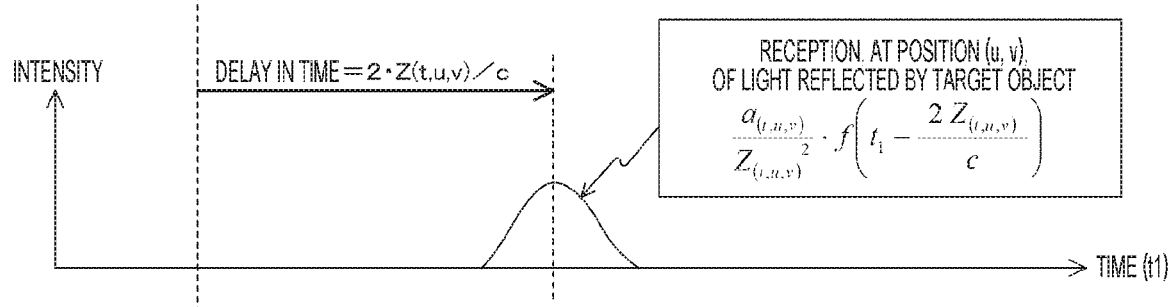
Figure 55C:
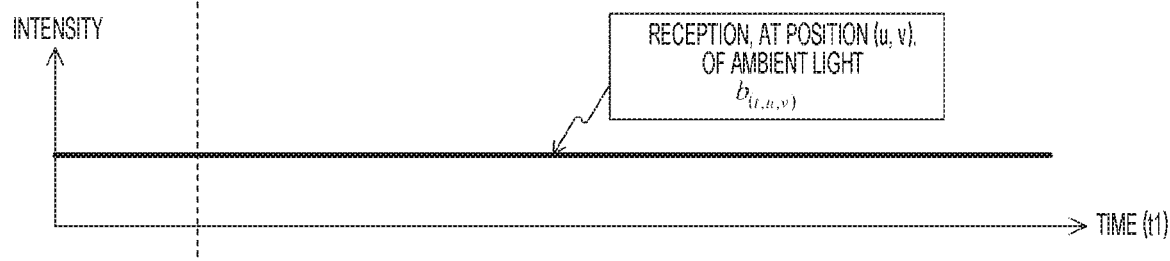

FIG. 55 is a diagram for describing an intensity distribution according to the sixth embodiment of the present technology.

Since an intensity of the light emitted from a light emitting unit 12 changes over time (t1), the intensity is expressed as f(t1). By measuring the intensity of light emitted from the light emitting unit 12 in advance, f(t1) becomes known. A in the drawing indicates a temporal change in intensity of light emitted from the light emitting unit 12.

Active light (for example, light from the light emitting unit 12) is incident on each position (u, v) after being reflected by a target object. A distance to the target object is expressed as Z(t, u, v). The active light (light from the light emitting unit 12) incident on position (u, v) reaches with a delay of 2×Z(t, u, v)/c with respect to the light emission from the light emitting unit 12. Furthermore, light attenuates in proportion to the square of the distance. A reflectance of the target object is expressed as a(t, u, v). Taking into account the above, when light is emitted from the light emitting unit 12, the intensity of the light incident on position (u, v) is represented by the following Expression 77.

[Math. 77]

$$\frac{a_{(t,u,v)}}{Z^2_{(t,u,v)}} \cdot f\!\left(t_1 - \frac{2Z_{(t,u,v)}}{c}\right)$$

Expression 77

B in the drawing illustrates a temporal change in intensity of the active light incident on position (u, v).

Furthermore, ambient light (for example, light from Sun 30) is also incident on each position (u, v). The incident light (photon) always arrives with a constant probability while a t-th histogram is being created. This probability is expressed as b(t, u, v). C in the drawing illustrates a temporal change in intensity of the ambient light incident on position (u, v).

The intensity of light incident on position (u, v) is the total of B and C in the drawing, and is represented by the following Expression 78.

[Math. 78]

$$b_{(t,u,v)} + \frac{a_{(t,u,v)}}{Z^2_{(t,u,v)}} \cdot f\left(t_1 - \frac{2Z_{(t,u,v)}}{c}\right) \quad \text{Expression 78}$$

Thus, the occurrence rate of bin n of a SPAD at position (x, y) is represented by the following Expression 79.

[Math. 79]

$$p_{(t,x,y,n)} = \iint_{(u,v)\in A(x,y)} \left\{ \eta_{(u,v,x,y)} \cdot \left\{ b_{(t,u,v)} + \frac{a_{(t,u,v)}}{Z^2_{(t,u,v)}} \cdot f\left(nD - \frac{2Z_{(t,u,v)}}{c}\right) \right\} \cdot D \right\} du\, dv \quad \text{Expression 79}$$

In this Expression 79, as compared with Expression 78, time t1 is replaced with n×D, which is the time of an n-th bin, multiplication by a time width D of the n-th bin is performed, multiplication by a reaction rate η(u, v, x, y) is further performed, and integration with respect to (u, v) in region A(x, y) of a SPAD indicated by position (x, y) is performed.

Note that the calculation of Expression 79 and the integration described hereinafter are performed by a computation unit 16, but actually, digital addition with respect to position (u, v) is substituted for the integration with respect to position (u, v). In this case, a granularity of (u, v) is equal to or smaller than a granularity of (x, y). That is, a pitch of u is equal to or smaller than a pitch of x. A pitch of v is equal to or smaller than a pitch of y. Such a method of substituting addition for integration is a known technique generally performed for digital signal processing, and a description thereof will be omitted here.

Furthermore, the time function f(t1) of the intensity of light emitted from the light emitting unit 12 can be approximated by a normal distribution in many cases. Moreover, depending on the object by which light is reflected, light may be reflected after being diffused inside in addition to reflection at the surface, and the returning light may be wider than f(t1), which is a normal distribution. That is, light that is reflected back has a normal distribution with respect to time, and its standard deviation may be larger than the standard deviation of f(t1). Taking this into account, the occurrence rate of bin n of a SPAD at position (x, y) is represented by the following Expression 80.

[Math. 80]

$$p_{(t,x,y,n)} = \quad \text{Expression 80}$$

$$\iint_{(u,v)\in A(x,y)} \left\{ \eta_{(u,v,x,y)} \cdot \left\{ b_{(t,u,v)} + \frac{a_{(t,u,v)}}{Z^2_{(t,u,v)}} \cdot \frac{1}{\sqrt{2\pi}\,\sigma_{(t,u,v)}} \exp\left( \frac{1}{2\sigma^2_{(t,u,v)}} \left(nD - \frac{2Z_{(t,u,v)}}{c}\right)^2 \right) \right\} \cdot D \right\} du\, dv$$

In this Expression 80, the standard deviation σ is a function of (u, v). In Expression 79, it is assumed that the same waveform f( ) as light emitted from the light emitting unit 12 is incident on position (u, v). In Expression 80, this waveform is allowed to be wide in the time direction (the degree of wideness is expressed by σ(u, v)). Therefore, this expression can also faithfully express internal diffusion at the time of reflection of light at the target object.

To summarize the above, when a histogram at each time t and each position (x, y) is observed and the histogram is expressed as H(t, x, y, n), the most probable "occurrence rate p(t, x, y, n) at each time t and each position (x, y)) is p(t, x, y, n) that minimizes Expression 76. Here, n=0 to N−1. Note that p(t, x, y, n) in Expression 76 is expressed by Expression 79 or 80.

[Expression Minimization Problem]

In the sixth embodiment, b(t, u, v), a(t, u, v), and Z(t, u, v) that minimize Expression 76 obtained by substituting Expression 79 into Expression 76 are obtained. Here, (u, v) indicates a position in the SPAD array 13. The obtained b(t, u, v) is an intensity (luminance) of the ambient light incident on position (u, v) at time t. a(t, u, v) is an intensity (luminance) of the active light incident on position (u, v) at time t. Z(t, u, v) is a distance to a target object that is in the direction of the light incident on position (u, v) at time t.

Alternatively, in the sixth embodiment, b(t, u, v), a(t, u, v), Z(t, u, v), and σ(t, u, v) that minimize Expression 76 obtained by substituting Expression 80 into Expression 76 are obtained. The obtained b(t, u, v), a(t, u, v), and Z(t, u, v) have the same meaning as a solution obtained when Expression 79 is substituted into Expression 76.

Now, a minimization problem of Expression 76 obtained by substituting Expression 79 or 80 into Expression 76 has a plurality of solutions. Consequently, a practical restriction is imposed. That is, instead of obtaining b(t, u, v), a(t, u, v), and Z(t, u, v) that minimize Expression 76 obtained by substituting Expression 79 into Expression 76, the following Expression 81 is solved.

[Math. 81]

$$\underset{b_{(t,u,v)},a_{(t,u,v)},Z_{(t,u,v)}}{\arg\min} (DataTerm + SmoothTerm) \quad \text{Expression 81}$$

In Expression 81, DataTerm is Expression 76 obtained by substituting Expression 79 into Expression 76. Alternatively, instead of obtaining b(t, u, v), a(t, u, v), Z(t, u, v), and σ(t, u, v) that minimize Expression 76 obtained by substituting Expression 80 into Expression 76, the following Expression 82 is solved.

[Math. 82]

$$\underset{b_{(t,u,v)},a_{(t,u,v)},\sigma_{(t,u,v)},Z_{(t,u,v)}}{\arg\min} ( DataTerm + SmoothTerm) \quad \text{Expression 82}$$

In Expression 82, DataTerm is Expression 76 obtained by substituting Expression 80 into Expression 76. Then, SmoothTerm in Expression 81 or 82 is the above-described "practical restriction", and details thereof will be described later.

[Symbols]

Here, symbols will be defined. An Lp norm is described by the following Expression 83. Here, p is equal to or greater than 0, and includes infinity.

[Math. 83]

$$\|\cdot\|_p \qquad \text{Expression 83}$$

In the sixth embodiment, definitions of this symbol and the Lp norm are used in a similar manner to generally used terms. In the sixth embodiment, an example of p=2 is shown as an expression to be solved, but p is not limited to 2 in the sixth embodiment.

Here, a gradient is described by the following Expression 84.

[Math. 84]

$$\nabla \equiv \left( \frac{\partial}{\partial u}, \frac{\partial}{\partial v} \right) \qquad \text{Expression 84}$$

In the sixth embodiment, this symbol $\nabla$ is an operator for position (u, v), and has the same definition as that generally used.

First Working Example

In a first working example, the following Expression 85 is adopted as SmoothTerm, which is the above-described "practical restriction".

[Math. 85]

$$\begin{aligned} SmoothTerm \equiv\ & \alpha_{bt} \sum_t \left\{ \iint_{(u,v)} \left\| \frac{\partial}{\partial t} b_{(t,u,v)} \right\|_2 du\ dv \right\} + \\ & \alpha_{bs} \sum_t \left\{ \iint_{(u,v)} \|\nabla b_{(t,u,v)}\|_2 du\ dv \right\} + \\ & \alpha_{at} \sum_t \left\{ \iint_{(u,v)} \left\| \frac{\partial}{\partial t} a_{(t,u,v)} \right\|_2 du\ dv \right\} + \\ & \alpha_{as} \sum_t \left\{ \iint_{(u,v)} \|\nabla a_{(t,u,v)}\|_2 du\ dv \right\} + \\ & \alpha_{Zt} \sum_t \left\{ \iint_{(u,v)} \left\| \frac{\partial}{\partial t} Z_{(t,u,v)} \right\|_2 du\ dv \right\} + \\ & \alpha_{Zs} \sum_t \left\{ \iint_{(u,v)} \|\nabla Z_{(t,u,v)}\|_2 du\ dv \right\} \end{aligned}$$

Expression 85

DataTerm is Expression 76 obtained by substituting Expression 79 into Expression 76, and solves Expression 81.

Here, Expression 85 will be described. In general, in "b(t, u, v), which is an intensity (luminance) of the ambient light incident on position (u, v) at time t", a change in time t is small. Then, a change in position (u, v) is also small. Consequently, a value obtained by partially differentiating b(t, u, v) with respect to t and a value obtained by partially differentiating b(t, u, v) with respect to position (u, v) should be small. Consequently, these values are set as SmoothTerm (first and second terms on the right-hand side of Expression 85) to solve a minimization problem of Expression 81. Note that αbt and αbs in Expression 85 indicate contribution rates of the amount of change in b(t, u, v) with respect to t and the amount of change in b(t, u, v) with respect to (u, v), respectively, for SmoothTerm, and are desired constants.

In general, in "a(t, u, v), which is an intensity (luminance) of the active light incident on position (u, v) at time t", a change in time t is small. Then, a change in position (u, v) is also small. Consequently, a value obtained by partially differentiating a(t, u, v) with respect to t and a value obtained by partially differentiating a(t, u, v) with respect to position (u, v) should be small. Consequently, these values are set as SmoothTerm (third and fourth terms on the right-hand side of Expression 85) to solve the minimization problem of Expression 81. Note that αat and αas in Expression 85 indicate contribution rates of the amount of change in a(t, u, v) with respect to t and the amount of change with respect to (u, v), respectively, for SmoothTerm, and are desired constants.

In general, in "Z(t, u, v), which is the distance to a target object that is in the direction of the light incident on position (u, v) at time t", a change in time t is small. Then, a change in position (u, v) is also small. Consequently, a value obtained by partially differentiating Z(t, u, v) with respect to t and a value obtained by partially differentiating Z(t, u, v) with respect to position (u, v) should be small. Consequently, these values are set as SmoothTerm (fifth and sixth terms on the right-hand side of Expression 85) to solve the minimization problem of Expression 81. Note that αZt and αZs in Expression 85 indicate contribution rates of the amount of change in Z(t, u, v) with respect to t and the amount of change with respect to (u, v), respectively, for SmoothTerm, and are desired constants.

Expression 85 indicates that, as a "practical restriction", changes in time t and position (u, v) are small in b(t, u, v), a(t, u, v), and Z(t, u, v).

Figure 56:
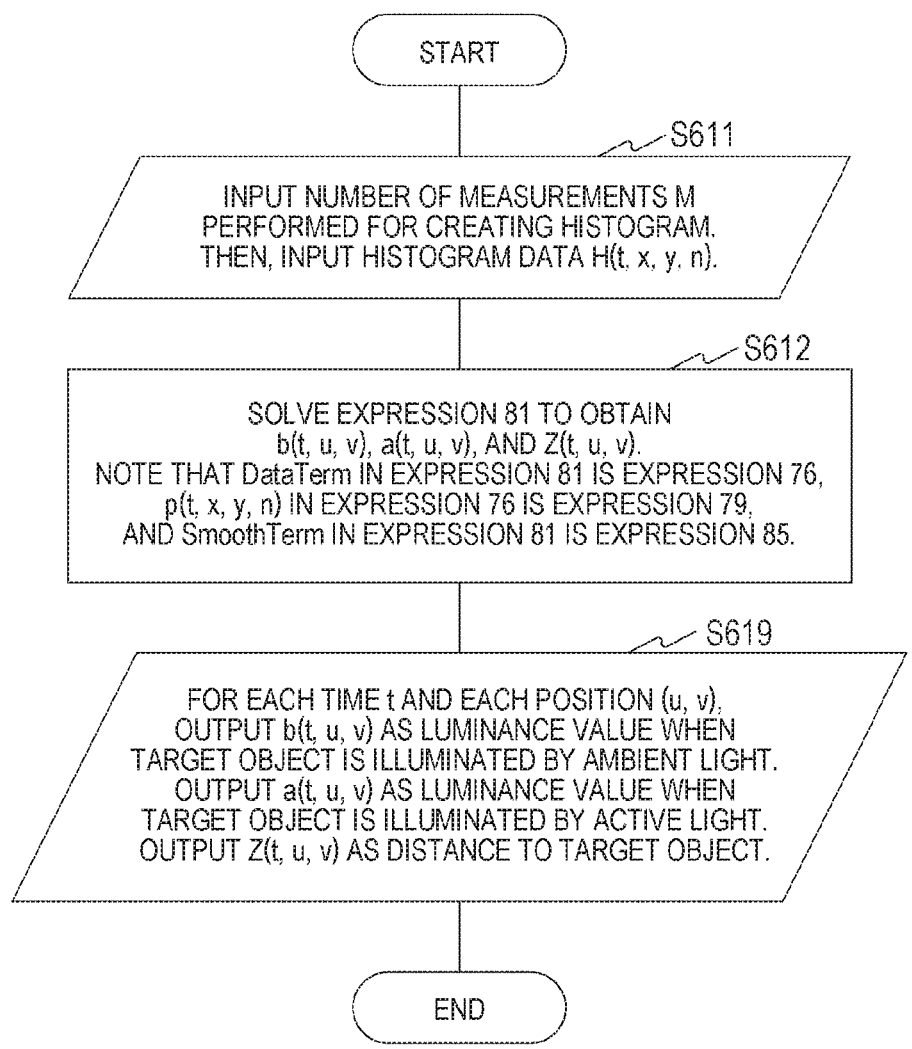
FIG. 56 is a flowchart illustrating an example of a processing procedure for calculating a luminance value and a distance according to a first working example of the sixth embodiment of the present technology.

FIG. 56 is a flowchart illustrating an example of a processing procedure for calculating a luminance value and a distance according to the first working example of the sixth embodiment of the present technology. This processing is performed by the computation unit 16, and the result is output from an output terminal 17.

First, in step S611, the number of measurements M performed for creating a histogram is input. Then, histogram data H(t, x, y, n) is input. Here, t is an integer equal to or greater than 1, and x=1 to X, y=1 to Y, and n=0 to N−1 are satisfied. Then, the processing proceeds to step S612.

In step S612, Expression 81 is solved to obtain b(t, u, v), a(t, u, v), and Z(t, u, v). Note that DataTerm in Expression 81 is Expression 76, p(t, x, y, n) in Expression 76 is Expression 79, and SmoothTerm in Expression 81 is Expression 85. Then, the processing proceeds to step S619.

In step S619, for each time t and each position (u, v), b(t, u, v) is output as a luminance value when a target object is illuminated by the ambient light. As a luminance value when the target object is illuminated by the active light, a(t, u, v) is output. As a distance to a target object, Z(t, u, v) is output. Then, the series of processing ends.

In this way, for each time t and each position (u, v), a luminance value when the target object is illuminated by the ambient light can be output. Furthermore, it is possible to output a luminance value when the target object is illuminated by the active light. Then, the distance to the target object can be output.

Second Working Example

In a second working example, the following Expression 86 is adopted as SmoothTerm, which is the above-described "practical restriction".

[Math. 86]

$$SmoothTerm \equiv a_{bt} \sum_{t} \left\{ \int\!\!\int_{(u,v)} \left\| \frac{\partial}{\partial t} b_{(t,u,v)} \right\|_2 du\, dv \right\} +$$

$$\alpha_{bs} \sum_{t} \left\{ \int\!\!\int_{(u,v)} \left\| \nabla b_{(t,u,v)} \right\|_2 du\, dv \right\} +$$

$$\alpha_{at} \sum_{t} \left\{ \int\!\!\int_{(u,v)} \left\| \frac{\partial}{\partial t} a_{(t,u,v)} \right\|_2 du\, dv \right\} +$$

$$\alpha_{as} \sum_{t} \left\{ \int\!\!\int_{(u,v)} \left\| \nabla a_{(t,u,v)} \right\|_2 du\, dv \right\} +$$

$$\alpha_{Zt} \sum_{t} \left\{ \int\!\!\int_{(u,v)} \left\| \frac{\partial}{\partial t} Z_{(t,u,v)} \right\|_2 du\, dv \right\} +$$

$$\alpha_{Zs} \sum_{t} \left\{ \int\!\!\int_{(u,v)} \left\| \nabla Z_{(t,u,v)} \right\|_2 du\, dv \right\}$$

Expression 86

DataTerm is Expression 76 obtained by substituting Expression 80 into Expression 76, and solves Expression 82.

Here, Expression 86 will be described. Note that first to sixth terms on the right-hand side of Expression 86 are the same as those of Expression 85, and thus a description thereof will be omitted.

In general, in "σ(t, u, v), which is a standard deviation of the active light incident on position (u, v) at time t", a change in time t is small. Then, a change in position (u, v) is also small. Consequently, a value obtained by partially differentiating σ(t, u, v) with respect to t and a value obtained by partially differentiating σ(t, u, v) with respect to position (u, v) should be small. Consequently, these values are set as SmoothTerm (seventh and eighth terms on the right-hand side of Expression 86) to solve a minimization problem of Expression 82. Note that ασt and ασs in Expression 86 indicate contribution rates of the amount of change in a(t, u, v) with respect to t and the amount of change with respect to (u, v), respectively, for SmoothTerm, and are desired constants.

Expression 86 indicates that, as the above-described "practical restriction", changes in time t and position (u, v) are small in b(t, u, v), a(t, u, v), Z(t, u, v), and σ(t, u, v).

Figure 57:
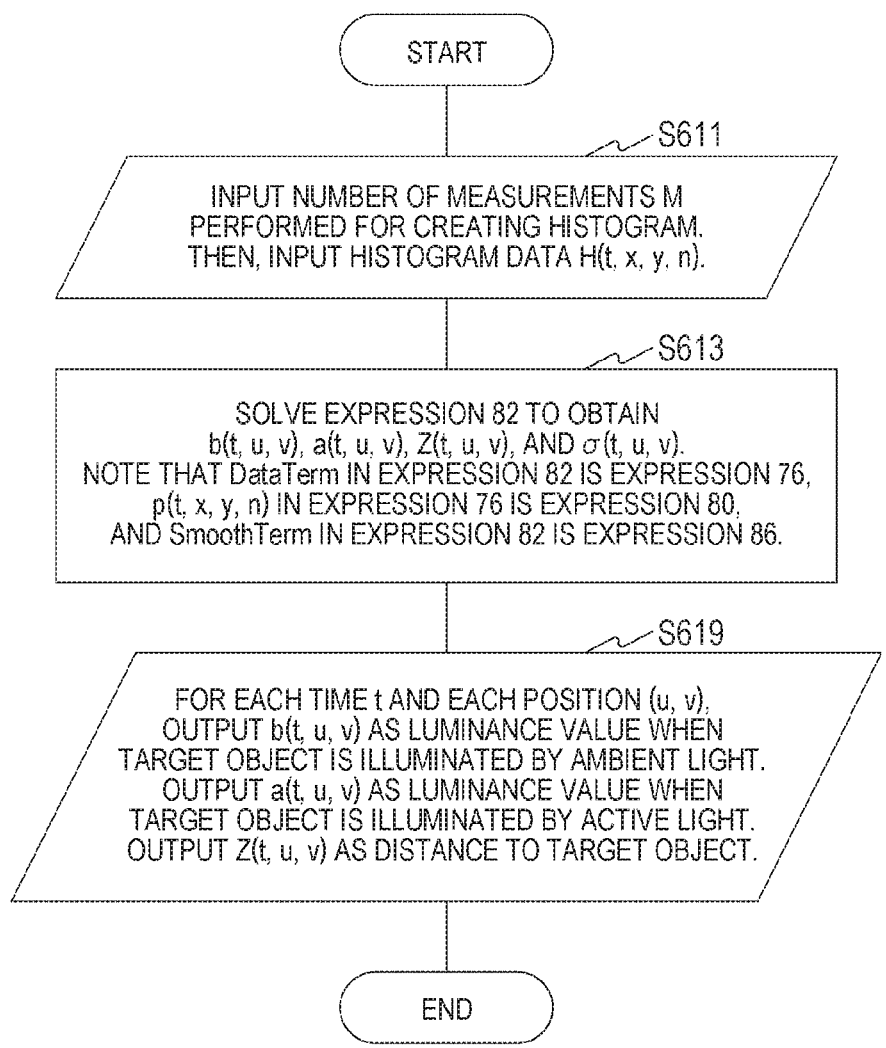
FIG. 57 is a flowchart illustrating an example of a processing procedure for calculating a luminance value and a distance according to a second working example of the sixth embodiment of the present technology.

FIG. 57 is a flowchart illustrating an example of a processing procedure for calculating a luminance value and a distance according to the second working example of the sixth embodiment of the present technology. The processing of the second working example is performed by the computation unit 16, and the result is output from the output terminal 17.

Steps S611 and S619 have been described in the above-described first working example, and will not be described here. Instead of step S612 of the above-described first working example, the following step S613 is executed.

In step S613, Expression 82 is solved to obtain b(t, u, v), a(t, u, v), Z(t, u, v), and σ(t, u, v). Note that DataTerm in Expression 82 is Expression 76, p(t, x, y, n) in Expression 76 is Expression 80, and SmoothTerm in Expression 82 is Expression 86.

In this way, for each time t and each position (u, v), a luminance value when the target object is illuminated by the ambient light can be output. Furthermore, it is possible to output a luminance value when the target object is illuminated by the active light. Then, the distance to the target object can be output.

Third Working Example

In the following third to sixth working examples, a camera 100 attached to a distance measuring device 10 is used. Here, the camera 100 is a device capable of capturing an image, and captures the image in the same direction as a direction of measurement by the SPAD array 13 of the distance measuring device 10.

A pixel value (luminance value) in an image by the camera 100 corresponding to an object being measured by each time t and each position (u, v) in the SPAD array 13 is expressed as I(t, u, v). Note that in a case where the distance measuring device 10 and the camera 100 are installed adjacent to each other, the pixel value I(t, u, v) is a value of a pixel that has been imaged by the camera 100 in the same direction as the direction in which position (u, v) in the SPAD array 13 is imaging at time t.

In a case where the number of pixels of the camera 100 is larger than the number of SPADs (X×Y) in the SPAD array 13, the third to sixth working examples achieve particularly high effects. In this case, a pixel pitch of an image by the camera 100 may be adopted as a pitch of (u, v).

It is assumed that (t1, u1, v1) and (t2, u2, v2) are neighboring positions in time and space.

In a case where I(t1, u1, v1) and I(t2, u2, v2) are substantially the same in value (pixel value), the object being measured by (t1, u1, v1) in the SPAD array 13 and the object being measured by (t2, u2, v2) in the SPAD array 13 are considered to be the same. Thus, it is considered that b(t, u, v), a(t, u, v), Z(t, u, v), and σ(t, u, v) corresponding to (t1, u1, v1) respectively have the same values as b(t, u, v), a(t, u, v), Z(t, u, v), and σ(t, u, v) corresponding to (t2, u2, v2). In this case, it is preferable to apply SmoothTerm so that these two pieces of b(t, u, v), two pieces of a(t, u, v), two pieces of Z(t, u, v), and two pieces of σ(t, u, v) each may have values that are as close to being the same as possible.

On the other hand, in a case where I(t1, u1, v1) and I(t2, u2, v2) are completely different in value (pixel value), the object being measured by (t1, u1, v1) in the SPAD array 13 and the object being measured by (t2, u2, v2) in the SPAD array 13 are considered to be different. Thus, it is considered that b(t, u, v), a(t, u, v), Z(t, u, v), and σ(t, u, v) corresponding to (t1, u1, v1) respectively have different values from b(t, u, v), a(t, u, v), Z(t, u, v), and σ(t, u, v) corresponding to (t2, u2, v2). In this case, since it is not necessary that these two pieces of b(t, u, v), two pieces of a(t, u, v), two pieces of Z(t, u, v), and two pieces of σ(t, u, v) are each the same, it is preferable not to apply SmoothTerm.

The above description is, as described above, common to the third to sixth working examples.

In the third working example, the following Expression 87 is adopted as SmoothTerm, which is the above-described "practical restriction".

[Math. 87]

$$SmoothTerm \equiv \alpha_{bs} \int\!\!\int_{(u,v)}$$

$$\left\{ \left\| s_{b(t,u,v)} - \frac{\frac{\partial}{\partial u} b_{(t,u,v)}}{\frac{\partial}{\partial u} I_{(t,u,v)}} \right\|_2 + \left\| s_{b(t,u,v)} - \frac{\frac{\partial}{\partial v} b_{(t,u,v)}}{\frac{\partial}{\partial v} I_{(t,u,v)}} \right\|_2 \right\}$$

$$du\, dv +$$

$$\alpha_{be} \int\!\!\int_{(u,v)} \left( \left\| \mu_{across(t,u,v)} e^T_{across(t,u,v)} \nabla s_{b(t,u,v)} \right\|_2 + \right.$$

Expression 87

-continued $$\|\mu_{along\,(t,u,v)} e^T_{along\,(t,u,v)} \nabla s_{b(t,u,v)}\|_2 )du\ dv + \alpha_{as} \iint\limits_{(u,v)}$$

$$\left( \left\|s_{a(t,u,v)} - \frac{\frac{\partial}{\partial u} a_{(t,u,v)}}{\frac{\partial}{\partial u} I_{(t,u,v)}}\right\|_2 + \left\|s_{a(t,u,v)} - \frac{\frac{\partial}{\partial v} a_{(t,u,v)}}{\frac{\partial}{\partial v} I_{(t,u,v)}}\right\|_2 \right)$$

$$du\ dv + \alpha_{ae} \iint\limits_{(u,v)} (\|\mu_{across(t,u,v)} e^T_{across(t,u,v)} \nabla s_{a(t,u,v)}\|_2 +$$

$$\|\mu_{along\,(t,u,v)} e^T_{along\,(t,u,v)} \nabla s_{a(t,u,v)}\|_2 )du\ dv + \alpha_{Zs} \iint\limits_{(u,v)}$$

$$\left( \left\|s_{Z(t,u,v)} - \frac{\frac{\partial}{\partial u} Z_{(t,u,v)}}{\frac{\partial}{\partial u} I_{(t,u,v)}}\right\|_2 + \left\|s_{Z(t,u,v)} - \frac{\frac{\partial}{\partial v} Z_{(t,u,v)}}{\frac{\partial}{\partial v} I_{(t,u,v)}}\right\|_2 \right)$$

$$du\ dv + \alpha_{Ze} \iint\limits_{(u,v)} (\|\mu_{across(t,u,v)} e^T_{across(t,u,v)} \nabla s_{Z(t,u,v)}\|_2 +$$

$$\|\mu_{along\,(t,u,v)} e^T_{along\,(t,u,v)} \nabla s_{Z(t,u,v)}\|_2 )du\ dv$$

DataTerm is Expression 76 obtained by substituting Expression 79 into Expression 76, and solves Expression 81. Note that eacross(t, u, v), ealong(t, u, v), µacross(t, u, v), and µalong(t, u, v) shown in Expression 87 are defined by the following Expressions 88 to 91.

[Math. 88]

$$e_{across(t,u,v)} \equiv \frac{1}{|\nabla I_{(t,u,v)}|^2} \begin{pmatrix} \frac{\partial}{\partial u} I_{(t,u,v)} \\ \frac{\partial}{\partial v} I_{(t,u,v)} \end{pmatrix} \qquad \text{Expression 88}$$

[Math. 89]

$$e_{along(t,u,v)} \equiv \frac{1}{|\nabla I_{(t,u,v)}|^2} \begin{pmatrix} \frac{\partial}{\partial u} I_{(t,u,v)} \\ -\frac{\partial}{\partial v} I_{(t,u,v)} \end{pmatrix} \qquad \text{Expression 89}$$

[Math. 90]

$$\mu_{across(t,u,v)} \equiv \sqrt{\frac{\xi^2}{|\nabla I_{(t,u,v)}|^2 + 2\xi^2}} \qquad \text{Expression 90}$$

[Math. 91]

$$\mu_{along(t,u,v)} \equiv \sqrt{\frac{|\nabla I_{(t,u,v)}|^2 + \xi^2}{|\nabla I_{(t,u,v)}|^2 + 2\xi^2}} \qquad \text{Expression 91}$$

Here, $\xi$ is a desired minute value (constant), and pacross(t, u, v)≤µalong(t, u, v) is satisfied. Furthermore, Expression 88 defines eacross(t, u, v), which is a unit tangent vector perpendicular to an edge direction of (crossing an edge of) an image. Expression 89 defines ealong(t, u, v), which is a unit tangent vector along the edge direction of the image.

Note that when the value obtained by partially differentiating I(t, u, v) with respect to u or v is 0, division by zero occurs in Expression 87. Consequently, in practice, in order to avoid division by zero, when the value obtained by partially differentiating I(t, u, v) with respect to u or v is 0, replacement with a minute value is necessary. Since this is a known common practice and is irrelevant to the gist of this embodiment, this is not mentioned in Expression 87.

This working example is an example in which no restriction is imposed on the time direction as a "practical restriction", and it is assumed that t=1 only.

Here, a first term on the right-hand side of Expression 87 will be described. This term acts so that the ratio between the differential value (difference value) in the u direction of b(t, u, v) to be finally obtained and the differential value (difference value) in the u direction of the corresponding image pixel value I(t, u, v) may be equal to sb(t, u, v). Moreover, this term acts so that the ratio between the differential value (difference value) in the v direction of b(t, u, v) to be finally obtained and the differential value (difference value) in the v direction of the corresponding image pixel value I(t, u, v) may also be equal to sb(t, u, v). That is, this term acts so that the ratio between the differential value of b(t, u, v) and the differential value of I(t, u, v), which have a linear relationship, may be as close to sb(t, u, v) as possible. Note that abs is a contribution rate for the linearity between the differential value of b(t, u, v) and the differential value of I(t, u, v) in the space (u, v) direction, and is a desired constant equal to or greater than 0.

A second term on the right-hand side of Expression 87 will be described. First, in a direction crossing an edge of an image, there is no correlation between the amount of change in b(t, u, v) and the amount of change in I(t, u, v). This is because an edge indicates a boundary between objects, and there are completely different objects (i.e., completely different in distance and luminance value) on one side and the other side of the edge. Consequently, even a large amount of change in sb(t, u, v) in this direction is acceptable. The contribution to SmoothTerm is reduced by multiplying a "differential value of sb(t, u, v) in this direction" by pacross (t, x, y), which is a small value.

Furthermore, in a direction along an edge of an image, there is a correlation between the amount of change in b(t, u, v) and the amount of change in I(t, u, v). This is because in a direction along an edge, the object is the same (i.e., same distance and same luminance value). Consequently, the amount of change in sb(t, u, v) in this direction is reduced. The contribution to SmoothTerm is increased by multiplying the "differential value of sb(t, u, v) in this direction" by palong(t, x, y), which is a large value.

That is, the second term on the right-hand side of Expression 87 is a term that acts on acceptability of a change in sb(t, u, v) in a direction crossing/along an edge. Note that αbe is a contribution rate relating to acceptability of a change in sb(t, u, v) at an edge, and is a desired constant equal to or greater than 0.

Third and fourth terms on the right-hand side of Expression 87 are obtained by replacing b(t, u, v) in the above-described first and second terms with a(t, u, v), and a description thereof will be omitted. Note that αas is a contribution rate for the linearity between the differential value of a(t, u, v) and the differential value of I(t, u, v) in the space (u, v) direction, and is a desired constant equal to or greater than 0. αae is a contribution rate relating to acceptability of a change in sa(t, u, v) at an edge, and is a desired constant equal to or greater than 0.

Fifth and sixth terms on the right-hand side of Expression 87 are obtained by replacing b(t, u, v) in the above-described first and second terms with Z(t, u, v), and a description thereof will be omitted. Note that αZs is a contribution rate for the linearity between the differential value of Z(t, u, v) and the differential value of I(t, u, v) in the space (u, v) direction, and is a desired constant equal to or greater than 0. αZe is a contribution rate relating to acceptability of a change in sZ(t, u, v) at an edge, and is a desired constant equal to or greater than 0.

Figure 58:
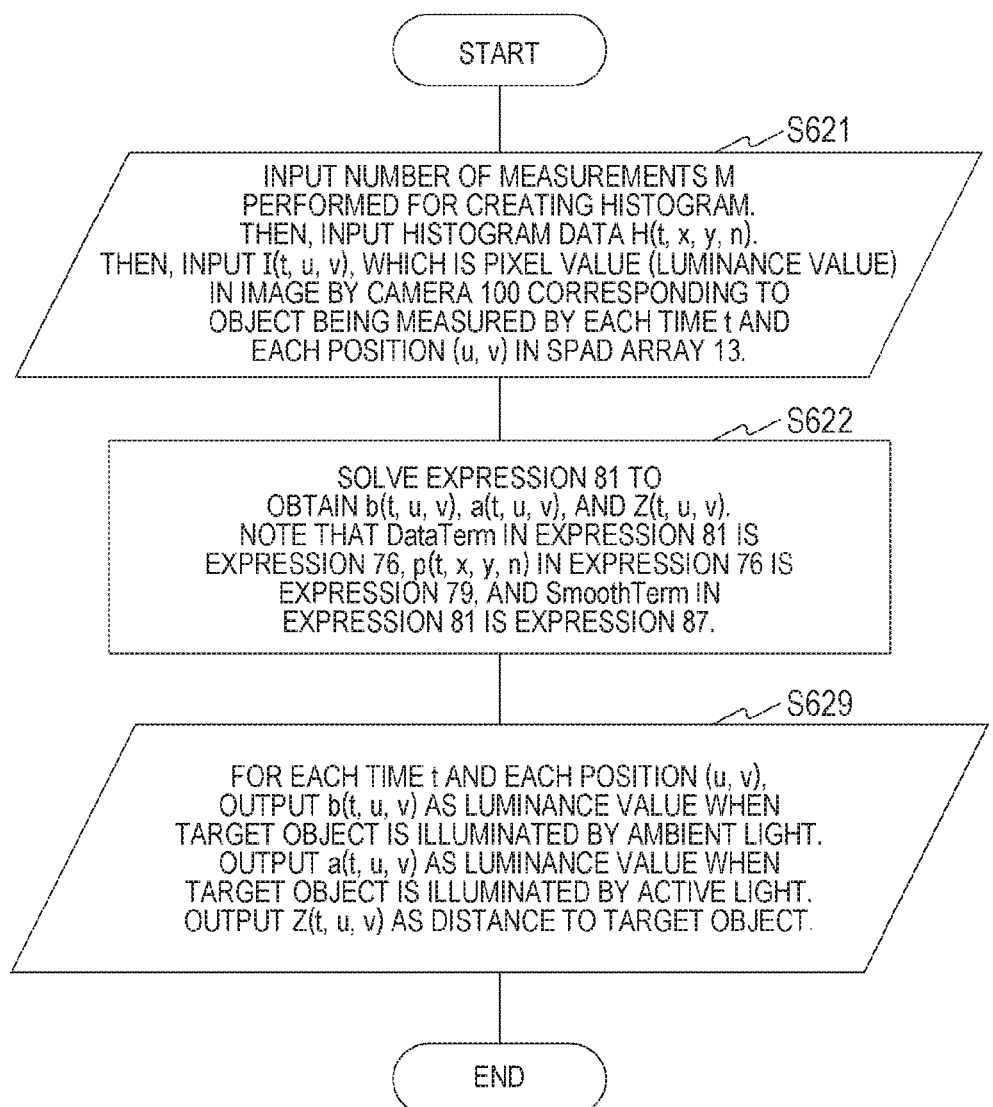
FIG. 58 is a flowchart illustrating an example of a processing procedure for calculating a luminance value and a distance according to a third working example of the sixth embodiment of the present technology.

FIG. 58 is a flowchart illustrating an example of a processing procedure for calculating a luminance value and a distance according to the third working example of the sixth embodiment of the present technology. The processing of the third working example is performed by the computation unit 16, and the result is output from the output terminal 17.

First, in step S621, the number of measurements M performed for creating a histogram is input. Then, histogram data H(t, x, y, n) is input. Here, t is an integer equal to or greater than 1, and x=1 to X, y=1 to Y, and n=0 to N−1 are satisfied. Then, I(t, u, v), which is a pixel value (luminance value) in an image by the camera 100 corresponding to an object being measured by each time t and each position (u, v) in the SPAD array 13, is input. Then, the processing proceeds to step S622.

In step S622, Expression 81 is solved to obtain b(t, u, v), a(t, u, v), and Z(t, u, v). Note that DataTerm in Expression 81 is Expression 76, p(t, x, y, n) in Expression 76 is Expression 79, and SmoothTerm in Expression 81 is Expression 87. Here, sb(t, u, v), sa(t, u, v), and sZ(t, u, v) are each an arbitrary scalar quantity. That is, sets of b(t, u, v), a(t, u, v), Z(t, u, v), sb(t, u, v), sa(t, u, v), and sZ(t, u, v) are obtained such that a value obtained by adding Expressions 76 and 87 is minimized, and only b(t, u, v), a(t, u, v), and Z(t, u, v) among those obtained are used as a calculation result. Furthermore, t=1. Then, the processing proceeds to step S629.

In step S629, for each time t and each position (u, v), b(t, u, v) is output as a luminance value when a target object is illuminated by the ambient light. As a luminance value when the target object is illuminated by the active light, a(t, u, v) is output. As a distance to a target object, Z(t, u, v) is output. Then, the series of processing ends.

In this way, for each time t and each position (u, v), a luminance value when the target object is illuminated by the ambient light can be output. Furthermore, it is possible to output a luminance value when the target object is illuminated by the active light. Then, the distance to the target object can be output.

Fourth Working Example

In the fourth working example, the following Expression 92 is adopted as SmoothTerm, which is the above-described "practical restriction".

[Math. 92]

$$SmoothTerm \equiv \alpha_{bs} \iint_{(u,v)}$$

Expression 92

$$\left( \left\| s_{b(t,u,v)} - \frac{\frac{\partial}{\partial u} b_{(t,u,v)}}{\frac{\partial}{\partial u} I_{(t,u,v)}} \right\|_2 + \left\| s_{b(t,u,v)} - \frac{\frac{\partial}{\partial v} b_{(t,u,v)}}{\frac{\partial}{\partial v} I_{(t,u,v)}} \right\|_2 \right)$$

$$du\ dv +$$

$$\alpha_{be} \iint_{(u,v)} (\|\mu_{across(t,u,v)} e^T_{across(t,u,v)} \nabla s_{b(t,u,v)}\|_2 +$$

-continued $$\|\mu_{along(t,u,v)} e^T_{along(t,u,v)} \nabla s_{b(t,u,v)}\|_2 )du\ dv + \alpha_{as} \iint_{(u,v)}$$

$$\left( \left\| s_{a(t,u,v)} - \frac{\frac{\partial}{\partial u} a_{(t,u,v)}}{\frac{\partial}{\partial u} I_{(t,u,v)}} \right\|_2 + \left\| s_{a(t,u,v)} - \frac{\frac{\partial}{\partial v} a_{(t,u,v)}}{\frac{\partial}{\partial v} I_{(t,u,v)}} \right\|_2 \right)$$

$$du\ dv + \alpha_{ae} \iint_{(u,v)} (\|\mu_{across(t,u,v)} e^T_{across(t,u,v)} \nabla s_{a(t,u,v)}\|_2 +$$

$$\|\mu_{along(t,u,v)} e^T_{along(t,u,v)} \nabla s_{a(t,u,v)}\|_2 )du\ dv + \alpha_{Zs} \iint_{(u,v)}$$

$$\left( \left\| s_{Z(t,u,v)} - \frac{\frac{\partial}{\partial u} Z_{(t,u,v)}}{\frac{\partial}{\partial u} I_{(t,u,v)}} \right\|_2 + \left\| s_{Z(t,u,v)} - \frac{\frac{\partial}{\partial v} Z_{(t,u,v)}}{\frac{\partial}{\partial v} I_{(t,u,v)}} \right\|_2 \right)$$

$$du\ dv + \alpha_{Ze} \iint_{(u,v)} (\|\mu_{across(t,u,v)} e^T_{across(t,u,v)} \nabla s_{Z(t,u,v)}\|_2 +$$

$$\|\mu_{along(t,u,v)} e^T_{along(t,u,v)} \nabla s_{a(t,u,v)}\|_2 )du\ dv + \alpha_{Zs} \iint_{(u,v)}$$

$$\left( \left\| s_{\sigma(t,u,v)} - \frac{\left(\frac{\partial}{\partial u}\sigma\right)_{(t,u,v)}}{\frac{\partial}{\partial u} I_{(t,u,v)}} \right\|_2 + \left\| s_{\sigma(t,u,v)} - \frac{\left(\frac{\partial}{\partial v}\sigma\right)_{(t,u,v)}}{\frac{\partial}{\partial v} I_{(t,u,v)}} \right\|_2 \right)$$

$$du\ dv + \alpha_{\sigma e} \iint_{(u,v)} (\|\mu_{across(t,u,v)} e^T_{across(t,u,v)} \nabla s_{Z(t,u,v)}\|_2 +$$

$$\|\mu_{along(t,u,v)} e^T_{along(t,u,v)} \nabla s_{Z(t,u,v)}\|_2 )du\ dv$$

DataTerm is Expression 76 obtained by substituting Expression 80 into Expression 76, and solves Expression 82.

Note that while division by zero may occur in Expression 92, this can be avoided in a similar manner to the description of Expression 87.

This working example is an example in which no restriction is imposed on the time direction as a "practical restriction", and it is assumed that t=1 only.

Here, Expression 92 will be described. However, first to sixth terms on the right-hand side of Expression 92 are the same as those of the above-described Expression 87, and thus a description thereof will be omitted.

Seventh and eighth terms on the right-hand side of Expression 92 are obtained by replacing b(t, u, v) in the above-described first and second terms with σ(t, u, v), and a description thereof will be omitted. Note that ασs is a contribution rate for the linearity between the differential value of σc(t, u, v) and the differential value of I(t, u, v) in the space (u, v) direction, and is a desired constant equal to or greater than 0. ace is a contribution rate relating to acceptability of a change in sσ(t, u, v) at an edge, and is a desired constant equal to or greater than 0.

Figure 59:
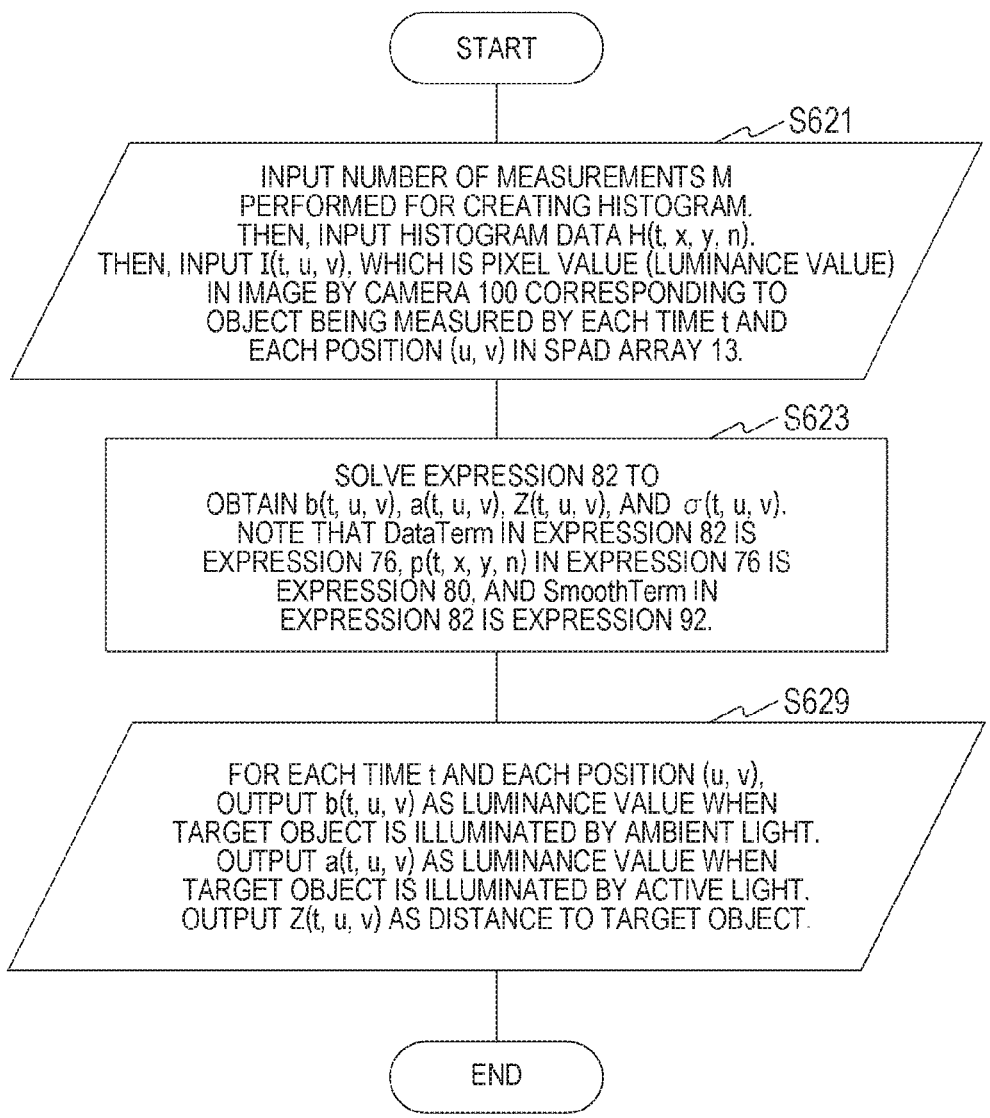
FIG. 59 is a flowchart illustrating an example of a processing procedure for calculating a luminance value and a distance according to a fourth working example of the sixth embodiment of the present technology.

FIG. 59 is a flowchart illustrating an example of a processing procedure for calculating a luminance value and a distance according to the fourth working example of the sixth embodiment of the present technology. This processing is performed by the computation unit 16, and the result is output from the output terminal 17.

Steps S621 and S629 have been described in the above-described third working example, and will not be described here. Instead of step S622 of the above-described third working example, the following step S623 is executed.

In step S623, Expression 82 is solved to obtain b(t, u, v), a(t, u, v), Z(t, u, v), and σ(t, u, v). Note that DataTerm in Expression 82 is Expression 76, p(t, x, y, n) in Expression 76 is Expression 80, and SmoothTerm in Expression 82 is Expression 92. Here, sb(t, u, v), sa(t, u, v), sZ(t, u, v), and sσ(t, u, v) are each an arbitrary scalar quantity. That is, sets of b(t, u, v), a(t, u, v), Z(t, u, v), σ(t, u, v), sb(t, u, v), sa(t, u, v), sZ(t, u, v), and sσ(t, u, v) are obtained such that a value obtained by adding Expressions 76 and 92 is minimized, and only b(t, u, v), a(t, u, v), Z(t, u, v), and σ(t, u, v) among those obtained are used as a calculation result. Furthermore, t=1.

In this way, for each time t and each position (u, v), a luminance value when the target object is illuminated by the ambient light can be output. Furthermore, it is possible to output a luminance value when the target object is illuminated by the active light. Then, the distance to the target object can be output.

Fifth Working Example

In the fifth working example, the following Expression 93 is adopted as SmoothTerm, which is the above-described "practical restriction".

[Math. 93]

Expression 93

$$SmoothTerm \equiv$$

$$\alpha_{b1} \sum_t \iint_{(u,v)} \left\{ \sum_{-\Delta T \leq t_1 \leq \Delta T} \iint_{\substack{-\Delta u \leq u_1 \leq \Delta u \\ -\Delta v \leq v_1 \leq \Delta v}} \|b_{(t+t_1, u+u_1, v+v_1)} - A_{b(t,u,v)} \cdot I_{(t+t_1, u+u_1, v-v)} - B_{b(t,u,v)}\|_2 \, du_1 \, dv_1 \right\} du \, dv +$$

$$\alpha_{b2} \sum_t \iint_{(u,v)} \|A_{b(t,u,v)}\|_2 + \alpha_{a1} \sum_t \iint_{(u,v)} \left\{ \sum_{-\Delta T \leq t_1 \leq \Delta T} \iint_{\substack{-\Delta u \leq u_1 \leq \Delta u \\ -\Delta v \leq v_1 \leq \Delta v}} \|a_{(t+t_1, u+u_1, v+v_1)} - A_{a(t,u,v)} \cdot I_{(t+t_1, u+u_1, v+v_2)} - B_{a(t,u,v)}\|_2 \, du_1 \, dv_1 \right\} du \, dv + \alpha_{a2} \sum_t \iint_{(u,v)} \|A_{a(t,u,v)}\|_2 +$$

$$\alpha_{Z1} \sum_t \iint_{(u,v)} \left\{ \sum_{-\Delta T \leq t_1 \leq \Delta T} \iint_{\substack{-\Delta u \leq u_1 \leq \Delta u \\ -\Delta v \leq v_1 \leq \Delta v}} \|Z_{(t+t_1, u+u_1, v+v_1)} - A_{Z(t,u,v)} \cdot I_{(t+t_1, u+u_1, v+v_2)} - B_{Z(t,u,v)}\|_2 \, du_1 \, dv_1 \right\} du \, dv + \alpha_{Z2} \sum_t \iint_{(u,v)} \|A_{Z(t,u,v)}\|_2$$

Here, ΔT, Δu, and Δv are each a desired constant equal to or greater than 0. DataTerm is Expression 76 obtained by substituting Expression 79 into Expression 76, and solves Expression 81.

A first term on the right-hand side of Expression 93 will be described. Consideration is given to a region the size of (2×ΔT+1, 2×Δu, 2×Δv) centered on (t, u, v) in time and space. For example, ΔT=Δu=Δv=2 is satisfied. In this local region, it may be considered that there is a linear relationship between b(t, u, v) to be finally obtained and the corresponding image pixel value I(t, u, v). This is because, in a local region, there is a correlation between "sets of b(t, u, v) and I(t, u, v)" at each position in time and space. Consequently, in this linearity, a first-order coefficient is expressed as Ab(t, u, v), and a zero-order coefficient is expressed as Bb(t, u, v). The first term on the right-hand side of Expression 93 acts so that this linearity relationship may be established as much as possible. Note that αb1 is a contribution rate for the degree of establishment of this linearity relationship, and is a desired constant equal to or greater than 0.

A second term on the right-hand side of Expression 93 will be described. In a case where a change in value of I(t, u, v) in a region the size of (2×ΔT+1, 2×Δu, 2×Δv) centered on (t, u, v) in time and space is small, Ab(t, u, v) becomes unstable. This is because the following Expression 95 holds if B' is set so as to satisfy the following Expression 94 for an arbitrary value A'.

[Math. 94]

$$B' = B - (A' - A_{b(t,u,v)}) \cdot I_{const} \quad \text{Expression 94}$$

[Math. 95]

$$A_{b(t,u,v)} \cdot I_{const} + B_{b(t,u,v)} = A' \cdot I_{const} + B't \quad \text{Expression 95}$$

Here, the value of I(t, u, v) is Iconst, which is always constant.

Consequently, the term for canceling the instability is the second term on the right-hand side of Expression 93. Even in a case where the first term alone is not enough to prevent Ab(t, u, v) from being unstable, this second term can act so that a small value is selected as the value of Ab(t, u, v) so that Ab(t, u, v) can be determined. Note that αb2 is a contribution rate for the instability cancellation, and is a desired constant equal to or greater than 0.

Third and fourth terms on the right-hand side of Expression 93 are obtained by replacing b(t+t1, u+u1, v+v1) in the above-described first and second terms with a(t+t1, u+u1, v+v1), and a description thereof will be omitted. Note that αa1 is a contribution rate for the degree of establishment of this linearity relationship, and is a desired constant equal to or greater than 0. αa2 is a contribution rate for the instability cancellation, and is a desired constant equal to or greater than 0.

Fifth and sixth terms on the right-hand side of Expression 93 are obtained by replacing b(t+t1, u+u1, v+v1) in the above-described first and second terms with Z(t+t1, u+u1, v+v1), and a description thereof will be omitted. Note that αZ1 is a contribution rate for the degree of establishment of this linearity relationship, and is a desired constant equal to or greater than 0. αZ2 is a contribution rate for the instability cancellation, and is a desired constant equal to or greater than 0.

Figure 60:
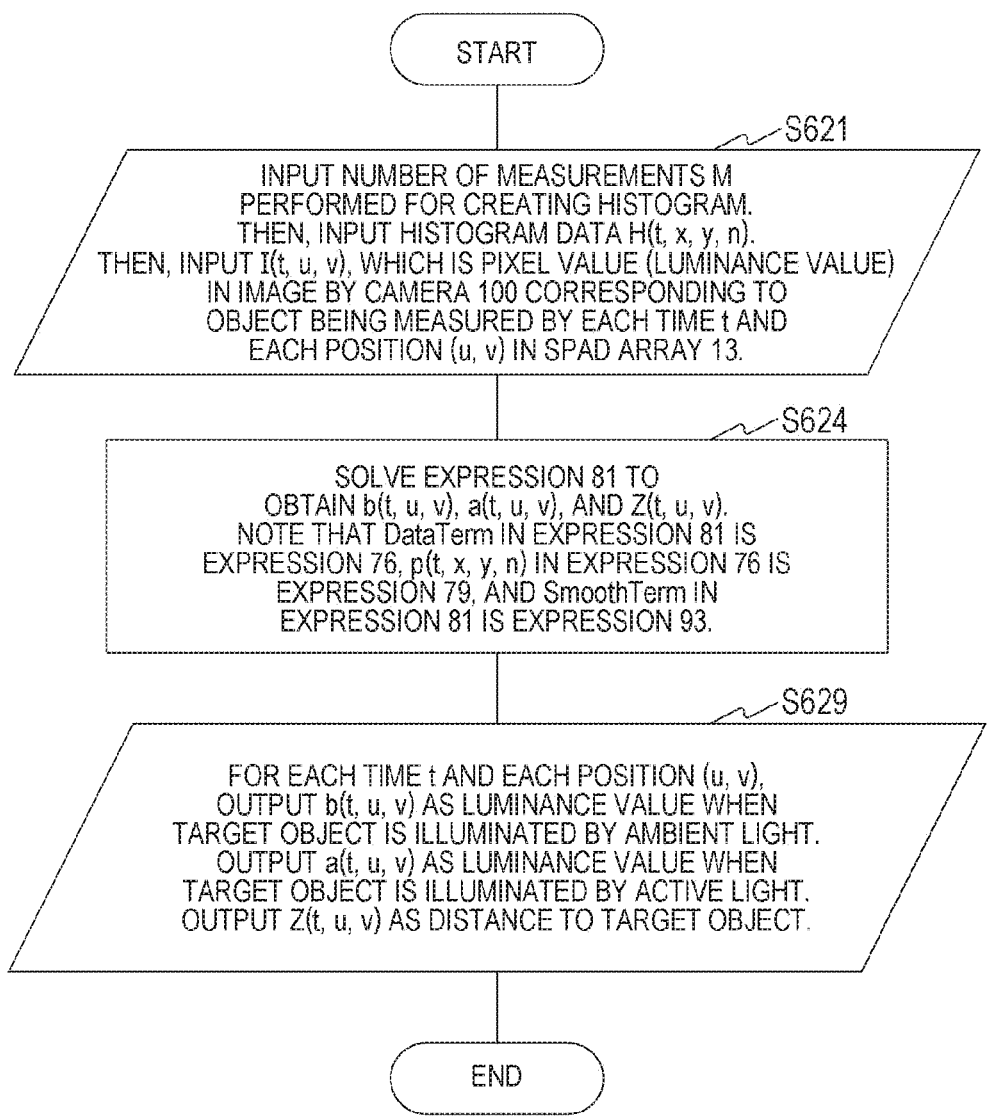
FIG. 60 is a flowchart illustrating an example of a processing procedure for calculating a luminance value and a distance according to a fifth working example of the sixth embodiment of the present technology.

FIG. 60 is a flowchart illustrating an example of a processing procedure for calculating a luminance value and a distance according to the fifth working example of the sixth embodiment of the present technology. This processing is performed by the computation unit 16, and the result is output from the output terminal 17.

Steps S621 and S629 have been described in the above-described third working example, and will not be described here. Instead of step S622 of the above-described third working example, the following step S624 is executed.

In step S624, Expression 81 is solved to obtain b(t, u, v), a(t, u, v), and Z(t, u, v). Note that DataTerm in Expression 81 is Expression 76, p(t, x, y, n) in Expression 76 is Expression 79, and SmoothTerm in Expression 81 is Expression 93. Here, Ab(t, u, v), Bb(t, u, v), Aa(t, u, v), Ba(t, u, v), AZ(t, u, v), and BZ(t, u, v) are each an arbitrary scalar quantity. That is, sets of b(t, u, v), a(t, u, v), Z(t, u, v), Ab(t, u, v), Bb(t, u, v), Aa(t, u, v), Ba(t, u, v), AZ(t, u, v), and BZ(t, u, v) are obtained such that a value obtained by adding Expressions 76 and 93 is minimized, and only b(t, u, v), a(t, u, v), and Z(t, u, v) among those obtained are used as a calculation result.

In this way, for each time t and each position (u, v), a luminance value when the target object is illuminated by the ambient light can be output. Furthermore, it is possible to output a luminance value when the target object is illuminated by the active light. Then, the distance to the target object can be output.

Sixth Working Example

In the sixth working example, the following Expression 96 is adopted as SmoothTerm, which is the above-described "practical restriction".

[Math. 96]

Expression 96

$$SmoothTerm \equiv$$

$$\alpha_{b1} \sum_t \iint_{(u,v)} \left\{ \sum_{-\Delta T \le t_1 \le \Delta T} \iint_{\substack{-\Delta u \le u_1 \le \Delta u \\ -\Delta v \le v_1 \le \Delta v}} \left\| b_{(t+t_1, u+u_1, v+v_1)} - A_{b(t,u,v)} \cdot I_{(t+t_1, u+u_1, v-v)} - B_{b(t,u,v)} \right\|_2 du_1 dv_1 \right\} du \, dv +$$

$$\alpha_{b2} \sum_t \iint_{(u,v)} \|A_{b(t,u,v)}\|_2 + \alpha_{a1} \sum_t \iint_{(u,v)} \left\{ \sum_{-\Delta T \le t_1 \le \Delta T} \iint_{\substack{-\Delta u \le u_1 \le \Delta u \\ -\Delta v \le v_1 \le \Delta v}} \left\| a_{(t+t_1, u+u_1, b+v_1)} - A_{a(t,u,v)} \cdot I_{(t+t_1, u+u_1, v+v_2)} - B_{a(t,u,v)} \right\|_2 du_1 dv_1 \right\} du \, dv + \alpha_{a2} \sum_t \iint_{(u,v)} \|A_{a(t,u,v)}\|_2 +$$

$$\alpha_{Z1} \sum_t \iint_{(u,v)} \left\{ \sum_{-\Delta T \le t_1 \le \Delta T} \iint_{\substack{-\Delta u \le u_1 \le \Delta u \\ -\Delta v \le v_1 \le \Delta v}} \left\| Z_{(t+t_1, u+u_1, v+v_1)} - A_{Z(t,u,v)} \cdot I_{(t+t_1, u+u_1, v+v_2)} - B_{Z(t,u,v)} \right\|_2 du_1 dv_1 \right\} du \, dv + \alpha_{Z2} \sum_t \iint_{(u,v)} \|A_{Z(t,u,v)}\|_2 +$$

$$\alpha_{\sigma 1} \sum_t \iint_{(u,v)} \left\{ \sum_{-\Delta T \le t_1 \le \Delta T} \iint_{\substack{-\Delta u \le u_1 \le \Delta u \\ -\Delta v \le v_1 \le \Delta v}} \left\| \sigma_{(t+t_1, u-u_1, v+v_1)} - A_{\sigma(t,u,v)} \cdot I_{(t+t_1, u+u_t, v+v_1)} - B_{\sigma(t,u,v)} \right\|_2 du_1 dv_1 \right\} du \, dv + \alpha_{\sigma 2} \sum_t \iint_{(u,v)} \|A_{\sigma(t,u,v)}\|_2$$

DataTerm is Expression 76 obtained by substituting Expression 80 into Expression 76, and solves Expression 82.

Here, Expression 96 will be described. However, first to sixth terms on the right-hand side of Expression 96 are the same as those of Expression 93, and thus a description thereof will be omitted.

Seventh and eighth terms on the right-hand side of Expression 96 are obtained by replacing b(t+t1, u+u1, v+v1) in the above-described first and second terms with σ(t+t1, u+u1, v+v1), and a description thereof will be omitted. Note that ασ1 is a contribution rate for the degree of establishment of this linearity relationship, and is a desired constant equal to or greater than 0. ασ2 is a contribution rate for the instability cancellation, and is a desired constant equal to or greater than 0.

Figure 61:
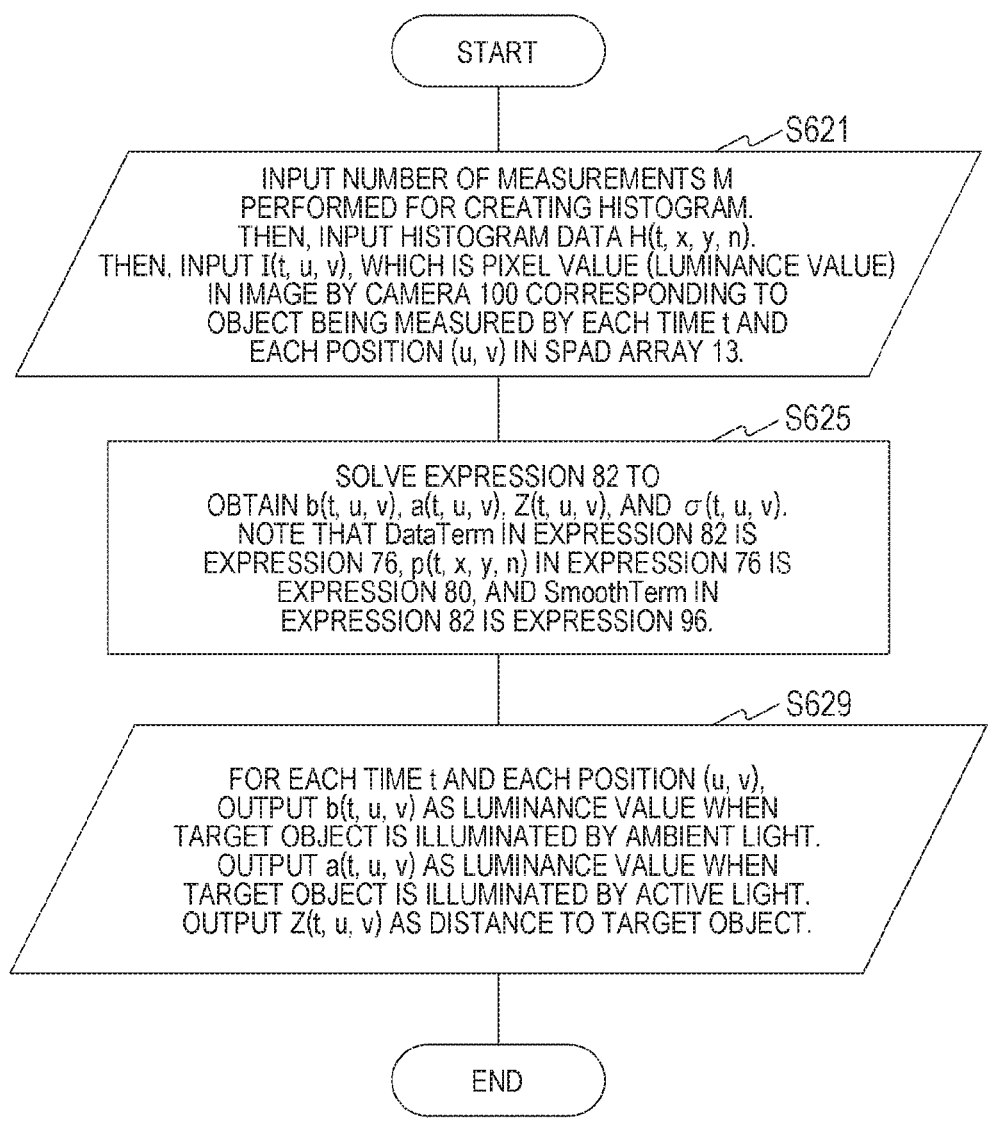
FIG. 61 is a flowchart illustrating an example of a processing procedure for calculating a luminance value and a distance according to a sixth working example of the sixth embodiment of the present technology.

FIG. 61 is a flowchart illustrating an example of a processing procedure for calculating a luminance value and a distance according to the sixth working example of the sixth embodiment of the present technology. This processing is performed by the computation unit 16, and the result is output from the output terminal 17.

Steps S621 and S629 have been described in the above-described third working example, and will not be described here. Instead of step S622 of the above-described sixth working example, the following step S625 is executed.

In step S625, Expression 82 is solved to obtain b(t, u, v), a(t, u, v), Z(t, u, v), and σ(t, u, v). Note that DataTerm in Expression 82 is Expression 76, p(t, x, y, n) in Expression 76 is Expression 80, and SmoothTerm in Expression 82 is Expression 96. Here, Ab(t, u, v), Bb(t, u, v), Aa(t, u, v), Ba(t, u, v), AZ(t, u, v), BZ(t, u, v), Aσ(t, u, v), and Bσ(t, u, v) are each an arbitrary scalar quantity. That is, sets of b(t, u, v), a(t, u, v), Z(t, u, v), σ(t, u, v), Ab(t, u, v), Bb(t, u, v), Aa(t, u, v), Ba(t, u, v), AZ(t, u, v), BZ(t, u, v), Aσ(t, u, v), and Bσ(t, u, v) are obtained such that a value obtained by adding Expressions 76 and 96 is minimized, and only b(t, u, v), a(t, u, v), Z(t, u, v), and σ(t, u, v) among those obtained are used as a calculation result.

In this way, for each time t and each position (u, v), a luminance value when the target object is illuminated by the ambient light can be output. Furthermore, it is possible to output a luminance value when the target object is illuminated by the active light. Then, the distance to the target object can be output.

[Summary]

In the sixth embodiment, a luminance or a distance is calculated taking into account two policies: a first policy and a second policy described below. That is, the first policy is to obtain an occurrence rate so that the occurrence rate may match a histogram, which is an observation value, as much as possible (minimization of DataTerm). The second policy is to correct occurrence rates in proximity to each other so that the change becomes small (minimization of SmoothTerm). Note that the second policy may further use a correlation with an image obtained from an attached camera to operate the acceptable amount of change between neighbors depending on each position (t, u, v) in time and space.

Therefore, in the sixth embodiment, a theoretically optimum solution can be obtained.

[Gist]

The gist of the sixth embodiment is as follows.

(1) A method of obtaining a distance or a luminance from a histogram, the method including:
an input step of inputting a histogram at each position in time and space;
a calculation step of calculating at least one of a distance or a luminance from the histogram; and
an output step of outputting the distance or the luminance, in which the calculation step
calculates parameters that satisfy two constraints: a first constraint that constrains, when an occurrence rate is expressed as a function of time, the parameters of the function so as to satisfy a relationship with the histogram, and a second constraint that constrains the parameters so that the parameters in proximity to each other in time and space may satisfy a specific relationship, and
calculates a distance or a luminance from the parameters.

(2) The method of obtaining a distance or a luminance from a histogram according to (1), in which the first constraint that is the relationship between the occurrence rate p(t) and the histogram h(t) is a relationship represented by $p(t)=h(t)/M(t-1)$, where M is the number of measurements for obtaining the histogram.

(3) The method of obtaining a distance or a luminance from a histogram according to (1) or (2), in which
the second constraint is a relationship in which a difference between the parameters in proximity to each other in time and space is small.

(4) The method of obtaining a distance or a luminance from a histogram according to (1) or (2), the method further including:
an image input step of inputting an image,
in which the second constraint is a constraint in which the parameters in time and space have a correlation with the image.

(5) The method of obtaining a distance or a luminance from a histogram according to (4), in which
the correlation is
a correlation in which, in a direction along an edge in the image, a ratio between a "change in pixel value of the image" and a "change in the parameter" becomes constant.

(6) The method of obtaining a distance or a luminance from a histogram according to (4), in which
the correlation is a correlation in which the image and the parameters have a linear relationship for every local region in time and space.

8. Seventh Embodiment

[Outline]

In this seventh embodiment, noise is removed by performing weighted addition of distance data (distance information). That is, a method of appropriately removing noise with a small amount of computation and without assuming a positional relationship in advance is provided.

In the seventh embodiment, a computation unit 16 detects a peak from a histogram created at each time t and each position (x, y), and calculates a distance by multiplying a time corresponding to the peak by c/2. A distance obtained at each time t and each position (x, y) is expressed as Z(t, x, y, i). Here, i=1 to C(t, x, y). The index i and C(t, x, y) will be described later.

Figure 62:
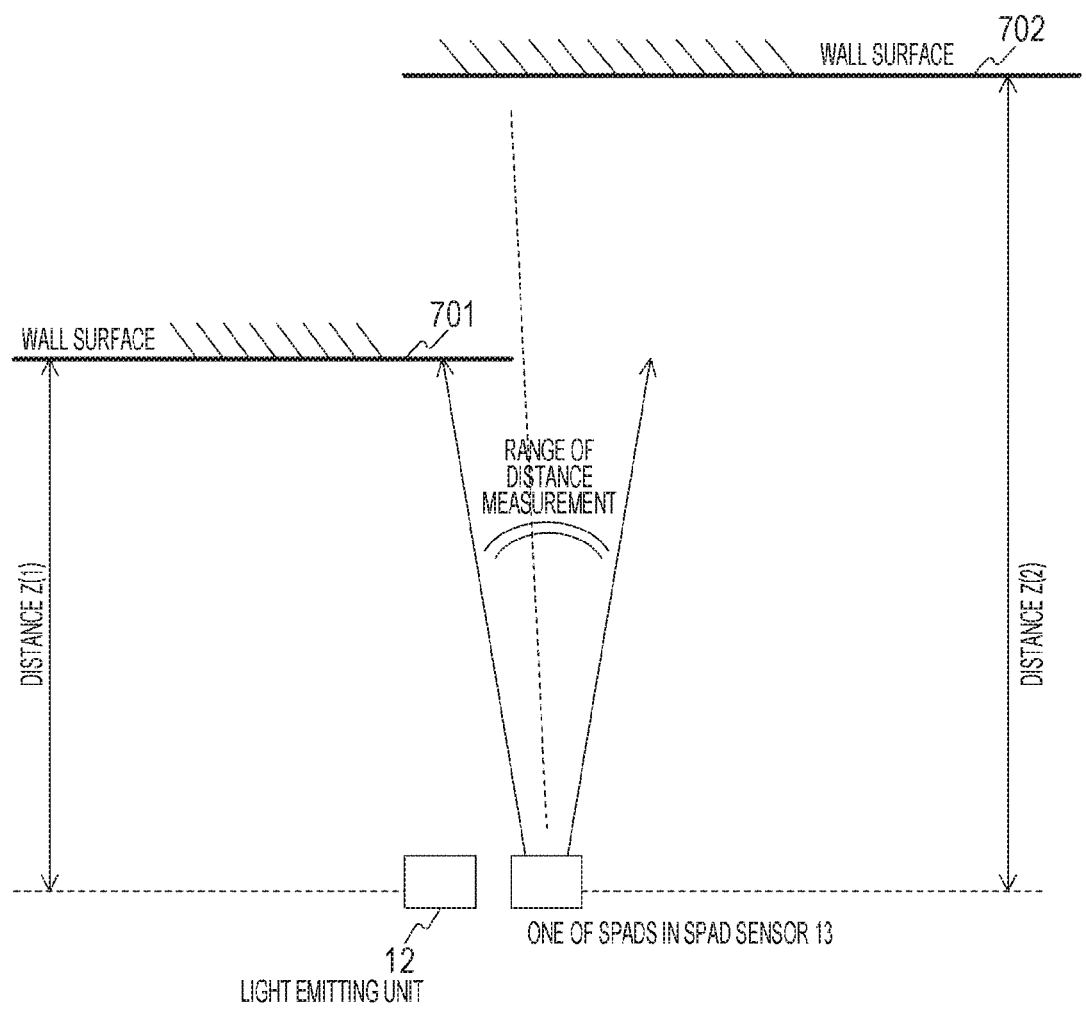
FIG. 62 is a diagram illustrating an example of a scene of distance measurement according to a seventh embodiment of the present technology.

FIG. 62 is a diagram illustrating an example of a scene of distance measurement according to the seventh embodiment of the present technology.

A case as illustrated in the drawing is considered in which one of SPADs in a SPAD array 13 is performing distance measurement on objects (wall surfaces 701 and 702) at different distances at the same time. One SPAD does not perform distance measurement in one direction, but performs, in practice, distance measurement in the whole direction with a certain solid angle (the range of distance measurement in the drawing). A scene where the wall surfaces 701 and 702 are in the range of distance measurement is illustrated. It is assumed that the wall surfaces 701 and 702 are at distances Z(1) and Z(2), respectively.

During M times of light emission from a light emitting unit 12, the light may be received by a SPAD after being reflected by the wall surface 701 in some cases. Alternatively, the light may be received by a SPAD after being reflected by the wall surface 702 in some cases. As a matter of course, ambient light is also received.

Figure 63:
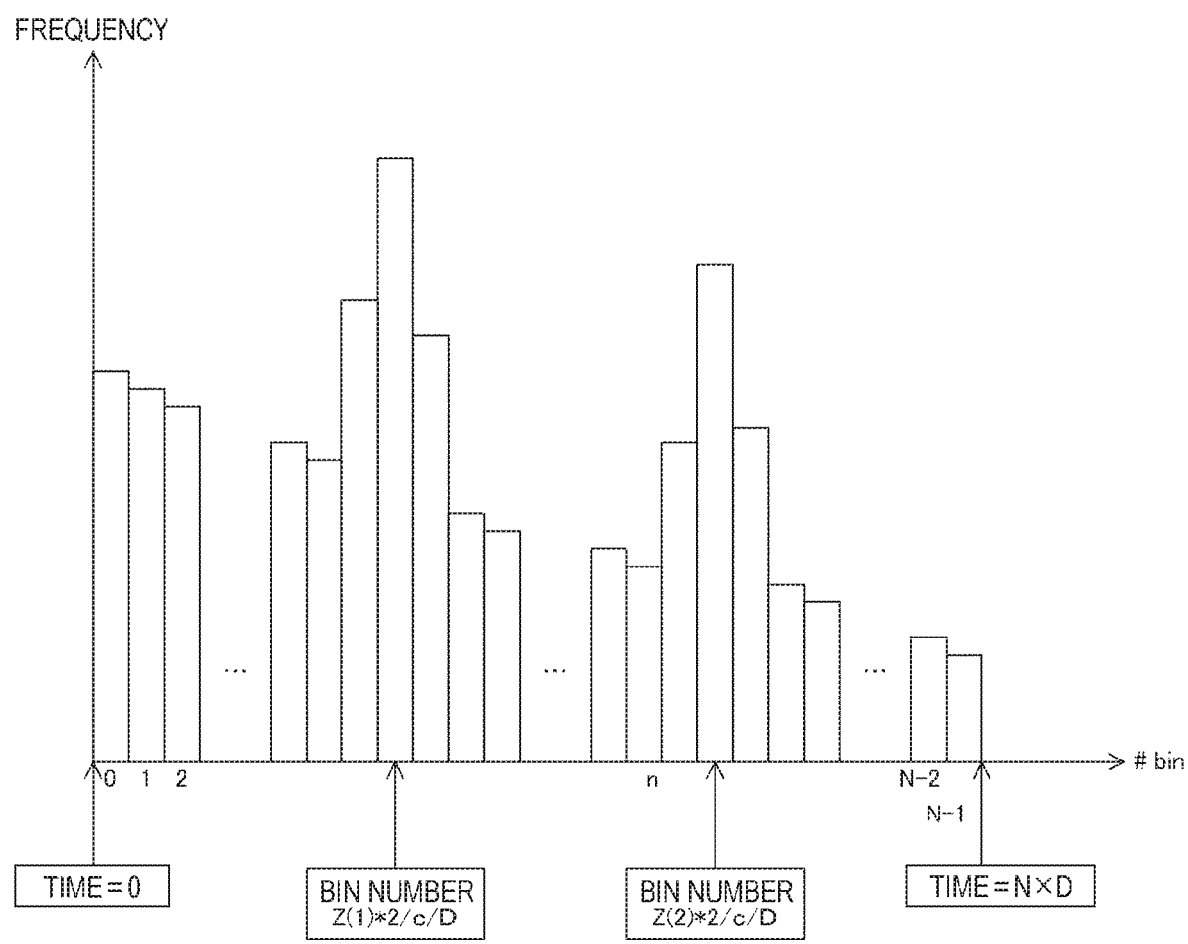
FIG. 63 is a diagram illustrating an intensity distribution in an example of distance measurement according to the seventh embodiment of the present technology.

FIG. 63 is a diagram illustrating an intensity distribution in an example of distance measurement according to the seventh embodiment of the present technology. In this case, there are two peaks in a histogram that is finally obtained. That is, as illustrated in the drawing, the peaks are at a bin (Z(1)×2/c/D) corresponding to distance Z(1) and a bin (Z(2)×2/c/D) corresponding to distance Z(2).

A further generalized case is considered in which a SPAD at position (x, y) in the SPAD array 13 is performing distance measurement on C(t, x, y) objects at different distances at a certain time t. When peak detection is performed on a histogram observed in such a situation, C(t, x, y) peaks are detected. Bins corresponding to these peaks are multiplied by "c×D/2" to calculate C(t, x, y) distances. The distances calculated in this way are expressed as Z(t, x, y, i). Here, i=1 to C(t, x, y).

Furthermore, a peak area is also used in a working example of the seventh embodiment, and the computation unit 16 also calculates the peak area corresponding to each peak as appropriate. An i-th peak area at each time t and each position (x, y) is expressed as S(t, x, y, i). Here, i=1 to C(t, x, y).

A peak area indicates the magnitude of the peak. In a case where this value is small, the corresponding distance data cannot be trusted. Conversely, in a case where this value is large, the corresponding distance data can be trusted.

Note that there are known methods of detecting a peak and obtaining a peak area, and those methods can be applied. That is, for example, there is a general processing method performed on chromatogram data acquired by a gas chromatograph, a liquid chromatograph, or the like. Specific methods include, for example, methods disclosed in "Japanese Patent Application Laid-Open No. 2014-211393: Peak Detector" and "Japanese Patent Application Laid-Open No. 6-230001: Chromatographic Data Processing Device", and these methods can be used to detect a peak and obtain a peak area.

Summarizing the above, distance data can be obtained by analyzing a histogram at each time t and each position (x, y) by the computation unit 16 using a conventionally known method. Here, the number of pieces of distance data is not necessarily one. That is, the number of pieces is $C(t, x, y)$. Then, the seventh embodiment is characterized in that the computation unit 16 removes noise from i-th distance data $Z(t, x, y, i)$ at each time t and each position (x, y). Here, t is an integer equal to or greater than 1. $x=1$ to $X$ and $y=1$ to $Y$ are satisfied. $i=1$ to $C(t, x, y)$ is satisfied. This noise removal also uses a value of a peak area $S(t, x, y, i)$ as necessary.

The removal of noise from distance data $Z(t, x, y, i)$ according to the seventh embodiment can be succinctly expressed as the following Expression 97.

[Math. 97]

$$Z_{NR(t,x,y,i)} = \frac{1}{W_{(t,x,y,i)}} \cdot \sum_{t_1, x_1, y_1, j} w_{(t,x,y,i,t_1,x_1,y_1,j)} \cdot Z_{(t_1,x_1,y_1,j)},$$
$$\text{where } W_{(t,x,y,i)} \equiv \sum_{t_1, x_1, y_1, j} w_{(t,x,y,i,t_1,x_1,y_1,j)} \quad \text{Expression 97}$$

That is, $Z(t, x, y, i)$ is input, and the computation unit 16 uses Expression 97 to calculate distance data $ZNR(t, x, y, i)$ from which noise has been removed, and the distance data $ZNR(t, x, y, i)$ from which noise has been removed is output from an output terminal 17.

Expression 97 performs a weighted average for $Z(t, x, y, i)$. The weighted average removes noise from the distance data. $w(t, x, y, i, t1, x1, y1, j)$ is weighting for the corresponding $Z(t1, x1, y1, j)$, and $W(t, x, y, i)$ is the total value of $w(t, x, y, i, t1, x1, y1, j)$ used for normalization. The seventh embodiment is characterized in setting of the value of this $w(t, x, y, i, t1, x1, y1, j)$, and the value in specific terms will be described later.

Again, $w(t, x, y, i, t1, x1, y1, j)$ is weighting for "j-th distance data at time t1 and position (x1, y1)" used to calculate "i-th distance data at time t and position (x, y)", from which noise is to be removed. Weighted addition is performed on "j-th distance data $Z(t1, x1, y1, j)$ at time t1 and position (x1, y1)" with weighting $w(t, x, y, i, t1, x1, y1, j)$ to obtain "i-th distance data $ZNR(t, x, y, i)$ at time t and position (x, y)" from which noise has been removed.

First Working Example

In a first working example, $w(t, x, y, i, t1, x1, y1, j)$ is determined so as to reduce weighting depending on a distance in time and space. That is, weighting $w(t, x, y, i, t1, x1, y1, j)$ represented by the following Expression 98 is adopted.

[Math. 98]

$$w_{(t,x,y,i,t_1,x_1,y_1,j)} = \begin{cases} 1, & \text{if } t_1 = t, x_1 = x, y_1 = y, j = i \\ 0, & \text{if } t_1 = t, x_1 = x, y_1 = y, j \neq i \\ \dfrac{1}{1 + \sqrt{(t_1-t)^2 + (x_1-x)^2 + (y_1-y)^2}} \cdot \dfrac{S_{(t_1,x_1,y_1,j)}}{1 + |Z_{(t_1,x_1,y_1,j)} - Z_{(t,x,y,i)}|}, & \text{otherwise} \end{cases} \quad \text{Expression 98}$$

Moreover, as shown in Expression 98, by using a peak area, weighting $w(t, x, y, i, t1, x1, y1, j)$ is reduced in a case where the distance data cannot be trusted (the peak area is small), and weighting $w(t, x, y, i, t1, x1, y1, j)$ is increased in a case where the distance data can be trusted (the peak area is large).

The features of the weighting $w(t, x, y, i, t1, x1, y1, j)$ according to the first working example are as follows.

(Feature 1-1) Weighting $w(t, x, y, i, t1, x1, y1, j)$ monotonically decreases with respect to a distance in time and space. This is based on the fact that the probability is high that target objects being measured by two SPADs at a short distance are the same object (distance). In a case where the objects (distances) are the same, noise can be removed by addition.

(Feature 1-2) In a "group of $C(t1, x1, y1)$ pieces of distance data at time t1 and position (x1, y1) $\{Z(t1, x1, y1, j)|j$ is 1 to $C(t, x, y)\}$", weighting is increased as the value is closer to the value of $Z(t, x, y, i)$. This is because in a case of a target object, among $C(t1, x1, y1)$ target objects being measured by SPADs at time t1 and position (x1, y1), with a high probability of being the same object (distance) with an i-th target object being measured by a SPAD at time t and position (x, y), $Z(t, x, y, i)$ and $Z(t1, x1, y1, j)$ should be similar.

(Feature 1-3) Weighting $w(t, x, y, i, t1, x1, y1, j)$ is reduced in a case where distance data cannot be trusted (peak area $S(t1, x1, y1, j)$ is small), and weighting $w(t, x, y, i, t1, x1, y1, j)$ is increased in a case where distance data can be trusted (peak area $S(t1, x1, y1, j)$ is large). This is because better noise removal can be achieved by determining weighting in accordance with a reliability.

In the first working example, a distance measuring device 10 is used to perform distance measurement for each SPAD in the SPAD array 13. From an observed histogram obtained from an accumulation unit 15, the computation unit 16 detects a peak and obtains distance data. Then, the computation unit 16 removes noise from this distance data.

Figure 64:
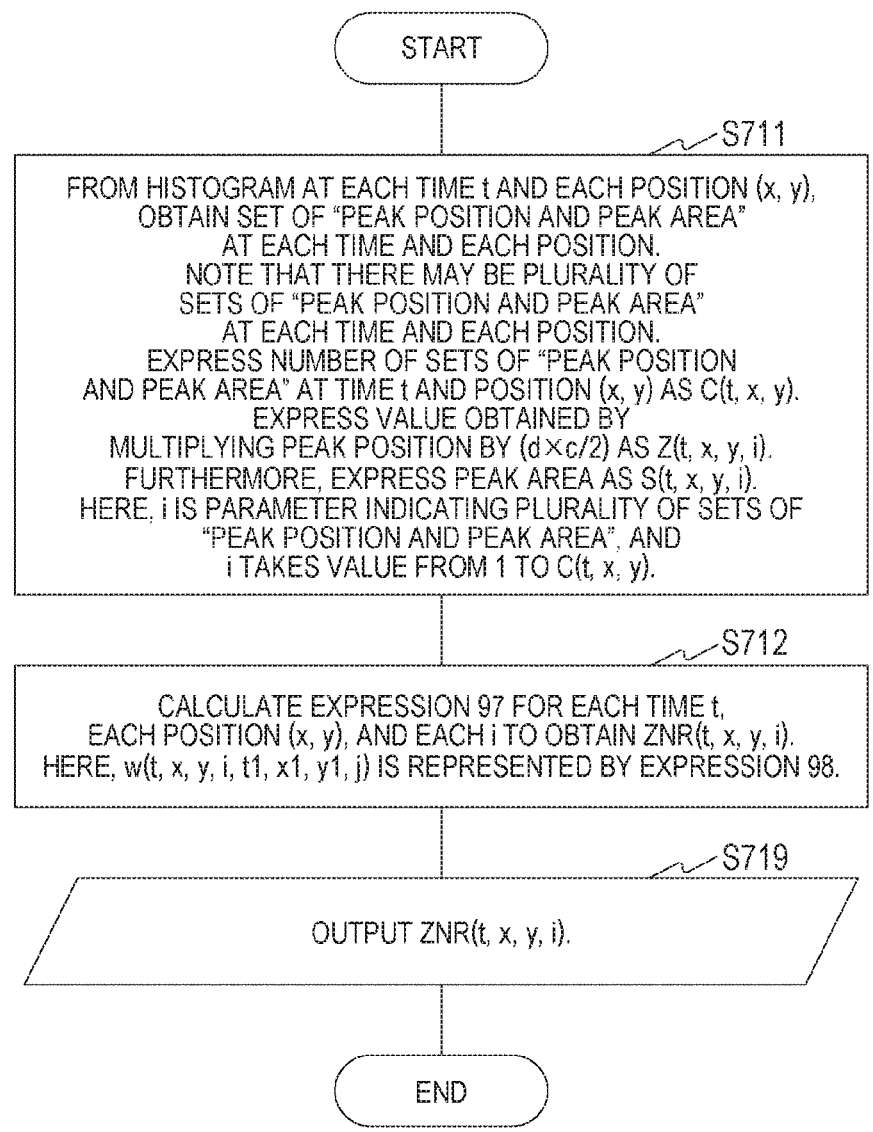
FIG. 64 is a flowchart illustrating an example of a processing procedure for removing noise according to a first working example of the seventh embodiment of the present technology.

FIG. 64 is a flowchart illustrating an example of a processing procedure for removing noise according to the first working example of the seventh embodiment of the present technology. This processing is performed to remove noise from distance data. This processing is performed by the computation unit 16.

First, in step S711, from a histogram at each time t and each position (x, y), a set of "a peak position and a peak area" at each time and each position is obtained. Note that there may be a plurality of sets of "a peak position and a peak area" at each time and each position. The number of sets of "a peak position and a peak area" at time t and position (x, y) is expressed as C(t, x, y). A value obtained by multiplying a peak position by (D×c/2) is expressed as Z(t, x, y, i). Furthermore, a peak area is expressed as S(t, x, y, i). Here, i is a parameter indicating a plurality of sets of "a peak position and a peak area", and i takes a value from 1 to C(t, x, y). Then, the processing proceeds to step S712.

In step S712, the above-described Expression 97 is calculated for each time t, each position (x, y), and each i to obtain ZNR(t, x, y, i). Here, w(t, x, y, i, t1, x1, y1, j) is represented by the above-described Expression 98. Then, the processing proceeds to step S713.

In step S713, ZNR(t, x, y, i) is output from the output terminal 17 as "i-th distance data at time t and position (x, y) from which noise has been removed". Then, the series of processing ends.

Note that in the first working example, the calculation may be simplified by omitting to make weighting w(t, x, y, i, t1, x1, y1, j) depend on the peak area. That is, in Expression 98, S(t1, x1, y1, j) may be forcibly solved as 1 (constant).

Second Working Example

In a second working example, w(t, x, y, i, t1, x1, y1, j) is determined so as to reduce weighting depending on a distance in time and space. That is, weighting w(t, x, y, i, t1, x1, y1, j) represented by the following Expression 99 is adopted.

[Math. 99]

$$w_{(t,x,y,i,t_1,x_1,y_1,j)} = \begin{cases} \dfrac{1}{1 + \sqrt{(t_1 - t)^2 + (x_1 - x)^2 + (y_1 - y)^2}}, & \text{if } j = \underset{h}{\operatorname{argmin}}(|Z_{(t_1,x_1,y_1,h)} - Z_{(t,x,y,i)}|) \\ 0, & \text{othewise} \end{cases}$$

Expression 99

Moreover, as shown in Expression 99, in the "group of C(t1, x1, y1) pieces of distance data at time t1 and position (x1, y1) {Z(t1, x1, y1, j)|j is 1 to C(t, x, y)}", only the one with a value closest to the value of Z(t, x, y, i) is adopted, and weighting is set to 0 for others. This is an extreme example of (Feature 1-2) according to the first working example. That is, as for "(Feature 1-2) In a 'group of C(t1, x1, y1) pieces of distance data at time t1 and position (x1, y1) {Z(t1, x1, y1, j) j is 1 to C(t, x, y)}', weighting is increased as the value is closer to the value of Z(t, x, y, i).", weighting is set to 0 for all except for the one with the closest value.

Again, the features of the weighting w(t, x, y, i, t1, x1, y1, j) according to the second working example are as follows.

(Feature 2-1) In the "group of C(t1, x1, y1) pieces of distance data at time t1 and position (x1, y1) {Z(t1, x1, y1, j)|j is 1 to C(t, x, y)}", weighting is set to 0 except for those close to the value of Z(t, x, y, i). This is because in a case of a target object, among C(t1, x1, y1) target objects being measured by SPADs at time t1 and position (x1, y1), with a high probability of being the same object (distance) with an i-th target object being measured by a SPAD at time t and position (x, y), Z(t, x, y, i) and Z(t1, x1, y1, j) should be similar.

In the second working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 65:
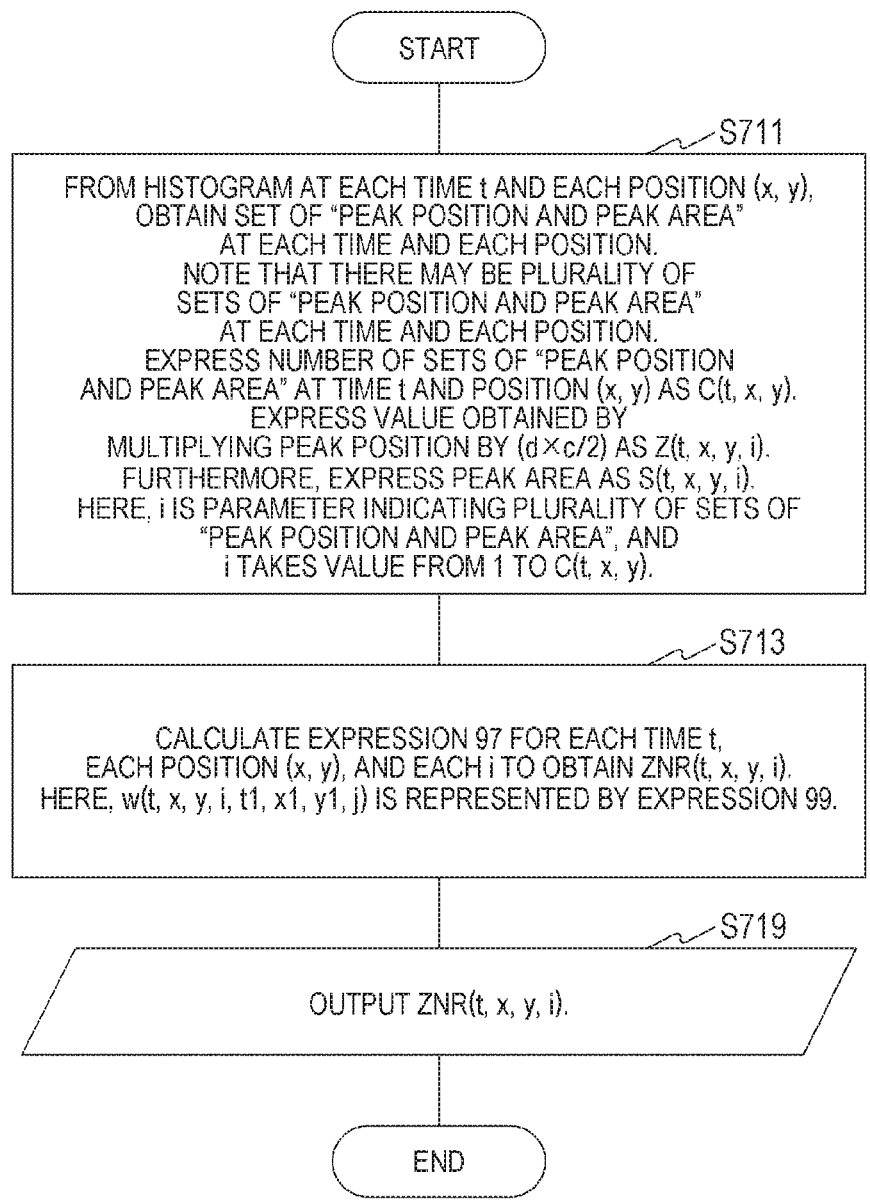
FIG. 65 is a flowchart illustrating an example of a processing procedure for removing noise according to a second working example of the seventh embodiment of the present technology.

FIG. 65 is a flowchart illustrating an example of a processing procedure for removing noise according to the second working example of the seventh embodiment of the present technology. This processing is performed to remove noise from distance data. This processing is performed by the computation unit 16.

Steps S711 and S719 have been described in the above-described first working example, and will not be described here. Instead of step S712 of the above-described first working example, the following step S713 is executed.

In step S713, Expression 97 is calculated for each time t, each position (x, y), and each i to obtain ZNR(t, x, y, i). Here, w(t, x, y, i, t1, x1, y1, j) is represented by Expression 99.

Third Working Example

In a third working example, weighting w(t, x, y, i, t1, x1, y1, j) is determined depending on directions in time and space (time direction, x direction, and y direction). That is, weighting w(t, x, y, i, t1, x1, y1, j) represented by the following Expression 100 is adopted.

[Math. 100]

$$w_{(t,x,y,i,t_1,x_1,y_1,j)} =$$

$$\begin{cases} 1, & \text{if } t_1 = t, x_1 = x, y_1 = y, j = i \\ \frac{1}{2} \cdot \text{Heaviside}\left(Th_1 - \frac{1}{C_{(t,x,y)}} \cdot \sum_{g=1}^{C_{(t,x,y)}} \min_{h,k}(|Z_{(t+1,x_1,y_1,h)} - Z_{(t,x,y,g)}| + |Z_{(t-1,x_1,y_1,k)} - Z_{(t,x,y,g)}|)\right); \\ \quad \text{if } t_1 = t \pm 1, x_1 = x, y_1 = y, j = \underset{h}{\text{argmin}}(|Z_{(t_1,x_1,y_1,h)} - Z_{(t,x,y,i)}|) \\ \frac{1}{2} \cdot \text{Heaviside}\left(Th_1 - \frac{1}{C_{(t,x,y)}} \cdot \sum_{g=1}^{C_{(t,x,y)}} \min_{h,k}(|Z_{(t_1,x+1,y_1,h)} - Z_{(t,x,y,g)}| + |Z_{(t_1,x-1,y_1,k)} - Z_{(t,x,y,g)}|)\right); \\ \quad \text{if } t_1 = t, x_1 = x \pm 1, y_1 = y, j = \underset{h}{\text{argmin}}(|Z_{(t_1,x_1,y_1,h)} - Z_{(t,x,y,i)}|) \\ \frac{1}{2} \cdot \text{Heaviside}\left(Th_1 - \frac{1}{C_{(t,x,y)}} \cdot \sum_{g=1}^{C_{(t,x,y)}} \min_{h,k}(|Z_{(t_1,x_1,y+1,h)} - Z_{(t,x,y,g)}| + |Z_{(t_1,x_1,y-1,k)} - Z_{(t,x,y,g)}|)\right); \\ \quad \text{if } t_1 = t, x_1 = x, y_1 = y \pm 1, j = \underset{h}{\text{argmin}}(|Z_{(t_1,x_1,y_1,h)} - Z_{(t,x,y,i)}|) \\ 0, & \text{otherwise} \end{cases}$$

Expression 100

Note that Heaviside( ) in Expression 100 is a step function defined by the following Expression 101. Furthermore, Th1 is a desired constant (threshold).

[Math. 101]

$$\text{Heaviside}(r) = \begin{cases} 1, & \text{if } 0 \leq r \\ 0, & \text{otherwise} \end{cases}$$

Expression 101

Here, Expression 100 will be described. Interest is focused on distance data temporally immediately preceding and immediately following "g-th (g=1 to C(t, x, y)) distance data at time t and position (x, y)" from which noise is to be removed. That is, the interest is focused on "h-th distance data at time t1 and position (x1, y1)", where t1=t+1, x1=x, and y1=y. Here, h=1 to C(t+1, x, y) is satisfied. Then, the interest is focused on "k-th distance data at time t1 and position (x1, y1)", where t1=t−1, x1=x, and y1=y. Here, k=1 to C(t−1, x, y) is satisfied.

It is determined whether or not the same target object (distance) is being measured at time t+1 and time t. This can be determined by the following Expression 102.

[Math. 102]

$$\frac{1}{C_{(t,x,y)}} \cdot \sum_{g=1}^{C_{(t,x,y)}} \min_h |Z_{(t+1,x,y,h)} - Z_{(t,x,y,g)}|$$

Expression 102

Expression 102 checks whether or not a distance similar to "g-th distance data at time t and position (x, y)" is included in a "group of pieces of distance data at time t+1 and position (x, y)". Here, g=1 to C(t, x, y) is satisfied. In a case where the value of Expression 102 is small, it can be determined that "the same target object (distance) is being measured at time t+1 and time t".

It is determined whether or not the same target object (distance) is being measured at time t−1 and time t. This can be determined by the following Expression 103.

[Math. 103]

$$\frac{1}{C_{(t,x,y)}} \cdot \sum_{g=1}^{C_{(t,x,y)}} \min_h |Z_{(t-1,x,y,h)} - Z_{(t,x,y,g)}|$$

Expression 103

Expression 103 checks whether or not a distance similar to "g-th distance data at time t and position (x, y)" is included in a "group of pieces of distance data at time t−1 and position (x, y)". Here, g=1 to C(t, x, y) is satisfied. In a case where the value of Expression 103 is small, it can be determined that "the same target object (distance) is being measured at time t−1 and time t".

Thus, when considered in the time direction, whether or not the same target object (distance) is being measured at time t−1, time t, and time t+1 can be determined by the following Expression 104.

[Math. 104]

$$Th_1 - \frac{1}{C_{(t,x,y)}} \cdot \sum_{g=1}^{C_{(t,x,y)}} \min_{h,k}(|Z_{(t+1,x,y,h)} - Z_{(t,x,y,g)}| + |Z_{(t-1,x,y,h)} - Z_{(t,x,y,g)}|)$$

Expression 104

In a case where the value of Expression 104 is negative, it can be determined that different target objects (distances) are being measured at time t−1, time t, and time t+1". In a case where the value of Expression 104 is 0 or positive, it can be determined that the same target object (distance) is being measured at time t−1, time t, and time t+1". Then, in the case of "the same", noise can be removed by addition. That is, as shown in the following Expression 105, addition is performed with weighting of 0 in the case of "different", or with weighting of ½ in the case of "the same".

[Math. 105]

$$\frac{1}{2} \cdot \text{Heaviside} \left( Th_1 - \frac{1}{C_{(t,x,y)}} \cdot \sum_{g=1}^{C_{(t,x,y)}} \min_{h,k} (|Z_{(t+1,x,y,h)} - Z_{(t,x,y,g)}| + |Z_{(t-1,x,y,h)} - Z_{(t,x,y,g)}|) \right)$$

Expression 105

As a matter of course, distance data to be added is only the one closest to the value of Z(t, x, y, i) among a "group of C(t+1, x, y) pieces of distance data at time t+1 and position (x, y) {Z(t+1, x, y, j)|j is 1 to C(t+1, x, y)}". Then, distance data to be added is only the one closest to the value of Z(t, x, y, i) among a "group of C(t−1, x, y) pieces of distance data at time t−1 and position (x, y) {Z(t−1, x, y, j)|j is 1 to C(t−1, x, y)}". Adopting "only the closest one" is the same as the above-described second working example.

The above description relates to the time direction, and the same can be said for the x direction and the y direction in a similar manner, so weighting is ultimately represented by the above-described Expression 100.

Again, the features of the weighting w(t, x, y, i, t1, x1, y1, j) according to the third working example are as follows.

(Feature 3-1) Weighting w(t, x, y, i, t1, x1, y1, j) is determined depending on directions in time and space (time direction, x direction, and y direction). In a case where it is determined that the same target object (distance) is being measured in a certain direction, weighting for that direction is increased. In a case where the determination result is "different", weighting is reduced (or set to 0). Note that this determination is made by determining whether or not there are pieces of data with the same distance (i.e., Expression 104).

In the third working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 66:
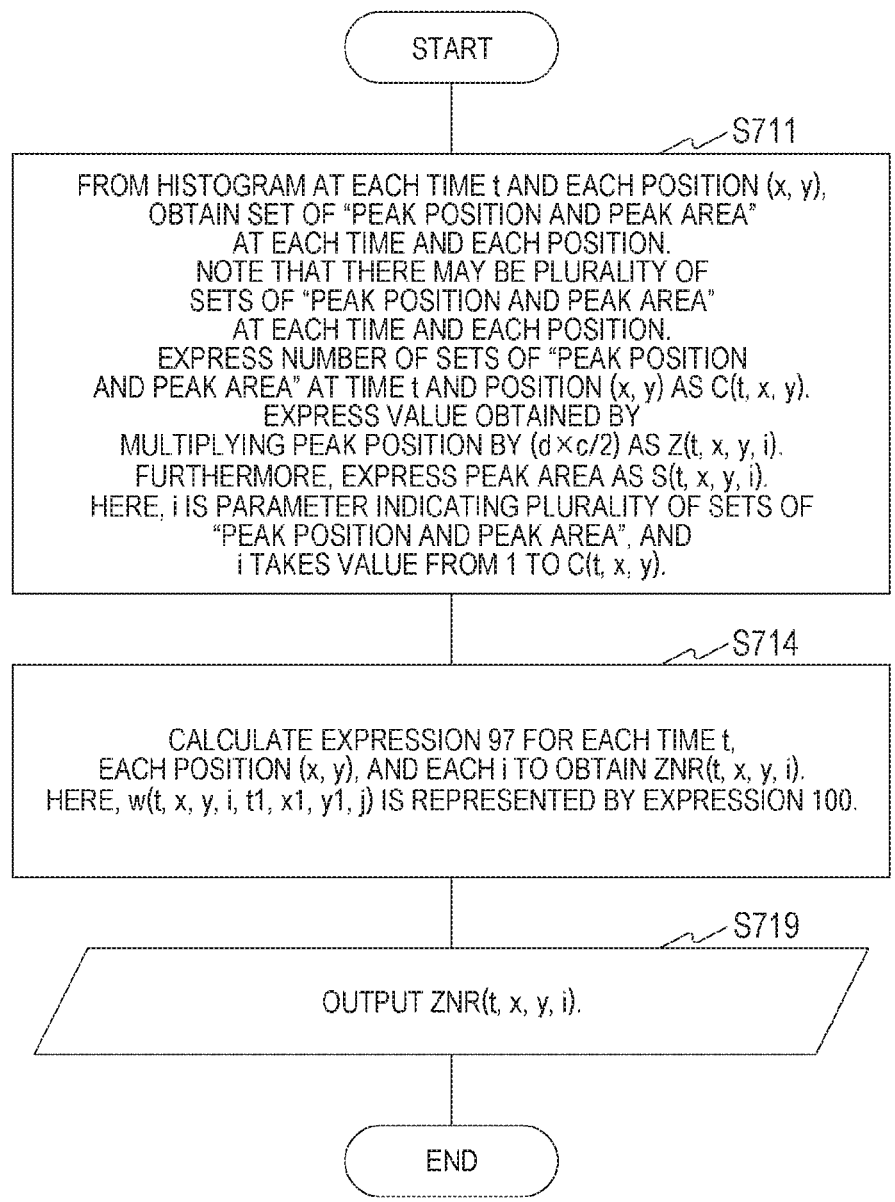
FIG. 66 is a flowchart illustrating an example of a processing procedure for removing noise according to a third working example of the seventh embodiment of the present technology.

FIG. 66 is a flowchart illustrating an example of a processing procedure for removing noise according to the third working example of the seventh embodiment of the present technology. This processing is performed to remove noise from distance data. This processing is performed by the computation unit 16.

Steps S711 and S719 have been described in the above-described first working example, and will not be described here. Instead of step S712 of the above-described first working example, the following step S714 is executed.

In step 714, the above-described Expression 97 is calculated for each time t, each position (x, y), and each i to obtain ZNR(t, x, y, i). Here, w(t, x, y, i, t1, x1, y1, j) is represented by the above-described Expression 100.

Fourth Working Example

In a fourth working example, weighting w(t, x, y, i, t1, x1, y1, j) is increased for distance data in which it is considered that the same target object (distance) is being measured. That is, weighting w(t, x, y, i, t1, x1, y1, j) represented by the following Expression 106 is adopted.

[Math. 106]

$$w_{(t,x,y,i,t_1,x_1,y_1,j)} = $$

$$\begin{cases} \dfrac{1}{1 + \sqrt{(t_1 - t)^2 + (x_1 - x)^2 + (y_1 - y)^2}} \cdot \\ \quad \dfrac{1}{1 + \dfrac{1}{C_{(t,x,y)}} \cdot \sum_{g=1}^{C_{(t,x,y)}} \min_h (|Z_{(t_1,x_1,y_1,h)} - Z_{(t,x,y,g)}|)}, \\ \quad \text{if } j = \underset{h}{\operatorname{argmin}}(|Z_{(t_1,x_1,y_1,h)} - Z_{(t,x,y,i)}|) \\ 0, \text{ otherwise} \end{cases}$$

Expression 106

Here, Expression 106 will be described. It is determined whether or not a "target object (distance) being measured at time t and position (x, y)" and a "target object (distance) being measured at time t1 and position (x1, y1)" are the same. This can be determined by the following Expression 107.

[Math. 107]

$$\frac{1}{C_{(t,x,y)}} \cdot \sum_{g=1}^{C_{(t,x,y)}} \min_h |Z_{(t_1,x_1,y_1,h)} - Z_{(t,x,y,g)}|$$

Expression 107

Expression 107 checks whether or not a distance similar to "g-th distance data at time t and position (x, y)" is included in a "group of pieces of distance data at time t1 and position (x1, y1)". Here, g=1 to C(t, x, y) is satisfied. In a case where the value of Expression 107 is small, the "target object (distance) being measured at time t and position (x, y)" and the "target object (distance) being measured at time t1 and position (x1, y1)" can be determined to be the same.

Then, in a case where the determination result is "the same", noise can be removed by addition. Consequently, the smaller the value of Expression 107, the more the weighting is increased for the addition. As a matter of course, distance data to be added is only the one closest to the value of Z(t, x, y, i) among a "group of C(t1, x1, y1) pieces of distance data at time t1 and position (x1, y1) {Z(t1, x1, 1y, j)|j is 1 to C(t1, x1, y1)}". Adopting "only the closest one" is the same as the above-described second working example. That is, weighting is represented by Expression 106.

Note that in Expression 106, weighting is dependent also on the distance. Dependency on the distance is the same as (Feature 1-1) of the above-described first working example.

Again, the features of the weighting w(t, x, y, i, t1, x1, y1, j) according to the fourth working example are as follows.

(Feature 4-1) In a case where it is determined that a "target object (distance) being measured at time t and position (x, y)" and a "target object (distance) being measured at time t1 and position (x1, y1)" are the same, weighting is increased. In a case where the determination result is "different", weighting is reduced. Note that this determination is made by determining whether or not there are pieces of data with the same distance (i.e., Expression 107).

In the fourth working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 67:
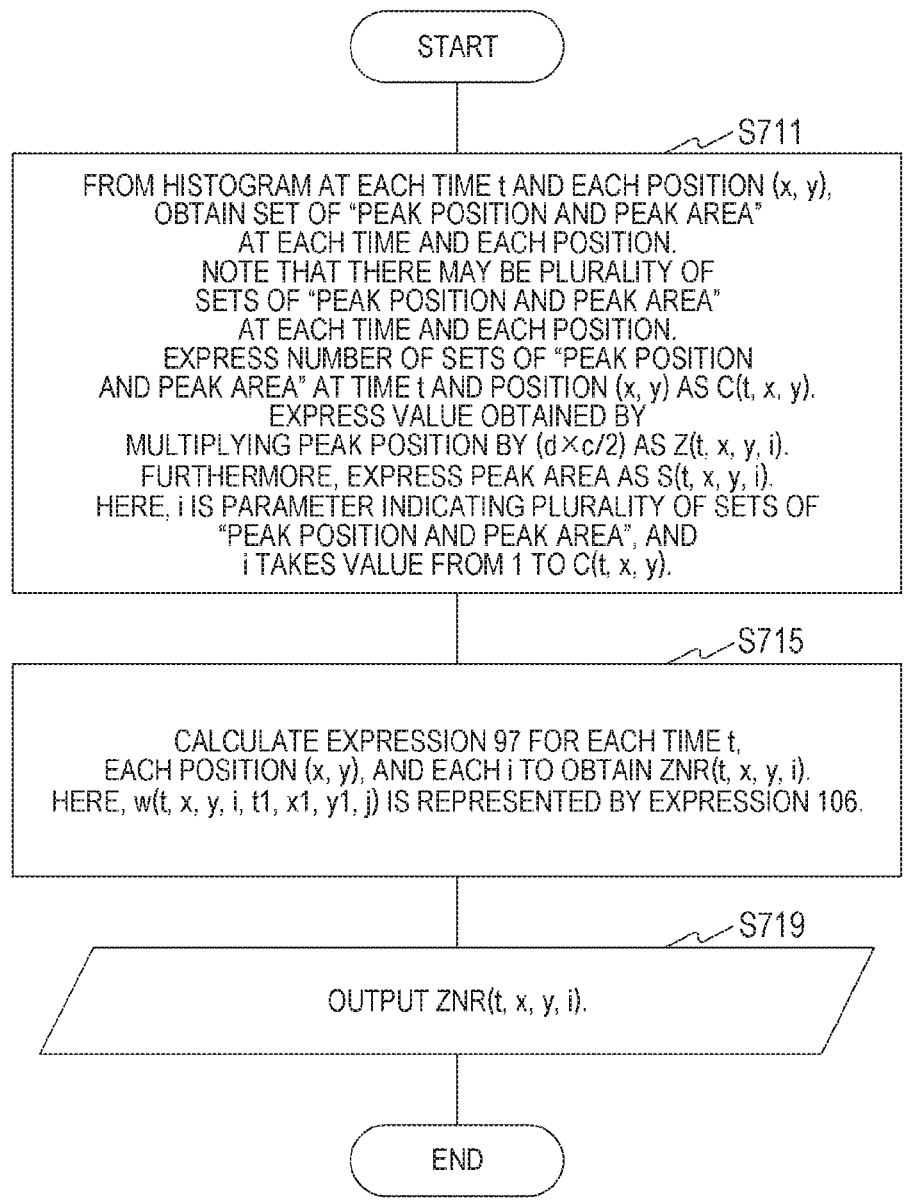
FIG. 67 is a flowchart illustrating an example of a processing procedure for removing noise according to a fourth working example of the seventh embodiment of the present technology.

FIG. 67 is a flowchart illustrating an example of a processing procedure for removing noise according to the fourth working example of the seventh embodiment of the present technology. This processing is performed to remove noise from distance data. This processing is performed by the computation unit 16.

Steps S711 and S719 have been described in the above-described first working example, and will not be described here. Instead of step S712 of the above-described first working example, the following step S715 is executed.

In step S715, Expression 97 is calculated for each time t, each position (x, y), and each i to obtain ZNR(t, x, y, i). Here, w(t, x, y, i, t1, x1, y1, j) is represented by Expression 106.

Fifth Working Example

In a fifth working example, weighting w(t, x, y, i, t1, x1, y1, j) is increased for distance data in which it is considered that the same target object (distance) is being measured. That is, weighting w(t, x, y, i, t1, x1, y1, j) represented by the following Expression 108 is adopted. Note that a in Expression 108 is a desired constant.

[Math. 108]

$$w_{(t,x,y,i,t_1,x_1,y_1,j)} =$$

$$\begin{cases} \dfrac{(1)}{1 + \sum\limits_{\substack{-a \le t_0 \le a \\ -a \le x_0 \le a \\ -a \le y_0 \le a}} \left\{ \dfrac{(1)}{(C_{(t+t_0,x+x_0,y+y_0)})} \cdot \sum\limits_{g=1}^{C_{(t+t_0,x+x_0,y-y_0)}} \min_h (|Z_{(t_1+t_0,x_1+x_0,y_1+y_0,h)} - Z_{(t_1+t_0,x_1+x_0,y_1+y_0,h)}|) \right\}}, & \text{if } j = \operatorname*{argmin}_h (|Z_{(t_1,x_1,y_1,h)} - Z_{(t,x,y,i)}|) \\ 0, & \text{otherwise} \end{cases}$$

Expression 108

In the above-described fourth working example, whether or not the same target object (distance) is being measured is determined using distance data at that time and that position. On the other hand, in the fifth working example, whether or not the same target object (distance) is being measured is determined using distance data at that time and its surrounding times and at that position and its surrounding positions.

Here, Expression 108 will be described. It is determined whether or not a "target object (distance) being measured at time t and position (x, y)" and a "target object (distance) being measured at time t1 and position (x1, y1)" are the same. For this determination, distance data in a region of (2α+1)×(2α+1)×(2α+1) in time and space centered on the "time t, position (x, y)" is used. Then, distance data in a region of (2α+1)×(2α+1)×(2α+1) in time and space centered on the "time t1, position (x1, y1)" is used. That is, a determination is made by the following Expression 109.

[Math. 109]

$$\sum_{\substack{-a \le t_0 \le a \\ -a \le x_0 \le a \\ -a \le y_0 \le a}} \left\{ \frac{1}{C_{(t+t_0,x+x_0,y+y_0)}} \cdot \sum_{g=1}^{C_{(t+t_0,x+x_0,y+y_1)}} \min_h \right.$$

$$\left. (|Z_{(t_1+t_0,x_1+x_0,y_1+y_0,h)} - Z_{(t+t_0,x+x_0,y+y_0,g)}|) \right\}$$

Expression 109

For each of t0, x0, and y0 where −α≤t0≤α, −α≤x0≤α, and −α≤y0≤α, it is determined whether or not a "target object (distance) being measured at time t+t0 and position (x+x0, y+y0)" and a "target object (distance) being measured at time t1+t0 and position (x1+x0, y1+y0)" are the same. This determination for each of t0, x0, and y0 is the same as the determination (Expression 107) according to the above-described fourth working example. The total of determinations for every to, x0, and y0 is represented by Expression 109.

Instead of a comparison between only "distance measurement data at time t and position (x, y)" of interest and "distance measurement data at time t1 and position (x1, y1)" (Expression 107 in the fourth working example), an evaluation is made also on surrounding positions (Expression 109), and this enables more accurate determination.

Then, in a case where the determination result is "the same", noise can be removed by addition. Consequently, the smaller the value of Expression 109, the more the weighting is increased for the addition. As a matter of course, distance data to be added is only the one closest to the value of Z(t, x, y, i) among a "group of C(t1, x1, y1) pieces of distance data at time t1 and position (x1, y1) {Z(t1, x1, 1y, j)|j is 1 to C(t1, x1, y1)}". Adopting "only the closest one" is the same as the above-described second working example. That is, weighting is represented by Expression 108.

Again, the features of the weighting w(t, x, y, i, t1, x1, y1, j) according to the fifth working example are as follows.

(Feature 5-1) In a case where it is determined that a "target object (distance) being measured at time t and position (x, y)" and a "target object (distance) being measured at time t1 and position (x1, y1)" are the same, weighting is increased. In a case where the determination result is "different", weighting is reduced. Note that this determination is made by determining whether or not there are pieces of data with the same distance, including surrounding positions in time and space (i.e., Expression 109).

In the fifth working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 68:
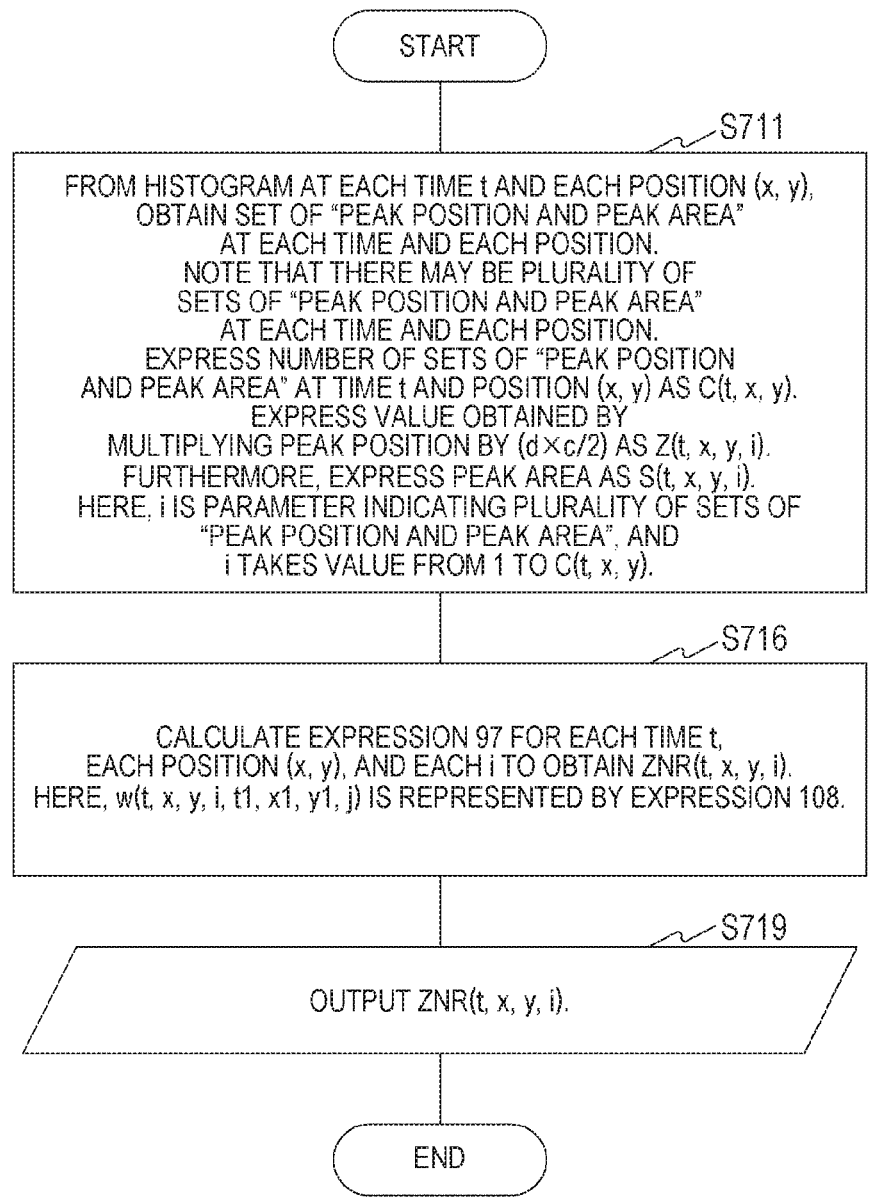
FIG. 68 is a flowchart illustrating an example of a processing procedure for removing noise according to a fifth working example of the seventh embodiment of the present technology.

FIG. 68 is a flowchart illustrating an example of a processing procedure for removing noise according to the fifth working example of the seventh embodiment of the present technology. This processing is performed to remove noise from distance data. This processing is performed by the computation unit 16.

Steps S711 and S719 have been described in the above-described first working example, and will not be described here. Instead of step S712 of the above-described first working example, the following step S716 is executed.

In step S716, Expression 97 is calculated for each time t, each position (x, y), and each i to obtain ZNR(t, x, y, i). Here, w(t, x, y, i, t1, x1, y1, j) is represented by Expression 108.

Sixth Working Example

In a sixth working example, a camera 100 attached to the distance measuring device 10 is used. Here, the camera 100 is a device capable of capturing an image, and captures the image in the same direction as a direction of measurement by the SPAD array 13 of the distance measuring device 10.

A pixel position in an image by the camera 100 corresponding to an "object being measured by a SPAD at time t and position (x, y)" is expressed as (u(t, x, y), v(t, x, y)). Then, a pixel value at a pixel position (u(t, x, y), v(t, x, y)) in an image captured by the camera 100 at time t is expressed as G(t, u(t, x, y), v(t, x, y)).

Note that in a case where the distance measuring device 10 and the camera 100 are installed adjacent to each other, the pixel value G(t, u(t, x, y), v(t, x, y)) is a value of a pixel that has been imaged by the camera 100 in the same direction as the direction in which a SPAD at position (x, y) in the SPAD array 13 is performing distance measurement at time t.

In a case where a pixel value G(t, u(t, x, y), v(t, x, y)) in an image by the camera 100 corresponding to an object being measured by a SPAD at time of interest t and position of interest (x, y) in the SPAD array 13 and a pixel value G(t1, u(t1, x1, y1), v(t1, x1, y1)) in an image by the camera 100 corresponding to an object being measured by a SPAD at time t1 and position (x1, y1) in the SPAD array 13 are similar, it is considered that the same object is being imaged in the camera 100. That is, it is considered that the two SPADs are measuring the same object. On the other hand, in a case where the pixel values are different, it is considered that different objects are being measured.

Consequently, if the pixel values G(t, u(t, x, y), v(t, x, y)) and G(t1, u(t1, x1, y1), v(t1, x1, y1)) in the images by the camera 100 are substantially the same, weighting for adding distance data at time t1 and position (x1, y1) is increased. If not, weighting to be added is reduced, or no addition is performed. In this way, appropriate distance data can be added, and noise can be removed.

Thus, in the sixth working example, weighting w(t, x, y, i t1, x1, y1, j) represented by Expression 110 is adopted.

[Math. 110]

$$w_{(t,x,y,i,t_1,x_1,y_1,j)} = \begin{cases} \dfrac{1}{1 + \sqrt{(t_1-t)^2 + (x_1-x)^2 + (y_1-y)^2}} \cdot \\ \quad \dfrac{1}{1 + |G_{(t_1,u(t_1,x_1,y_1),v(t_1,x_1,y_1))} - G_{(t,u(t,x,y),v(t,x,y))}|} \\ \quad \text{if } j = \underset{h}{\mathrm{argmin}}(|Z_{(t_1,x_1,y_1,h)} - Z_{(t,x,y,i)}|) \\ 0, \text{ otherwise} \end{cases}$$

Expression 110

Note that in Expression 110, weighting is dependent also on the distance. Dependency on the distance is the same as (Feature 1-1) of the above-described first working example.

Furthermore, distance data to be added is only the one closest to the value of Z(t, x, y, i) among a "group of C(t1, x1, y1) pieces of distance data at time t1 and position (x1, y1) {Z(t1, x1, 1y, j)|j is 1 to C(t1, x1, y1)}". Adopting "only the closest one" is the same as the above-described second working example.

Again, the features of the weighting w(t, x, y, i, t1, x1, y1, j) according to the sixth working example are as follows.

(Feature 6-1) In a case where it is determined that a "target object being measured at time t and position (x, y)" and a "target object being measured at time t1 and position (x1, y1)" are the same, weighting is increased. In a case where the determination result is "different", weighting is reduced. Note that this determination is made on the basis of the similarity between pixel values at the corresponding pixel positions in images by the camera 100 attached to the distance measuring device 10.

In the sixth working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 69:
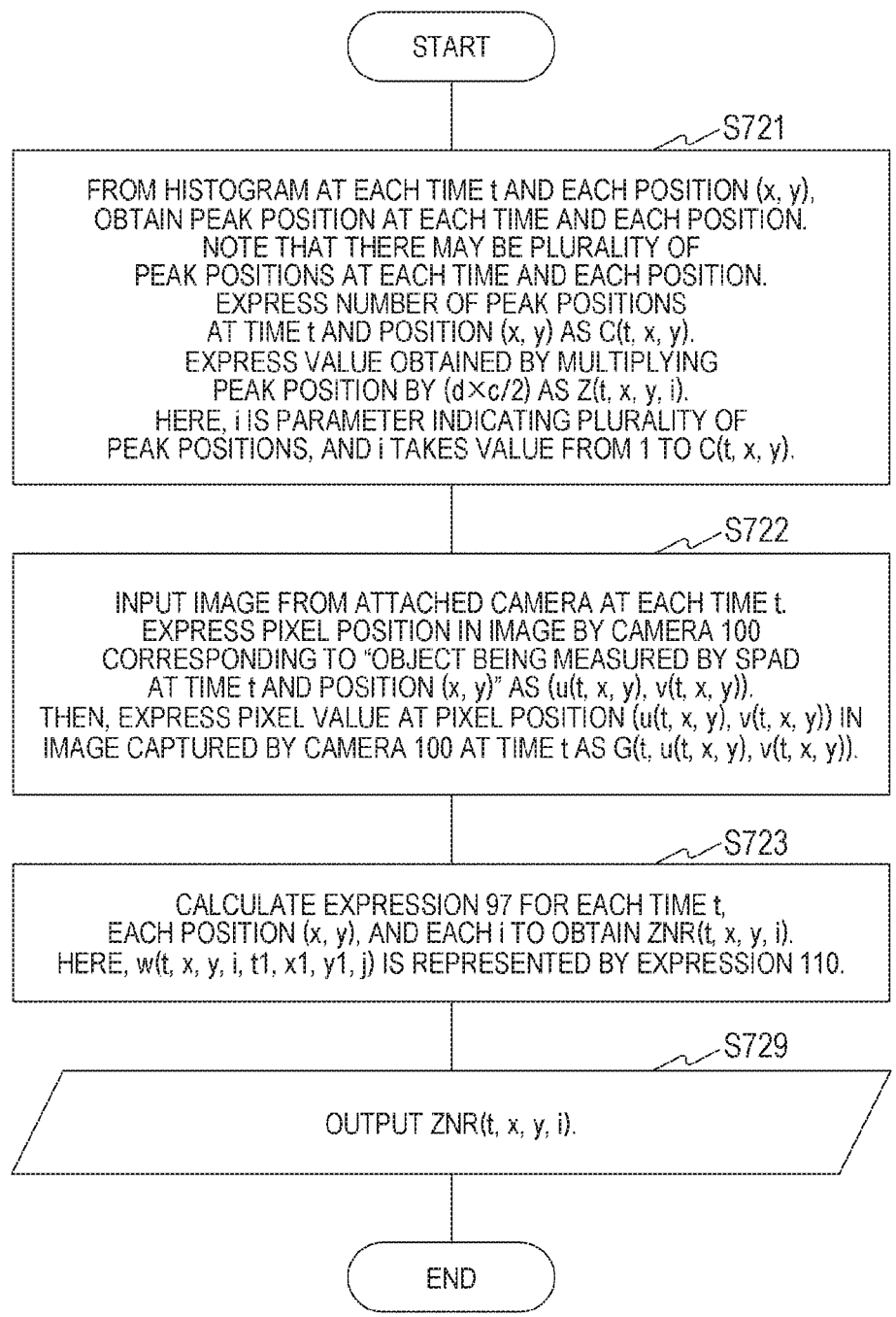
FIG. 69 is a flowchart illustrating an example of a processing procedure for removing noise according to a sixth working example of the seventh embodiment of the present technology.

FIG. 69 is a flowchart illustrating an example of a processing procedure for removing noise according to the sixth working example of the seventh embodiment of the present technology. This processing is performed to remove noise from distance data. This processing is performed by the computation unit 16.

First, in step S721, from a histogram at each time t and each position (x, y), a peak position at each time and each position is obtained. Note that there may be a plurality of peak positions at each time and each position. The number of peak positions at time t and position (x, y) is expressed as C(t, x, y). A value obtained by multiplying a peak position by (D×c/2) is expressed as Z(t, x, y, i). Here, i is a parameter indicating a plurality of peak positions, and i takes a value from 1 to C(t, x, y). Then, the processing proceeds to step S722.

In step S722, an image from an attached camera at each time t is input. A pixel position in an image by the camera 100 corresponding to an "object being measured by a SPAD at time t and position (x, y)" is expressed as (u(t, x, y), v(t, x, y)). Then, a pixel value at a pixel position (u(t, x, y), v(t, x, y)) in an image captured by the camera 100 at time t is expressed as G(t, u(t, x, y), v(t, x, y)). Then, the processing proceeds to step S723.

In step S723, Expression 97 is calculated for each time t, each position (x, y), and each i to obtain ZNR(t, x, y, i). Here, w(t, x, y, i, t1, x1, y1, j) is represented by Expression 110. Then, the processing proceeds to step S729.

In step S729, ZNR(t, x, y, i) is output from the output terminal 17 as "i-th distance data at time t and position (x, y) from which noise has been removed". Then, the series of processing ends.

Seventh Working Example

In a seventh working example, the camera 100 attached to the distance measuring device 10 is used (see FIG. 1). Here, the camera 100 is a device capable of capturing an image, and captures the image in the same direction as a direction of measurement by the SPAD array 13 of the distance measuring device 10.

A pixel position in an image by the camera 100 corresponding to an "object being measured by a SPAD at time t and position (x, y)" is expressed as (u(t, x, y), v(t, x, y)). Then, a pixel value at a pixel position (u(t, x, y), v(t, x, y)) in an image captured by the camera 100 at time t is expressed as G(t, u(t, x, y), v(t, x, y)).

Note that in a case where the distance measuring device 10 and the camera 100 are installed adjacent to each other, the pixel value G(t, u(t, x, y), v(t, x, y)) is a value of a pixel that has been imaged by the camera 100 in the same direction as the direction in which a SPAD at position (x, y) in the SPAD array 13 is performing distance measurement at time t.

In a case where a pixel value G(t, u(t, x, y), v(t, x, y)) in an image by the camera 100 corresponding to an object being measured by a SPAD at time of interest t and position of interest (x, y) in the SPAD array 13 and its surrounding pixel values G(t, u(t, x, y)+f1, v(t, x, y)+f2) are respectively similar to a pixel value G(t1, u(t1, x1, y1), v(t1, x1, y1)) in an image by the camera 100 corresponding to an object being measured by a SPAD at time t1 and position (x1, y1) in the SPAD array 13 and its surrounding pixel values G(t1, u(t1, x1, y1)+f1, v(t1, x1, y1)+f2), it is considered that the same object is being imaged in the camera 100. That is, it is considered that the two SPADs are measuring the same object. On the other hand, in a case where the pixel values are different, it is considered that different objects are being measured. Here, f1=–F to F, and f2=–F to F. F is a desired constant, for example, F=2.

Consequently, if the pixel values G(t, u(t, x, y), v(t, x, y)) and G(t, u(t, x, y)+f1, v(t, x, y)+f2) are respectively substantially the same with the pixel values G(t1, u(t1, x1, y1), v(t1, x1, y1)) and G(t1, u(t1, x1, y1)+f1, v(t1, x1, y1)+f2) in the images by the camera 100, weighting for adding distance data at time t1 and position (x1, y1) is increased. If not, weighting to be added is reduced, or no addition is performed. In this way, appropriate distance data can be added, and noise can be removed.

Thus, in the seventh working example, weighting w(t, x, y, t1, x1, y1, j) represented by the following Expression 111 is adopted.

Note that in Expression 111, weighting is dependent also on the distance. Dependency on the distance is the same as (Feature 1-1) of the above-described first working example.

Furthermore, distance data to be added is only the one closest to the value of Z(t, x, y, i) among a "group of C(t1, x1, y1) pieces of distance data at time t1 and position (x1, y1) {Z(t1, x1, 1y, j)|j is 1 to C(t1, x1, y1)}". Adopting "only the closest one" is the same as the above-described second working example.

Again, the features of the weighting w(t, x, y, i, t1, x1, y1, j) according to the seventh working example are as follows.

(Feature 7-1) In a case where it is determined that a "target object being measured at time t and position (x, y)" and a "target object being measured at time t1 and position (x1, y1)" are the same, weighting is increased. In a case where the determination result is "different", weighting is reduced. Note that this determination is made on the basis of the similarity in pixel value between a corresponding pixel position and a pixel position in its surroundings in images by the camera 100 attached to the distance measuring device 10.

In the seventh working example, the distance measuring device 10 is used to perform distance measurement for each SPAD in the SPAD array 13. From an observed histogram obtained from the accumulation unit 15, the computation unit 16 detects a peak and obtains distance data. Then, the computation unit 16 removes noise from this distance data.

Figure 70:
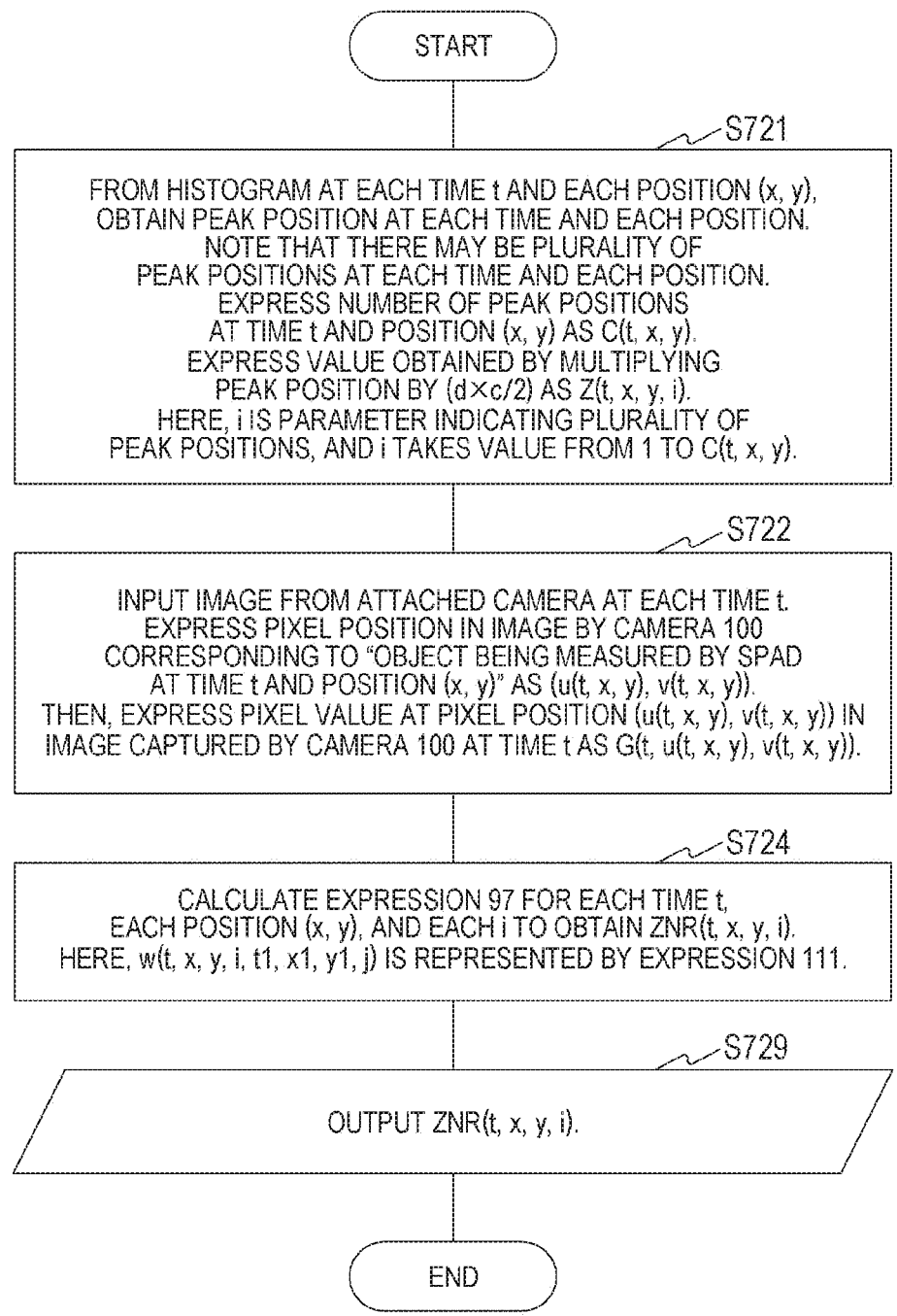
FIG. 70 is a flowchart illustrating an example of a processing procedure for removing noise according to a seventh working example of the seventh embodiment of the present technology.

FIG. 70 is a flowchart illustrating an example of a processing procedure for removing noise according to the seventh working example of the seventh embodiment of the present technology. This processing is performed to remove noise from distance data. This processing is performed by the computation unit 16.

Steps S721, S722, and S729 have been described in the above-described sixth working example, and will not be described here. Instead of step S723 of the above-described sixth working example, the following step S724 is executed.

In step S724, Expression 97 is calculated for each time t, each position (x, y), and each i to obtain ZNR(t, x, y, i). Here, w(t, x, y, i, t1, x1, y1, j) is represented by Expression 111.

[Summary]

The features of the seventh embodiment are as follows. Weighted addition of pieces of distance data at each time and each position obtained from the SPAD array 13 is performed. In particular, weighting is determined as follows.

(Feature 1-1) Weighting depends on the distance in time and space, and is reduced as the distance is longer.

(Features 1-2 and 2-1) In a plurality of pieces of distance data at the same time and at the same position, the more a piece of distance data is similar to the distance data from which noise is to be removed, the more the weighting is

[Math. 111]

$$w_{(t,x,y,i,t_1,x_1,y_1,j)} = \begin{cases} \dfrac{1}{1 + \sqrt{(t_1 - t)^2 + (x_1 - x)^2 + (y_1 - y)^2}} \cdot \dfrac{1}{1 + \sum\limits_{\substack{-F \leq f_1 \leq F \\ -F \leq f_2 \leq F}} |G_{(t_1, u(t_1, x_1, y_1)+f_1, v(t_1, x_1, y_1)+f_2)} - G_{(t, u(t,x,y), f_1, v(t,x,y)+f_2)}|}, \\ \qquad \qquad \text{if } j = \underset{h}{\mathrm{argmin}}(|Z_{(t_1, x_1, y_1, h)} - Z_{(t,x,y,i)}|) \\ 0, \text{otherwise} \end{cases} \quad \text{Expression 111}$$

increased for that piece of distance data. Furthermore, weighting is set to 0 except for the most similar one.

(Feature 1-3) Weighting depends on the reliability of distance data (i.e., the peak area of each histogram obtained from the SPAD array 13), and is increased as the reliability is larger.

(Feature 3-1) Weighting is determined depending on the direction in time and space. In a case where it is determined that the same target object (distance) is being measured in a certain direction, weighting for that direction is increased. In a case where the determination result is "different", weighting is reduced (or set to 0).

(Feature 4-1) Weighting depends on the similarity between groups of pieces of distance data at each time and each position, and is increased as the similarity is higher.

(Feature 5-1) Weighting depends on the similarity between groups of pieces of distance data each in a region centered on and in proximity to each time and each position, and is increased as the similarity is higher.

(Feature 6-1) Weighting depends on the similarity between pixel values at corresponding pixel positions in images by the attached camera 100, and is increased as the similarity is higher.

(Feature 7-1) Weighting depends on the similarity between pixel values at corresponding pixel positions and their surrounding pixel positions in images by the attached camera 100, and is increased as the similarity is higher.

Furthermore, the advantages of the seventh embodiment are as follows. That is, by appropriately performing weighted addition of distance data, noise can be removed without specifying the positional relationship of the object and without requiring an enormous amount of calculation.

[Gist]

The gist of the seventh embodiment is as follows.

(1) A method of removing noise from distance data, the method including:
- a first input step of inputting pieces of distance data at the corresponding positions in time and space; and
- a first addition step of performing weighted addition of the pieces of distance data,
- in which in the first addition step, in the pieces of distance data at the same time and at the same position, the more a piece of distance data is similar to the distance data from which noise is to be removed, the more the weighting is increased for that piece of distance data.

(2) A method of removing noise from distance data corresponding to peaks in ToF histograms, the method including:
- a second input step of inputting pieces of distance data at the corresponding positions in time and space and peak areas of the histograms; and
- a second addition step of performing weighted addition of the pieces of distance data,
- in which in the second addition step, the larger the peak area, the more the weighting is increased for the corresponding piece of distance data.

(3) The method of removing noise from distance data according to (1), in which
- in the first addition step, in the pieces of distance data at the same time and at the same position, weighting is set to 0 except for the piece of distance data that is most similar to the distance data from which noise is to be removed.

(4) The method of removing noise from distance data according to (1) or (3), in which
- in the first addition step, weighting depends on the distance in time and space, and is reduced as the distance is longer.

(5) The method of removing noise from distance data according to (1), (3), or (4), in which
- in the first addition step, weighting depends on the direction in time and space, and the more the pieces of distance data in that direction are close to each other in value, the more the weighting is increased for the pieces of distance data in that direction.

(6) The method of removing noise from distance data according to (1) and (3) to (5), in which
- in the first addition step, weighting depends on the similarity between the pieces of distance data at each time and each position, and is increased as the similarity is higher.

(7) The method of removing noise from distance data according to (1) and (3) to (6), in which
- in the first addition step, weighting depends on the similarity between the pieces of distance data at each time and each position and in proximity to the time and the position, and is increased as the similarity is higher.

(8) The method of removing noise from distance data according to (1) and (3) to (7), the method further including:
- a third input step of inputting images,
- in which in the first addition step, weighting depends on the similarity between pixel values of the images corresponding to the pieces of distance data at each time and each position, and is increased as the similarity is higher.

(9) The method of removing noise from distance data according to (1) and (3) to (7), the method further including:
- a fourth input step of inputting an image,
- in which in the first addition step, weighting depends on the similarity in pixel value between the image and its surroundings corresponding to the pieces of distance data at each time and each position, and is increased as the similarity is higher.

9. Eighth Embodiment

[Outline]

In this eighth embodiment, appropriate noise removal is performed by making finally obtained distance data to be as equal as possible to observed distance data, and by obtaining a solution in which neighbors are as equal as possible to each other. That is, noise is appropriately removed with a small amount of computation and without assuming a positional relationship in advance.

In the eighth embodiment, a computation unit 16 detects a peak from a histogram created at each time t and each position (x, y), and calculates a distance by multiplying a time corresponding to the peak by c/2. A distance obtained at each time t and each position (x, y) is expressed as $Z(t, x, y, i)$. Here, i=1 to $C(t, x, y)$. The index i and $C(t, x, y)$ will be described later.

Figure 71:
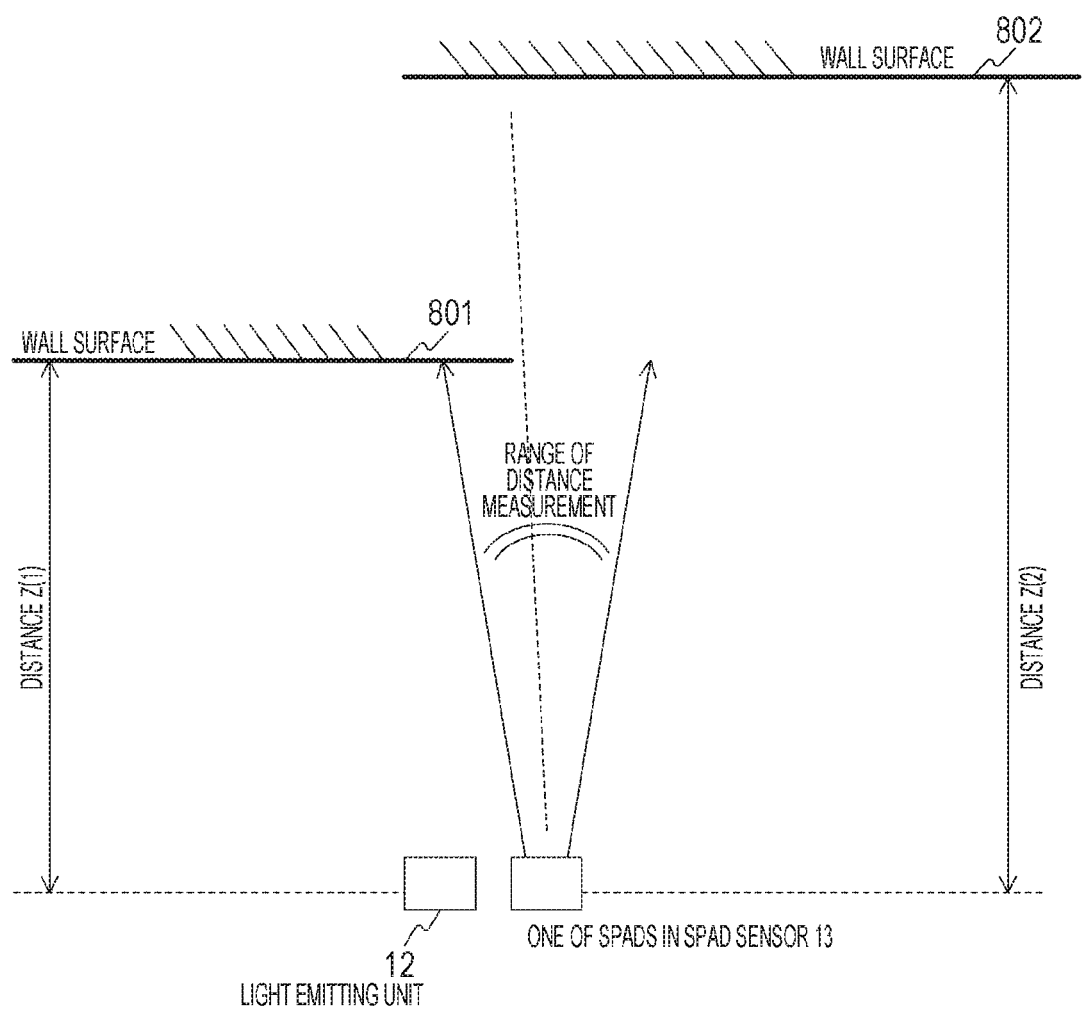
FIG. 71 is a diagram illustrating an example of a scene of distance measurement according to an eighth embodiment of the present technology.

FIG. 71 is a diagram illustrating an example of a scene of distance measurement according to the eighth embodiment of the present technology.

A case as illustrated in the drawing is considered in which one of SPADs in a SPAD array 13 is performing distance measurement on objects (wall surfaces 801 and 802) at different distances at the same time. One SPAD does not perform distance measurement in one direction, but performs, in practice, distance measurement in the whole direction with a certain solid angle (the range of distance measurement in the drawing). A scene where the wall surfaces 801 and 802 are in the range of distance measurement is illustrated. It is assumed that the wall surfaces 801 and 802 are at distances $Z(1)$ and $Z(2)$, respectively.

During M times of light emission from a light emitting unit 12, the light may be received by a SPAD after being reflected by the wall surface 801 in some cases. Alternatively, the light may be received by a SPAD after being reflected by the wall surface 802 in some cases. As a matter of course, ambient light is also received.

Figure 72:
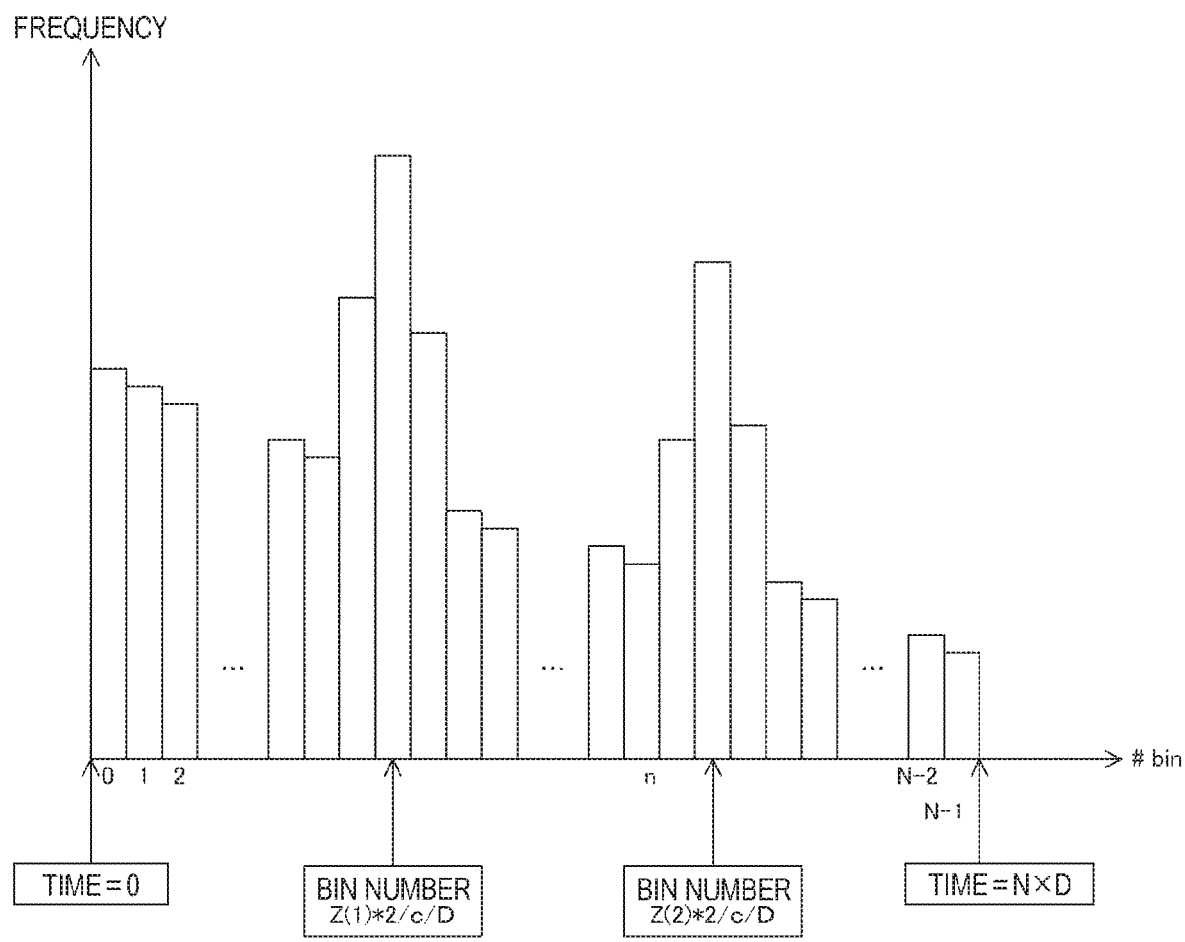
FIG. 72 is a diagram illustrating an intensity distribution in an example of distance measurement according to the eighth embodiment of the present technology.

FIG. 72 is a diagram illustrating an intensity distribution in an example of distance measurement according to the eighth embodiment of the present technology. In this case, there are two peaks in a histogram that is finally obtained. That is, as illustrated in the drawing, the peaks are at a bin (Z(1)×2/c/D) corresponding to distance Z(1) and a bin (Z(2)×2/c/D) corresponding to distance Z(2).

A further generalized case is considered in which a SPAD at position (x, y) in the SPAD array 13 is performing distance measurement on C(t, x, y) objects at different distances at a certain time t. When peak detection is performed on a histogram observed in such a situation, C(t, x, y) peaks are detected. Bins corresponding to these peaks are multiplied by "c×D/2" to calculate C(t, x, y) distances. The distances calculated in this way are expressed as Z(t, x, y, i). Here, i=1 to C(t, x, y).

Furthermore, a peak area is also used in a working example of the eighth embodiment, and the computation unit 16 also calculates the peak area corresponding to each peak as appropriate. An i-th peak area at each time t and each position (x, y) is expressed as S(t, x, y, i). Here, i=1 to C(t, x, y).

A peak area indicates the magnitude of the peak. In a case where this value is small, the corresponding distance data cannot be trusted. Conversely, in a case where this value is large, the corresponding distance data can be trusted.

Note that there are known methods of detecting a peak and obtaining a peak area, and those methods can be applied. That is, for example, there is a general processing method performed on chromatogram data acquired by a gas chromatograph, a liquid chromatograph, or the like. Specific methods include, for example, methods disclosed in "Japanese Patent Application Laid-Open No. 2014-211393: Peak Detector" and "Japanese Patent Application Laid-Open No. 6-230001: Chromatographic Data Processing Device", and these methods can be used to detect a peak and obtain a peak area.

Summarizing the above, distance data can be obtained by analyzing a histogram at each time t and each position (x, y) by the computation unit 16 using a conventionally known method. Here, the number of pieces of distance data is not necessarily one. That is, the number of pieces is C(t, x, y). Then, the eighth embodiment is characterized in that the computation unit 16 removes noise from i-th distance data Z(t, x, y, i) at each time t and each position (x, y). Here, t is an integer equal to or greater than 1. x=1 to X and y=1 to Y are satisfied. i=1 to C(t, x, y) is satisfied. This noise removal also uses a value of a peak area S(t, x, y, i) as necessary.

The removal of noise from distance data Z(t, x, y, i) according to the eighth embodiment can be succinctly expressed as the following Expression 112.

[Math. 112]

$$\underset{Z_{NR(t,x,y,i)}}{\mathrm{argmin}}\ (DataTerm + SmoothTerm) \quad \text{Expression 112}$$

That is, ZNR(t, x, y, i) is obtained such that the sum of two terms, DataTerm (data term) and SmoothTerm (smooth term or regularization term) is minimized.

DataTerm, which is a data term, acts so that Z(t, x, y, i), which is an observation value, and ZNR(t, x, y, i) may have values that are as close to being the same as possible (see Expression 113 described later). Then, SmoothTerm, which is a smooth term, acts so that values of ZNR(t, x, y, i) in proximity to each other may be similar (see Expression 114 described later).

Working Example

A distance measuring device 10 is used to perform distance measurement for each SPAD in the SPAD array 13. From an observed histogram obtained from an accumulation unit 15, the computation unit 16 detects a peak, and obtains distance data and a value of the peak area. Then, the computation unit 16 removes noise from this distance data.

Removing noise means, more specifically, obtaining a solution of the above-described Expression 112.

DataTerm in the above-described Expression 112 is defined by the following Expression 113.

[Math. 113]

$$DataTerm \equiv \sum_t \sum_{x=1}^{X} \sum_{y=1}^{Y} \left\{ \frac{1}{C_{(t,x,y)}} \cdot \sum_{i=1}^{C_{(t,x,y)}} (S_{(t,x,y,i)} \cdot \|Z_{NR(t,x,y,i)} - Z_{(t,x,y,i)}\|_2) \right\} \quad \text{Expression 113}$$

As shown in Expression 113, DataTerm acts so that i-th distance data ZNR(t, x, y, i) to be obtained at each time t and each position (x, y) may be close to i-th observed distance data Z(t, x, y, i) at time t and position (x, y). Here, multiplication by a value of a peak area S(t, x, y, i) is performed. This is due to the following reason. As described above, in a case where the value of the peak area corresponding to the observed distance data Z(t, x, y, i) is small, that distance data Z(t, x, y, i) is not very trustworthy. In a case where the distance data cannot be trusted, it is not necessary to force ZNR(t, x, y, i) to get closer to Z(t, x, y, i). Consequently, in a case where the distance data cannot be trusted, the contribution to DataTerm is reduced by multiplication by S(t, x, y, i) having a small value. Conversely, in a case where the distance data can be trusted, the contribution to DataTerm is increased by multiplication by S(t, x, y, i) having a large value. The above is the reason for performing multiplication by S(t, x, y, i).

SmoothTerm in the above-described Expression 112 is defined by the following Expression 114.

[Math. 114]

$$SmoothTerm \equiv \alpha_t \sum_t \sum_{x=1}^{X} \sum_{y=1}^{Y} \left\{ \frac{1}{C_{(t,x,y)}} \cdot \sum_{i=1}^{C_{(t,x,y)}} \left( \left\| \min_{1 \leq h \leq C_{(t+1,x,y)}} (X_{NR(t+1,x,y,h)} - Z_{NR(t,x,y,i)}) \right\|_2 + \left\| \min_{1 \leq h \leq C_{(t-1,x,y)}} (X_{NR(t-1,x,y,h)} - Z_{NR(t,x,y,i)}) \right\|_2 \right) \right\} + \quad \text{Expression 114}$$

-continued $$\alpha_{xy} \sum_t \sum_{x=1}^{X} \sum_{y=1}^{Y} \left\{ \frac{1}{C_{(t,x,y)}} \cdot \sum_{i=1}^{C_{(t,x,y)}} \left\{ \begin{array}{l} \left\| \min_{1 \leq h \leq C_{(t,x+1,y)}} (X_{NR(t,x+1,y,h)} - Z_{NR(t,x,y,i)}) \right\|_2 + \\ \left\| \min_{1 \leq h \leq C_{(t,x-1,y)}} (X_{NR(t,x-1,y,h)} - Z_{NR(t,x,y,i)}) \right\|_2 + \\ \left\| \min_{1 \leq h \leq C_{(t,x,y+1)}} (X_{NR(t,x,y+1,h)} - Z_{NR(t,x,y,i)}) \right\|_2 + \\ \left\| \min_{1 \leq h \leq C_{(t,x,y-1)}} (X_{NR(t,x,y-1,h)} - Z_{NR(t,x,y,i)}) \right\|_2 \end{array} \right\} \right\}$$

A first term in Expression 114 indicates a relationship between "time of interest t, position (x, y)" and "immediately following time t+1, position (x, y)", and a relationship between "time of interest t, position (x, y)" and "immediately preceding time t−1, position (x, y)". Times t−1, t, and t+1 are continuous in time, and there is a good chance that target objects being measured by the SPAD at the same position (x, y) are at the same distance. Alternatively, the distance is changing smoothly, and the difference in distance is sufficiently small. That is, a value that is the same as ZNR(t, x, y, i) should be included in ZNR(t+1, x, y, h) (here, h=1 to C(t+1, x, y)). That is, selecting an appropriate h should reduce the values of ZNR(t, x, y, i) and ZNR(t+1, x, y, h). In a similar manner, selecting an appropriate h should reduce the values of ZNR(t, x, y, i) and ZNR(t−1, x, y, h). This is expressed as an expression in the first term in Expression 114.

Here, αt is a contribution rate for smoothness in the time direction, and is a desired constant equal to or greater than 0. Note that when αt=0 is satisfied, smoothness in the time direction is not considered.

A second term in Expression 114 indicates
a relationship between "time of interest t, position (x, y)" and "the same time t, neighboring position (x+1, y) in x direction",
a relationship between "time of interest t, position (x, y)" and "the same time t, neighboring position (x−1, y) in x direction",
a relationship between "time of interest t, position (x, y)" and "the same time t, neighboring position (x, y+1) in y direction", and
a relationship between "time of interest t, position (x, y)" and "the same time t, neighboring position (x, y−1) in y direction". These are continuous in space, and there is a good chance that target objects being measured by each SPAD are at the same distance. Alternatively, the distance is changing smoothly, and the difference in distance is sufficiently small. That is, a value that is the same as ZNR(t, x, y, i) should be included in ZNR(t, x+1, y, h) (here, h=1 to C(t, x+1, y)). That is, selecting an appropriate h should reduce the values of ZNR(t, x, y, i) and ZNR(t, x+1, y, h). The same can be said for other positional relationships. This is expressed as an expression in the second term in Expression 114.

Here, αxy is a contribution rate for smoothness in the space direction, and is a desired constant equal to or greater than 0. Note that when αxy=0 is satisfied, smoothness in the space direction is not considered.

Expression 114 acts so that ZNR(t, x, y, i) may change smoothly in time and space.

Figure 73:
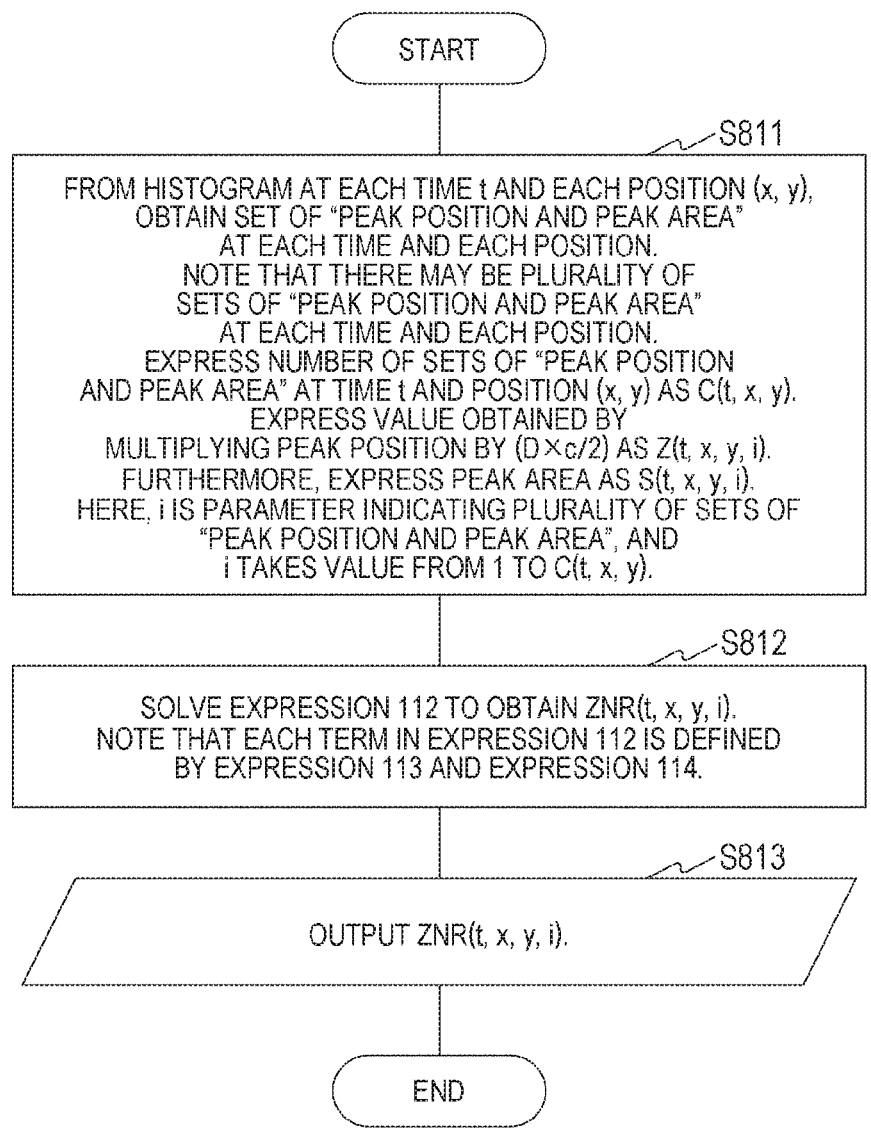
FIG. 73 is a flowchart illustrating an example of a processing procedure for removing noise according to a working example of the eighth embodiment of the present technology.

FIG. 73 is a flowchart illustrating an example of a processing procedure for removing noise according to the working example of the eighth embodiment of the present technology. This processing is performed to remove noise from distance data.

First, in step S811, from a histogram at each time t and each position (x, y), a set of "a peak position and a peak area" at each time and each position is obtained. Note that there may be a plurality of sets of "a peak position and a peak area" at each time and each position. The number of sets of "a peak position and a peak area" at time t and position (x, y) is expressed as C(t, x, y). A value obtained by multiplying a peak position by (D×c/2) is expressed as Z(t, x, y, i). Furthermore, a peak area is expressed as S(t, x, y, i). Here, i is a parameter indicating a plurality of sets of "a peak position and a peak area", and i takes a value from 1 to C(t, x, y). Then, the processing proceeds to step S812.

In step S812, Expression 112 is solved to obtain ZNR(t, x, y, i). Note that each term in Expression 112 is defined by Expression 113 and Expression 114. Then, the processing proceeds to step S813.

In step S813, ZNR(t, x, y, i) is output from an output terminal 17 as "i-th distance data at time t and position (x, y) from which noise has been removed". Then, the series of processing ends.

Note that in the working example of the eighth embodiment, the calculation may be simplified by omitting dependency on the peak area. That is, in Expression 113, S(t, x, y, i) may be forcibly solved as 1 (constant).

In this way, according to the working example of the eighth embodiment, noise can be removed with a small amount of computation and without assuming a positional relationship in advance.

[Gist]

The gist of the eighth embodiment is as follows.

(1) A method of removing noise from distance data, the method including:
a first input step of inputting first distance data at each position in time and space;
a noise removal/calculation step of removing noise from the first distance data and calculating second distance data; and
an output step of outputting the second distance data,
in which in the noise removal/calculation step, processing of determining the second distance data is performed so that the total of two operators may become an extreme value, the two operators being a first operator that acts so that the second distance data may be equal to the first distance data, and a second operator that acts so that a set of pieces of the second distance data, among pieces of the second distance data that are adjacent to each other in time and space, having a smallest difference may become equal.

(2) The method of removing noise from distance data according to (1), in which
the first distance data is data calculated from a peak in a ToF histogram, and
the first operator is weighted, for the distance data corresponding to the peak, on the basis of a peak area of the peak.

10. Ninth Embodiment

[Outline]

In a case where a plurality of peaks is detected in a histogram corresponding to one SPAD, a distance to an object can be calculated from each peak, but the positions of boundaries (edges) of these objects (i.e., regions of the corresponding objects) remain unknown. A ninth embodiment has been made in view of such circumstances to detect positions of edges (i.e., regions of the corresponding objects).

[Histogram]

It is assumed that a SPAD is arranged at each position (x, y) in a SPAD array 13. Here, x=0 to X-1 and y=0 to Y-1. The number of SPADs is X×Y in total. In the above description, 1≤x≤X and 1≤y≤Y are set as pixel positions of SPADs. In this ninth embodiment, 0≤x≤X-1 and 0≤y≤Y-1 are set in order that the pixel positions may coincide with the positions in a coordinate system (u, v). The number of histograms is X×Y in total, in a similar manner to other embodiments.

Note that a variable (x, y) indicates a position of each SPAD in the SPAD array 13, and takes an integer value. On the other hand, as described later, a variable (u, v) indicates a position in the SPAD array 13, and takes a real value.

Furthermore, in the ninth embodiment, since the time direction is not considered, a histogram at position (x, y) is expressed as H(x, y, n). Here, x is an integer between 0 and X-1 inclusive, and y is an integer between 0 and Y-1 inclusive. Then, n represents a bin number, and is an integer between 0 and N-1 inclusive.

[Relationship Between Histogram and Occurrence Rate]

Since only one histogram is considered here, H(x, y, n) is simply expressed as h(n). Here, n=0 to N-1.

An occurrence rate is, in a similar manner to that in other embodiments, the number of times an event occurs per unit time.

Note that, to be precise, a "probability of arrival of a photon during a time (D) corresponding to a certain bin" is a value obtained by multiplying an occurrence rate by time D. However, constant multiplication (multiplication by D) is ignored here. Alternatively, time D may be considered as a unit time. Moreover, alternatively, in this embodiment, an occurrence rate may be considered to be defined as a value obtained by multiplying an "occurrence rate", which is a term generally widely used, by D.

Now, an occurrence rate p(n) in bin n is the probability that light (photon) arrives a SPAD during a period from time n×D to time (n+1)×D. The occurrence rate p(n) is irrelevant to whether light (photon) has arrived before time n×D.

On the other hand, each SPAD of a SPAD sensor 13 in a distance measuring device 10 detects the first piece of light (photon) to arrive, but does not detect the second and subsequent pieces of light (photons) to arrive. As a specific example, in a case where a first piece of light (photon) arrives at a time corresponding to bin 2, a second piece of light (photon) arrives at a time corresponding to bin 4, and then a third piece of light (photon) arrives at a time corresponding to bin 6, only h(2) is counted in the histogram, not h(4) or h(6).

In this way, there is a clear difference between the occurrence rate p(n) that is irrelevant to whether light (photon) has arrived before that point of time, and a frequency h(n) in which light (photon) that has arrived before that point of time is not counted. By taking this into consideration, a relationship between the occurrence rate p(n) and the frequency h(n) can be derived.

When the occurrence rate in bin 0 is expressed as p(0), the probability that the frequency of bin 0 becomes h(0) in M-time measurements is represented by the following Expression 115.

[Math. 115]

$$p_{(0)} = \frac{h_{(0)}}{M} \quad \text{Expression 115}$$

This is because the probability is a probability that an event that occurs with a probability of p(0) occurs h(0) times out of M times.

The occurrence rate in bin 1 is expressed as p(1). The probability that the frequency of bin 1 becomes h(1) even though the event has occurred h(0) times in bin 0 in M-time measurements is represented by the following Expression 116.

[Math. 116]

$$p_{(1)} = \frac{h_{(1)}}{M - h_{(0)}} \quad \text{Expression 116}$$

This is because the probability is a probability that an event that occurs with a probability of p(1) occurs h(1) times out of M-h(0) times.

The occurrence rate in bin 2 is expressed as p(2). The probability that the frequency of bin 2 becomes h(2) even though the event has occurred h(0) times in bin 0 and h(1) times in bin 1 in M-time measurements is represented by the following Expression 117.

[Math. 117]

$$p_{(2)} = \frac{h_{(2)}}{M - h_{(0)} - h_{(1)}} \quad \text{Expression 117}$$

This is because the probability is a probability that an event that occurs with a probability of p(2) occurs h(2) times out of M-h(0)-h(1) times.

Similarly, the probability that the frequency of bin n becomes h(n) even though the event has occurred h(m) times in bin m in M-time measurements is represented by the following Expression 118. Here, m=0 to n-1.

[Math. 118]

$$p_{(n)} = \frac{h_{(n)}}{M_{(n-1)}}, \text{ where } M_{(n-1)} \equiv M - \sum_{j=0}^{n-1} h_{(j)} \quad \text{Expression 118}$$

As can be seen from these descriptions, when a histogram at each position (x, y) is observed and the histogram is expressed as H(x, y, n), an occurrence rate p(x, y, n) at position (x, y) is represented by the following Expression 119. Here, n=0 to N-1.

[Math. 119]

$$p_{(x,y,n)} = \frac{H_{(x,y,n)}}{M_{(x,y,n-1)}}, \text{ where } M_{(x,y,n-1)} \equiv M - \sum_{j=0}^{n-1} H_{(x,y,j)} \quad \text{Expression 119}$$

[Occurrence Rate]

Figure 74:
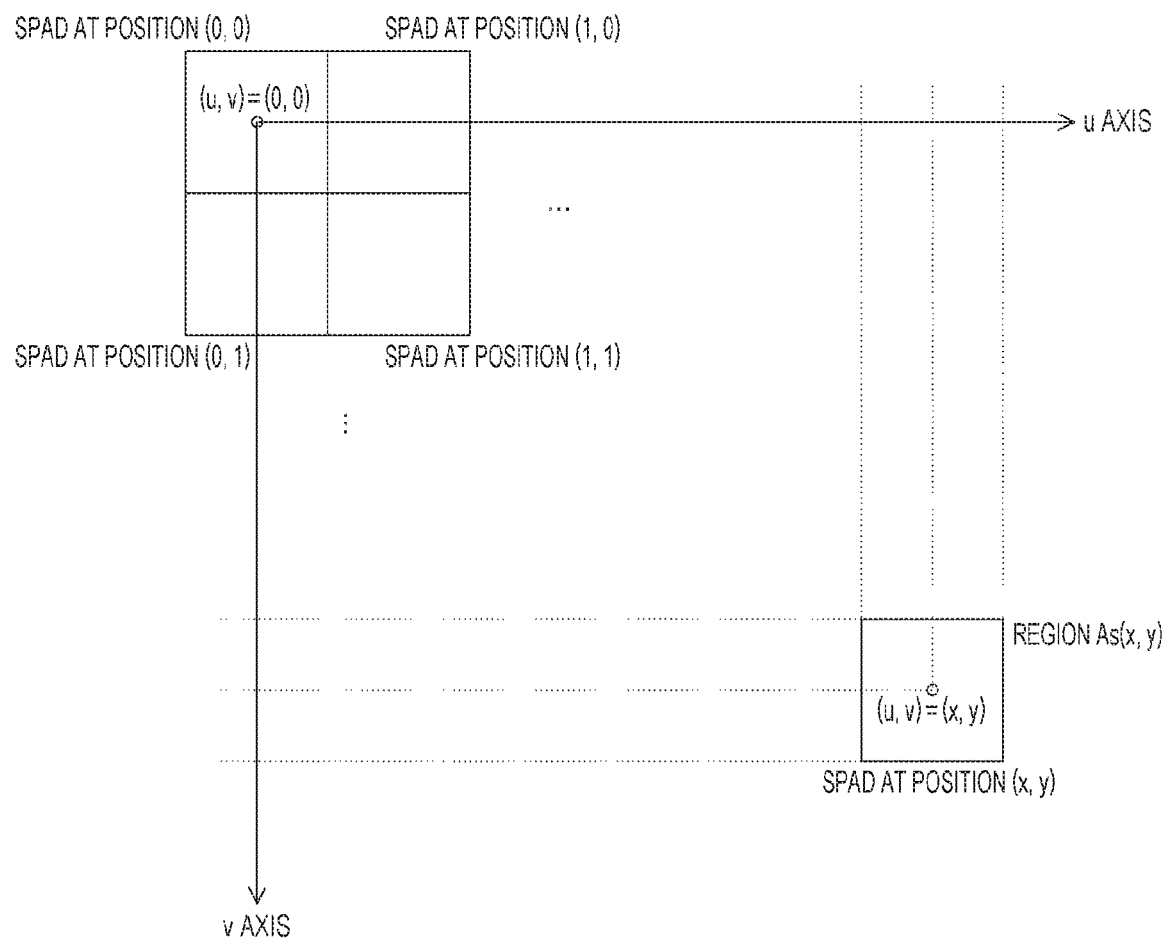
FIG. 74 is a diagram illustrating an example of a position of each SPAD in a (u, v) coordinate system according to a ninth embodiment of the present technology.

FIG. 74 is a diagram illustrating an example of a position of each SPAD in a (u, v) coordinate system according to the ninth embodiment of the present technology.

Here, each position in the SPAD array 13 is expressed as (u, v). u and v are each a real number. As illustrated in the drawing, the center position of a SPAD at x=0 and y=0 is on the origin (0, 0) of the (u, v) coordinate. A physical region of a SPAD at position (x, y) is As(x, y), which is represented by the following Expression 120.

[Math. 120]

$$A_s(x,y) = \{(u,v) | x-1/2 \leq u \leq x+1/2, y-1/2 \leq v \leq y+1/2\} \quad \text{Expression 120}$$

Furthermore, a region in which a SPAD indicated by (x, y) in the SPAD sensor 13 reacts to arriving light (photon) is expressed as A(x, y). That is, light (photon) that has arrived position (u, v), where (u, v)∈A(x, y), causes the SPAD at position (x, y) to react. Furthermore, the SPAD does not always react to light (photon) incident on position (u, v). The reaction rate is expressed as η(u, v, x, y). When light (photon) is incident on position (u, v), the SPAD indicated by (x, y) reacts at a rate of η(u, v, x, y). Note that η(u, v, x, y) depends on position (u, v) and becomes known by measuring it in advance. In a case where the measurement is difficult, η(u, v, x, y) may be 0 at (u, v) outside physical region As(x, y) of the SPAD indicated by (x, y) in the SPAD sensor 13, and may be approximated to a constant value at (u, v) in physical region As(x, y) of the SPAD indicated by (x, y) in the SPAD sensor 13.

Note that here, supplementary information will be given. A(x, y) ideally coincides with physical region As(x, y) of the SPAD indicated by (x, y) in the SPAD sensor 13. That is, ideally, in a case where (x1, y1)≠(x2, y2) is satisfied, there is no overlap between region A(x1, y1) and region A(x2, y2). However, actually, in a case where (x1, y1) and (x2, y2) are neighboring SPADs, there is an overlap between region A(x1, y1) and region A(x2, y2). As a first reason, arriving light is collected on each SPAD by the lens 13*a* as described in the above description of FIG. 1. In a case where an inexpensive lens is used, light may not be sufficiently collected and blur may occur. That is, light (photon) flying in a direction toward a SPAD indicated by (x1, y1) in the SPAD sensor 13 may reach a neighboring SPAD indicated by (x2, y2) due to blurring of the lens. Furthermore, as a second reason, even in a case where light (photon) is incident on a region of the SPAD indicated by (x1, y1), the light (photon) may travel through a semiconductor forming the SPAD array and reach the neighboring SPAD indicated by (x2, y2). Thus, for a certain position (u, v), even in a case where (x1, y1)≠(x2, y2) is satisfied, both η(u, v, x1, y1)≠0 and η(u, v, x2, y2)≠0 may be satisfied.

Figure 75:
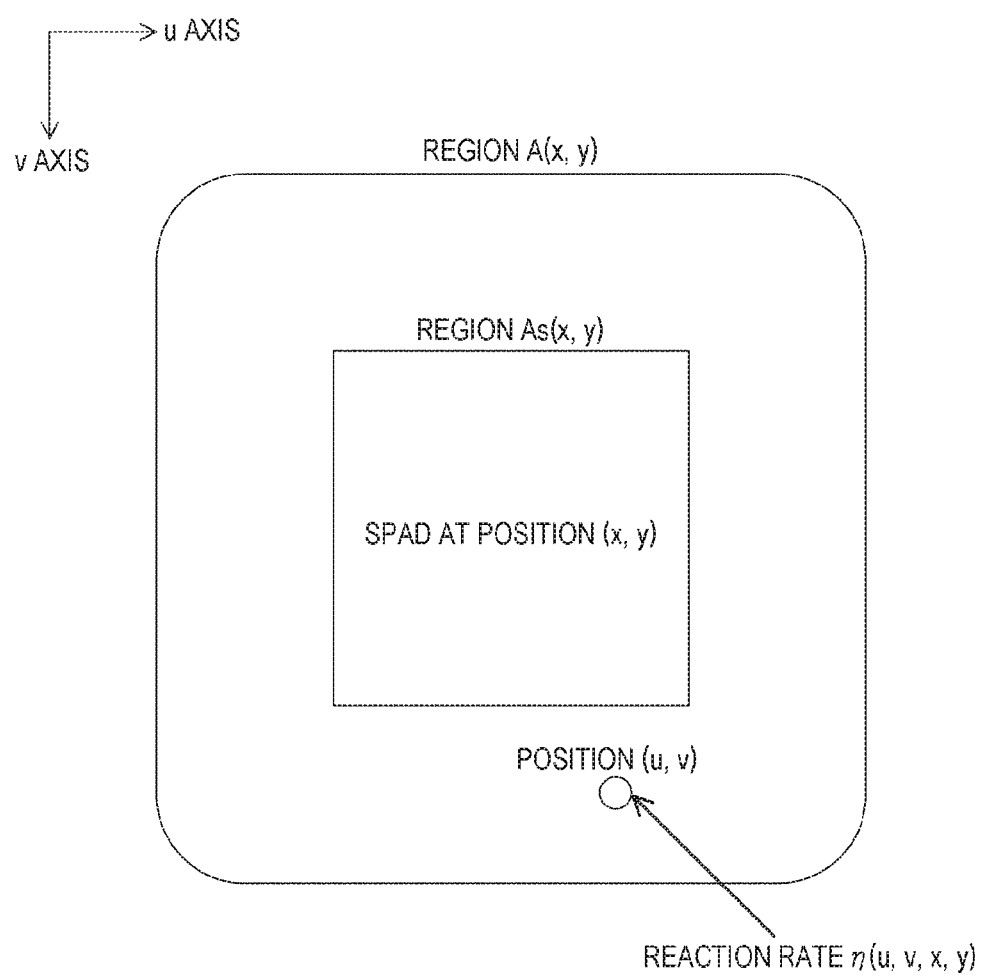
FIG. 75 is a diagram illustrating an example of a relationship between A(x, y) and As(x, y) according to the ninth embodiment of the present technology.

FIG. 75 is a diagram illustrating an example of a relationship between A(x, y) and As(x, y) according to the ninth embodiment of the present technology.

As illustrated in the drawing, physical region As(x, y) of the SPAD at position (x, y) does not coincide with region A(x, y) where the SPAD at position (x, y) reacts. Furthermore, as illustrated in the drawing, a reaction rate at an arbitrary position (u, v) in region A(x, y) is η(u, v, x, y).

Figure 76A:
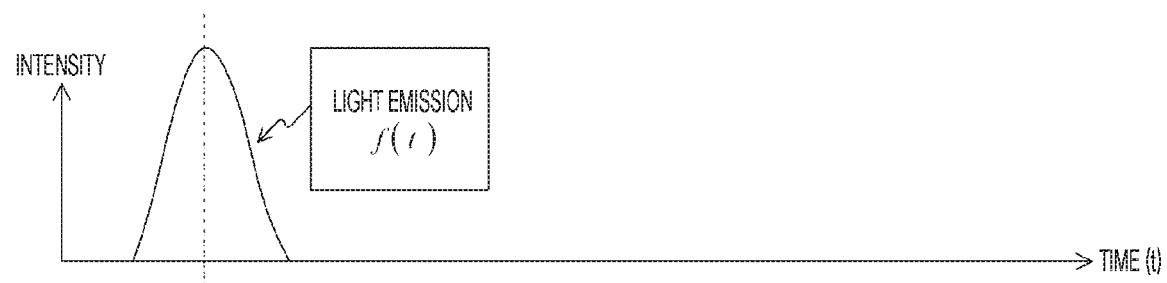
FIG. 76 is a diagram illustrating an intensity distribution in an example of distance measurement according to the ninth embodiment of the present technology.
Figure 76B:
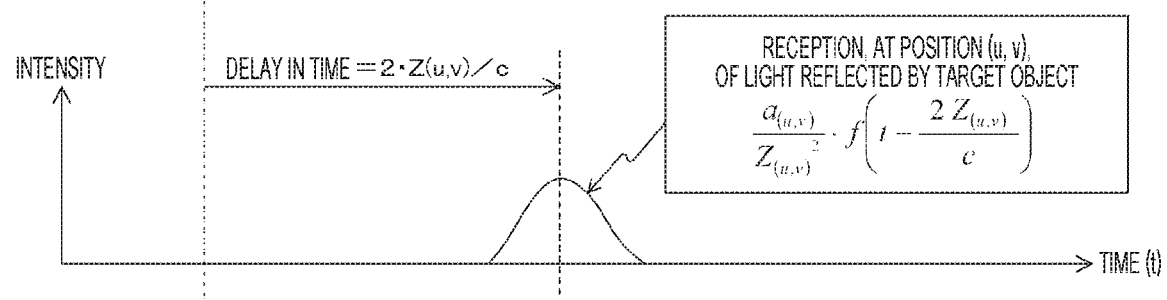
Figure 76C:
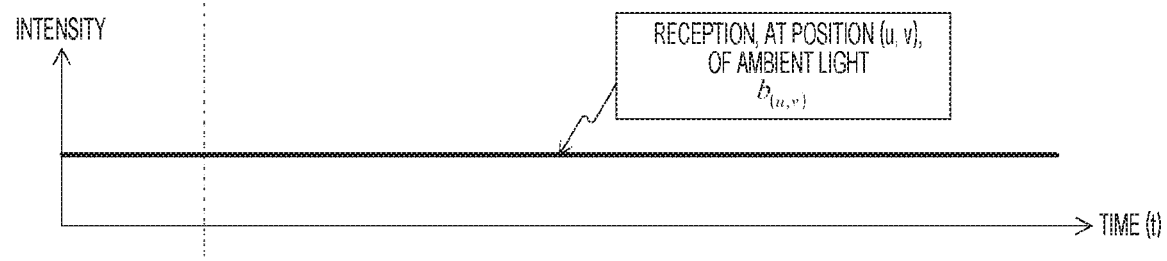

FIG. 76 is a diagram illustrating an intensity distribution in an example of distance measurement according to the ninth embodiment of the present technology.

An intensity of light emission (short-time light emission) from a light emitting unit 12 changes over time (t). The intensity is expressed as f(t). A in the drawing indicates a temporal change in intensity of light emitted from the light emitting unit 12.

Active light (light from the light emitting unit 12) is incident on each position (u, v) after being reflected by a target object. A distance to the target object is expressed as Z(u, v). The active light (light from the light emitting unit 12) incident on position (u, v) reaches with a delay of 2×Z(u, v)/c with respect to the light emission from the light emitting unit 12. Furthermore, light attenuates in proportion to the square of the distance. A reflectance of the target object is expressed as a(u, v). Taking into account the above, when light is emitted from the light emitting unit 12, the intensity of the light incident on position (u, v) is represented by the following Expression 121.

[Math. 121]

$$\frac{a_{(u,v)}}{Z^2_{(u,v)}} \cdot f\left(t - \frac{2Z_{(u,v)}}{c}\right) \quad \text{Expression 121}$$

B in the drawing illustrates a temporal change in intensity of the active light incident on position (u, v).

Furthermore, ambient light (for example, light from Sun 30 in FIG. 1) is also incident on each position (u, v). The incident light (photon) always arrives with a constant probability while a histogram is being created. This probability is expressed as b(u, v). C in the drawing illustrates a temporal change in intensity of the ambient light incident on position (u, v).

The intensity of light incident on position (u, v) is the total of B and C in the drawing, and is represented by the following Expression 122.

[Math. 122]

$$b_{(u,v)} + \frac{a_{(u,v)}}{Z^2_{(u,v)}} \cdot f\left(t - \frac{2Z_{(u,v)}}{c}\right) \quad \text{Expression 122}$$

Thus, the occurrence rate of bin n of a SPAD at position (x, y) is represented by the following Expression 123.

[Math. 123]

$$p_{(x,y,n)} = \iint_{(u,v)\in A(x,y)} \left(\eta_{(u,v,x,y)} \cdot \left\{b_{(u,v)} + \frac{a_{(u,v)}}{Z^2_{(u,v)}} \cdot f\left(nD - \frac{2Z_{(u,v)}}{c}\right)\right\} \cdot D\right) du\, dv \quad \text{Expression 123}$$

In this Expression 123, as compared with Expression 122, time t is replaced with n×D, which is the time of an n-th bin, multiplication by a time width D of the n-th bin is performed, multiplication by a reaction rate q(u, v, x, y) is further performed, and integration with respect to (u, v) in region A(x, y) of a SPAD indicated by position (x, y) is performed.

Now, a case is considered in which a SPAD at position (x, y) in the SPAD array 13 is performing distance measurement on C(x, y) objects at different distances. One SPAD does not perform distance measurement in one direction, but performs, in practice, distance measurement in the whole direction with a certain solid angle. This is a case where a plurality of objects at different distances is in the range of distance measurement.

Distances to the C(x, y) target objects are expressed as Z(x, y, i). Here, i=1 to C(x, y). That is, an arbitrary position (u, v) in region A(x, y) receives a reflection from a target object at distance Z(u, v), and Z(u, v) is any Z(x, y, i) (i=1 to C(x, y)).

Reflectances of the C(x, y) target objects are expressed as a(x, y, i). Here, i=1 to C(x, y). That is, an arbitrary position (u, v) in region A(x, y) receives a reflection from a target object with a reflectance a(u, v), and a(u, v) is any a(x, y, i) (i=1 to C(x, y)).

That is, in the expression of an "occurrence rate p(x, y, n) of bin n of a SPAD at position (x, y)" represented by Expression 123, Z(u, v) and a(u, v) take only C(x, y) values of Z(x, y, i) and C(x, y) values of a(x, y, i), respectively. Taking this into consideration, Expression 123 can be deformed into the following Expression 124.

[Math. 124]

$$p_{(x,y,n)} = \iint\limits_{(u,v)\in A(x,y)} (\eta_{(u,v,x,y)} \cdot b_{(u,v)} \cdot D) du\, dv +$$

$$\sum_{i=1}^{C_{(x,y)}} \left\{ \frac{a_{(x,y,i)}}{Z_{(x,y,i)}^2} \cdot \iint\limits_{(u,v)\in A(x,y)\cap B(i)} \left( \eta_{(u,v,x,y)} \cdot f\left(nD - \frac{2Z_{(x,y,i)}}{c}\right) \cdot D \right) du\, dv \right\}$$

Expression 124

Note that here, set B(i) (i=1 to C(x, y)) is a set of positions (u, v) where an i-th target object is projected. Furthermore, a first term on the right-hand side of Expression 124 is constant regardless of n.

Figure 77:
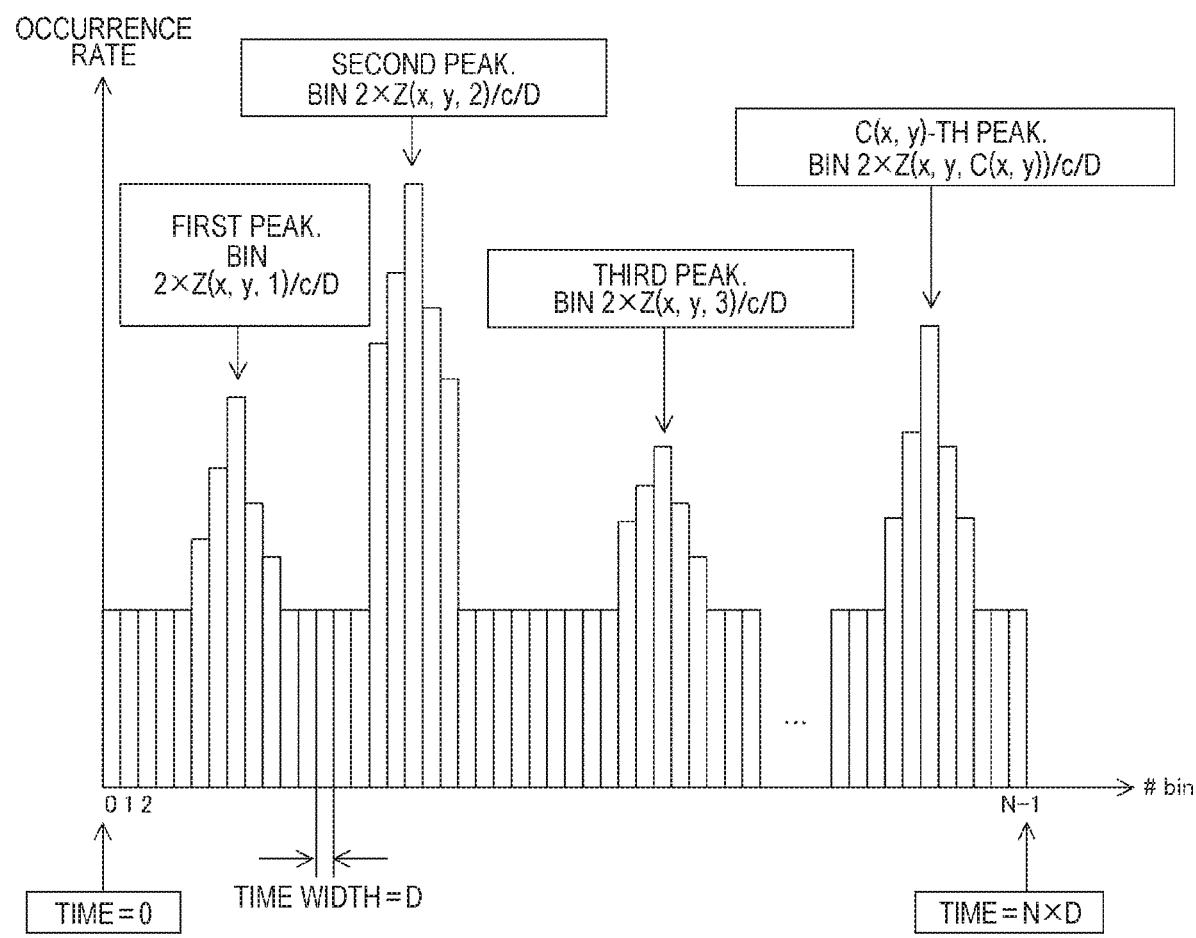
FIG. 77 is a diagram illustrating a distribution of occurrence rates in the example of distance measurement according to the ninth embodiment of the present technology.

FIG. 77 is a diagram illustrating a distribution of occurrence rates in the example of distance measurement according to the ninth embodiment of the present technology.

As illustrated in the drawing, an occurrence rate p(x, y, n) (n=0 to N−1) is expressed as a graph having C(x, y) peaks. The bins corresponding to the peaks are expressed as 2×Z(x, y, i)/c/D. Here, i=1 to C(x, y).

Figure 78:
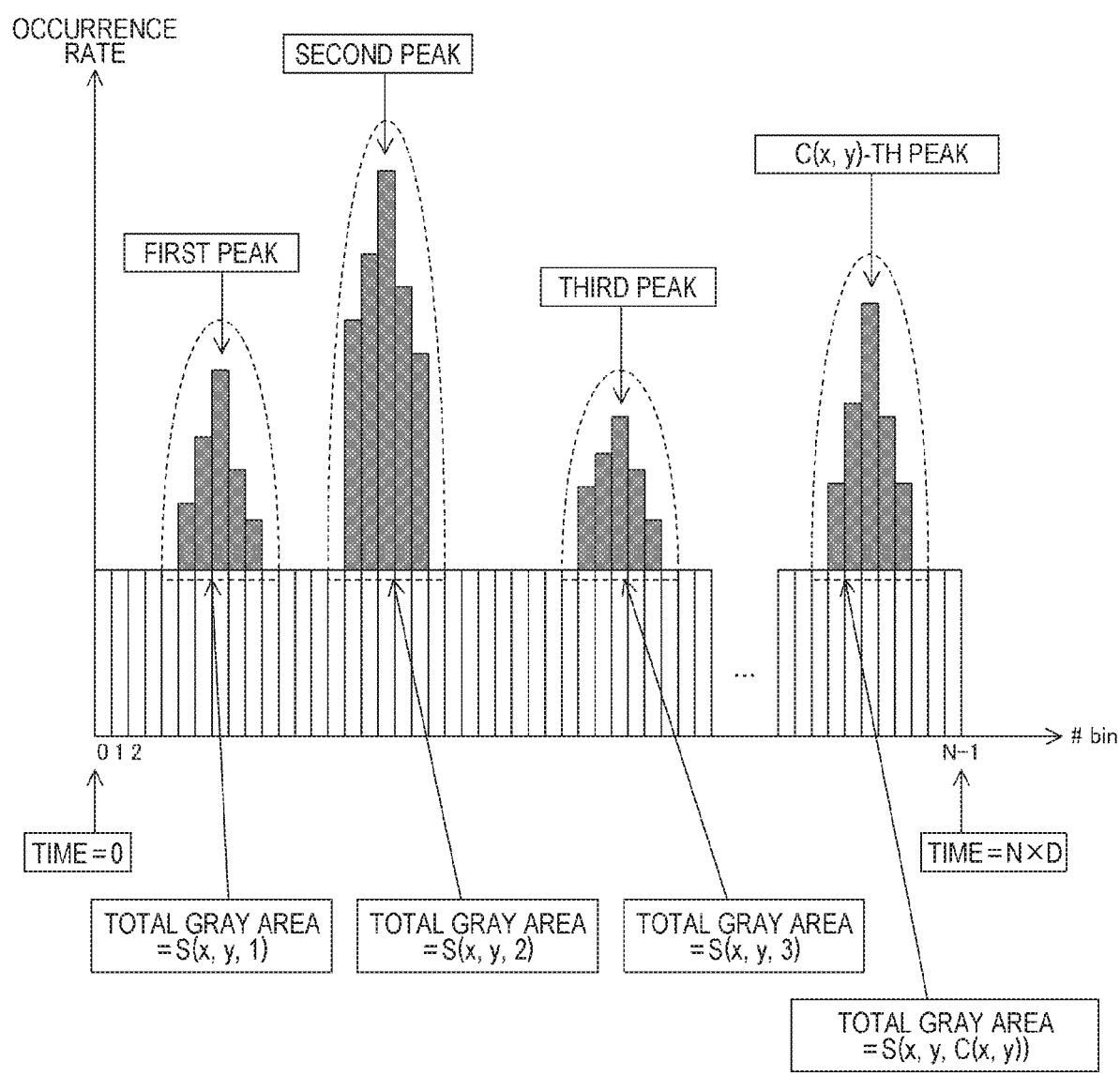
FIG. 78 is a diagram illustrating a distribution of occurrence rates in the example of distance measurement according to the ninth embodiment of the present technology.

FIG. 78 is a diagram illustrating a distribution of occurrence rates in the example of distance measurement according to the ninth embodiment of the present technology.

In the drawing, an area of a portion enclosed by a dotted line indicates a peak area of each peak. The peak areas are expressed as S(x, y, i). Here, i=1 to C(x, y). Note that a "peak area" is a term generally used in the field of gas chromatographs and liquid chromatographs, and is used in the same meaning in this embodiment.

As can be seen from the above-described Expression 124, peak area S(x, y, i) satisfies the following Expression 125.

[Math. 125]

$$S_{(x,y,i)} = \sum_{n=0}^{N-1} \left\{ \frac{a_{(x,y,i)}}{Z_{(x,y,i)}^2} \cdot \iint\limits_{(u,v)\in A(x,y)\cap B(i)} \left( \eta_{(u,v,x,y)} \cdot f\left(nD - \frac{2Z_{(x,y,i)}}{c}\right) \cdot D \right) du\, dv \right\} \propto$$

$$\frac{a_{(x,y,i)}}{Z_{(x,y,i)}^2} \cdot \left( \iint\limits_{(u,v)\in A(x,y)\cap B(i)} \eta_{(u,v,x,y)} du\, dv \right)$$

Expression 125

Furthermore, in a case where C(x, y)=1 is satisfied, it means that only an object at one distance is projected on a SPAD at position (x, y), so A(x, y) ⊂ B(1) holds. Thus, in a case where C(x, y)=1 is satisfied, the above-described Expression 11 becomes the following Expression 126.

[Math. 126]

$$S_{(x,y,i)} \propto \frac{a_{(x,y,i)}}{Z_{(x,y,i)}^2} \cdot \left( \iint\limits_{(u,v)\in A(x,y)\cap B(i)} \eta_{(u,v,x,y)} du\, dv \right),$$

where $i = 1$.

Expression 126

The above is summarized as follows. The distance measuring device 10 is used to obtain an occurrence rate p(x, y, n) by Expression 119 from a histogram H(x, y, n), which is an observation value obtained from each SPAD in the SPAD array 13. A peak of the occurrence rate p(x, y, n) in the range of n=0 to N−1 is detected. The number of peaks is expressed as C(x, y). It can be seen that a SPAD at position (x, y) in the SPAD array 13 has been performing distance measurement on C(x, y) objects at different distances. Then, when the peak area of each peak is expressed as S(x, y, i), there is a relationship represented by Expression 125. In particular, in a case where C(x, y)=1 is satisfied, Expression 126 holds.

Note that there are known methods of detecting a peak and obtaining a peak area, and those methods may be applied. That is, for example, there is a general processing method performed on chromatogram data acquired by a gas chromatograph, a liquid chromatograph, or the like. Specific methods include methods disclosed in, for example, Japanese Patent Application Laid-Open No. 2014-211393 and Japanese Patent Application Laid-Open No. 6-230001, and these methods can be used to detect a peak and obtain a peak area.

[Pre-Processing]

This embodiment relates to processing of detecting, in a case where a certain SPAD in the SPAD array 13 is performing distance measurement on a plurality of objects at different distances, positions of edges of those objects (i.e., regions of the corresponding objects). Specifically, depending on whether or not an occurrence rate p(x, y, n) represented by Expression 119 has a plurality of peaks, a determination is made on whether a SPAD at that position (x, y) is performing distance measurement on a plurality of objects, and moreover, processing of detecting positions of edges (i.e., regions of the corresponding objects) is performed.

However, even in a case where an occurrence rate p(x, y, n) has a plurality of peaks, it does not necessarily mean that an edge of an object is included. Consequently, a determination as to whether or not an edge of an object is included is performed as pre-processing. This pre-processing will be described below.

Figure 79:
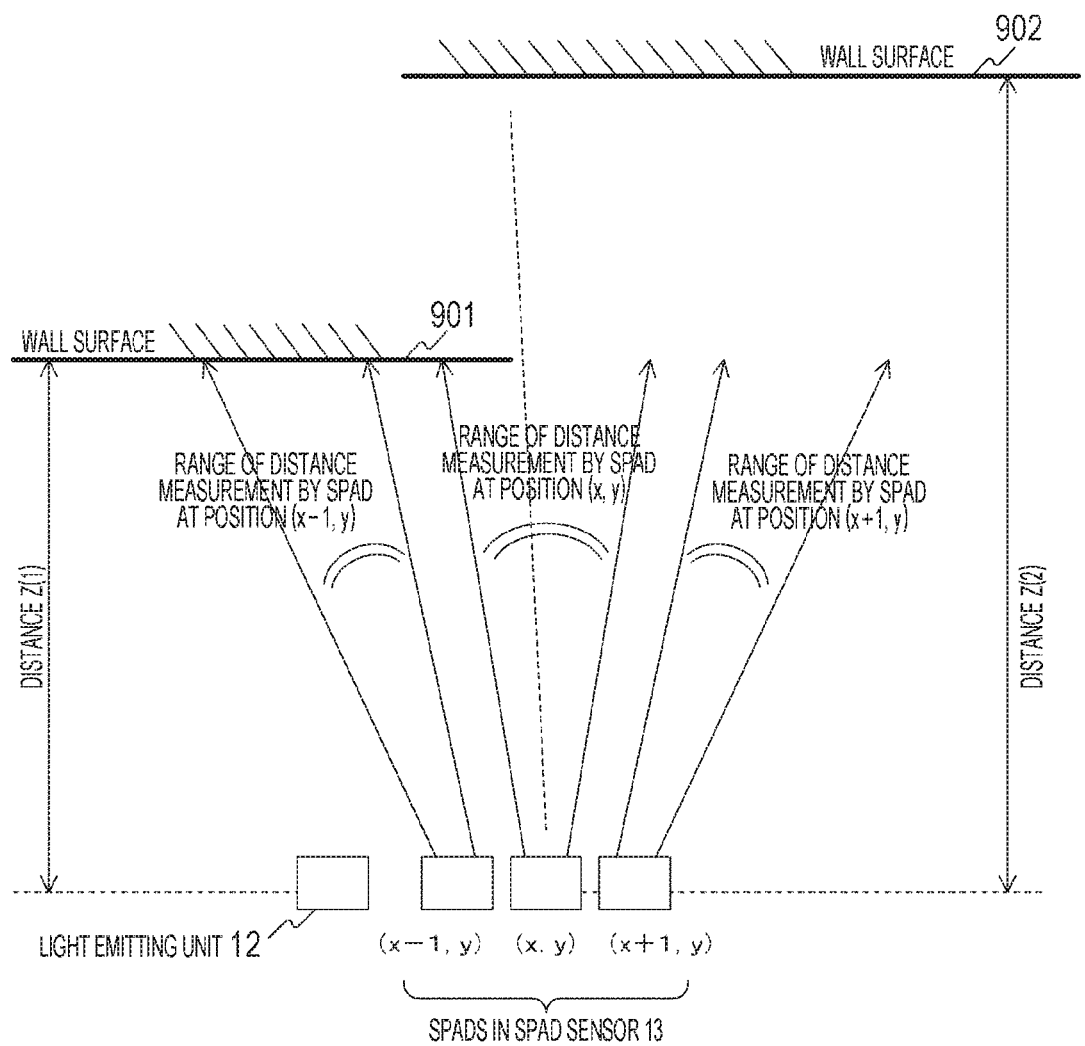
FIG. 79 is a diagram illustrating a first example of a scene of distance measurement according to the ninth embodiment of the present technology.

FIG. 79 is a diagram illustrating a first example of a scene of distance measurement according to the ninth embodiment of the present technology. This diagram illustrates a case where a SPAD at position (x, y) is performing distance measurement on two objects at different distances. That is, distance measurement is performed on two target objects: a wall surface 901 at distance Z(1) and a wall surface 902 at distance Z(2). In this case, from a histogram H(x, y, n), which is an observation value obtained from the SPAD at position (x, y), an occurrence rate p(x, y, n) is obtained by Expression 119, and then peaks in the occurrence rate p(x, y, n) are obtained. Thus, two bins $2 \times Z(1)/c/D$ and $2 \times Z(2)/c/D$ are obtained.

Figure 80:
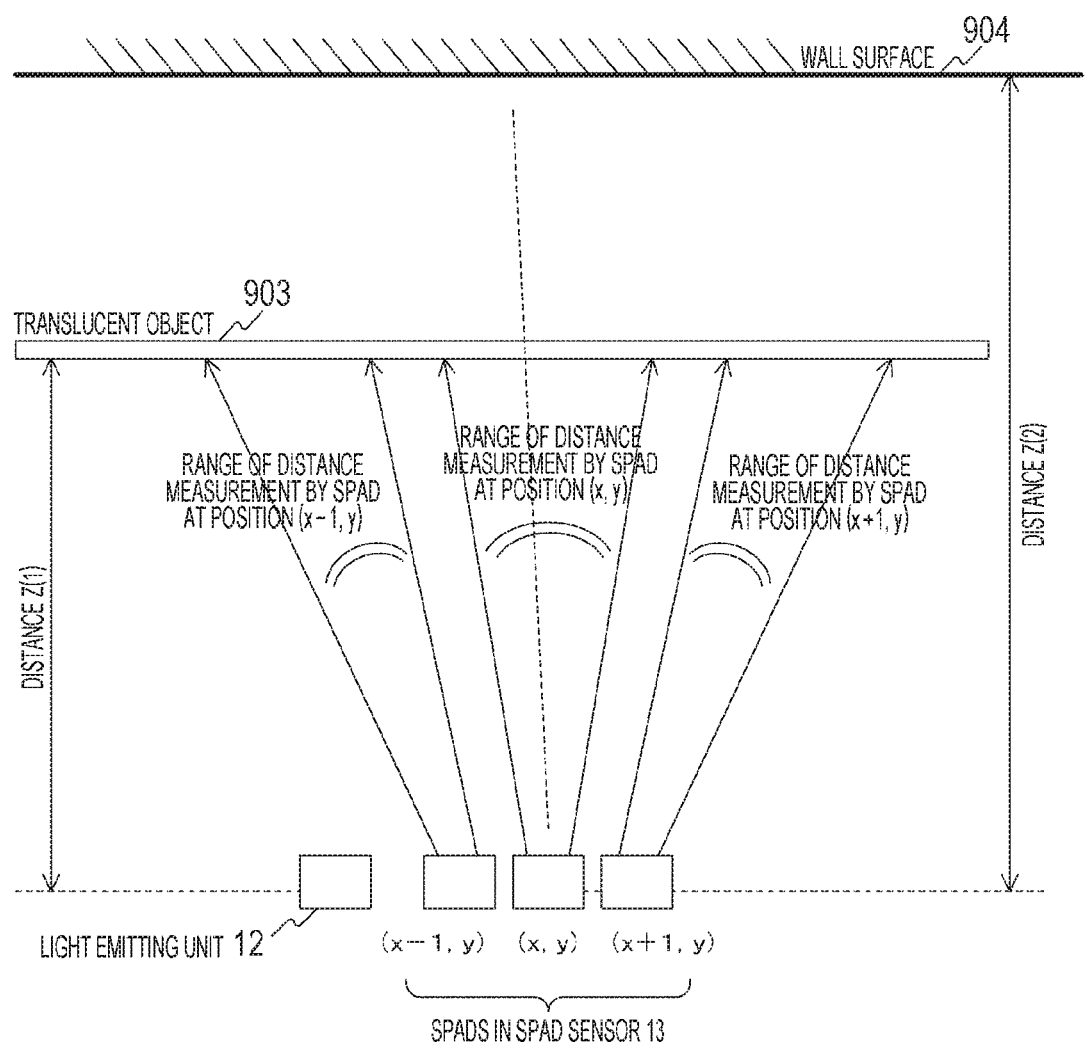
FIG. 80 is a diagram illustrating a second example of a scene of distance measurement according to the ninth embodiment of the present technology.

FIG. 80 is a diagram illustrating a second example of a scene of distance measurement according to the ninth embodiment of the present technology.

In the drawing, a translucent object 903 is located at distance $Z(1)$, and a wall surface 904 is located at distance $Z(2)$. Since the translucent object 903 is translucent, light (photon) may pass through it, or may be reflected by it. Thus, a SPAD may receive light reflected from the translucent object 903, or may receive light reflected from the wall surface 904. As a result, peaks are detected at the two bins $2 \times Z(1)/c/D$ and $2 \times Z(2)/c/D$ in the same manner as in the first example.

In the case of the first example, this embodiment may be applied to detect a boundary (edge) between the wall surfaces 901 and 902. However, in the case of the second example, a conclusion that no edge is included should be made without applying this embodiment. This determination is made in the pre-processing.

This pre-processing is determined on the basis of the situation of surrounding SPADs (for example, a SPAD at position $(x-1, y)$ and a SPAD at position $(x+1, y)$).

In the case of the first example, surrounding SPADs include a SPAD that is measuring only a target object at the distance of $Z(1)$ (in the first example, the SPAD at position $(x-1, y)$). Then, there is a SPAD that is measuring only a target object at the distance of $Z(2)$ (in the first example, the SPAD at position $(x+1, y)$).

On the other hand, in the case of the second example, the surrounding SPADs are also performing distance measurement on two objects: a target object at the distance of $Z(1)$ and a target object at the distance of $Z(2)$ (in the second example, the SPAD at position $(x-1, y)$ and the SPAD at position $(x+1, y)$).

Figure 81:
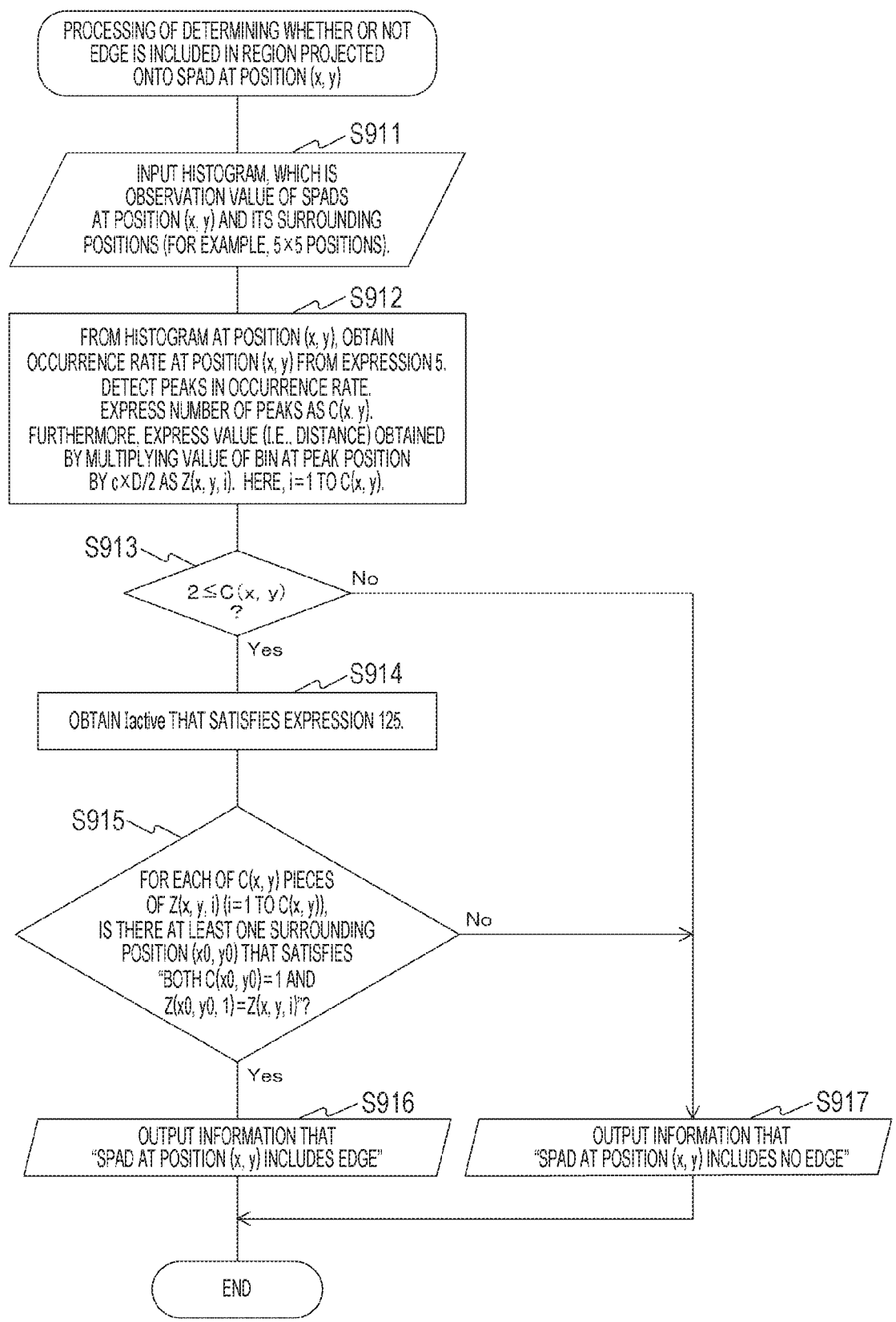
FIG. 81 is a flowchart illustrating an example of a pre-processing procedure according to the ninth embodiment of the present technology.

FIG. 81 is a flowchart illustrating an example of a pre-processing procedure according to the ninth embodiment of the present technology. In this pre-processing, it is determined whether or not an edge is included in a region projected onto the SPAD at position $(x, y)$. This processing is performed by the computation unit 16.

First, in step S911, a histogram, which is an observation value of SPADs at position $(x, y)$ and its surrounding positions (for example, 5×5 positions), is input. Note that while the SPADs at the surrounding positions are described as being neighbors on both sides in the x direction in the above-described first and second examples, it is possible to assume about 5×5 SPADs centered on position of interest $(x, y)$. Then, the processing proceeds to step S912.

In step S912, from a histogram at position $(x, y)$, an occurrence rate at position $(x, y)$ is obtained from Expression 119, and peaks in the occurrence rate are detected. The number of peaks is expressed as $C(x, y)$. Furthermore, a value (i.e., a distance) obtained by multiplying a value of a bin at a peak position by $c \times D/2$ is expressed as $Z(x, y, i)$. Here, $i=1$ to $C(x, y)$. Then, the processing proceeds to step S913.

In step S913, it is determined whether or not $C(x, y)$ is equal to or greater than 2. If it is equal to or greater than 2, the processing proceeds to step S914. If it is less than 2, the processing proceeds to step S917. In a case where $C(x, y)$ is less than 2, it means that a plurality of objects at different distances is not projected on the SPAD at position $(x, y)$.

In step S914, from histograms at the corresponding surrounding positions $(x0, y0)$, occurrence rates at positions $(x0, y0)$ are obtained from Expression 119, and peaks in the occurrence rates are detected. The number of peaks is expressed as $C(x0, y0)$. Furthermore, a value (i.e., a distance) obtained by multiplying a value of a bin at a peak position by $c \times D/2$ is expressed as $Z(x0, y0, i)$. Here, $i=1$ to $C(x0, y0)$ is satisfied. Then, the processing proceeds to step S915.

In step S915, for each of $C(x, y)$ pieces of $Z(x, y, i)$ ($i=1$ to $C(x, y)$), it is determined whether there is at least one surrounding position $(x0, y0)$ that satisfies "both $C(x0, y0)=1$ and $Z(x0, y0, 1)=Z(x, y, i)$". If true, the processing proceeds to step S916. If false, the processing proceeds to step S917. As a result of this determination, in the case of the first example, the processing proceeds to step S916. In the case of the second example, the processing proceeds to step S917.

In step S916, information that "the SPAD at position $(x, y)$ includes an edge" is output. Then, the series of processing ends.

In step S917, information that "the SPAD at position $(x, y)$ includes no edge" is output. Then, the series of processing ends.

Note that supplementary information regarding the determination of "$Z(x0, y0, 1)=Z(x, y, i)$" in step S915 will be given. Actually, measurement errors occur, and it is substantially impossible that "$Z(x0, y0, 1)=Z(x, y, i)$" is exactly satisfied. Consequently, taking into consideration the error, the determination is made on the basis of whether or not "$Z(x, y, i)-\delta \leq (x0, y0, 1) \leq Z(x, y, i)+\delta$" is satisfied. Here, $\delta$ is an assumed error amount, and is a desired small constant.

By the pre-processing described here, it is possible to determine whether or not an edge of an object is included in the region of the SPAD at position $(x, y)$. This pre-processing is performed before each working example of this embodiment is performed, and each working example of this embodiment is performed only in a case where it is determined that "the SPAD at position $(x, y)$ includes an edge". Then, in a case where it is determined that "the SPAD at position $(x, y)$ includes no edge", each working example of this embodiment is not performed.

[Input Data]

The data input in each of the following working examples includes $C(x, y)$ at each position $(x, y)$. Then, $Z(x, y, i)$ and $S(x, y, i)$ are also included. Here, $i=1$ to $C(x, y)$.

These values can be calculated as described below. The distance measuring device 10 is used to obtain an occurrence rate $p(x, y, n)$ by Expression 119 from a histogram $H(x, y, n)$, which is an observation value obtained from each SPAD in the SPAD array 13. A peak of the occurrence rate $p(x, y, n)$ in the range of $n=0$ to $N-1$ is detected. The number of peaks is expressed as $C(x, y)$. A value (i.e., a distance) obtained by multiplying a value of a bin at a peak position by $c \times D/2$ is expressed as $Z(x, y, i)$. Furthermore, a peak area of each peak is expressed as $S(x, y, i)$. In this way, $C(x, y)$ at each position $(x, y)$, and $Z(x, y, i)$ and $S(x, y, i)$ can be obtained. These pieces of calculation processing are performed by the computation unit 16 before the processing of each working example is performed.

First Working Example

A first working example is processing of determining a region of an object of interest (i-th object), which is one of $C(x, y)$ objects in a region of a SPAD at position of interest $(x, Y)$.

The region of the i-th object, which is the object of interest, is expressed by the following Expression 127. That is, $B(\alpha, \beta, g)$ is the region of the i-th object.

[Math. 127]

$$B(\alpha,\beta,g) \equiv \{(u,v) | \alpha u + \beta v \leq g\} \quad \text{Expression 127}$$

Here, $\alpha$, $\beta$, and $g$ are parameters for determining the region, and the magnitude of a vector $(\alpha, \beta)$ is 1. Obtaining these parameters is the ultimate goal of the first working example.

A set of positions of SPADs surrounding position of interest $(x, y)$ (for example, 5×5 positions centered on position of interest $(x, y)$) is expressed as $G(x, y)$. That is, $G(x, y)$ includes 25 positions such as position $(x-2, y-2)$, position $(x-2, y-1)$, position $(x-2, y)$, and position $(x+2, y+2)$. Position $(x, y)$ is also included in $G(x, y)$. For a SPAD at position $(x1, y1)$ in the surroundings $G(x, y)$, one that is equal to distance $Z(x, y, i)$ to the i-th object, which is the object of interest, is chosen. That is, a set $A0(x, y, i)$ represented by the following Expression 128 is determined.

[Math. 128]

$$A_0(x,y,i) \equiv \{(x_1,y_1,j) | Z_{(x,y,i)} - \delta \leq Z_{(x_1,y_1,j)} \leq Z_{(x,y,i)} + \delta, (x_1,y_1) \in G_{(x,y)}\} \quad \text{Expression 128}$$

Note that, taking into consideration an error, in a case where "$Z(x, y, i) - \delta \leq Z(x1, y1, j) \leq Z(x, y, i) + \delta$" is satisfied, it is assumed that the distance is "equal to distance $Z(x, y, i)$ to the i-th object, which is the object of interest". Here, $\delta$ is an assumed error amount, and is a desired small constant.

For each element in the set $A0(x, y, i)$, a weighted average (a center-of-gravity position in a $(u, v)$ coordinate system) represented by the following Expression 129 is obtained.

[Math. 129]

$$(u_{avg}, v_{avg}) \equiv \left( \frac{\sum_{(x_1,y_1,j) \in A_0(x,y,i)} x_1 \cdot S_{(x_1,y_1,j)}}{\sum_{(x_1,y_1,j) \in A_0(x,y,i)} S_{(x_1,y_1,j)}}, \frac{\sum_{(x_1,y_1,j) \in A_0(x,y,i)} y_1 \cdot S_{(x_1,y_1,j)}}{\sum_{(x_1,y_1,j) \in A_0(x,y,i)} S_{(x_1,y_1,j)}} \right) \quad \text{Expression 129}$$

Position $(uavg, vavg)$ represented by Expression 129 will be described. Expression 129 represents a weighted average position of position $(x, y)$ of a SPAD that is performing distance measurement on a target object at a distance "equal to distance $Z(x, y, i)$ to the i-th object, which is the object of interest" in the surroundings $G(x, y)$. At this time, a peak area is adopted as weighting.

In a case where the value of peak area $S(x1, y1, j)$ is large, a target object at distance $Z(x, y, i)$ is projected on a large scale on a SPAD at position $(x1, y1)$ (the target object at distance $Z(x, y, i)$ is projected on most of the range of distance measurement by the SPAD at position $(x1, y1)$).

In a case where the value of peak area $S(x1, y1, j)$ is small, a target object at distance $Z(x, y, i)$ is projected on a small scale on a SPAD at position $(x1, y1)$ (the target object at distance $Z(x, y, i)$ is not projected on most of the range of distance measurement by the SPAD at position $(x1, y1)$).

Thus, position $(uavg, vavg)$ can be considered as the center of gravity of the target object at distance $Z(x, y, i)$.

As described with reference to FIG. 74. The center position of the SPAD at position $(x, y)$ is $u=x$ and $v=y$. Thus, it is reasonable to consider that a vector $(x-uavg, y-vavg)$ is orthogonal to a boundary (edge) of the i-th object, which is the object of interest. That is, the parameters $\alpha$ and $\beta$ in the above-described Expression 127 satisfy the following Expression 130.

[Math. 130]

$$(\alpha, \beta) \equiv \frac{(x - u_{avg}, y - v_{avg})}{\|(x - u_{avg}, y - v_{avg})\|} \quad \text{Expression 130}$$

Figure 82:
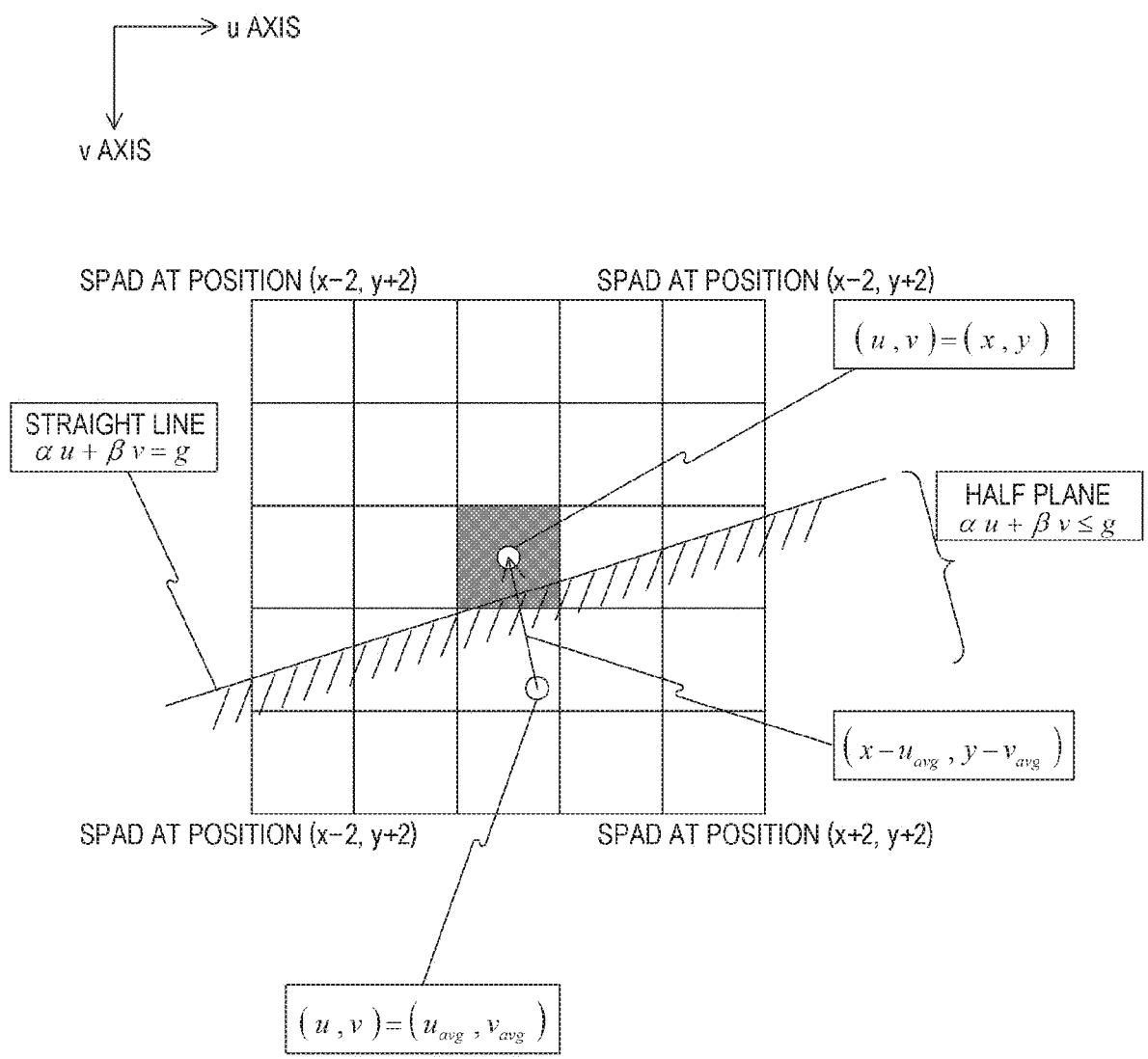
FIG. 82 is a diagram illustrating a position of each SPAD at a position included in G(x, y) according to a first working example of the ninth embodiment of the present technology.

FIG. 82 is a diagram illustrating a position of each SPAD at a position included in $G(x, y)$ according to the first working example of the ninth embodiment of the present technology. That is, 5×5 SPADs centered on a SPAD at position $(x, y)$ are illustrated.

Only the SPAD at position $(x, y)$ is illustrated in gray for easy viewing. The center position of the SPAD at position $(x, y)$ is $u=x$ and $v=y$ in a $(u, v)$ coordinate system. Furthermore, position $(uavg, vavg)$ represented by the above-described Expression 129 is also illustrated. Position $(uavg, vavg)$ can be considered as the center of gravity of the target object at distance $Z(x, y, i)$. A half plane represented by $\alpha \times u + \beta \times v \leq g$ is also illustrated. This half plane is $B(\alpha, \beta, g)$. The vector $(x-uavg, y-vavg)$ is orthogonal to a straight line $\alpha \times u + \beta \times v = g$, which is a boundary of $B(\alpha, \beta, g)$.

Now, the following Expression 131 is obtained by substituting $B(\alpha, \beta, g)$ represented by the above-described Expression 127 for $B(i)$ in the above-described Expression 125.

[Math. 131]

$$S_{(x,y,i)} \propto \frac{a_{(x,y,i)}}{Z_{(x,y,i)}^2} \cdot \left( \iint_{(u,v) \in A(x,y) \cap B(\alpha,\beta,g)} \eta_{(u,v,x,y)} du \, dv \right) \quad \text{Expression 131}$$

For a SPAD at position $(x1, y1)$ in the surroundings $G(x, y)$, one that is "equal to distance $Z(x, y, i)$ to the i-th object, which is the object of interest" and satisfies "$C(x1, y1)$ at that position $(x1, y1)$ is 1" is chosen. That is, a set $A1(x, y, i)$ represented by the following Expression 132 is determined.

[Math. 132]

$$A_1(x,y,i) \equiv \{(x_1,y_1,j) | Z_{(x,y,i)} - \delta \leq Z_{(x_1,y_1,j)} \leq Z_{(x,y,i)} + \delta, C_{(x_1,y_1)} = 1, (x_1,y_1) \in G_{(x,y)}\} \quad \text{Expression 132}$$

Note that, taking into consideration an error, in a case where "$Z(x, y, i) - \delta \leq Z(x1, y1, j) \leq Z(x, y, i) + \delta$" is satisfied, it is assumed that the distance is "equal to distance $Z(x, y, i)$ to the i-th object, which is the object of interest". Here, $\delta$ is an assumed error amount, and is a desired small constant.

From the above-described Expressions 125 and 126 and Expressions 131 and 132, the following Expression 133 is obtained.

[Math. 133]

$$\frac{S_{(x,y,i)}}{\sum_{(x_1,y_1,j) \in A(x,y,i)} S_{(x_1,y_1,j)}} = \frac{\iint_{(u,v) \in A(x,y) \cap B(\alpha,\beta,g)} \eta_{(u,v,x,y)} du \, dv}{\sum_{(x_1,y_1,j) \in A(x,y,i)} \left( \iint_{(u,v) \in A(x_1,y_1)} \eta_{(u,v,x_1,y_1)} du \, dv \right)} \quad \text{Expression 133}$$

Note that it is apparent that Expression 133 holds, because (x1, y1) included in Expression 132 satisfies C(x1, y1)=1, and Expression 125 becomes Expression 126 when C(x, y)=1 is satisfied.

Summarizing the above, $B(\alpha, \beta, g)$ can be obtained as described below, the $B(\alpha, \beta, g)$ being a region of an i-th object of interest, which is one of C(x, y) objects in a region of a SPAD at position of interest (x, y). That is, $\alpha$ and $\beta$ can be obtained from Expressions 128 to 130. Expression 132 and an expression obtained by substituting the previously obtained $\alpha$ and $\beta$ into Expression 133 can be used to obtain g.

Note that the following Expression 134 holds because the "region of the i-th object" to be finally obtained is only required to be obtained inside the region of the SPAD at position (x, y).

[Math. 134]

$$A_s(x,y) \cap B(\alpha,\beta,g) \quad \text{Expression 134}$$

Here, As(x, y) is, as already described, a physical region of the SPAD at position (x, y). The region represented by Expression 134 is the "region of the i-th object" in the region of the SPAD at position (x, y).

Figure 83:
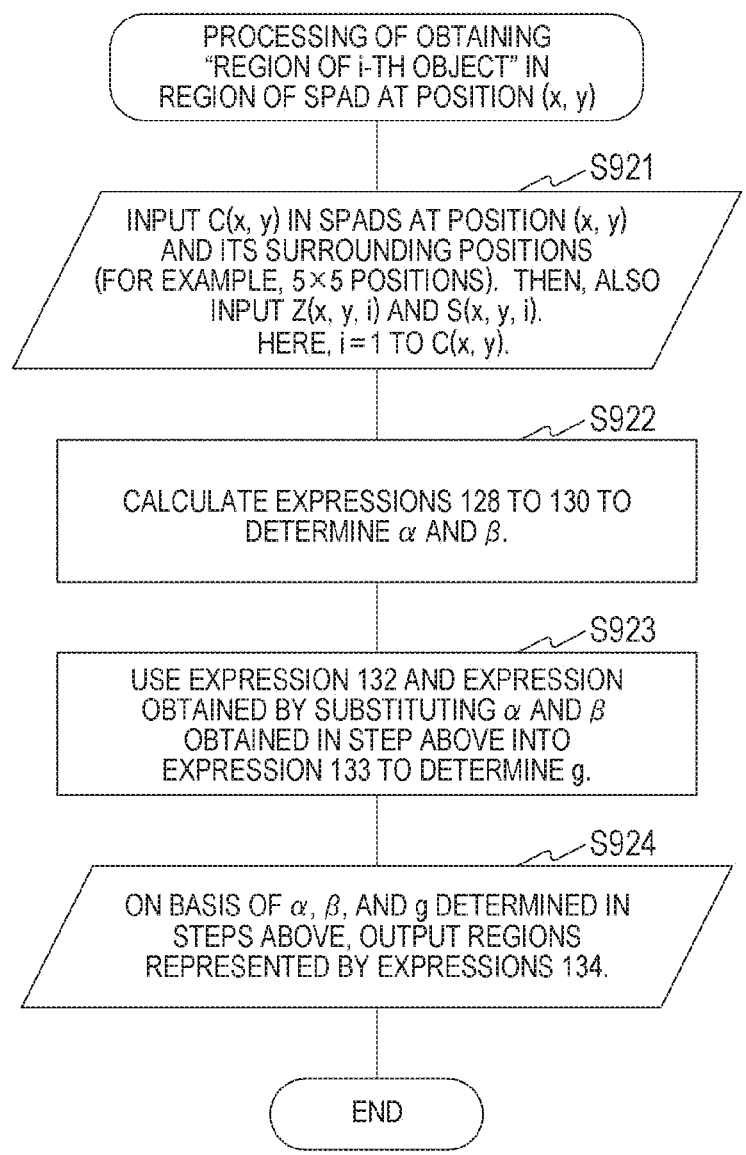
FIG. 83 is a flowchart illustrating an example of a processing procedure for obtaining a region of an object according to the first working example of the ninth embodiment of the present technology.

FIG. 83 is a flowchart illustrating an example of a processing procedure for obtaining a region of an object according to the first working example of the ninth embodiment of the present technology. This processing obtains a "region of an i-th object" in a region of a SPAD at position (x, y). This processing is performed by the computation unit 16.

First, in step S921, C(x, y) in SPADs at position (x, y) and its surrounding positions (for example, 5×5 positions) is input. Then, Z(x, y, i) and S(x, y, i) are also input. Here, =1 to C(x, y). Then, the processing proceeds to step S922.

In step S922, Expressions 128 to 130 are calculated to determine $\alpha$ and $\beta$. Then, the processing proceeds to step S923.

In step S923, Expression 132 and an expression obtained by substituting $\alpha$ and $\beta$ obtained in step S922 into Expression 133 are used to determine g. Then, the processing proceeds to step S924.

In step S924, on the basis of $\alpha$, $\beta$, and g determined in steps S922 and S923, a region represented by Expression 134 is output. Then, the series of processing ends.

In this way, the "region of the i-th object" in the region of the SPAD at position (x, y) can be obtained.

Second Working Example

A second working example is processing of determining, in a case where C(x, y)=2 is satisfied in a region of a SPAD at position of interest (x, y), a region of each of two objects.

A region of a first object is expressed as $B(\alpha 1, \beta 1, g1)$. A complementary set of B(a1, β1, g1) is a region of a second object. Note that $B(\cdot, \cdot, \cdot)$ is defined by the above-described Expression 127. Here, $\alpha 1$, $\beta 1$, and g1 are parameters for determining a region, and the magnitude of a vector $(\alpha 1, \beta 1)$ is 1. Obtaining these parameters is the ultimate goal of the second working example.

Considering in a similar manner to Expression 129 in the first working example, center-of-gravity position (uavg1, vavg1) of a target object (first object) at distance Z(x, y, 1) is represented by the following Expression 135.

[Math. 135]

$$(u_{avg1}, v_{avg1}) \equiv \left( \frac{\sum_{(x_1,y_1,j) \in A_0(x,y,1)} x_1 \cdot S_{(x_1,y_1,j)}}{\sum_{(x_1,y_1,j) \in A_0(x,y,1)} S_{(x_1,y_1,j)}}, \frac{\sum_{(x_1,y_1,j) \in A_0(x,y,1)} y_1 \cdot S_{(x_1,y_1,j)}}{\sum_{(x_1,y_1,j) \in A_0(x,y,1)} S_{(x_1,y_1,j)}} \right) \quad \text{Expression 135}$$

Then, center-of-gravity position (uavg2, vavg2) of a target object (second object) at distance Z(x, y, 2) is represented by the following Expression 136.

[Math. 136]

$$(u_{avg2}, v_{avg2}) \equiv \left( \frac{\sum_{(x_1,y_1,j) \in A_0(x,y,2)} x_1 \cdot S_{(x_1,y_1,j)}}{\sum_{(x_1,y_1,j) \in A_0(x,y,2)} S_{(x_1,y_1,j)}}, \frac{\sum_{(x_1,y_1,j) \in A_0(x,y,2)} y_1 \cdot S_{(x_1,y_1,j)}}{\sum_{(x_1,y_1,j) \in A_0(x,y,2)} S_{(x_1,y_1,j)}} \right) \quad \text{Expression 136}$$

Note that here, $A0(\cdot, \cdot, \cdot)$ is defined by the above-described Expression 128.

It is reasonable to consider that a vector (uavg2−uavg1, vavg2−vavg1) that connects the center-of-gravity positions of the two objects represented by Expressions 135 and 136 is orthogonal to a straight line $\alpha 1 \times u + \beta 1 \times v = g1$, which is a boundary of $B(\alpha 1, \beta 1, g1)$. That is, the parameters $\alpha 1$ and $\beta 1$ satisfy the following Expression 137.

[Math. 137]

$$(\alpha_1, \beta_1) \equiv \frac{(u_{avg2} - u_{avg1}, v_{avg2} - v_{avg1})}{\|(u_{avg2} - u_{avg1}, v_{avg2} - v_{avg1})\|} \quad \text{Expression 137}$$

Figure 84:
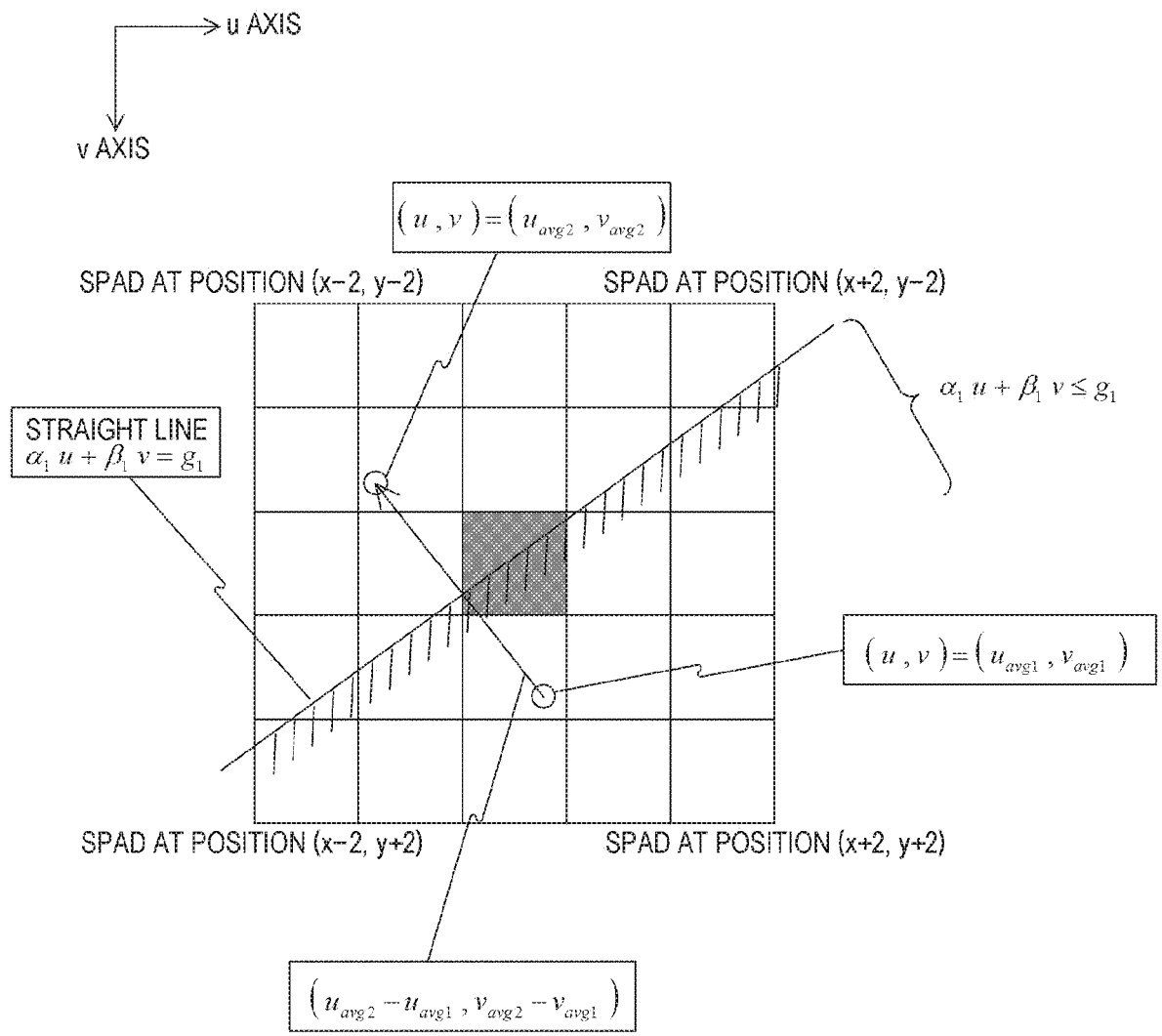
FIG. 84 is a diagram illustrating a position of each SPAD at a position included in G(x, y) according to a second working example of the ninth embodiment of the present technology.

FIG. 84 is a diagram illustrating a position of each SPAD at a position included in G(x, y) according to the second working example of the ninth embodiment of the present technology. That is, 5×5 SPADs centered on a SPAD at position (x, y) are illustrated.

Only the SPAD at position (x, y) is illustrated in gray for easy viewing. The center position of the SPAD at position (x, y) is u=x and v=y in a (u, v) coordinate system. Furthermore, positions (uavg1, vavg1) and (uavg2, vavg2) represented by Expressions 135 and 136 are also illustrated. Position (uavg1, vavg1) can be considered as the center of gravity of a target object at distance Z(x, y, 1). Position (uavg2, vavg2) can be considered as the center of gravity of a target object at distance Z(x, y, 2). A half plane represented by $\alpha 1 \times u + \beta 1 \times v \leq g1$ is also illustrated. This half plane is $B(\alpha 1, \beta 1, g1)$. A vector (uavg2−uavg1, vavg2−vavg1) is orthogonal to a straight line $\alpha 1 \times u + \beta 1 \times v = g1$, which is a boundary of $B(\alpha 1, \beta 1, g1)$.

Now, considering in a similar manner to the derivation of Expression 133 in the first working example, the following Expressions 138 and 139 are derived.

[Math. 138]

$$\frac{S_{(x,y,1)}}{\sum_{(x_1,y_1,j)\in A_1(x,y,1)} S_{(x_1,y_1,j)}} = \frac{\iint_{(u,v)\in A(x,y)\cap B(\alpha_1,\beta_1,g_1)} \eta_{(u,v,x,y)} du\, dv}{\sum_{(x_1,y_1,j)\in A_1(x,y,1)} \left( \iint_{(u,v)\in A(x_1,y_1)} \eta_{(u,v,x_1,y_1)} du\, dv \right)}$$

Expression 138

[Math. 139]

$$\frac{S_{(x,y,2)}}{\sum_{(x_1,y_1,j)\in A_1(x,y,2)} S_{(x_1,y_1,j)}} = \frac{\iint_{(u,v)\in A(x,y)\cap B^c(\alpha_1,\beta_1,g_1)} \eta_{(u,v,x,y)} du\, dv}{\sum_{(x_1,y_1,j)\in A_1(x,y,2)} \left( \iint_{(u,v)\in A(x_1,y_1)} \eta_{(u,v,x_1,y_1)} du\, dv \right)}$$

Expression 139

Note that here, A1(•, •, •) is as defined by the above-described Expression 132.

The following Expression 140 is obtained from these Expressions 138 and 139.

[Math. 140]

$$\frac{S_{(x,y,1)}}{\sum_{(x_1,y_1,j)\in A_1(x,y,1)} S_{(x_1,y_1,j)}} : \frac{S_{(x,y,2)}}{\sum_{(x_1,y_1,j)\in A_1(x,y,2)} S_{(x_1,y_1,j)}} = \frac{\iint_{(u,v)\in A(x,y)\cap B(\alpha_1,\beta_1,g_1)} \eta_{(u,v,x,y)} du\, dv}{\sum_{(x_1,y_1,j)\in A_1(x,y,1)} \left( \iint_{(u,v)\in A(x_1,y_1)} \eta_{(u,v,x_1,y_1)} du\, dv \right)} : \frac{\iint_{(u,v)\in A(x,y)\cap B^c(\alpha_1,\beta_1,g_1)} \eta_{(u,v,x,y)} du\, dv}{\sum_{(x_1,y_1,j)\in A_1(x,y,2)} \left( \iint_{(u,v)\in A(x_1,y_1)} \eta_{(u,v,x_1,y_1)} du\, dv \right)}$$

Expression 140

Summarizing the above, B($\alpha_1$, $\beta_1$, g1) can be obtained as described below, the B($\alpha_1$, $\beta_1$, g1) being the region of the first object, which is one of the two objects in the region of the SPAD at position of interest (x, y). That is, $\alpha_1$ and $\beta_1$ can be obtained from Expressions 135 to 137. An expression obtained by substituting the previously obtained $\alpha_1$ and $\beta_1$ into Expression 140 can be used to obtain g1.

Note that the following Expression 141 holds because the "region of the first object" to be finally obtained is only required to be obtained inside the region of the SPAD at position (x, y).

[Math. 141]

$$A_s(x,y)\cap(a_1,\beta_1,g_1)$$

Expression 141

The following Expression 142 holds because the "region of the second object" is only required to be obtained inside the region of the SPAD at position (x, y).

[Math. 142]

$$A_s(x,y)\quad B^c(\alpha_1,\beta_1,g_1)$$

Expression 142

Figure 85:
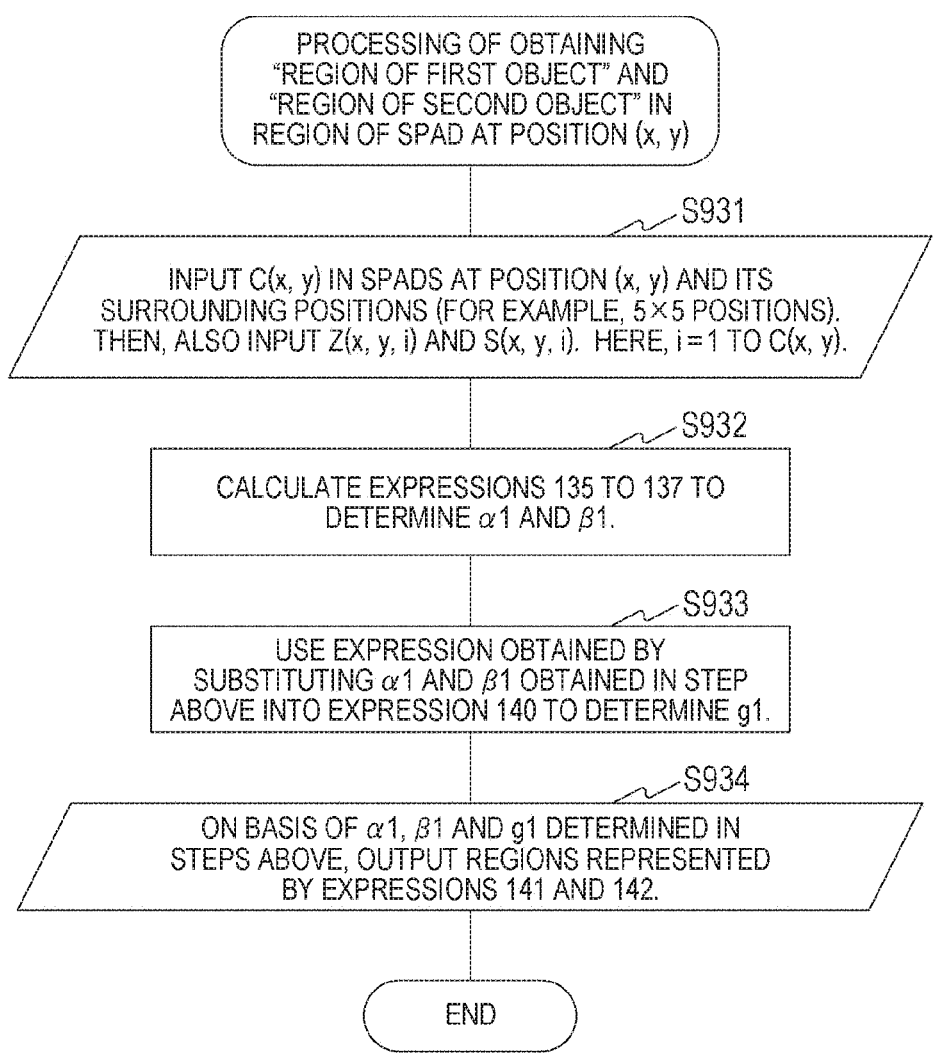
FIG. 85 is a flowchart illustrating an example of a processing procedure for obtaining a region of an object according to the second working example of the ninth embodiment of the present technology.

FIG. 85 is a flowchart illustrating an example of a processing procedure for obtaining a region of an object according to the second working example of the ninth embodiment of the present technology. This processing obtains a "region of a first object" and a "region of a second object" in a region of a SPAD at position (x, y). This processing is performed by the computation unit 16.

First, in step S931, C(x, y) in SPADs at position (x, y) and its surrounding positions (for example, 5×5 positions) is input. Then, Z(x, y, i) and S(x, y, i) are also input. Here, i=1 to C(x, y). Then, the processing proceeds to step S932.

In step S932, Expressions 135 to 137 are calculated to determine $\alpha_1$ and $\beta_1$. Then, the processing proceeds to step S933.

In step S933, an expression obtained by substituting $\alpha_1$ and $\beta_1$ obtained in step S932 into Expression 140 is used to determine g1. Then, the processing proceeds to step S934.

In step S934, on the basis of $\alpha_1$, $\beta_1$, and g1 determined in steps S932 and S933, regions represented by Expressions 141 and 142 are output. Then, the series of processing ends.

In this way, the "region of the first object" and the "region of the second object" in the region of the SPAD at position (x, y) can be obtained.

Third Working Example

A third working example is processing of determining, in a case where C(x, y)=3 is satisfied in a region of a SPAD at position of interest (x, y), a region of each of three objects.

The region of a first object is defined as B1($\alpha_1$, $\beta_1$, u0, v0) ∩ "complementary set of B1($\alpha_3$, $\beta_3$, u0, v0)". The region of a second object is defined as B1($\alpha_2$, $\beta_2$, u0, v0) ∩ "complementary set of B1($\alpha_1$, $\beta_1$, u0, v0)". The region of a third object is defined as B1($\alpha_3$, $\beta_3$, u0, v0)∩ "complementary set of B1($\alpha_2$, $\beta_2$, u0, v0)". Here, B1 (•, •, •, •) is a set defined by the following Expression 143.

[Math. 143]

$$\beta_1(\alpha,\beta,u_0,v_0)\equiv\{(u,v)|\alpha(u-u_0)+\beta(v-v_0)\leq 0\}$$

Expression 143

Here, $\alpha_1$, $\beta_1$, $\alpha_2$, $\beta_2$, $\alpha_3$, $\beta_3$, u0, and v0 are parameters for determining regions. The magnitude of a vector ($\alpha_1$, $\beta_1$) is 1. The magnitude of a vector ($\alpha_2$, $\beta_2$) is 1. The magnitude of a vector ($\alpha_3$, $\beta_3$) is 1. Obtaining these parameters is the ultimate goal of the third working example.

Considering in a similar manner to Expression 129 in the first working example, center-of-gravity position (uavg1, vavg1) of a target object (first object) at distance Z(x, y, 1) is represented by the following Expression 144.

[Math. 144]

$$(u_{avg1}, v_{avg1}) \equiv \left( \frac{\sum_{(x_1,y_1,j)\in A_0(x,y,1)} x_1 \cdot S_{(x_1,y_1,j)}}{\sum_{(x_1,y_1,j)\in A_0(x,y,1)} S_{(x_1,y_1,j)}}, \frac{\sum_{(x_1,y_1,j)\in A_0(x,y,1)} y_1 \cdot S_{(x_1,y_1,j)}}{\sum_{(x_1,y_1,j)\in A_0(x,y,1)} S_{(x_1,y_1,j)}} \right)$$

Expression 144

Then, center-of-gravity position (uavg2, vavg2) of a target object (second object) at distance Z(x, y, 2) is represented by the following Expression 145.

[Math. 145]

$$(u_{avg2}, v_{avg2}) \equiv \left( \frac{\sum_{(x_1,y_1,j) \in A_0(x,y,2)} x_1 \cdot S_{(x_1,y_1,j)}}{\sum_{(x_1,y_1,j) \in A_0(x,y,2)} S_{(x_1,y_1,j)}}, \right.$$

$$\left. \frac{\sum_{(x_1,y_1,j) \in A_0(x,y,2)} y_1 \cdot S_{(x_1,y_1,j)}}{\sum_{(x_1,y_1,j) \in A_0(x,y,2)} S_{(x_1,y_1,j)}} \right)$$

Expression 145

Then, center-of-gravity position (uavg3, vavg3) of a target object (third object) at distance Z(x, y, 3) is represented by the following Expression 146.

[Math. 146]

$$(u_{avg3}, v_{avg3}) \equiv \left( \frac{\sum_{(x_1,y_1,j) \in A_0(x,y,3)} x_1 \cdot S_{(x_1,y_1,j)}}{\sum_{(x_1,y_1,j) \in A_0(x,y,3)} S_{(x_1,y_1,j)}}, \right.$$

$$\left. \frac{\sum_{(x_1,y_1,j) \in A_0(x,y,3)} y_1 \cdot S_{(x_1,y_1,j)}}{\sum_{(x_1,y_1,j) \in A_0(x,y,3)} S_{(x_1,y_1,j)}} \right)$$

Expression 146

Note that here, A0(•, •, •) is as defined by the above-described Expression 128.

It is reasonable to consider that a vector (uavg2−uavg1, vavg2−vavg1) that connects the center-of-gravity positions of the first and second objects represented by Expressions 144 and 145 is orthogonal to a straight line α1×(u−u0)+β1×(v−v0)=0, which is a boundary between the region of the first object and the region of the second object. That is, the parameters α1 and β1 satisfy the following Expression 147.

[Math. 147]

$$(\alpha_1, \beta_1) \equiv \frac{(u_{avg2} - u_{avg1}, v_{avg2} - v_{avg1})}{\|(u_{avg2} - u_{avg1}, v_{avg2} - v_{avg1})\|}$$

Expression 147

It is reasonable to consider that a vector (uavg3−uavg2, vavg3−vavg2) that connects the center-of-gravity positions of the second and third objects represented by Expressions 145 and 146 is orthogonal to a straight line α2×(u−u0)+β2×(v−v0)=0, which is a boundary between the region of the second object and the region of the third object. That is, the parameters α2 and β2 satisfy the following Expression 148.

[Math. 148]

$$(\alpha_2, \beta_2) \equiv \frac{(u_{avg3} - u_{avg2}, v_{avg3} - v_{avg2})}{\|(u_{avg3} - u_{avg2}, v_{avg3} - v_{avg2})\|}$$

Expression 148

It is reasonable to consider that a vector (uavg1−uavg3, vavg1−vavg3) that connects the center-of-gravity positions of the third and first objects represented by Expressions 146 and 144 is orthogonal to a straight line α3×(u−u0)+β3×(v−v0)=0, which is a boundary between the region of the third object and the region of the first object. That is, the parameters α3 and β3 satisfy the following Expression 149.

[Math. 149]

$$(\alpha_3, \beta_3) \equiv \frac{(u_{avg1} - u_{avg3}, v_{avg1} - v_{avg3})}{\|(u_{avg1} - u_{avg3}, v_{avg1} - v_{avg3})\|}$$

Expression 149

FIGS. 86 to 89 are diagrams illustrating a position of each SPAD at a position included in G(x, y) according to the third working example of the ninth embodiment of the present technology. That is, 5×5 SPADs centered on a SPAD at position (x, y) are illustrated. These are basically the same drawing, which is illustrated as a plurality of figures in order to illustrate each region of a plurality of objects.

Figure 86:
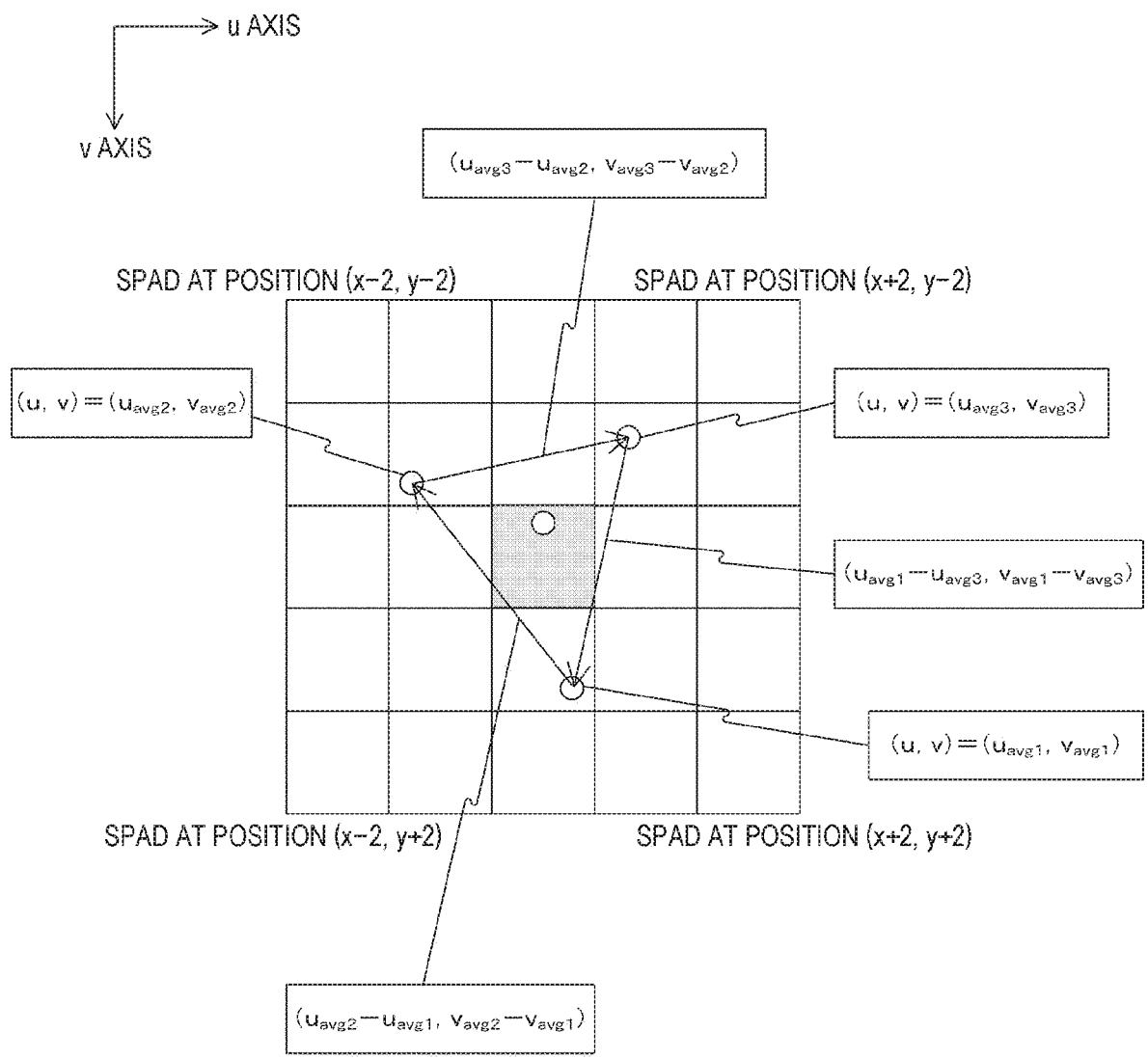
FIG. 86 is a diagram illustrating a position of each SPAD at a position included in G(x, y) according to a third working example of the ninth embodiment of the present technology.

In FIG. 86, a SPAD at position (x, y) is illustrated in gray. The center position of the SPAD at position (x, y) is u=x and v=y in a (u, v) coordinate system. Furthermore, positions (uavg1, vavg1), (uavg2, vavg2), and (uavg3, vavg3) represented by Expressions 144 to 147 are also illustrated. Position (uavg1, vavg1) can be considered as the center of gravity of a target object at distance Z(x, y, 1). Position (uavg2, vavg2) can be considered as the center of gravity of a target object at distance Z(x, y, 2). Position (uavg3, vavg3) can be considered as the center of gravity of a target object at distance Z(x, y, 3).

Figure 87:
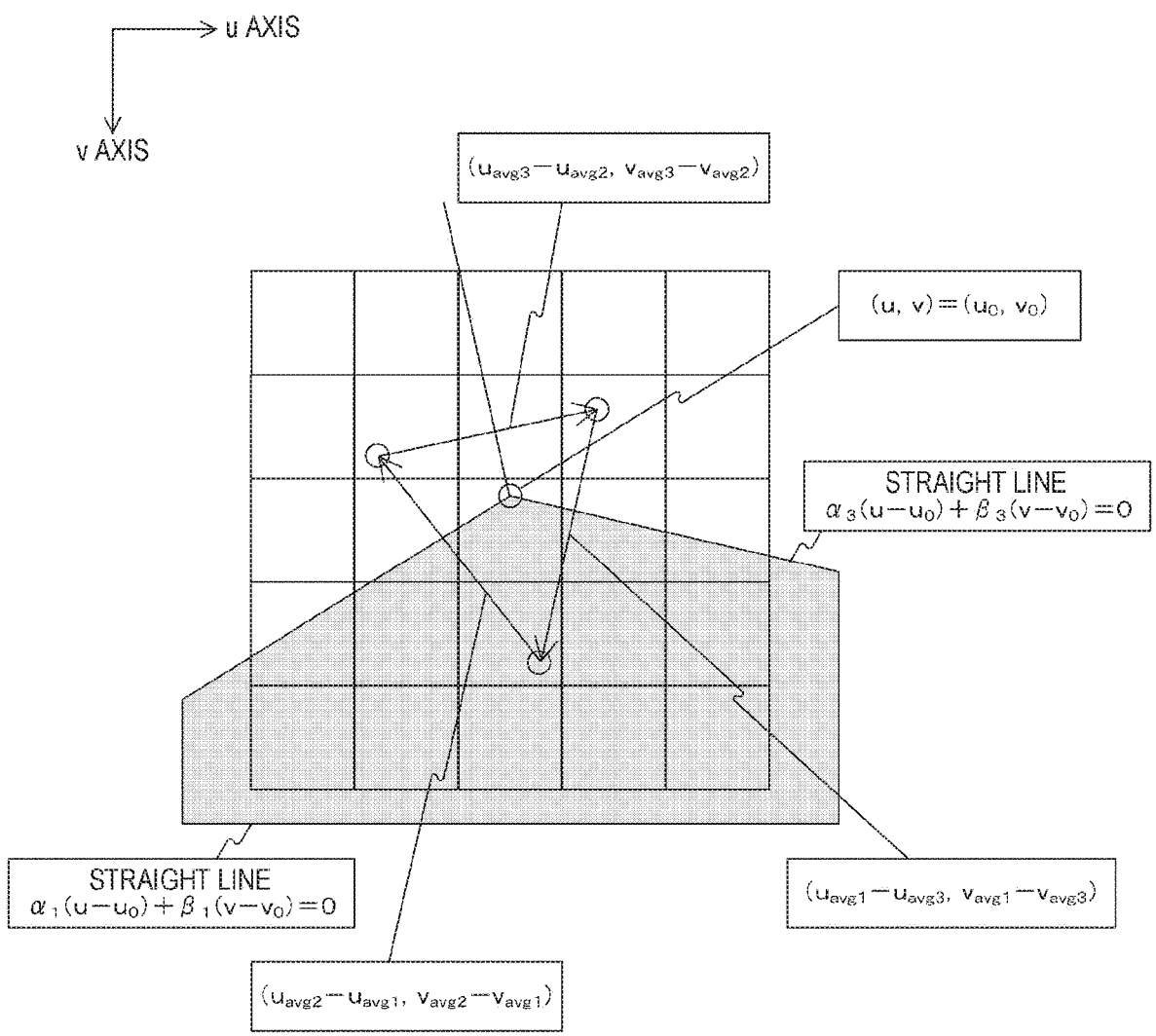
FIG. 87 is a diagram illustrating a position of each SPAD at a position included in G(x, y) according to the third working example of the ninth embodiment of the present technology.

In FIG. 87, B1(α1, μ1, u0, v0) ∩ "complementary set of B1(α3, β3, u0, v0)", which is the region of a first object, is illustrated in gray. It is an intersection of α1×(u−u0)+β1×(v−v0)≤0 and α3×(u−u0)+β3×(v−v0)>0.

Figure 88:
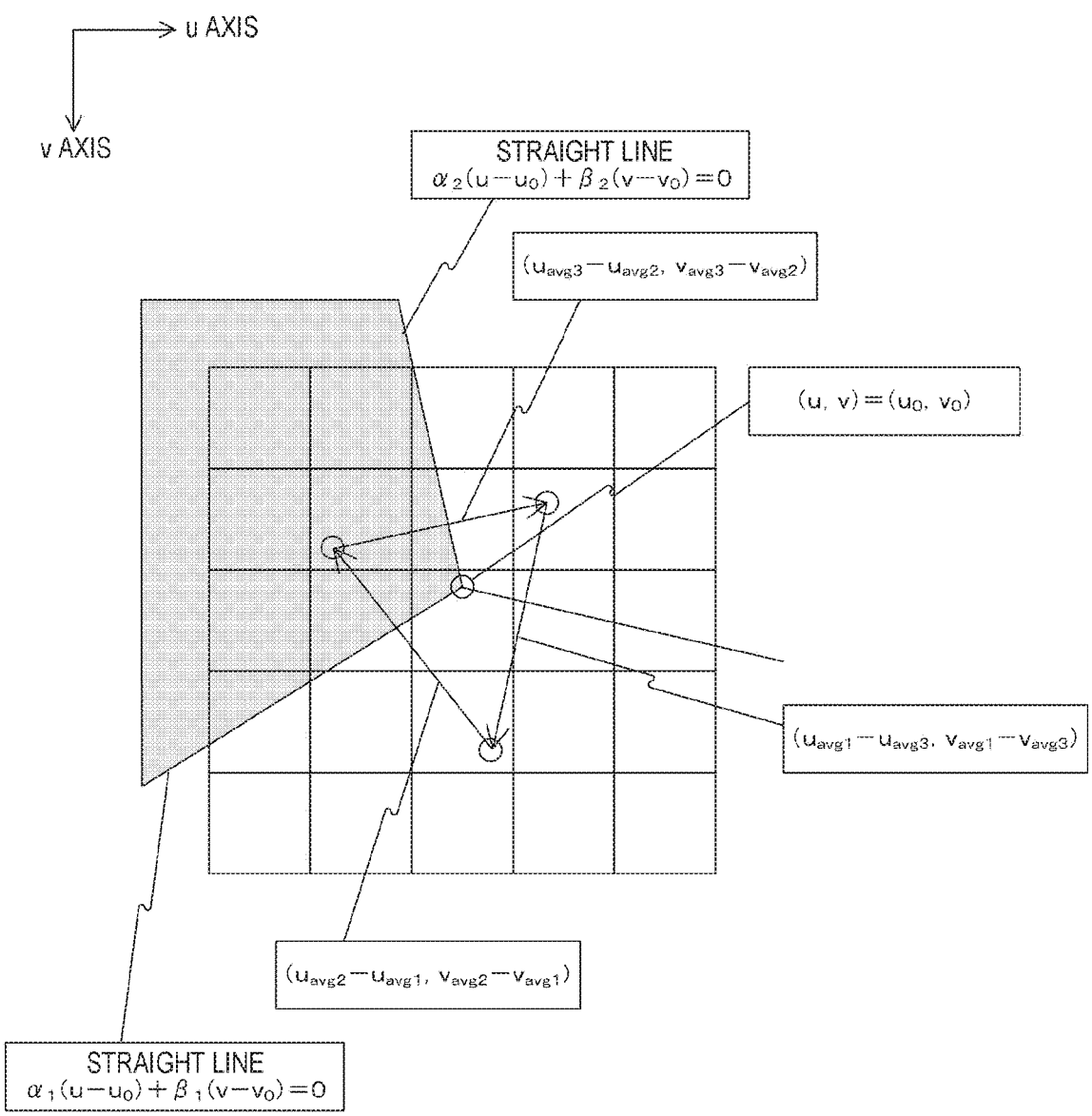
FIG. 88 is a diagram illustrating a position of each SPAD at a position included in G(x, y) according to the third working example of the ninth embodiment of the present technology.

In FIG. 88, B1(α2, β2, u0, v0) ∩ "complementary set of B1(α1, β1, u0, v0)", which is the region of a second object, is illustrated in gray. It is an intersection of α2×(u−u0)+β2×(v−v0)≤0 and α1×(u−u0)+β1×(v−v0)>0.

Figure 89:
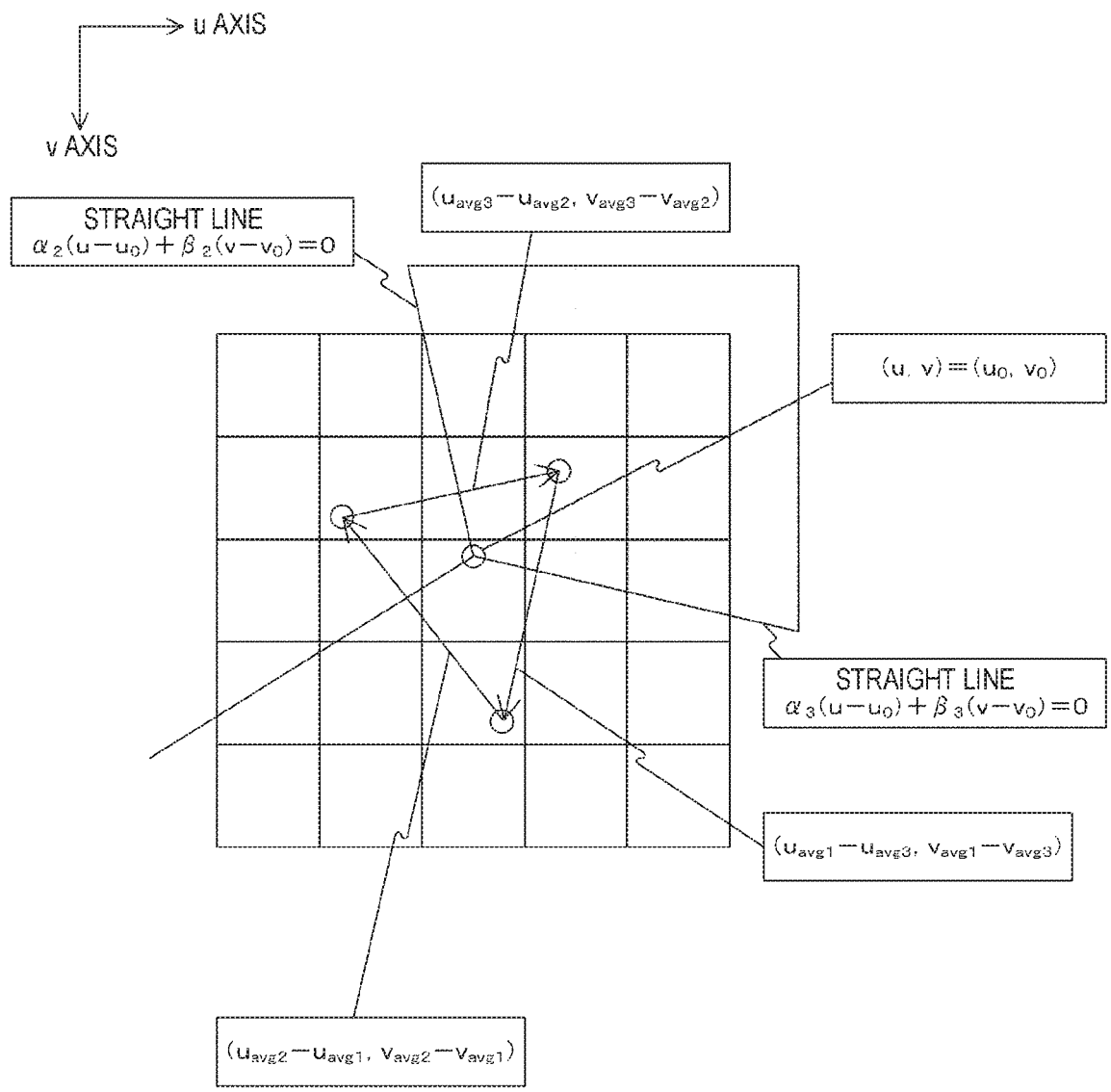
FIG. 89 is a diagram illustrating a position of each SPAD at a position included in G(x, y) according to the third working example of the ninth embodiment of the present technology.

In FIG. 89, B1(α3, β3, u0, v0) ∩ "complementary set of B1(α2, β2, u0, v0)", which is the region of a third object, is illustrated in gray. It is an intersection of α3×(u−u0)+133×(v−v0)≤0 and α2×(u−u0)+β2×(v−v0)>0.

Now, considering in a similar manner to the derivation of Expression 140 in the second working example, the following Expression 150 is derived.

[Math. 150]

$$\frac{S_{(x,y,1)}}{\sum_{(x_1,y_1,j) \in A_1(x,y,1)} S_{(x_1,y_1,j)}} :$$

$$\frac{S_{(x,y,2)}}{\sum_{(x_1,y_1,j) \in A_1(x,y,2)} S_{(x_1,y_1,j)}} : \frac{S_{(x,y,3)}}{\sum_{(x_1,y_1,j) \in A_1(x,y,3)} S_{(x_1,y_1,j)}} =$$

$$\frac{\iint_{(u,v) \in A(x,y) \cap B_1(\alpha_1,\beta_1,u_0,v_0) \cap B_1^c(\alpha_3,\beta_3,u_0,v_0)} \eta_{(u,v,x,y)} du\, dv}{\sum_{(x_1,y_1,j) \in A_1(x,y,1)} \left( \iint_{(u,v) \in A(x_1,y_1)} \eta_{(u,v,x_1,y_1)} du\, dv \right)} :$$

$$\frac{\iint_{(u,v) \in A(x,y) \cap B_1(\alpha_2,\beta_2,u_0,v_0) \cap B_1^0(\alpha_1,\beta_1,u_0,v_0)} \eta_{(u,v,x,y)} du\, dv}{\sum_{(x_1,y_1,j) \in A_1(x,y,2)} \left( \iint_{(u,v) \in A(x_1,y_1)} \eta_{(u,v,x_1,y_1)} du\, dv \right)} :$$

Expression 150

-continued $$\frac{\iint_{(u,v)\in A(x,y)\cap B_1(\alpha_3,\beta_3,u_0,v_0)\cap B_1^c(\alpha_3,\beta_2,u_0,v_0)} \eta_{(u,v,x,y)} du\, dv}{\sum_{(x_1,y_1,j)\in A_1(x,y,3)} \left( \iint_{(u,v)\in A(x_1,y_1)} \eta_{(u,v,x_1,y_1)} du\, dv \right)}$$

Summarizing the above, for the three objects in the region of the SPAD at position of interest (x, y), B1 (α1, β1, u0, v0) ∩ "complementary set of B1(α3, β3, u0, v0)", which is the region of the first object, B1(α2, β2, u0, v0) ∩ "complementary set of B1 (α1, β1, u0, v0)", which is the region of the second object, and B1(α3, β3, u0, v0) ∩ "complementary set of B1(α2, β2, u0, v0)", which is the region of the third object can be obtained as follows. That is, α1, β1, α2, β2, α3, and β3 can be obtained from Expressions 144 to 149. An expression obtained by substituting the previously obtained α1, β1, α2, β2, α3, and β3 into Expression 150 can be used to obtain u0 and v0.

Note that the following Expression 151 holds because the "region of the first object" to be finally obtained is only required to be obtained inside the region of the SPAD at position (x, y).

[Math. 151]

$$A_s(x,y)\cap B_1(\alpha_1,\beta_1,u_0v_0)\cap B_1^c(\alpha_3,\beta_3,u_0,v_0) \quad \text{Expression 151}$$

The following Expression 152 holds because the "region of the second object" is only required to be obtained inside the region of the SPAD at position (x, y).

[Math. 152]

$$A_s(x,y)\cap B_1(\alpha_2,\beta_2,u_0v_0)\cap B_1^c(\alpha_1,\beta_1,u_0,v_0) \quad \text{Expression 152}$$

The following Expression 153 holds because the "region of the third object" is only required to be obtained inside the region of the SPAD at position (x, y).

[Math. 153]

$$A_s(x,y)\cap B_1(\alpha_3,\beta_3,u_0v_0)\cap B_1^c(\alpha_2,\beta_2,u_0,v_0) \quad \text{Expression 153}$$

FIG. 90 is a flowchart illustrating an example of a processing procedure for obtaining a region of an object according to the third working example of the ninth embodiment of the present technology. This processing is performed by the computation unit 16.

First, in step S941, C(x, y) in SPADs at position (x, y) and its surrounding positions (for example, 5×5 positions) is input. Then, Z(x, y, i) and S(x, y, i) are also input. Here, i=1 to C(x, y). Then, the processing proceeds to step S942.

In step S942, Expressions 144 to 149 are calculated to determine α1, β1, α2, β2, α3, and β3. Then, the processing proceeds to step S943.

In step S943, an expression obtained by substituting α1, β1, α2, β2, α3, and β3 obtained in step S942 into Expression 150 is used to determine u0 and v0. Then, the processing proceeds to step S944.

In step S944, on the basis of α1, β1, α2, β2, α3, β3, u0, and v0 determined in steps S942 and S943, regions represented by Expressions 151 to 153 are output. Then, the series of processing ends.

In this way, the "region of the first object", the "region of the second object", and the "region of the third object" in the region of the SPAD at position (x, y) can be obtained.

[Summary]

First, features of the pre-processing will be described. A histogram of each SPAD surrounding a SPAD of interest is analyzed to check whether there is a plurality of peaks (step S914 in FIG. 81). In a case where all surrounding SPADs have a plurality of peaks (i.e., there is a plurality of objects at different distances in the range of distance measurement by each SPAD), it is determined that no edge exists (determined to be false in step S915 in FIG. 81, i.e., the state is as illustrated in FIG. 80, not FIG. 79). This makes it possible to determine whether an edge exists in the SPAD of interest.

Next, features of each working example of the present invention will be described. Occurrence rates are obtained from observed histograms. Peaks and peak areas of the occurrence rates are obtained. From a ratio between the peak areas, a rate of a projected area of an object at the corresponding distance in a region of a SPAD of interest is obtained (Expression 133, 140, or 150).

Furthermore, the center of gravity of an object at each distance including surrounding pixels is obtained, and a direction of a boundary (edge) between the objects is obtained from the positional relationship between the centers of gravity ("Expressions 129 and 130", "Expressions 135 to 137", or "Expressions 144 to 149").

Thus, the projected region of the object at each distance can be determined.

[Gist]

The gist of the ninth embodiment is as follows.

(1) A method of detecting a region of an object using histogram information, the method including:

a first input step of inputting a plurality of histograms;

a number-of-peaks detection step of counting the number of peaks for every one of the plurality of histograms;

a determination step of determining whether the number of the peaks is equal to or greater than 2 in all of the plurality of histograms; and an output step of outputting, in a case where a result of the determination step is true, information that no boundary of the region of the object exists.

(2) A method of detecting a region of an object using histogram information, the method including:

a second input step of inputting a plurality of histograms;

a first occurrence rate calculation step of obtaining, for every one of the plurality of histograms, an occurrence rate by dividing a bin in the histogram by a value obtained by subtracting a frequency of a young bin from the total number in the histogram;

a first peak detection step of obtaining peaks and peak areas of the occurrence rates; and an area calculation step of determining an area of the region of the object from a ratio between the peak areas.

(3) A method of detecting a region of an object using histogram information, the method including:

a third input step of inputting a plurality of histograms;

a second occurrence rate calculation step of obtaining, for every one of the plurality of histograms, an occurrence rate by dividing a bin in the histogram by a value obtained by subtracting a frequency of a young bin from the total number in the histogram;

a second peak detection step of obtaining peaks and peak areas of the occurrence rates;

a first center-of-gravity position calculation step of calculating, for each of bins corresponding to the peaks, with respect to a position of the histogram, a weighted average with weighting based on the peak area to obtain the center of gravity; and a first boundary direction calculation step of obtaining a direction of a boundary of the region of the object from a positional relationship between the centers of gravity.

(4) The method of detecting a region of an object using histogram information according to (2), the method further including:

a second center-of-gravity position calculation step of calculating, for each of bins corresponding to the peaks, with respect to a position of the histogram, a weighted average with weighting based on the peak area to obtain the center of gravity;

a second boundary direction calculation step of obtaining a direction of a boundary of the region of the object from a positional relationship between the centers of gravity; and a position determination step of determining a position of the region of the object from the "area of the region of the object" obtained in the area calculation step and the "direction of the boundary of the region of the object" obtained in the second boundary direction calculation step.

11. Tenth Embodiment

[Outline]

In a case where a plurality of peaks is detected in a histogram corresponding to one SPAD, a distance to an object can be calculated from each peak, but the positions of boundaries (edges) of these objects (i.e., regions of the corresponding objects) remain unknown. A tenth embodiment has been made in view of such circumstances to detect positions of edges (i.e., regions of the corresponding objects). More specifically, the tenth embodiment is aimed at increasing the resolution of distance data. Then, the distance data with a higher resolution obtained as a result of applying the tenth embodiment can be used to determine a detailed position of an edge.

[Histogram]

It is assumed that a SPAD is arranged at each position (x, y) in a SPAD array 13. Here, x=0 to X−1 and y=0 to Y−1. The number of SPADs is X×Y in total. In the above description, 1≤x≤X and 1≤y≤Y are set as pixel positions of SPADs. In this tenth embodiment, 0≤x≤X−1 and 0≤y≤Y−1 are set in order to coincide the relationships with the coordinate system (u, v). The number of histograms is X×Y in total, in a similar manner to other embodiments.

Note that a variable (x, y) indicates a position of each SPAD in the SPAD array 13, and takes an integer value. On the other hand, as described later, a variable (u, v) indicates a position in the SPAD array 13, and takes a real value. Moreover, as described later, a variable (α, β) indicates a pixel position in a high-resolution image obtained from a camera 100.

Furthermore, in the tenth embodiment, since the time direction is not considered, a histogram at position (x, y) is expressed as H(x, y, n). Here, x is an integer between 0 and X−1 inclusive, and y is an integer between 0 and Y−1 inclusive. Then, n represents a bin number, and is an integer between 0 and N−1 inclusive.

[Relationship Between Histogram and Occurrence Rate]

Since only one histogram is considered here, H(x, y, n) is simply expressed as h(n). Here, n=0 to N−1.

An occurrence rate is, in a similar manner to that in other embodiments, the number of times an event occurs per unit time.

Note that, to be precise, a "probability of arrival of a photon during a time (D) corresponding to a certain bin" is a value obtained by multiplying an occurrence rate by time D. However, constant multiplication (multiplication by D) is ignored here. Alternatively, time D may be considered as a unit time. Moreover, alternatively, in this embodiment, an occurrence rate may be considered to be defined as a value obtained by multiplying an "occurrence rate", which is a term generally widely used, by D.

Now, an occurrence rate p(n) in bin n is the probability that light (photon) arrives a SPAD during a period from time n×D to time (n+1)×D. The occurrence rate p(n) is irrelevant to whether light (photon) has arrived before time n×D.

On the other hand, each SPAD of a SPAD sensor 13 in a distance measuring device 10 detects the first piece of light (photon) to arrive, but does not detect the second and subsequent pieces of light (photons) to arrive. As a specific example, in a case where a first piece of light (photon) arrives at a time corresponding to bin 2, a second piece of light (photon) arrives at a time corresponding to bin 4, and then a third piece of light (photon) arrives at a time corresponding to bin 6, only h(2) is counted in the histogram, not h(4) or h(6).

In this way, there is a clear difference between the occurrence rate p(n) that is irrelevant to whether light (photon) has arrived before that point of time, and a frequency h(n) in which light (photon) that has arrived before that point of time is not counted. By taking this into consideration, a relationship between the occurrence rate p(n) and the frequency h(n) can be derived.

When the occurrence rate in bin 0 is expressed as p(0), the probability that the frequency of bin 0 becomes h(0) in M-time measurements is represented by the following Expression 154.

[Math. 154]

$$p_{(0)} = \frac{h_{(0)}}{M} \qquad \text{Expression 154}$$

This is because the probability is a probability that an event that occurs with a probability of p(0) occurs h(0) times out of M times.

The occurrence rate in bin 1 is expressed as p(1). The probability that the frequency of bin 1 becomes h(1) even though the event has occurred h(0) times in bin 0 in M-time measurements is represented by the following Expression 155.

[Math. 155]

$$p_{(1)} = \frac{h_{(1)}}{M - h_{(0)}} \qquad \text{Expression 155}$$

This is because the probability is a probability that an event that occurs with a probability of p(1) occurs h(1) times out of M−h(0) times.

The occurrence rate in bin 2 is expressed as p(2). The probability that the frequency of bin 2 becomes h(2) even though the event has occurred h(0) times in bin 0 and h(1) times in bin 1 in M-time measurements is represented by the following Expression 156.

[Math. 156]

$$p_{(2)} = \frac{h_{(2)}}{M - h_{(0)} - h_{(1)}} \qquad \text{Expression 156}$$

This is because the probability is a probability that an event that occurs with a probability of p(2) occurs h(2) times out of M−h(0)−h(1) times.

Similarly, the probability that the frequency of bin n becomes h(n) even though the event has occurred h(m) times in bin m in M-time measurements is represented by the following Expression 157. Here, m=0 to n−1.

[Math. 157]

$$p_{(n)} = \frac{h_{(n)}}{M_{(n-1)}}, \text{ where } M_{(n-1)} \equiv M - \sum_{j=0}^{n-1} h_{(j)}$$

Expression 157

As can be seen from these descriptions, when a histogram at each position (x, y) is observed and the histogram is expressed as H(x, y, n), an occurrence rate p(x, y, n) at position (x, y) is represented by the following Expression 158. Here, n=0 to N−1.

[Math. 158]

$$p_{(x,y,n)} = \frac{H_{(x,y,n)}}{M_{(x,y,n-1)}}, \text{ where } M_{(x,y,n-1)} \equiv M - \sum_{j=0}^{n-1} H_{(x,y,j)}$$

Expression 158

[Occurrence Rate]

Figure 91:
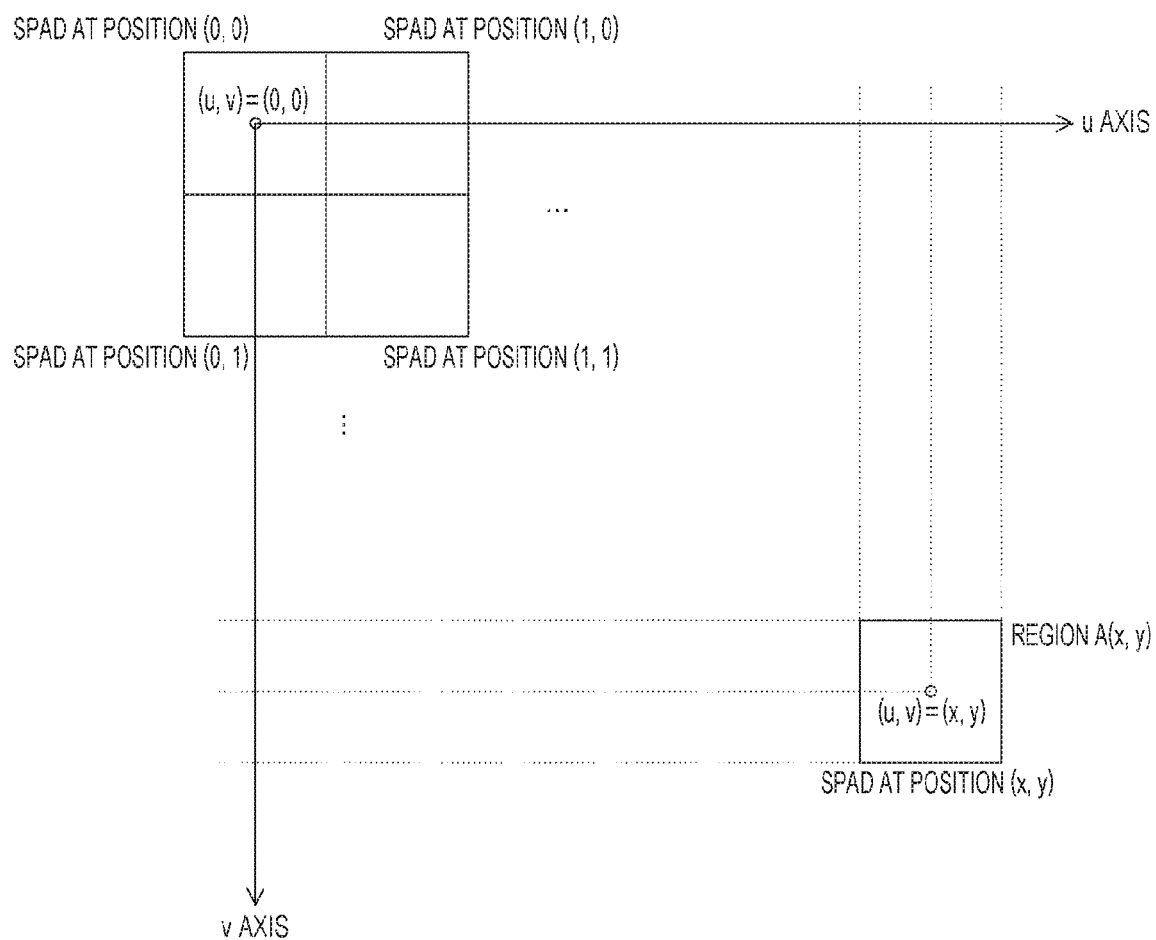
FIG. 91 is a diagram illustrating an example of a position of each SPAD in a (u, v) coordinate system according to a tenth embodiment of the present technology.

FIG. 91 is a diagram illustrating an example of a position of each SPAD in a (u, v) coordinate system according to the tenth embodiment of the present technology.

Here, each position in the SPAD array 13 is expressed as (u, v). u and v are each a real number. As illustrated in the drawing, the center position of a SPAD at x=0 and y=0 is on the origin (0, 0) of the (u, v) coordinate. A physical region of a SPAD at position (x, y) is A(x, y), which is represented by the following Expression 159.

[Math. 159]

$$A_s(x,y) \equiv \{(u,v) | x-1/2 \leq u \leq x+1/2, y-1/2 \leq v \leq y+1/2\}$$

Expression 159

Figure 92A:
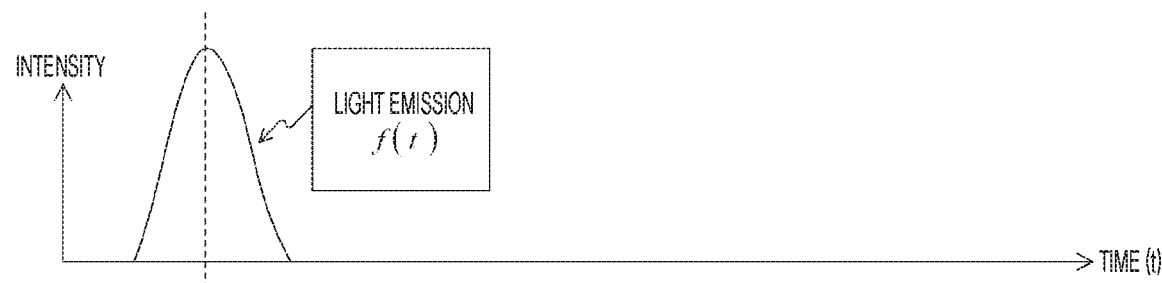
FIG. 92 is a diagram illustrating an intensity distribution in an example of distance measurement according to the tenth embodiment of the present technology.
Figure 92B:
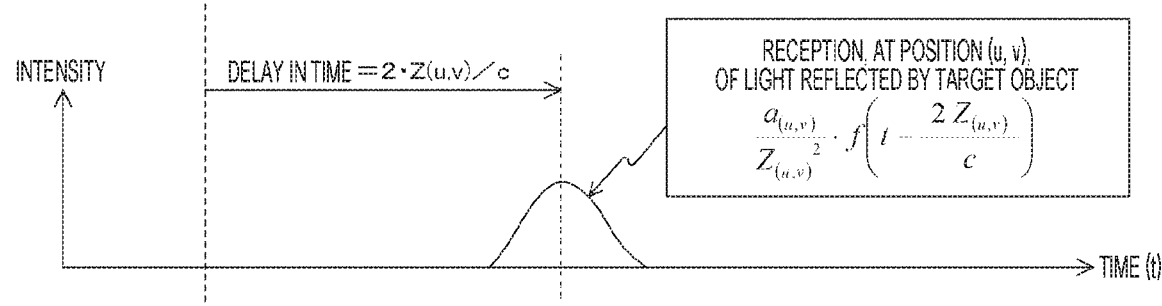
Figure 92C:
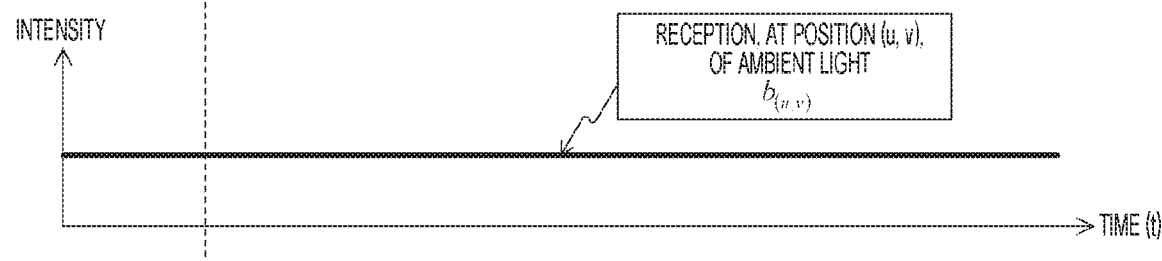

FIG. 92 is a diagram illustrating an intensity distribution in an example of distance measurement according to the tenth embodiment of the present technology.

An intensity of light emission (short-time light emission) from a light emitting unit 12 changes over time (t). The intensity is expressed as f(t). A in the drawing indicates a temporal change in intensity of light emitted from the light emitting unit 12.

Active light (light from the light emitting unit 12) is incident on each position (u, v) after being reflected by a target object. A distance to the target object is expressed as Z(u, v). The active light (light from the light emitting unit 12) incident on position (u, v) reaches with a delay of 2×Z(u, v)/c with respect to the light emission from the light emitting unit 12. Furthermore, light attenuates in proportion to the square of the distance. A reflectance of the target object is expressed as a(u, v). Taking into account the above, when light is emitted from the light emitting unit 12, the intensity of the light incident on position (u, v) is represented by the following Expression 160.

[Math. 160]

$$\frac{a_{(u,v)}}{Z_{(u,v)}^2} \cdot f\left(t - \frac{2Z_{(u,v)}}{c}\right)$$

Expression 160

B in the drawing illustrates a temporal change in intensity of the active light incident on position (u, v).

Furthermore, ambient light (for example, light from Sun 30 in FIG. 1) is also incident on each position (u, v). The incident light (photon) always arrives with a constant probability while a histogram is being created. This probability is expressed as b(u, v). C in the drawing illustrates a temporal change in intensity of the ambient light incident on position (u, v).

The intensity of light incident on position (u, v) is the total of B and C in the drawing, and is represented by the following Expression 161.

[Math. 161]

$$b_{(u,v)} + \frac{a_{(u,v)}}{Z_{(u,v)}^2} \cdot f\left(t - \frac{2Z_{(u,v)}}{c}\right)$$

Expression 161

Thus, the occurrence rate of bin n of a SPAD at position (x, y) is represented by the following Expression 162.

[Math. 162]

$$p_{(x,y,n)} = \iint_{(u,v) \in A(x,y)} \left\{ b_{(u,v)} + \frac{a_{(u,v)}}{Z_{(u,v)}^2} \cdot f\left(nD - \frac{2Z_{(u,v)}}{c}\right) \right\} \cdot D \, du \, dv$$

Expression 162

In this Expression 162, as compared with Expression 161, time t is replaced with n×D, which is the time of an n-th bin, multiplication by a time width D of the n-th bin is performed, and integration with respect to (u, v) in region A(x, y) of a SPAD indicated by position (x, y) is performed. Note that in the ninth embodiment, multiplication by a reaction rate η(u, v, x, y) is performed in derivation of Expression 123, which corresponds to Expression 162. In the tenth embodiment, a reaction rate η(u, v, x, y) is omitted because it is constant. Furthermore, in the above description of the derivation of Expression 123, a region where a SPAD reacts and a physical region of a SPAD are distinguished. In the description of this tenth embodiment, it is assumed that a region where a SPAD reacts and a physical region of a SPAD are the same and represented by Expression 159.

Now, a case is considered in which a SPAD at position (x, y) in the SPAD array 13 is performing distance measurement on C(x, y) objects at different distances. One SPAD does not perform distance measurement in one direction, but performs, in practice, distance measurement in the whole direction with a certain solid angle. This is a case where a plurality of objects at different distances is in the range of distance measurement.

Distances to the C(x, y) target objects are expressed as Z(x, y, i). Here, i=1 to C(x, y). That is, an arbitrary position (u, v) in region A(x, y) receives a reflection from a target object at distance Z(u, v), and Z(u, v) is any Z(x, y, i) (i=1 to C(x, y)).

Reflectances of the C(x, y) target objects are expressed as a(x, y, i). Here, i=1 to C(x, y). That is, an arbitrary position (u, v) in region A(x, y) receives a reflection from a target object with a reflectance a(u, v), and a(u, v) is any a(x, y, i) (i=1 to C(x, y)).

That is, in the expression of an "occurrence rate p(x, y, n) of bin n of a SPAD at position (x, y)" represented by Expression 162, Z(u, v) and a(u, v) take only C(x, y) values of Z(x, y, i) and C(x, y) values of a(x, y, i), respectively. Taking this into consideration, Expression 162 can be deformed into the following Expression 163.

[Math. 163]

$$p_{(x,y,n)} = \iint\limits_{(u,v)\in A(x,y)} (b_{(u,v)} \cdot D) \, du \, dv + \sum_{i=1}^{C_{(x,y)}} \left\{ \frac{a_{(x,y,i)}}{Z_{(x,y,i)}^2} \cdot \iint\limits_{(u,v)\in A(x,y)\cap B(i)} \left\{ f\left(nD - \frac{2Z_{(x,y,i)}}{c}\right) \cdot D \right\} du \, dv \right\}$$

Expression 163

Note that here, set B(i) (i=1 to C(x, y)) is a set of positions (u, v) where an i-th target object is projected. Furthermore, a first term on the right-hand side of Expression 163 is constant regardless of n.

Figure 93:
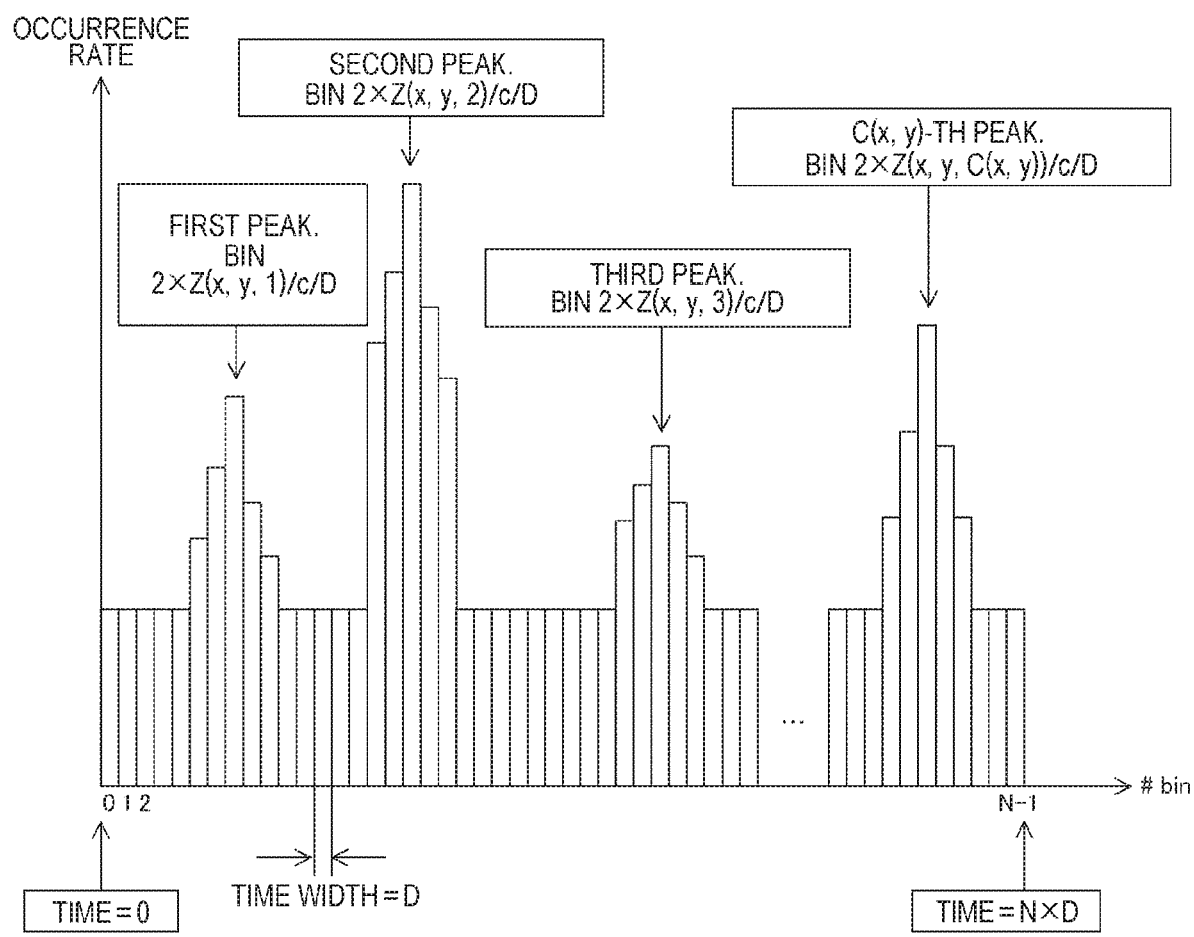
FIG. 93 is a diagram illustrating a distribution of occurrence rates in the example of distance measurement according to the tenth embodiment of the present technology.

FIG. 93 is a diagram illustrating a distribution of occurrence rates in the example of distance measurement according to the tenth embodiment of the present technology.

As illustrated in the drawing, an occurrence rate p(x, y, n) (n=0 to N−1) is expressed as a graph having C(x, y) peaks. The bins corresponding to the peaks are expressed as 2×Z(x, y, i)/c/D. Here, i=1 to C(x, y).

Figure 94:
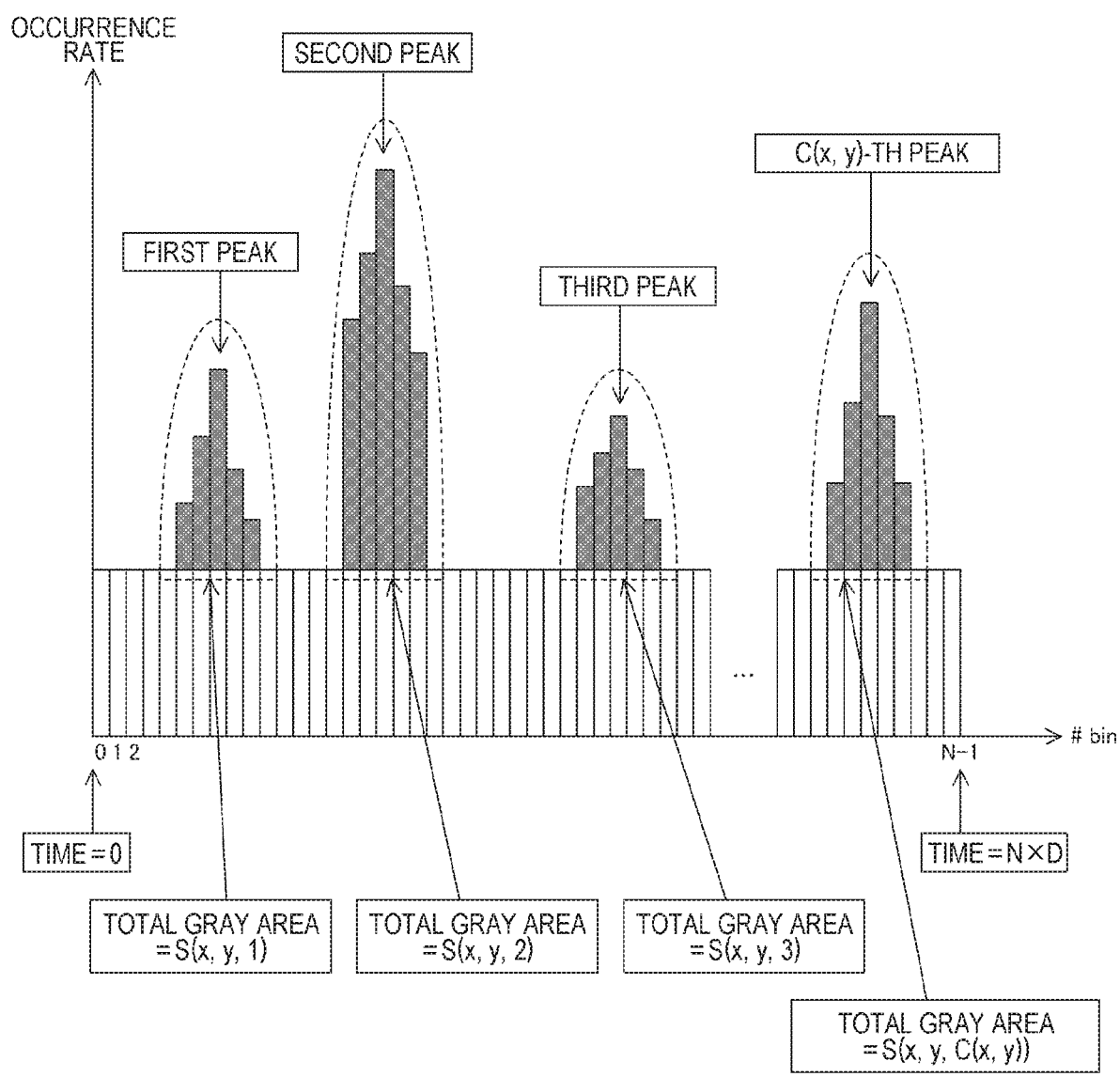
FIG. 94 is a diagram illustrating a distribution of occurrence rates in example of distance measurement according to the tenth embodiment of the present technology.

FIG. 94 is a diagram illustrating a distribution of occurrence rates in the example of distance measurement according to the tenth embodiment of the present technology.

In the drawing, an area of a portion enclosed by a dotted line indicates a peak area of each peak. The peak areas are expressed as S(x, y, i). Here, i=1 to C(x, y). Note that a "peak area" is a term generally used in the field of gas chromatographs and liquid chromatographs, and is used in the same meaning in this embodiment.

As can be seen from the above-described Expression 163, peak area S(x, y, i) satisfies the following Expression 164.

[Math. 164]

$$S_{(x,y,i)} = \sum_{n=0}^{N-1} \left\{ \frac{a_{(x,y,i)}}{Z_{(x,y,i)}^2} \cdot \iint\limits_{(u,v)\in A(x,y)\cap B(i)} \left\{ f\left(nD - \frac{2Z_{(x,y,i)}}{c}\right) \cdot D \right\} du \, dv \right\} \propto$$

$$\mu(A(x, y) \cap B(i))$$

Expression 164

Note that p(A(x, y)∩B(i)) in Expression 164 means the area of A(x, y)∩B(i), which is a region on a two-dimensional plane.

The above is summarized as follows. The distance measuring device 10 is used to obtain an occurrence rate p(x, y, n) by Expression 158 from a histogram H(x, y, n), which is an observation value obtained from each SPAD in the SPAD array 13. A peak of the occurrence rate p(x, y, n) in the range of n=0 to N−1 is detected. The number of peaks is expressed as C(x, y). It can be seen that a SPAD at position (x, y) in the SPAD array 13 has been performing distance measurement on C(x, y) objects at different distances. Then, when the peak area of each peak is expressed as S(x, y, i), there is a relationship represented by Expression 164. That is, S(x, y, i) is proportional to the area of A(x, y)∩B(i).

Note that there are known methods of detecting a peak and obtaining a peak area, and those methods may be applied. That is, for example, there is a general processing method performed on chromatogram data acquired by a gas chromatograph, a liquid chromatograph, or the like. Specific methods include methods disclosed in, for example, Japanese Patent Application Laid-Open No. 2014-211393 and Japanese Patent Application Laid-Open No. 6-230001, and these methods can be used to detect a peak and obtain a peak area.

Figure 95:
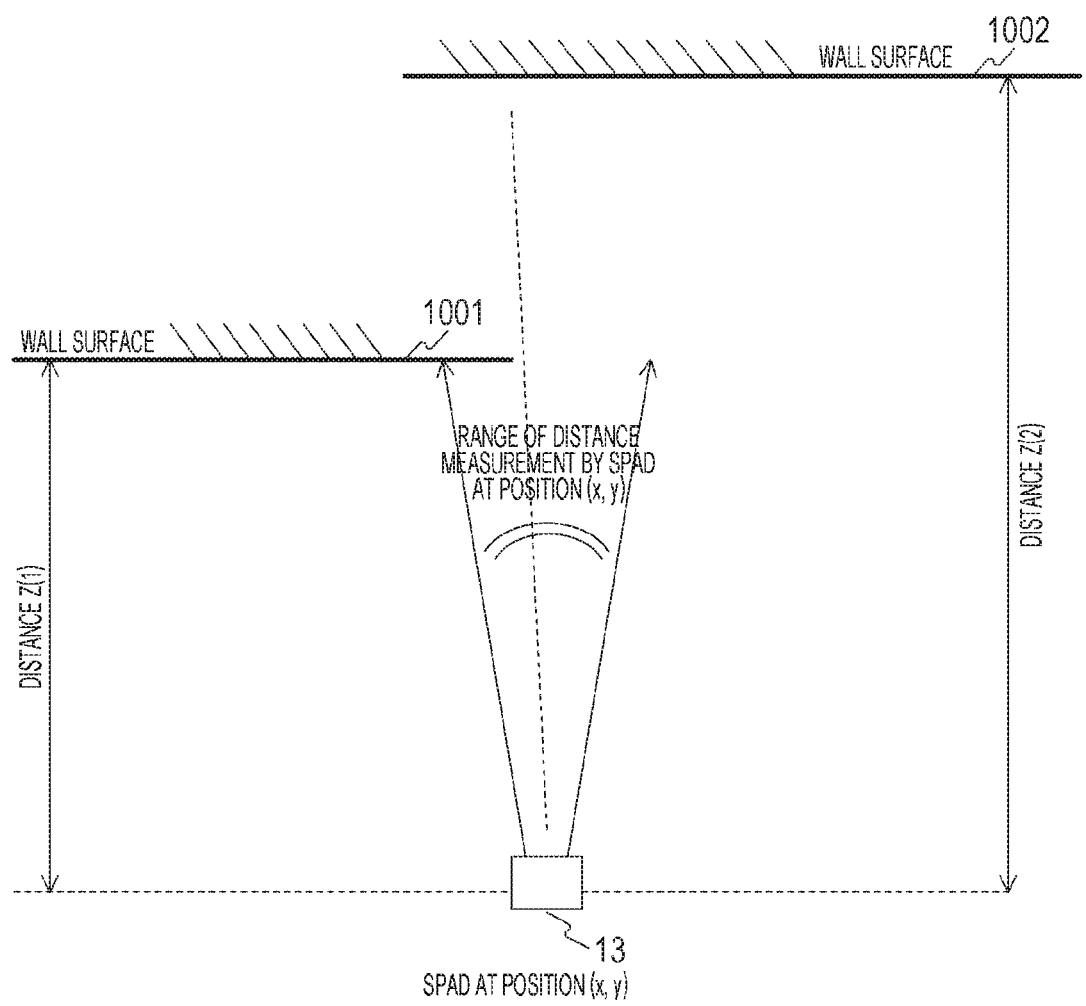
FIG. 95 is a diagram illustrating an example of a scene of distance measurement according to the tenth embodiment of the present technology.

FIG. 95 is a diagram illustrating an example of a scene of distance measurement according to the tenth embodiment of the present technology.

The drawing illustrates an example of a situation where C(x, y)=2 is satisfied. That is, the drawing illustrates a case where a SPAD at position (x, y) is performing distance measurement on two objects at different distances. Distance measurement is performed on two target objects: a wall surface 1001 at distance Z(1) and a wall surface 1002 at distance Z(2). In this case, from a histogram H(x, y, n), which is an observation value obtained from the SPAD at position (x, y), an occurrence rate p(x, y, n) is obtained by Expression 158, and then peaks in the occurrence rate p(x, y, n) are obtained. Thus, two bins 2×Z(1)/c/D and 2×Z(2)/c/D are obtained.

[Captured Image]

In the tenth embodiment, the camera 100 attached to the distance measuring device 10 is used (see FIG. 1). Here, the camera 100 is a device capable of capturing an image, and captures the image in the same direction as a direction of measurement by the SPAD array 13 of the distance measuring device 10. In this embodiment, a description will be given assuming that the camera 100 is a color camera, that is, each pixel in a captured image has an RGB value. Hereinafter, it is referred to as a color image.

Furthermore, the camera 100 is a high-resolution camera. That is, the number of color image pixels is (Q×X) in a horizontal direction and (Q×Y) in a vertical direction. Here, as already described, X is the number of SPADs in the horizontal direction in the SPAD array 13, and Y is the number of SPADs in the vertical direction. Q is a value exceeding 1, for example, Q=2, 4, 6, or 8. Each SPAD in the SPAD array 13 corresponds to Q×Q color image pixels.

A "position of a pixel in a captured image (color image) by the camera 100" corresponding to an "object being measured by a SPAD at each position (x, y) in the SPAD array 13" is expressed as (α(x, y, q), β(x, y, q)). Here, q=1 to Q×Q is satisfied.

In other words, a "color image pixel" that is imaging in a direction included in a solid angle, which is a "range of distance measurement where a SPAD at each position (x, y) in the SPAD array 13 is imaging", is a pixel positioned at (α(x, y, q), β(x, y, q)). Here, q=1 to Q×Q is satisfied.

Figure 96:
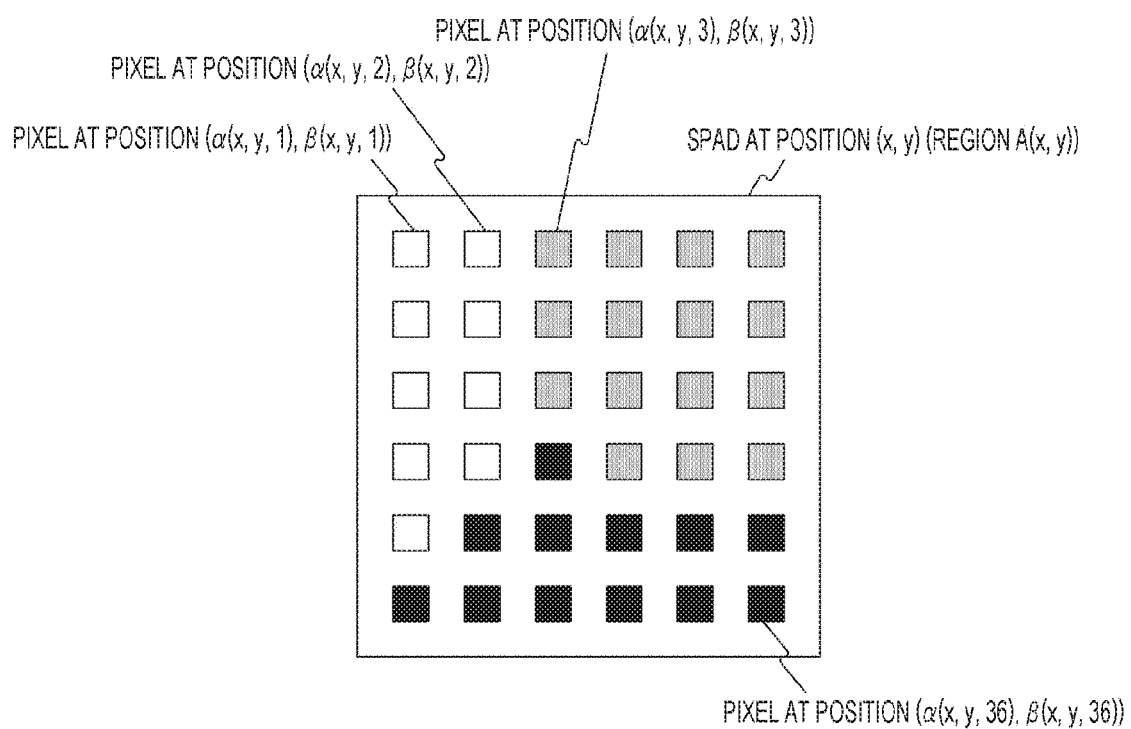
FIG. 96 is a diagram illustrating an example of a positional relationship between a SPAD and color image pixels according to the tenth embodiment of the present technology.
Figure 97:
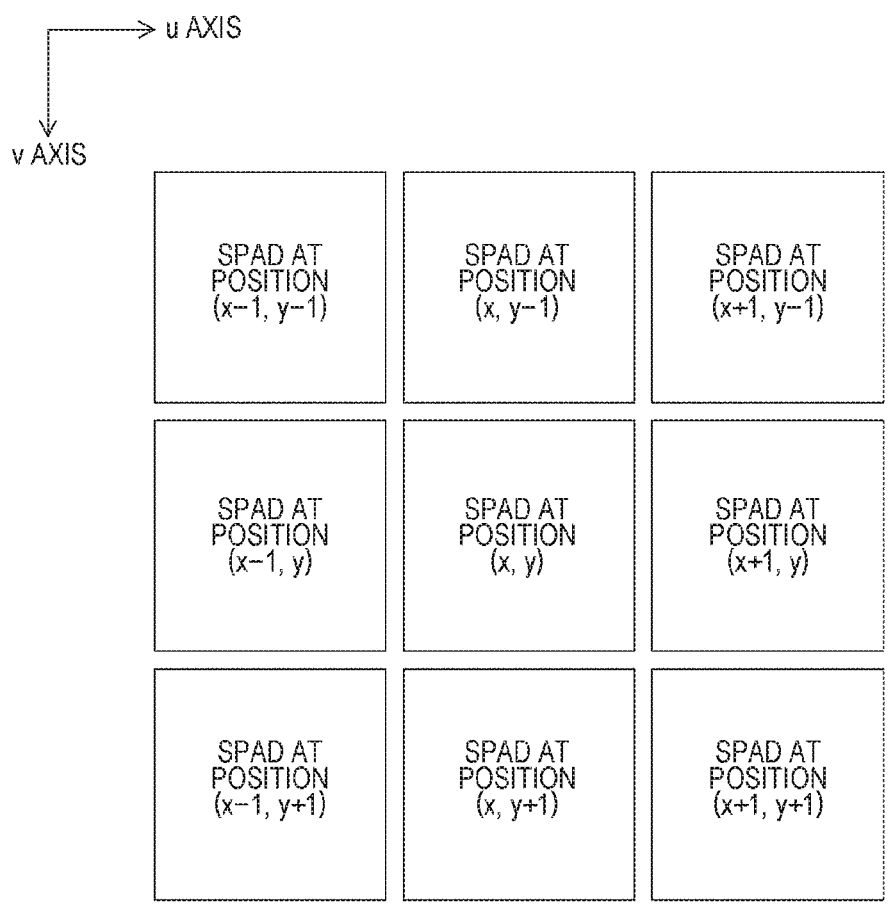
FIG. 97 is a diagram illustrating an example of a positional relationship between SPADs and color image pixels according to a first working example of the tenth embodiment of the present technology.

FIG. 96 is a diagram illustrating an example of a positional relationship between a SPAD and color image pixels according to the tenth embodiment of the present technology.

The drawing illustrates an example in which Q=6 is satisfied. An outer large rectangle indicates a SPAD at position (x, y) in the SPAD array 13. That is, the inside of this rectangular region is A(x, y). The inside of this region corresponds to Q×Q "color image pixels". That is, as illustrated in the drawing, the inside of this region corresponds to color image pixels positioned at (α(x, y, q), β(x, y, q)) (q=1 to Q×Q). Note that in the drawing, 36 small rectangles are each a "color image pixel". Furthermore, the difference in color of the small rectangles will be described later.

Conventionally, the SPAD array 13 having X×Y SPADs has produced X×Y distance measurement results (distance data). That is, the resolution has been X×Y. By applying this embodiment, distance data having the same number of pixels as the number of color image pixels can be obtained. That is, it is possible to increase the resolution by a factor of Q×Q. The ultimate goal of this embodiment is to determine distance data for each pixel position of a color image.

In the following description, it is assumed that positions ($\alpha 1$, $\beta 1$) and ($\alpha 2$, $\beta 2$) of two pixels of a color image are in proximity to each other. In a case where the RGB value at the pixel position ($\alpha 1$, $\beta 1$) and the RGB value at the pixel position ($\alpha 2$, $\beta 2$) are substantially the same, it can be said that these pixels are measuring the same object. Thus, it can be said that pieces of distance data corresponding to these two positions are the same.

On the other hand, in a case where the RGB value at the pixel position ($\alpha 1$, $\beta 1$) and the RGB value at the pixel position ($\alpha 2$, $\beta 2$) are completely different, it can be said that these pixels are measuring different objects. Thus, pieces of distance data corresponding to these two positions cannot be said to be the same.

This will be described with reference to FIG. 96. The drawing is an explanatory diagram illustrating a case where C(x, y)=3. That is, this is a case where three objects at different distances are projected on region A(x, y) of the SPAD at position (x, y). Consideration is given to dividing Q×Q=36 positions ($\alpha(x, y, q)$, $\beta(x, y, q)$) (q=1 to Q×Q) into three groups (region division), each group including those having similar RGB values. A case is assumed in which, as a result of division into three groups, a group of small white rectangles in the drawing, a group of small gray rectangles, and a group of small black rectangles are obtained. It is reasonable to consider that the positions of the small rectangles belonging to each group indicate projection of objects at the same distance. Thus, the positions indicated by the white rectangles among ($\alpha(x, y, q)$, $\beta(x, y, q)$) (q=1 to Q×Q) are distance Z(x, y, 1), Z(x, y, 2), or Z(x, y, 3). The positions indicated by the gray rectangles are distance Z (x, y, 1), Z (x, y, 2), or Z (x, y, 3).

The positions indicated by the black rectangles are distance Z(x, y, 1), Z(x, y, 2), or Z(x, y, 3). These are exclusive.

[Input Data]

Data to be input in the working example described later includes C(x, y) at each position (x, y). Then, Z(x, y, i) and S(x, y, i) are also included. Here, i=1 to C(x, y).

These values can be calculated as described below. The distance measuring device 10 is used to obtain an occurrence rate p(x, y, n) by Expression 158 from a histogram H(x, y, n), which is an observation value obtained from each SPAD in the SPAD array 13. A peak of the occurrence rate p(x, y, n) in the range of n=0 to N−1 is detected. The number of peaks is expressed as C(x, y). A value (i.e., a distance) obtained by multiplying a value of a bin at a peak position by c×D/2 is expressed as Z(x, y, i). Furthermore, a peak area of each peak is expressed as S(x, y, i). In this way, C(x, y) at each position (x, y), and Z(x, y, i) and S(x, y, i) can be obtained. These pieces of calculation processing are performed by a computation unit 16 before the processing of the working example is performed.

Working Example

In this working example, C(x, y) at each position (x, y) is input. Furthermore, Z(x, y, i) and S(x, y, i) are also input. Here, x=0 to X−1, y=0 to Y−1, and i=1 to C(x, y) are satisfied. Moreover, each pixel value (RGB value) of a color image having (Q×X)×(Q×Y) pixels is also input.

By applying this working example, distance data at each pixel position of a color image can be obtained. That is, the ultimate goal of this embodiment is to assign distance data to Q×Q pixel positions ($\alpha(x, y, q)$, $\beta(x, y, q)$) (q=1 to Q×Q) of a color image that correspond to each position (x, y).

First, a set of positions of SPADs surrounding position of interest (x, y) (for example, 3×3 SPADs centered on position of interest (x, y)) is expressed as G(x, y). That is, G(x, y) includes nine positions such as position (x−1, y−1), position (x−1, y), position (x−1, y+1), and position (x+1, y+1). Position (x, y) is also included in G(x, y). For a SPAD at position (x1, y1) in the surroundings G(x, y), one that is equal to distance Z(x, y, i) to an i-th object, which is an object of interest at position of interest (x, y), is chosen. That is, a set A0(x, y, i) represented by the following Expression 165 is determined.

[Math. 165]

$$A_0(x,y,i) \equiv \{(x_1,y_1,j) | Z_{(x,y,i)} - \delta \leq Z_{(x_1,y_1,j)} \leq Z_{(x,y,i)} + \delta, (x_1,y_1) \in G_{(x,y)}\}$$

Expression 165

Here, i=1 to C(x, y). Note that, taking into consideration an error, in a case where "Z(x, y, i)−Z(x1, y1, j)≤Z(x, y, i)+δ" is satisfied, it is assumed that the distance is "equal to distance Z(x, y, i) to the i-th object, which is the object of interest". Here, δ is an assumed error amount, and is a desired small constant.

For each element in the set A0(x, y, i), a weighted average (center-of-gravity position in a (u, v) coordinate system) represented by the following Expression 166 is obtained.

[Math. 166]

Expression 166

$$(u_{avg(i)}, v_{avg(i)}) \equiv \left( \frac{\sum_{(x_1,y_1,j) \in A_0(x,y,i)} x_1 \cdot S_{(x_1,y_1,j)}}{\sum_{(x_1,y_1,j) \in A_0(x,y,i)} S_{(x_1,y_1,j)}}, \frac{\sum_{(x_1,y_1,j) \in A_0(x,y,i)} y_1 \cdot S_{(x_1,y_1,j)}}{\sum_{(x_1,y_1,j) \in A_0(x,y,i)} S_{(x_1,y_1,j)}} \right)$$

Position (uavg(i), vavg(i)) represented by Expression 166 will be described. Expression 166 represents a weighted average position of position (x, y) of a SPAD that is performing distance measurement on a target object at a distance "equal to distance Z(x, y, i) to the i-th object, which is the object of interest" in the surroundings G(x, y). At this time, a peak area is adopted as weighting.

In a case where the value of peak area S(x1, y1, j) is large, a target object at distance Z(x, y, i) is projected on a large scale on a SPAD at position (x1, y1) (the target object at distance Z(x, y, i) is projected on most of the range of distance measurement by the SPAD at position (x1, y1)).

In a case where the value of peak area S(x1, y1, j) is small, the target object at distance Z(x, y, i) is projected on a small scale on the SPAD at position (x1, y1). (The target object at distance Z(x, y, i) is not projected on most of the range of distance measurement by the SPAD at position (x1, y1).)

Thus, position (uavg(i), vavg(i)) can be considered as the center of gravity of the target object at distance Z(x, y, i). Since this matter is important, it is explicitly described as "Property 1".

Property 1: Position (uavg(i), vavg(i)) is the center of gravity of the target object at distance Z(x, y, i).

FIGS. 97 to 104 are diagrams illustrating an example of a positional relationship between SPADs and color image pixels according to the working example of the tenth embodiment of the present technology. In the following description, a case where C(x, y)=3 and Q=6 are satisfied will be described as a specific example.

Here, SPADs at positions included in G(x, y) are illustrated. That is, 3×3 SPADs centered on a SPAD at position (x, y) are illustrated. In particular, FIG. 97 clearly illustrates a position of each SPAD.

Figure 98:
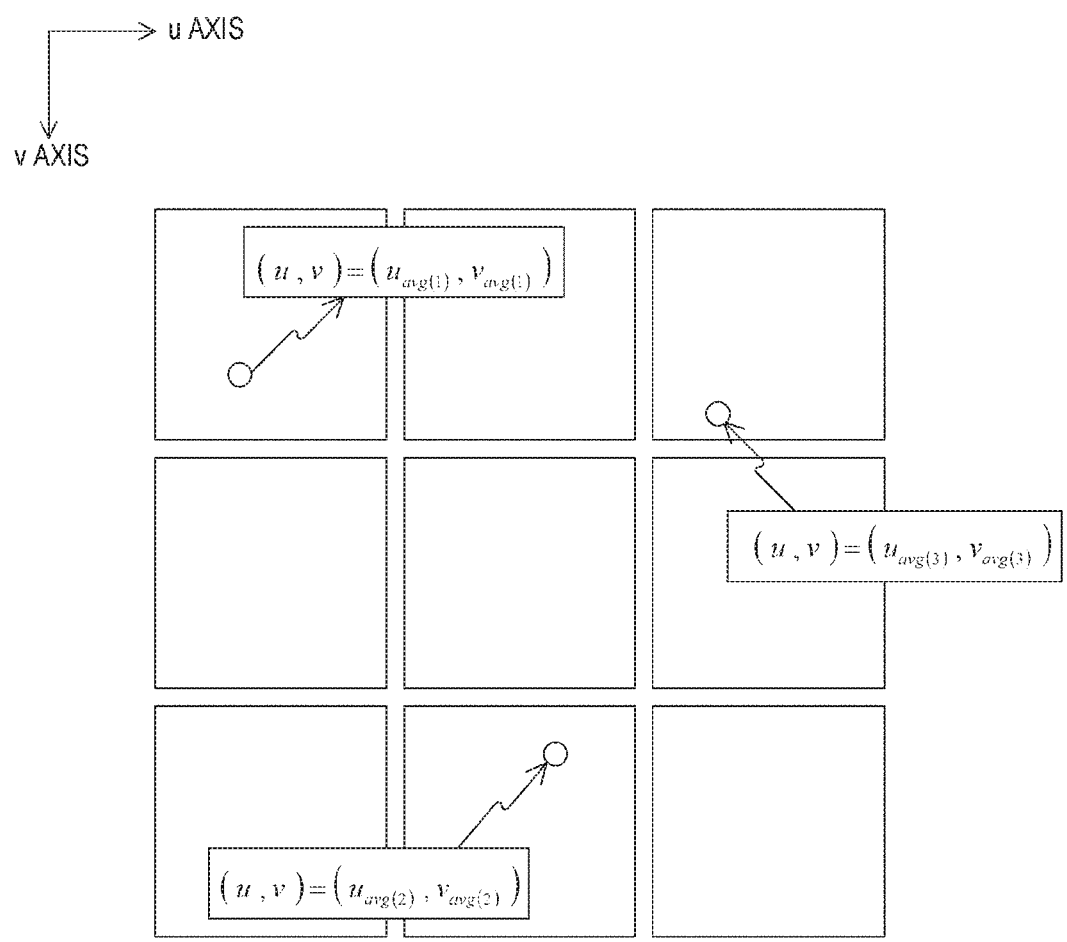
FIG. 98 is a diagram illustrating the example of the positional relationship between the SPADs and the color image pixels according to the first working example of the tenth embodiment of the present technology.

FIG. 98 illustrates position (uavg(i), vavg(i)) calculated by Expression 166. Here, i=1 to C(x, y).

Figure 99:
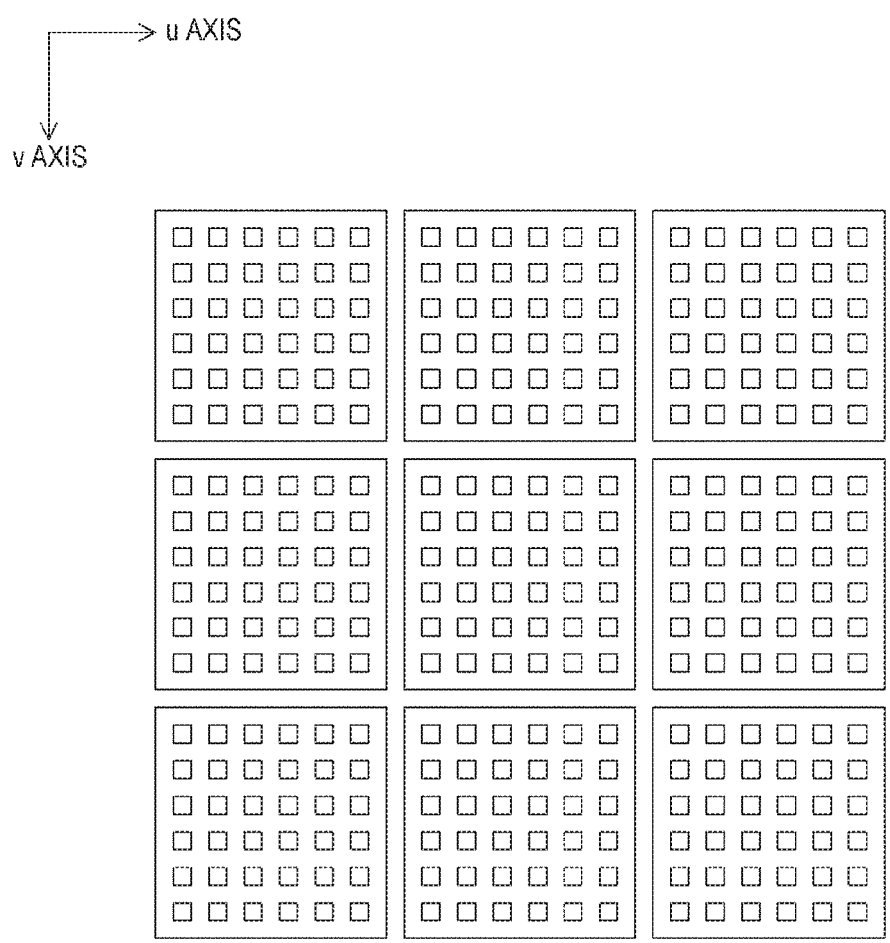
FIG. 99 is a diagram illustrating the example of the positional relationship between the SPADs and the color image pixels according to the first working example of the tenth embodiment of the present technology.

FIG. 99 illustrates each pixel position of a color image. In each region of the nine SPADs included in G(x, y), Q×Q small rectangles are illustrated. Every one of these small rectangles is a color image pixel position.

Figure 100:
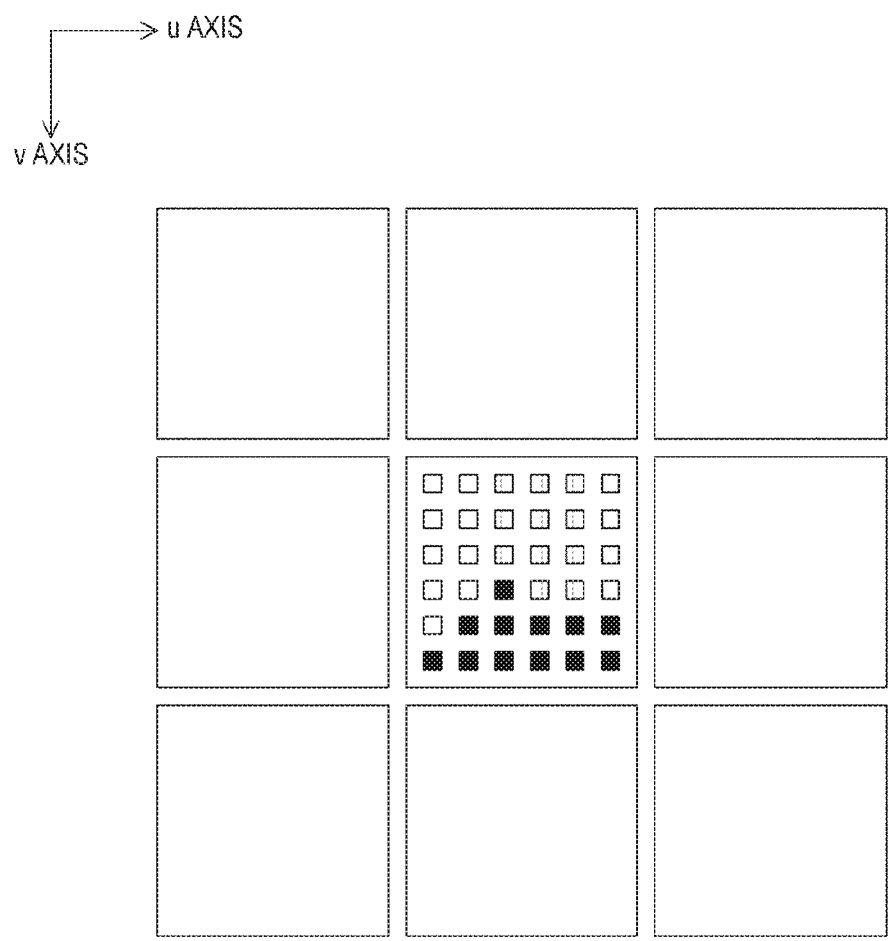
FIG. 100 is a diagram illustrating the example of the positional relationship between the SPADs and the color image pixels according to the first working example of the tenth embodiment of the present technology.
Figure 101:
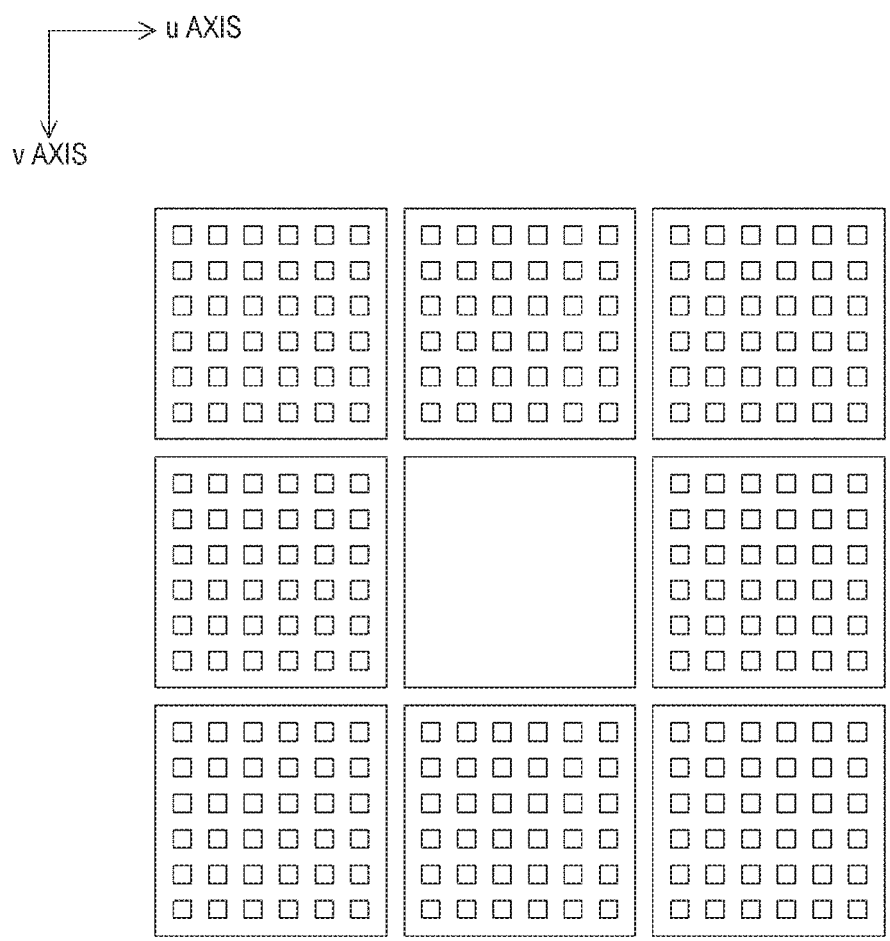
FIG. 101 is a diagram illustrating the example of the positional relationship between the SPADs and the color image pixels according to the first working example of the tenth embodiment of the present technology.

Q×Q pixel positions included in a SPAD at position of interest (x, y) (the SPAD at the center in the drawing) are divided into C(x, y) groups (region division), each group including those having similar RGB values. In FIG. 100, white rectangles, gray rectangles, and black rectangles indicate a result of this division into three groups. This division into groups is performed in a similar manner to that described with reference to FIG. 96.

An average value of RGB values in the white rectangles illustrated in FIG. 100 is expressed as RGB(1). Furthermore, an average value of RGB values in the gray rectangles is expressed as RGB(2). Furthermore, an average value of RGB values in the black rectangles is expressed as RGB(3).

Figure 102:
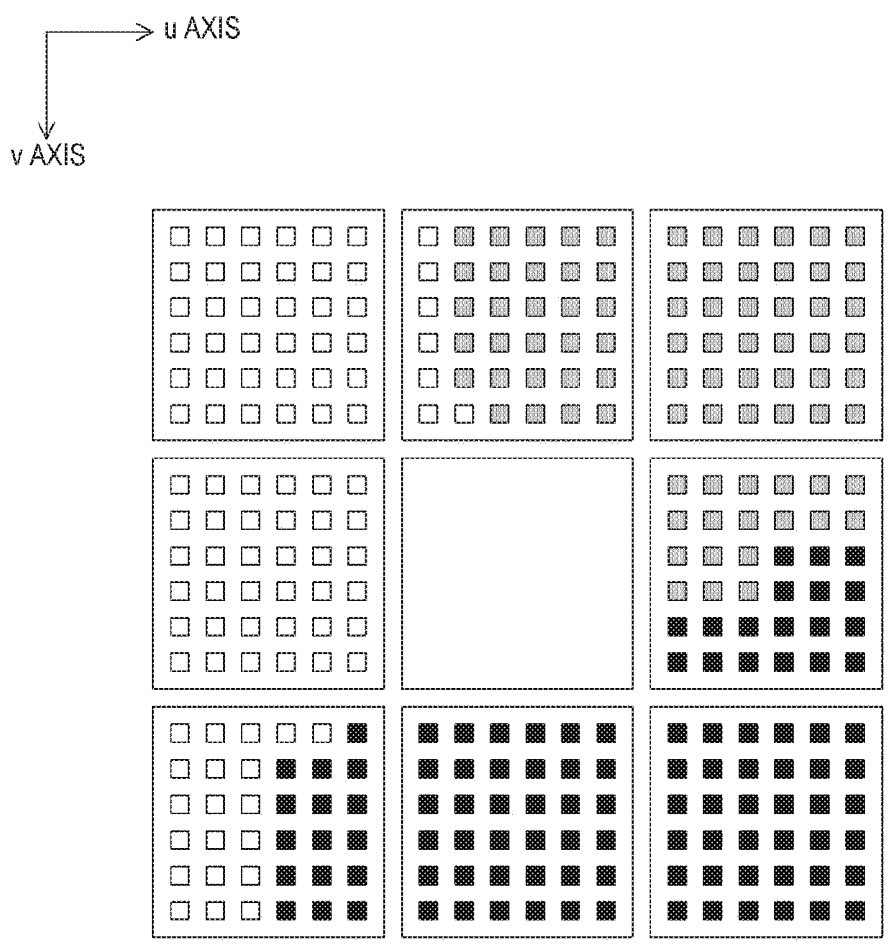
FIG. 102 is a diagram illustrating the example of the positional relationship between the SPADs and the color image pixels according to the first working example of the tenth embodiment of the present technology.

After the above-described "division into C(x, y) groups for the SPAD at position (x, y)", division of pixel positions into groups is performed for other SPADs at the remaining positions. That is, which group to belong is determined for every one of the small rectangles illustrated in FIG. 101. For each of the positions of the "small rectangles", a determination is made on which RGB(i) (i=1 to C(x, y)) the RGB value is closest to. In a case where the result indicates that the RGB value is closest to RGB(1), the rectangle belongs to the same group as white rectangles. Furthermore, in a case where the RGB value is closest to RGB(2), the rectangle belongs to the same group as gray rectangles. Furthermore, in a case where the RGB value is closest to RGB(3), the rectangle belongs to the same group as black rectangles. The results are, for example, as illustrated in FIG. 102.

Figure 103:
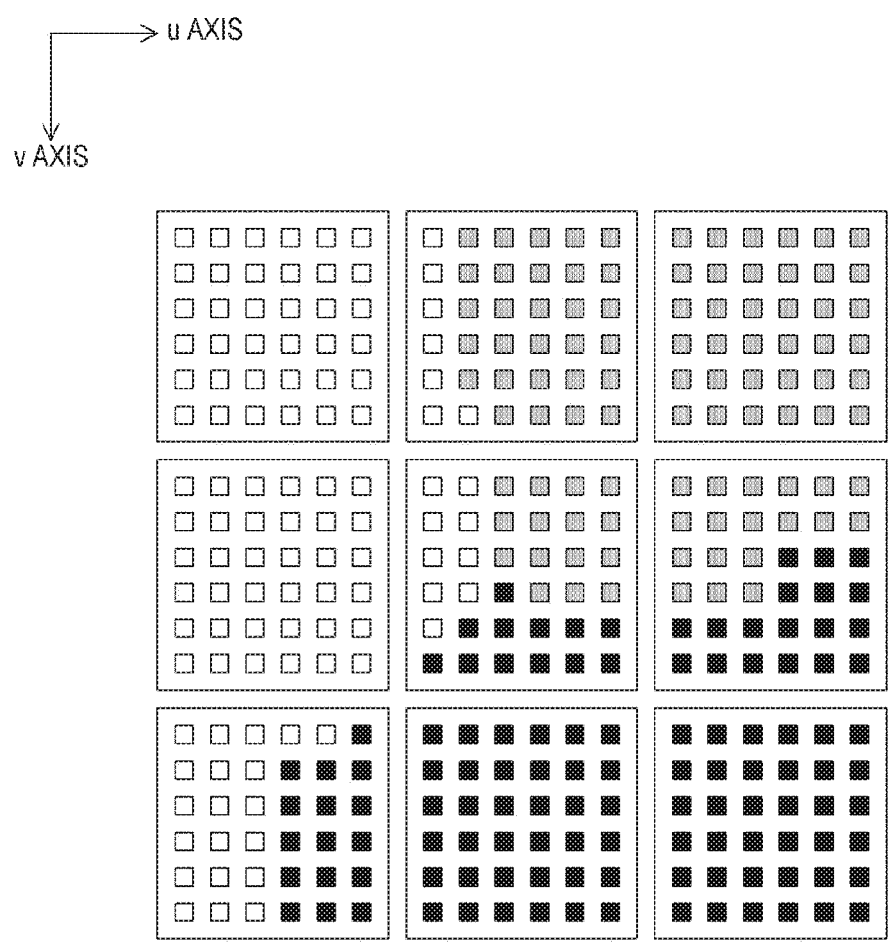
FIG. 103 is a diagram illustrating the example of the positional relationship between the SPADs and the color image pixels according to the first working example of the tenth embodiment of the present technology.

As a result, which group to belong is determined for every small rectangle (color image pixel position) in the regions of the nine SPADs included in G(x, y). The results are, for example, as illustrated in FIG. 103. FIG. 103 is a diagram in which FIGS. 100 and 102 are combined.

Figure 104:
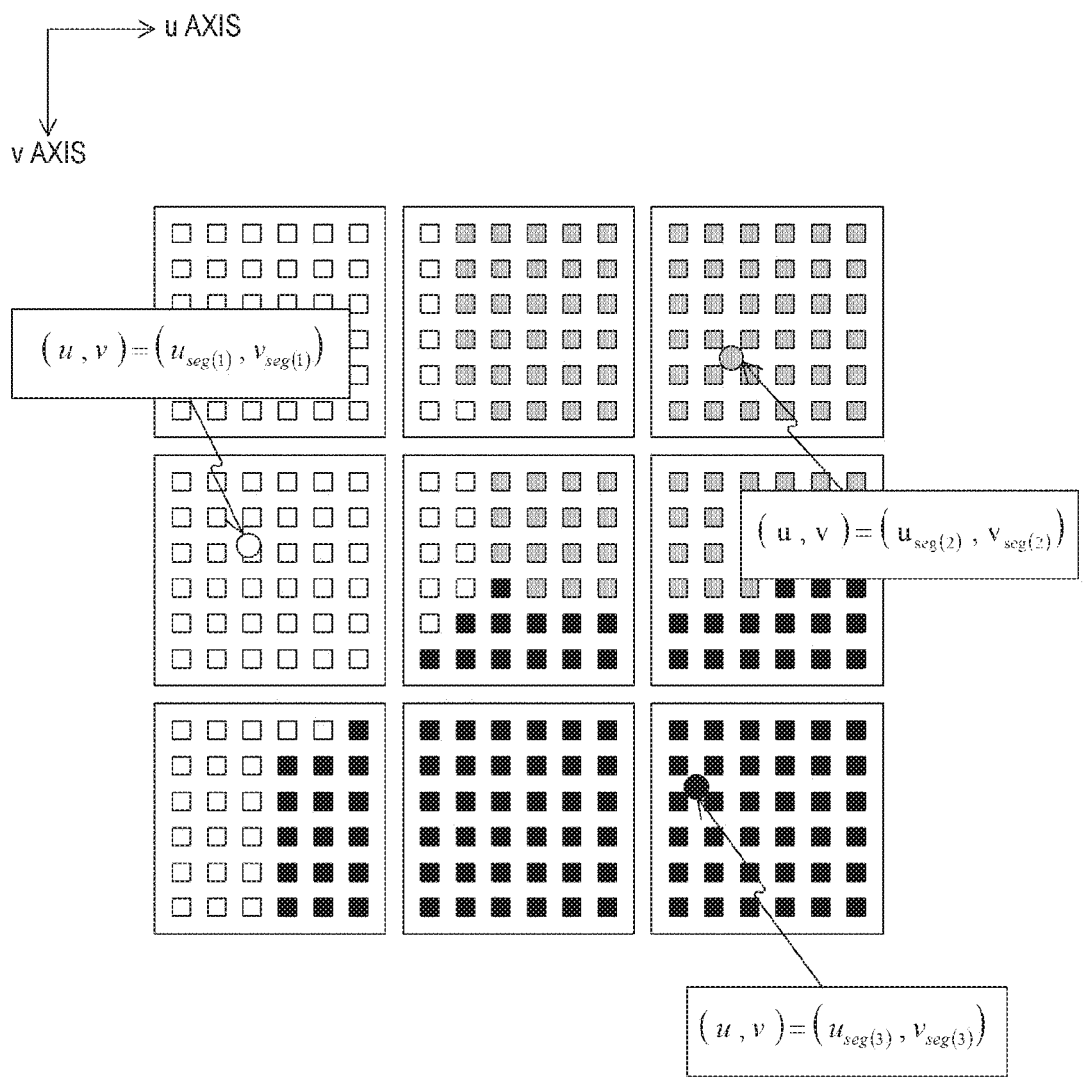
FIG. 104 is a diagram illustrating the example of the positional relationship between the SPADs and the color image pixels according to the first working example of the tenth embodiment of the present technology.

After the above-described "division of color image pixel positions in the regions of the SPADs included in G(x, y) into groups", the center of gravity is obtained for each group. That is, the center of gravity of the pixel positions belonging to the group of white rectangles is obtained, and its (u, v) coordinate is expressed as (useg(1), vseg(1)). The center of gravity of the pixel positions belonging to the group of gray rectangles is obtained, and its (u, v) coordinate is expressed as (useg(2), vseg(2)). The center of gravity of the pixel positions belonging to the group of black rectangles is obtained, and its (u, v) coordinate is expressed as (useg(3), vseg(3)). In this way, (useg(i), vseg(i)) (i=1 to C(x, y)) is obtained as illustrated in FIG. 104.

A case is assumed in which C(x, y) objects at different distances are projected onto the SPADs included in G(x, y), that is, onto the color image pixel positions in the regions of the SPADs included in G(x, y). In this case, it is reasonable to consider that these C(x, y) objects at different distances are projected onto the corresponding C(x, y) regions (the group of white rectangles, the group of gray rectangles, and the group of black rectangles) illustrated in FIG. 103. Then, it is reasonable to consider that the centers of gravity of these C(x, y) objects at different distances are positioned at (useg(i), vseg(i)) (i=1 to C(x, y)). Since this matter is important, it is explicitly described as "Property 2".

Property 2: The center of gravity of each of the C(x, y) objects at different distances is positioned at any (useg(i), vseg(i)) (i=1 to C(x, y)).

Here, it is necessary to pay attention to the following. The center-of-gravity position of an object at distance Z(x, y, 1) is, according to the Property 1, (uavg(1), vavg(1)). However, the position may not always be (useg(1), vseg(1)). The center-of-gravity position of the object at distance Z(x, y, 1) is (useg(1), vseg(1)), (useg(2), vseg(2)), or (useg(3), vseg(3)). The same can be said for an object at distance Z(x, y, 2) and an object at distance Z(x, y, 3). Thus, it is necessary to determine a correspondence relationship between a set {(uavg(i), vavg(i))|i=1 to C(x, y)} and a set {(useg(i), vseg(i))|i=1 to C(x, y)}.

After the above-described (useg(i), vseg(i)) (i=1 to C(x, y)) is obtained, the correspondence relationship between the set {(uavg(i), vavg(i))|i=1 to C(x, y)} and the set {(useg(i), vseg(i))|i=1 to C(x, y)} is determined. Here, "Property 1" and "Property 2" are used. That is, an element of the set {(uavg(i), vavg(i))|i=1 to C(x, y)} and an element of the set {(useg(i), vseg(i))|i=1 to C(x, y)}, the elements being at a short distance from each other, may be paired. Specifically, a permutation operator σ(i) (i=1 to C(x, y)) that satisfies the following Expression 167 may be determined.

[Math. 167]

$$\underset{\{\sigma_{(i)}|\sigma_{(i)} \text{ is permeation.}\}}{\mathrm{argmin}} \sum_{i=1}^{C_{(x,y)}} \left\{ \begin{pmatrix} u_{avg(\sigma_{(i)})} \\ v_{avg(\sigma_{(i)})} \end{pmatrix} - \begin{pmatrix} u_{seg(i)} \\ v_{seg(i)} \end{pmatrix} \right\}^2 \quad \text{Expression 167}$$

For example, in the case of FIGS. 98 and 104, (uavg(1), vavg(1)) and (useg(1), vseg(1)) are close to each other.

(uavg(2), vavg(2)) and (useg(3), vseg(3)) are close to each other.

(uavg(3), vavg(3)) and (useg(2), vseg(2)) are close to each other.

Thus, the following is obtained by solving Expression 102. That is, the center-of-gravity position of the object at distance Z(x, y, 1) is (useg(1), vseg(1)). That is, onto the pixel positions of the white rectangles, the object at distance Z(x, y, 1) is projected.

The center-of-gravity position of the object at distance Z(x, y, 2) is (useg(3), vseg(3)). That is, onto the pixel positions of the black rectangles, the object at distance Z(x, y, 2) is projected.

The center-of-gravity position of the object at distance Z(x, y, 3) is (useg(2), vseg(2)). That is, onto the pixel positions of the gray rectangles, the object at distance Z(x, y, 3) is projected.

That is, in the Q×Q pixel positions (small rectangles in FIG. 100) included in the SPAD at position of interest (x, y), the distance to the object projected onto the pixel positions of the white rectangles is Z(x, y, 1).

The distance to the object projected onto the pixel positions of the black rectangles is Z(x, y, 2).

The distance to the object projected onto the pixel positions of the gray rectangles is Z(x, y, 3).

As a specific case, processing of assigning distance data to each of "Q×Q pixel positions included in the SPAD at position of interest (x, y)" has been described above with reference to FIGS. 97 to 104. This can be generalized into the following processing procedure.

Figure 105:
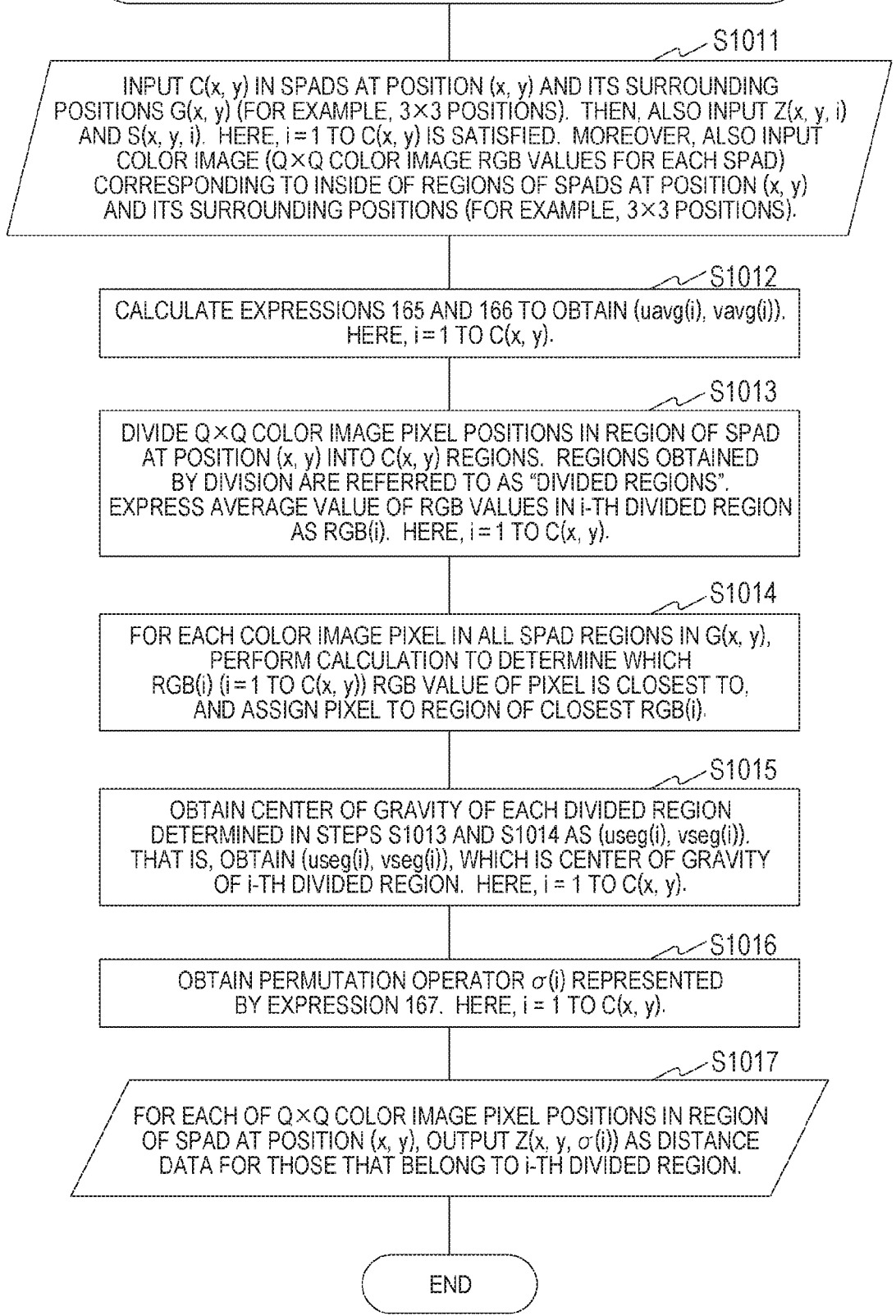
FIG. 105 is a flowchart illustrating an example of a processing procedure for determining distance data according to the working example of the tenth embodiment of the present technology.

FIG. 105 is a flowchart illustrating an example of a processing procedure for determining distance data according to the working example of the tenth embodiment of the present technology.

First, in step S1011, C(x, y) in SPADs at position (x, y) and its surrounding positions G(x, y) (for example, 3×3 positions) is input. Then, Z(x, y, i) and S(x, y, i) are also input. Here, i=1 to C(x, y) is satisfied. Moreover, a color image (Q×Q color image RGB values for each SPAD) corresponding to the inside of the regions of the SPADs at position (x, y) and its surrounding positions (for example, 3×3 positions) is also input. Then, the processing proceeds to step S1012.

In step S1012, Expressions 165 and 166 are calculated to obtain (uavg(i), vavg(i)). Here, i=1 to C(x, y). Then, the processing proceeds to step S1013.

In step S1013, the Q×Q color image pixel positions in the region of the SPAD at position (x, y) are divided into C(x, y) regions. The regions obtained by the division are referred to as "divided regions". An average value of RGB values in an i-th divided region is expressed as RGB(i). Here, i=1 to C(x, y). Then, the processing proceeds to step S1014.

Note that region division can be performed by using a known technique such as k-means clustering. Thus, a detailed description will be omitted here.

In step S1014, for each color image pixel in all the SPAD regions in G(x, y), calculation is performed to determine which RGB(i) (i=1 to C(x, y)) the RGB value of the pixel is closest to, and the pixel is assigned to a region of the closest RGB(i). Then, the processing proceeds to step S1015.

In step S1015, the center of gravity of each divided region determined in steps S1013 and S1014 is obtained, and is expressed as (useg(i), vseg(i)). That is, (useg(i), vseg(i)), which is the center of gravity of the i-th divided region, is obtained. Here, i=1 to C(x, y). Then, the processing proceeds to step S1016.

In step S1016, a permutation operator a(i) represented by Expression 167 is obtained. Here, i=1 to C(x, y). Then, the processing proceeds to step S1017.

In step S1017, for each of the Q×Q color image pixel positions in the region of the SPAD at position (x, y), Z(x, y, σ(i)) is output as distance data for those that belong to the i-th divided region. Then, the series of processing ends.

Note that while the above description assumes a case of using a color image, a black-and-white image may be used, for example.

Furthermore, in the above description, an occurrence rate p(x, y, n) is obtained from a histogram H(x, y, n) by Expression 158, and a peak and a peak area of the occurrence rate p(x, y, n) are obtained. Instead, a peak and a peak area of the histogram H(x, y, n) may be obtained for simplification. That is, although an approximate solution will be obtained, instead of using Expression 158, it is possible to obtain the occurrence rate p(x, y, n) assuming that p(x, y, n)=H(x, y, n) and apply this working example. Here, n=0 to N−1. As a result, the calculation of Expression 158 can be omitted, and the amount of calculation can be reduced.

Furthermore, peak area S(x, y, i) may be approximated as a constant regardless of x, y, and i. Here, x=0 to X−1, y=0 to Y−1, and i=1 to C(x, y) are satisfied. Alternatively, peak area S(x, y, i) may be approximated as peak area S(x, y, i)=1/C(x, y). As a result, the processing of calculating a peak area can be omitted, and the amount of calculation can be reduced.

[Summary]

The features of the tenth embodiment are as follows.

A camera that can capture an image with a resolution higher than the number of SPADs in the SPAD array is used as well. Distance data at a pixel position of this high-resolution image is obtained. Note that the number of pieces of distance data obtained from each SPAD is not necessarily one. That is, the number of pieces is expressed as C(x, y). Here, C(x, y) may be equal to or greater than 2.

Feature 1: At this time, this high-resolution image is divided into regions, and distance data is assigned to each divided region. Here, the distance data is distance data obtained from a SPAD array.

Feature 2: Moreover, pieces of distance data that are the same in value are chosen from distance data obtained from the SPAD array, and the center of gravity of a chosen position is obtained. Then, the center of gravity is obtained for each of the divided regions of the high-resolution image described above. By pairing these centers of gravity, distance data for each divided region of the above-described high-resolution image is determined.

Feature 3: Moreover, in the above-described pairing, those that are in a short distance from each other are paired.

The tenth embodiment satisfies at least one of the above-described Features 1 to 3.

In this way, by applying the tenth embodiment, distance data at a position with a resolution higher than the number of SPADs in the SPAD array can be obtained.

[Gist]

The gist of the tenth embodiment is as follows.

(1) A method of increasing a resolution of distance measurement data obtained from histogram information, the method including:

a first input step of inputting histograms;

a distance calculation step of calculating distance data from the histograms;

a second input step of inputting an image with the number of pixels larger than the number of the histograms;

a division step of dividing a region of the image to obtain divided regions;

an assigning step of assigning the distance data to each of the divided regions; and an output step of outputting a result of the assigning step.

(2) The method of increasing a resolution of distance measurement data according to (1), in which the assigning step includes:

a distance data center-of-gravity calculation step of performing division into groups, each group including pieces of distance data having the same value, and obtaining first center-of-gravity positions, which are the center-of-gravity positions of the corresponding groups;

a region center-of-gravity calculation step of obtaining second center-of-gravity positions, which are the center-of-gravity positions of the corresponding divided regions; and a pairing processing step of pairing one of the first center-of-gravity positions and one of the second center-of-gravity positions.

(3) The method of increasing a resolution of distance measurement data according to (2), in which in the pairing processing step, one of the first center-of-gravity positions and one of the second center-of-gravity positions that are at a short distance from each other are obtained as a pairing result.

12. Eleventh Embodiment

[Outline]

A SPAD array has a lens for efficient light collection. However, in a case where an inexpensive lens is adopted, light cannot be collected perfectly, and the light has a certain width. In the case of such a lens, the point spread function (PSF) is not a delta function, but a function having a certain width. In this eleventh embodiment, a histogram is sharpened by correcting the "PSF having a certain width", which is a characteristic of the lens attached to the SPAD array.

[Histogram]

It is assumed that a SPAD is arranged at each position (x, y) in a SPAD array 13. Here, x=1 to X, and y=1 to Y. The number of SPADs is X×Y in total. As described above, distance measurement is performed by M-time emissions and receptions of light, and a histogram is completed by an accumulation unit 15. That is, a histogram corresponding to each position (x, y) is completed by M-time emissions and receptions of light. The number of histograms is X×Y in total.

Furthermore, in the eleventh embodiment, the time direction is not considered, and a histogram at position (x, y) is expressed as H(x, y, n). Here, x is an integer between 1 and X inclusive, and y is an integer between 1 and Y inclusive. Then, n represents a bin number, and is an integer between 0 and N−1 inclusive.

[Relationship Between Histogram and Occurrence Rate]

Since only one histogram is considered here, H(x, y, n) is simply expressed as h(n). Here, n=0 to N−1.

An occurrence rate is, in a similar manner to that in other embodiments, the number of times an event occurs per unit time.

Note that, to be precise, a "probability of arrival of a photon during a time (D) corresponding to a certain bin" is a value obtained by multiplying an occurrence rate by time D. However, constant multiplication (multiplication by D) is ignored here. Alternatively, time D may be considered as a unit time. Moreover, alternatively, in this embodiment, an occurrence rate may be considered to be defined as a value obtained by multiplying an "occurrence rate", which is a term generally widely used, by D.

Now, an occurrence rate p(n) in bin n is the probability that light (photon) arrives a SPAD during a period from time n×D to time (n+1)×D. The occurrence rate p(n) is irrelevant to whether light (photon) has arrived before time n×D.

On the other hand, each SPAD of a SPAD sensor 13 in a distance measuring device 10 detects the first piece of light (photon) to arrive, but does not detect the second and subsequent pieces of light (photons) to arrive. As a specific example, in a case where a first piece of light (photon) arrives at a time corresponding to bin 2, a second piece of light (photon) arrives at a time corresponding to bin 4, and then a third piece of light (photon) arrives at a time corresponding to bin 6, only h(2) is counted in the histogram, not h(4) or h(6).

In this way, there is a clear difference between the occurrence rate p(n) that is irrelevant to whether light (photon) has arrived before that point of time, and a frequency h(n) in which light (photon) that has arrived before that point of time is not counted. By taking this into consideration, a relationship between the occurrence rate p(n) and the frequency h(n) can be derived.

When the occurrence rate in bin 0 is expressed as p(0), the probability that the frequency of bin 0 becomes h(0) in M-time measurements is represented by the following Expression 168.

[Math. 168]

$$p_{(0)} = \frac{h_{(0)}}{M} \qquad \text{Expression 168}$$

This is because the probability is a probability that an event that occurs with a probability of p(0) occurs h(0) times out of M times.

The occurrence rate in bin 1 is expressed as p(1). The probability that the frequency of bin 1 becomes h(1) even though the event has occurred h(0) times in bin 0 in M-time measurements is represented by the following Expression 169.

[Math. 169]

$$p_{(1)} = \frac{h_{(1)}}{M - h_{(0)}} \qquad \text{Expression 169}$$

This is because the probability is a probability that an event that occurs with a probability of p(1) occurs h(1) times out of M−h(0) times.

The occurrence rate in bin 2 is expressed as p(2). The probability that the frequency of bin 2 becomes h(2) even though the event has occurred h(0) times in bin 0 and h(1) times in bin 1 in M-time measurements is represented by the following Expression 170.

[Math. 170]

$$p_{(2)} = \frac{h_{(2)}}{M - h_{(0)} - h_{(1)}} \qquad \text{Expression 170}$$

This is because the probability is a probability that an event that occurs with a probability of p(2) occurs h(2) times out of M−h(0)−h(1) times.

Similarly, the probability that the frequency of bin n becomes h(n) even though the event has occurred h(m) times in bin m in M-time measurements is represented by the following Expression 171. Here, m=0 to n−1.

[Math. 171]

$$p_{(n)} = \frac{h_{(n)}}{M_{(n-1)}}, \text{ where } M_{(n-1)} \equiv M - \sum_{j=0}^{n-1} h_{(j)} \qquad \text{Expression 171}$$

As can be seen from these descriptions, when a histogram at each position (x, y) is observed and the histogram is expressed as H(x, y, n), an occurrence rate p(x, y, n) at position (x, y) is represented by the following Expression 172. Here, n=0 to N−1.

[Math. 172]

$$p_{(x,y,n)} = \frac{H_{(x,y,n)}}{M_{(x,y,n-1)}}, \text{ where } M_{(x,y,n-1)} \equiv M - \sum_{j=0}^{n-1} H_{(x,y,j)} \qquad \text{Expression 172}$$

[Relationship Between PSF of Lens and Occurrence Rate]

Figure 106:
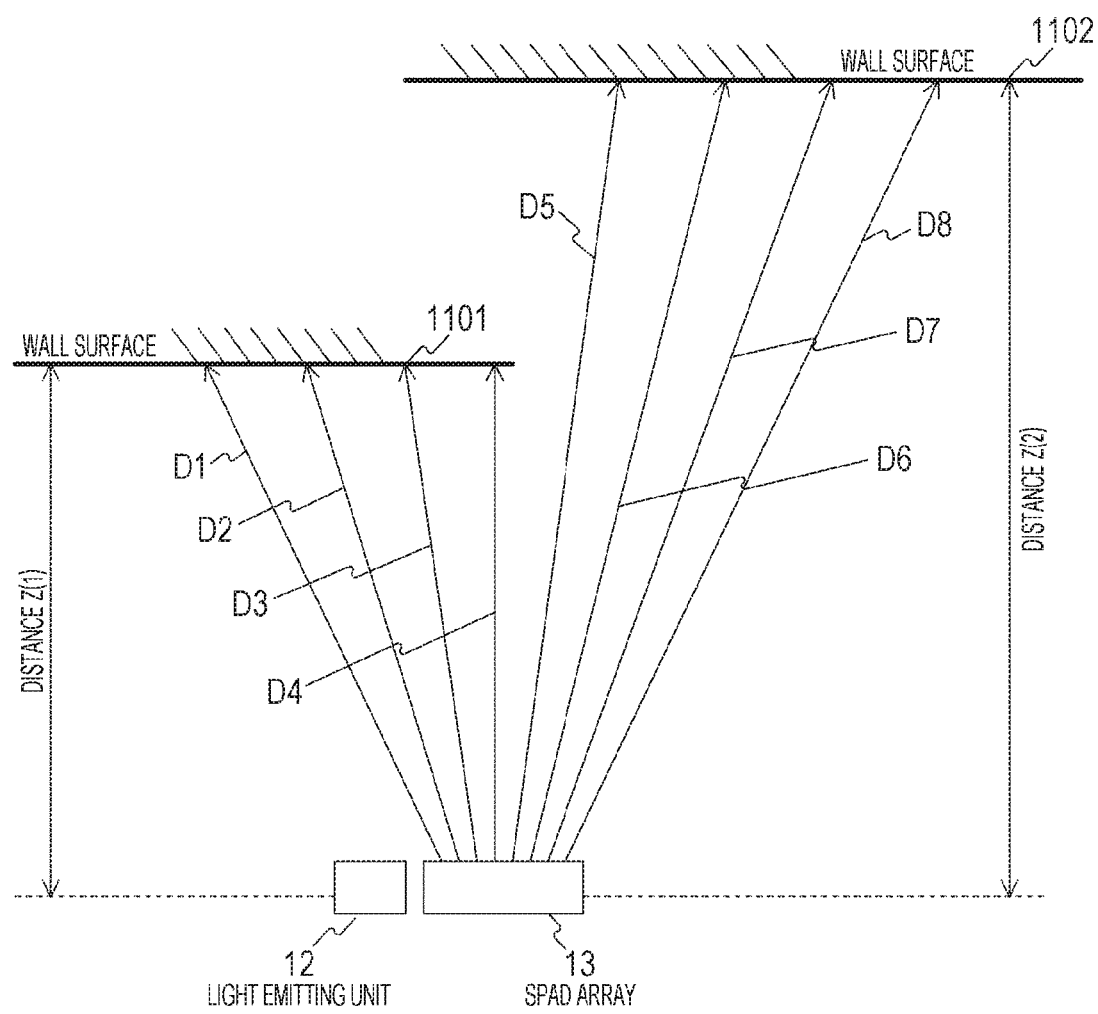
FIG. 106 is a diagram illustrating an example of a scene of distance measurement according to an eleventh embodiment of the present technology.

FIG. 106 is a diagram illustrating an example of a scene of distance measurement according to the eleventh embodiment of the present technology.

The drawing illustrates a case where there is a wall surface 1101 at distance Z(1) and a wall surface 1102 at distance Z(2) from a light emitting unit 12 and the SPAD array 13 (i.e., the distance measuring device 10). Note that a lens 13*a* is not illustrated in the drawing.

It is assumed that a certain SPAD (S1) in the SPAD array 13 is performing distance measurement in a direction of D1 in the drawing. Then, it is assumed that a SPAD (S2) neighboring S1 is performing distance measurement in a direction of D2.

It is assumed that a SPAD (S3) neighboring S2 is performing distance measurement in a direction of D3.

It is assumed that a SPAD (S4) neighboring S3 is performing distance measurement in a direction of D4.

It is assumed that a SPAD (S5) neighboring S4 is performing distance measurement in a direction of D5.

It is assumed that a SPAD (S6) neighboring S5 is performing distance measurement in a direction of D6.

It is assumed that a SPAD (S7) neighboring S6 is performing distance measurement in a direction of D7.

It is assumed that a SPAD (S8) neighboring S7 is performing distance measurement in a direction of D8.

Figure 107:
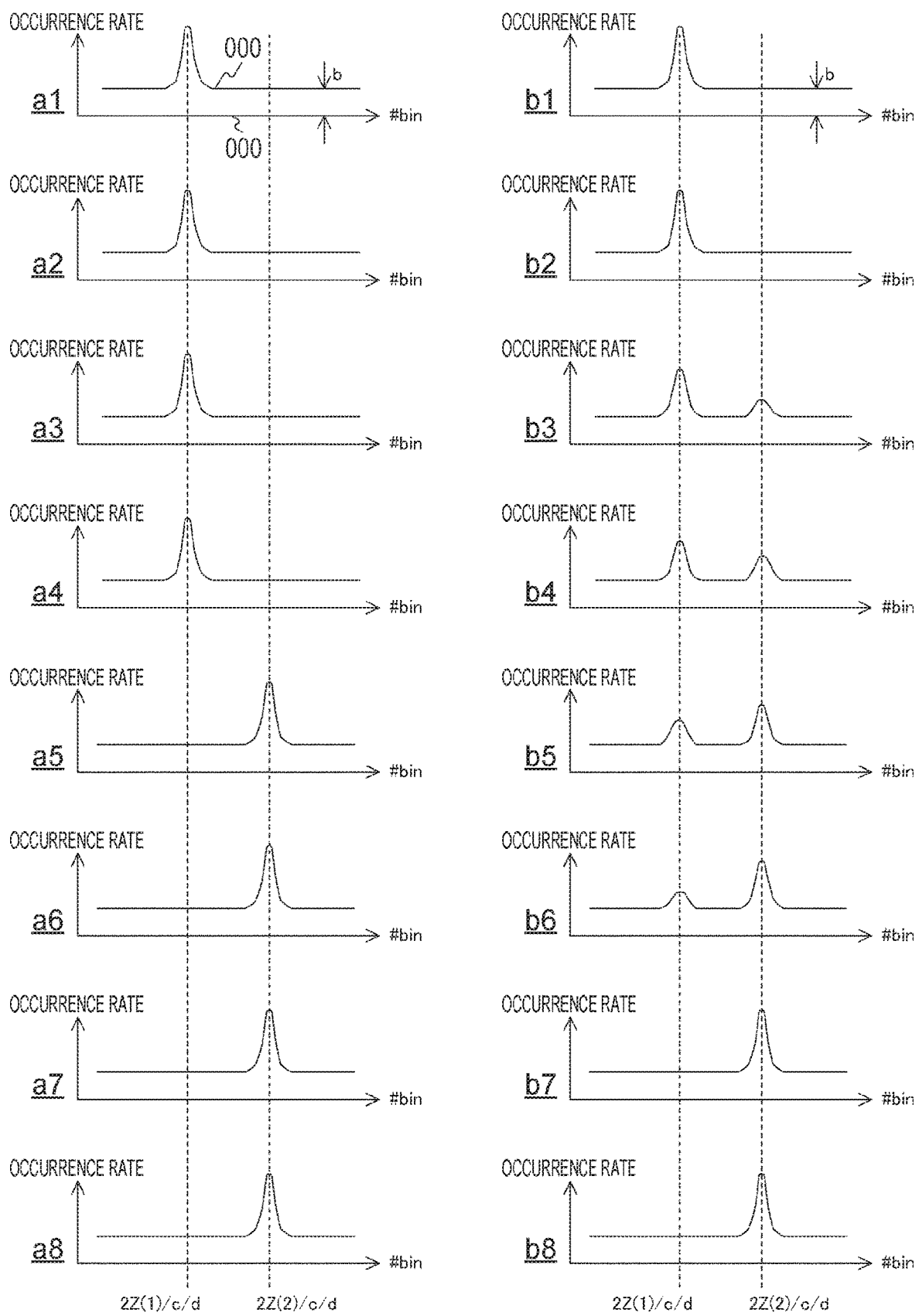
FIG. 107 is a diagram illustrating a distribution of occurrence rates in an example of distance measurement according to the eleventh embodiment of the present technology.

FIG. 107 is a diagram illustrating a distribution of occurrence rates in an example of distance measurement according to the eleventh embodiment of the present technology.

First, an occurrence rate of the SPAD S1 is considered. That is, light (photon) that arrives the SPAD S1 is considered. As described above, there are two types of light (photon) that arrives. One is light (photon) that is emitted from the light emitting unit 12 (active light) and reflected by and returned from the wall surface 1101. The other is light (photon) that arrives from ambient light. As described above, reception of the ambient light always occurs with a constant probability regardless of time. This probability is expressed as b. A value of the probability b is illustrated in a1 of FIG. 107. Note that the same applies to FIGS. 108 and 109 described later. On the other hand, reception of the active light occurs mostly at time 2×Z(1)/c (bin number 2×Z(1)/c/D). Thus, the occurrence rate is expressed as a1 in the drawing. That is, the occurrence rate is expressed as a graph having a peak at the position of bin 2×Z(1)/c/D.

The same thing as the SPAD S1 can be said for occurrence rates of the SPADs S2 to S4. Thus, the occurrence rates of the SPADs S2 to S4 are respectively expressed as a2 to a4 in the drawing.

The same thing as the SPAD S1 can be said for occurrence rates of the SPADs S5 to S8 by substituting Z(2) as Z(1). Thus, the occurrence rates of the SPADs S5 to S8 are respectively expressed as a5 to a8 in the drawing.

Now, in the description so far, the PSF of the lens 13a has not been taken into consideration. The PSF of an actual lens has a certain width, and has a low light-collecting performance. To be specific, light (photon) that arrives from the direction of D4 should ideally reach the SPAD S4. However, since the light-collecting performance of the lens 13a is low, light may reach a SPAD around S4 (for example, the SPAD S5).

b5 in the drawing indicates a practical occurrence rate of the SPAD S5 in consideration of the PSF of the lens 13a. As described above, from the direction of D4, light (photon) arrives with a significantly high probability at time 2×Z(1)/c (bin number 2×Z(1)/c/D). Then, due to the PSF of the lens 13a, such light (photon) contributes to the occurrence rate of the SPAD S5. As a result, as illustrated in b5 in the drawing, the occurrence rate is expressed as a graph having a peak at the position of bin 2×Z(1)/c/D.

b4 in the drawing indicates a practical occurrence rate of the SPAD S4 in consideration of the PSF of the lens 13a. From the direction of D4, a part of light (photon) that arrives at time 2×Z(1)/c (bin number 2×Z(1)/c/D) reaches S5. That is, the light (photon) that practically reaches the SPAD S4 is less than the light (photon) that ideally arrives the SPAD S4 from the direction of D4 at time 2×Z(1)/c (bin number 2×Z(1)/c/D). That is, the peak at the position of bin 2×Z(1)/c/D in b4 in the drawing is lower than the peak at the position of bin 2×Z(1)/c/D in a4 in the drawing.

Furthermore, light (photon) that arrives from the direction of D5 should ideally reach the SPAD S5. However, since the light-collecting performance of the lens 13a is low, light may reach a SPAD around S5 (for example, the SPAD S4). As a result, the practical occurrence rate of the SPAD S4 is expressed as a graph having a peak at the position of bin 2×Z(2)/c/D, as illustrate in b4 in the drawing.

In this way, the practical occurrence rates of the SPADs S1 to S8 are as illustrated in b1 to b8, respectively, in the drawing.

Figure 108A:
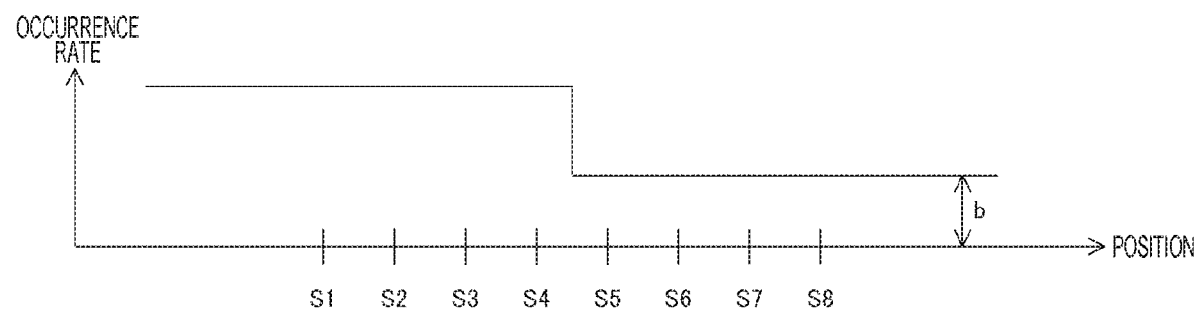
FIG. 108 is a diagram illustrating a distribution of occurrence rates in the example of distance measurement according to the eleventh embodiment of the present technology.
Figure 108B:
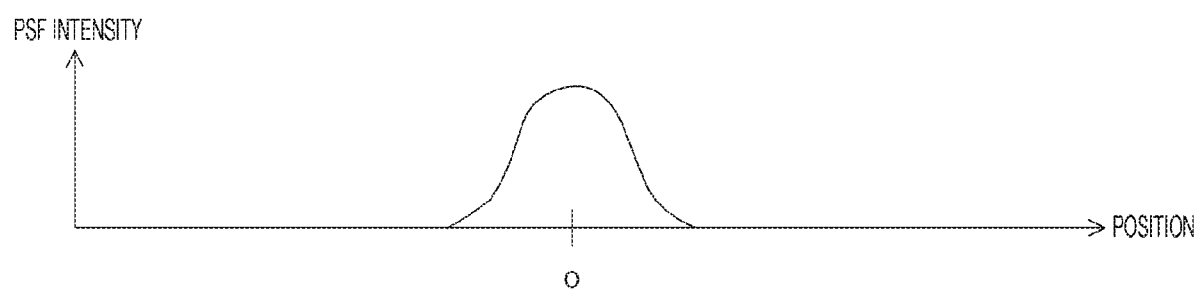
Figure 108C:
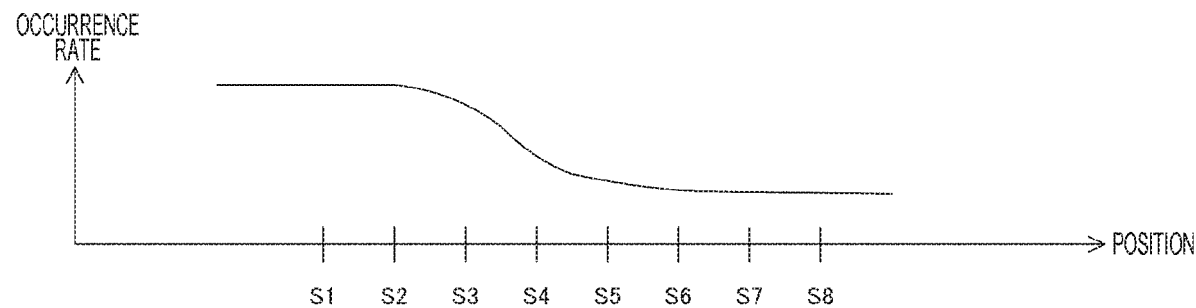

FIG. 108 is a diagram illustrating a distribution of occurrence rates in the example of distance measurement according to the eleventh embodiment of the present technology. The drawing illustrates graphs created by extracting values at bin number 2×Z(1)/c/D in the SPADs S1 to S8.

A in the drawing illustrates ideal occurrence rates. That is, occurrence rates in a case where it is assumed that the PSF of the lens 13a is a delta function are illustrated. This graph displays values of bin 2×Z(1)/c/D in a1 to a8 in the above-described FIG. 107.

B in the drawing illustrates the PSF intensity of the lens 13a. The PSF of a practical lens is not a delta function, but a function with a certain width as illustrated here.

Thus, a practical probability that light arrives bin 2×Z(1)/c/D of each SPAD is obtained as a result of a convolution of A and B in the drawing. That is, C in the drawing is obtained. This is the same as a graph displaying the values of bin 2×Z(1)/c/D in b1 to b8 in the above-described FIG. 107.

Figure 109A:
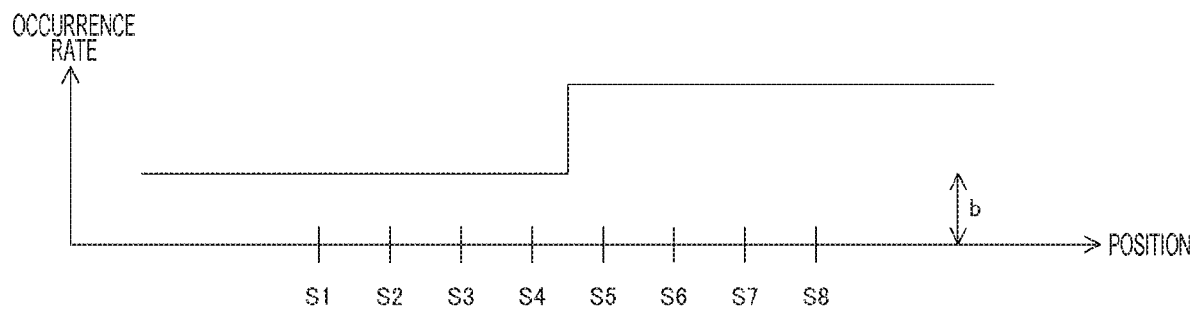
FIG. 109 is a diagram illustrating a distribution of occurrence rates in the example of distance measurement according to the eleventh embodiment of the present technology.
Figure 109B:
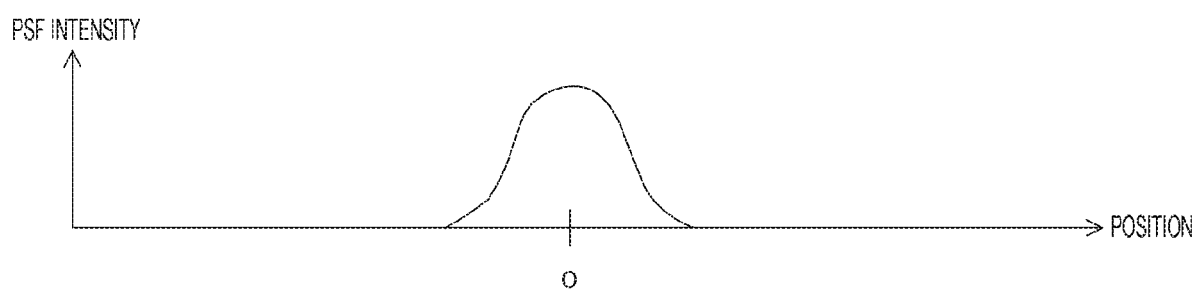
Figure 109C:
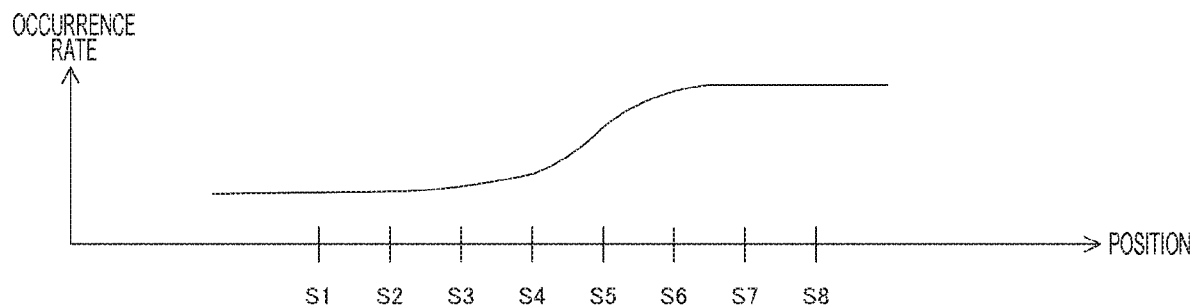

FIG. 109 is a diagram illustrating a distribution of occurrence rates in the example of distance measurement according to the eleventh embodiment of the present technology. The drawing illustrates graphs created by extracting values at bin number 2×Z(2)/c/D in the SPADs S1 to S8.

A in the drawing illustrates ideal occurrence rates. That is, occurrence rates in a case where it is assumed that the PSF of the lens 13a is a delta function are illustrated. This graph displays values of bin 2×Z(2)/c/D in a1 to a8 in the above-described FIG. 107.

B in the drawing illustrates the PSF intensity of the lens 13a. The PSF of a practical lens is not a delta function, but a function with a certain width as illustrated here.

Thus, a practical probability that light arrives bin 2×Z(2)/c/D of each SPAD is obtained as a result of a convolution of A and B in the drawing. That is, C in the drawing is obtained. This is the same as a graph displaying the values of bin 2×Z(2)/c/D in b1 to b8 in the above-described FIG. 107.

The above description can be mathematically expressed as the following Expression 173.

[Math. 173]

$$p_{(x,y,n)} = f_{(x,y)} \otimes p_{ideal(x,y,n)} \qquad \text{Expression 173}$$

Here, p(x, y, n) is a practical occurrence rate at position (x, y). Here, n=0 to N−1. That is, it is an occurrence rate actually observed using the distance measuring device 10.

pideal(x, y, n) is an ideal occurrence rate at position (x, Y).

f(x, y) is the PSF of the lens 13a. Note that f(x, y) does not include n as an argument because f(x, y) is a characteristic of the lens and is irrelevant to the bin. Furthermore, by measuring the PSF of the lens 13a in advance, it is possible to make f(x, y) known, so the description will proceed assuming that f(x, y) is known.

The above-described Expression 173 means that p(x, y, n) is obtained by a "convolution for x and y" with respect to f(x, y) and pideal(x, y, n). Here, n=0 to N−1.

In the eleventh embodiment, on the basis of an occurrence rate p(x, y, n) actually observed using the distance measuring device 10, an ideal occurrence rate pideal(x, y, n) is obtained, and an ideal histogram Hdeblur(x, y, n) is further obtained. Here, "ideal" has the same meaning as "a case where the PSF of the lens 13a is assumed to be a delta function".

In other words, even in a case where an inexpensive lens having a low light-collecting performance (the PSF has a width) is used, an advantage that a histogram equivalent to that observed using an expensive lens having a high light-collecting performance (the PSF is a delta function) can be obtained by applying the eleventh embodiment.

Working Example

Figure 110:
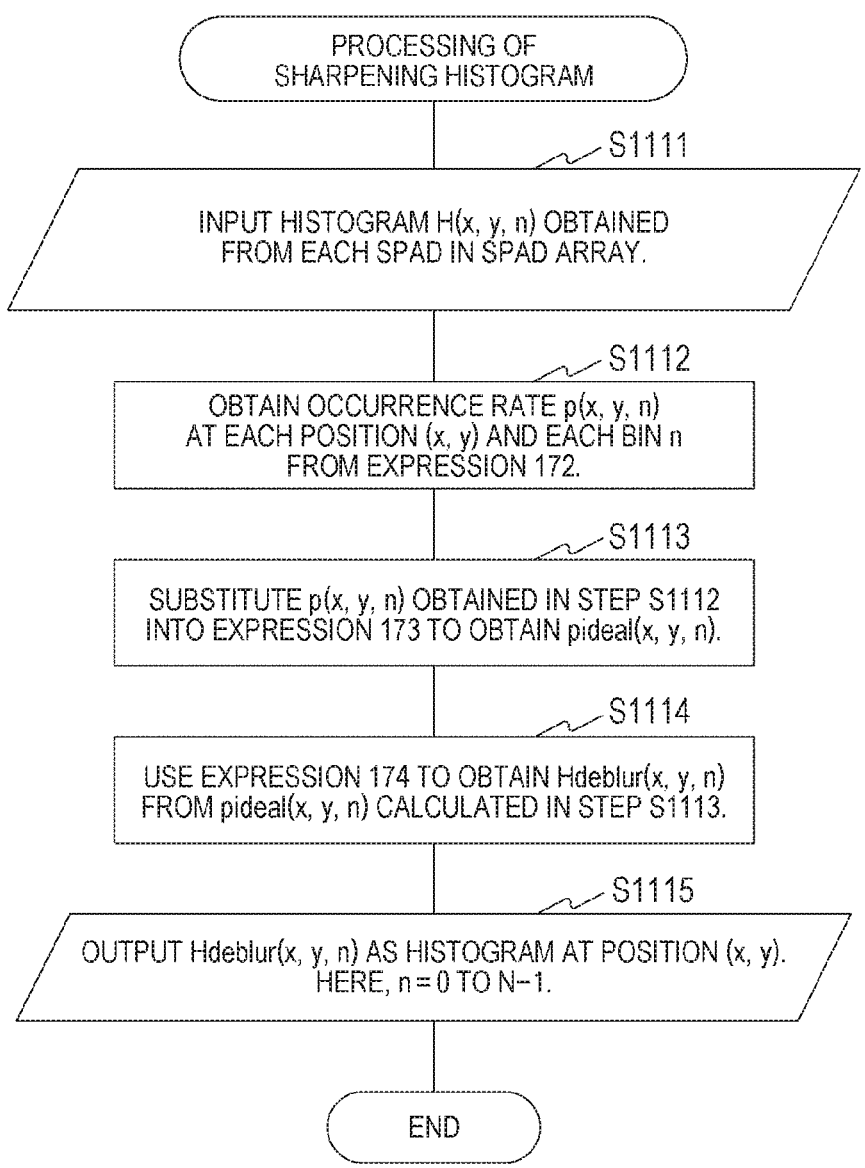
FIG. 110 is a flowchart illustrating an example of a processing procedure for sharpening a histogram according to a working example of the eleventh embodiment of the present technology.

FIG. 110 is a flowchart illustrating an example of a processing procedure for sharpening a histogram according to a working example of the eleventh embodiment of the present technology.

First, in step S1111, a histogram H(x, y, n) obtained from a SPAD at each position (x, y) in the SPAD array is input. Here, n=0 to N−1. Then, the processing proceeds to step S1112.

In step S1112, an occurrence rate p(x, y, n) at each position (x, y) and each bin n is obtained from Expression 172. Then, the processing proceeds to step S1113.

In step S1113, for each n, p(x, y, n) obtained in step S1112 is substituted into Expression 173 to obtain pideal(x, y, n). Here, n=0 to N−1. Then, the processing proceeds to step S1114.

In step S1114, Hdeblur(x, y, n) is obtained from the pideal(x, y, n) calculated in step S1113 using the following Expression 174.

[Math. 174]

$$H_{deblur(x,y,n)} = M_{deblue(x,y,n-1)} \cdot p_{ideal(x,y,j)},$$ Expression 174

$$\text{where } M_{deblue(x,y,n-1)} \equiv M - \sum_{j=0}^{n-1} H_{deblur(x,y,j)}$$

Then, the processing proceeds to step S1115.

In step S1115, Hdeblur(x, y, n) is output as a histogram at position (x, y). Here, n=0 to N−1. Hdeblur(x, y, n) is a sharpened histogram in which the PSF of the lens has been corrected. Then, the series of processing ends.

Note that Expression 172 is an expression for obtaining an occurrence rate from a histogram, and Expression 174 is a reverse conversion thereof, that is, an expression for obtaining a histogram from an occurrence rate.

Furthermore, in step S1113, Expression 173 is used to obtain pideal(x, y, n) from p(x, y, n). This method is called deconvolution, and a known technique such as Wiener filter and Lucy-Richardson deconvolution can be adopted. Since these are known techniques, a detailed description will be omitted. Alternatively, as a method of obtaining pideal(x, y, n) from p(x, y, n) using Expression 173 for each n, a filter for enhancing the contour, that is, an edge enhancement filter may be used. That is, pideal(x, y, n) may be obtained by using an edge enhancement filter on two-dimensional data p(x, y, n) expressed by x and y for each n.

Note that the processing illustrated in the drawing is performed by a computation unit 16. Then, after this processing has been performed, the computation unit 16 further performs conventionally performed peak detection processing on the sharpened histogram Hdeblur(x, y, n) in which the PSF of the lens has been corrected and obtains a distance, and the distance data is output from an output terminal 17. Therefore, even in a case where an inexpensive lens having a low light-collecting performance is used, distance data having the same performance as that of distance measurement using an expensive lens having a high light-collecting performance can be obtained.

Furthermore, as is apparent from Expression 174, the peak position in Hdeblur(x, y, n) (n=0 to N−1) is equal to the peak position in pideal(x, y, n) (n=0 to N−1). Thus, a peak in pideal(x, y, n) (n=0 to N−1) may be detected, and then a distance corresponding to the position of that bin may be obtained as distance data. In this case, the conversion equation represented by the above-described Expression 174 is not required.

[Summary]

A relationship between occurrence rates in a case where an inexpensive practical lens having a low light-collecting performance (the PSF has a width) and in a case where an expensive ideal lens having a high light-collecting performance (the PSF is a delta function) is illustrated (see FIGS. 107 to 109 and Expression 173).

The relationship shown in Expression 173 can be used to create, by signal processing, a histogram Hdeblur(x, y, n) obtained through an ideal lens from a histogram H(x, y, n) obtained through the actual lens 13a of the distance measuring device 10.

That is, even in a case where an inexpensive lens having a low light-collecting performance is used, distance data having the same performance as that of distance measurement using an expensive lens having a high light-collecting performance can be obtained.

[Gist]

The gist of the eleventh embodiment is as follows.

(1) A method of sharpening a histogram including:
  an input step of inputting a plurality of histograms;
  an occurrence rate calculation step of obtaining, for every one of the plurality of histograms, an occurrence rate by dividing a bin in the histogram by a value obtained by subtracting a frequency of a young bin from the total number in the histogram;
  a reverse conversion calculation step of performing deconvolution on the occurrence rate;
  a histogram calculation step of obtaining a sharpened histogram from the deconvoluted occurrence rate; and
  an output step of outputting the sharpened histogram.

13. Twelfth Embodiment

[Outline]

This twelfth embodiment provides a method of obtaining a state (such as the shape and movement) of an object in the range of distance measurement by one SPAD.

[Histogram]

Figure 111:
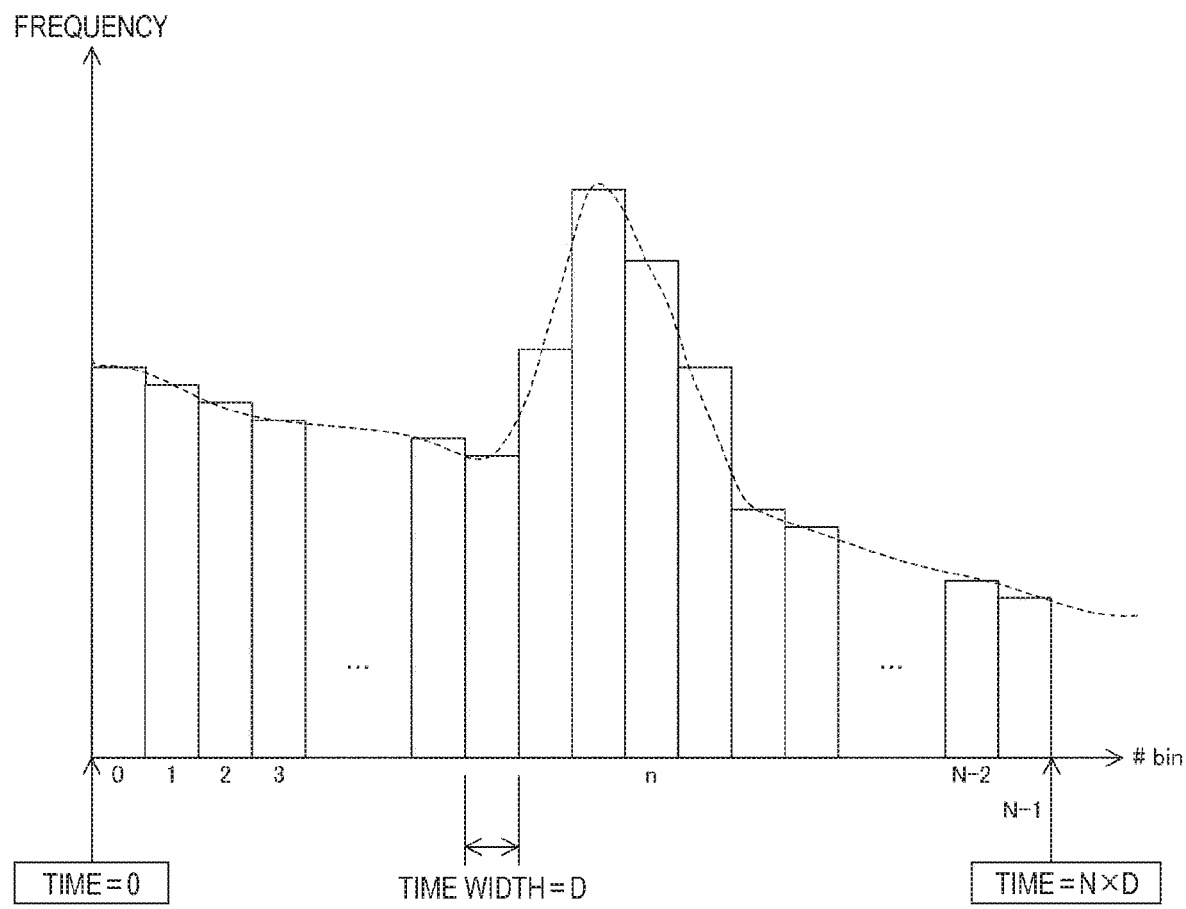
FIG. 111 is a diagram illustrating an example of a histogram generated by an accumulation unit 15 according to a twelfth embodiment of the present technology.

FIG. 111 is a diagram illustrating an example of a histogram generated by an accumulation unit 15 according to the twelfth embodiment of the present technology.

In the twelfth embodiment, since time D is assumed to be sufficiently small, a frequency of a histogram can be considered to be a continuous value with respect to bins, not a discrete value in units of D. In the drawing, the continuous values are indicated by a dotted line.

It is assumed that a SPAD is arranged at each position (x, y) in a SPAD array 13. Here, x=0 to X−1 and y=0 to Y−1. The number of SPADs is X×Y in total. In the above description, 1≤x≤X and 1≤y≤Y are set as pixel positions of SPADs. In this twelfth embodiment, 0≤x≤X−1 and 0≤y≤Y−1 are set in order that the pixel positions may coincide with the positions in a coordinate system (u, v). The number of histograms is X×Y in total, in a similar manner to other embodiments.

Moreover, it is assumed that distance measurement is performed continuously in time. That is, processing of "creating a histogram by M-time emissions and receptions of light" is continuously performed. The time required for the processing of "creating a histogram by M-time emissions and receptions of light" is defined as a unit time. By defining the unit time in this way, the accumulation unit 15 outputs, at time t, a histogram created for the t-th time in time. Here, t is an integer equal to or greater than 0.

For measurement at each time t, light is emitted and received M times. An m-th emission and reception of light is performed at time t+m/M. Here, m is 0 to M−1. That is, a histogram at time t is completed by emission and reception of light at time t, emission and reception of light at time t+1/M, emission and reception of light at time t+2/M, . . . , and emission and reception of light at time t+(M−1)/M.

Note that since an (m+1)-th light emission is performed after the histogram has been updated by the m-th emission and reception of light, N×D≤1/M is satisfied. Note that this constraint condition is not directly related to this embodiment.

A histogram at time t and position (x, y) is expressed as H(t, x, y, n). Here, t is an integer equal to or greater than 0, x is an integer between 0 and X−1 inclusive, and y is an integer between 0 and Y−1 inclusive. Then, n represents a bin number, and is an integer between 0 and N−1 inclusive.

Note that a variable (x, y) indicates a position of each SPAD in the SPAD array 13, and takes an integer value. On the other hand, as described later, a variable (u, v) indicates a position in each SPAD. That is, u takes a real value of at least 0 and less than 1, and v takes a real value of at least 0 and less than 1.

[Relationship Between Histogram and Occurrence Rate]

Since only one histogram is considered here, H(t, x, y, n) is simply expressed as h(n). Here, n=0 to N−1.

An occurrence rate is, in a similar manner to that in other embodiments, the number of times an event occurs per unit time.

Note that, to be precise, a "probability of arrival of a photon during a time (D) corresponding to a certain bin" is a value obtained by multiplying an occurrence rate by time D. However, constant multiplication (multiplication by D) is ignored here. Alternatively, time D may be considered as a unit time. Moreover, alternatively, in this embodiment, an occurrence rate may be considered to be defined as a value obtained by multiplying an "occurrence rate", which is a term generally widely used, by D.

Now, an occurrence rate p(n) in bin n is the probability that light (photon) arrives a SPAD during a period from time n×D to time (n+1)×D. The occurrence rate p(n) is irrelevant to whether light (photon) has arrived before time n×D.

On the other hand, each SPAD of a SPAD sensor 13 in a distance measuring device 10 detects the first piece of light (photon) to arrive, but does not detect the second and subsequent pieces of light (photons) to arrive. As a specific example, in a case where a first piece of light (photon) arrives at a time corresponding to bin 2, a second piece of light (photon) arrives at a time corresponding to bin 4, and then a third piece of light (photon) arrives at a time corresponding to bin 6, only h(2) is counted in the histogram, not h(4) or h(6).

In this way, there is a clear difference between the occurrence rate p(n) that is irrelevant to whether light (photon) has arrived before that point of time, and a frequency h(n) in which light (photon) that has arrived before that point of time is not counted. By taking this into consideration, a relationship between the occurrence rate p(n) and the frequency h(n) can be derived.

When the occurrence rate in bin 0 is expressed as p(0), the probability that the frequency of bin 0 becomes h(0) in M-time measurements is represented by the following Expression 175.

[Math. 175]

$$p_{(0)} = \frac{h_{(0)}}{M} \quad \text{Expression 175}$$

This is because the probability is a probability that an event that occurs with a probability of p(0) occurs h(0) times out of M times.

The occurrence rate in bin 1 is expressed as p(1). The probability that the frequency of bin 1 becomes h(1) even though the event has occurred h(0) times in bin 0 in M-time measurements is represented by the following Expression 176.

[Math. 176]

$$p_{(1)} = \frac{h_{(1)}}{M - h_{(0)}} \quad \text{Expression 176}$$

This is because the probability is a probability that an event that occurs with a probability of p(1) occurs h(1) times out of M−h(0) times.

The occurrence rate in bin 2 is expressed as p(2). The probability that the frequency of bin 2 becomes h(2) even though the event has occurred h(0) times in bin 0 and h(1) times in bin 1 in M-time measurements is represented by the following Expression 177.

[Math. 177]

$$p_{(2)} = \frac{h_{(2)}}{M - h_{(0)} - h_{(1)}} \quad \text{Expression 177}$$

This is because the probability is a probability that an event that occurs with a probability of p(2) occurs h(2) times out of M−h(0)−h(1) times.

Similarly, the probability that the frequency of bin n becomes h(n) even though the event has occurred h(m) times in bin m in M-time measurements is represented by the following Expression 178. Here, m=0 to n−1.

[Math. 178]

$$p_{(n)} = \frac{h_{(n)}}{M_{(n-1)}}, \text{ where } M_{(n-1)} \equiv M - \sum_{j=0}^{n-1} h_{(j)} \quad \text{Expression 178}$$

As can be seen from these descriptions, when a histogram at each time t and each position (x, y) is observed and the histogram is expressed as H(t, x, y, n), an occurrence rate p(t, x, y, n) at time t and position (x, y) is represented by the following Expression 179. Here, n=0 to N−1.

[Math. 179]

$$p_{(t,x,y,n)} = \frac{H_{(t,x,y,n)}}{M_{(t,x,y,n-1)}}, \quad \text{Expression 179}$$

$$\text{where } M_{(t,x,y,n-1)} \equiv M - \sum_{j=0}^{n-1} H_{(t,x,y,j)}$$

[Occurrence Rate]

Figure 112:
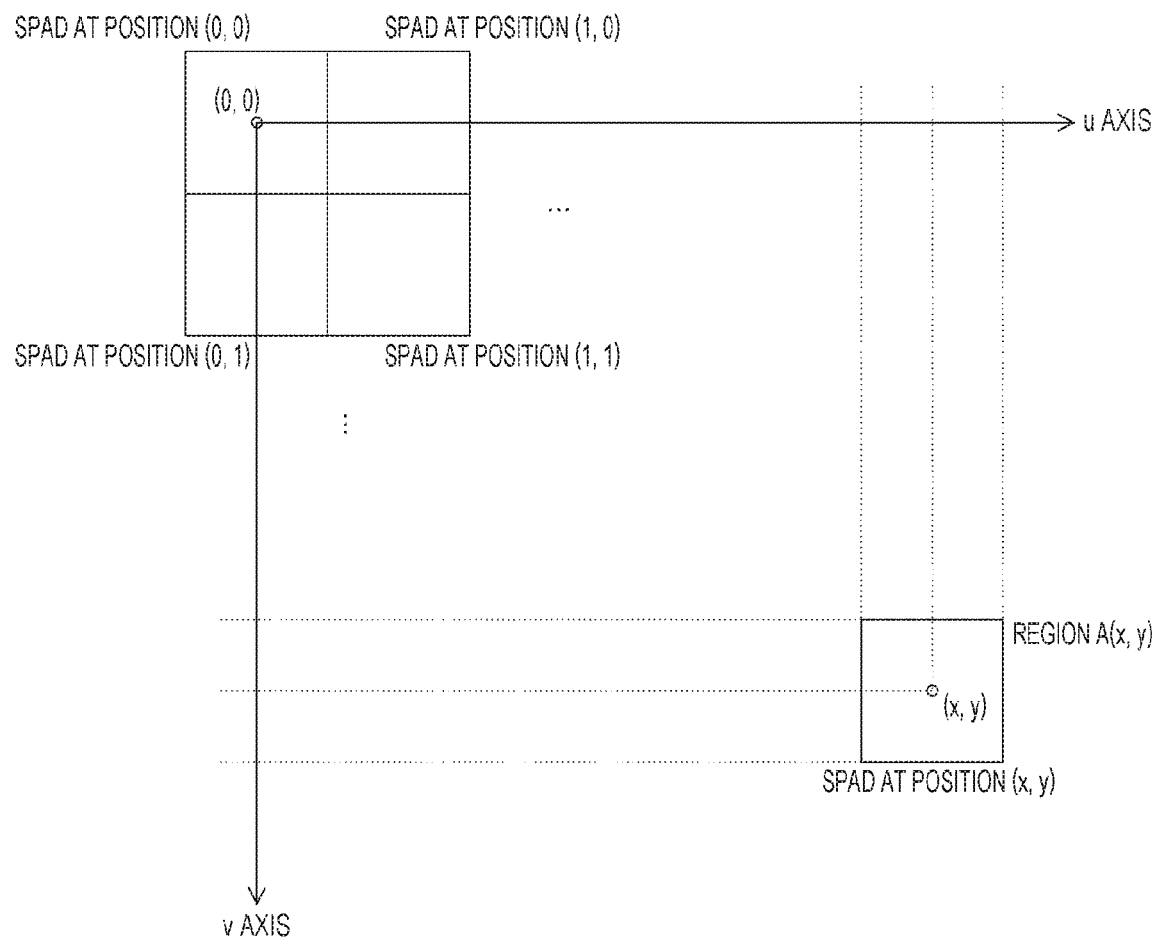
FIG. 112 is a diagram illustrating an example of a position of each SPAD in a (u, v) coordinate system according to the twelfth embodiment of the present technology.

FIG. 112 is a diagram illustrating an example of a position of each SPAD according to the twelfth embodiment of the present technology.

Here, each position in each SPAD is expressed as (u, v). u and v are each a real number of at least 0 and less than 1. The size of each PAD is 1 vertical×1 horizontal. As illustrated in the drawing, a SPAD at position (0, 0) occupies a region of at least 0 and less than 1 on the X axis and at least 0 and less than 1 on the Y axis.

A SPAD at position (1, 0) occupies a region of at least 1 and less than 2 on the X axis and at least 0 and less than 1 on the Y axis.

A SPAD at position (0, 1) occupies a region of at least 0 and less than 1 on the X axis and at least 1 and less than 2 on the Y axis.

A SPAD at position (1, 1) occupies a region of at least 1 and less than 2 on the X axis and at least 1 and less than 2 on the Y axis.

In a similar manner, a SPAD at position (x, y) occupies a region of at least x and less than x+1 on the X axis and at least y and less than y+1 on the Y axis.

They can be expressed by the following Expression 180.

[Math. 180]

$$A(x,y) \equiv \{(x+u, y+v) | 0 \le u < 1, 0 \le v < 1\} \quad \text{Expression 180}$$

In Expression 180, A(x, y) indicates the region of the SPAD at position (x, y). When light (photon) is incident on this range, the SPAD at position (x, y) reacts.

Figure 113A:
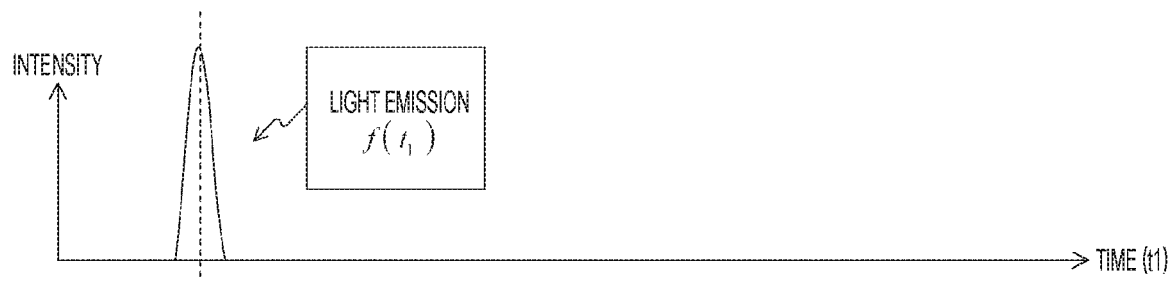
FIG. 113 is a diagram illustrating an intensity distribution in an example of distance measurement according to the twelfth embodiment of the present technology.
Figure 113B:
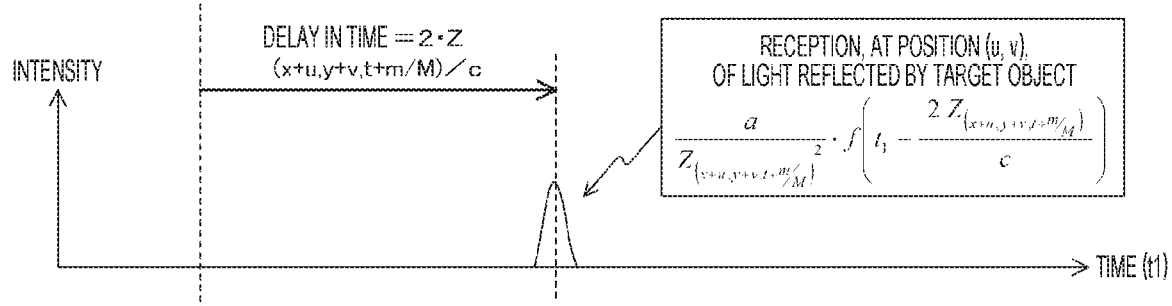
Figure 113C:
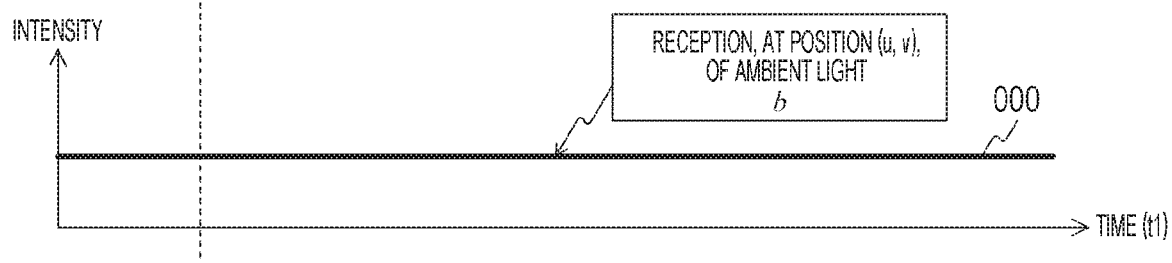

FIG. 113 is a diagram illustrating an intensity distribution in an example of distance measurement according to the twelfth embodiment of the present technology.

An intensity of light emission (short-time light emission) from a light emitting unit 12 changes over time (t1). The intensity is expressed as f(t1). A in the drawing indicates a temporal change in intensity of light emitted from the light emitting unit 12.

Active light (light from the light emitting unit 12) is incident on each position (u, v) in the SPAD at time t and position (x, y) after being reflected by a target object. A distance to the target object corresponding to position (u, v) at the time of an m-th emission and reception of light (i.e., time t+m/M) is expressed as Z(x+u, y+v, t+m/M). The m-th active light (light from the light emitting unit 12) incident on position (u, v) reaches position (u, v) in the SPAD at position (x, y) with a delay of 2×Z(x+u, y+v, t+m/M)/c with respect to the light emission from the light emitting unit 12. Furthermore, light attenuates in proportion to the square of the distance. A reflectance of the target object is expressed as a. Taking into account the above, when light is emitted from the light emitting unit 12, the intensity of the light incident on position (u, v) is represented by the following Expression 181.

[Math. 181]

$$\frac{a}{Z_{(x+u,y+v,t+m/M)}^2} \cdot f\left(t_1 - \frac{2Z_{(x+u,y+v,t+m/M)}}{c}\right) \quad \text{Expression 181}$$

B in the drawing illustrates a temporal change in intensity of the m-th active light incident on position (u, v).

Furthermore, ambient light (for example, light from Sun 30 in FIG. 1) is also incident on each position (u, v). The incident light (photon) always arrives with a constant intensity while a histogram is being created. This intensity is represented as b. C in the drawing illustrates a temporal change in intensity of the ambient light incident on position (u, v).

The intensity of light incident on position (u, v) is the total of B and C in the drawing, and is represented by the following Expression 182.

[Math. 182]

$$b + \frac{a}{Z_{(x+u,y+v,t+m/M)}^2} \cdot f\left(t_1 - \frac{2Z_{(x+u,y+v,t+m/M)}}{c}\right) \quad \text{Expression 182}$$

One SPAD does not perform distance measurement in one direction, but performs, in practice, distance measurement in the whole direction with a certain solid angle. That is, any light incident on a region of at least x and less than x+1 on the X axis and at least y and less than y+1 on the Y axis in the SPAD array 13 causes the SPAD at position (x, y) to react.

That is, the occurrence rate of bin n of a SPAD at time t and position (x, y) is proportional to a value obtained by integrating Expression 182 with respect to each of u and v from 0 to 1, and then accumulating Expression 182 with respect to m from 0 to M−1. Here, t1=n×D.

[Relationship Between Position of Target Object and Occurrence Rate]

Figure 114:
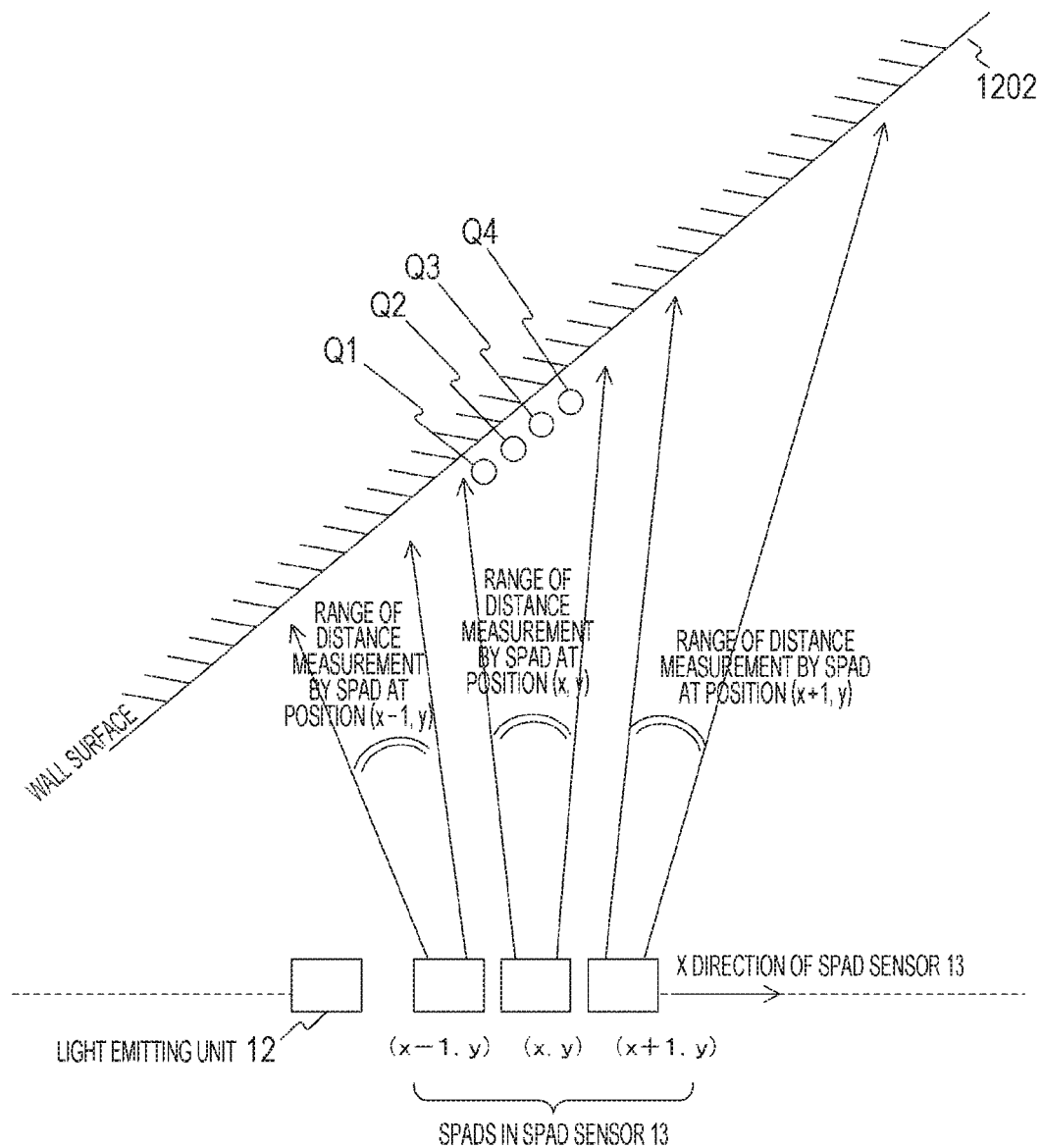
FIG. 114 is a diagram illustrating a first example of a scene of distance measurement according to the twelfth embodiment of the present technology.
Figure 115A:
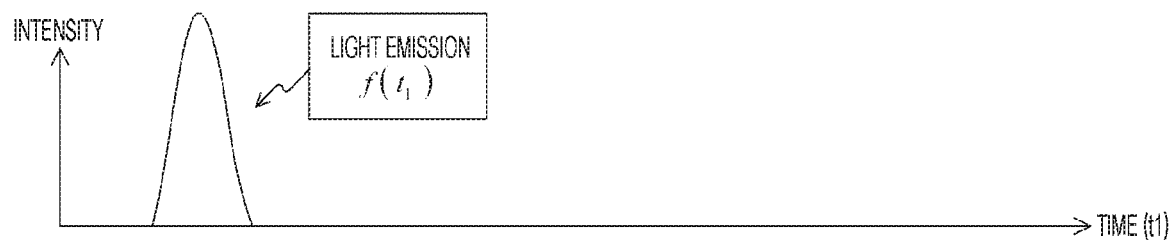
FIG. 115 is a diagram illustrating a temporal change in intensity of light according to the twelfth embodiment of the present technology.
Figure 115B:
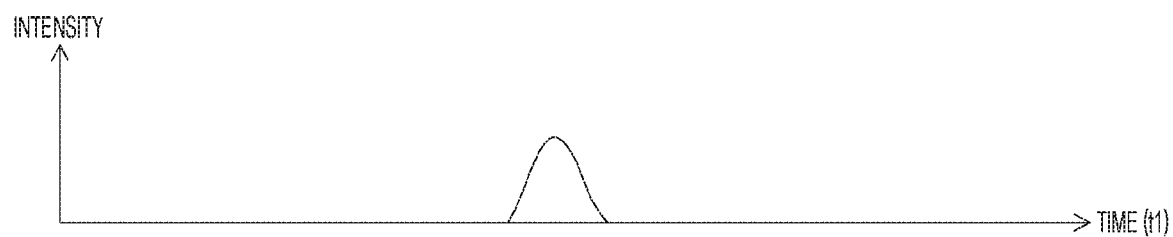
Figure 115C:
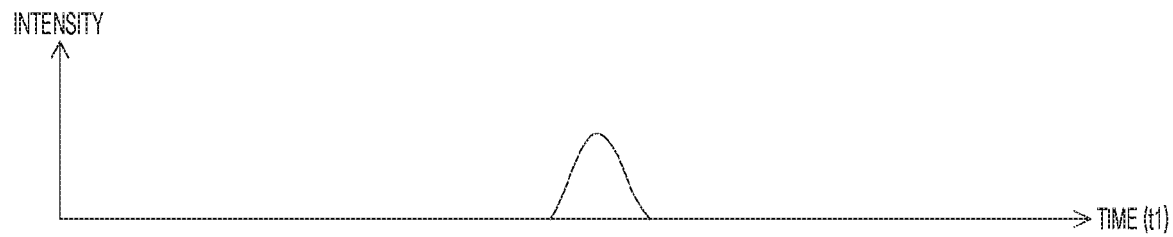
Figure 115D:
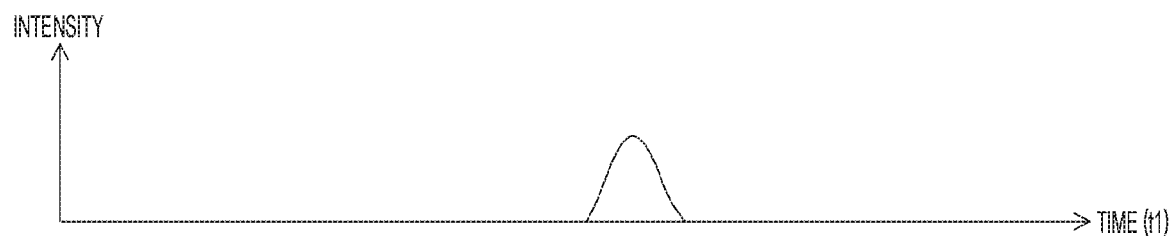
Figure 115E:
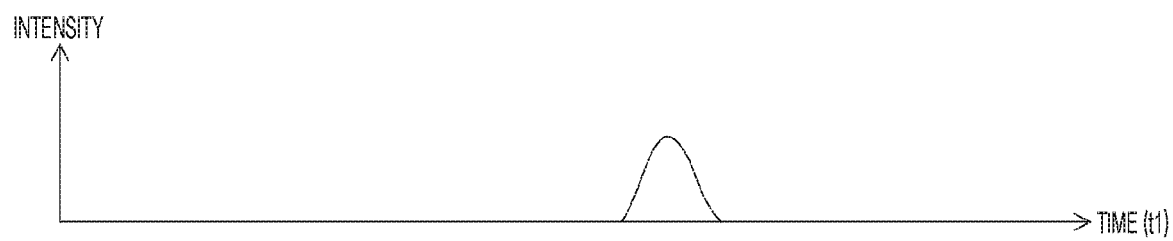

FIG. 114 is a diagram illustrating a first example of a scene of distance measurement according to the twelfth embodiment of the present technology.

Here, a case is considered in which a target object 20 is positioned obliquely with respect to the distance measuring device 10. The drawing illustrates only the light emitting unit 12 in the distance measuring device 10 and three SPADs in the SPAD array 13. That is, the SPADs are three neighboring SPADs at positions (x−1, y), (x, y), and (x+1, y).

As described above, one SPAD does not perform distance measurement in one direction, but in practice performs distance measurement in the whole direction with a certain solid angle. The drawing illustrates the ranges of distance measurement by the three SPADs.

Interest is focused on the SPAD at position (x, y). Consideration is given to four positions (Q1 to Q4 in the drawing) in the range of distance measurement by this SPAD.

The position in the SPAD at position (x, y) corresponding to Q1 is expressed as (u1, v1).

The position in the SPAD at position (x, y) corresponding to Q2 is expressed as (u2, v2).

The position in the SPAD at position (x, y) corresponding to Q3 is expressed as (u3, v3).

The position in the SPAD at position (x, y) corresponding to Q4 is expressed as (u4, v4).

In a case where the target object 20 is positioned obliquely as illustrated in the drawing, the times at which active light (light from the light emitting unit 12) is incident on positions (u1, v1) to (u4, v4) after being reflected by the target object 20 are in the order of (u1, v1), (u2, v2), (u3, v3), and (u4, v4). This is because the distance to the distance measuring device 10 increases in the order of Q1, Q2, Q3, and Q4.

FIG. 115 is a diagram illustrating a temporal change in intensity of light according to the twelfth embodiment of the present technology.

A in the drawing indicates a temporal change in intensity of light emitted from the light emitting unit 12. B in the drawing illustrates a temporal change in intensity of the active light incident on position (u1, v1).

C in the drawing illustrates a temporal change in intensity of the active light incident on position (u2, v2). D in the drawing illustrates a temporal change in intensity of the active light incident on position (u3, v3). E in the drawing illustrates a temporal change in intensity of the active light incident on position (u4, v4).

In the drawing, the intensity distribution shifts in the direction of later time in the order of B, C, D, and E. Note that ambient light components (corresponding to C in FIG. 113) is omitted in the drawing.

The total of B to E in the drawing is the light that arrives the SPAD at position (x, y). Thus, the occurrence rate of the SPAD at position (x, y) has a wide peak. To be more precise, as compared with a peak of the occurrence rate in a case where the target object 20 is positioned parallel to the distance measuring device 10, the peak of the occurrence rate becomes wider in a case where the target object 20 is positioned obliquely with respect to the distance measuring device 10. This will be described with reference to the next figure.

Figure 116A:
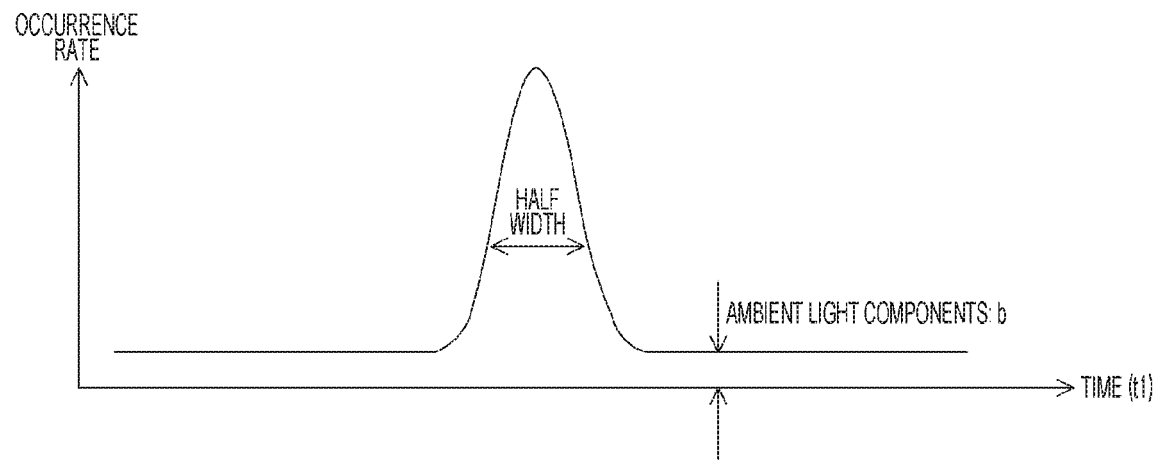
FIG. 116 is a diagram illustrating an example of a comparison of intensity distribution between layouts according to the twelfth embodiment of the present technology.
Figure 116B:
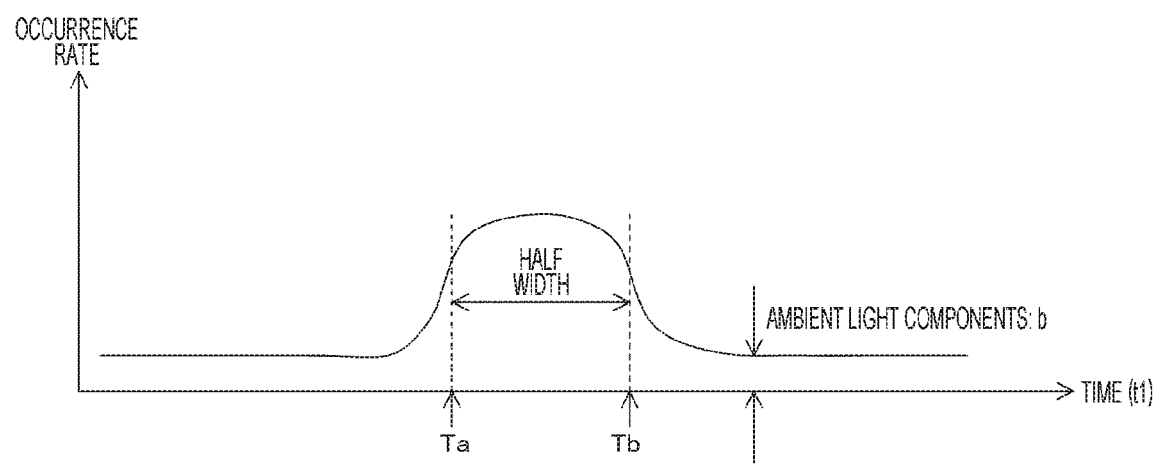

FIG. 116 is a diagram illustrating an example of a comparison of intensity distribution between layouts according to the twelfth embodiment of the present technology.

A in the drawing illustrates the occurrence rate in the case where the target object 20 is positioned parallel to the distance measuring device 10. B in the drawing illustrates the occurrence rate in the case where the target object 20 is positioned obliquely with respect to the distance measuring device 10. The half width of the peak in B in the drawing is wider than the half width of the peak in A in the drawing.

Furthermore, as illustrated in the drawing, the earlier time (t1) corresponding to the half width is expressed as Ta, and the later time (t1) is expressed as Tb. Note that in terms of bins, they are the Ta/D-th and Tb/D-th bins, respectively. Here, D is the width of each bin as already described. At this time, the distance in the direction of Q1 is Ta×c/2, and the distance in the direction of Q4 is Tb×c/2.

While the SPAD at position (x, y) has been described above, the same can be said for the SPAD at position (x−1, y) and the SPAD at position (x+1, y).

Figure 117A:
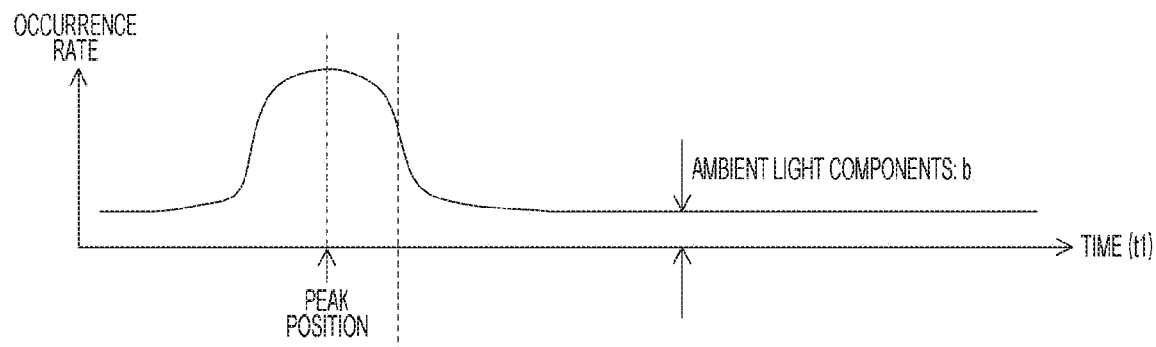
FIG. 117 is a diagram illustrating an occurrence rate in the first example of distance measurement according to the twelfth embodiment of the present technology.
Figure 117B:
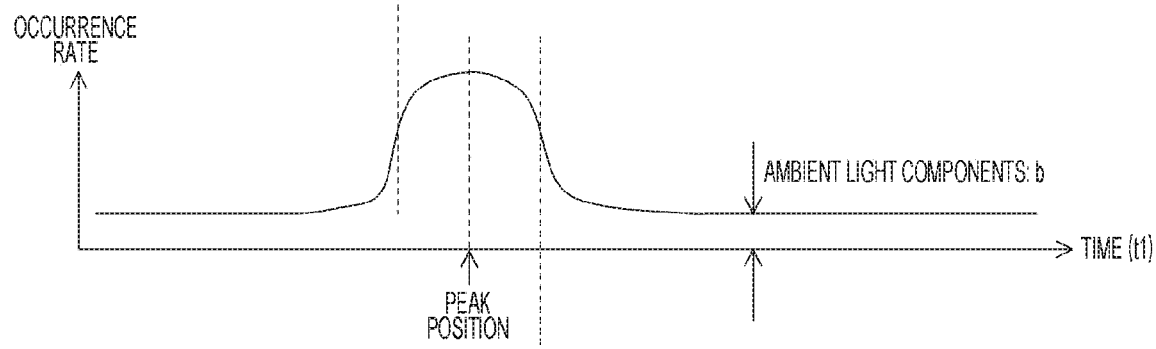
Figure 117C:
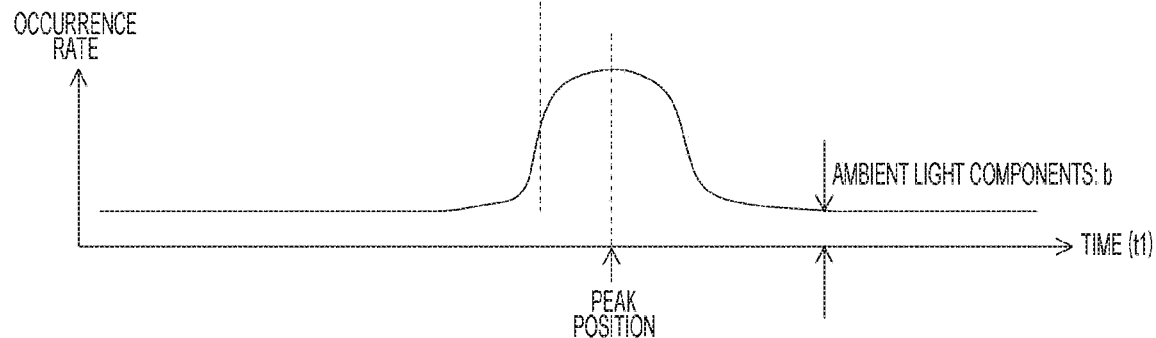

FIG. 117 is a diagram illustrating an occurrence rate in the first example of distance measurement according to the twelfth embodiment of the present technology.

This figure illustrates the occurrence rates of the three SPADs illustrated in the above-described FIG. 114. A in the drawing illustrates the occurrence rate of the SPAD at position (x−1, y). B in the drawing illustrates the occurrence rate of the SPAD at position (x, y). C in the drawing illustrates the occurrence rate of the SPAD at position (x+1, y).

The above-described FIG. 114 illustrates an example of a target object having a positive inclination in the X direction (the distance to the target object increases as the position shifts in the X direction). In this case, as is apparent from the situation of FIG. 114, the order in time (t1) is the peak position in A in FIG. 117, the peak position in B in the drawing, and the peak position in C in the drawing.

Furthermore, while the above description relates to three SPADs neighboring in the X direction, the same can be said for the Y direction.

The following Properties 1 and 2 can be derived from the above description. Here, a peak position (peak time) of an occurrence rate of a SPAD at position (x+i, y+j) is expressed as Tp(x+i, y+j). Here, the set of (i, j) is (−1, 0), (1, 0), (0, −1), (0, 1), or (0, 0).

(Property 1) In a case where the half width of a peak of the occurrence rate of a SPAD at position (x, y) is wide, a target object that is in a direction corresponding to the SPAD at position (x, y) has an inclination of {Tp(x+1, y)×c/2−Tp(x−1, y)×c/2}/2 in the X direction.

(Property 2) In a case where the half width of a peak of the occurrence rate of a SPAD at position (x, y) is wide, a target object that is in a direction corresponding to the SPAD at position (x, y) has an inclination of {Tp(x, y+1)×c/2−Tp(x, y−1)×c/2}/2 in the Y direction.

[Relationship Between Movement of Target Object and Occurrence Rate]

Figure 118:
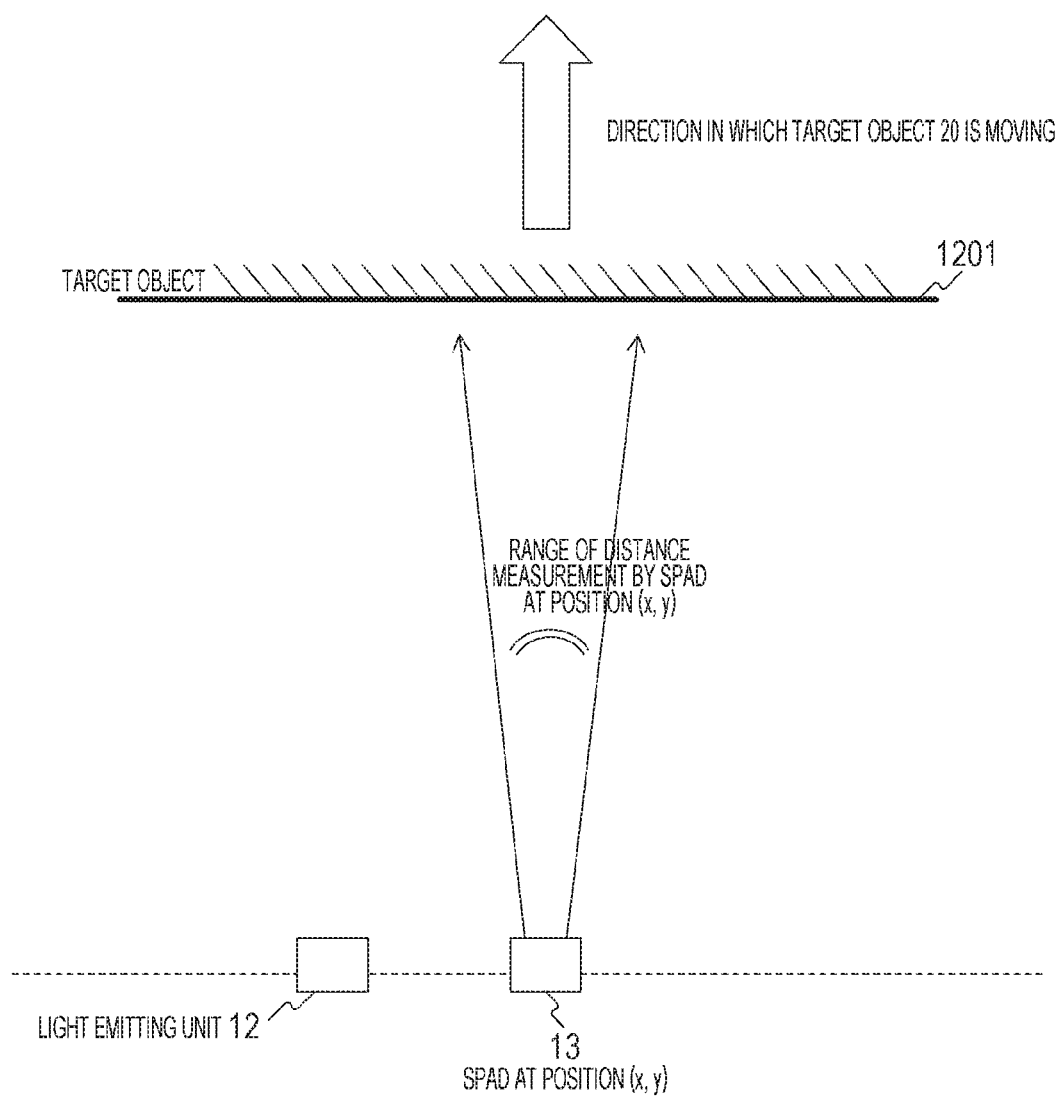
FIG. 118 is a diagram illustrating a second example of the scene of distance measurement according to the twelfth embodiment of the present technology.

FIG. 118 is a diagram illustrating a second example of the scene of distance measurement according to the twelfth embodiment of the present technology.

Here, a case is considered in which the target object 20 is moving in the depth direction with respect to the distance measuring device 10. The drawing illustrates only the light emitting unit 12 in the distance measuring device 10 and one SPAD in the SPAD array 13. That is, the SPAD at position (x, y) is illustrated.

Interest is focused on distance measurement at time t. As already described, distance measurement at time t is performed by M-time emissions and receptions of light. That is, emission and reception of light at time t, emission and reception of light at time t+1/M, emission and reception of light at time t+2/M, . . . , and emission and reception of light at time t+(M−1)/M are performed. As already described, the SPAD operates to repeat an operation of "emission and reception of light" at a time interval of 1/M, and detect the time difference between emission and reception of light. As illustrated in the drawing, in a case where the target object 20 is moving away from the distance measuring device 10 over time, the time difference between the m-th emission of light and reception of light increases as m increases. Here, m=0 to M−1.

In a situation where the time difference gradually increases, when time differences in M-time emissions and receptions of light are converted into a histogram and the above-described Expression 179 is used to obtain an occurrence rate, the occurrence rate of the SPAD at time t and position (x, y) has a wide peak. To be more precise, as compared with a peak of the occurrence rate in a case where the target object 20 is stationary with respect to the distance measuring device 10, the peak of the occurrence rate becomes wider in a case where the target object 20 is moving in the depth direction with respect to the distance measuring device 10.

When this is illustrated, a relationship similar to that of the above-described FIG. 116 is obtained. That is, A in FIG. 116 illustrates the occurrence rate in the case where the target object 20 is stationary with respect to the distance measuring device 10. B in the drawing illustrates the occurrence rate in the case where the target object 20 is moving in the depth direction with respect to the distance measuring device 10. The half width of the peak in B in the drawing is wider than the half width of the peak in A in the drawing.

Furthermore, as illustrated in the drawing, the earlier time (t1) corresponding to the half width is expressed as Ta, and the later time (t1) is expressed as Tb. Note that in terms of bins, they are the Ta/D-th and Tb/D-th bins, respectively. Here, D is the width of each bin as already described. At this time, the distance to the target object 20 at time t is Ta×c/2, and the distance to the target object 20 at time t+(M−1)/M is Tb×c/2.

Conversely, in a case where the target object 20 is approaching, the distance to the target object 20 at time t is Tb×c/2, and the distance to the target object 20 at time t+(M−1)/M is Ta×c/2.

While the SPAD at time t and position (x, y) has been described above, the same can be said for the SPAD at time t−1 and the SPAD at time t+1.

Thus, in the situation illustrated in the above-described FIG. 118, the occurrence rates of the SPAD at position (x, y) at time t−1, time t, and time t+1 have a relationship similar to that in the above-described FIG. 117. That is, A in FIG. 117 illustrates the occurrence rate of the SPAD at time t−1 and position (x, y). B in the drawing illustrates the occurrence rate of the SPAD at time t and position (x, y). C in the drawing illustrates the occurrence rate of the SPAD at time t+1 and position (x, y).

The above-described FIG. 118 illustrates an example of a target object a distance to which increases as time advances. As is apparent from this situation, the order in time (t1) is the peak position in A in FIG. 117, the peak position in B in the drawing, and the peak position in C in the drawing.

The following Property 3 can be derived from the above description. Here, the peak position (peak time) of the occurrence rate of the SPAD at time t+k and position (x, y) is expressed as Tp(t+k). k is −1, 0, or 1.

(Property 3) In a case where the half width of a peak of the occurrence rate of a SPAD at time t and position (x, y) is wide, a target object that is in a direction corresponding to the SPAD at position (x, y) is moving at a speed of {Tp(t+1)×c/2−Tp(t−1)×c/2}/2 over time. In a case where the value of {Tp(t+1)×c/2−Tp(t−1)×c/2}/2 is positive, the target object is moving away. In a case where the value is negative, the target object is approaching.

Working Example

By using the above-described Properties 1 to 3, the state of the target object 20 (whether it is positioned obliquely with respect to the device 10 or is moving in the depth direction) can be found out.

Figure 119:
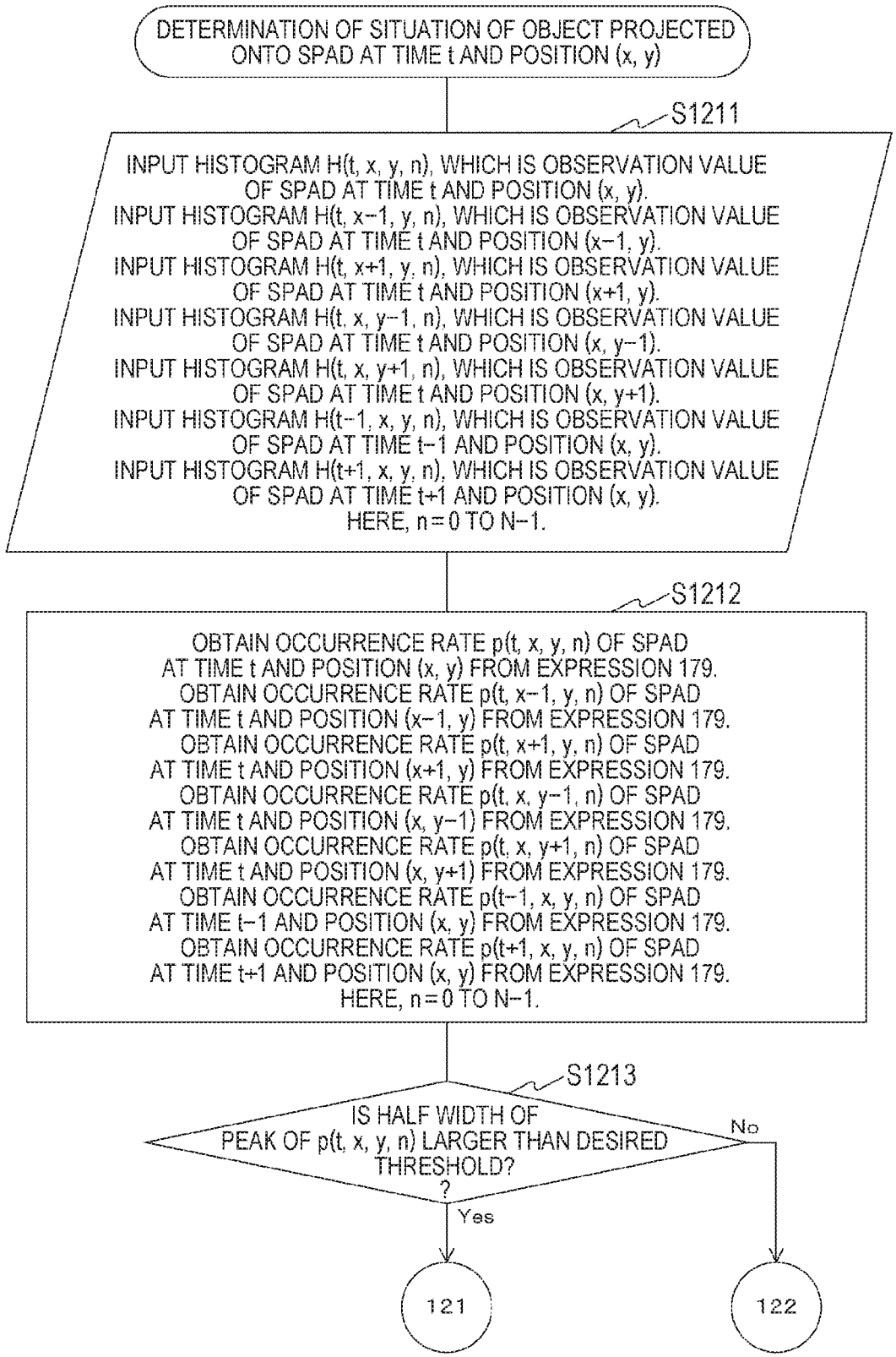
FIG. 119 is a flowchart illustrating an example of a processing procedure for determining a situation of an object according to a working example of the twelfth embodiment of the present technology.
Figure 120:
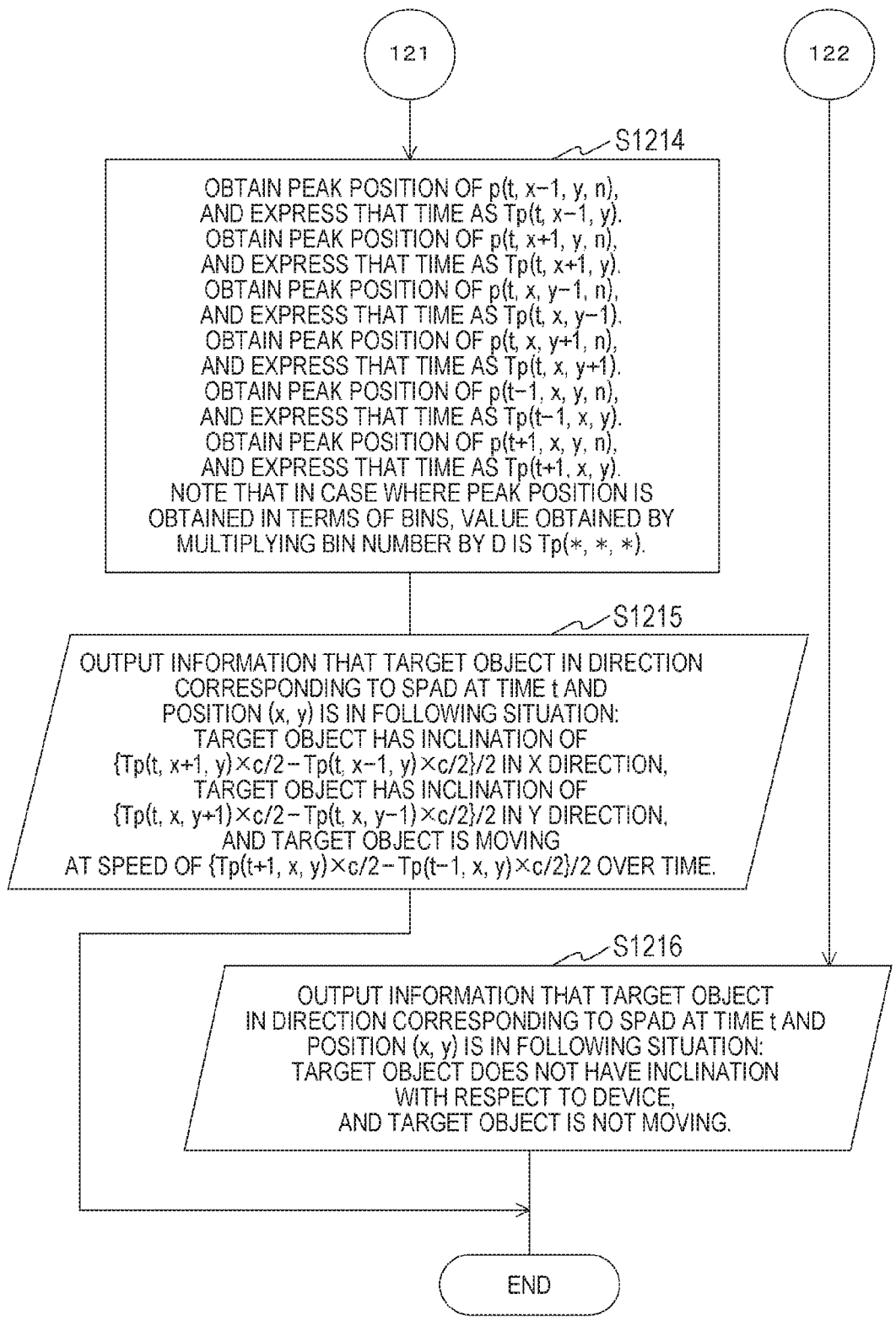

FIGS. 119 and 120 are flowcharts illustrating an example of a processing procedure for determining a situation of an object according to a working example of the twelfth embodiment of the present technology. This processing is performed by the computation unit 16.

First, in step S1211,
a histogram H(t, x, y, n), which is an observation value of the SPAD at time t and position (x, y), is input.
A histogram H(t, x−1, y, n), which is an observation value of the SPAD at time t and position (x−1, y), is input.
A histogram H(t, x+1, y, n), which is an observation value of the SPAD at time t and position (x+1, y), is input.
A histogram H(t, x, y−1, n), which is an observation value of the SPAD at time t and position (x, y−1), is input.
A histogram H(t, x, y+1, n), which is an observation value of the SPAD at time t and position (x, y+1), is input.
A histogram H(t−1, x, y, n), which is an observation value of the SPAD at time t−1 and position (x, y), is input.
A histogram H(t+1, x, y, n), which is an observation value of the SPAD at time t+1 and position (x, y), is input.
Here, n=0 to N−1. Then, the processing proceeds to step S1212.

In step S1212,
the occurrence rate p(t, x, y, n) of the SPAD at time t and position (x, y) is obtained from Expression 179.
The occurrence rate p(t, x−1, y, n) of the SPAD at time t and position (x−1, y) is obtained from Expression 179.
The occurrence rate p(t, x+1, y, n) of the SPAD at time t and position (x+1, y) is obtained from Expression 179.
The occurrence rate p(t, x, y−1, n) of the SPAD at time t and position (x, y−1) is obtained from Expression 179.
The occurrence rate p(t, x, y+1, n) of the SPAD at time t and position (x, y+1) is obtained from Expression 179.
The occurrence rate p(t−1, x, y, n) of the SPAD at time t−1 and position (x, y) is obtained from Expression 179.
The occurrence rate p(t+1, x, y, n) of the SPAD at time t+1 and position (x, y) is obtained from Expression 179.
Here, n=0 to N−1. Then, the processing proceeds to step S1213.

In step S1213, it is determined whether or not the half width of the peak of p(t, x, y, n) is larger than a desired threshold. In a case where the half width is larger, the processing proceeds to step S1214. In a case where the half width is smaller, the processing proceeds to step S1216.

Note that the "desired threshold" in step S1213 is the half width of a peak of the occurrence rate observed in a case where a target object is installed so as to be parallel and stationary with respect to the distance measuring device 10. This value can be acquired by measuring in advance a target object that has been installed so as to be parallel and stationary with respect to the distance measuring device 10.

Furthermore, a known technique may be used as a method of obtaining a peak position and its half width. For example, a method disclosed in Japanese Patent Application Laid-Open No. 6-230001 can be used to obtain the peak position (the position indicated by RT in FIG. 3 of the same publication) and the half width (a value obtained by multiplying the value indicated by HT-RT in FIG. 3 of the same publication by 2). Note that the half width is sometimes referred to as a full width at half maximum.

In step S1214,
a peak position of p(t, x−1, y, n) is obtained, and that time is expressed as Tp(t, x−1, y).
A peak position of p(t, x+1, y, n) is obtained, and that time is expressed as Tp(t, x+1, y).
A peak position of p(t, x, y−1, n) is obtained, and that time is expressed as Tp(t, x, y−1).
A peak position of p(t, x, y+1, n) is obtained, and that time is expressed as Tp(t, x, y+1).
A peak position of p(t−1, x, y, n) is obtained, and that time is expressed as Tp(t−1, x, y).
A peak position of p(t+1, x, y, n) is obtained, and that time is expressed as Tp(t+1, x, y).
Note that in a case where a peak position is obtained in terms of bins, a value obtained by multiplying the bin number by D is Tp(*, *, *). Then, the processing proceeds to step S1215.

In step S1215, information that a target object in a direction corresponding to the SPAD at time t and position (x, y) is in the following situation is output. That is, information regarding a situation that "the target object has an inclination of {Tp(t, x+1, y)×c/2−Tp(t, x−1, y)×c/2}/2 in the X direction, has an inclination of {Tp(t, x, y+1)×c/2−Tp(t, x, y−1)×c/2}/2 in the Y direction, and is moving at a speed of {Tp(t+1, x, y)×c/2−Tp(t−1, x, y)×c/2}/2 over time" is output. Then, the series of processing ends.

In step S1216, information that the target object in the direction corresponding to the SPAD at time t and position (x, y) is in the following situation is output. That is, information regarding a situation that "the target object does not have an inclination with respect to the device, and is not moving" is output. Then, the series of processing ends.

In this way, the situation of the target object 20 in the direction corresponding to the SPAD at time t and position (x, y) can be determined.

Note that in the above description, an occurrence rate p(t, x, y, n) is obtained from a histogram H(t, x, y, n) by Expression 179, and a peak position and the half width of a peak of the occurrence rate p(t, x, y, n) are obtained. However, instead, a peak position and the half width of a peak of a histogram H(t, x, y, n) may be obtained for simplification. That is, although an approximate solution will be obtained, instead of using Expression 179, an occurrence rate p(x, y, n) may be calculated assuming that p(t, x, y, n)=H(t, x, y, n). Here, n=0 to N−1. As a result, the calculation of Expression 179 can be omitted, and the amount of calculation can be reduced.

[Summary]

In this way, the shape and movement of the target object can be found out from the width of the half width of a peak of an occurrence rate (or, for simplification, a histogram).

[Gist]

The gist of the twelfth embodiment is as follows.

(1) A method of obtaining a situation of an object using histogram information, the method including:
- a first input step of inputting a histogram;
- an occurrence rate calculation step of obtaining an occurrence rate by dividing a bin in the histogram by a value obtained by subtracting a frequency of a young bin from the total number in the histogram;
- a first peak detection step of obtaining a peak position and a half width of a peak of the occurrence rate;
- a first determination step of determining whether the half width of the peak is larger or smaller than a desired threshold; and
- a first output step of outputting, in a case where it is determined in the first determination step that the half width is larger, a result that a target object to be measured is oblique or moving.

(2) The method of obtaining a situation of an object according to (1), the method further including:
- a first calculation step of quantitatively calculating, in a case where it is determined in the first determination step that the half width is larger, the degree of obliquity or the degree of movement of the target object to be measured from a difference value between "peak positions of occurrence rates at neighboring positions in time and space" obtained in the first peak detection step; and
- a second output step of outputting the degree of obliquity or the degree of movement in the first calculation step.

(3) A method of obtaining a situation of an object using histogram information, the method including:
- a second input step of inputting a histogram;
- a second peak detection step of obtaining a peak position and a half width of a peak of the histogram;
- a second determination step of determining whether the half width of the peak is larger or smaller than a desired threshold; and
- a third output step of outputting, in a case where it is determined in the second determination step that the half width is larger, a result that a target object to be measured is oblique or moving.

(4) The method of obtaining a situation of an object according to (3), the method further including:
- a second calculation step of quantitatively calculating, in a case where it is determined in the second determination step that the half width is larger, the degree of obliquity or the degree of movement of the target object to be measured from a difference value between "peak positions of histograms at neighboring positions in time and space" obtained in the second peak detection step; and
- a fourth output step of outputting the degree of obliquity or the degree of movement in the second calculation step.

14. Thirteenth Embodiment

[Outline]

In this thirteenth embodiment, an appropriate peak detection is performed on the basis of a histogram indicating a frequency of reception of reflected light to measure a distance to a target object. A case is assumed in which a SPAD that has detected a photon can detect a photon again, and a histogram in such a case is theoretically analyzed.

In the above-described embodiments, it is assumed that a "SPAD detects only the first piece of light (photon) to arrive among a plurality of pieces of light (photons) that has arrived". Then, a histogram is assumed to be obtained by "incrementing the number of bins corresponding to the time when the first piece of light (photon) arrives". However, depending on the type of the SPAD, other pieces of light (photons) can be detected in addition to the first piece of light (photon) to arrive. That is, there are some SPADs with the following specifications.

When arriving light (photon) is detected, a detection operation is not performed for a predetermined time (dead time) from that time. Then, after the predetermined time has elapsed, an operation of detecting arriving light (photon) is performed again. That is, in the above-described embodiments, it is assumed that this dead time is infinite. In the following description, processing of obtaining a probability density function under a condition that light is received again after a finite dead time has elapsed since reception of reflected light will be examined. Note that the dead time is a known value.

In a case where such a SPAD is used, bins in a histogram corresponding to all values of the times at which light (photon) has been detected are incremented by 1. Thus, one time of emission of light from a light emitting unit 12 may cause values of a plurality of bins in a histogram to be incremented.

Figure 121:
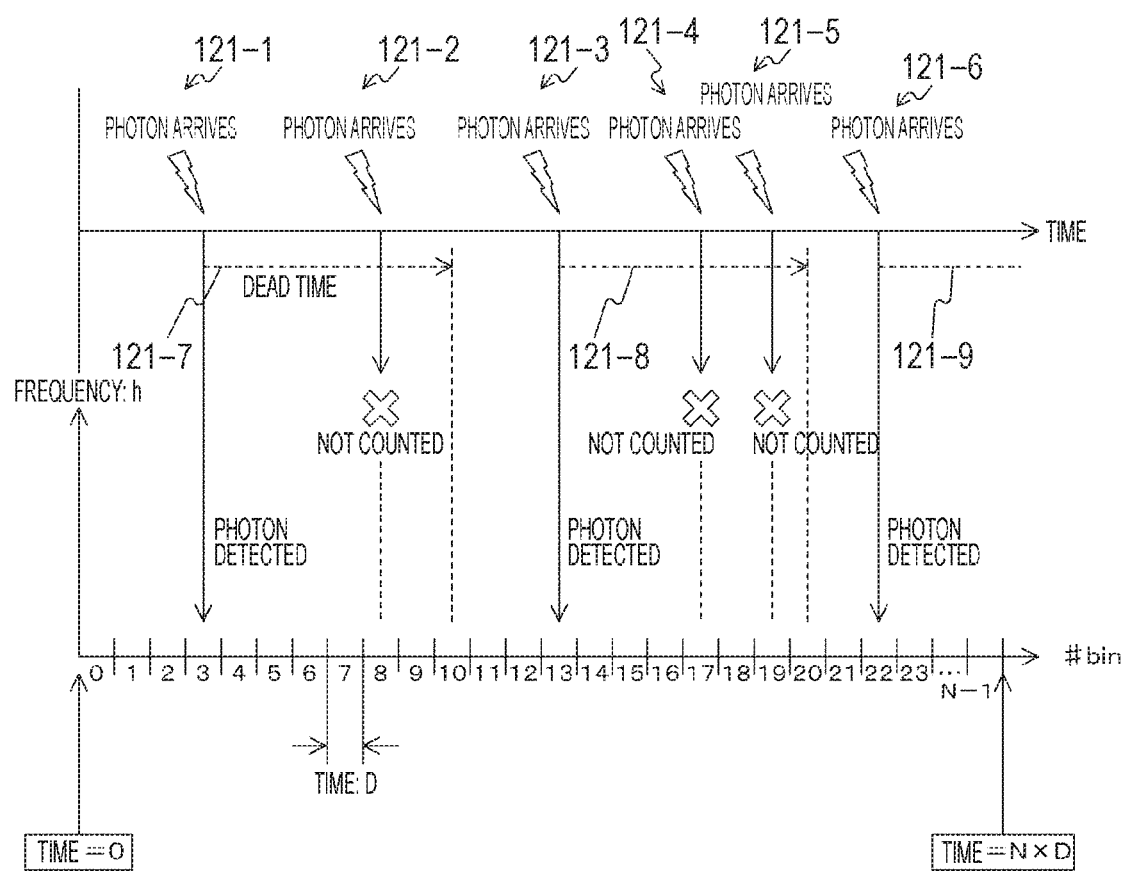

FIG. 121 illustrates a specific example of this operation. In FIG. 121, the horizontal axis represents time. Furthermore, corresponding bin numbers are indicated on the horizontal axis. The width of a bin is expressed as D.

[Detection of Photon]

In the example illustrated in FIG. 121, a piece of light (photon) arrives during a time corresponding to a third bin (i.e., the range from time 3×D to time 4×D). Moreover, a piece of light (photon) arrives during a time corresponding to an eighth bin (i.e., the range from time 8×D to time 9×D). A piece of light (photon) arrives during a time corresponding to a 13th bin (i.e., the range from time 13×D to time 14×D). A piece of light (photon) arrives during a time corresponding to a 17th bin (i.e., the range from time 17×D to time 18×D). A piece of light (photon) arrives during a time corresponding to a 19th bin (i.e., the range from time 19×D to time 20×D). A piece of light (photon) arrives during a time corresponding to a 22nd bin (i.e., the range from time 22×D to time 23×D). Note that in the drawing, numbers 121-1 to 121-6 are respectively assigned to the pieces of light (photons).

In the case illustrated in the drawing, the piece of light (photon) 121-1 is detected by the SPAD. That is, the third bin is incremented by 1. At the same time, a dead time starts. The length of the dead time is indicated by a dotted arrow 121-7 in the drawing. Light (photon) that arrives during this period is not detected. That is, the piece of light (photon) 121-2 is not detected by the SPAD, and histogram data is not updated (not incremented).

The piece of light (photon) 121-3 that arrives next is detected by the SPAD because the dead time has already ended. That is, the 13th bin is incremented by 1. At the same time, a dead time starts again. The length of the dead time is indicated by a dotted arrow 121-8 in the drawing. Light (photon) that arrives during this period is not detected. That is, the pieces of light (photons) 121-4 and 121-5 are not detected by the SPAD, and the histogram data is not updated (not incremented).

The piece of light (photon) 121-6 that arrives next is detected by the SPAD because the dead time has already ended. That is, the 22nd bin is incremented by 1. At the same time, a dead time (121-9 in the drawing) starts again.

Note that dead times are always constant. That is, 121-7, 121-8, and 121-9 are the same in length. In the example of FIG. 121, a dead time has a time length of 7×D.

This continues in a similar manner. A SPAD having dead times operates in this way.

In a case where a SPAD capable of detecting arriving light (photon) again after a dead time in this way is adopted for a SPAD array 13 in a distance measuring device 10, when a frequency h(n) of each bin n in a histogram is observed, an occurrence rate p(n) of an n-th bin is different from that in Expression 8.

Hereinafter, an occurrence rate in a case where a SPAD capable of detecting arriving light (photon) again after a dead time is adopted for the SPAD array 13 in the distance measuring device 10 will be described.

Figure 122:
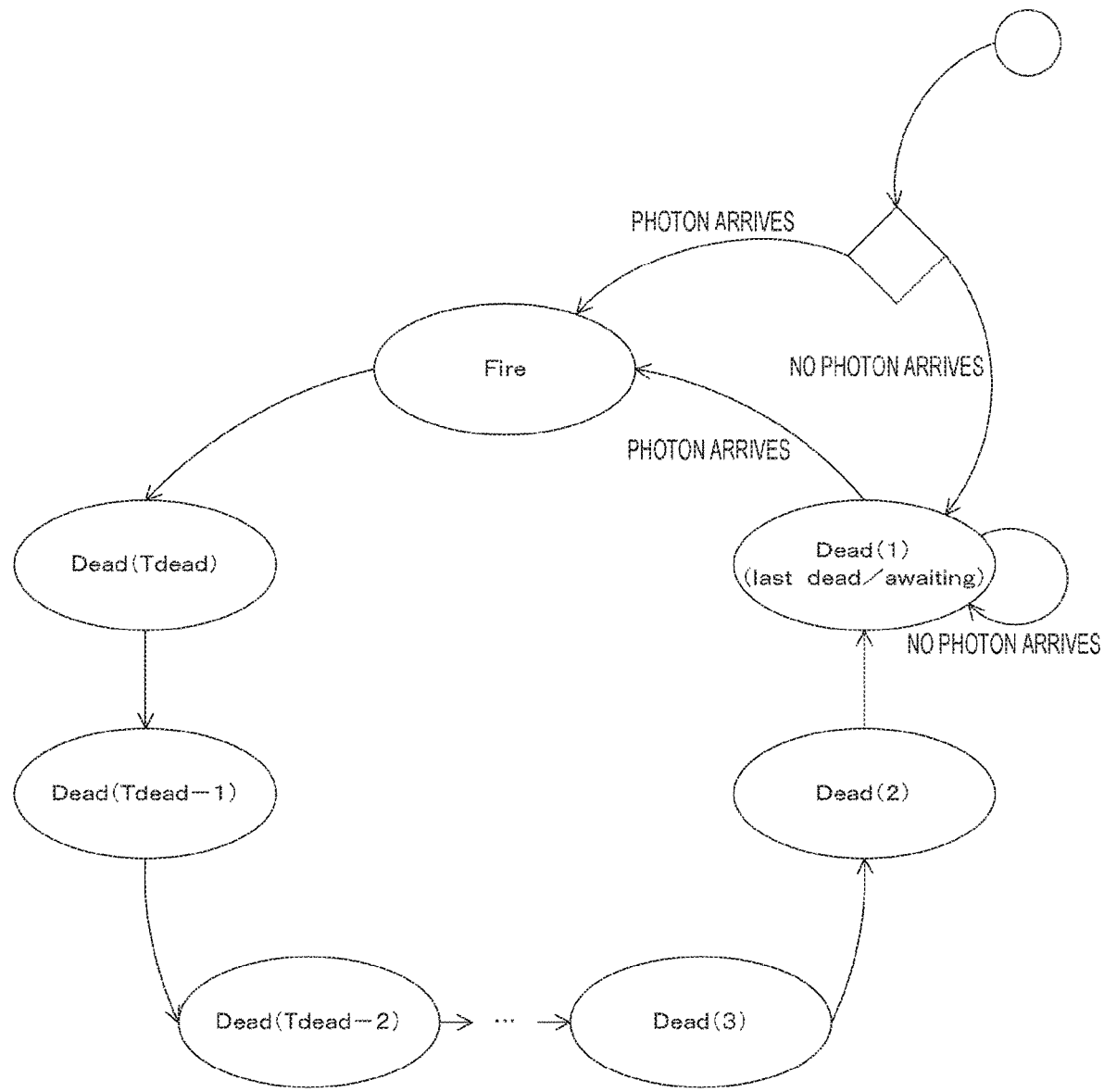

FIG. 122 is a state transition diagram of a SPAD having a dead time according to the thirteenth embodiment of the present technology. Here, Tdead="dead time"/D. That is, Tdead is the length of a dead time in terms of bins. That is, this state transition diagram can be used to manage dead times. Note that "Dead (Tdead−3)" to "Dead (4)" are not illustrated. Furthermore, in the example of FIG. 121, Tdead is 7.

First, in a case where light (photon) first arrives, the state changes into "Fire". In a case where light (photon) does not arrive, the state changes into "Dead (1)". "Dead (1)" is a state in which arriving light (photon) can be detected. In other states, arriving light (photon) cannot be detected.

When the state is "Fire", the state in the next bin is set to "Dead (Tdead)". When the state is "Dead (Tdead)", the state in the next bin is set to "Dead (Tdead−1)". When the state is "Dead (Tdead−1)", the state in the next bin is set to "Dead (Tdead−2)". After that, the state transits in a similar manner. When the state is "Dead (3)", the state in the next bin is set to "Dead (2)". Then, when the state is "Dead (2)", the state in the next bin is set to "Dead (1)". The transition of the state from "Fire" to "Dead (1)" proceeds uniformly regardless of arrival of light (photon).

The state "Fire" means that light (photon) has arrived during a time corresponding to that bin. When a time of Tdead passes in terms of bins, the state changes into "Dead (1)". That is, it means that light (photon) is not detected during the time of Tdead.

In a case where light (photon) arrives while the state is "Dead (1)", the state in the next bin changes into "Fire". In a case where no light (photon) arrives, the state in the next bin remains "Dead (1)". That is, arrival of a photon is awaited (awaiting) during this "Dead (1)".

When the state transition diagram of the SPAD having a dead time illustrated in FIG. 121 is formulated using a matrix, the following Expression 183 is obtained. Expression 183 is a transition matrix.

[Math. 183]

$$T_{state(n)} \overset{def}{=} \begin{pmatrix} 1-p(n) & 0 & 0 & 0 & \cdots & 0 & 0 & 1 \\ p(n) & 0 & & & & & & 0 \\ 0 & 1 & 0 & & & 0 & & 0 \\ 0 & & 1 & 0 & & & & 0 \\ \vdots & & & 1 & \ddots & & & \vdots \\ 0 & & & & \ddots & 0 & & 0 \\ 0 & & 0 & & & 1 & 0 & 0 \\ 0 & & & & & & 1 & 0 \end{pmatrix} \quad \text{Expression 183}$$

The matrix shown in the above Expression 183 is a matrix having "Tdead+1" rows and "Tdead+1" columns. Furthermore, p(n) is an occurrence rate of an n-th bin. Note that, as described above, to be precise, the "probability of arrival of a photon during a time (D) corresponding to a certain bin" is expressed as p(n). To be precise, since an occurrence rate as a general term indicates a probability of occurrence per unit time, p(n) is a value obtained by multiplying an "occurrence rate as a general term" at the time corresponding to the n-th bin by D.

Now, consideration is given to the number of times the state corresponding to the n-th bin changes into each state during M-time measurements (light emission). That is, consideration is given to a "Tdead+1"-dimensional vector shown in the following Expression 184.

[Math. 184]

$$N_{state(n)} \overset{def}{=} \begin{pmatrix} \text{number of State}_{(n)} \text{ which is Dead}_{(1)} \\ \text{number of State}_{(n)} \text{ which is Fire} \\ \text{number of State}_{(n)} \text{ which is Dead}_{(T_{dead})} \\ \text{number of State}_{(n)} \text{ which is Dead}_{(T_{dead}-1)} \\ \vdots \\ \text{number of State}_{(n)} \text{ which is Dead}_{(3)} \\ \text{number of State}_{(n)} \text{ which is Dead}_{(4)} \end{pmatrix} \quad \text{Expression 184}$$

When n=−1 is satisfied, the definition represented by the following Expression 185 is used for convenience. This is an initial value for calculating n=0.

[Math. 185]

$$N_{state(-1)} \overset{def}{=} \begin{pmatrix} M \\ 0 \\ 0 \\ 0 \\ \vdots \\ 0 \\ 0 \end{pmatrix} \quad \text{Expression 185}$$

At this time, the following Expression 186 holds.

[Math. 186]

$$N_{state(n)} = T_{state(n)} N_{state(n-1)} \qquad \text{Expression 186}$$

Here, n is 0 to N−1.

The second row of the above Expression 186 (i.e., "Tstate(n)·Nstate(n−1)") indicates the number of times the state of the n-th bin changes into "Fire". That is, it indicates the number of times the SPAD has detected light (photon) during a time corresponding to the n-th bin (i.e., the range from time n×D to time (n+1)×D). When M-time measurements (M-time emissions and receptions of light) are actually performed, the number of times the SPAD reacts during the time corresponding to the n-th bin is h(n), so the following Expression 187 holds.

[Math. 187]

$$\text{Second row of } "T_{state(n)} N_{state(n-1)}" = h_{(n)} \qquad \text{Expression 187}$$

Thus, since h(n) is an observation value and is known, the value of p(0) in Expression 183 is obtained from Expressions 187 and 185, where n=0. That is, Tstate(0) is determined. Moreover, Nstate(0) is determined by Expression 186.

Next, consideration is given to n=1. The value of p(1) in Expression 183 is obtained from Expression 187, where n=1, and the previously determined Nstate(0). That is, Tstate(1) is determined. Moreover, Nstate(1) is also determined by Expression 186.

Next, consideration is given to n=2. The value of p(2) in Expression 183 is obtained from Expression 187, where n=2, and the previously determined Nstate(1). That is, Tstate(2) is determined. Moreover, Nstate(2) is determined by Expression 186.

After that, in a similar manner, p(n), Tstate(n), and Nstate(n) can be obtained for every n from n=0 to N−1.

Now, the value of the first row of Nstate(n), which is a Tdead+1-dimensional vector, is expressed as Md(n). Here, n=0 to N−1. Furthermore, the value of the first row of Nstate(−1) is expressed as Md(−1). That is, Md(−1)=M. When M-time measurements are performed, the number of times the state is Dead (1) during a time corresponding to an (n−1)-th bin is expressed as Md(n−1). Furthermore, during the time corresponding to the n-th bin, h(n) times of arrival of light (photon) are observed. Thus, when the frequency h(n) of each bin n in the histogram has been observed and the occurrence rate p(n) of the n-th bin is used as a random variable, the probability density function indicates a normal distribution with an average represented by Expression 188 and a standard deviation represented by Expression 189.

[Math. 188]

$$p_{(n)} = \frac{h_{(n)}}{Md_{(n-1)}} \qquad \text{Expression 188}$$

[Math. 189]

$$\sqrt{\frac{1}{Md_{(n-1)}} \frac{h_{(n)}}{Md_{(n-1)}} \left(1 - \frac{h_{(n)}}{Md_{(n-1)}}\right)} \qquad \text{Expression 189}$$

In other words, in a case where the SPAD used in the SPAD array 13 is a "SPAD that detects only the first piece of light (photon) to arrive", the probability density function when the occurrence rate is used as a random variable is expressed by Expression 8, while in a case where the SPAD is a "SPAD capable of detecting light (photon) once and then detecting arriving light (photon) again after a dead time", the following Expression 190 may be adopted as the probability density function. That is, on the basis of state transition used to manage dead times, the probability density function is obtained as follows.

[Math. 190]

$$N\left(\frac{h_{(n)}}{Md_{(n-1)}}, \frac{1}{Md_{(n-1)}} \frac{h_{(n)}}{Md_{(n-1)}} \left(1 - \frac{h_{(n)}}{Md_{(n-1)}}\right)\right) \qquad \text{Expression 190}$$

Figure 123:
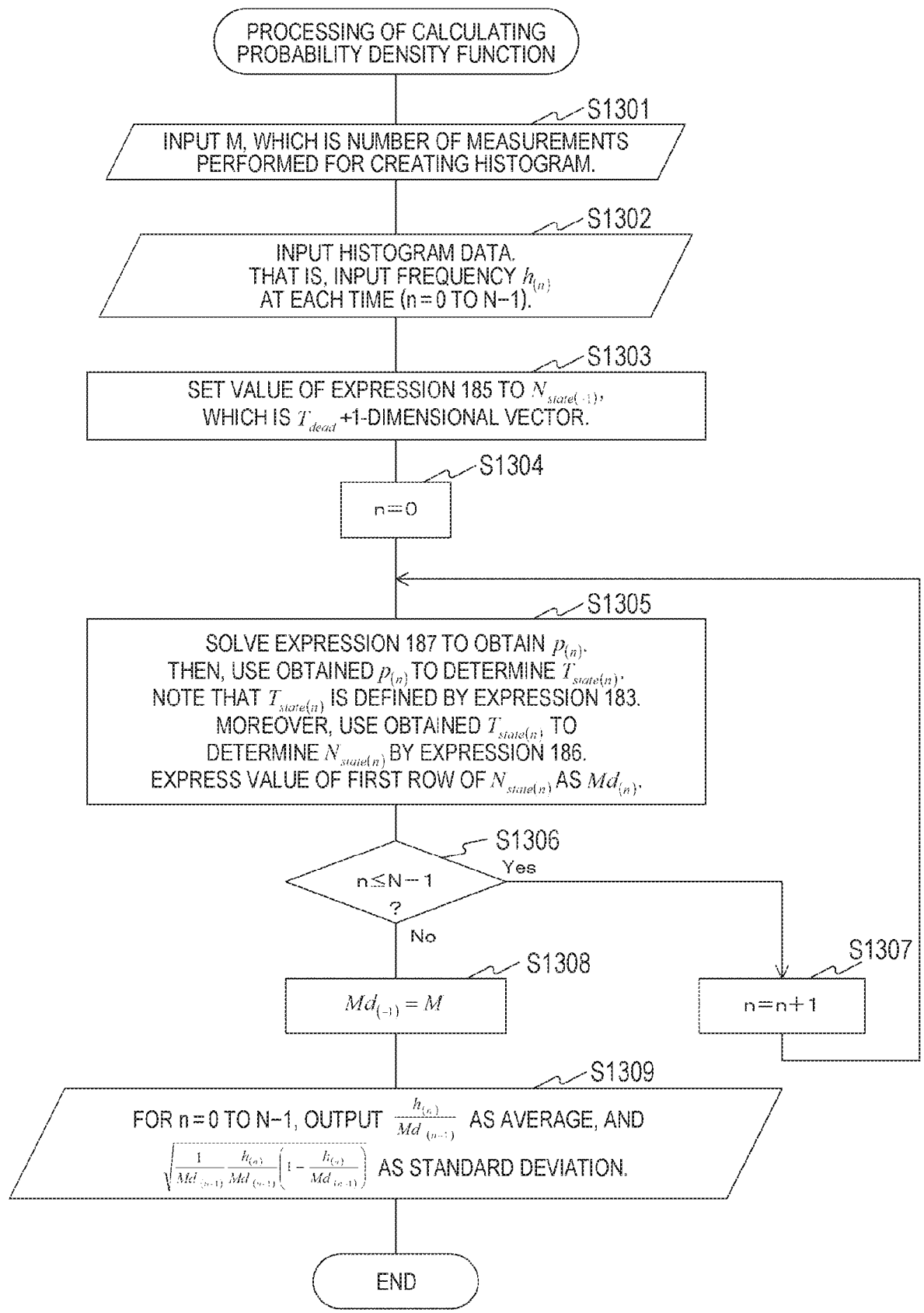

In a case where the SPAD used in the SPAD array 13 is a "SPAD capable of detecting light (photon) once and then detecting arriving light (photon) again after a dead time" and the occurrence rate is used as a random variable, the probability density function can be calculated by a processing procedure illustrated in FIG. 123 instead of FIG. 5.

FIG. 123 is a flowchart illustrating an example of a processing procedure for calculating a probability density function according to the thirteenth embodiment of the present technology. This processing is performed by the computation unit 16.

First, in step S1301, a numerical value M, which is the number of measurements performed for creating a histogram, is input. Then, the processing proceeds to step S1302.

In step S1302, histogram data created by an accumulation unit 15 is input. That is, the frequency h(n) in each bin n is input. Here, n=0 to N−1. Then, the processing proceeds to step S1303.

In step S1303, Nstate(−1), which is a Tdead+1-dimensional vector defined in the above-described Expression 185, is set. Then, the processing proceeds to step S1304.

In step S1304, n is set to 0. Then, the processing proceeds to step S1305.

In step S1305, Expression 187 is solved to obtain p(n). Then, Tstate(n) is determined using the obtained p(n). Note that Tstate(n) is defined by Expression 183. Moreover, Nstate(n) is determined by Expression 186 using the obtained Tstate(n). The value of the first row of Nstate(n) is expressed as Md(n). Then, the processing proceeds to step S1306.

In step S1306, it is checked whether the current value of n is equal to or smaller than N−1. If the current value is equal to or smaller than N−1, the processing proceeds to step S1307. If not, the processing proceeds to step S1308.

In step S1307, the value of n is incremented by 1, and the processing proceeds to step S1305.

In step S1308, M is set to Md(−1). Then, the processing proceeds to step S1309.

In step S1309, h(n)/Md(n−1) is output as an average, and "the square root of (1/Md(n−1)×h(n)/Md(n−1)×(1−h(n)/Md(n−1)))" is output as a standard deviation. Then, the series of processing ends. Here, n=0 to N−1.

Instead of using the "probability density function when the occurrence rate p(n) of the n-th bin is used as a random variable" described with reference to Expression 8 and FIG. 5 in the previously described embodiments from the "first embodiment" to the "twelfth embodiment", the "probability density function when the occurrence rate p(n) of the n-th bin is used as a random variable" described with reference to Expression 190 and FIG. 123 may be used so that the present technology may be applied also to a case where the SPAD used in the SPAD array 13 is a "SPAD capable of detecting light (photon) once and then detecting arriving light (photon) again after a dead time".

[Subdivided Bins]

In the preceding description, it has been assumed that a dead time has a time length of Tdead="dead time"/D, which can be divided evenly by a bin interval D. In the following description, a case where the time length cannot be divided evenly by the bin interval D will be described. That is, consideration is given to a case where the "time length of a dead time" is expressed as Tdead/Udead×D. Here, in such a case, Tdead and Udead are natural numbers, and Udead is equal to or greater than 2. Note that the above description assumes a case where Udead=1.

Figure 124:
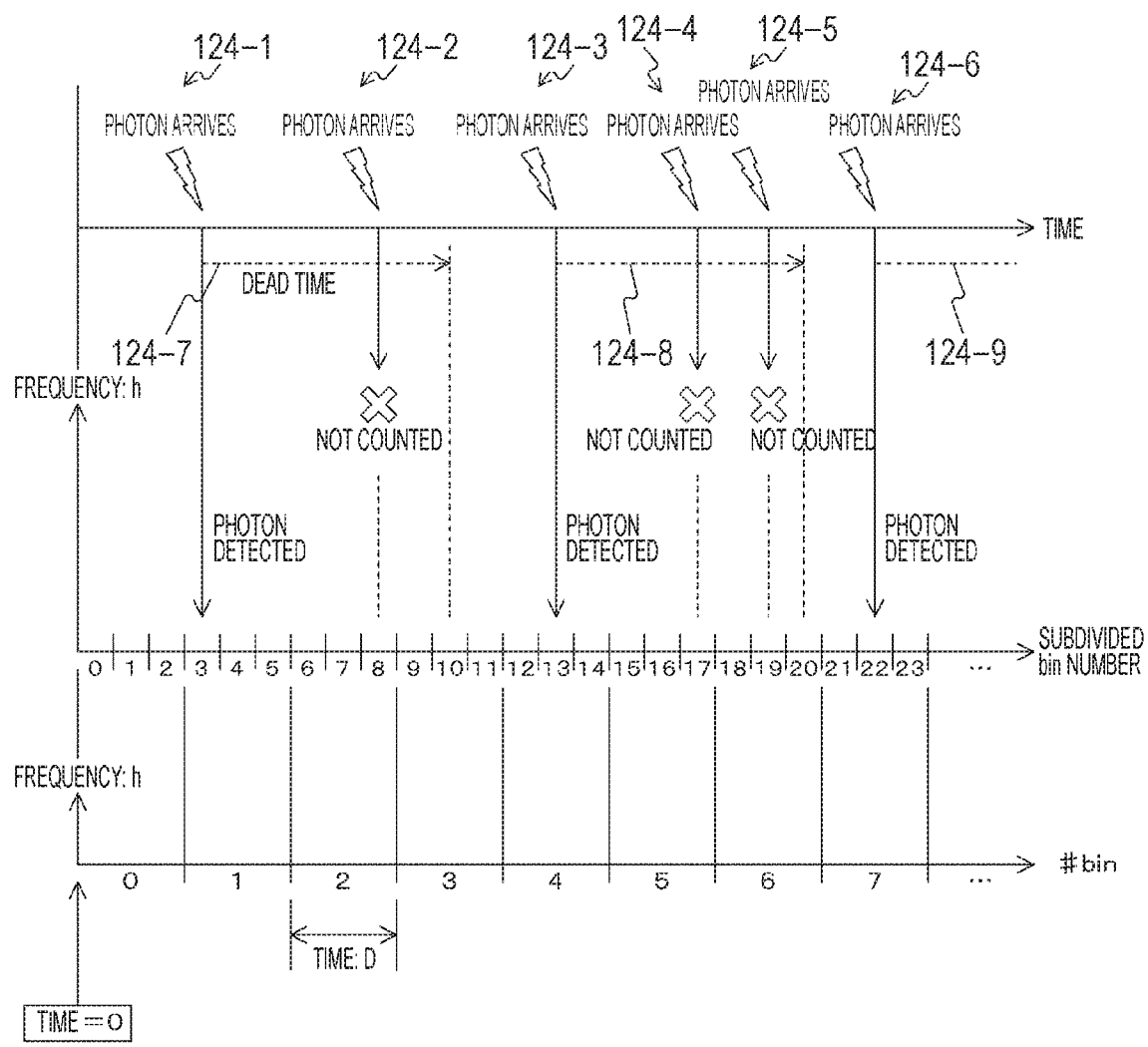

In a case where Udead is equal to or greater than 2, "subdivided bins" obtained by dividing each bin into Udead bins are considered. As a specific example, FIG. 124 illustrates a case where Udead=3. In the drawing, the horizontal axis represents time. Furthermore, corresponding bin numbers are indicated on the horizontal axis. The width of a bin is expressed as D. Moreover, numbers of the corresponding "subdivided bins" are also indicated on the horizontal axis. The ratio between a "bin" and a "subdivided bin" is Udead (3 in the illustrated example). Note that the times corresponding to eighth to (N−1)-th bins are not illustrated in the drawing.

In the example illustrated in FIG. 124, a piece of light (photon) arrives during a time corresponding to a third "subdivided bin" (i.e., the range from time 3×D/Udead to time 4×D/Udead). Moreover, a piece of light (photon) arrives during a time corresponding to an eighth "subdivided bin" (i.e., the range from time 8×D/Udead to time 9×D/Udead). A piece of light (photon) arrives during a time corresponding to a 13th "subdivided bin" (i.e., the range from time 13×D/Udead to time 14×D/Udead). A piece of light (photon) arrives during a time corresponding to a 17th "subdivided bin" (i.e., the range from time 17×D/Udead to time 18×D/Udead). A piece of light (photon)) arrives during the time corresponding to a 19th "subdivided bin" (i.e., the range from time 19×D/Udead to time 20×D/Udead). A piece of light (photon) arrives during the time corresponding to a 22nd "subdivided bin" (i.e., the range from time 22×D/Udead to time 23×D/Udead). In the drawing, numbers 124-1 to 124-6 are respectively assigned to the pieces of light (photons).

In the case illustrated in the drawing, the piece of light (photon) 124-1 is detected by a SPAD. That is, a first bin is incremented by 1. At the same time, a dead time starts. The length of the dead time is indicated by a dotted arrow 124-7 in the drawing. Light (photon) that arrives during this period is not detected. That is, the piece of light (photon) 124-2 is not detected by the SPAD, and histogram data is not updated (not incremented).

The piece of light (photon) 124-3 that arrives next is detected by the SPAD because the dead time has already ended. That is, a fourth bin is incremented by 1. At the same time, a dead time starts again. The length of the dead time is indicated by a dotted arrow 124-8 in the drawing. Light (photon) that arrives during this period is not detected. That is, the pieces of light (photons) 124-4 and 124-5 are not detected by the SPAD, and the histogram data is not updated (not incremented).

The piece of light (photon) 124-6 that arrives next is detected by the SPAD because the dead time has already ended. That is, a seventh bin is incremented by 1. At the same time, a dead time (124-9 in the drawing) starts again.

Note that dead times are always constant. That is, 124-7, 124-8, and 124-9 are the same in length. In the example of FIG. 124, a dead time has a time length of 7×D/Udead. That is, since a case where Udead=3 is assumed in the drawing, a dead time has a time length of (7/3)×D.

This continues in a similar manner. A SPAD having dead times operates in this way.

In a case where Udead=1 is not satisfied, an occurrence rate can be obtained by giving a similar consideration as described above to these "subdivided bins". That is, an occurrence rate ps(k) of a k-th "subdivided bin" can be obtained. To be precise, a "probability of arrival of a photon during a time (D/Udead) corresponding to a certain subdivided bin" is expressed as ps(k). To be precise, since an occurrence rate as a general term indicates a probability of occurrence per unit time, ps(k) is a value obtained by multiplying an "occurrence rate as a general term" at the time corresponding to the k-th subdivided bin by "D/Udead".

Now, in FIG. 121, a frequency (h(n)) is observed for each bin (n). On the other hand, for the "subdivided bins" illustrated in FIG. 124, only a value represented by the following Expression 191 is observed as h(n).

[Math. 191]

$$h_{(n)} = \sum_{k=U_{dead} \times n}^{U_{dead} \times (n+1)-1} h_{s(k)} \qquad \text{Expression 191}$$

Here, hs(k) is the number of times a piece of light (photon) arrives, causing the SPAD to react and detect the light (photon) during a time corresponding to a k-th "subdivided bin" (i.e., the range from time k×D/Udead to time (k+1)×D/Udead).

That is, the number of times hs(k) a piece of light (photon) arrives, causing the SPAD to react and detect the light (photon) during the time corresponding to the k-th "subdivided bin" cannot be observed for each k. Instead, a value obtained by cumulatively adding Udead pieces of hs(k) is observed. However, a solution cannot be obtained in this state, so a certain assumption is made. That is, the following Expression 192 is used.

[Math. 192]

$$p_{s(U_{dead} \times n)} = p_{s(U_{dead} \times n+1)} = \cdots = p_{s(U_{dead} \times (n+1)-1)} \qquad \text{Expression 192}$$

This assumption is reasonable because the occurrence rate does not change abruptly between times that are in proximity to each other.

Considering in a similar manner to the description of using a matrix to formulate the state transition diagram of the SPAD having a dead time illustrated in FIG. 121 (Expression 183), in this case, the transition matrix is as shown in the following Expression 193.

[Math. 193]

$$T_{state\_s(k)} \overset{def}{=} \begin{pmatrix} 1 - p_{s(k)} & 0 & 0 & 0 & \cdots & 0 & 0 & 1 \\ p_{s(k)} & 0 & & & & & & 0 \\ 0 & 1 & 0 & & & & 0 & 0 \\ 0 & & 1 & 0 & & & & 0 \\ \vdots & & & 1 & \ddots & & & \vdots \\ 0 & & & & \ddots & 0 & & 0 \\ 0 & & & & & 1 & 0 & 0 \\ 0 & & & & & & 1 & 0 \end{pmatrix} \qquad \text{Expression 193}$$

The matrix shown in the above Expression 193 is a matrix having "Tdead+1" rows and "Tdead+1" columns. Furthermore, ps(k) is an occurrence rate of the k-th "subdivided bin".

Now, consideration is given to the number of times the state corresponding to the k-th "subdivided bin" changes into each state during M-time measurements (light emission). That is, consideration is given to a "Tdead+1"-dimensional vector shown in the following Expression 194.

[Math. 194]

$$N_{state\_s(k)} \stackrel{def}{=} \begin{pmatrix} \text{number of State}_{(k)} \text{ which is Dead}_{(1)} \\ \text{number of State}_{(k)} \text{ which is Fire} \\ \text{number of State}_{(k)} \text{ which is Dead}_{(T_{dead})} \\ \text{number of State}_{(k)} \text{ which is Dead}_{(T_{dead}-1)} \\ \vdots \\ \text{number of State}_{(k)} \text{ which is Dead}_{(3)} \\ \text{number of State}_{(k)} \text{ which is Dead}_{(2)} \end{pmatrix} \quad \text{Expression 194}$$

When n=−1 is satisfied, the definition represented by the following Expression 195 is used for convenience. This is an initial value for calculating k=0.

[Math. 195]

$$N_{state\_s(-1)} \stackrel{def}{=} \begin{pmatrix} M \\ 0 \\ 0 \\ 0 \\ \vdots \\ 0 \\ 0 \end{pmatrix} \quad \text{Expression 195}$$

At this time, the following Expression 196 holds.

[Math. 196]

$$N_{state\_s(k)} = T_{state\_s(k)} N_{state\_s(k-1)} \quad \text{Expression 196}$$

Here, k is 0 to N×Udead−1.

The second row of the above Expression 196 (i.e., "Tstate_s(k)·Nstate_s(k−1)") indicates the number of times the state in the k-th "subdivided bin" changes into "Fire". That is, it indicates the number of times the SPAD detects light (photon) during a time corresponding to the k-th "subdivided bin" (i.e., the range from time k×D/Udead to time (k+1)×D/Udead). When M-time measurements (M-time emissions and receptions of light) are actually performed, the number of times the SPAD reacts during the time corresponding to the k-th "subdivided bin" is hs(k), so the following Expression 197 holds.

[Math. 197]

$$\text{Second row of } "T_{state\_s(k)} N_{state\_s(k-1)}" = h_{s(k)} \quad \text{Expression 197}$$

Thus, since h(n) is an observation value and is known, n=0 is set and Expressions 197, 191, 192, and 195, where k=Udead×n to Udead×(n+1)−1, are used to obtain the value of ps(k) in Expression 193, where k=Udead×n to Udead×(n+1)−1. That is, Tstate_s(k) is determined. Moreover, Nstate_s(k) is also determined by Expression 196.

Next, consideration is given to n=1. n=1 is set, and Expressions 197, 191, and 192, where k=Udead×n to Udead×(n+1)−1, and the previously determined Nstate_s (Udead×n−1) are used to obtain the value of ps(k) in Expression 193, where k=Udead×n to Udead×(n+1)−1. That is, Tstate_s(k) is determined. Moreover, Nstate_s(k) is also determined by Expression 196.

Next, consideration is given to n=2. n=2 is set, and Expressions 197, 191, and 192, where k=Udead×n to Udead×(n+1)−1, and the previously determined Nstate_s (Udead×n−1) are used to obtain the value of ps(k) in Expression 193, where k=Udead×n to Udead×(n+1)−1. That is, Tstates(k) is determined. Moreover, Nstate_s(k) is also determined by Expression 196.

After that, in a similar manner, ps(k), Tstate_s(k), and Nstate_s(k), where k=Udead×n to Udead×(n+1)−1, can be obtained for every n from n=0 to N−1.

Next, consideration is given to obtaining an occurrence rate p(n) of an n-th bin. The value of the first row of Nstate_s((n+1)×Udead−1) is expressed as Md(n). Here, n=0 to N−1. Furthermore, the value of the first row of Nstate_s (−1) is expressed as Md(−1). That is, Md(−1)=M.

Now, the time immediately preceding time n×D corresponds to a bin immediately preceding n×Udead in the subdivided bins. That is, the time corresponds to an (n×Udead−1)-th bin. Thus, in M-time measurements, the number of times the state is Dead (1) at the time immediately preceding time n×D is expressed as Md(n−1). Furthermore, during the time corresponding to the n-th bin, h(n) times of arrival of light (photon) are observed. Thus, when the frequency h(n) of each bin n in the histogram has been observed and the occurrence rate p(n) of the n-th bin is used as a random variable, the probability density function indicates a normal distribution with an average represented by the above-described Expression 188 and a standard deviation represented by the above-described Expression 189.

Figure 125:
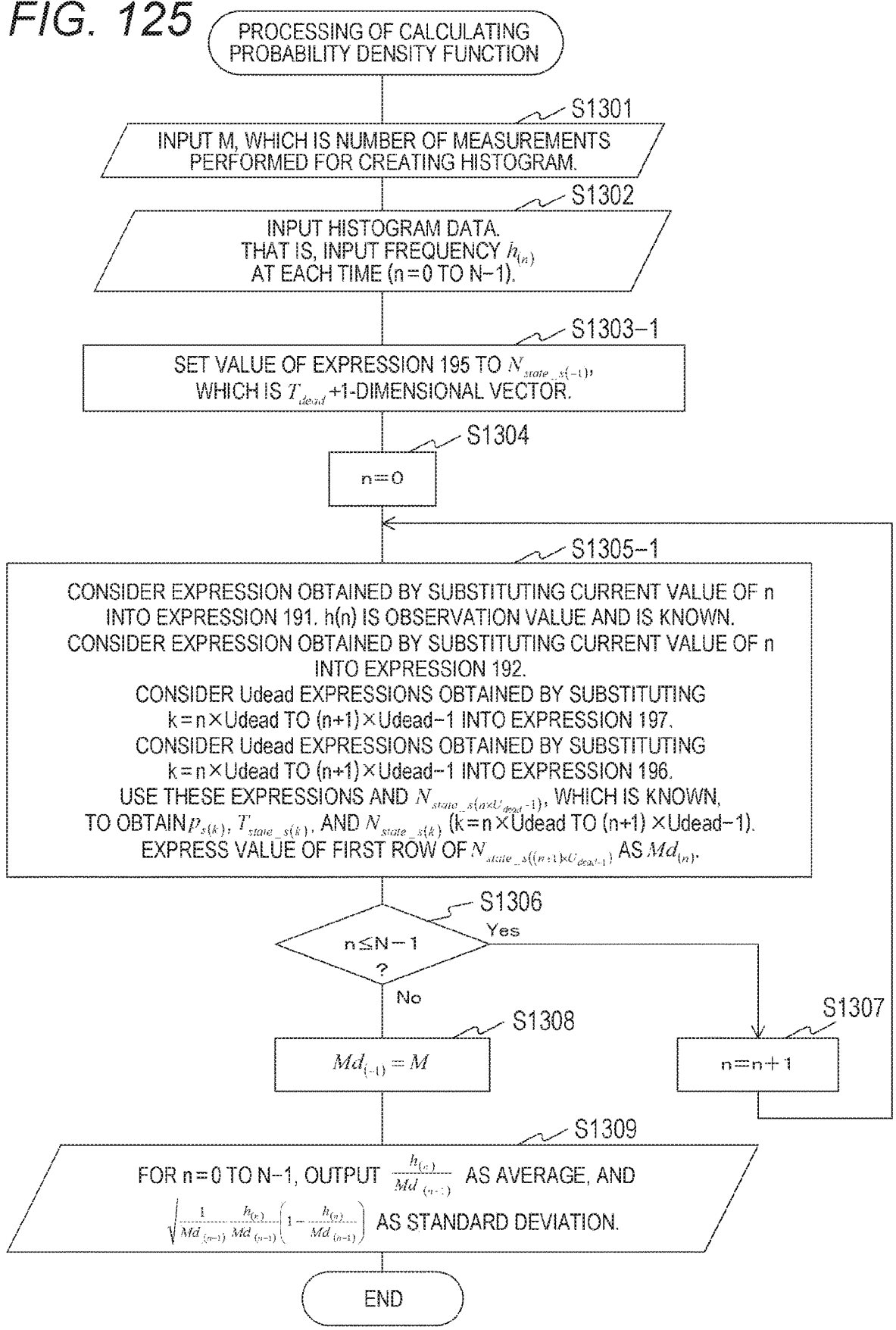
Figure 127A:
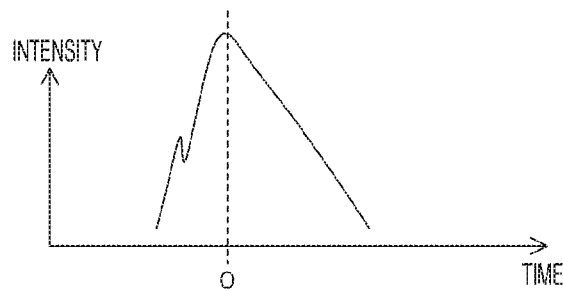
Figure 127B:
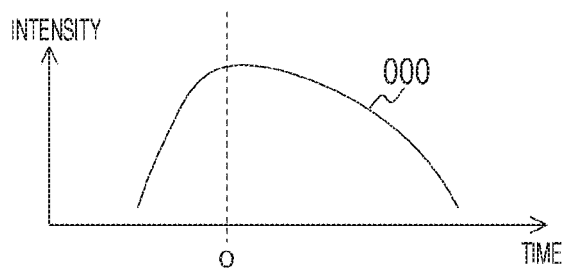
Figure 127C:
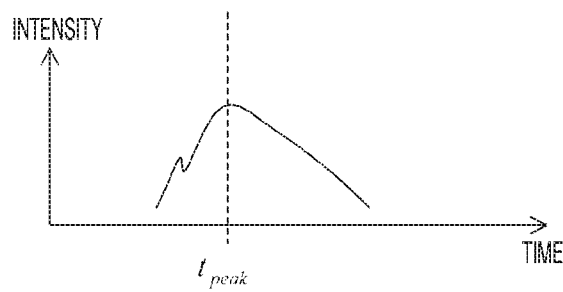
Figure 127D:
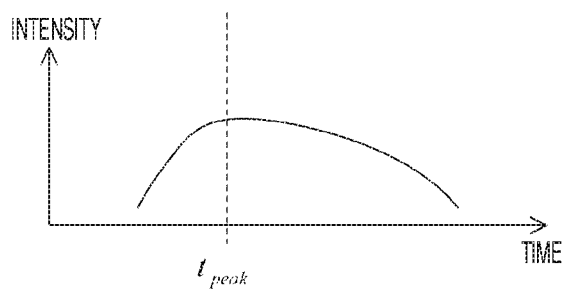
Figure 127E:
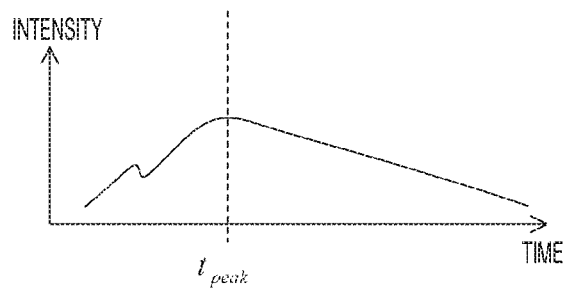
Figure 127F:
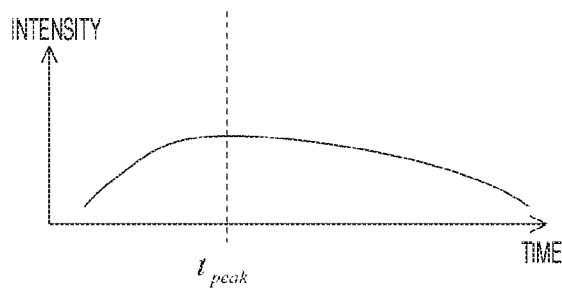

On the basis of the above, steps S1303-1 and S1305-1 in FIG. 125 may be performed instead of steps S1303 and 1305 in FIG. 123, respectively. With this change, an occurrence rate can be calculated also in a case where the "time length of a dead time" is expressed as Tdead/Udead×D, where Udead is an integer equal to or greater than 2.

Note that in step S1303-1, Nstate_s(−1), which is a Tdead+1-dimensional vector defined in the above-described Expression 193, is set.

In step S1305-1, consideration is given to an expression obtained by substituting the current value of n into Expression 191. h(n) is an observation value and is known. Consideration is given to an expression obtained by substituting the current value of n into Expression 192. Consideration is given to Udead expressions obtained by substituting k=n× Udead to (n+1)×Udead−1 into Expression 197. Consideration is given to Udead expressions obtained by substituting k=n×Udead to (n+1)×Udead−1 into Expression 196. These expressions and Nstate_s(n×Udead−1), which is known, are used to obtain ps(k), Tstate_s(k), and Nstate_s(k) (k=n× Udead to (n+1)×Udead−1). The value of the first row of Nstate_s((n+1)×Udead−1) is expressed as Md(n).

In this way, by applying the thirteenth embodiment, it is possible to theoretically analyze a histogram in a case where the SPAD has a finite dead time.

[Gist]

The gist of the thirteenth embodiment is as follows.

(1) A distance measuring device including:
  a histogram acquisition unit that obtains a histogram indicating a frequency of reception of reflected light including active light components of active light emitted from a light emitting unit and reflected by a target object and ambient light components of ambient light reflected by the target object;

a detection unit that detects a distribution of the active light components by performing predetermined statistical processing on the histogram; and a measurement unit that measures a distance to the target object as distance information on the basis of the distribution of the active light components, in which the detection unit performs, as the predetermined statistical processing, processing of obtaining a probability density function when an occurrence rate caused by reception of the reflected light is used as a random variable, and in a case where the frequency of reception is counted but is not counted during specific times (dead times), the detection unit performs the processing of obtaining the probability density function taking into consideration a state transition having states of the same number as the dead times.

(2) The distance measuring device according to (1), in which the detection unit performs, in a case where the dead times are not an integral multiple of a time resolution of the histogram, the processing of obtaining the probability density function taking into consideration the state transition having states of the same number as the dead times, at a time interval subdivided in the time direction, and the subdivided time interval is a time interval in which a value of an integral multiple is the time resolution of the histogram and a value of an integral multiple is the dead times.

15. Fourteenth Embodiment

[Outline]

Here, an embodiment will be described in which a peak of an occurrence rate is obtained with an accuracy equal to or smaller than D. Note that D is a bin width (time width) as already described. By detecting a peak of an occurrence rate and multiplying a bin number corresponding to that position by time D, the time of the position of the peak can be obtained. However, in this case, the time of the peak position can be obtained only in units of D. Here, a description will be given of processing of obtaining the time with an accuracy equal to or smaller than in units of D by interpolation to improve a time resolution.

Note that, as already described, a distance to a target object can be calculated by multiplying the time of a peak position by the speed of light (c) and dividing the result by 2. That is, if the time of a peak position can be calculated with a finer time resolution to obtain the time, a measuring device with a finer distance resolution can be provided.

[Distance measurement]

FIG. 126 is a diagram illustrating an example of an intensity distribution in distance measurement according to a fourteenth embodiment of the present technology. By measuring the intensity of light emitted from a light emitting unit 12 in advance, this intensity distribution becomes known.

It is assumed that light is emitted from the light emitting unit 12 as illustrated in A in the drawing. The intensity changes over time. Note that the peak position is set to time 0.

In an n-th bin of a histogram, the number of times a piece of light (photon) is detected during the time corresponding to the bin (the range from time (n−1)×D to time n×D) is stored as data. That is, a result of a convolution of the intensity of A in the drawing with a box filter (B in the drawing) having a width of D is used as data of each bin. That is, the data of each bin is proportional to an intensity illustrated in C in the drawing. C in the drawing illustrates the result of convolution of A in the drawing with B in the drawing. Moreover, a waveform of C in the drawing is approximated by, for example, a polynomial (D in the drawing). An approximate expression is expressed as Lightorg(t). Since the intensity distribution of A in the drawing is known, C in the drawing is also known, and "Lightorg(t), which is a function of t", which is obtained by approximating C, is also known.

Now, as described immediately above, "the data of each bin is proportional to an intensity illustrated in C in the drawing", and this will be considered in detail with reference to FIG. 127.

A in FIG. 127 is identical to A in FIG. 126. That is, the intensity of light emitted from the light emitting unit 12 is illustrated.

Then, B in FIG. 127 is identical to D in FIG. 126.

It is assumed that light emitted from the light emitting unit 12 reaches a SPAD in a SPAD array 13 with a delay of time tpeak. Here, tpeak is equal to a "distance to a target object"×2/c.

Naturally, the intensity attenuates as the light travels a to-and-fro "distance to the target object". Thus, as illustrated in C in FIG. 127, the intensity of the light that reaches the SPAD in the SPAD array 13 has a smaller amplitude than A in the drawing. That is, the data of each bin is as illustrated in D in the drawing. Note that D in the drawing illustrates a waveform obtained by multiplying B in the drawing by a constant in the vertical axis direction.

Furthermore, the light from the light emitting unit 12 may reach the SPAD in the SPAD array 13 with an increased width caused by internal scattering at a subject, which is a reflection surface. That is, the SPAD in the SPAD array 13 receives the intensity as illustrated in E in FIG. 127. E in the drawing illustrates a waveform having an amplitude smaller and wider in the time direction as compared with A in the drawing. That is, the data of each bin is as illustrated in E in the drawing. Note that E in the drawing illustrates a waveform obtained by multiplying B in the drawing by a constant in the vertical axis direction and multiplying B by a constant in the horizontal axis direction.

Note that the peak positions in C to F in the drawing are at tpeak. This is because a delay equivalent to the time it takes to travel the to-and-fro "distance to the target object" occurs.

From the above consideration, it can be understood that the light that reaches the SPAD in the SPAD array 13 has an intensity obtained by multiplying Lightorg(t) (known as described above) by a constant (blight) in the time direction and then multiplying this function by a constant (alight). Furthermore, an occurrence rate also includes ambient light components that are constant regardless of time. Since the intensity is proportional to the occurrence rate, the occurrence rate is represented by the following Expression 198.

[Math. 198]

$$p_t(t) = a_{light} \times \text{Light}_{org}(b_{light} \times (t - t_{peak})) + c_{light} \quad \text{Expression 198}$$

Here, alight, blight, and clight are unknowns that change depending on the situation. clight is ambient light components. Furthermore, while the symbol p(n) has been used as an occurrence rate corresponding to an n-th bin, since an occurrence rate during time t is considered here, pt, which is a symbol different from p, is used to distinguish the occurrence rate at time t from this. pt(t) is an occurrence rate at time t. In a precise manner, taking into consideration consistency with p(n), pt(t) is used to express a "probability of arrival of a photon during an interval from time t−D/2 to time t+D/2 (D as a time width)". To be precise, since an occurrence rate as a general term indicates a probability of occurrence per unit time, pt(t) is a value obtained by multiplying an "occurrence rate as a general term" at time t by D.

Since p(n) is a probability that light (photon) arrives in the range from time n×D to time (n+1)×D, it can be said that p(n)=pt (D×(n+0.5)) holds.

In this embodiment, it is processing of obtaining a peak position (position of a maximal value) tpeak of pt(t).

Since an occurrence rate p(n) corresponding to each bin can be obtained as described using Expression 6, the description in this embodiment assumes that p(n) has already been obtained. Here, n is 0 to N−1.

A peak position of p(n), which is a function of n, is detected, and its value is expressed as np. np is 0 to N−1. tpeak is in proximity to the time corresponding to an np-th bin. To be more exact, tpeak satisfies Expression 199.

[Math. 199]

$$D \times (n_p - 1 + 0.5) < t_{peak} < D \times (n_p + 1 + 0.5) \quad \text{Expression 199}$$

Figure 128:
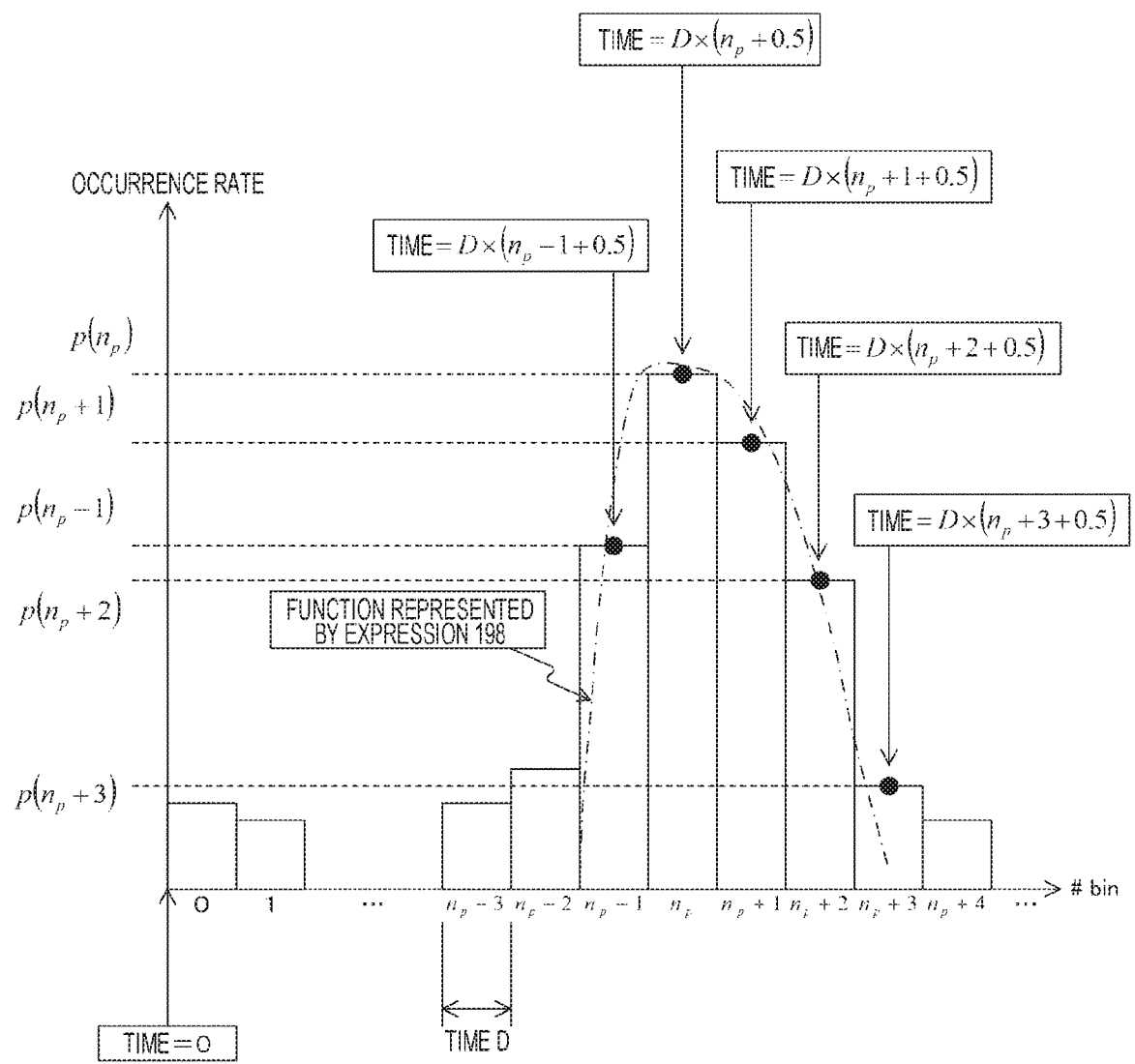

Consequently, data p(n), which is in proximity to np, is used to perform function fitting represented by Expression 198. A specific example is illustrated in FIG. 128. The bar graph in the drawing represents an occurrence rate corresponding to each bin. Note that the portion of bins 2 to np−4 and np+5 to N−1 are not illustrated in the drawing.

In the drawing, five examples, np−1, np, np+1, np+2, and np+3 are illustrated as data in proximity to np used for the function fitting.

An occurrence rate p(np−1) is a probability that light (photon) arrives in the range from time (np−1)×D to time (np−1+1)×D, and can be said to be an occurrence rate at time D×(np−1+0.5). The same applies to occurrence rates p(np), p(np+1), p(np+2), and p(np+3). These are illustrated as five black circles in FIG. 128. The five black circles indicate that occurrence rates at time D×(np−1+0.5), time D×(np+0.5), time D×(np+1+0.5), time D×(np+2+0.5), and time D×(np+3+0.5) are respectively p(np−1), p(np), p(np+1), p(np+2), and p(np+3).

A function (indicated by a dashed line in the drawing) represented by Expression 198 that passes as close as possible to these five black circles can be obtained. That is, alight, blight, clight, and tpeak that satisfy the following Expression 200, which is a least square error expression, can be obtained. Note that argmin in Expression 200 means that alight, blight, clight, and tpeak that minimize the value of the expression are obtained.

[Math. 200]

$$\underset{a_{light}, b_{light}, c_{light}, t_{peak}}{\arg\min} \sum_{n \in neighbourhood \ of \ np} \frac{\{p(n) - a_{light} \times \text{Light}_{org}(b_{light} \times (D \times (n + 0.5) - t_{peak})) - c_{light}\}^2}{\sigma(n)^2} \quad \text{Expression 200}$$

Σ on the right-hand side of the above Expression 200 is a sum of data in proximity to np, and is, in the case illustrated in FIG. 128, a sum of {np−1, np, np+1, np+2, np+3}. Furthermore, σ(n) is represented by, as already described, σ(n)="square root of (1/M(n−1)×h(n)/M(n−1)×(1−h(n)/M (n−1)))", and is the standard deviation of the normal distribution of the above-described Expression 8. σ(n) may be approximated as a constant regardless of n.

Hereinafter, a detailed description will be given while showing a specific example of a function Lightorg(t).

The following Expression 201 shows a specific example of the function Lightorg(t).

[Math. 201]

$$\text{Light}_{org}(t) = \begin{cases} -t^2 + e_{light}, & \text{if } t \leq 0 \\ -(d_{obs} \times t)^2 + e_{light}, & \text{if } 0 < t \end{cases} \quad \text{Expression 201}$$

In the function shown in the above Expression 201, the left side of the peak position (t=0) is a function expressed by a quadratic function, and the right side is a function expressed by another quadratic function. Light emission (short-time light emission) from the light emitting unit 12 has different inclinations at the rising edge and the falling edge in general cases, and Expression 201 is optimum as a function that approximates such a situation. Furthermore, by setting the value of dobs to 1, it is possible to cope with a case where the rising edge and the falling edge have the same inclination.

By measuring the intensity of light emitted from the light emitting unit 12 in advance, dobs becomes known.

By substituting Expression 201 into Expression 198, the following Expression 202 is obtained.

[Math. 202]

$$p_t(t) = \begin{cases} a_{light} \times (t - t_{peak})^2 + c_{light}, & \text{if } t \leq t_{peak} \\ a_{light} \times \{d_{obs} \times (x - t_{peak})\}^2 + c_{light}, & \text{if } t_{peak} < t \end{cases} \quad \text{Expression 202}$$

However, −alight×(blight squared) is newly set as alight. Then, alight×elight+clight is newly set as clight. In this case, the unknowns are alight, clight, and tpeak. As data in proximity to np used for function fitting, three points: np−1, np, and np+1 are used. Since there are three measurement points and three unknowns, the method of solving the least square error becomes a mere method of solving three simultaneous equations. That is, the following Expressions 203 to 205 are solved.

[Math. 203]

$$p(n_p - 1) = \begin{cases} a_{light} \times (D \times (n_p - 1 + 0.5) - t_{peak})^2 + c_{light}, & \text{if } D \times (n_p - 1 + 0.5) \leq t_{peak} \\ a_{light} \times \{d_{obs} \times (D \times (n_p - 1 + 0.5) - t_{peak})\}^2 + c_{light}, & \text{if } t_{peak} < D \times (n_p - 1 + 0.5) \end{cases} \quad \text{Expression 203}$$

-continued

[Math. 204]

$$p(n_p) = \begin{cases} a_{light} \times (D \times (n_p + 0.5) - t_{peak})^2 + c_{light}, & \text{if } D \times (n_p + 0.5) \leq t_{peak} \\ a_{light} \times \{d_{obs} \times (D \times (n_p + 0.5) - t_{peak})\}^2 + c_{light}, & \text{if } t_{peak} < D \times (n_p + 0.5) \end{cases}$$

Expression 204

[Math. 205]

$$p(n_p + 1) = \begin{cases} a_{light} \times (D \times (n_p + 1 + 0.5) - t_{peak})^2 + c_{light}, & \text{if } D \times (n_p + 1 + 0.5) \leq t_{peak} \\ a_{light} \times \{d_{obs} \times (D \times (n_p + 1 + 0.5) - t_{peak})\}^2 + c_{light}, & \text{if } t_{peak} < D \times (n_p + 1 + 0.5) \end{cases}$$

Expression 205

The left sides of the corresponding expressions described above are respectively the occurrence rates p(np−1), p(np), and p(np+1) in the (np−1)-th, np-th, and (np+1)-th bins obtained from measured values. dobs become known by measuring the intensity of light emission from the light emitting unit 12 in advance.

By solving Expressions 203 to 205 for alight, clight, and tpeak, time tpeak at the peak position can be obtained. That is, the peak position of active light components is detected with a time resolution finer than the time resolution of the histogram. Note that tpeak satisfies the above-described Expression 199.

Figure 129:
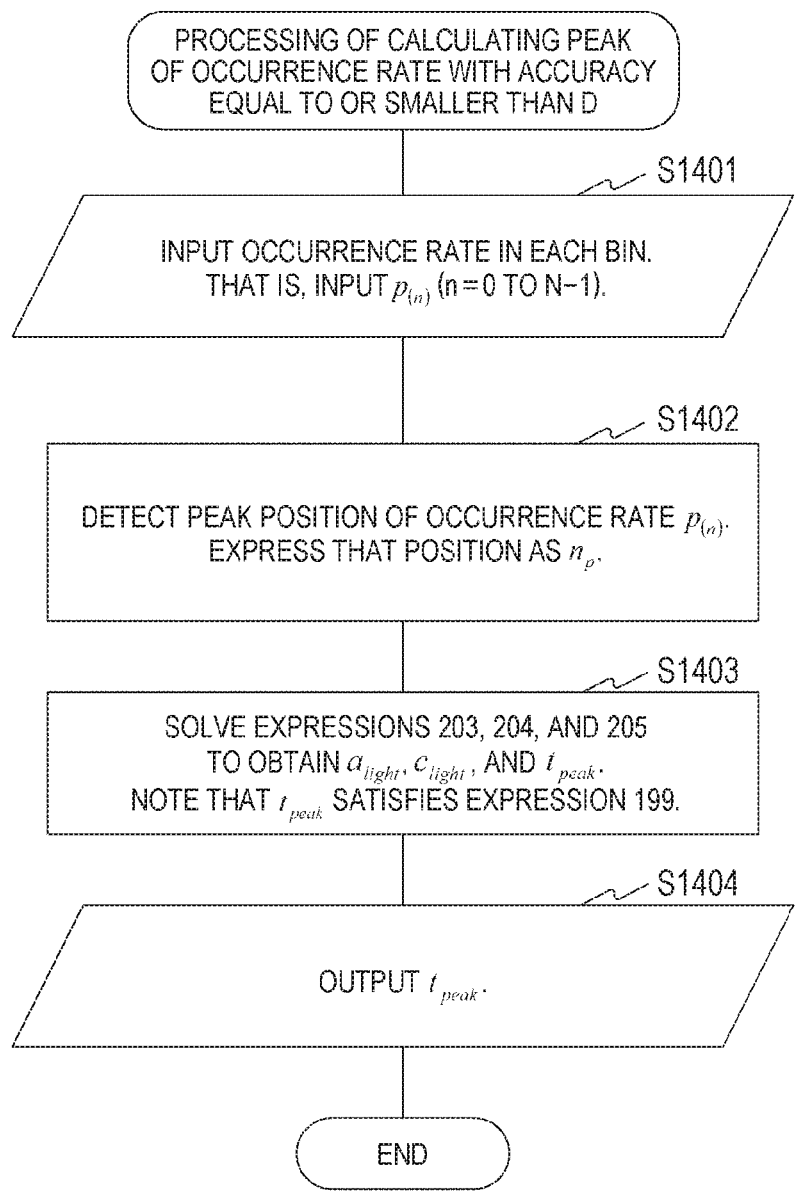

Summarizing the above, as processing of obtaining a peak of an occurrence rate with an accuracy equal to or smaller than D, a processing procedure illustrated in FIG. 129 can be performed to calculate the peak.

FIG. 129 is a flowchart illustrating an example of a processing procedure for obtaining a peak of an occurrence rate with an accuracy equal to or smaller than D. This processing is performed by the computation unit 16.

Note that it is assumed that an occurrence rate p(n) corresponding to each bin (n) has been obtained before this processing is performed. Here, n is 0 to N−1.

First, in step S1401, the occurrence rate in each bin is input. That is, p(n) is input. Here, n=0 to N−1. Then, the processing proceeds to step S1402.

In step S1402, a peak position of the occurrence rate p(n) is detected. That position is expressed as np. Peak detection is performed by a conventional technique. Then, the processing proceeds to step S1403.

In step S1403, Expressions 203 to 205 are solved to obtain alight, clight, and tpeak. Note that tpeak satisfies Expression 199. Then, the processing proceeds to step S1404.

In step S1404, tpeak is output. Then, the series of processing ends.

In this way, it is possible to calculate a peak position with an accuracy of less than D in time resolution. That is, a measuring device with a fine distance resolution can be provided.

Here, as a specific example of the function Lightorg(t), the left side and the right side of the peak position are each approximated by a quadratic function. Alternatively, for example, a normal distribution may be used for approximation.

Note that similar processing may be performed on a histogram, not an occurrence rate, to obtain an approximate value. That is, in the above description, the processing may be performed using h(n) instead of p(n) (n=0 to N−1). In this case, although the accuracy is lowered, the processing of calculating an occurrence rate can be omitted, which contributes to a reduction in the amount of calculation.

[Detection of Attribute of Object]

Next, a mode for detecting an attribute of an object to be measured will be described.

Figure 130:
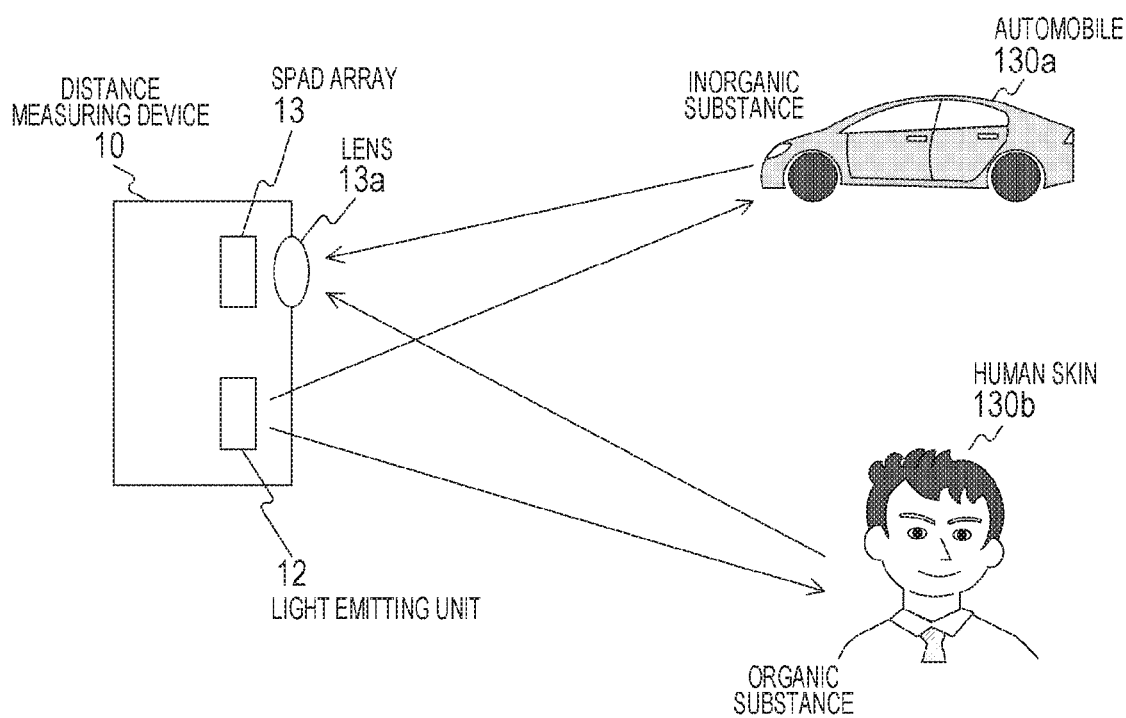

FIG. 130 illustrates a situation in which a distance measuring device 10 assumed in the embodiments of the present technology is used to measure an inorganic substance and an organic substance. Here, an automobile 130a is used as an example of an inorganic substance, and human skin 130b is used as an example of an organic substance. Light from the light emitting unit 12 in the distance measuring device 10 hits and is reflected by the automobile 130a and the human skin 130b, and reaches a corresponding SPAD in the SPAD array 13 via a lens 13a.

Figure 131A:
Figure 131B:
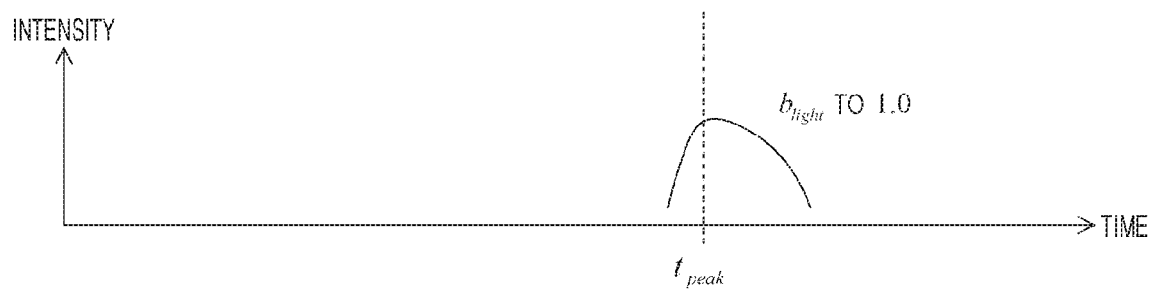
Figure 131C:
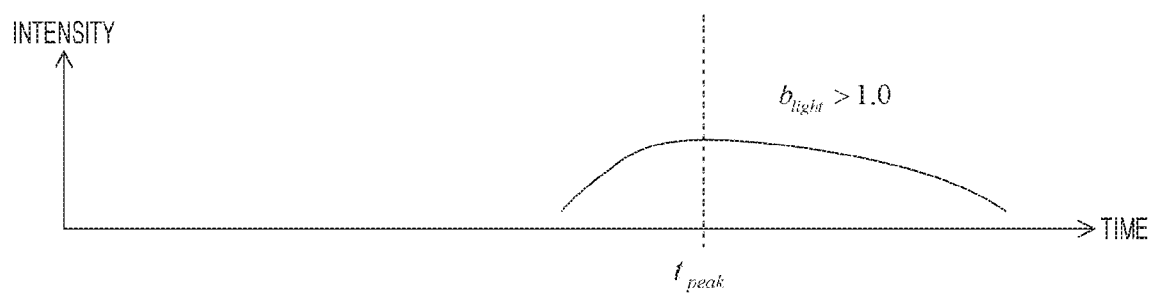

FIG. 131 is a diagram illustrating an example of measuring an object in which inorganic and organic substances are measured. Light from the light emitting unit 12 (A in FIG. 131) reaches the SPAD in the SPAD array 13 with an increased width caused by internal scattering at a subject, which is a reflection surface. In a case where the subject is an inorganic substance, internal scattering hardly occurs, so the width does not increase (B in FIG. 131). On the other hand, in a case where the subject is an organic substance, internal scattering is remarkable, so the width largely increases (C in FIG. 131). That is, the value of blight in Expressions 198 and 200 is substantially 1 for an inorganic substance, and is significantly larger than 1 for an organic substance.

When the computation unit 16 solves Expression 200, if the value of blight is equal to or smaller than a predetermined value, information that "the target object to be measured is an inorganic substance" is output from an output terminal 17 in the distance measuring device 10. If the value exceeds the predetermined value, information that "the target object to be measured is an organic substance" is output. This makes it possible to measure a distance to the target object to be measured and, at the same time, obtain the attribute (whether inorganic or organic) of the target object.

Now, the description will return to the embodiment in which a peak of an occurrence rate is obtained with an accuracy equal to or smaller than D. It has already been described that alight, blight, clight, and tpeak that satisfy Expression 200 can be obtained by the computation unit 16. If information regarding some of the unknowns alight, blight, clight, and tpeak can be obtained in advance, a more accurate solution can be obtained by solving Expression 200 taking into account the information.

For example, a camera 100 attached to the distance measuring device 10 can be used to obtain information regarding blight. This scene will be described with reference to FIGS. 132 and 133.

Recent image recognition technology enables recognition of an object projected onto an image captured by a camera. Consequently, a target object to be measured can be recognized by analyzing an image captured by the camera 100 using a conventional recognition technology.

For example, in the case illustrated in FIG. 132, it is possible to determine that the target object to be measured is the automobile 130a by analyzing, by the computation unit 16, an image captured by the camera 100. An automobile is inorganic and blight in Expression 200 is substantially 1. That is, in a case where the camera 100 determines that the target object to be measured is an automobile, Expression 200 may be solved with a condition that "blight is substantially 1". Specifically, the following Expression 206 may be solved instead of Expression 200.

[Math. 206]

$$\arg\min_{\substack{a_{light}, b_{light},\\ c_{light}, t_{peak}}} \left\{ \sum_{n \in neighbourhood\ of\ np} \frac{\{p(n) - a_{light} \times \text{Light}_{org}(b_{light} \times (D \times (n+0.5) - t_{peak})) - c_{light}\}^2}{\sigma(n)^2} \right\} - \{Const_{light} \times (b_{light} - 1)\}^2 \quad \text{Expression 206}$$

For example, in the case illustrated in FIG. 133, it is possible to determine that the target object to be measured is the human skin 130*b* by analyzing, by the computation unit 16, an image captured by the camera 100. Human skin is organic, and blight in Expression 200 is significantly larger than 1. That is, in a case where the camera 100 determines that the target object to be measured is human skin, Expression 200 may be solved with a condition that "blight is significantly larger than 1". Specifically, the following Expression 207 may be solved instead of Expression 200.

[Math. 207]

$$\arg\min_{\substack{a_{light}, b_{light},\\ c_{light}, t_{peak}}} \left\{ \sum_{n \in neighbourhood\ of\ np} \frac{\{p(n) - a_{light} \times \text{Light}_{org}(b_{light} \times (D \times (n+0.5) - t_{peak})) - c_{light}\}^2}{\sigma(n)^2} \right\} - \quad \text{Expression 207}$$

$$\left\{ \frac{Const_{light}}{b_{light} - 1} \right\}^2$$

Note that Constlight in Expressions 206 and 207 is a desired constant.

In this way, the solution of Expression 200 can be obtained more accurately by using a sensor different from the distance measuring device 10 (the camera 100 in the above-described examples) and obtaining information regarding some of the unknowns alight, blight, clight, and tpeak.

In this way, by applying the fourteenth embodiment, it is possible to interpolate values of bins in a histogram and obtain a peak value with an accuracy to at least one decimal place.

[Gist]

The gist of the fourteenth embodiment is as follows.

(1) A distance measuring device including:

a histogram acquisition unit that acquires a histogram indicating a frequency of reception of reflected light including active light components that are active light emitted from a light emitting unit and reflected by a target object and ambient light components that are ambient light reflected by the target object;

a detection unit that detects a distribution of the active light components by performing predetermined statistical processing on the histogram;

a peak position calculation unit that detects a peak position of the active light components with an accuracy higher than a time resolution of the histogram on the basis of the distribution of the active light components; and a measurement unit that measures a distance to the target object as distance information on the basis of the peak position.

(2) The distance measuring device according to (1), in which the peak position calculation unit determines a parameter such that a predetermined waveform having the parameter coincides with or best fits the "distribution of the active light components" in proximity to the "peak position in the distribution of the active light components", and then performs processing of detecting a peak position of the waveform with the "determined parameter".

(3) The distance measuring device according to (2), in which the peak position calculation unit further performs processing of determining an attribute of the target object in accordance with a width of a waveform by analyzing the "determined parameter" corresponding to the width of the waveform.

(4) The distance measuring device according to (2), in which the peak position calculation unit imposes a restriction on the parameter depending on an attribute of the target object and performs processing of determining the parameter such that the waveform having the parameter best fits.

16. Fifteenth Embodiment

[Outline]

Here, a description will be given of a mode in which the degree of certainty of a distance measurement result is output. As described above, a distance measuring device 10 outputs a distance to a target object from an output terminal 17 by detecting a peak in an occurrence rate or a histogram. In addition to this, the degree of correctness (degree of certainty) of the output distance information is also output from the output terminal 17 in this embodiment.

[Peak Detection]

Since an occurrence rate p(n) corresponding to each bin can be obtained as described using Expression 8, the description in this embodiment assumes that p(n) has already been obtained. Here, n is 0 to N−1. Note that, once again, a probability density function when an occurrence rate p(n) of an n-th bin is used as a random variable is represented by Expression 8.

As in the above-described first embodiment, when H(n)=h(n)/M(n−1) holds, H(n) is the average in the normal distribution of the above-described Expression 8. Then, when σ(n)="square root of (1/M(n−1)×h(n)/M(n−1)×(1−h(n)/M(n−1)))" holds, σ(n) is the standard deviation of the normal distribution of the above-described Expression 8. The description will be given on the assumption that these values have already been obtained.

Light (photon) from a light emitting unit 12 in the device 10 is reflected by a target object 20 and reaches a SPAD array 13 via a lens 13a. Then, a bin corresponding to the time that the light has reached is incremented by 1. Since the light emitting unit 12 emits light for a short time, the number of corresponding bins is small. That is, the counts in most bins are caused by light (photons) from ambient light.

When this is illustrated, FIG. 134 is obtained. The horizontal axis in the drawing indicates the number of elements in a set S. The set S is a subset of a set {0, 1, 2, 3, . . . N−2, N−1}. A probability Ppriori(S) that "a set of bins in which only light (photon) from the ambient light is counted is expressed as S, and a bin corresponding to the time at which light (photon) from the light emitting unit 12 has been detected is not included in the set S" is plotted on the vertical axis. Note that Ppriori(S) may be a relative value and thus may be in any unit.

In an example illustrated in FIG. 134, 90% out of N bins are bins in which only light (photon) from the ambient light is counted. That is, in the drawing, the value abruptly changes at around 0.9×N on the horizontal axis. When the value on the horizontal axis is equal to or smaller than 0.9×N, Ppriori(S) is substantially 0. When the value exceeds 0.9×N, Ppriori(S) has a large value. This Ppriori(S) can be determined by performing tests assuming a plurality of distance measurement sites, and Ppriori(S) is not limited to the function illustrated in the drawing. Again, Ppriori(S) is known by performing tests assuming a plurality of distance measurement sites in advance.

Furthermore, in a case where an approximate distance to an object on which distance measurement is to be performed is known and a bin corresponding to that distance is included in S, the value of Ppriori(S) may be reduced.

Consideration is given to a case where the set S is "a set of bins in which only light (photon) from the ambient light is counted". For each element n in the set S, the occurrence rate of the n-th bin has an average of H(n) and a standard deviation of σ(n), so an "occurrence rate of light (photon) from the ambient light" inferred from observation values of only the bins included in the set S is represented by the following Expression 208. That is, a weighted average can be used for the calculation, and that value is expressed as Hav(S) in Expression 208.

[Math. 208]

$$H_{av(S)} \stackrel{def}{=} \frac{\sum_{n \in S} \frac{H_{(n)}}{\sigma_{(n)}^2}}{\sum_{n \in S} \frac{1}{\sigma_{(n)}^2}} \quad \text{Expression 208}$$

Then, the probability that the occurrence rate of light (photon) from the ambient light is Hav(S) is represented by the following Expression 209.

[Math. 209]

$$\frac{\prod_{n \in S} \frac{1}{\sqrt{2\pi} \; \sigma_{(n)}} \exp\left(-\frac{(H_{(n)} - H_{av(S)})^2}{2\sigma_{(n)}^2}\right)}{\int_{-\infty}^{\infty} \prod_{n \in S} \frac{1}{\sqrt{2\pi} \; \sigma_{(n)}} \exp\left(-\frac{(H_{(n)} - x)^2}{2\sigma_{(n)}^2}\right) dx} \quad \text{Expression 209}$$

Thus, the following can be said about a set Sambient shown in the following Expression 210. A set of bins in which only light (photon) from the ambient light is counted is Sambient, and a bin corresponding to the time at which light (photon) from the light emitting unit 12 has been detected is not included in the set Sambient.

[Math. 210]

$$S_{ambient} \stackrel{def}{=} \arg\max_{S \in Pow(\{0,1,2,\cdots,N-1\})} P_{priori}(S) \times$$

$$\frac{\prod_{n \in S} \frac{1}{\sqrt{2\pi} \; \sigma_{(n)}} \exp\left(-\frac{(H_{(n)} - H_{av(S)})^2}{2\sigma_{(n)}^2}\right)}{\int_{-\infty}^{\infty} \prod_{n \in S} \frac{1}{\sqrt{2\pi} \; \sigma_{(n)}} \exp\left(-\frac{(H_{(n)} - x)^2}{2\sigma_{(n)}^2}\right) dx}$$

Expression 210

Thus, it can be said that the occurrence rate of light (photon) from the ambient light is Hambient represented by the following Expression 211.

[Math. 211]

$$H_{ambient} \stackrel{def}{=} H_{av(S_{ambient})} \quad \text{Expression 211}$$

Now, a peak position in the average H(n) of the occurrence rate in each bin (n=0 to N−1) is obtained. The peak position is expressed as np. Note that peak detection is a conventional technique, and a description of the technique will be omitted.

The average occurrence rate at the peak position np is H(np), and the standard deviation is σ(np). In a case where this value has a significant difference from the occurrence rate Hambient of light (photon) from the ambient light, it can be said that light (photon) from the light emitting unit 12 has been detected during the time corresponding to an np-th bin. That is, it can be said that the distance corresponding to the np-th bin is the distance to the target object 20. Conversely, in a case where the difference is not significant, it can be said that noise has been accidentally detected as a peak. As described above qualitatively, by quantifying and outputting this, the degree of certainty of the distance measurement result can be transmitted to a user.

For quantification, the following Expression 212 may be calculated.

[Math. 212]

$$\int_{-H_{ambient}}^{\infty} \frac{1}{\sqrt{2\pi} \; \sigma_{(n_p)}} \exp\left(-\frac{(x - H_{(n_p)})^2}{2\sigma_{(n_p)}^2}\right) dx \quad \text{Expression 212}$$

Expression 212 above represents a probability that a normal distribution (probability density function) with an average H(np) and a standard deviation a(np) takes a value larger than Hambient (the area of the gray portion in FIG. 135). That is, the degree of significance (reliability) of active light components with respect to ambient light components is obtained by Expression 212. Note that FIG. 135 illustrates an occurrence rate in each bin. In particular, only the np-th bin is illustrated, and other bins are not illustrated in the drawing.

[Processing Procedure]

Summarizing the above, processing of obtaining a reliability (degree of certainty) of a distance measurement result, that is, the degree of significance of active light components with respect to ambient light components, can be calculated by the following processing procedure illustrated in FIG. 136.

FIG. 136 is a flowchart illustrating an example of a processing procedure for obtaining a reliability (degree of certainty) of a distance measurement result. This processing is performed by the computation unit 16.

Note that it is assumed that the average H(n) and the standard deviation σ(n) of the occurrence rate corresponding to each bin (n) have been obtained before this processing is performed. Here, n is 0 to N−1.

First, in step S1501, the occurrence rate in each bin is input. That is, the average H(n) and the standard deviation a(n) are input (n=0 to N−1). Then, the processing proceeds to step S1502.

In step S1502, a peak position in the average H(n) of the occurrence rate for n=0 to N−1 is detected. That position is expressed as np. Then, the processing proceeds to step S1503.

In step S1503, Hambient is obtained from Expressions 208, 210, and 211. Alternatively, Expression 213 is solved to obtain Hambient. Then, the processing proceeds to step S1504.

[Math. 213]

$$H_{ambient} \stackrel{def}{=} \arg\max_{0 \leq H \leq 1} \left| \left\{ n \,\middle|\, H_{(n)} - \frac{\sigma_{(n)}}{2} \leq H \leq H_{(n)} + \frac{\sigma_{(n)}}{2} \right\} \right| \quad \text{Expression 213}$$

In step S1504, the value of Expression 212 is output from the output terminal 17. Then, the series of processing ends.

Note that supplementary information regarding step S1503 will be given below.

In the above description, it has been described that Hambient is obtained from Expressions 208, 210, and 211. However, this calculation is complicated. Consequently, Hambient may be obtained by Expression 213 for simplification.

Expression 213 is the same as Expression 9 already described, except that the symbols are different. From the description of Expression 9, it can be said that Hambient in Expression 213 is the occurrence rate of light (photon) from the ambient light.

That is, in step S1503 for calculating Hambient, Hambient may be obtained by Expressions 208, 210, and 211, or Hambient may be obtained by solving Expression 213.

Note that similar processing may be performed on a histogram, not an occurrence rate, to obtain an approximate value. In this case, although the accuracy is lowered, the processing of calculating an occurrence rate can be omitted, which contributes to a reduction in the amount of calculation.

Next, a description will be given of an example of using the mode in which the degree of certainty of a distance measurement result is output. FIG. 137 illustrates an example in which an application processor 10a is connected subsequent to the distance measuring device 10 illustrated in FIG. 1. The application processor 10a obtains distance information from the output terminal 17 and processes various applications. Examples include object detection and gesture recognition. (These applications using distance data are known, and a detailed description thereof will be omitted.)

The distance measuring device 10 includes an input terminal 17a. This enables inputting information from the application processor 10a. Information from the application processor 10a is sent to a control unit 11 via the input terminal 17a. The control unit 11 performs various controls on the basis of this information.

For example, consideration is given to a case where the application processor 10a does not require distance measurement data having a low degree of certainty. The application processor 10a sends a desired threshold to the control unit 11 via the input terminal 17a. The control unit 11 sends information regarding this threshold to the computation unit 16. Then, the computation unit 16 performs processing illustrated in FIG. 138.

FIG. 138 is a flowchart illustrating an example of a processing procedure for obtaining a reliability (degree of certainty) of a distance measurement result and outputting only distance data having at least a desired accuracy. This processing is performed by the computation unit 16.

Note that it is assumed that the average H(n) and the standard deviation σ(n) of the occurrence rate corresponding to each bin (n) have been obtained before this processing is performed. Here, n is 0 to N−1.

Steps S1601 to S1603 in FIG. 138 are respectively the same as steps S1501 to S1503 in FIG. 136, and a description thereof will be omitted.

After step S1603 ends, the processing proceeds to step S1604. In step S1604, only in a case where the value of Expression 212 is larger than the degree of certainty (desired threshold) specified from the input terminal 17a, a distance corresponding to the peak position np (i.e., c×np×D/2) is output from the output terminal 17. In a case where the value is smaller, no distance is output. Then, the series of processing ends.

In this way, it is possible to cause the distance measuring device 10 not to output distance data that is not required by the subsequent application 10a. This enables a reduction in the amount of data communication between the distance measuring device 10 and the application processor 10a.

As another example, consideration is given to a case where the application processor 10a accepts even distance measurement data having a not very high degree of certainty.

In this case, the processing illustrated in FIG. 136 is performed, and data regarding a distance to a target object and its degree of certainty are transmitted to the subsequent application processor 10a. In a case where the degree of certainty is larger than the desired value, the application processor 10a transmits that information to the control unit 11 via the input terminal 17a. The control unit 11 performs control so as to suppress the amount of light emission from the light emitting unit 11 in the next distance measurement. As a result, the amount of light emission in the next distance measurement decreases, and the height of the peak of the occurrence rate decreases. That is, the degree of certainty decreases. Even in a case where the degree of certainty is low, that degree of certainty is sufficient for the application processor 10a to perform processing without any problem. Then, by decreasing the amount of light emission, power consumption can be suppressed. That is, it is possible to perform distance measurement with the degree of certainty required by the application processor 10a and suppress the power consumption.

In this way, by applying the fifteenth embodiment, it is possible to output the degree of correctness (degree of certainty) of output distance information in addition to the distance to the target object.

[Gist]

The gist of the fifteenth embodiment is as follows.

(1) A distance measuring device including:
a histogram acquisition unit that acquires a histogram indicating a frequency of reception of reflected light including active light components that are active light emitted from a light emitting unit and reflected by a target object and ambient light components that are ambient light reflected by the target object;
a detection unit that detects a distribution of the active light components and the ambient light components by performing predetermined statistical processing on the histogram;
a measurement unit that measures a distance to the target object as distance information on the basis of the distribution of the active light components, and calculates the degree of significance (reliability) of the active light components with respect to the ambient light components; and
an output terminal that outputs the distance information and the degree of significance.

(2) A distance measuring device including:
a histogram acquisition unit that acquires a histogram indicating a frequency of reception of reflected light including active light components that are active light emitted from a light emitting unit and reflected by a target object and ambient light components that are ambient light reflected by the target object;
a detection unit that detects a distribution of the active light components and the ambient light components by performing predetermined statistical processing on the histogram;
a measurement unit that measures a distance to the target object as distance information on the basis of the distribution of the active light components, and calculates the degree of significance of the active light components with respect to the ambient light components; and
an output terminal that outputs the distance information, in which the distance information is output from the output terminal only in a case where the degree of significance exceeds a desired value (first value).

(3) A distance measuring device including:
a histogram acquisition unit that acquires a histogram indicating a frequency of reception of reflected light including active light components that are active light emitted from a light emitting unit and reflected by a target object and ambient light components that are ambient light reflected by the target object;
a detection unit that detects a distribution of the active light components and the ambient light components by performing predetermined statistical processing on the histogram;
a measurement unit that measures a distance to the target object as distance information on the basis of the distribution of the active light components, and calculates the degree of significance of the active light components with respect to the ambient light components; and
an output terminal that outputs the distance information, in which the amount of light emitted from the light emitting unit is suppressed in the next distance measurement in a case where the degree of significance exceeds a desired value (second value).

17. Application Example

The technology according to the present disclosure (the present technology) can be applied to various products. For example, the technology according to the present disclosure may be materialized as a device that is mounted on any type of mobile object such as an automobile, an electric vehicle, a hybrid electric vehicle, a motorcycle, a bicycle, personal mobility, an airplane, a drone, a ship, and a robot.

FIG. 139 is a block diagram illustrating a schematic configuration example of a vehicle control system that is an example of a mobile object control system to which the technology according to the present disclosure can be applied.

A vehicle control system 12000 includes a plurality of electronic control units connected via a communication network 12001. In the example illustrated in FIG. 139, the vehicle control system 12000 includes a drive system control unit 12010, a body system control unit 12020, an outside vehicle information detection unit 12030, an inside vehicle information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls operation of devices related to a drive system of a vehicle in accordance with various programs. For example, the drive system control unit 12010 serves as a device for controlling a driving force generator such as an internal combustion engine or a driving motor for generating a driving force of the vehicle, a driving force transmission mechanism for transmitting the driving force to wheels, a steering mechanism that adjusts a steering angle of the vehicle, a braking device that generates a braking force of the vehicle, and the like.

The body system control unit 12020 controls operation of various devices mounted on a vehicle body in accordance with various programs. For example, the body system control unit 12020 serves as a device for controlling a keyless entry system, a smart key system, a power window device, or various lamps such as a headlamp, a back lamp, a brake lamp, a blinker, or a fog lamp. In this case, the body system control unit 12020 may receive input of radio waves transmitted from a portable device that serves as a key or signals from various switches. The body system control unit 12020 receives input of these radio waves or signals, and controls a door lock device, the power window device, lamps, and the like of the vehicle.

The outside vehicle information detection unit 12030 detects information outside the vehicle on which the vehicle control system 12000 is mounted. For example, an image-capturing unit 12031 is connected to the outside vehicle information detection unit 12030. The outside vehicle information detection unit 12030 causes the image-capturing unit 12031 to capture an image outside the vehicle and receives the captured image. The outside vehicle information detection unit 12030 may perform object detection processing or distance detection processing for a person, a car, an obstacle, a sign, a character on a road surface, or the like on the basis of the received image.

The image-capturing unit 12031 is an optical sensor that receives light and outputs an electrical signal in accordance with the amount of received light. The image-capturing unit 12031 can output the electrical signal as an image, or can output it as distance measurement information. Furthermore, the light received by the image-capturing unit 12031 may be visible light or invisible light such as infrared rays.

The inside vehicle information detection unit 12040 detects information inside the vehicle. For example, a driver state detection unit 12041 that detects a driver's state is connected to the inside vehicle information detection unit 12040. The driver state detection unit 12041 includes, for example, a camera that captures an image of the driver, and the inside vehicle information detection unit 12040 may calculate the driver's degree of fatigue or degree of concentration on the basis of detection information input from the driver state detection unit 12041, or may distinguish whether the driver has fallen asleep or not.

The microcomputer 12051 can compute a control target value of the driving force generator, the steering mechanism, or the braking device on the basis of the information inside or outside the vehicle acquired by the outside vehicle information detection unit 12030 or the inside vehicle information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control for the purpose of autonomous driving, which is autonomous traveling without depending on operation by the driver, and the like by controlling the driving force generator, the steering mechanism, the braking device, or the like on the basis of information of the surroundings of the vehicle acquired by the outside vehicle information detection unit 12030 or the inside vehicle information detection unit 12040.

Furthermore, the microcomputer 12051 can output a control command to the body system control unit 12020 on the basis of information outside the vehicle acquired by the outside vehicle information detection unit 12030. For example, the microcomputer 12051 can perform cooperative control for the purpose of preventing glare such as switching from a high beam to a low beam by controlling the headlamp in accordance with the position of a preceding vehicle or an oncoming vehicle detected by the outside vehicle information detection unit 12030.

The audio/image output unit 12052 transmits at least one of a sound output signal or an image output signal to output devices capable of giving visual or audio information to a passenger in the vehicle or to the outside of the vehicle. In the example of FIG. 139, an audio speaker 12061, a display unit 12062, and an instrument panel 12063 are illustrated as the output devices. The display unit 12062 may include, for example, at least one of an on-board display or a head-up display.

FIG. 140 is a diagram illustrating an example of an installation position of the image-capturing unit 12031.

In FIG. 140, the image-capturing unit 12031 includes image-capturing units 12101, 12102, 12103, 12104, and 12105.

The image-capturing units 12101, 12102, 12103, 12104, and 12105 are disposed at positions such as a front nose, side mirrors, a rear bumper, a back door, and the top of a windshield in a passenger compartment of a vehicle 12100. The image-capturing unit 12101 disposed at the front nose and the image-capturing unit 12105 disposed at the top of the windshield in the passenger compartment mainly acquire an image ahead of the vehicle 12100. The image-capturing units 12102 and 12103 disposed at the side mirrors mainly acquire an image on the right or left from the vehicle 12100. The image-capturing unit 12104 disposed at the rear bumper or the back door mainly acquires an image behind the vehicle 12100. The image-capturing unit 12105 disposed at the top of the windshield in the passenger compartment is mainly used to detect a preceding vehicle, a pedestrian, an obstacle, a traffic light, a traffic sign, a lane, or the like.

Note that FIG. 140 illustrates an example of an imaging range of the image-capturing units 12101 to 12104. An image-capturing range 12111 indicates the image-capturing range of the image-capturing unit 12101 disposed at the front nose, image-capturing ranges 12112 and 12113 respectively indicate the image-capturing ranges of the image-capturing units 12102 and 12103 disposed at the side mirrors, and an image-capturing range 12114 indicates the image-capturing range of the image-capturing unit 12104 disposed at the rear bumper or the back door. For example, pieces of image data captured by the image-capturing units 12101 to 12104 are superimposed to obtain an overhead view image of the vehicle 12100 as viewed from above.

At least one of the image-capturing units 12101 to 12104 may have a function of acquiring distance information. For example, at least one of the image-capturing units 12101 to 12104 may be a stereo camera including a plurality of imaging elements, or may be an imaging element having pixels for phase difference detection.

For example, the microcomputer 12051 obtains, on the basis of distance information obtained from the image-capturing units 12101 to 12104, a distance to each three-dimensional object in the image-capturing ranges 12111 to 12114 and a change over time in the distance (relative speed with respect to the vehicle 12100), thereby extracting, as a preceding vehicle, the closest three-dimensional object that is particularly on the traveling path of the vehicle 12100 and is traveling at a predetermined speed (for example, equal to or greater than 0 km/h) in substantially the same direction as the vehicle 12100. Moreover, the microcomputer 12051 can set in advance an inter-vehicle distance to be maintained from a preceding vehicle and perform automatic brake control (including follow-up stop control), automatic acceleration control (including follow-up start control), and the like. In this way, it is possible to perform cooperative control for the purpose of autonomous driving, which is autonomous traveling without depending on operation by the driver, and the like.

For example, on the basis of distance information obtained from the image-capturing units 12101 to 12104, the microcomputer 12051 can classify and extract three-dimensional object data related to three-dimensional objects into two-wheeled vehicles, ordinary vehicles, large-sized vehicles, pedestrians, and other three-dimensional objects such as utility poles so that the three-dimensional object data can be used for automatic avoidance of obstacles. For example, the microcomputer 12051 identifies obstacles around the vehicle 12100 as obstacles that are visible to the driver of the vehicle 12100 and obstacles that are difficult to see. Then, the microcomputer 12051 determines a collision risk indicating the degree of risk of collision with each obstacle, and in a case where the collision risk is equal to or greater than a setting value and a collision may occur in that situation, driving assistance for collision avoidance can be performed by outputting an alarm to the driver via the audio speaker 12061 or the display unit 12062, or by performing forced deceleration or avoidance steering via the drive system control unit 12010.

At least one of the image-capturing units 12101 to 12104 may be an infrared camera that detects infrared rays. For example, the microcomputer 12051 can recognize a pedestrian by determining whether or not there is a pedestrian in an image captured by the image-capturing units 12101 to 12104. Such pedestrian recognition is performed by, for example, a procedure for extracting feature points in an image captured by the image-capturing units 12101 to 12104 as infrared cameras, and a procedure for distinguishing whether or not an object is a pedestrian by performing pattern matching processing on a series of feature points defining the contour of the object. When the microcomputer 12051 determines that there is a pedestrian in the image captured by the image-capturing units 12101 to 12104 and recognizes the pedestrian, the audio/image output unit 12052 causes the display unit 12062 to overlay a bounding box for highlighting on the recognized pedestrian. Furthermore, the audio/image output unit 12052 may cause the display unit 12062 to display an icon for a pedestrian or the like at a desired position.

An example of a vehicle control system to which the technology according to the present disclosure can be applied has been described above. The technology according to the present disclosure can be applied to the image-capturing unit 12031 among the configurations described above. Specifically, the above-described autonomous driving and driving assistance can be achieved by measuring a distance to an object from pixel data captured by the image-capturing unit 12031.

Note that the above-described embodiments show examples for embodying the present technology, and the matters in the embodiments and the matters specifying the invention in the claims have a correspondence relationship with each other. In a similar manner, the matters specifying the invention in the claims and the matters in the embodiments of the present technology with the same names have a correspondence relationship with each other. However, the present technology is not limited to the embodiments, and can be embodied by making a variety of modifications to the embodiments without departing from the gist thereof.

Furthermore, the processing procedures described in the above-described embodiments may be regarded as a method including a series of these procedures, or may be regarded as a program for causing a computer to execute the series of these procedures or a recording medium that stores the program. As the recording medium, for example, a compact disc (CD), a MiniDisc (MD), a digital versatile disc (DVD), a memory card, or a Blu-ray (registered trademark) disc can be used.

Note that effects described herein are merely illustrative and are not intended to be restrictive, and other effects may be obtained.

Note that the present technology can also be configured as described below.

(1) A distance measuring device including:
  a histogram acquisition unit that acquires a histogram indicating a frequency of reception of reflected light including active light components that are active light emitted from a light emitting unit and reflected by a target object and ambient light components that are ambient light reflected by the target object;
  a detection unit that detects a distribution of the active light components by performing predetermined statistical processing on the histogram; and
  a measurement unit that measures a distance to the target object as distance information on the basis of the distribution of the active light components.

(2) The distance measuring device according to (1), in which
  the detection unit performs, as the predetermined statistical processing, processing of obtaining a probability density function when an occurrence rate caused by reception of the reflected light is used as a random variable.

(3) The distance measuring device according to (1), in which
  the detection unit performs, as the predetermined statistical processing, processing of determining, when an occurrence rate caused by reception of the reflected light is expressed as a function of time, a parameter of the function that satisfies a relationship with the histogram.

(4) The distance measuring device according to (1), further including:
  a histogram noise removal processing unit that performs noise removal processing on the histogram,
  in which the detection unit performs the predetermined statistical processing on the histogram on which the noise removal processing has been performed by the histogram noise removal processing unit.

(5) The distance measuring device according to (4), in which
  the histogram noise removal processing unit adaptively performs weighted addition processing on a plurality of the histograms.

(6) The distance measuring device according to (4), in which
  the histogram noise removal processing unit performs weighted addition processing on occurrence rates obtained from a plurality of the histograms.

(7) The distance measuring device according to (4), in which
  the histogram noise removal processing unit performs noise removal processing on an occurrence rate obtained from the histogram.

(8) The distance measuring device according to (1), in which a calculation of parameters that satisfy a first constraint that constrains, when an occurrence rate caused by reception of the reflected light is expressed as a function of time, the parameters of the function to satisfy a relationship with the histogram and a second constraint that constrains the parameters to make the parameters in proximity to each other in time and space satisfy a specific relationship is performed, and the calculated parameters are used to obtain the distance to the target object or a luminance.

(9) The distance measuring device according to (1), further including:
  a distance information noise removal processing unit that removes noise from the distance information measured by the measurement unit.

(10) The distance measuring device according to (9), in which
  the distance information noise removal processing unit performs weighted addition processing in which the more pieces of the distance information are similar between pieces of data that are the same in time and position, the more the weighting is increased.

(11) The distance measuring device according to (9), in which
  the distance information noise removal processing unit determines the distance information after noise removal to cause an extreme value to be obtained by summing a first operator that causes the distance information after the noise removal to be equal to the distance information, and a second operator that causes a set of pieces of distance information, among pieces of the distance information after the noise removal adjacent to each other in time and space, having the smallest difference to be equal to each other.

(12) The distance measuring device according to (1), in which
the detection unit obtains, for every one of a plurality of the histograms, an occurrence rate by dividing each value of the histogram by a value obtained by subtracting the smallest frequency from the total number in the histogram, obtains peaks and peak areas of the occurrence rates, and obtains an area of a region of an object from a ratio between the peak areas.

(13) The distance measuring device according to (1), further including:
an image input unit that inputs a captured image of the target object;
an image dividing unit that divides the image into a plurality of divided regions; and
an assigning unit that assigns pieces of the distance information each to every one of the plurality of divided regions.

(14) The distance measuring device according to (1), in which
the detection unit obtains, for every one of a plurality of the histograms, an occurrence rate by dividing each value of the histogram by a value obtained by subtracting the smallest frequency from the total number in the histogram, performs deconvolution on the occurrence rate, and obtains a sharpened histogram from the deconvolved occurrence rate.

(15) The distance measuring device according to (1), in which
the detection unit obtains, for every one of a plurality of the histograms, an occurrence rate by dividing each value of the histogram by a value obtained by subtracting the smallest frequency from the total number in the histogram, obtains a peak position and a peak half width of the occurrence rate, and detects that the target object is obliquely disposed or in a moving state in a case where the half width is larger than a predetermined threshold.

(16) The distance measuring device according to (2), in which
the detection unit performs, under a condition that light is received again after a specific time has elapsed since reception of the reflected light, processing of obtaining the probability density function on the basis of state transition used to manage the specific time.

(17) The distance measuring device according to (1), in which
the detection unit detects a peak position of the active light components with a time resolution finer than a time resolution of the histogram on the basis of the distribution of the active light components, and measures the distance to the target object on the basis of the peak position.

(18) The distance measuring device according to (1), further including
an output unit,
in which the measurement unit generates the degree of significance of the active light components with respect to the ambient light components, and the output unit outputs the distance information and the degree of significance.

REFERENCE SIGNS LIST

10 Distance measuring device
11 Control unit
12 Light emitting unit
13 SPAD array
13*a* Lens
14 Time difference detection unit
15 Accumulation unit
16 Computation unit
17 Output terminal
18 Input terminal
20 Target object
30 Sun
100 Camera

The invention claimed is:

1. A distance measuring device, comprising:
a first circuitry configured to:
acquire a histogram, wherein
the histogram indicates a frequency of reception of reflected light, and
the reflected light includes active light components that are active light emitted from a light emitting unit and reflected by a target object and ambient light components that are ambient light reflected by the target object;
execute a statistical processing operation on the histogram;
detect a distribution of the active light components in the histogram;
obtain, for each histogram of a plurality of histograms, an occurrence rate by dividing each value of the histogram by a specific value, wherein the specific value is obtained by subtracting a smallest frequency from a total number in the histogram,
obtain peaks and peak areas of occurrence rates of the plurality of histograms;
obtain an area of a region of the target object from a ratio between the peak areas; and
measure a distance to the target object as distance information based on the obtained area of the region of the target object.

2. The distance measuring device according to claim 1, wherein
the first circuitry is further configured to execute, as the statistical processing operation, a processing operation of obtaining a probability density function when an occurrence rate caused by reception of the reflected light is used as a random variable.

3. The distance measuring device according to claim 1, wherein
the first circuitry is further configured to execute, as the statistical processing operation, a processing operation of determining, when an occurrence rate caused by reception of the reflected light is expressed as a function of time, a parameter of the function that satisfies a relationship with the histogram.

4. The distance measuring device according to claim 1, wherein the first circuitry is further configured to:
execute a noise removal processing operation on the histogram, wherein
execute statistical processing operation on the histogram on which the noise removal processing operation is executed.

5. The distance measuring device according to claim 4, wherein
the first circuitry is further configured to adaptively execute a weighted addition processing operation on the plurality of histograms.

6. The distance measuring device according to claim 4, wherein
the first circuitry is further configured to execute a weighted addition processing operation on the occurrence rates obtained from the plurality of histograms.

7. The distance measuring device according to claim 4, wherein
the first circuitry is further configured to execute a noise removal processing operation on an occurrence rate obtained from the histogram.

8. The distance measuring device according to claim 1, wherein
the first circuitry is further configured to calculate parameters that satisfy
a first constraint that constrains, when an occurrence rate caused by reception of the reflected light is expressed as a function of time, the parameters of the function to satisfy a relationship with the histogram, and
a second constraint that constrains the parameters to make the parameters, in proximity to each other in time and space, satisfy a specific relationship, and
the calculated parameters are used to obtain the distance to the target object or a luminance.

9. The distance measuring device according to claim 1, wherein the first circuitry is further configured to remove noise from the distance information.

10. The distance measuring device according to claim 9, wherein
the first circuitry is further configured to execute a weighted addition processing operation in which more pieces of the distance information are similar between pieces of data that are the same in time and position, more weighting is increased.

11. The distance measuring device according to claim 9, wherein
the first circuitry is further configured to determine the distance information after noise removal to cause an extreme value to be obtained by summing a first operator and a second operator,
the first operator causes the distance information after the noise removal to be equal to the distance information, and
the second operator causes a set of pieces of the distance information, among pieces of the distance information after the noise removal adjacent to each other in time and space, having a smallest difference to be equal to each other.

12. The distance measuring device according to claim 1, further comprising:
a second circuitry configured to:
input a captured image of the target object;
divide the captured image into a plurality of divided regions; and
assign pieces of the distance information each to every one of the plurality of divided regions.

13. The distance measuring device according to claim 1, wherein
the first circuitry is further configured to:
execute deconvolution on the occurrence rate, and
obtain a sharpened histogram from the deconvolved occurrence rate.

14. The distance measuring device according to claim 1, wherein
the first circuitry is further configured to:
obtain a peak position and a peak half width of the occurrence rate, and
detect that the target object is obliquely disposed or in a moving state in a case where the peak half width is larger than a threshold.

15. The distance measuring device according to claim 2, wherein
the first circuitry is further configured to obtain, under a condition that light is received again after a specific time has elapsed since reception of the reflected light, the probability density function based on state transition used to manage the specific time.

16. The distance measuring device according to claim 1, wherein
the first circuitry is configured to:
detect a peak position of the active light components with a time resolution finer than a time resolution of the histogram based on the distribution of the active light components, and
measure the distance to the target object based on the peak position.

17. The distance measuring device according to claim 1, further comprising a third circuitry, wherein
the first circuitry is further configured to generate a degree of significance of the active light components with respect to the ambient light components, and
the third circuitry is configured to output the distance information and the degree of significance.

18. A distance measuring device, comprising:
a first circuitry configured to:
acquire a histogram, wherein
the histogram indicates a frequency of reception of reflected light, and
the reflected light includes active light components that are active light emitted from a light emitting unit and reflected by a target object and ambient light components that are ambient light reflected by the target object;
execute a statistical processing operation on the histogram;
detect a distribution of the active light components in the histogram;
obtain, for each histogram of a plurality of histograms, an occurrence rate by dividing each value of the histogram by a specific value, wherein the specific value is obtained by subtracting a smallest frequency from a total number in the histogram,
obtain a peak position and a peak half width of occurrence rates of the plurality of histograms;
detect that the target object is obliquely disposed or in a moving state in a case where the peak half width is larger than a threshold; and
measure a distance to the target object as distance information based on the detected target object.

* * * * *